US008128482B2

(12) United States Patent
Yoshizawa

(10) Patent No.: US 8,128,482 B2
(45) Date of Patent: Mar. 6, 2012

(54) GAMING MACHINE INCLUDING MULTI-CHOICE GAME AND BATTLE EFFECT IMAGES

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 457 days.

(21) Appl. No.: 12/406,517

(22) Filed: Mar. 18, 2009

(65) Prior Publication Data

US 2009/0247268 A1 Oct. 1, 2009

Related U.S. Application Data

(60) Provisional application No. 61/037,434, filed on Mar. 18, 2008, provisional application No. 61/037,773, filed on Mar. 19, 2008, provisional application No. 61/037,783, filed on Mar. 19, 2008, provisional application No. 61/037,786, filed on Mar. 19, 2008, provisional application No. 61/037,795, filed on Mar. 19, 2008, provisional application No. 61/037,800, filed on Mar. 19, 2008, provisional application No. 61/037,825, filed on Mar. 19, 2008, provisional application No. 61/037,835, filed on Mar. 19, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ........................................... 463/20; 463/25

(58) Field of Classification Search .................... 463/20, 463/25

See application file for complete search history.

(56) References Cited

U.S. PATENT DOCUMENTS

| | | | | |
|---|---|---|---|---|
| 6,638,169 | B2 | 10/2003 | Wilder et al. | |
| 2009/0111572 | A1 * | 4/2009 | Bigelow et al. | 463/21 |
| 2009/0191964 | A9 * | 7/2009 | Baerlocher et al. | 463/31 |

* cited by examiner

*Primary Examiner* — William M. Brewster
(74) *Attorney, Agent, or Firm* — NDQ & M Watchstone LLP

(57) ABSTRACT

In a slot machine, once a player indicates the bet amount with respect to a "continuous game", one or a plurality of "continuous games" including unit games that are executed by the number of times which can be indicated by the player is specified through the bet amount with respect to the "continuous game" indicated by the player and the minimum bet amount with respect to a unit game which can be set by the player. Thereafter, the operation with respect to all buttons corresponding to the "continuous game" thus specified is validated. The player operates any of the buttons thus validated, whereby the "continuous game", which is constituted of unit games executed by the number of times indicated by the player through the above-mentioned operation, is executed. Then, the bet amount with respect to the "continuous game" indicated by the player is evenly allocated to each unit game constituting the "continuous game" indicated by the player. Incidentally, the bet amount which was left after the bet amount has been evenly allocated with respect to each unit game constituting the "continuous game" is returned to the player.

4 Claims, 131 Drawing Sheets

FIG. 3

| CODE NUMBER | EACH VIDEO REEL |
|---|---|
| 21 | FRANKENSTEIN |
| 20 | BELL |
| 19 | APPLE |
| 18 | BELL |
| 17 | CHERRY |
| 16 | ORANGE |
| 15 | PLUM |
| 14 | CHERRY |
| 13 | BELL |
| 12 | APPLE |
| 11 | BELL |
| 10 | ORANGE |
| 09 | PLUM |
| 08 | BLUE 7 |
| 07 | BELL |
| 06 | APPLE |
| 05 | BELL |
| 04 | ORANGE |
| 03 | PLUM |
| 02 | CHERRY |
| 01 | BELL |
| 00 | APPLE |

| SCATTERS |  |  |  |  |  |  |  |
|---|---|---|---|---|---|---|---|
| ANY9 | 500 | 250 | 250 | 50 | 50 | 20 | 20 |
| ANY8 | 300 | 200 | 40 | 20 | 20 | 15 | 15 |
| ANY7 | 200 | 100 | 20 | 15 | 15 | 10 | 10 |
| ANY6 | 100 | 40 | 10 | 10 | 4 | 4 | 4 |
| ANY5 | 40 | 10 | 4 | 4 | 2 | 2 | 2 |
| ANY4 | 10 | 4 | 4 | 2 | 1 | 1 | 1 |
| ANY3 | 4 | 2 | 1 | 1 | – | – | – |

FIG. 16

| CODE NUMBER | EACH VIDEO REEL |
|---|---|
| 21 | FRANKENSTEIN |
| 20 | BELL |
| 19 | APPLE |
| 18 | BELL |
| 17 | CHERRY |
| 16 | ORANGE |
| 15 | PLUM |
| 14 | CHERRY |
| 13 | BELL |
| 12 | APPLE |
| 11 | BELL |
| 10 | ORANGE |
| 09 | PLUM |
| 08 | BLUE 7 |
| 07 | BELL |
| 06 | APPLE |
| 05 | BELL |
| 04 | ORANGE |
| 03 | PLUM |
| 02 | CHERRY |
| 01 | BELL |
| 00 | APPLE |

| SCATTERS |  |  |  |  |  |  |  |
|---|---|---|---|---|---|---|---|
| ANY9 | 500 | 250 | 250 | 50 | 50 | 20 | 20 |
| ANY8 | 300 | 200 | 40 | 20 | 20 | 15 | 15 |
| ANY7 | 200 | 100 | 20 | 15 | 15 | 10 | 10 |
| ANY6 | 100 | 40 | 10 | 10 | 4 | 4 | 4 |
| ANY5 | 40 | 10 | 4 | 4 | 2 | 2 | 2 |
| ANY4 | 10 | 4 | 4 | 2 | 1 | 1 | 1 |
| ANY3 | 4 | 2 | 1 | 1 | - | - | - |

FIG. 35

| CODE NUMBER | EACH VIDEO REEL |
|---|---|
| 21 | FRANKENSTEIN |
| 20 | BELL |
| 19 | APPLE |
| 18 | BELL |
| 17 | CHERRY |
| 16 | ORANGE |
| 15 | PLUM |
| 14 | CHERRY |
| 13 | BELL |
| 12 | APPLE |
| 11 | BELL |
| 10 | ORANGE |
| 09 | PLUM |
| 08 | BLUE 7 |
| 07 | BELL |
| 06 | APPLE |
| 05 | BELL |
| 04 | ORANGE |
| 03 | PLUM |
| 02 | CHERRY |
| 01 | BELL |
| 00 | APPLE |

| SCATTERS |  |  |  |  |  |  |  |
|---|---|---|---|---|---|---|---|
| ANY9 | 500 | 250 | 250 | 50 | 50 | 20 | 20 |
| ANY8 | 300 | 200 | 40 | 20 | 20 | 15 | 15 |
| ANY7 | 200 | 100 | 20 | 15 | 15 | 10 | 10 |
| ANY6 | 100 | 40 | 10 | 10 | 4 | 4 | 4 |
| ANY5 | 40 | 10 | 4 | 4 | 2 | 2 | 2 |
| ANY4 | 10 | 4 | 4 | 2 | 1 | 1 | 1 |
| ANY3 | 4 | 2 | 1 | 1 | - | - | - |

| 2 GAMES | | | |
|---|---|---|---|
| PAYOUT PATTERN | FIRST | SECOND | CONTINUOUS IMAGE |
| 1 | ○ | × | A |
| 2 | × | ○ | B |
| 3 | ○ | ○ | C |

FIG. 53

| CODE NUMBER | EACH VIDEO REEL |
|---|---|
| 21 | FRANKENSTEIN |
| 20 | BELL |
| 19 | APPLE |
| 18 | BELL |
| 17 | CHERRY |
| 16 | ORANGE |
| 15 | PLUM |
| 14 | CHERRY |
| 13 | BELL |
| 12 | APPLE |
| 11 | BELL |
| 10 | ORANGE |
| 09 | PLUM |
| 08 | BLUE 7 |
| 07 | BELL |
| 06 | APPLE |
| 05 | BELL |
| 04 | ORANGE |
| 03 | PLUM |
| 02 | CHERRY |
| 01 | BELL |
| 00 | APPLE |

| SCATTERS |  |  |  |  |  |  |  |
|---|---|---|---|---|---|---|---|
| ANY9 | 500 | 250 | 250 | 50 | 50 | 20 | 20 |
| ANY8 | 300 | 200 | 40 | 20 | 20 | 15 | 15 |
| ANY7 | 200 | 100 | 20 | 15 | 15 | 10 | 10 |
| ANY6 | 100 | 40 | 10 | 10 | 4 | 4 | 4 |
| ANY5 | 40 | 10 | 4 | 4 | 2 | 2 | 2 |
| ANY4 | 10 | 4 | 4 | 2 | 1 | 1 | 1 |
| ANY3 | 4 | 2 | 1 | 1 | - | - | - |

| 2 GAMES | | | |
|---|---|---|---|
| PAYOUT PATTERN | FIRST | SECOND | CONTINUOUS IMAGE |
| 1 | ○ | × | A |
| 2 | × | ○ | B |
| 3 | ○ | ○ | C |

FIG. 73

| CODE NUMBER | EACH VIDEO REEL |
|---|---|
| 21 | FRANKENSTEIN |
| 20 | BELL |
| 19 | APPLE |
| 18 | BELL |
| 17 | CHERRY |
| 16 | ORANGE |
| 15 | PLUM |
| 14 | CHERRY |
| 13 | BELL |
| 12 | APPLE |
| 11 | BELL |
| 10 | ORANGE |
| 09 | PLUM |
| 08 | BLUE 7 |
| 07 | BELL |
| 06 | APPLE |
| 05 | BELL |
| 04 | ORANGE |
| 03 | PLUM |
| 02 | CHERRY |
| 01 | BELL |
| 00 | APPLE |

| SCATTERS |  |  |  |  |  |  |  |
|---|---|---|---|---|---|---|---|
| ANY9 | 500 | 250 | 250 | 50 | 50 | 20 | 20 |
| ANY8 | 300 | 200 | 40 | 20 | 20 | 15 | 15 |
| ANY7 | 200 | 100 | 20 | 15 | 15 | 10 | 10 |
| ANY6 | 100 | 40 | 10 | 10 | 4 | 4 | 4 |
| ANY5 | 40 | 10 | 4 | 4 | 2 | 2 | 2 |
| ANY4 | 10 | 4 | 4 | 2 | 1 | 1 | 1 |
| ANY3 | 4 | 2 | 1 | 1 | - | - | - |

| ASSIGNED VALUE | RANDOM NUMBER VALUE |
|---|---|
| 0 | 0~ 10 |
| 10 | 11~101 |
| 20 | 102~230 |
| 50 | 231~255 |

| CHOICE RESULT | RANDOM NUMBER VALUE |
|---|---|
| SUCCESS | 0~177 |
| FAILURE | 178~256 |

| ASSIGNED VALUE | RANDOM NUMBER VALUE |
|---|---|
| 0 | 0~ 10 |
| 10 | 11~101 |
| 20 | 102~230 |
| 50 | 231~255 |

| CHOICE RESULT | RANDOM NUMBER VALUE |
|---|---|
| SUCCESS | 0~177 |
| FAILURE | 178~256 |

FIG. 148

| CODE NUMBER | EACH VIDEO REEL |
| --- | --- |
| 21 | FRANKENSTEIN |
| 20 | BELL |
| 19 | APPLE |
| 18 | BELL |
| 17 | CHERRY |
| 16 | ORANGE |
| 15 | PLUM |
| 14 | CHERRY |
| 13 | BELL |
| 12 | APPLE |
| 11 | BELL |
| 10 | ORANGE |
| 09 | PLUM |
| 08 | BLUE 7 |
| 07 | BELL |
| 06 | APPLE |
| 05 | BELL |
| 04 | ORANGE |
| 03 | PLUM |
| 02 | CHERRY |
| 01 | BELL |
| 00 | APPLE |

| SCATTERS |  |  |  |  |  |  |  |
|---|---|---|---|---|---|---|---|
| ANY9 | 500 | 250 | 250 | 50 | 50 | 20 | 20 |
| ANY8 | 300 | 200 | 40 | 20 | 20 | 15 | 15 |
| ANY7 | 200 | 100 | 20 | 15 | 15 | 10 | 10 |
| ANY6 | 100 | 40 | 10 | 10 | 4 | 4 | 4 |
| ANY5 | 40 | 10 | 4 | 4 | 2 | 2 | 2 |
| ANY4 | 10 | 4 | 4 | 2 | 1 | 1 | 1 |
| ANY3 | 4 | 2 | 1 | 1 | — | — | — |

GAMING MACHINE INCLUDING MULTI-CHOICE GAME AND BATTLE EFFECT IMAGES

CROSS-REFERENCE TO RELATED APPLICATIONS

This application is based upon and claims a priority from the U.S. Provisional Patent Application No. 61/037,773 filed on Mar. 19, 2008, the U.S. Provisional Patent Application No. 61/037,783 filed on Mar. 19, 2008, the U.S. Provisional Patent Application No. 61/037,786 filed on Mar. 19, 2008, the U.S. Provisional Patent Application No. 61/037,795 filed on Mar. 19, 2008, the U.S. Provisional Patent Application No. 61/037,434 filed on Mar. 18, 2008, the U.S. Provisional Patent Application No. 61/037,800 filed on Mar. 19, 2008, the U.S. Provisional Patent Application No. 61/037,825 filed on Mar. 19, 2008 and the U.S. Provisional Patent Application No. 61/037,835 filed on Mar. 19, 2008, the entire contents of which are incorporated herein by reference.

BACKGROUND

1. Field of the Invention

The present invention relates to a gaming machine in which setting of the bet amount is performed.

2. Description of Related Art

In slot machines, including both mechanical slot machines and video slot machines, representing one example of conventional gaming machines, a plurality of reels have been employed as a means of showing a game result. In such slot machines, the reels are displayed while being rotated and symbols arranged at the periphery of these reels are variably displayed. Then, the variable display of the reels is stopped so as to display the symbols which have been determined by internal lottery. A plurality of areas where the symbols will be displayed are set in advance and a winning combination is determined in accordance with a symbol combination displayed on these areas. As a result of this determination, if it was determined that a winning combination has been realized, a payout is awarded in accordance with the winning combination thus realized and the bet amount that was bet on these areas.

In this respect, in a slot machine such as described in U.S. Pat. No. 6,638,169, which is installed in great number in casinos and the like, a player indicates, at the start of a game, the area(s) with respect to which the winning combination determination will be made, from a plurality of areas thus provided. The player also indicates the bet amount for each area. Thus, a number obtained by adding up the bet amount corresponding only to the number of indicated areas is set as a total of the bet amount which the player bet in 1 game.

In such a slot machine, when designating the areas, area number setting buttons such as “1”, “5”, “25” and the like are used for setting the number of areas which the player wishes to indicate as areas with respect to which the winning combination determination will be made. These area number setting buttons are provided on an operation panel of the slot machine. For instance, if the player depresses the area number setting button “5”, 5 areas are set as areas with respect to which the winning combination determination will be made. Further, bet number setting buttons such as “1”, “3”, “8” and the like are used for setting the bet amount for an area which the player wishes to indicate. As is a case with the area number setting buttons, the bet amount setting buttons are also provided on the operation panel of the slot machine. Here, if the player depresses the bet amount setting button “8”, 8 bets are bet with respect to an area. In this case, 8 bets have been bet with respect to each one of 5 areas, meaning that the bet amount corresponding to “40” is set as a total of the bet amount. With this settings established, the game can start.

However, in such a slot machine, the player could not indicate the total of the bet amount with respect to a unit game which is executed continuously. Also, the player could not indicate the continuous unit game number of times for which the bet amount is set in a lump.

SUMMARY

The present invention is made in light of the above, and it is an object of the present invention to provide a novel, unprecedented gaming machine by making it possible to set the bet amount in a lump with respect to a continuous game which is made up of a group of unit games.

To achieve the object of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a unit game upon performing an inputting operation by the player with the completion device, and starting progress of the unit game; and (4) in a case where the player performs an indicating operation with any of the continuous number of times indicating devices validated: allocating respectively the indicated bet amount with respect to each of unit games corresponding to a continuous number of times of a type which corresponds to the continuous number of times indicating device in which the indicating operation is performed upon performing an inputting operation by the player with the completion device, and starting automatic continuous repetition of progress of each of unit games corresponding to the continuous number of times of the type which corresponds to the continuous number of times indicating device in which the indicating operation is performed.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a maximum number of times indicating device with which a player performs an indicating operation so as to bet the bet amount which is indicated in the bet amount indicating device with respect to the continuous game, and which is provided so as to correspond to a maximum continuous number of times which is computed based on both the bet amount indicated in the bet amount designating device and the minimum bet amount; a completion device with which a player performs an inputting operation of a completion with respect to each of the indicating operations in the bet amount indicating device and the unit game indicating device, with which a player performs an inputting operation of a completion with respect to each of the indicating operations in the bet amount indicating device and the continuous number of times indicating device or with which a player performs an inputting operation of a completion with respect to each of the indicating operations in the bet amount indicating device and the maximum number of times indicating device; and a processor which is programmed to execute each of processes from the process of (1) below to the process of (5) below: (1) each time a player performs an indicating operation of a bet amount with the bet amount indicating device: based on the minimum bet amount and the bet amount indicated, computing the maximum continuous number of times with respect to which the bet amount indicated can be bet and specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a unit game upon performing an inputting operation by the player with the completion device, and starting progress of the unit game; (4) in a case where the player performs an indicating operation with any of the continuous number of times indicating devices validated: allocating respectively the indicated bet amount with respect to each of unit games corresponding to a continuous number of times of a type which corresponds to the continuous number of times indicating device in which the indicating operation is performed upon performing an inputting operation by the player with the completion device, and starting automatic continuous repetition of progress of each of unit games corresponding to the continuous number of times of the type which corresponds to the continuous number of times indicating device in which the indicating operation is performed; and (5) in a case where the player performs an indicating operation with the maximum number of times indicating device: allocating respectively the indicated bet amount with respect to each of unit games corresponding to the maximum continuous number of times computed upon performing an inputting operation by the player with the completion device, and starting automatic continuous repetition of progress of each of unit games corresponding to the maximum continuous number of times computed.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a display device; a plurality of continuous images that respectively generated to correspond to each of the plurality of types of continuous number of times, so as to be continuously displayed on the display device from a start of progress of an initial unit game constituting the continuous game till an end of progress of a final unit game constituting the continuous game; a continuous image group which is made up of the continuous images; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-4) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a unit game upon performing an inputting operation by the player with the completion device, and starting progress of the unit game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) selecting the continuous image generated to correspond to the specified continuous number of times from the continuous image group; and (4-4) starting automatic continuous repetition of progress of each of the unit games corresponding to the specified continuous number of times simultaneously with starting a display of the selected continuous image on the display device.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a display device; a plurality of single images that respectively generated so as to be continuously displayed on the display device from a start of progress of a unit game till an end of progress of the unit game; a single image group which is made up of the single images; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-5) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: (3-1) allocating all of the indicated bet amount with respect to a unit game upon performing an inputting operation by the player with the completion device; (3-2) selecting at random one of the single images from the single image group; and (3-3) starting progress of the unit game simultaneously with starting a display of the selected single image on the display device; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) selecting the single images corresponding to the specified continuous number of times from the single image group in accordance with rules corresponding to each of the allocated bet amount; (4-4) generating from the selected single images a continuous image which is continuously displayed on the display device from a start of progress of an initial unit game which is included in unit games corresponding to the specified continuous number of times till an end of progress of a final unit game which is included in unit games corresponding to the specified continuous number of times; and (4-5) starting automatic continuous repetition of progress of each of unit games corresponding to the specified continuous number of times simultaneously with starting a display of the generated continuous image on the display device.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a plurality of payout patterns respectively generated in advance by patterns which specify whether or not it is time to award a payout to a player during the continuous game progressing with respect to each unit game which is progressed continuously in the continuous game progressing, and which can respectively be generated with respect to each of the plurality of types of continuous number of times; a payout pattern group which is made up of the payout patterns; a display device; a plurality of continuous images that respectively generated in advance to correspond to each of the payout patterns, so as to be continuously displayed on the display device from a start of progress of an initial unit game constituting the continuous game till an end of progress of a final unit game constituting the continuous game; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-8) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a unit game upon performing an inputting operation by the player with the completion device, and starting progress of the unit game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) determining in advance, at random, payout results with respect to each of unit games corresponding to the specified continuous number of times; (4-4) computing in advance a total payout which will be awarded to a player in continuous repetition of progress of each of unit games corresponding to the specified continuous number of times based on each of the payout results determined in advance and each of the bet amounts allocated; (4-5) selecting at random one of the payout patterns that was generated for the specified continuous number of times from the payout pattern group; (4-6) from each of unit games corresponding to the specified continuous number of times: allocating respectively the total payout computed in advance only to each of unit games which specified it is time to award a payout to a player by using the payout pattern selected; (4-7) starting automatic continuous repetition of progress of each of unit games corresponding to the specified continuous number of times simultaneously with starting a display of the continuous image corresponding to the selected payout pattern on the display device; and (4-8) awarding respectively each of the allocated payout to the player in executing unit games with respect to which it was specified it is time to award a payout to a player by using the selected payout pattern.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a display device; a plurality of single images that respectively generated so as to be continuously displayed on the display device from a start of progress of a unit game till an end of progress of the unit game and that notify a player of a payout to be awarded to the player in the unit game; a single image group which is made up of the single images; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-10) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: (3-1) allocating all of the indicated bet amount with respect to a unit game upon performing an inputting operation by the player with the completion device; (3-2) determining at random a payout result of the unit game; (3-3) computing a payout which will be awarded to the player in the unit game progressing based on the payout result determined and the bet amounts allocated; (3-4) selecting at random one of the single images that notify the player of the computed payout from the single image group; and (3-5) starting progress of the unit game based on the payout result determined simultaneously with starting a display of the selected single image on the display device; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) determining in advance, at random, payout results with respect to each of unit games corresponding to the specified continuous number of times; (4-4) computing in advance a total payout which will be awarded to a player in continuous repetition of progress of each of unit games corresponding to the specified continuous number of times based on each of the payout results determined in advance and each of the bet amounts allocated; (4-5) generating a payout pattern which specifies whether or not it is time to award a payout to a player during the progress of each of unit games corresponding to the specified continuous number of times with respect to each of the unit games; (4-6) from each of unit games corresponding to the specified continuous number of times: allocating respectively the total payout computed in advance only to each of unit games which specified it is time to award a payout to a player by using the payout pattern generated; (4-7) selecting respectively from the single image group the single image which notifies a player of a payout with respect to each of unit games corresponding to the specified continuous number of times based on each of the payout amount allocated and the payout pattern generated; (4-8) generating a continuous image corresponding to the payout pattern generated, by combining each of the selected single images in accordance with an execution sequence of each of unit games corresponding to the specified continuous number of times; (4-9) starting automatic continuous repetition of progress of each of unit games corresponding to the specified continuous number of times simultaneously with starting a display of the generated continuous image on the display device; and (4-10) awarding respectively each of the allocated payout to the player in executing unit games with respect to which it was specified it is time to award a payout to a player by using the generated payout pattern.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a display device; a peak image which is generated to be continuously displayed on the display device from a start of progress of a unit game till an end of progress of the unit game, in a case where a payout is awarded to a player in the unit game; a normal image which is generated to be continuously displayed on the display device from a start of progress of a unit game till an end of progress of the unit game, in a case where no payout is awarded to a player in the unit game; a plurality of image patterns respectively generated in advance by patterns which specify a time for displaying one of the peak image and the normal image during the continuous game progressing with respect to each unit game which is progressed continuously in the continuous game progressing, and which can respectively be generated with respect to each of the plurality of types of continuous number of times; an image pattern group which is made up of the image patterns; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-5) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: (3-1) allocating all of the indicated bet amount with respect to a unit game upon performing an inputting operation by the player with the completion device; (3-2) determining at random a payout result of the unit game; (3-3) selecting any one of the peak image and the normal image based on the payout result determined; and (3-4) starting progress of the unit game based on the determined payout result simultaneously with starting a display of the selected one of the peak image and the normal image on the display device; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) specifying a payout pattern complying with an execution sequence of each of unit games corresponding to the specified continuous number of times by determining in advance, at random, payout results with respect to each of unit games corresponding to the specified continuous number of times; (4-4) selecting the image pattern corresponding to the specified payout pattern from the image pattern group; (4-5) starting automatic continuous repetition of progress of each of unit games corresponding to the specified continuous number of times based on the specified payout pattern simultaneously with starting a display of one of the peak image and the normal image on the display device based on the selected image pattern.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a display device; a plurality of peak images that are respectively generated to be continuously displayed on the display device from a start of progress of a unit game till an end of progress of the unit game, in a case where a payout is awarded to a player in the unit game; a plurality of normal images that are respectively generated to be continuously displayed on the display device from a start of progress of a unit game till an end of progress of the unit game, in a case where no payout is awarded to a player in the unit game; an image group which is made up of the peak images and the normal images; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-6) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: (3-1) allocating all of the indicated bet amount with respect to a unit game upon performing an inputting operation by the player with the completion device; (3-2) determining at random a payout result of the unit game; (3-3) selecting any one of the peak images and the normal images based on the payout result determined and the allocated bet amount from the image group; and (3-4) starting progress of the unit game based on the determined payout result simultaneously with starting a display of the selected one of the peak images and the normal images on the display device; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) generating a payout pattern complying with an execution sequence of each of unit games corresponding to the specified continuous number of times by determining in advance, at random, payout results with respect to each of unit games corresponding to the specified continuous number of times; (4-4) selecting respectively from the image group any one of the peak image and the normal image with respect to each of unit games corresponding to the specified continuous number of times based on each of the bet amounts allocated and the payout pattern generated; (4-5) generating a continuous image by combining one side of the selected peak images or the selected normal images in accordance with an execution sequence of each of unit games corresponding to the specified continuous number of times; (4-6) starting automatic continuous repetition of progress of each of unit games corresponding to the specified continuous number of times based on the generated payout pattern simultaneously with starting a display of the generated continuous image on the display device.

Furthermore, according to another aspect of the present invention, there is provided a gaming machine comprising: a plurality of specific symbols; an accumulated number into which an appearance number of the specific symbols is included; a plurality of symbols including the specific symbols; a symbol group which is made up of the symbols; a display device which displays some of the symbols that are in a state of being arranged; a plurality of unit games in which the plurality of symbols which have been selected at random from the symbol group are rearranged and in which a payout is awarded to a player based on a total number of the identical symbols which have been rearranged; a continuous game which is a group of the unit games that progress by being executed continuously up to a plurality of number of times; a specific display area which is provided in the display device and in which the specific symbols which have been included in the accumulated number are displayed additionally during progress of the continuous game; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-8) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a unit game upon performing an inputting operation by the player with the completion device, and starting progress of the unit game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) determining in advance, at random, payout results with respect to each of unit games corresponding to the specified continuous number of times; (4-4) computing in advance a total payout which will be awarded to a player in continuous repetition of progress of each of unit games corresponding to the specified continuous number of times based on each of the payout results determined in advance and each of the bet amounts allocated; (4-5) computing a total required number of the specific symbols which must be displayed on the display device so that the total payout computed in advance is awarded to the player; (4-6) starting automatic continuous repetition of progress of each of unit games corresponding to the specified continuous number of times; (4-7) in a unit game other than the unit game which is executed finally from each of unit games corresponding to the specified continuous number of times: (4-7-1) in a case that a payout is awarded to a player based on a total number of the identical symbols that are rearranged on the display device if the symbols selected at random from the symbol group have been rearranged on the display device: eliminating forcibly awarding the payment to the player by replacing the selected symbols with other symbols; (4-7-2) in a case that the symbols that are rearranged on the display device include the specific symbols: if a result of including a number of the specific symbol rearranged into the accumulated number is below the calculated total required number; maintaining the including result of the accumulated number and displaying additionally in the specific display area the specific symbols rearranged simultaneously with permitting the rearrangement of the specific symbols on the display device; if a result of including a number of the specific symbol rearranged into the accumulated number is equal to or higher than the calculated total required number; cancelling the including result of the accumulated number and eliminating forcibly awarding a payout to the player by replacing the specific symbols with other symbols; and (4-8) in a case that the total payout computed in advance differs from a payout which is awarded to a player based on a total number of the identical symbols from the symbols that are rearranged on the display device and the specific symbols that are displayed in the specific display area if the symbols selected at random from the symbol group have been rearranged on the display device, in the unit game which is executed finally from each of unit games corresponding to the specified continuous number of times: eliminating forcibly awarding the total payout computed in advance to the player by replacing the selected symbols with other symbols.

Furthermore, according to another aspect of the present invention, there is provided a gaming machine comprising: a plurality of symbols; a symbol group which is made up of the symbols; a display device which displays some of the symbols that are in a state of being arranged; a plurality of unit games in which the plurality of symbols which have been selected at random from the symbol group are rearranged and in which a payout is awarded to a player based on a total number of the identical symbols which have been rearranged; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; and a processor which is programmed to execute each of processes from the process of (1) below to the process of (4-8) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a unit game upon performing an inputting operation by the player with the completion device, and starting progress of the unit game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of unit games corresponding to the specified continuous number of times; (4-3) determining in advance, at random, payout results with respect to each of unit games corresponding to the specified continuous number of times; (4-4) computing in advance a total payout which will be awarded to a player in continuous repetition of progress of each of unit games corresponding to the specified continuous number of times based on each of the payout results determined in advance and each of the bet amounts allocated; (4-5) allocating the total payout computed in advance only to a unit game which is executed finally from each of unit games corresponding to the specified continuous number of times; (4-6) starting automatic continuous repetition of progress of each of unit games corresponding to the specified continuous number of times; (4-7) in a case that a payout is awarded to a player based on a total number of the identical symbols that are rearranged on the display device if the symbols selected at random from the symbol group have been rearranged on the display device, in a unit game other than the unit game which is executed finally from each of unit games corresponding to the specified continuous number of times: eliminating forcibly awarding the payment to the player by replacing the selected symbols with other symbols; and (4-8) in a case that the total payout computed in advance differs from a payout which is awarded to a player based on a total number of the identical symbols that are rearranged on the display device if the symbols selected at random from the symbol group have been rearranged on the display device, in the unit game which is executed finally from each of unit games corresponding to the specified continuous number of times: eliminating forcibly awarding the total payout computed in advance to the player by replacing the selected symbols with other symbols.

Furthermore, according to another aspect of the present invention, there is provided a gaming machine comprising: a display device; a plurality of multiple-choice games that progress on the display device; a continuous game which is a group of the multiple-choice games that can progress by being executed continuously up to a plurality of number of times with using a basic payout and odds which up the basic payout; a bet amount indicating device with which a player performs an indicating operation of a bet amount; a minimum bet amount that a player can indicate per one of the multiple-choice games by employing the bet amount indicating device; a unit game indicating device with which a player performs an indicating operation so as to bet the bet amount which is indicated in the bet amount indicating device with respect to the multiple-choice game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a plurality of success images that notify a player of success in the multiple-choice game and that are respectively generated in advance with respect to each combination between the continuous number of times of the multiple-choice games and the basic payout; a plurality of failure images that notify a player of failure in the multiple-choice game and that are respectively generated in advance with respect to each combination between the continuous number of times of the multiple-choice games and the basic payout; an image group which is made up of the success images and the failure images; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; a choice device with which a player performs a choosing operation in the multiple-choice game; and a processor which is programmed to execute each of processes from the process of (1) below to the process of (4) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a multiple-choice game upon performing an inputting operation by the player with the completion device, and starting progress of the multiple-choice game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of multiple-choice games corresponding to the specified continuous number of times; (4-3) displaying a plurality of first choices on the display device; (4-4) specifying any one of the displayed first choices based on a choosing operation which is performed by the player using the choice device; (4-5) starting progress of an initial multiple-choice game constituting the current continuous game after determining the basic payout based on both the first choice specified and the bet amount allocated; (4-6) displaying a plurality of second choices on the display device simultaneously with incrementing the continuous number of times of the multiple-choice games in the current continuous game; (4-7) specifying any one of the displayed second choices based on a choosing operation which is performed by the player using the choice device; (4-8) determining a result of the current multiple-choice game either as success or failure based on the second choice specified; (4-9) in a case that the determined game result shows success: (4-9-1) upping the odds as compared to an actual condition; (4-9-2) computing a payout based on the upped odds and the basic payout; (4-9-3) awarding the computed payout to the player; (4-9-4) selecting the success image corresponding to the combination between the continuous number of times of the multiple-choice games and the basic payout from the image group; (4-9-5) displaying the image selected on the display device; (4-9-6) repeating the multiple-choice game by reverting the process of (4-6) above, if the continuous number of times of the multiple-choice game is smaller than the specified continuous number of times; (4-9-7) ending the continuous game, if the continuous number of times of the multiple-choice game is equal to the specified continuous number of times; and (4-10) in a case that the determined game result shows failure: (4-10-1) selecting the failure image corresponding to the combination between the continuous number of times of the multiple-choice games and the basic payout from the image group; (4-10-2) displaying the image selected on the display device; and (4-10-3) ending the continuous game.

Furthermore, according to another aspect of the present invention, there is provided a gaming machine comprising: a display device; a plurality of multiple-choice games that progress on the display device; a continuous game which is a group of the multiple-choice games that can progress by being executed continuously up to a plurality of number of times with using a basic payout and odds which up the basic payout; a bet amount indicating device with which a player performs an indicating operation of a bet amount; a minimum bet amount that a player can indicate per one of the multiple-choice games by employing the bet amount indicating device; a unit game indicating device with which a player performs an indicating operation so as to bet the bet amount which is indicated in the bet amount indicating device with respect to the multiple-choice game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; success effect basic data items that are necessary to generate success images that notify a player of success in the multiple-choice game with respect to each combination between the continuous number of times of the multiple-choice games and the basic payout; failure effect basic data items that are necessary to generate failure images that notify a player of failure in the multiple-choice game with respect to each combination between the continuous number of times of the multiple-choice games and the basic payout; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; a choice device with which a player performs a choosing operation in the multiple-choice game; and a processor which is programmed to execute each of processes from the process of (1) below to the process of (4) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a multiple-choice game upon performing an inputting operation by the player with the completion device, and starting progress of the multiple-choice game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of multiple-choice games corresponding to the specified continuous number of times; (4-3) displaying a plurality of first choices on the display device; (4-4) specifying any one of the displayed first choices based on a choosing operation which is performed by the player using the choice device; (4-5) starting progress of an initial multiple-choice game constituting the current continuous game after determining the basic payout based on both the first choice specified and the bet amount allocated; (4-6) displaying a plurality of second choices on the display device simultaneously with incrementing the continuous number of times of the multiple-choice games in the current continuous game; (4-7) specifying any one of the displayed second choices based on a choosing operation which is performed by the player using the choice device; (4-8) determining a result of the current multiple-choice game either as success or failure based on the second choice specified; (4-9) in a case that the determined game result shows success: (4-9-1) upping the odds as compared to an actual condition; (4-9-2) computing a payout based on the upped odds and the basic payout; (4-9-3) awarding the computed payout to the player; (4-9-4) generating the success image corresponding to the combination between the continuous number of times of the multiple-choice games and the basic payout based on the success effect basic data items; (4-9-5) displaying the image generated on the display device; (4-9-6) repeating the multiple-choice game by reverting the process of (4-6) above, if the continuous number of times of the multiple-choice game is smaller than the specified continuous number of times; (4-9-7) ending the continuous game, if the continuous number of times of the multiple-choice game is equal to the specified continuous number of times; and (4-10) in a case that the determined game result shows failure: (4-10-1) generating the failure image corresponding to the combination between the continuous number of times of the multiple-choice games and the basic payout based on the failure effect basic data items; (4-10-2) displaying the image generated on the display device; and (4-10-3) ending the continuous game.

Furthermore, according to another aspect of the present invention, there is provided a gaming machine comprising: a display device; a plurality of multiple-choice games that progress on the display device; a continuous game which is a group of the multiple-choice games that can progress by being executed continuously up to a plurality of number of times with using a basic payout and odds which up the basic payout; a stand alone type mystery jackpot which is executed in the continuous game; an award amount which is awarded to a player in the mystery jackpot; a bet amount indicating device with which a player performs an indicating operation of a bet amount; a minimum bet amount that a player can indicate per one of the multiple-choice games by employing the bet amount indicating device; a unit game indicating device with which a player performs an indicating operation so as to bet the bet amount which is indicated in the bet amount indicating device with respect to the multiple-choice game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a plurality of success images that notify a player of success in the multiple-choice game and that are respectively generated in advance with respect to each combination between the continuous number of times of the multiple-choice games and the basic payout; a plurality of failure images that notify a player of failure in the multiple-choice game and that are respectively generated in advance with respect to each combination between the continuous number of times of the multiple-choice games and the basic payout; an image group which is made up of the success images and the failure images; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; a choice device with which a player performs a choosing operation in the multiple-choice game; and a processor which is programmed to execute each of processes from the process of (1) below to the process of (4) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a multiple-choice game upon performing an inputting operation by the player with the completion device, and starting progress of the multiple-choice game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of multiple-choice games corresponding to the specified continuous number of times; (4-3) displaying a plurality of first choices on the display device; (4-4) specifying any one of the displayed first choices based on a choosing operation which is performed by the player using the choice device; (4-5) determining the basic payout based on both the first choice specified and the bet amount allocated; (4-5-1) determining at random a continuous number of times of the multi-choice games that show success as game result from within the continuous specified number of times; (4-5-2) starting progress of an initial multiple-choice game constituting the current continuous game after computing in advance a maximum payout which can be awarded to the player in the current continuous game based on the determined continuous number of times and the determined basic amount; (4-6) displaying a plurality of second choices on the display device simultaneously with incrementing the continuous number of times of the multiple-choice games in the current continuous game; (4-7) specifying any one of the displayed second choices based on a choosing operation which is performed by the player using the choice device; (4-8) determining a result of the current multiple-choice game either as success or failure based on the second choice specified; (4-9) in a case that the determined game result shows success: (4-9-1) upping the odds as compared to an actual condition; (4-9-2) computing a payout based on the upped odds and the basic payout; (4-9-3) in a case that even if the payout computed is included in a total payout which is awarded to the player in the current continuous game, the total payout is equal to or lower than the maximum payout computed in advance: (4-9-3-1) awarding the computed payout to the player; (4-9-3-2) selecting the success image corresponding to the combination between the continuous number of times of the multiple-choice games and the basic payout from the image group; (4-9-3-3) displaying the image selected on the display device; (4-9-4) in a case that if the payout computed is included in a total payout which is awarded to the player in the current continuous game, the total payout exceeds the maximum payout computed in advance: (4-9-4-1) changing forcibly the determined game result from success to failure; (4-9-4-2) selecting the failure image corresponding to the combination between the continuous number of times of the multiple-choice games and the basic payout from the image group; (4-9-4-3) displaying the image selected on the display device; (4-9-4-4) computing a difference amount between the total payout which was awarded to the player in the current continuous game and the maximum payout computed in advance; (4-9-4-5) ending the continuous game after including the computed difference amount in the award amount of the mystery jackpot; (4-9-5) repeating the multiple-choice game by reverting the process of (4-6) above, if the continuous number of times of the multiple-choice game is smaller than the determined continuous number of times; (4-9-6) if the continuous number of times of the multiple-choice game is equal to the determined continuous number of times, (4-9-6-1) computing a difference amount between a total payout which was awarded to the player in the current continuous game and the maximum payout computed in advance; (4-9-6-2) ending the continuous game after including the computed difference amount in the award amount of the mystery jackpot; (4-10) in a case that the determined game result shows failure: (4-10-1) selecting the failure image corresponding to the combination between the continuous number of times of the multiple-choice games and the basic payout from the image group; (4-10-2) displaying the image selected on the display device; (4-10-3) computing a difference amount between a total payout which was awarded to the player in the current continuous game and the maximum payout computed in advance; (4-10-4) ending the continuous game after including the computed difference amount in the award amount of the mystery jackpot.

Furthermore, according to another aspect of the present invention, there is provided a gaming machine comprising: a display device; a plurality of multiple-choice games that progress on the display device; a continuous game which is a group of the multiple-choice games that can progress by being executed continuously up to a plurality of number of times with using a basic payout and odds which up the basic payout; a stand alone type mystery jackpot which is executed in the continuous game; an award amount which is awarded to a player in the mystery jackpot; a bet amount indicating device with which a player performs an indicating operation of a bet amount; a minimum bet amount that a player can indicate per one of the multiple-choice games by employing the bet amount indicating device; a unit game indicating device with which a player performs an indicating operation so as to bet the bet amount which is indicated in the bet amount indicating device with respect to the multiple-choice game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; success effect basic data items that are necessary to generate success images that notify a player of success in the multiple-choice game with respect to each combination between the continuous number of times of the multiple-choice games and the basic payout; failure effect basic data items that are necessary to generate failure images that notify a player of failure in the multiple-choice game with respect to each combination between the continuous number of times of the multiple-choice games and the basic payout; a completion device with which a player performs an inputting operation of a completion with respect to each of the indicating operations in the bet amount indicating device and the unit game indicating device or with which a player performs an inputting operation of a completion with respect to each of the indicating operations in the bet amount indicating device and the continuous number of times indicating device; a choice device with which a player performs a choosing operation in the multiple-choice game; and a processor which is programmed to execute each of processes from the process of (1) below to the process of (4) below: (1) each time a player performs an indicating operation of a bet amount with the bet amount indicating device: based on the minimum bet amount and the bet amount indicated, specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a multiple-choice game upon performing an inputting operation by the player with the completion device, and starting progress of the multiple-choice game; and (4) in a case where the player performs an indicating operation with any of the continuous number of times indicating devices validated: (4-1) specifying a continuous number of times of a type which corresponds to the continuous number of times indicating device in which the indicating operation is performed upon performing an inputting operation by the player with the completion device; (4-2) allocating respectively the indicated bet amount with respect to each of multiple-choice games corresponding to the specified continuous number of times; (4-3) displaying a plurality of first choices on the display device; (4-4) specifying any one of the displayed first choices based on a choosing operation which is performed by the player using the choice device; (4-5) determining the basic payout based on both the first choice specified and the bet amount allocated; (4-5-1) determining at random a continuous number of times of the multi-choice games that show success as game result from within the continuous specified number of times; (4-5-2) starting progress of an initial multiple-choice game constituting the current continuous game after computing in advance a maximum payout which can be awarded to the player in the current continuous game based on the determined continuous number of times and the determined basic amount; (4-6) displaying a plurality of second choices on the display device simultaneously with incrementing the continuous number of times of the multiple-choice games in the current continuous game; (4-7) specifying any one of the displayed second choices based on a choosing operation which is performed by the player using the choice device; (4-8) determining a result of the current multiple-choice game either as success or failure based on the second choice specified; (4-9) in a case that the determined game result shows success: (4-9-1) upping the odds as compared to an actual condition; (4-9-2) computing a payout based on the upped odds and the basic payout; (4-9-3) in a case that even if the payout computed is included in a total payout which is awarded to the player in the current continuous game, the total payout is equal to or lower than the maximum payout computed in advance: (4-9-3-1) awarding the computed payout to the player; (4-9-3-2) generating the success image corresponding to the combination between the continuous number of times of the multiple-choice games and the basic payout based on the success effect basic data items; (4-9-3-3) displaying the image generated on the display device; (4-9-4) in a case that if the payout computed is included in a total payout which is awarded to the player in the current continuous game, the total payout exceeds the maximum payout computed in advance: (4-9-4-1) changing forcibly the determined game result from success to failure; (4-9-4-2) generating the failure image corresponding to the combination between the continuous number of times of the multiple-choice games and the basic payout based on the success effect basic data items; (4-9-4-3) displaying the image generated on the display device; (4-9-4-4) computing a difference amount between the total payout which was awarded to the player in the current continuous game and the maximum payout computed in advance; (4-9-4-5) ending the continuous game after including the computed difference amount in the award amount of the mystery jackpot; (4-9-5) repeating the multiple-choice game by reverting the process of (4-6) above, if the continuous number of times of the multiple-choice game is smaller than the determined continuous number of times; (4-9-6) if the continuous number of times of the multiple-choice game is equal to the determined continuous number of times, (4-9-6-1) computing a difference amount between a total payout which was awarded to the player in the current continuous game and the maximum payout computed in advance; (4-9-6-2) ending the continuous game after including the computed difference amount in the award amount of the mystery jackpot; (4-10) in a case that the determined game result shows failure: (4-10-1) generating the failure image corresponding to the combination between the continuous number of times of the multiple-choice games and the basic payout based on the success effect basic data items; (4-10-2) displaying the image generated on the display device; (4-10-3) computing a difference amount between a total payout which was awarded to the player in the current continuous game and the maximum payout computed in advance; (4-10-4) ending the continuous game after including the computed difference amount in the award amount of the mystery jackpot.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a maximum number of times indicating device with which a player performs an indicating operation so as to bet the bet amount which is indicated in the bet amount indicating device with respect to the continuous game, and which is provided so as to correspond to a maximum continuous number of times which is computed based on both the bet amount indicated in the bet amount designating device and the minimum bet amount; a multi-choice game which employs a plurality of character symbols; a display device on which the multi-choice game progresses; an inputting device with which a player performs an inputting operation which is required in the multi-choice game; a fund amount in which a payout is included in the multi-choice game; a plurality of battle effect images that are effect images respectively generated in advance with respect to each of all combinations that can be made up of ranking of the character symbols, and that notify a player of the ranking of the character symbols depending on a battle result of the character symbols; a battle effect image group which is made up of the battle effect images; a winning image which notifies a player of the player's win in the multi-choice game; a losing image which notifies a player of the player's loss in the multi-choice game; a completion device with which a player performs an inputting operation of a completion with respect to each of the indicating operations in the bet amount indicating device and the unit game indicating device, with which a player performs an inputting operation of a completion with respect to each of the indicating operations in the bet amount indicating device and the continuous number of times indicating device or with which a player performs an inputting operation of a completion with respect to each of the indicating operations in the bet amount indicating device and the maximum number of times indicating device; and a processor which is programmed, in a case where a player has simultaneously performed an indicating operation in any one of the continuous number of times indicating devices and performed an indicating operation in the maximum number of times indicating device, to execute each of processes from the process of (1) below to the process of (10-2) below for progressing the multi-choice game: (1) specifying all of the types of continuous number of times upon performing an inputting operation by the player with the completion device; (2) allocating respectively the indicated bet amount with respect to each of unit games corresponding to the specified continuous number of times; (3) repeating automatically progress of each of unit games corresponding to the specified continuous number of times in a condition that no payout is awarded to the player; (4) computing a total payout which was scheduled to be awarded to the player based on both progress results of each of unit games corresponding to the specified continuous number of times and the bet amount allocated; (5) displaying each of the character symbols on the display device; (6) specifying any one of the character symbols based on an inputting operation which is performed by the player employing the inputting device; (7) specifying a ranking forecast by the player with respect to the specified character symbol based on an inputting operation which is performed by the player employing the inputting device; (8) upon completing each inputting operation by the player with the inputting device: (8-1) determining respectively at random raking of each character symbol being displayed on the display device; (8-2) selecting a battle effect image corresponding to a combination which is made up of each character symbol's determined ranking from the battle effect image group; (8-3) displaying the selected battle effect image on the display device; (9) in a case where the determined ranking with respect to the specified character symbol differs from the specified ranking: (9-1) displaying the losing image on the display device; (9-2) ending the multi-choice game after including the scheduled total payout computed into the fund amount; (10) in a case where the determined ranking with respect to the specified character symbol coincides with the specified ranking: (10-1) displaying the winning image on the display device; and (10-2) ending the multi-choice game after awarding the player both the scheduled total payout computed and a payout corresponding to the fund amount.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a unit game indicating device with which a player performs an indicating operation so as to bet the bet amount which is indicated in the bet amount indicating device with respect to the unit game; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time; a maximum number of times indicating device with which a player performs an indicating operation so as to bet the bet amount which is indicated in the bet amount indicating device with respect to the continuous game, and which is provided so as to correspond to a maximum continuous number of times which is computed based on both the bet amount indicated in the bet amount designating device and the minimum bet amount; a multi-choice game which employs a plurality of character symbols; a display device on which the multi-choice game progresses; an inputting device with which a player performs an inputting operation which is required in the multi-choice game; a fund amount in which a payout is included in the multi-choice game; a plurality of battle effect images that are effect images respectively generated in advance with respect to each of all combinations that can be made up of ranking of the character symbols, and that notify a player of the ranking of the character symbols depending on a battle result of the character symbols; a battle effect image group which is made up of the battle effect images; a winning image which notifies a player of the player's win in the multi-choice game; a losing image which notifies a player of the player's loss in the multi-choice game; a completion device with which a player performs an inputting operation of a completion with respect to each of the indicating operations in the bet amount indicating device and the unit game indicating device, with which a player performs an inputting operation of a completion with respect to each of the indicating operations in the bet amount indicating device and the continuous number of times indicating device or with which a player performs an inputting operation of a completion with respect to each of the indicating operations in the bet amount indicating device and the maximum number of times indicating device; and a processor which is programmed to execute each of processes from the process of (1) below to the process of (6-10-2) below: (1) each time a player performs an indicating operation of a bet amount with the bet amount indicating device: based on the minimum bet amount and the bet amount indicated, computing the maximum continuous number of times with respect to which the bet amount indicated can be bet and specifying all of the types of continuous number of times with respect to which the bet amount indicated can be bet; (2) validating an indicating operation in each of the continuous number of times indicating devices respectively corresponding to each of the types of continuous number of times specified; (3) in a case where the player performs an indicating operation with the unit game indicating device: allocating all of the indicated bet amount with respect to a unit game upon performing an inputting operation by the player with the completion device, and starting progress of the unit game; (4) in a case where the player performs an indicating operation alone with any of the continuous number of times indicating devices validated: allocating respectively the indicated bet amount with respect to each of unit games corresponding to a continuous number of times of a type which corresponds to the continuous number of times indicating device in which the indicating operation is performed upon performing an inputting operation by the player with the completion device, and starting automatic continuous repetition of progress of each of unit games corresponding to the continuous number of times of the type which corresponds to the continuous number of times indicating device in which the indicating operation is performed; (5) in a case where the player performs an indicating operation alone with the maximum number of times indicating device: allocating respectively the indicated bet amount with respect to each of unit games corresponding to the maximum continuous number of times computed upon performing an inputting operation by the player with the completion device, and starting automatic continuous repetition of progress of each of unit games corresponding to the maximum continuous number of times computed; (6) executing each of processes from the process of (6-1) below to the process of (6-10-2) below for progressing the multi-choice game in a case where the player has simultaneously performed an indicating operation in any one of the validated continuous number of times indicating devices and performed an indicating operation in the maximum number of times indicating device: (6-1) specifying all of the types of continuous number of times upon performing an inputting operation by the player with the completion device; (6-2) allocating respectively the indicated bet amount with respect to each of unit games corresponding to the specified continuous number of times; (6-3) repeating automatically progress of each of unit games corresponding to the specified continuous number of times in a condition that no payout is awarded to the player; (6-4) computing a total payout which was scheduled to be awarded to the player based on both progress results of each of unit games corresponding to the specified continuous number of times and the bet amount allocated; (6-5) displaying each of the character symbols on the display device; (6-6) specifying any one of the character symbols based on an inputting operation which is performed by the player employing the inputting device; (6-7) specifying a ranking forecast by the player with respect to the specified character symbol based on an inputting operation which is performed by the player employing the inputting device; (6-8) upon completing each inputting operation by the player with the inputting device: (6-8-1) determining respectively at random raking of each character symbol being displayed on the display device; (6-8-2) selecting a battle effect image corresponding to a combination which is made up of each character symbol's determined ranking from the battle effect image group; (6-8-3) displaying the selected battle effect image on the display device; (6-9) in a case where the determined ranking with respect to the specified character symbol differs from the specified ranking: (6-9-1) displaying the losing image on the display device; (6-9-2) ending the multi-choice game after including the scheduled total payout computed into the fund amount; (6-10) in a case where the determined ranking with respect to the specified character symbol coincides with the specified ranking: (6-10-1) displaying the winning image on the display device; and (6-10-2) ending the multi-choice game alter awarding the player both the scheduled total payout computed and a payout corresponding to the fund amount.

Furthermore, according to another aspect of the present invention, there is provided a gaming machine comprising: a plurality of unit games; a continuous game which is a group of the unit games that progress by being executed continuously up to a plurality of number of times; a bet amount indicating device with which a player performs an indicating operation of a bet amount; a minimum bet amount that a player can indicate per a unit game by employing the bet amount indicating device; a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; and a processor which is programmed to execute each of processes from the process of (1) below to the process of (2) below: (1) each time a player performs an indicating operation of a bet amount with the bet amount indicating device: based on the minimum bet amount and the bet amount indicated, specifying all of the types of continuous number of times with respect to which the bet amount indicated can be bet; and (2) in a case where the player performs an indicating operation with any of the continuous number of times indicating devices: allocating respectively the indicated bet amount with respect to each of unit games corresponding to a continuous number of times of a type which corresponds to the continuous number of times indicating device in which the indicating operation is performed, and starting progress of the unit games corresponding to the continuous number of times of the type which corresponds to the continuous number of times indicating device in which the indicating operation is performed.

BRIEF DESCRIPTION OF THE DRAWINGS

FIG. 3 is a schematic view showing symbol columns drawn on reel band of each reel;

FIG. 16 is a schematic view showing symbol columns drawn on reel band of each reel;

FIG. 35 is a schematic view showing symbol columns drawn on reel band of each reel;

FIG. 53 is a schematic view showing symbol columns drawn on reel band of each reel;

FIG. 73 is a schematic view showing symbol columns drawn on reel band of each reel;

FIG. 120 is a flowchart of a main game process program;

FIG. 121 is a flowchart of a start acceptance process program;

FIG. 122 is a view showing one example of an image displayed on a liquid crystal panel;

FIG. 123 is a view showing one example of a data table;

FIG. 124 is a view showing one example of an image displayed on the liquid crystal panel;

FIG. 125 is a view showing one example of a data table;

FIG. 126 is a view showing one example of an image displayed on the liquid crystal panel;

FIG. 127 is a view showing one example of an image displayed on the liquid crystal panel;

FIG. 128 is a view showing one example of a data table;

FIG. 129 is a view showing one example of a data table;

FIG. 130 is a flowchart of a continuous game process program;

FIG. 131 is a flowchart of a continuous game process program;

Figure 132:
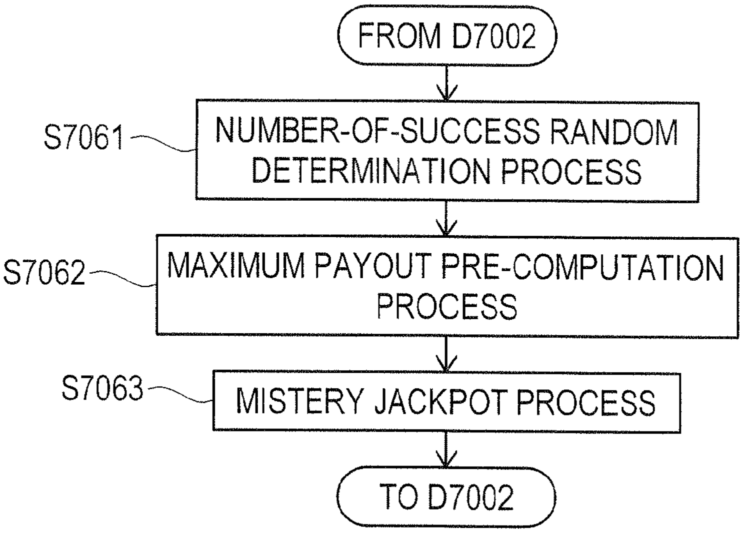
Figure 133:
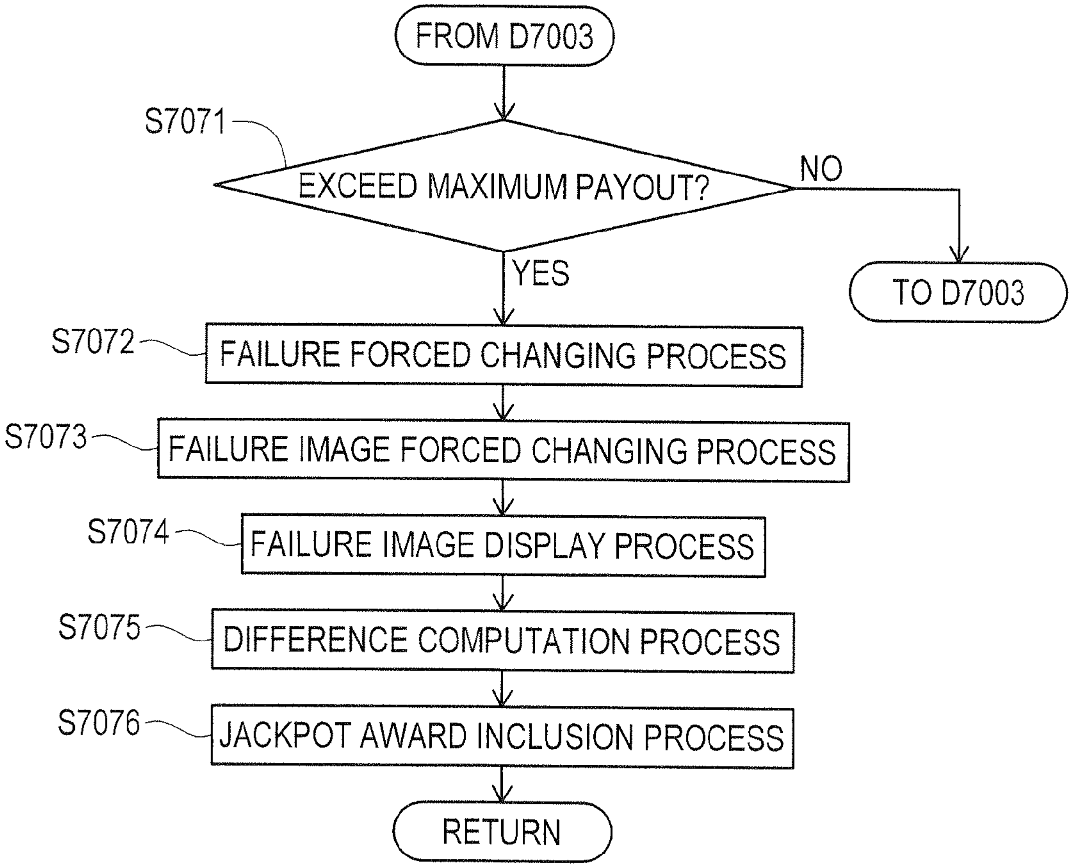
Figure 134:
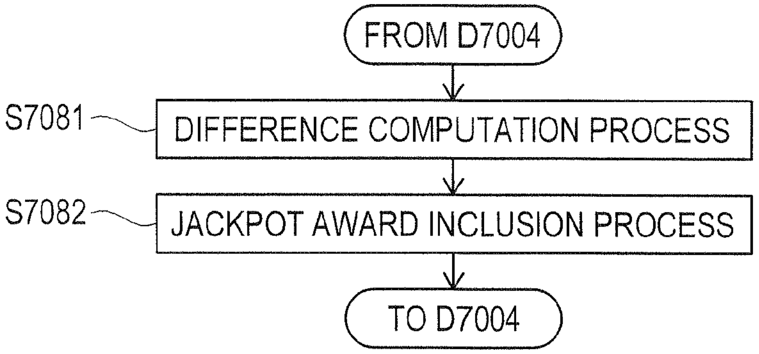

FIG. 132 is a flowchart of a continuous game process program;

FIG. 133 is a flowchart of a continuous game process program;

FIG. 134 is a flowchart of a continuous game process program; and

Figure 135:
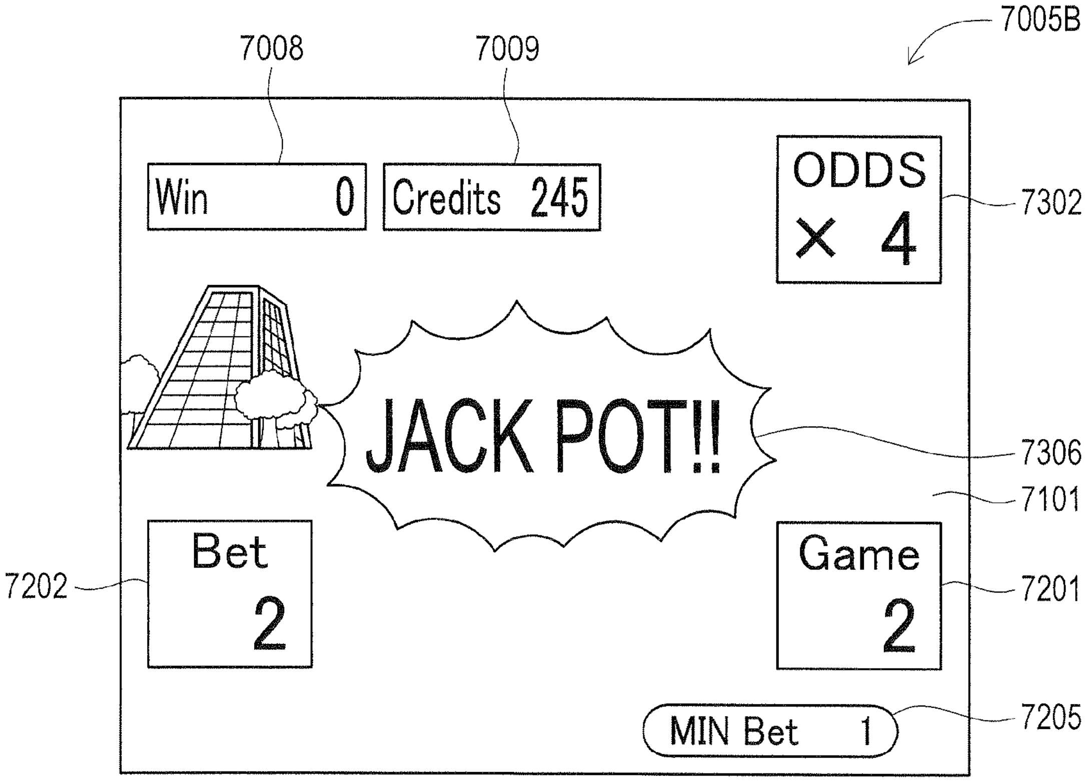

FIG. 135 is a view showing one example of an image displayed on the liquid crystal panel.

Figure 136:
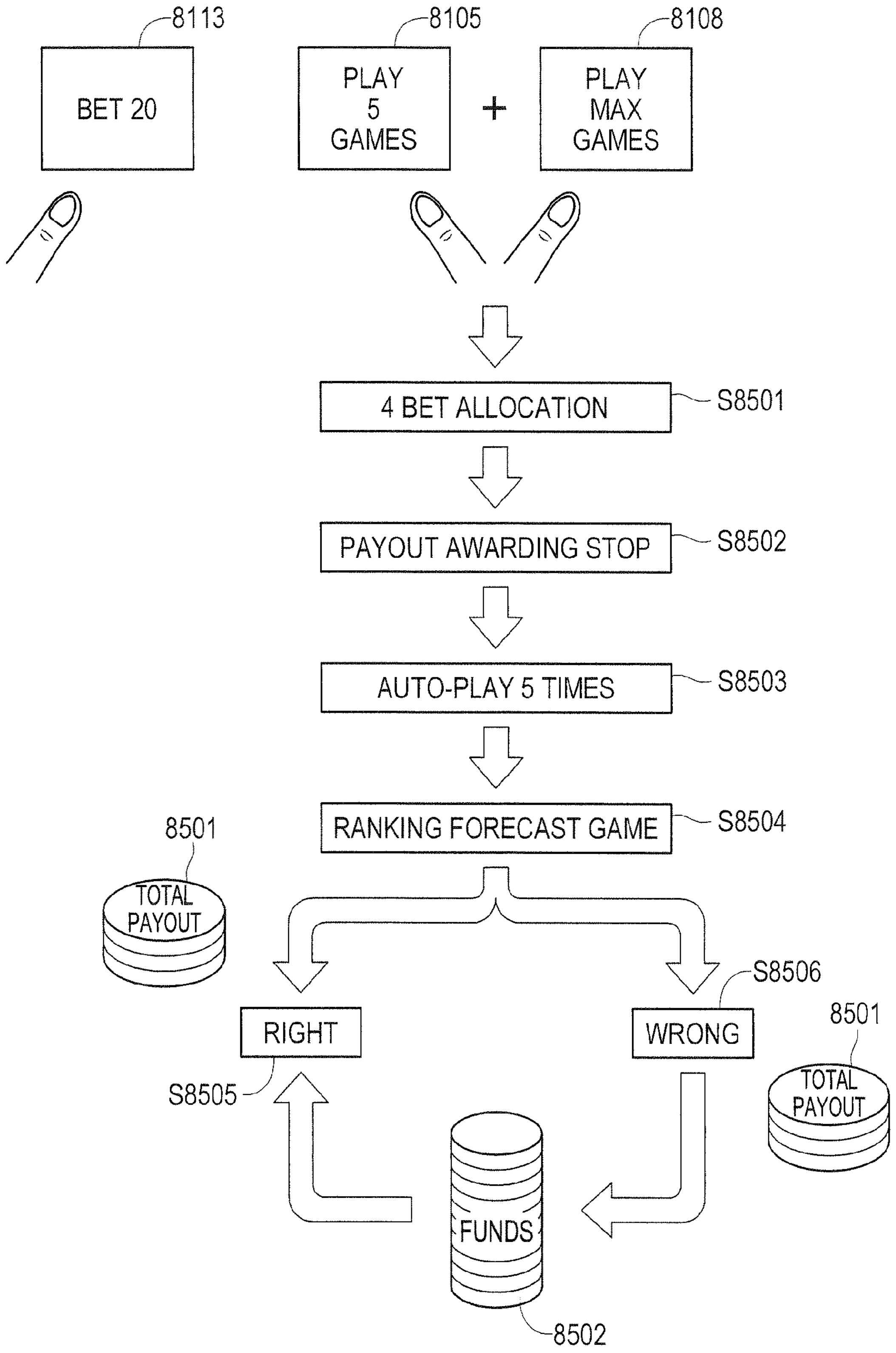
Figure 137:
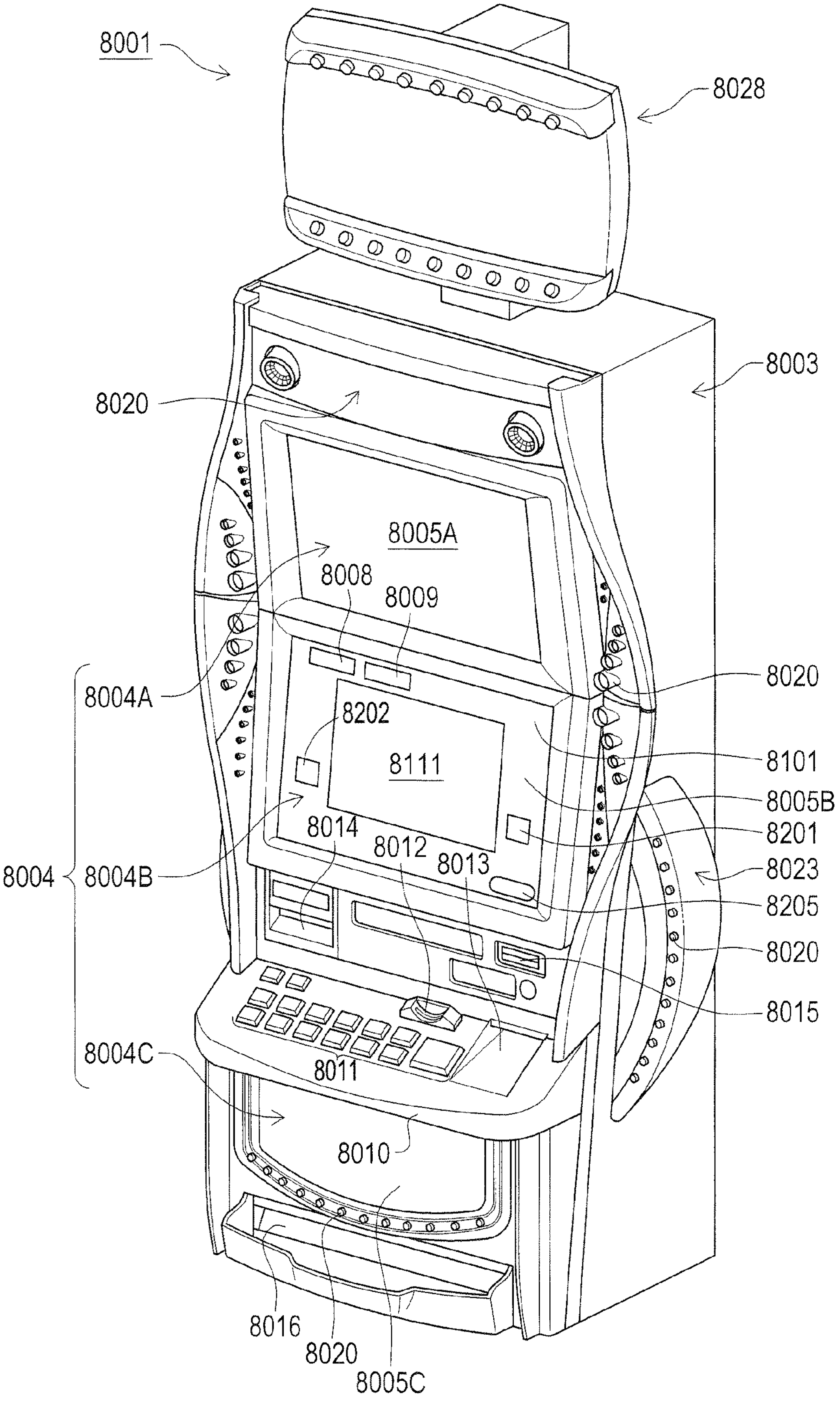
Figure 138:
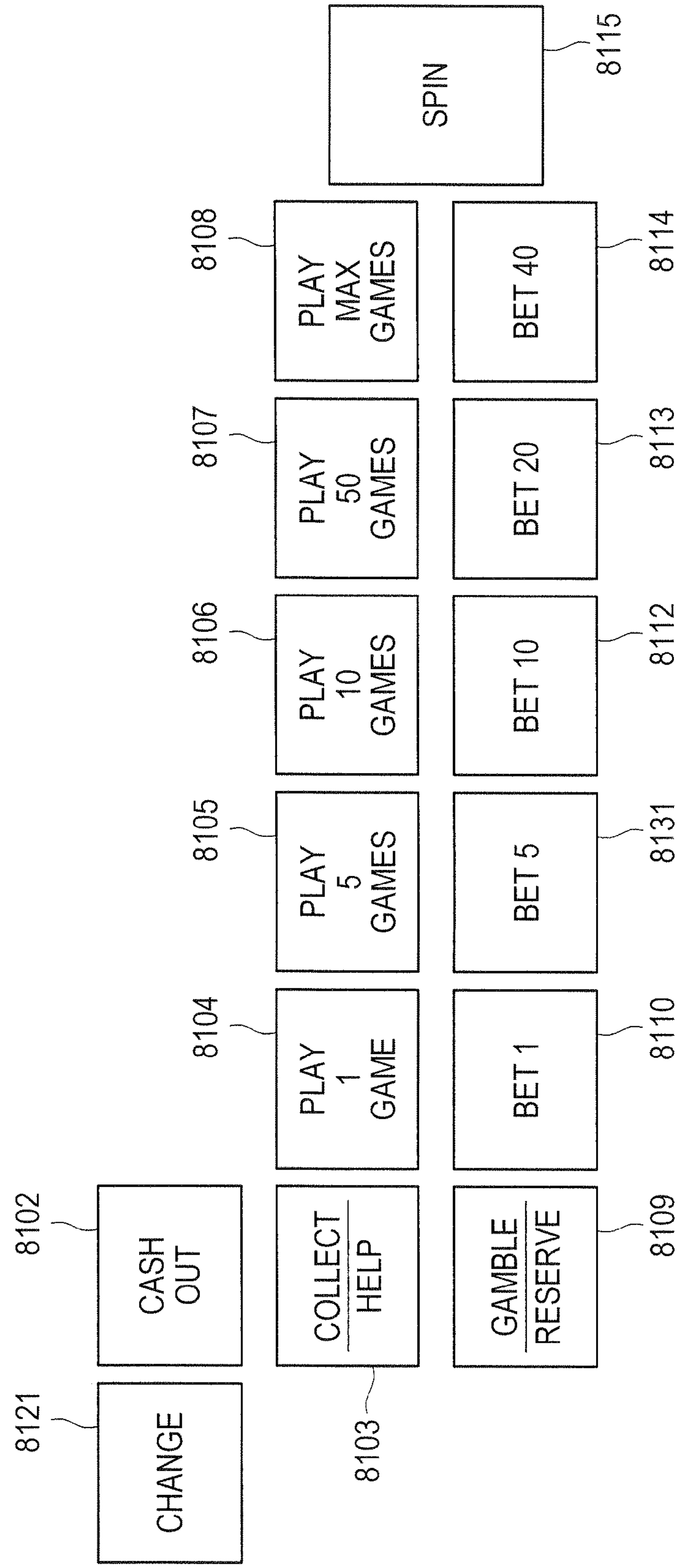
Figure 139:
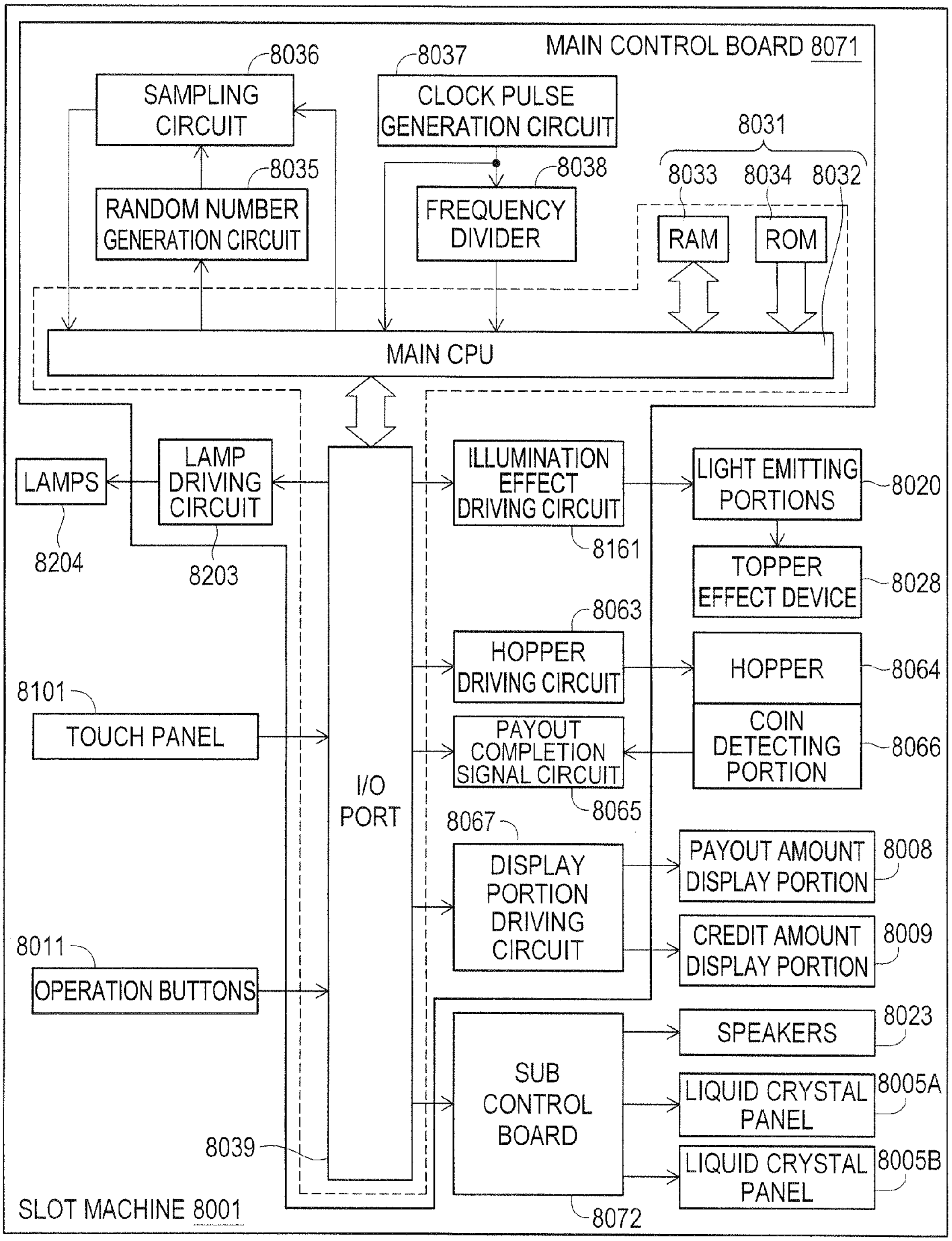
Figure 140:
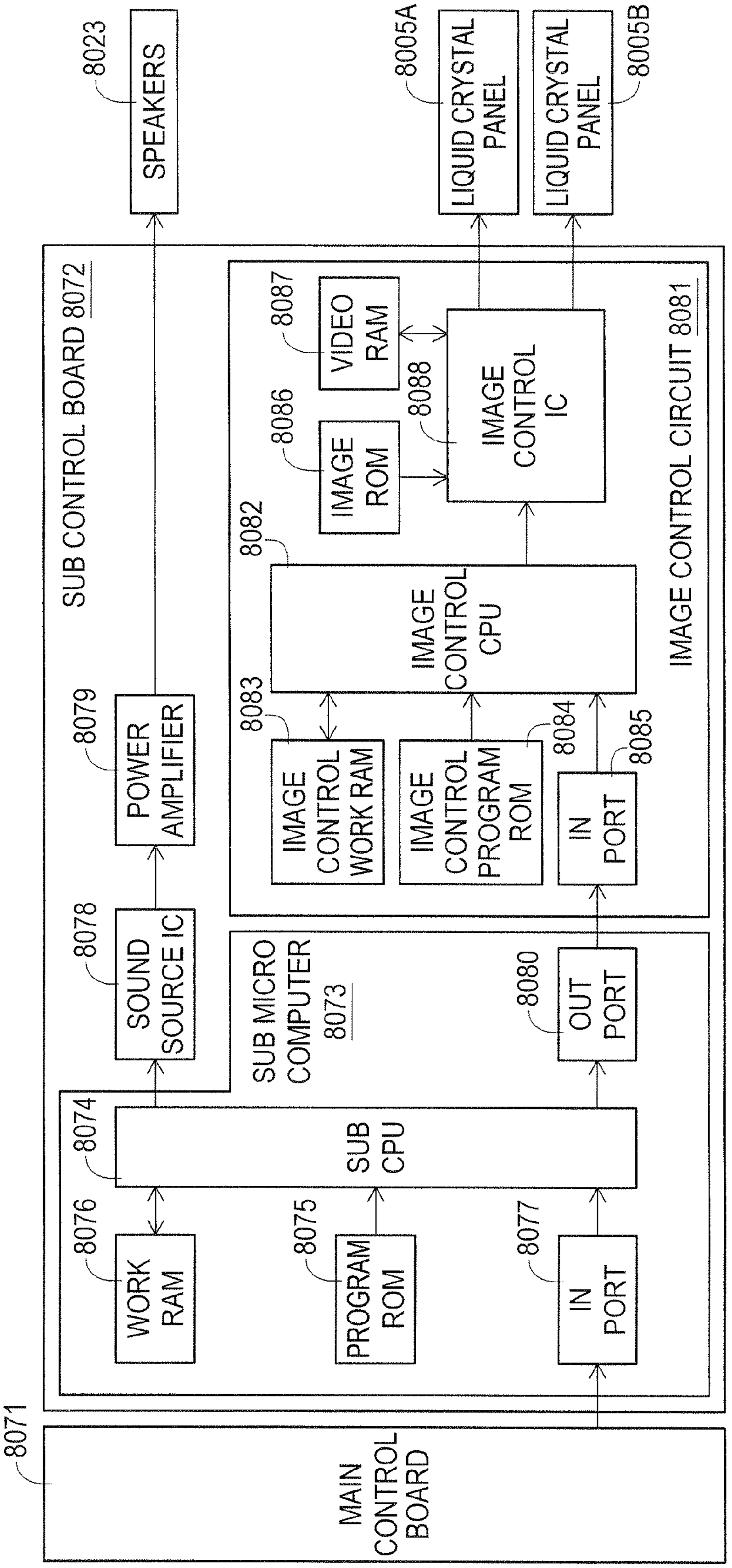
Figure 141:
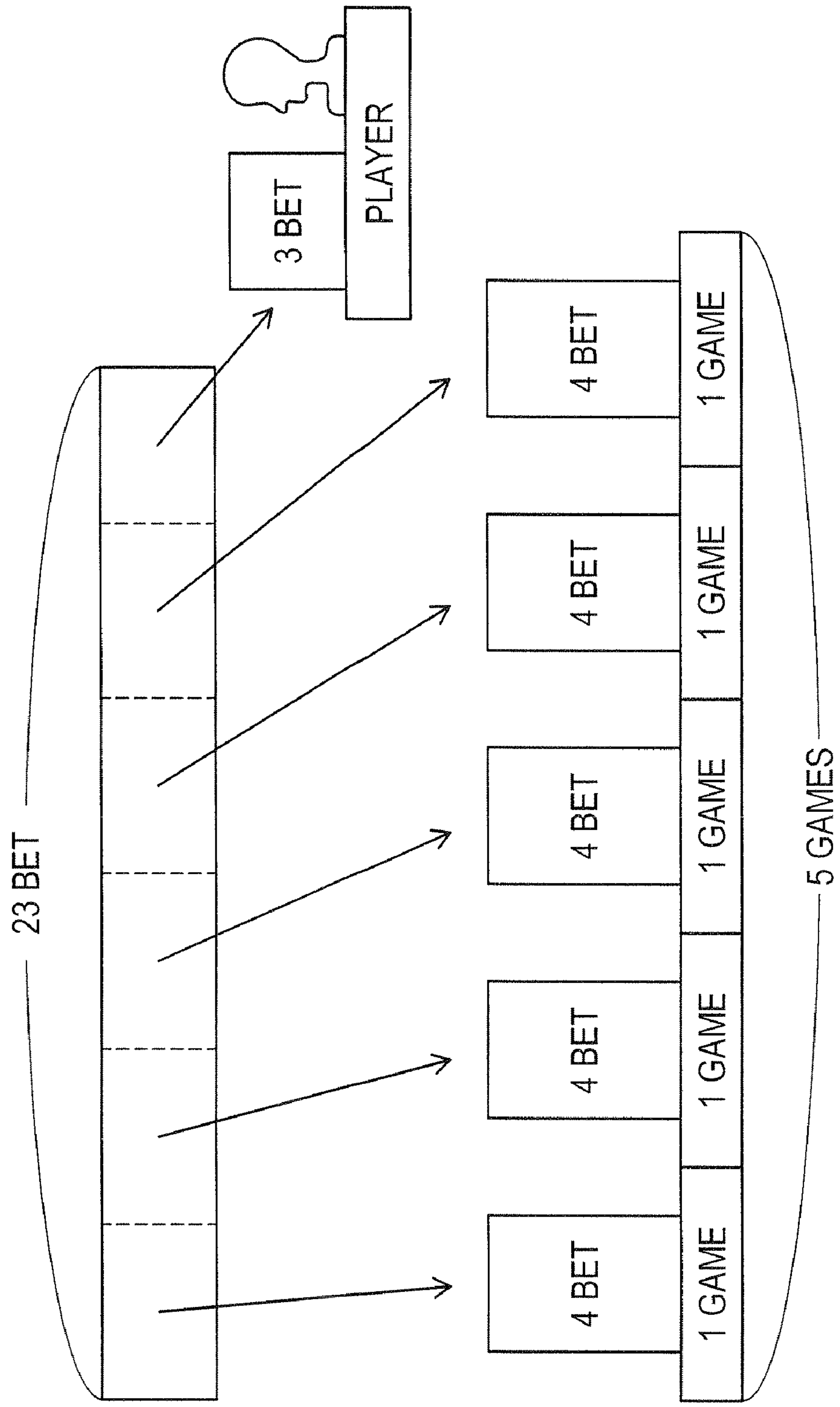
Figure 142:
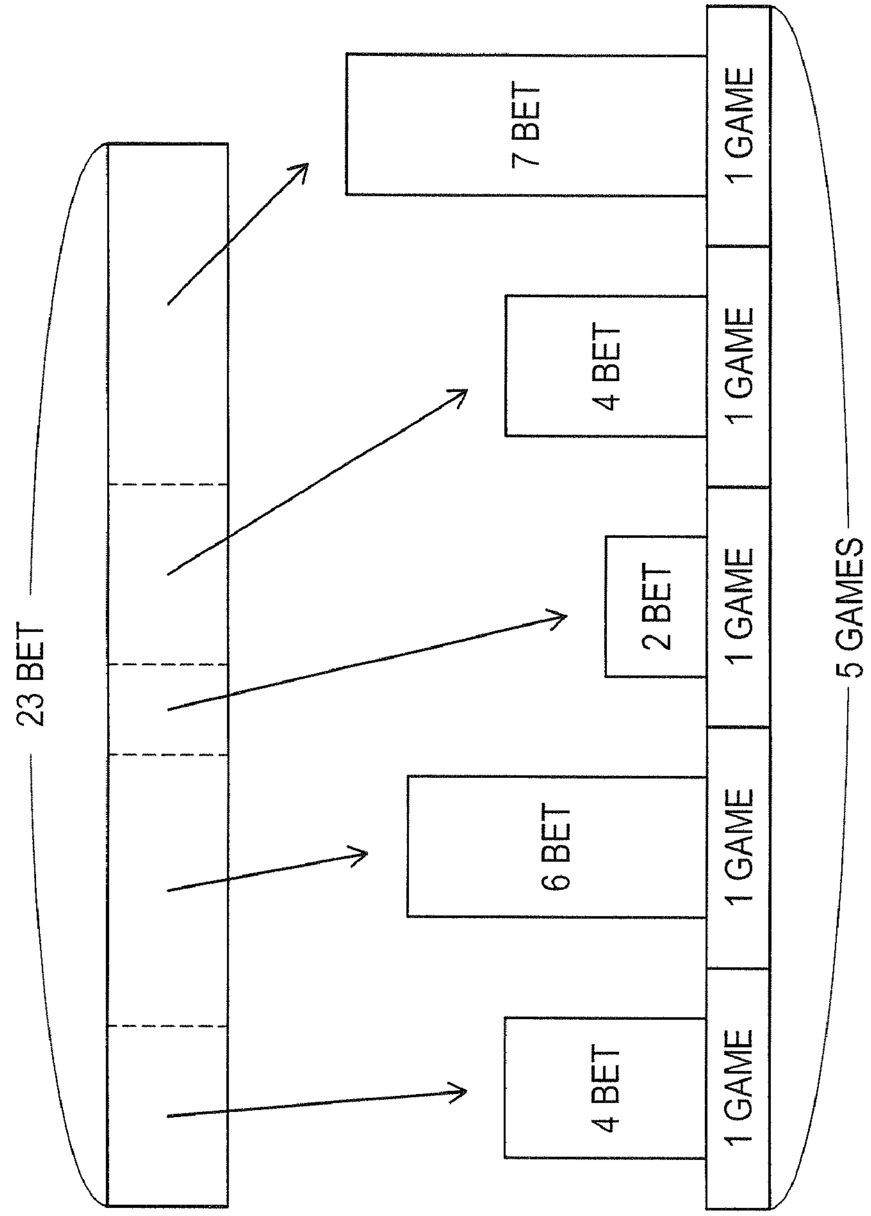
Figure 143:
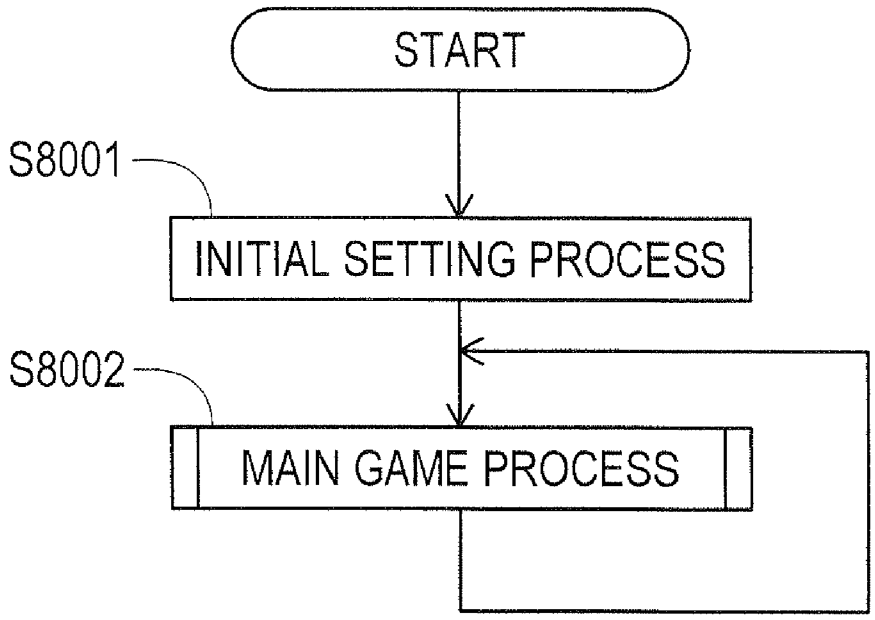
Figure 144:
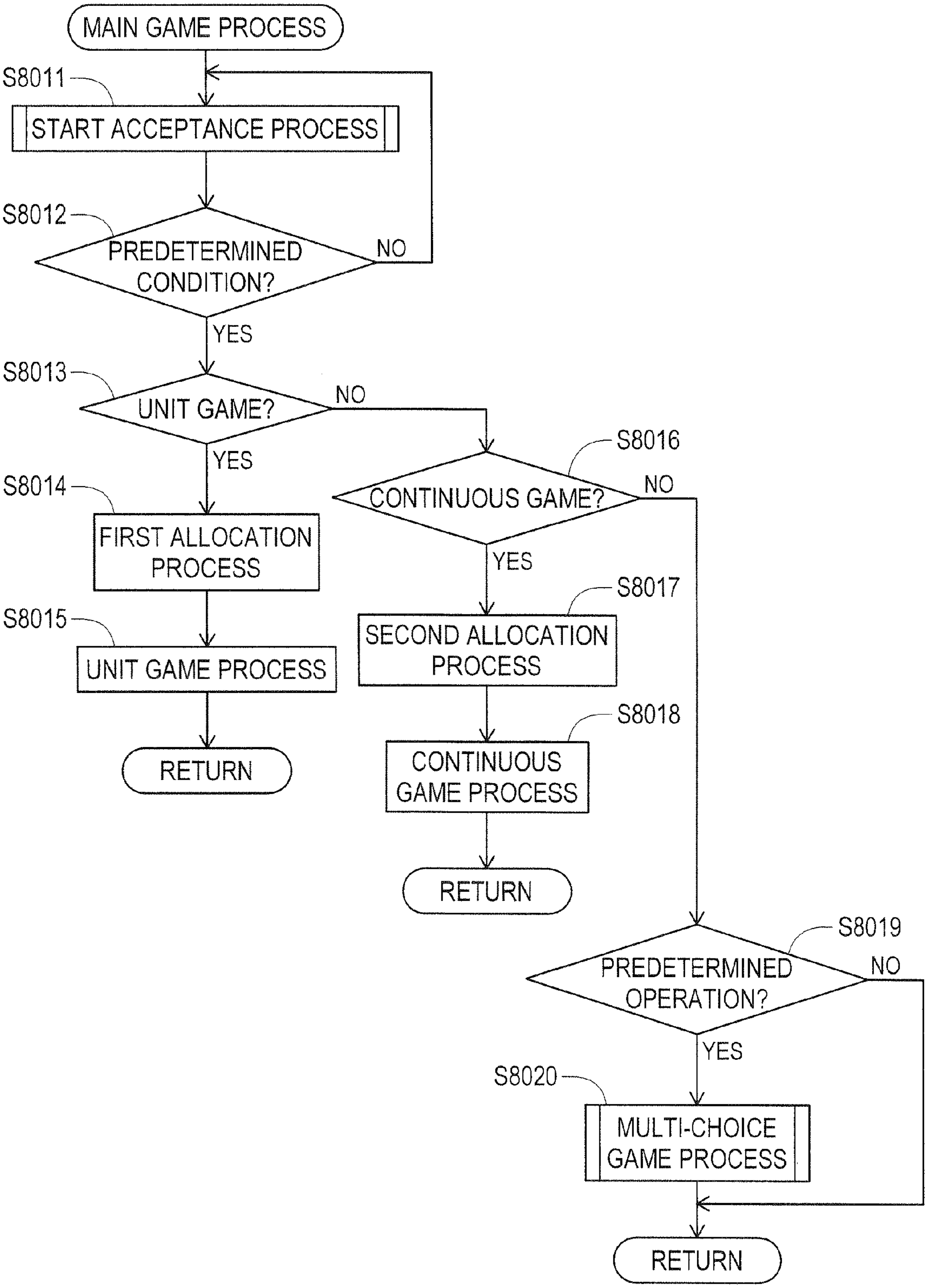
Figure 145:
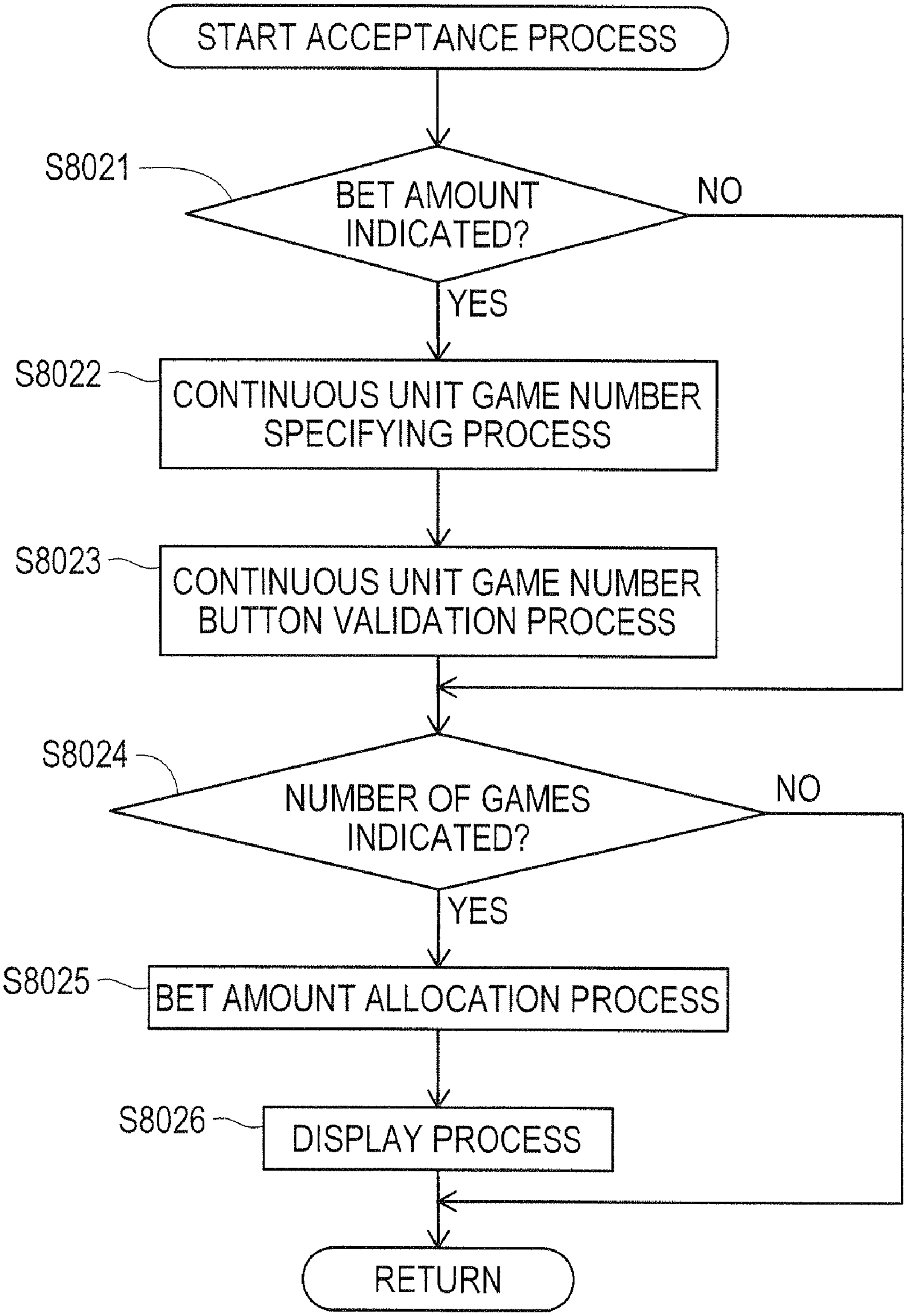
Figure 146:
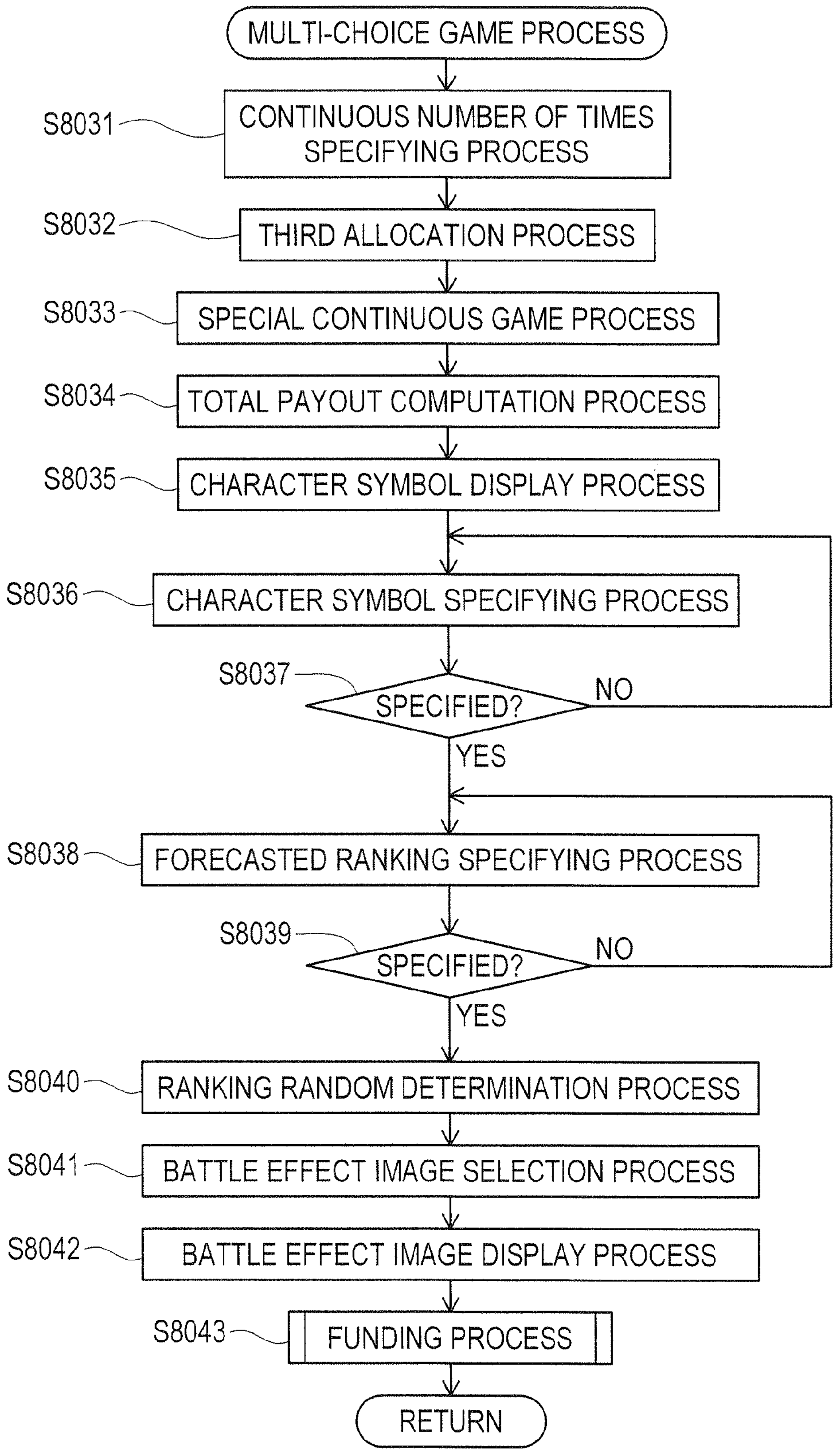
Figure 147:
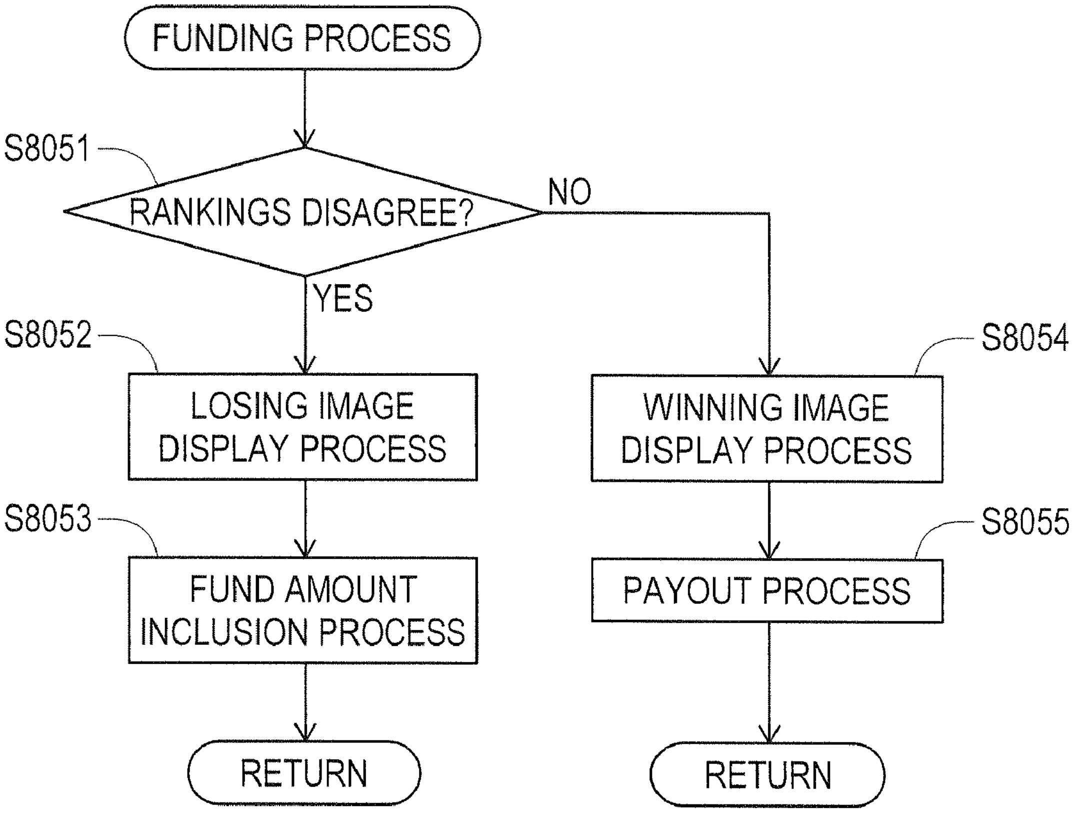
Figure 149:
Figure 149:
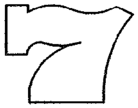
Figure 149:
Figure 149:
Figure 149:
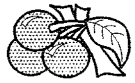
Figure 149:
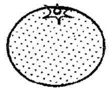
Figure 149:
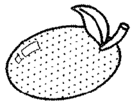
Figure 150:
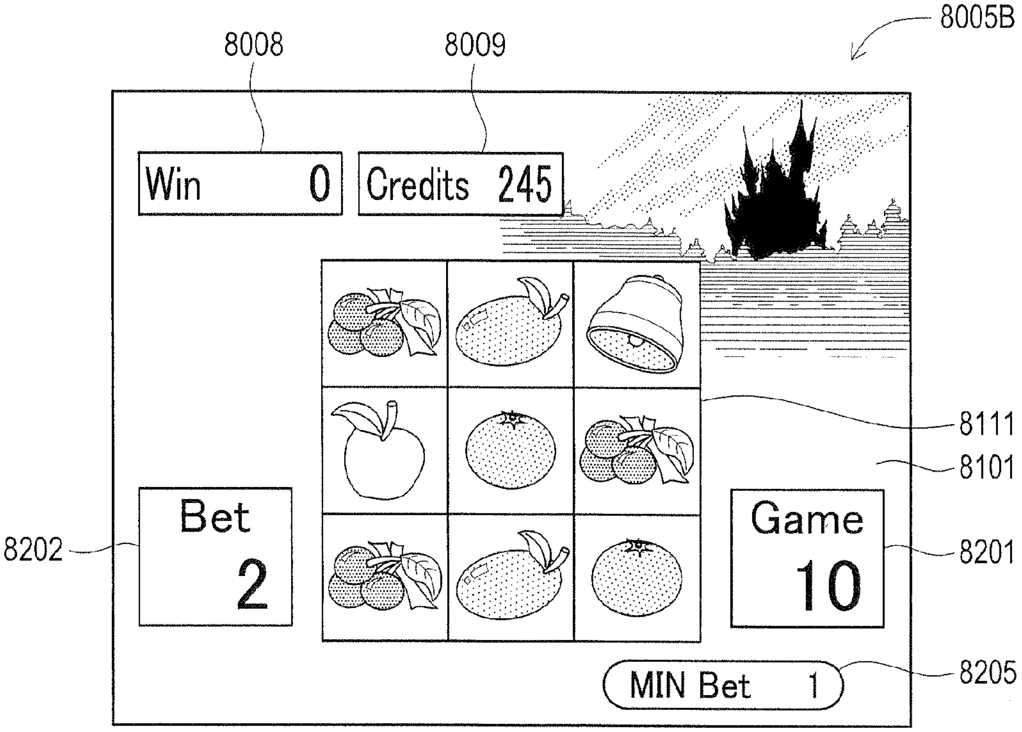
Figure 151:
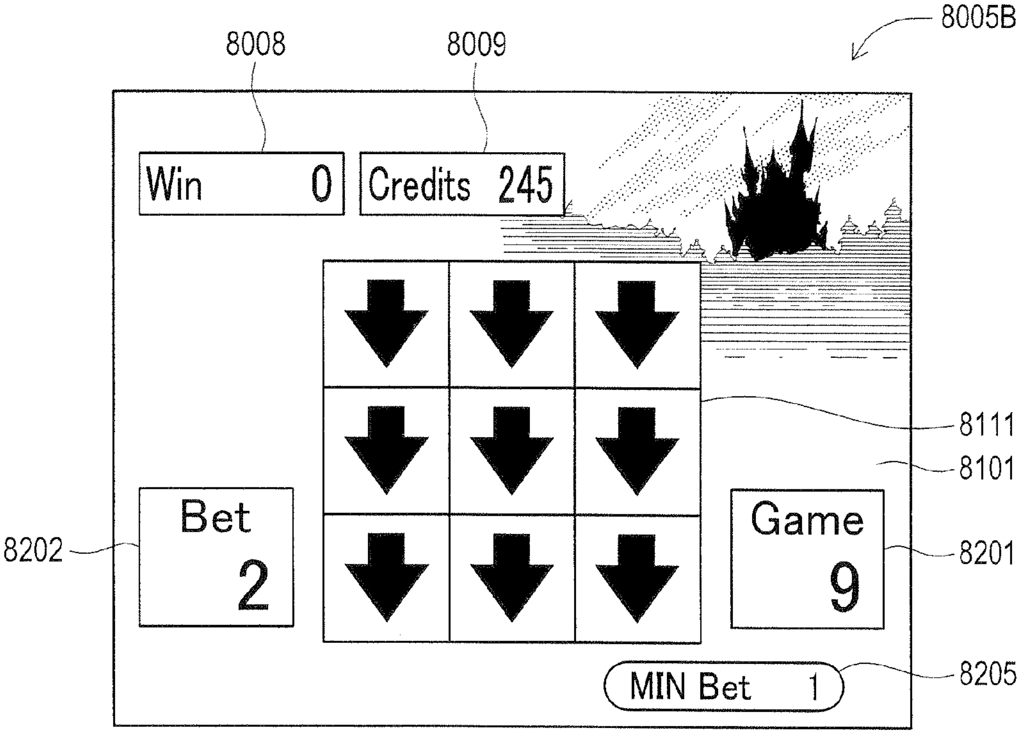
Figure 152:
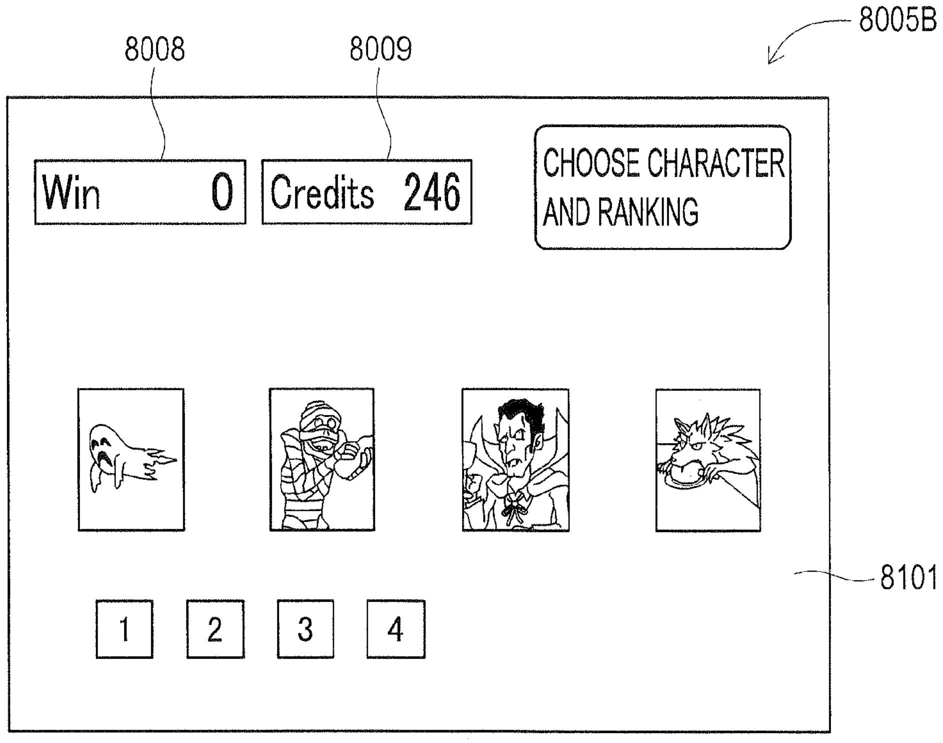
Figure 153:
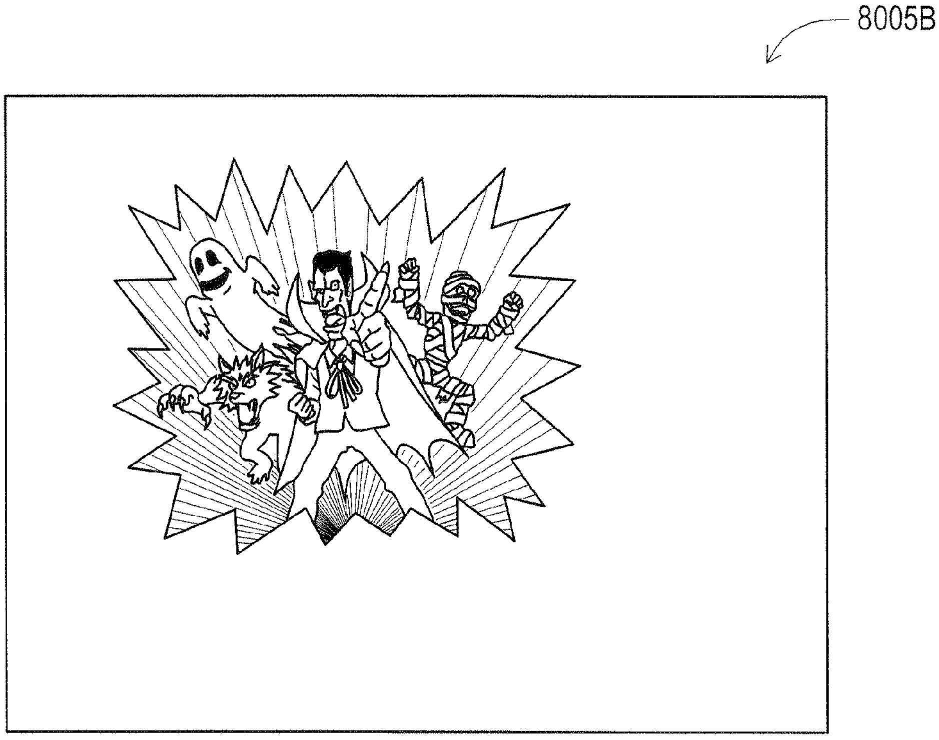
Figure 154:
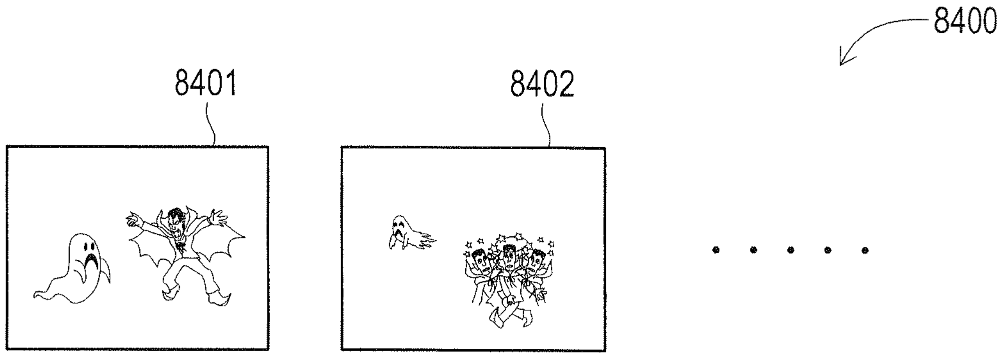

FIG. 136 is a view showing characteristics of a slot machine which is one eighth embodiment of the present invention;

FIG. 137 is a perspective view of the slot machine;

FIG. 138 is a front view showing a variety of operation buttons;

FIG. 139 is a block diagram showing an internal construction of entire slot machine;

FIG. 140 is a block diagram showing an internal construction of a sub control board;

FIG. 141 is a view showing characteristics of the slot machine;

FIG. 142 is a view showing characteristics of the slot machine;

FIG. 143 is a flowchart of a main control program;

FIG. 144 is a flowchart of a main game process program;

FIG. 145 is a flowchart of a start acceptance process program;

FIG. 146 is a flowchart of a multi-choice game process program;

FIG. 147 is a flowchart of a funding process program;

FIG. 148 is a schematic view showing symbol columns drawn on reel band of each reel;

FIG. 149 is a payout table in which winning combinations and the payout amounts corresponding to the winning combinations are shown when a slot game is executed by using each of the reels;

FIG. 150 is a view showing one of an image displayed on a liquid crystal panel;

FIG. 151 is a view showing one of an image displayed on the liquid crystal panel;

FIG. 152 is a view showing one of an image displayed on the liquid crystal panel;

FIG. 153 is a view showing one of an image displayed on the liquid crystal panel;

FIG. 154 is a view showing one example of an image group; and

Figure 155:
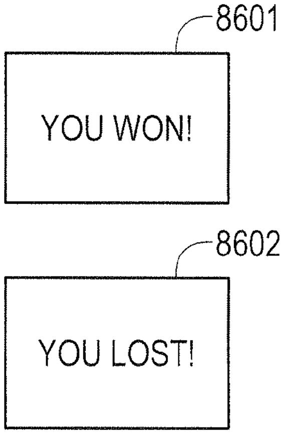

FIG. 155 is a view showing one example of a winning image and a losing image.

DETAILED DESCRIPTION

1-1. Characteristics of the Present Invention

The First Embodiment

Next, the first embodiment of the present invention, as applied to a slot machine which is one example of a gaming machine of the present invention, will be described while referring to the accompanying drawings.

A game which is executed in the slot machine of the present embodiment is constituted of a slot game in which scatter symbols are employed.

Figure 7:
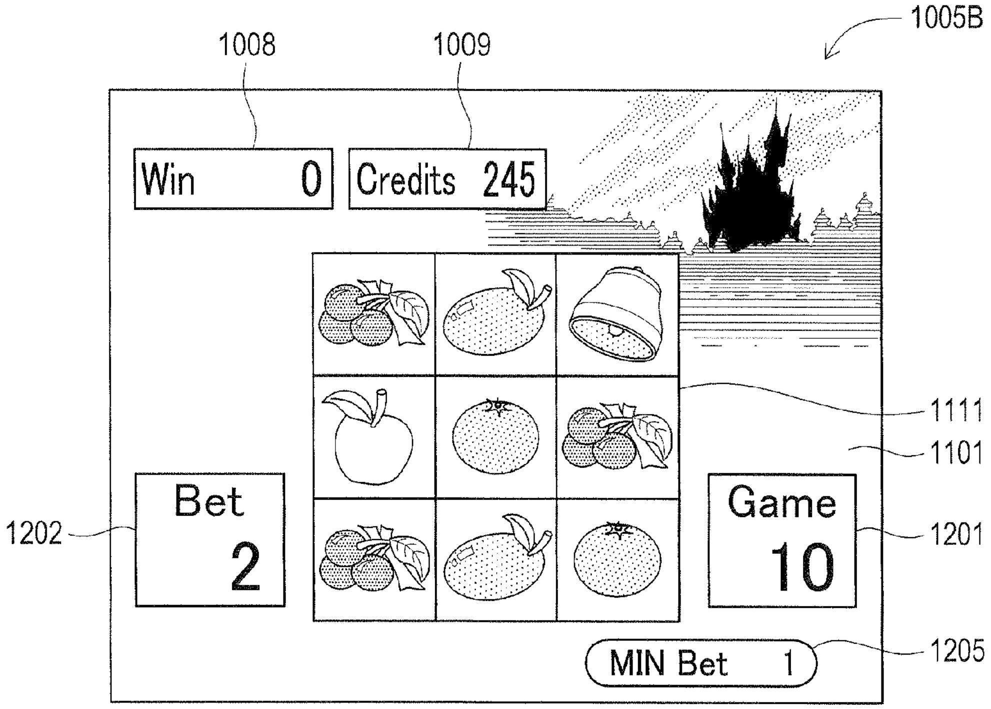
FIG. 7 is a view showing one of an image displayed on a liquid crystal panel.

In the slot game, as shown in FIG. 7, a symbol display frame 1111 displaying nine symbols is displayed on the well-known liquid crystal panel 1005B. The nine symbols are arranged in a matrix comprising three rows by three columns. In this respect, within the symbol display frame 1111, nine symbol display areas, where one of many symbols drawn on a reel band of one video reel is arranged, are positioned like a matrix comprising three rows by three columns. That is, one symbol display area is assigned to each of the nine video reels. Then, one of the symbols drawn on the reel band of each video reels is arranged in each of the symbol display areas.

Figure 6:
FIG. 6 is a payout table in which winning combinations and the payout amounts corresponding to the winning combinations are shown when a slot game is executed by using each of the reels.
Figure 6:
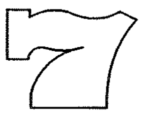
Figure 6:
Figure 6:
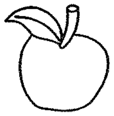
Figure 6:
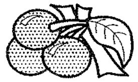
Figure 6:
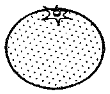
Figure 6:
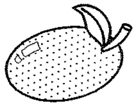

In the meantime, as shown in FIG. 6, various winning combinations are previously determined based on the number of the same scatter symbol. When each of the video reels is scrolled and stopped, a symbol is rearranged one by one in each of the symbol display areas of the symbol display frame 1111, as the liquid crystal panel 1005B shown in FIG. 7 and FIG. 8. At this time, when the nine symbols that are rearranged in the symbol display frame 1111 compose any one of the winning combinations, the payout amount corresponding to the winning combination composed is displayed in a payout amount display portion 1008. With this, a unit game is configured.

In the slot machine 1001 of the present embodiment, the player can indicate that a unit game will be executed continuously by a predetermined number of times such as “1”, “5”, “10” and the like. A group of unit games which the player indicated as a continuous play corresponds to a “continuous game”. This indication is made by operating a plurality of buttons which are respectively provided in accordance with the number of times of the unit games constituting the “continuous game” (refer to FIG. 11).

The player can indicate the bet amount, such as “1”, “5”, “10” and the like, with respect to the “continuous game”. This indication is made by operating a plurality of buttons which are respectively provided in accordance with the bet amount (refer to FIG. 11).

In this respect, in the slot machine 1001 of the present embodiment, once the player indicates the bet amount with respect to the “continuous game”, one or a plurality of “continuous games” including unit games that are executed by the number of times which can be indicated by the player is specified through the bet amount with respect to the “continuous game” indicated by the player and the minimum bet amount with respect to a unit game which can be set by the player (in the present embodiment, the bet amount being “1”). Thereafter, the operation with respect to all buttons corresponding to the “continuous game” thus specified is validated.

The player operates any of the buttons thus validated, whereby the “continuous game”, which is constituted of unit games executed by the number of times indicated by the player through the above-mentioned operation, is executed.

Figure 1:
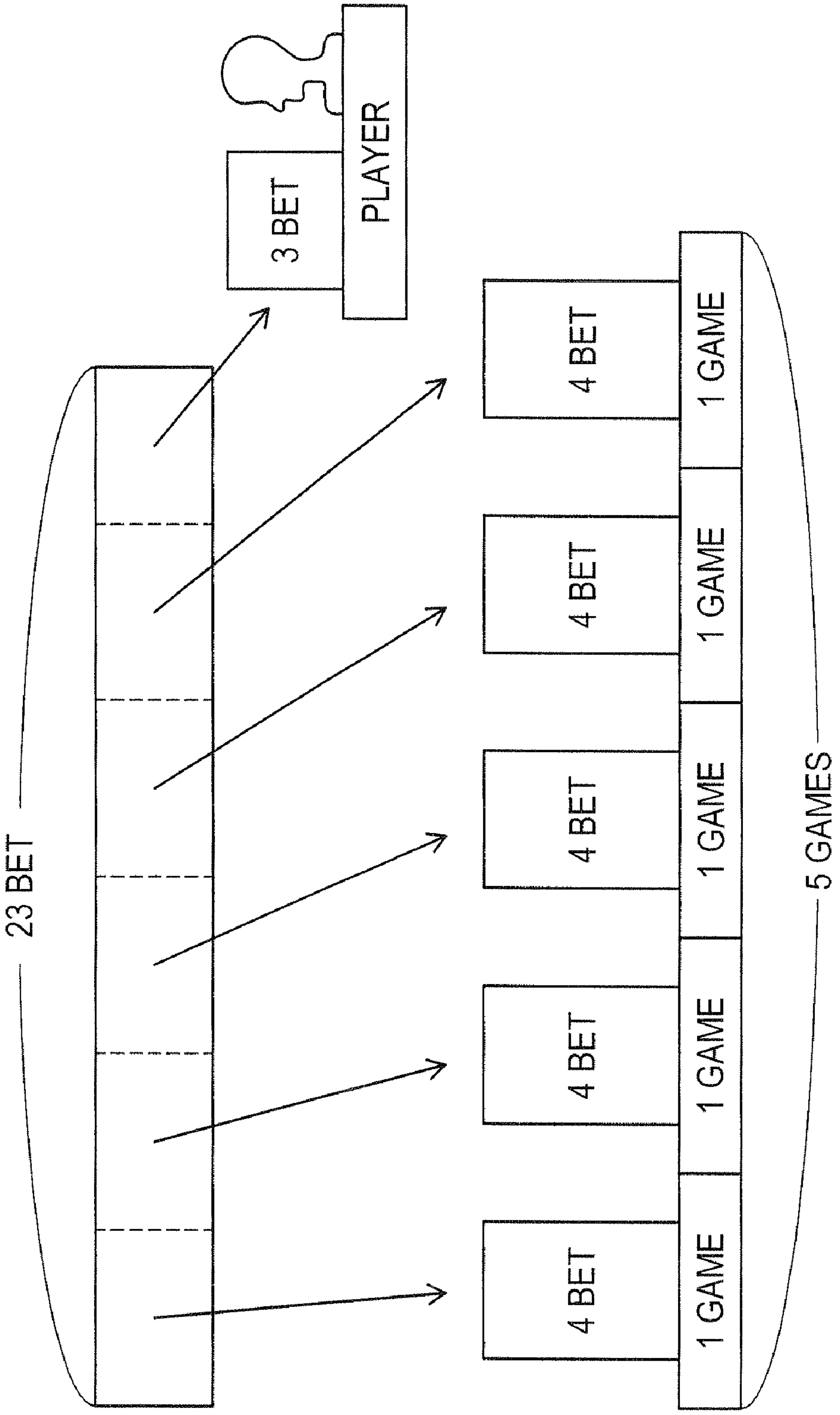
FIG. 1 is a view showing characteristics of a slot machine which is one first embodiment of the present invention.

The bet amount with respect to the “continuous game” indicated by the player is evenly allocated to each unit game constituting the “continuous game” indicated by the player. More specifically, as shown in FIG. 1, for instance, the bet amount with respect to the “continuous game” indicated by the player is assumed to be “23”, and the number of times for the unit games constituting the “continuous game” indicated by the player is assumed to be “5”. In this case, the bet amount “4” is evenly allocated with respect to each unit game constituting the “continuous game” indicated by the player.

Incidentally, the bet amount which was left after the bet amount has been evenly allocated with respect to each unit game constituting the “continuous game” is returned to the player. In the case of FIG. 1, the bet amount “3” is returned to the player.

Thereafter, once the “continuous game” starts, each of the unit games constituting the “continuous game” is executed by auto-play.

1-2. Construction of the Slot Machine

The First Embodiment

Hereinafter, the one embodiment embodying the present invention will be explained in detail with reference to the drawings.

Figure 2:
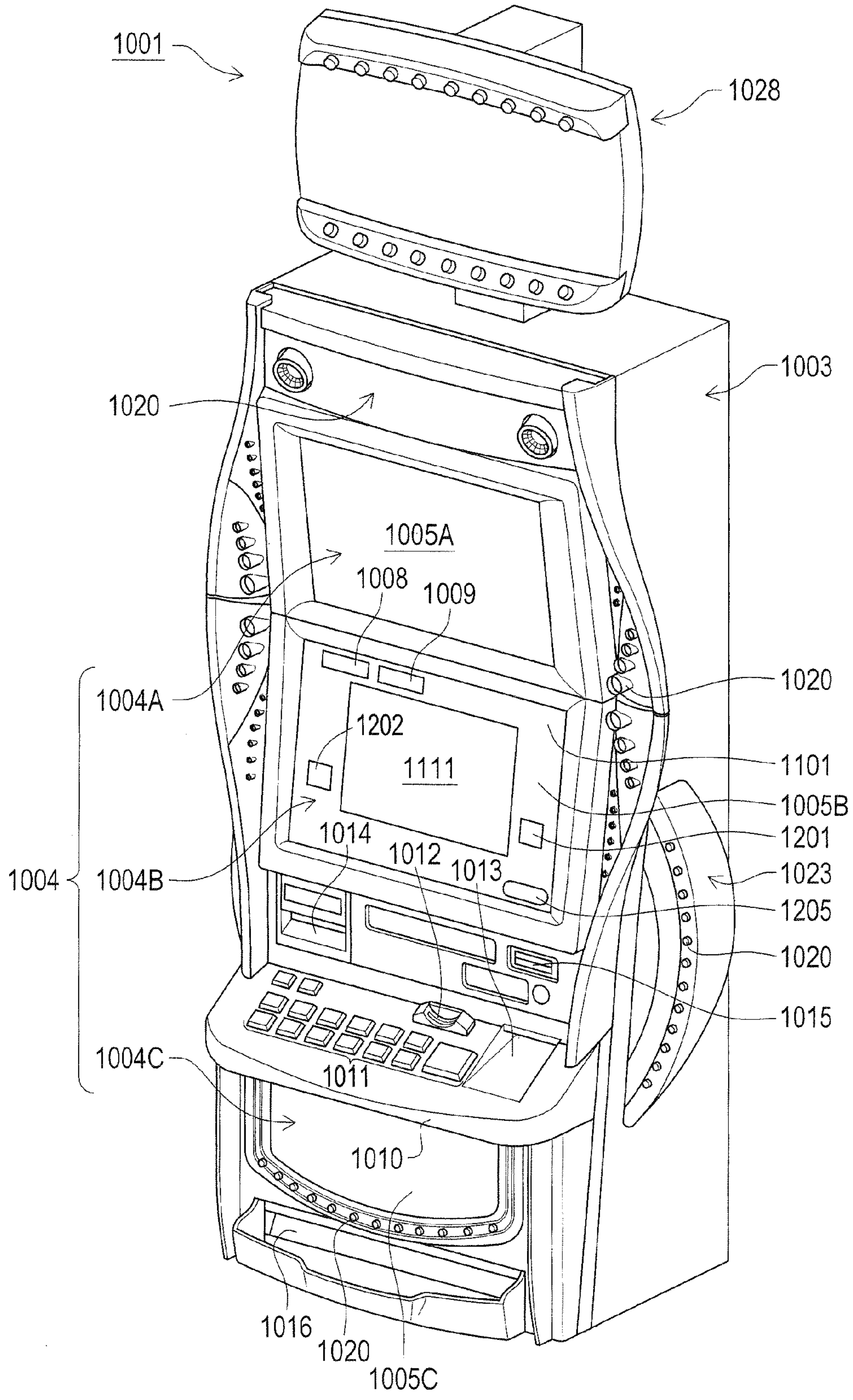
FIG. 2 is a perspective view of the slot machine.

First, an outline construction of the slot machine 1001 according to the present embodiment will be explained based on FIG. 2. FIG. 2 is a perspective view of the slot machine 1001 according to the present embodiment.

As shown in FIG. 2, the slot machine 1001 is an upright type slot machine arranged in a game arcade such as casino, in order to execute predetermined game modes, such slot machine includes a cabinet 1003 in which electronic and mechanical components are installed. For example, as a display portion 1004 to display information a concerning game, there are provided an upper display portion 1004A, a middle variable display portion 1004B and a lower display portion 1004C. Each display portion 1004A to 1004C is mounted at the front of the oblong cabinet 1003. The upper display portion 1004A includes a liquid crystal panel 1005A which is arranged above the middle variable display portion 1004B. On the liquid crystal panel 1005A, for example, an effect image, an introduction of a game content, and a rule explanation of a game are displayed. The lower display portion 1004C is arranged below the middle variable display portion 1004B, and includes a plastic panel 1005C on which images are printed, and a plastic panel 1005C is lightened by backlights.

The middle variable display portion 1004B, which is used to display an execution state of a game, includes the liquid crystal panel 1005B which is fixed at the front door of the cabinet 1003. In this liquid crystal panel 1005B, nine symbols of the video reels are displayed in a scrolling manner and in a stopped manner, respectively. In the middle variable display portion 1004B, the symbol display frame 1111 in which the nine symbol display areas associated with each video reel are positioned like a matrix of three rows times three columns is displayed on the liquid crystal panel 1005B. Further, a touch panel 1101 is provided on the front surface of the liquid crystal panel 1005B. A player can input each kind of commands by operating the touch panel 1101. On the upper position of the middle variable display portion 1004B, the payout amount display portion 1008 and a credit amount display portion 1009 are provided on the liquid crystal panel 1005B. Also the upper portion of the middle variable display portion 1004B, is related to the back side, thereby a player may play a game in a cozy posture.

In the middle variable display portion 1004B, a bet amount display portion 1202 is provided on the liquid crystal panel 1005B, at the right side of the symbol display frame 1111. Further, in the middle variable display portion 1004B, a game number display portion 1201 is provided on the liquid crystal panel 1005B, at the left side of the symbol display frame 1111. Furthermore, in the middle variable display portion 1004B, a minimum bet amount display area 1205 is provided on the liquid crystal panel 1005B, at the lower side of the game number display portion 1201.

Figure 8:
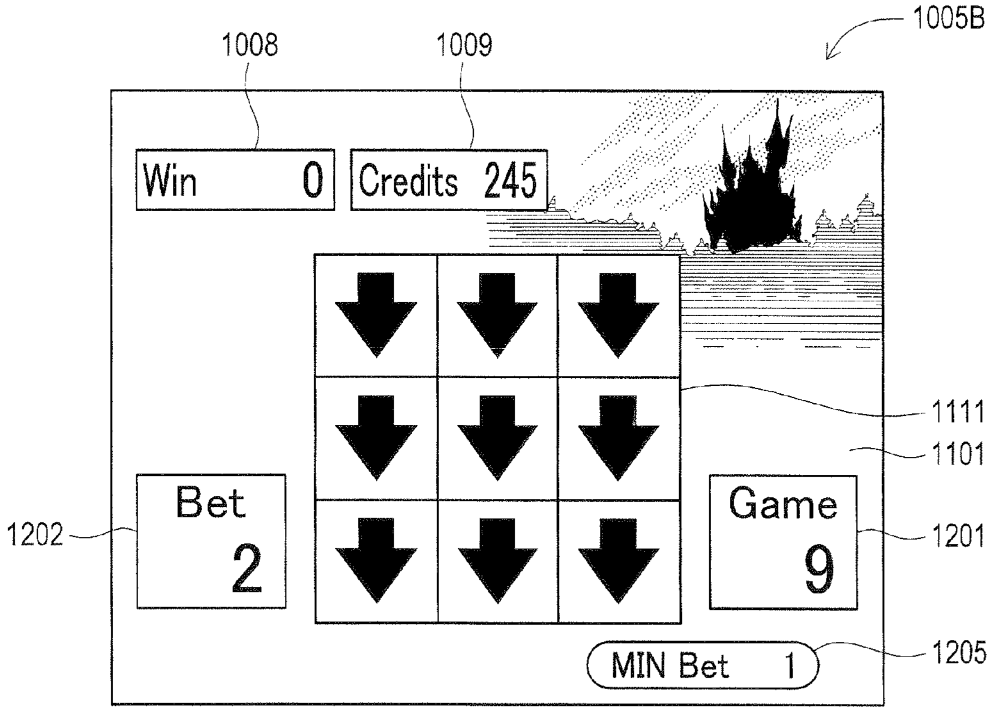
FIG. 8 is a view showing one of an image displayed on the liquid crystal panel.

Now, images of a slot game to be displayed on the liquid crystal panel 1005B are explained. FIG. 7 and FIG. 8 are drawings showing contents displayed on the liquid crystal panel 1005B, as one example of images of a slot game to be displayed on the liquid crystal panel 1005B. As shown in FIG. 7 and FIG. 8, on the liquid crystal panel 1005B in a slot game, the symbol drawn on the reel band of each video reel is displayed in the nine symbol display areas positioned like a matrix of three rows times three columns in the symbol display frame 1111, so that they can be viewed by a player. FIG. 7 shows a state in which the symbol drawn on the reel band of each video reel is arranged or rearranged in each symbol display area of the symbol display frame 1111 on the liquid crystal panel 1005B. FIG. 8 shows a state in which the symbol drawn on the reel band of each video reel is displayed by a scrolling manner in each symbol display area of the symbol display frame 1111 on the liquid crystal panel 1005B. Incidentally, on the reel band of each video reel, a symbol column constructed from twenty-two symbols is drawn respectively (refer to FIG. 3).

Further, the payout amount display portion 1008 and the credit amount display portion 1009 are provided on the liquid crystal panel 1005B. On the payout amount display portion 1008, the payout amount awarded in a slot game to a player is displayed. On the credit amount display portion 1009, the credit amount which is owned by a player at the moment is displayed.

Further, the liquid crystal panel 1005B contains the bet amount display portion 1202, the game number display portion 1201 and the minimum bet amount display area 1205. The bet amount display portion 1202 displays the bet amount for a unit game, as set by a player in a slot game. The game number display portion 1201 displays the remaining number of times for executing unit games that constitute the "continuous game" set by a player in a slot game. The minimum bet amount display area 1205 displays the minimum bet amount for each unit game that a player can set.

Therefore, on the liquid crystal panel 1005B in a slot game, one symbol which is drawn on the reel band of each video reel is arranged in each of the nine symbol display areas of the symbol display frame 1111.

Returning to FIG. 2, between the middle variable display portion 1004B and the lower display portion 1004C, at the front of the cabinet 1003, an operation table 1010 which is projected forward is provided. On the operation table 1010, a variety of operation buttons 1011 including a BET button, a COLLECT button, a SPIN button, a CASHOUT button and the like are arranged as an operation portion to execute a game.

Figure 11:
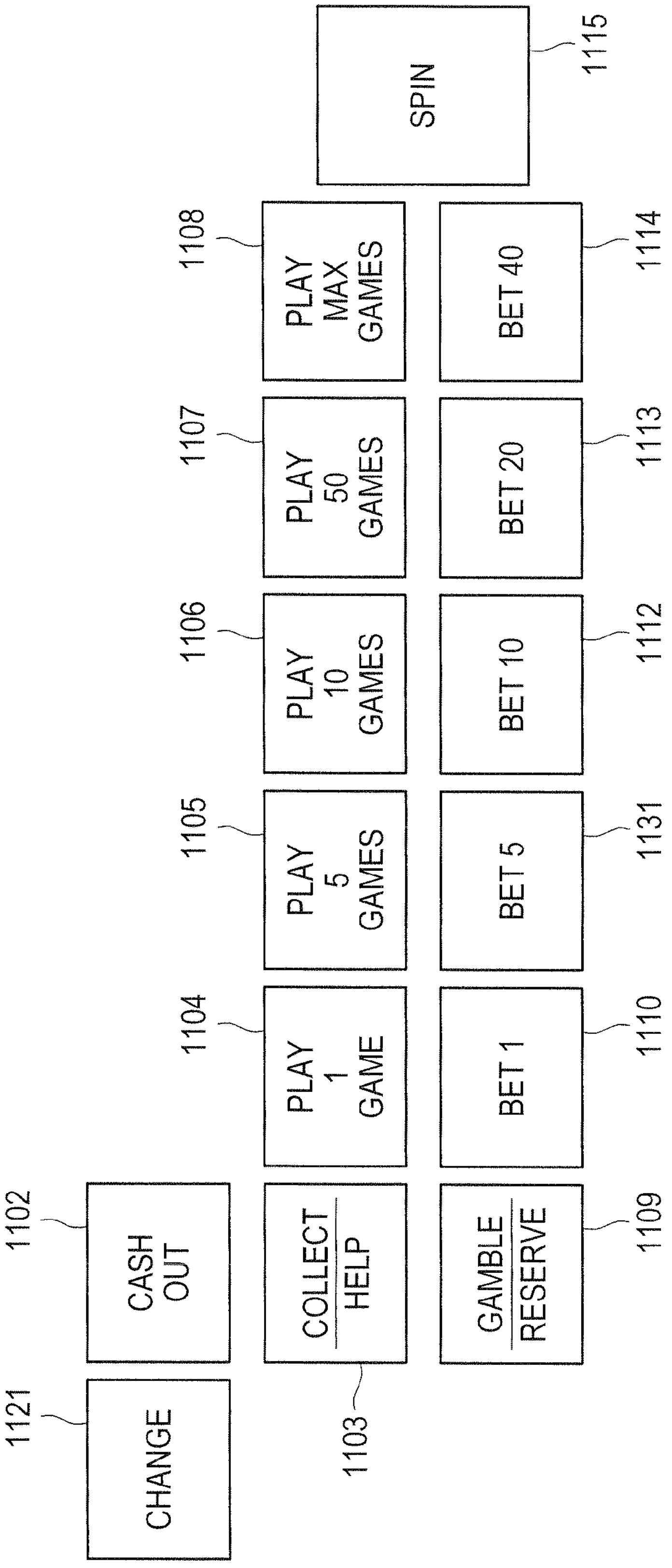
FIG. 11 is a front view showing a variety of operation buttons.

Here, the variety of operation buttons 1011 will now be described. FIG. 11 is a front view showing the variety of operation buttons 1011. As shown in FIG. 11, at an upper stage are provided a CHANGE button 1121, a CASHOUT button 1102 starting from the leftmost side. At a middle stage are provided a COLLECT/HELP button 1103, a PLAY 1 GAME button 1104, a PLAY 5 GAMES button 1105, a PLAY 10 GAMES button 1106, a PLAY 50 GAMES button 1107 and a PLAY MAX GAMES button 1108 starting from the leftmost side. At a lower stage are provided a GAMBLE/RESERVE button 1109, a BET 1 button 1110, a BET 5 button 1131, a BET 10 button 1112, a BET 20 button 1113 and a BET 40 button 1114, starting from the leftmost side. At the rightmost side is provided a SPIN button 1115.

In this respect, the CHANGE button 1121 is an operation device which is used to change bills inserted in a bill insertion slot 1013 (refer to FIG. 2). Coins which have been changed are paid out to a coin tray 1016 (refer to FIG. 2) provided at the lower side of the cabinet 1003 (refer to FIG. 2).

The CASHOUT button 1102 is an operation device which is used to input a command to pay out coins in accordance with the credit amount which a player owns at the moment to the coin tray 1016 (refer to FIG. 2) or a command to pay out such coins by means of bar code-attached tickets which are printed in a ticket printer 1014 (refer to FIG. 2).

The COLLECT/HELP button 1103 is an operation device which is used when completing a double-down game which is executed using the payout amount acquired by a player, or when the game operation method and the like is unclear. Incidentally, if the COLLECT/HELP button 1103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 1104 is an input device for inputting, based on being operated, a command to execute one unit game. The PLAY 5 GAMES button 1105 is an input device for inputting, based on being operated, a command to execute five continuous unit games constituting the "continuous game". The PLAY 10 GAMES button 1106 is an input device for inputting, based on being operated, a command to execute ten continuous unit games constituting the "continuous game". The PLAY 50 GAMES button 1107 is an input device for inputting, based on being operated, a command to execute fifty continuous unit games constituting the "continuous game".

The PLAY MAX GAMES button 1108 is an input device for inputting, based on being operated, a command to execute a maximum number of continuous unit games constituting the "continuous game". Here, the maximum number of times for executing the unit game is computed by dividing the credit amount owned by a player at the moment by the minimum bet amount with respect to each unit game which can be set by the player.

Incidentally, the operation with respect to the PLAY 1 GAME button 1104, PLAY 5 GAMES button 1105, PLAY 10 GAMES button 1106, PLAY 50 GAMES button 1107 and PLAY MAX game button 1108 is not accepted during normal operation.

The GAMBLE/RESERVE button 1109 is an operation device which is used by a player when he/she shifts a slot game to a double-down game, or when he/she steps away from the slot machine.

The BET 1 button 1110 is an input device for inputting, based on being operated, a command to set the bet amount corresponding to "1" with respect to a unit game or the "continuous game". The BET 5 button 1131 is an input device for inputting, based on being operated, a command to set the bet amount corresponding to "5" with respect to a unit game or the "continuous game". The BET 10 button 1112 is an input device for inputting, based on being operated, a command to set the bet amount corresponding to "10" with respect to a unit game or the "continuous game". The BET 20 button 1113 is an input device for inputting, based on being operated, a command to set the bet amount corresponding to "20" with respect to a unit game or the "continuous game". The BET 40 button 1114 is an input device for inputting, based on being operated, a command to set the bet amount corresponding to "40" with respect to a unit game or the "continuous game".

The SPIN button 1115 is an input device for inputting, based on being operated, a command to display each video reel by a scrolling manner.

Returning to FIG. 2, at the operation table 1010, a coin insertion slot 1012 and the bill insertion slot 1013 are provided. Between the operation table 1010 and the middle variable display portion 1004B, the ticket printer 1014 and a card reader 1015 are provided. At the lowest position of the cabinet 1003, the coin tray 1016 is also provided.

Incidentally, in the slot machine 1001 of the present embodiment, gaming medium may be coin, bill, or electronic value (credit). Here, the gaming medium may be others as well, such as medal, token, electronic money, or ticket.

Further, on the cabinet 1003 of the slot machine 1001, light emitting portions 1020 are arranged around a game area including the upper display portion 1004A, the middle variable display portion 1004B, the lower display portion 1004C and the operation table 1010.

Furthermore, the slot machine 1001 also includes a topper effect device 1028 which is installed on the cabinet 1003. The topper effect device 1028 is shaped in a rectangular board shaped, and is provided almost parallel to the liquid crystal panel 1005A of the upper display portion 1004A. The cabinet 1003 is further provided with speakers 1023 on its both sides.

1-3. Outline of Symbols

The First Embodiment

Next, the symbols drawn on the reel band of each video reel will be explained based on FIG. 3. These symbols are scrolled and rearranged in the respective symbol display areas of the symbol display frame 1111 on the liquid crystal panel 1005B in a slot game. FIG. 3 is a schematic view showing symbol columns drawn on the reel band of each video reel.

On the reel band of each video reel, twenty-two symbols are arranged respectively. Each symbol column of video reel is constructed from the symbols including "FRANKENSTEIN", "BLUE7", "BELL", "APPLE", "CHERRY", "PLUM" and "ORANGE". And the symbols of predetermined types are arranged in a predetermined sequence.

In this respect, each of the symbols including "FRANKENSTEIN", "BLUE 7", "BELL", "APPLE", "CHERRY", "PLUM" and "ORANGE" are scatter symbols. If three or four or more scatter symbols are rearranged in the symbol display frame 1111 of the liquid crystal panel 1005B, the payout amount set in advance is awarded to a player (refer to FIG. 6).

Incidentally, to each symbol composing the symbol column of each video reel shown in FIG. 3, a code number is allocated from top to down in sequence.

1-4. Internal Construction of the Slot Machine

The First Embodiment

Next, an internal construction of the above-mentioned slot machine 1001 will be explained with reference to FIG. 4 and FIG. 5.

Figure 4:
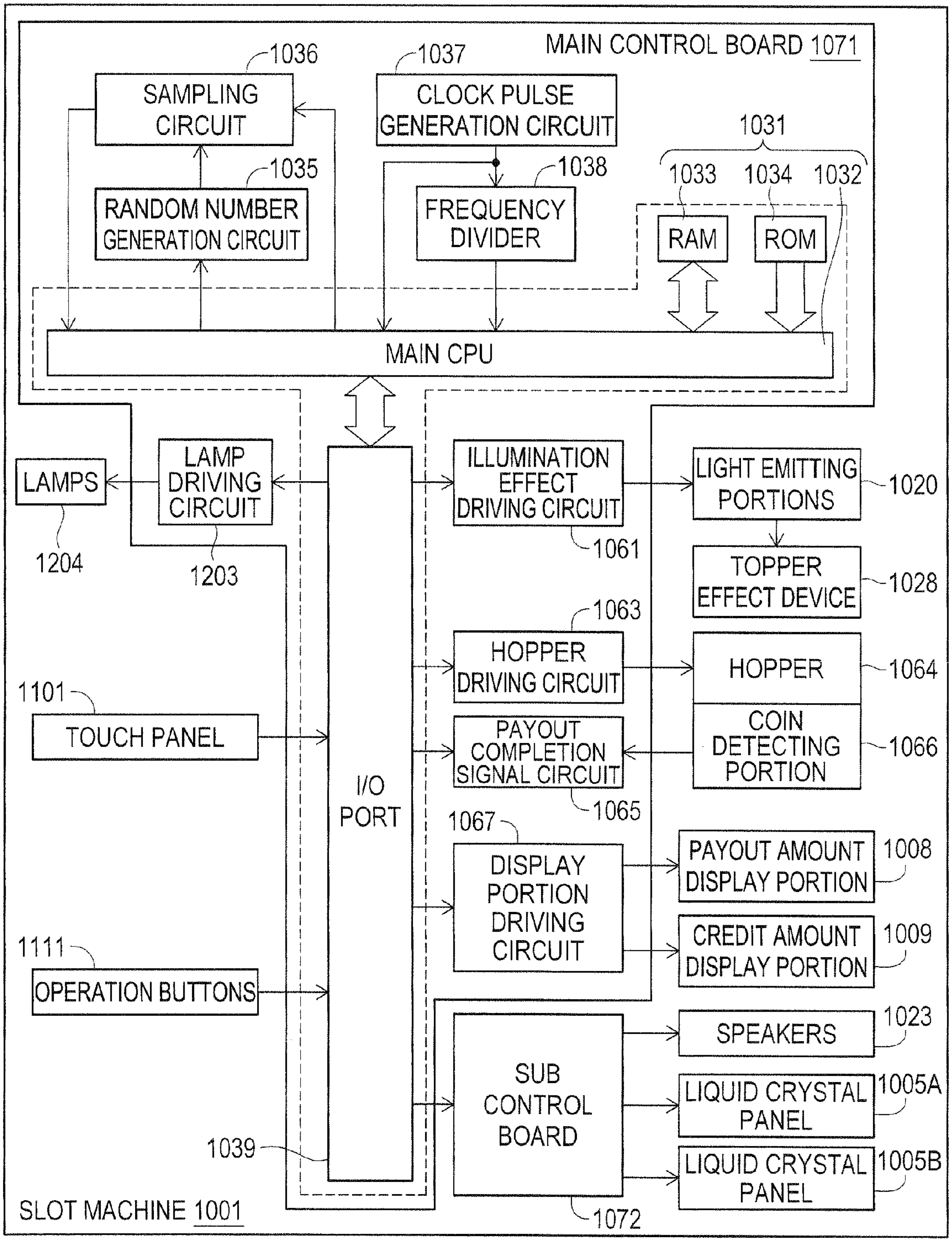
FIG. 4 is a block diagram showing an internal construction of entire slot machine.

FIG. 4 is a block diagram showing an internal construction of entire slot machine 1001. As shown in FIG. 4, the slot machine 1001 includes a plurality of construction elements such as a main control board 1071, in which a microcomputer 1031 is included. The main control board 1071 is constructed from the microcomputer 1031, a random number generation circuit 1035, a sampling circuit 1036, a clock pulse generation circuit 1037 and a frequency divider 1038. The main control board 1071 also includes an illumination effect driving circuit 1061, a hopper driving circuit 1063, a payout completion signal circuit 1065, a display portion driving circuit 1067 and a lamp driving circuit 1203.

The microcomputer 1031 is constructed from a main CPU 1032, a RAM 1033 and a ROM 1034. The main CPU 1032 runs based on programs stored in the ROM 1034, and inputs/outputs a signal with other elements through an I/O port 1039, so as to execute control of the entire slot machine 1001. Data and programs used when the main CPU 1032 runs are stored in the RAM 1033. For example, after-mentioned random numbers which are sampled by the sampling circuit 1036 are stored temporarily after a start of a game, also the code numbers of the respective video reels and the symbol numbers are stored in the RAM 1033. Further, the RAM 1033 sets in advance a storage area where an after-mentioned variable N is stored. Programs executed by the main CPU 1032 and permanent data are stored in the ROM 1034.

Especially, the programs stored in the ROM 1034 include game programs and game system programs (abbreviated as “the game programs and the like” hereinafter). Further, a lottery programs mentioned below is also included in the game programs.

The lottery program is a program used to determine the code numbers of the respective video reels which corresponds to each symbol rearranged in the respective symbol display areas of the symbol display frame 1111 on the liquid crystal panel 1005B. Then, in the lottery program, it is included symbol weighing data corresponding to each of plural kinds of payout rates (for example, 80%, 84%, and 88%). The symbol weighing data are the data indicating correlation between the code number of each video reel and one or plural random numbers belonging to a predetermined number range (0 to 255), every each of the nine video reels. In other words, each of the code number of one video reel is associated with one or more random numbers corresponding to the payout rate. The random numbers are extracted by the lottery program, and symbols specified finally by the random numbers are rearranged in the respective symbol display areas of the symbol display frame 1111 on the liquid crystal panel 1005B.

Random numbers over a predetermined range are generated by the random number generation circuit 1035, which is operated based on instructions from the main CPU 1032. The random numbers are voluntarily extracted from the random numbers generated by the random number generation circuit 1035 by the sampling circuit 1036, based on instructions from the main CPU 1032, and the extracted random numbers are input to the main CPU 1032. The base clock for running the main CPU 1032 is generated by the clock pulse generation circuit 1037, and signals which are generated by dividing the base clock in a predetermined frequency are input to the main CPU 1032 by the frequency divider 1038.

And to the main control board 1071, the touch panel 1101 is connected. The touch panel 1101 is arranged in front of the liquid crystal panel 1005B, and specifies the coordinate position of the portion touched by a player. The position on which a player touched and the direction of the movement of the touched portion are determined based on the specified coordinate position information. A signal corresponding to the determination is input to the main CPU 1032 through the I/O port 1039.

Also, the operation buttons 1111 for instructing an execution of a game are connected to the main control board 1071. The operation buttons 1111 include the variety of buttons (refer to FIG. 11). A signal corresponding to the depressing of these buttons is input to the main CPU 1032 through the I/O port 1039.

An effect signal which is used to conduct illumination effect is output to the above-mentioned light emitting portions 1020 and the topper effect device 1028 by the illumination effect driving circuit 1061. Then, the topper effect device 1028 is serially connected to the illumination effect driving circuit 1061 through the light emitting portions 1020.

A hopper 1064 is driven by the hopper driving circuit 1063 based on control of main CPU 1032. The hopper 1064 executes payout of coins, and coins are paid out from the coin tray 1016. Data of the number of coins are input from the connected coin detecting portion 1066 by the payout completion signal circuit 1065. When the number of coins becomes a predetermined number, a signal indicating completion of the coins is input to the main CPU 1032. The number of the coins paid out from the hopper 1064 is calculated by the coin detecting portion 1066, and the data of the number calculated are input to the payout completion signal circuit 1065. The each display operation of the payout amount display portion 1008 and credit amount display portion 1009 is controlled by the display portion driving circuit 1067.

The lamp driving circuit 1203 turns lamps 1204 on/off based on control of main CPU 1032. The lamps 1204 are provided inside the operation buttons 1011. The lamp 1204 inside the button with respect to which a player’s operation is validated lights up, notifying the player of the button with respect to which operation is validated.

Furthermore, a sub control board 1072 is connected to the main control board 1071. The sub control board 1072 is connected to the liquid crystal panel 1005A, the liquid crystal panel 1005B and the speakers 1023.

Figure 5:
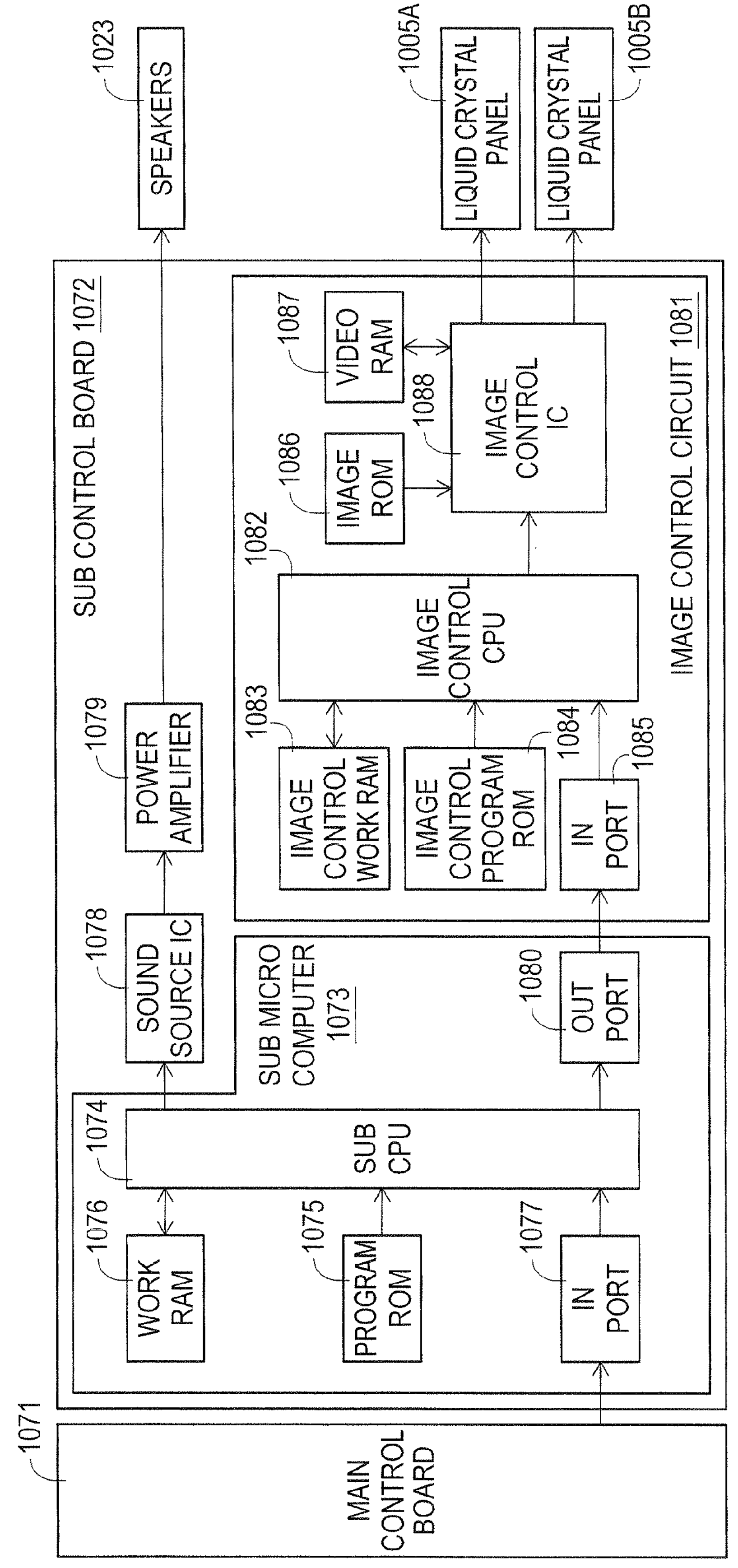
FIG. 5 is a block diagram showing an internal construction of a sub control board.

FIG. 5 is a block diagram showing an internal construction of the sub control board 1072. As shown in FIG. 5, a command from the main control board 1071 is input to the sub control board 1072. The display control on the liquid crystal panel 1005A of the upper display portion 1004A and the liquid crystal panel 1005B of the variable display portion 1004B, and the sound output control on the speakers 1023 are executed by the sub control board 1072. The sub control board 1072 is constructed on a circuit board different from the circuit board for the main control board 1071, and includes a microcomputer 1073 (abbreviated as “sub microcomputer” hereinafter) as a main construction element, and a sound source IC 1078, a power amplifier 1079 and an image control circuit 1081. The sound source IC 1078 controls the sound output from the speakers 1023, the power amplifier 1079 is used as an amplification device, and the image control circuit 1081 runs as a display control device of the liquid crystal panel 1005A and 1005B.

The sub microcomputer 1073 includes a sub CPU 1074, a program ROM 1075, a work RAM 1076, an IN port 1077 and an OUT port 1080. The control operations are executed by the sub CPU 1074 based on a control order sent from the main control board 1071, the program ROM 1075 is used as a memory device. Although a clock pulse generation circuit, a frequency divider, a random number generation circuit and a sampling circuit are not included in the sub control board 1072, the sub control board 1072 is constructed so as to execute random number sampling according to operation programs thereof. Control programs executed by the sub CPU 1074 are stored in the program ROM 1075. The work RAM 1076 is constructed as a temporary storing device when the above-mentioned control programs are executed by the sub CPU 1074.

The image control circuit 1081 includes an image control CPU 1082, an image control work RAM 1083, an image control program ROM 1084, an IN port 1085, an image ROM 1086, a video RAM 1087 and an image control IC 1088. Images displayed on the liquid crystal panel 1005A and 1005B are determined by the image control CPU 1082, based on parameters set by the sub microcomputer 1073, according to image control programs stored in the image control program ROM 1084.

The image control programs regarding to a display of the liquid crystal panel 1005A, 1005B and a variety of selection tables are stored in the image control program ROM 1084. The image control work RAM 1083 is constructed as a temporary storing device when the image control programs are executed by the image control CPU 1082. Images corresponding to contents determined by the image control CPU 1082 are formed by the image control IC 1088, and are output to the liquid crystal panel 1005A, 1005B.

In the image ROM 1086, dot data used to form images are stored. Thus, it stores the dot data on symbols drawn on the reel band of the each video reel. The video RAM 1087 runs as a temporary storing device when the images are formed by the image control IC 1088.

Further, based on a control signal from the main CPU 1032, the image control circuit 1081 performs display control of scrolling display/stop display of the video reels in the respective symbol display areas of the symbol display frame 1111 on the liquid crystal panel 1005B.

1-5. Outline of a Slot Game

The First Embodiment

Next, winning combinations and the payout amounts corresponding to the winning combinations will be explained based on FIG. 6, wherein the winning combinations are symbol combinations when a slot game is executed by using each of the video reels in the slot machine 1001 according to the present embodiment. FIG. 6 is a payout table in which the winning combinations and the payout amounts corresponding to the winning combinations are shown when a slot game is executed by using each of the video reels.

Here, the payout amount shown in FIG. 6 indicates the payout amount when the bet amount is "1". Therefore, when the bet amount is "1", the payout amount shown in FIG. 6 is paid out, and when the bet amount is more than "2", the payout amount obtained by multiplying the payout amount shown in FIG. 6 with the bet amount is paid out.

Accordingly, if the nine scatter symbols of "FRANKENSTEIN" are rearranged in the symbol display frame 1111 of the liquid crystal panel 1005B, the amount obtained by multiplying the bet amount with 500 credits will be paid out. If the eight scatter symbols of "FRANKENSTEIN" are rearranged in the symbol display frame 1111 of the liquid crystal panel 1005B, the amount obtained by multiplying the bet amount with 300 credits will be paid out. Hereinafter, the payout amounts are set in a similar manner, as shown in FIG. 6, in accordance with the number of "FRANKENSTEIN" scatter symbols which have been rearranged in the symbol display frame 1111 of the liquid crystal panel 1005B.

With respect to each of the other scatter symbols including "BLUE 7", "BELL", "APPLE", "CHERRY", "ORANGE" and "PLUM", as well, the payout amounts as shown in FIG. 6 are set in a similar manner in accordance with the number of the same scatter symbols which have been rearranged in the symbol display frame 1111 of the liquid crystal panel 1005B.

As mentioned above, in the slot machine 1001 according to the present embodiment, a slot game is executed.

In other words, in a slot game, the slot game is executed by rearranging the plurality of same symbols specified by nine video reels in the symbol display frame 1111 of the liquid crystal panel 1005B. In the slot game, firstly, a part of symbol column (one symbol) drawn on the reel band of each video reel shown in FIG. 3, is arranged in each symbol display area of the symbol display frame 1111 on the liquid crystal panel 1005B (refer to FIG. 7). Here, after a player sets the bet amount by depressing the BET button among the operation buttons 1111, if the player depresses the SPIN button 1115 among the operation buttons 1111, each of the video reels rotates, the symbol column drawn on the reel band of each video reel shown in FIG. 3, is scrolled from up to down in the symbol display frame 1111 of the liquid crystal panel 1005B (refer to FIG. 8).

After a predetermined time, each of the video reels stops automatically, a part of symbol column (one symbol) drawn on the reel band of each video reel shown in FIG. 3, is rearranged in each symbol display area of the symbol display frame 1111 on the liquid crystal panel 1005B (refer to FIG. 7). On the other hand, each winning combination based on each the number of the scatter symbol is determined beforehand (refer to FIG. 6). When a symbol combination constructed from the nine symbols rearranged in the symbol display frame 1111 of the liquid crystal panel 1005B, realizes a winning combination specified by the number of the same scatter symbol, the payout amount obtained by multiplying the bet amount with the payout amount corresponding to the realized winning combination is awarded to the player.

1-6. Operation of the Slot Machine

The First Embodiment

Figure 9:
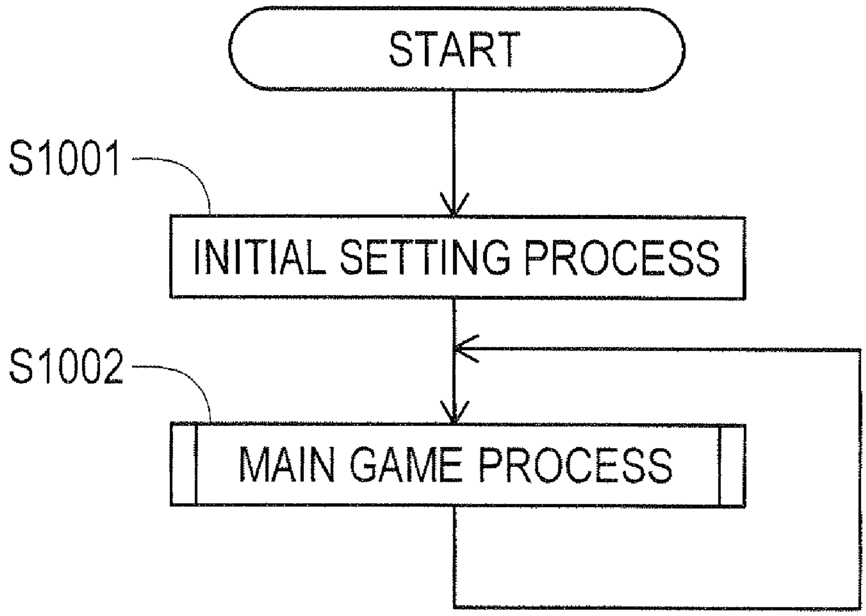
FIG. 9 is a flowchart of a main control program.

Next, a main control program executed in the slot machine 1001 according to the present embodiment will be explained with reference to drawings. FIG. 9 is a flowchart of the main control program.

First, when a power switch is pressed (power activation), the microcomputer 1031 is started to operate, an initial setting process is executed by the microcomputer 1031 in step (abbreviated as "S") 1001. In the initialization process, BIOS stored in the ROM 1034 is executed by the main CPU 1032. Compressed data included in the BIOS are expanded to the RAM 1033, and when the BIOS expansion to the RAM 1033 is executed, a diagnosing process and initialization process of various peripheral devices are executed. Also, the game programs and the like are written from the ROM 1034 to the RAM 1033 by the main CPU 1032, so as to obtain the payout rate setting data and country ID information. Also, during execution of the initial setting process, a verification process to each program is executed.

Then in S1002, the main CPU 1032 reads out the game programs and the like from the RAM 1033, and executes the programs in sequence so as to conduct the main game process. A game is executed in the slot machine 1001 according to the present embodiment by executing the main game process. Then, the main game process is repeated when the power is supplied to the slot machine 1001.

Figure 10:
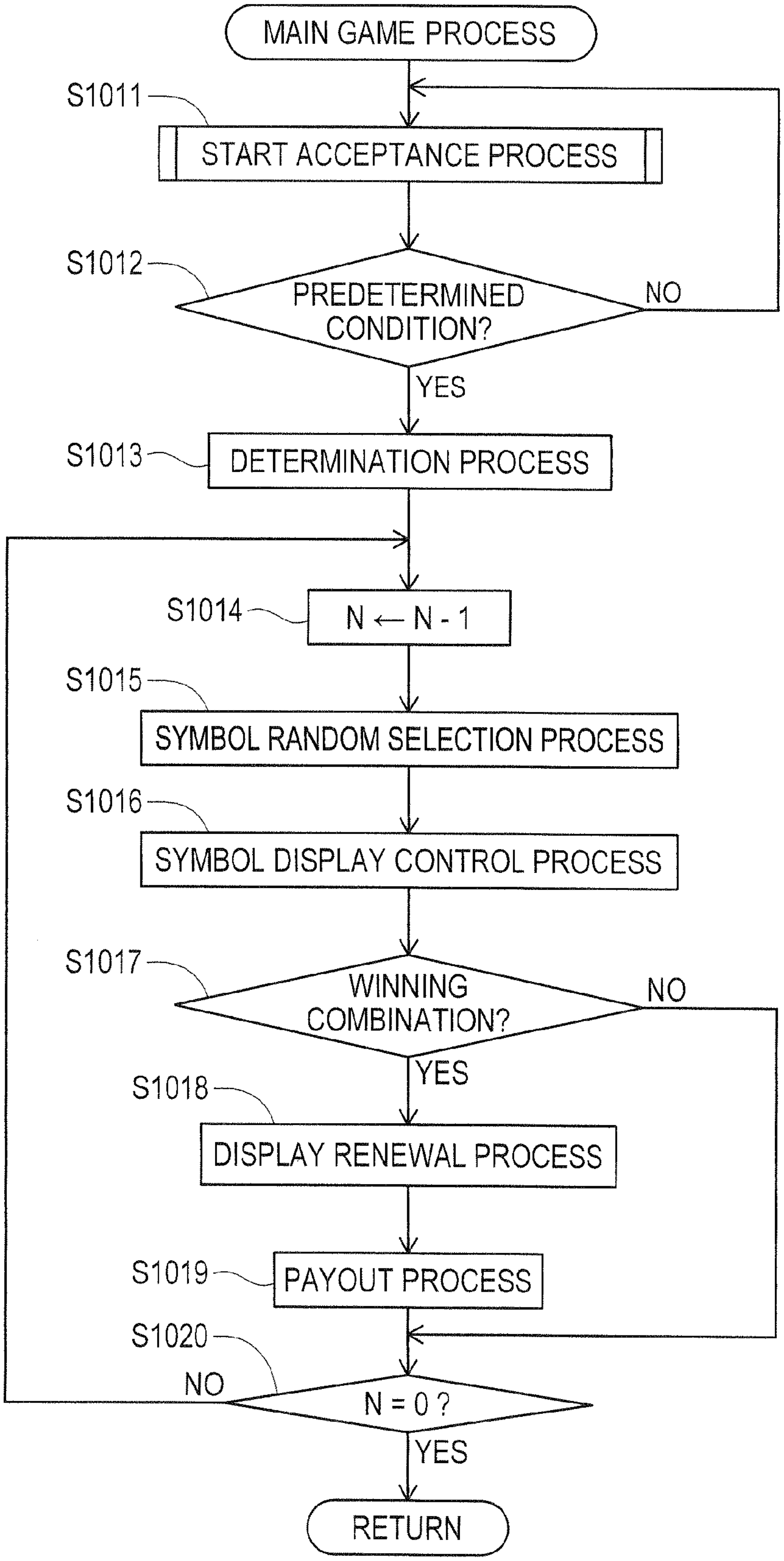
FIG. 10 is a flowchart of a main game process program.

Next, a sub process of the main game process in S1002 above will be explained based on FIG. 10. FIG. 10 is a flowchart of the main game process program in the slot machine 1001 according to the present embodiment. Incidentally, each program shown in the flowchart of FIG. 10 is stored in the ROM 1034 or the RAM 1033 of the slot machine 1001, and is executed by the main CPU 1032.

Figure 12:
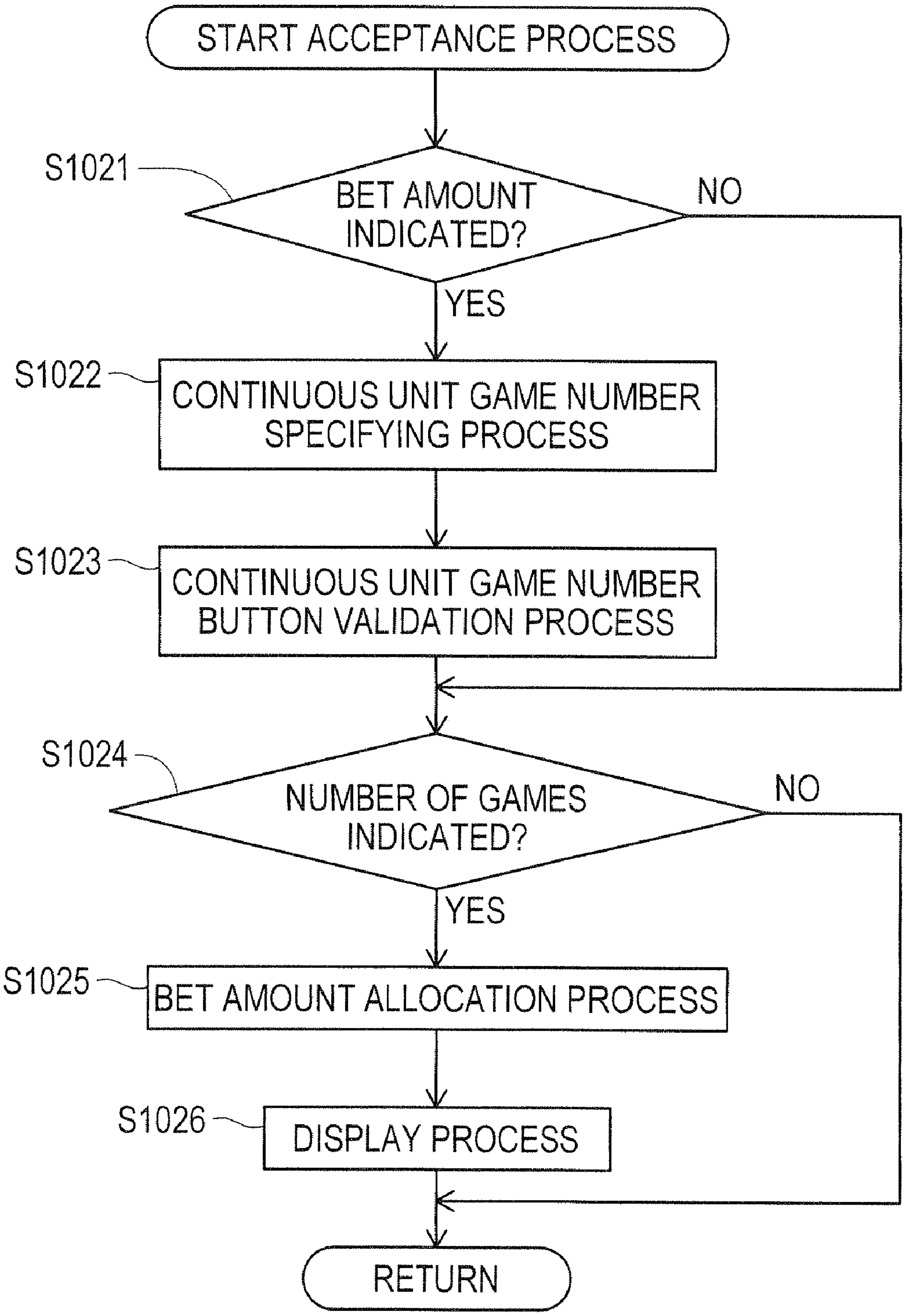
FIG. 12 is a flowchart of a start acceptance process program.

First, as shown in FIG. 10, in S1011, a start acceptance process is executed by the main CPU 1032. Then, a sub process of the start acceptance process in S1011 above will be explained based on FIG. 12. FIG. 12 is a flowchart of the start acceptance process program in the slot machine 1001 according to the present embodiment. Incidentally, each program shown in the flowchart of FIG. 12 is stored in the ROM 1034 or the RAM 1033 of the slot machine 1001, and is executed by the main CPU 1032.

In the start acceptance process in S1011 above, the main CPU 1032 determines, in S1021, whether or not the bet amount has been indicated, as shown in FIG. 12. Here, in a case of an input signal from any of the BET 1 button 1110, BET 5 button 1131, BET 10 button 1112, BET 20 button 1113 and BET 40 button 1114, it is determined that the bet amount has been indicated. However, if the indicated amount exceeds the bet amount corresponding to the credit amount owned by a player at the moment, it is determined that no bet amount has been indicated. At this point, if no bet amount has been indicated (S1021: NO), the process proceeds to S1024 described below. In contrast, if the bet amount has been indicated (S1021: YES), the process proceeds to S1022.

In S1022, the main CPU 1032 executes a continuous unit game number specifying process. In this process, the main CPU 1032 specifies one or a plurality of "continuous games" including a number of unit games which can be indicated by a player, through the bet amount indicated in S1021 above and the minimum bet amount (in the present embodiment, the bet amount being "1") with respect to a unit game which can be set by a player.

In S1023, the main CPU 1032 executes a continuous unit game number button validation process. In this process, the main CPU 1032 accepts the player's operating the button related to the "continuous game" specified in S1022 above, with respect to the PLAY 1 GAME button 1104, PLAY 5 GAMES button 1105, PLAY 10 GAMES button 1106, PLAY 50 GAMES button 1107 and PLAY MAX GAMES button 1108.

Incidentally, in a case of a rate of 1 credit for 1 bet, as long as the credit amount owned by a player at the moment is not "0", the player's operation with respect to the PLAY MAX GAMES button 1108 is accepted.

Further, the main CPU 1032 turns on the lamp 1204 provided inside the button related to the "continuous game" specified in S1022 above, by sending a control signal to the lamp driving circuit 1203. As a result, a player is notified that the operation of that button is valid.

In S1024, the main CPU 1032 determines whether or not the number of games has been indicated. Here, with respect to the PLAY 1 GAME button 1104, PLAY 5 GAMES button 1105, PLAY 10 GAMES button 1106, PLAY 50 GAMES button 1107 and PLAY MAX GAMES button 1108, if an input signal is sent from any of the buttons which have been validated in S1023 above, it is determined that the number of games has been indicated. At this point, if the number of games has not been indicated (S1024: NO), the process proceeds to above S1012 shown in FIG. 10. In contrast, if the number of games has been indicated (S1024: YES), the process proceeds to S1025.

Incidentally, the main CPU 1032 assigns the number of games indicated in S1024 above to the variable N. The main CPU 1032 displays the variable N stored in the RAM 1033 on the game number display portion 1201 of the liquid crystal panel 1005B by sending a control signal to the sub control board 1072.

In S1025, the main CPU 1032 executes a bet amount allocation process. In this process, the main CPU 1032 allocates the bet amount indicated in S1021 above in an equal manner to each unit game corresponding to the number of games indicated in S1024 above (refer to FIG. 1 above). As a result of this equal allocation, if a surplus occurs with respect to the bet amount indicated in S1021 above, the main CPU 1032 stores the surplus of the bet amount in the RAM 1033, as surplus information.

The main CPU 1032 stores the bet amount thus allocated in the RAM 1033, as bet allocation information. Then, the main CPU 1032 displays the bet allocation information (the bet amount which is evenly allocated to each unit game) which is stored in the RAM 1033 on the bet amount display portion 1202 of the liquid crystal panel 1005B, by sending a control signal to the sub control board 1072. Then, the process proceeds to above S1012 shown in FIG. 10.

Returning to FIG. 11, in S1012, the main CPU 1032 determines whether or not a predetermined condition is met.

Here, the predetermined condition is that the SPIN button 1115 is depressed. Accordingly, this determination is made based on a signal which is input to the main CPU 1032 depending on depressing the SPIN button 1115. At this point, if the SPIN button 1115 is not depressed (S1012: NO), the process returns to the start acceptance process (S1011) again. Thereby, an operation of changing the bet amount, an operation of changing the number of games and the like are possible. In contrast, if the SPIN button 1115 is depressed (S1012: YES), the process proceeds to S1013.

In S1013, the main CPU 1032 executes a determination process. In this process, the bet amount set based on the above bet operation is reduced from the credit amount owned by the player at the moment. Incidentally, the credit amount after the reduction is stored in the RAM 1033 as credit information. Then, by sending a control signal to the display portion driving circuit 1067, the main CPU 1032 displays the credit information (the credit amount after the above reduction) stored in the RAM 1033 on the credit amount display portion 1009 of the liquid crystal panel 1005B.

The main CPU 1032 includes the surplus information (the surplus of the bet amount which occurred in the allocation process of S1025) stored in the RAM 1033 to the credit information stored in the RAM 1033, at a rate of 1 credit for 1 bet. Then, by sending a control signal to the display portion driving circuit 1067, the main CPU 1032 displays the credit information (the credit amount after the above addition) stored in the RAM 1033 on the credit amount display portion 1009 of the liquid crystal panel 1005B. Further, the main CPU 1032 overwrites "0" in the RAM 1033, as the surplus information.

Further, the main CPU 1032 invalidates the operation with respect to all buttons including the PLAY 1 GAME button 1104, PLAY 5 GAMES button 1105, PLAY 10 GAMES button 1106, PLAY 50 GAMES button 1107 and PLAY MAX GAMES button 1108. Simultaneously, by sending a control signal to the lamp driving circuit 1203, the main CPU 1032 turns off the lamp 1204 provided inside each of the buttons 1104 to 1108.

In S1014, the main CPU 1032 decrements the variable N. Then, by sending a control signal to the sub control board 1072, the main CPU 1032 displays the variable N stored in the RAM 1033 on the game number display portion 1201 of the liquid crystal panel 1005B.

In S1015, the main CPU 1032 executes a symbol random selection process. Specifically, when the lottery program included in the game programs is executed by the main CPU 1032, the random number corresponding to each video reel respectively is selected from a range of "0 to 255". Then, with reference to the symbol weighting data corresponding to the payout rate setting data, based on the nine random numbers, the code number of each video reel is determined by the main CPU 1032. The main CPU 1032 stores the determined code number of each video reel in the RAM 1033 by overwriting code number information in the RAM 1033 with the determined code number of each video reel so as to correspond to each symbol display area of the symbol display frame 1111 on the liquid crystal panel 1005B. Thereafter, the process proceeds to S1016.

Here, the code number of each video reel is associated with the symbol number to be rearranged in each symbol display area of the symbol display frame 1111 on the liquid crystal panel 1005B, so each symbol to be rearranged in such game is determined by overwriting the code number information in the RAM 1033 with the code number of each video reel determined by the main CPU 1032 so as to correspond to each symbol display area of the symbol display frame 1111 on the liquid crystal panel 1005B. For example, if the main CPU 1032 determines that all of the code number of each video reel are "21" and then overwrites the code number information in the RAM 1033 with the code number of each video reel so as to correspond to each symbol display area of the symbol display frame 1111 on the liquid crystal panel 1005B, the main CPU 1032 determines to rearrange the nine symbols of "FRANKENSTEIN" (refer to FIG. 3). Thus, by overwriting the code number information in the RAM 1033 with the code number of each video reel selected by a lottery so as to correspond to each symbol display area of the symbol display frame 1111 on the liquid crystal panel 1005B, each symbol to be rearranged in a unit game of a slot game is determined.

Subsequently, when proceeding to S1016, the main CPU 1032 executes a symbol display control process. In other words, by sending a control signal to the sub control board 1072, the main CPU 1032 starts a scrolling display of each video reel in each symbol display area of the symbol display frame 1111 on the liquid crystal panel 1005B. After that, an effect mode (a display mode of images on the liquid crystal panel 1005B and a sound output mode from the speakers 1023) for each unit game is determined by the main CPU 1032, and the sub control board 1072 is ordered to start the effect in a predetermined effect pattern. Then, when a predetermined timing to stop displaying each video reel in scrolling manner comes, the main CPU 1032, by sending a control signal to the sub control board 1072, stops scrolling of each video reel being displayed. The stop operation is based on the code number stored in the RAM 1033 by overwriting the code number information in the RAM 1033 with the code number so as to correspond to each symbol display area of the symbol display frame 1111 on the liquid crystal panel 1005B. With this, each symbol which determined in S1015 above-mentioned is rearranged in each symbol display area of the symbol display frame 1111 on the liquid crystal panel 1005B.

After that, when proceeding to S1017, the main CPU 1032 determines whether or not there is a winning combination. The determination is made based on the code number stored in the RAM 1033 by overwriting the code number information in the RAM 1033 with the code number so as to correspond to each symbol display area of the symbol display frame 1111 on the liquid crystal panel 1005B. At this point, if there is not a winning combination (S1017: NO), the process proceeds to S1020 described below. In contrast, if there is a winning combination (S1017: YES), the process proceeds to S1018.

In S1018, the main CPU 1032 executes a display renewal process. Specifically, first, the payout amount obtained by multiplying the payout amount corresponding to the winning combination (the number of the same symbol) rearranged in the symbol display frame 1111 of the liquid crystal panel 1005B with the bet amount is computed. Incidentally, the computation is executed based on the bet allocation information in the RAM 1033 and the payout table of FIG. 6. In case that there is more than one payout amount corresponding to the winning combination (the number of the same symbol), the computation is executed by adding up these payout amounts. The computed payout amount is stored in RAM 1033 as payout information. After that, by sending a control signal to the display portion driving circuit 1067, the main CPU 1032 displays the payout information stored in the RAM 1033 (the above-mentioned computed amount) on the payout amount display portion 1008 of the liquid crystal panel 1005B.

Then, the main CPU 1032 executes a payout process in S1019. In the payout process, the payout amount awarded to a player in a slot game is paid out to the player based on the payout information stored in the RAM 1033.

When the pay out is executed, the credit amount stored in the RAM 1033 as the payout information (the payout amount awarded to a player in a slot game) are added to the credit amount stored in the RAM 1033 as the credit information, and the added value is overwritten in the RAM 1033 as the credit information. After that, by sending a control signal to the display portion driving circuit 1067, the main CPU 1032 displays the credit information stored in the RAM 1033 (the added value computed in S1019) on the credit amount display portion 1009 of the liquid crystal panel 1005B.

Incidentally, in the payout process, the credit amount owned by a player at the moment may be paid out by coins corresponding to the credit amount (one credit equals to one coin) based on the player's depressing the CASHOUT button 1102, or may also be paid out by a ticket with a bar code which is printed by the ticket printer 1014.

Then, after the main CPU 1032 executes the above-mentioned payout process in S1019, the process proceeds to S1020.

In S1020, the main CPU 1032 determines whether or not the variable N is "0". At this point, if the variable N is not "0" (S1020: NO), the process returns to S1014 above. As a result, the unit games corresponding to the number of games indicated in S1024 above are executed by auto-play with the bet amount which is allocated in S1025 above. In contrast, if the variable N is "0" (S1020: YES), the main CPU 1032 overwrites "0" in the RAM 1033, as the bet allocation information, and at the same time, displays "0" on the bet amount display portion 1202 of the liquid crystal panel 1005B by sending a control signal to the sub control board 1072. Then, the process returns to S1011 above, at which the main game process is repeated as shown in FIG. 11.

1-7. Other

The First Embodiment

The present invention is not limited to the above-described first embodiment, and various modifications and alterations can be made thereto without departing from the spirit of the invention.

For instance, the bet amount with respect to the "continuous game" indicated by a player may be allocated at random to each unit game constituting the "continuous game" indicated by the player. More specifically, as shown in FIG. 13, for instance, the bet amount with respect to the "continuous game" indicated by a player is assumed to be "23", while the number of times of the unit games constituting the "continuous game" indicated by the player is assumed to be "5".

Figure 13:
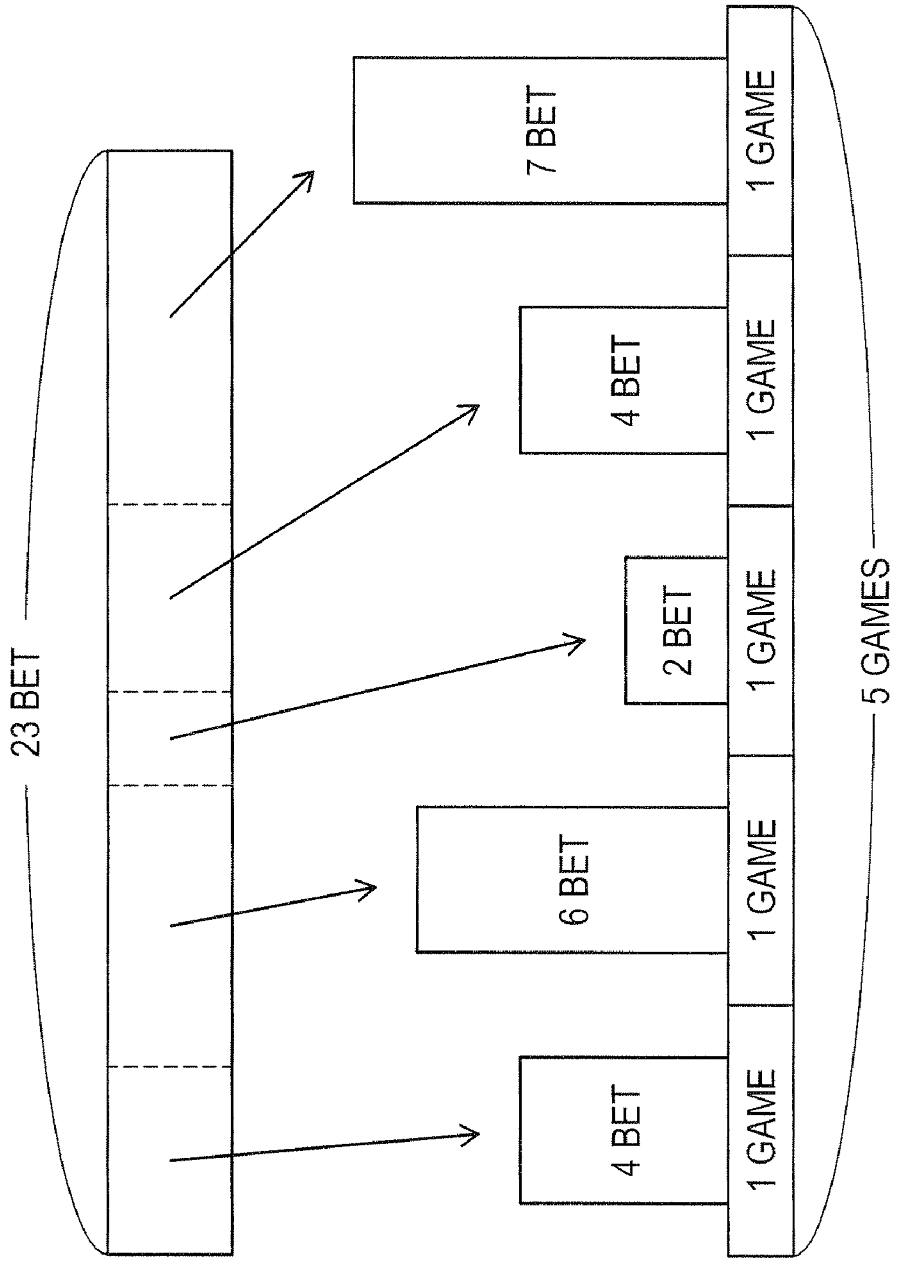
FIG. 13 is a view showing characteristics of the slot machine.

In the case shown in FIG. 13, the bet amount is respectively allocated to five unit games constituting the "continuous game" indicated by the player, in the order "4", "16", "2", "4" and "17".

Incidentally, if the bet amount with respect to the "continuous game" indicated by a player is allocated at random to each unit game constituting the "continuous game" indicated by the player, the main CPU 1032 performs control so that the bet amount allocated with respect to the unit games during execution thereof is updated and stored in the bet allocation information, with each execution of the unit games constituting the "continuous game" indicated by the player. Further, the main CPU 1032 performs control so that the bet allocation information thus updated and stored is displayed on the bet amount display portion 1202 of the liquid crystal panel 1005B, by sending a control signal to the sub control board 1072, with each execution of the unit games constituting the "continuous game" indicated by the player.

A surplus of the bet amount may occur as a result of the above-mentioned random allocation thereof. Alternatively, as shown in FIG. 13, this random allocation of the bet amount may be adjusted so as to prevent occurrence of a surplus of the bet amount.

The present invention may also be applied with respect to a gaming machine wherein unit games such as card games, roulette games, dice games or mahjong game or the like are repeatedly executed.

2-1. Characteristics of the Present Invention

The Second Embodiment

Next, the second embodiment of the present invention, as applied to a slot machine which is one example of a gaming machine of the present invention, will be described while referring to the accompanying drawings.

A game which is executed in the slot machine of the present embodiment is constituted of a slot game in which scatter symbols are employed.

Figure 14:
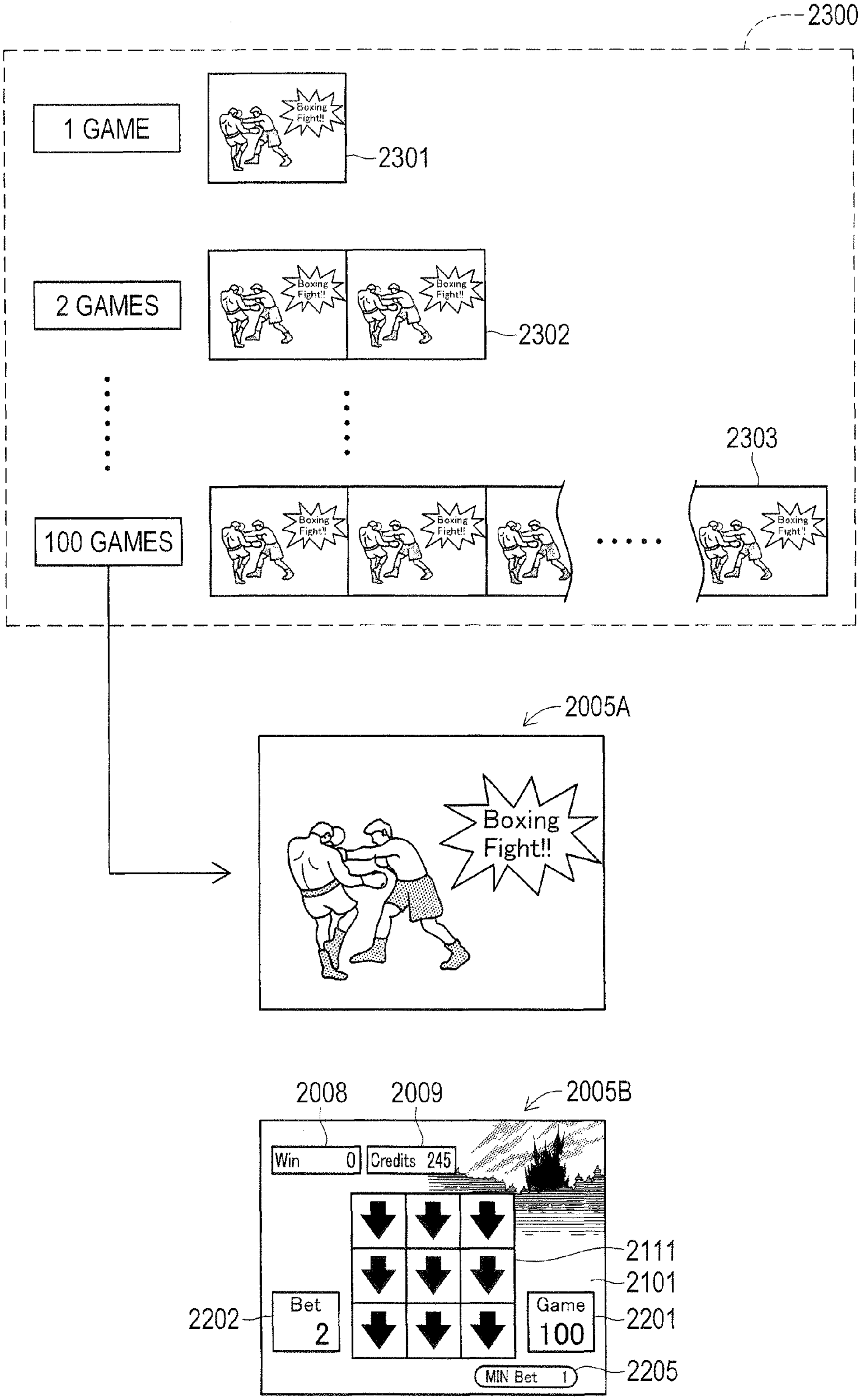
FIG. 14 is a view showing characteristics of a slot machine which is one second embodiment of the present invention.

In the slot game, as shown in FIG. 14, a symbol display frame 2111 displaying nine symbols is displayed on the well-known liquid crystal panel 2005B. The nine symbols are arranged in a matrix comprising three rows by three columns. In this respect, within the symbol display frame 2111, nine symbol display areas, where one of many symbols drawn on a reel band of one video reel is arranged, are positioned like a matrix comprising three rows by three columns. That is, one symbol display area is assigned to each of the nine video reels. Then, one of the symbols drawn on the reel band of each video reels is arranged in each of the symbol display areas.

Figure 19:
FIG. 19 is a payout table in which winning combinations and the payout amounts corresponding to the winning combinations are shown when a slot game is executed by using each of the reels.
Figure 19:
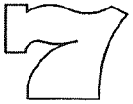
Figure 19:
Figure 19:
Figure 19:
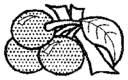
Figure 19:
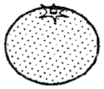
Figure 19:
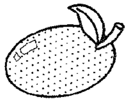

In the meantime, as shown in FIG. 19, various winning combinations are previously determined based on the number of the same scatter symbol. When each of the video reels is scrolled and stopped (refer to FIG. 20 and FIG. 21), a symbol is rearranged one by one in each of the symbol display areas of the symbol display frame 2111, as the liquid crystal panel 2005B shown in FIG. 14. At this time, when the nine symbols that are rearranged in the symbol display frame 2111 compose any one of the winning combinations, the payout amount corresponding to the winning combination composed is displayed in a payout amount display portion 2008. With this, a unit game is configured.

In the slot machine 2001 of the present embodiment, the player can indicate that a unit game will be executed continuously by a predetermined number of times such as "1", "5", "10" and the like. A group of unit games which the player indicated as a continuous play corresponds to a "continuous game". This indication is made by operating a plurality of buttons which are respectively provided in accordance with the number of times of the unit games constituting the "continuous game" (refer to FIG. 24).

The player can indicate the bet amount, such as "1", "5", "10" and the like, with respect to the "continuous game". This indication is made by operating a plurality of buttons which are respectively provided in accordance with the bet amount (refer to FIG. 24).

In this respect, in the slot machine 2001 of the present embodiment, once the player indicates the bet amount with respect to the "continuous game", one or a plurality of "continuous games" including unit games that are executed by the number of times which can be indicated by the player is specified through the bet amount with respect to the "continuous game" indicated by the player and the minimum bet amount with respect to a unit game which can be set by the player (in the present embodiment, the bet amount being "1"). Thereafter, the operation with respect to all buttons corresponding to the "continuous game" thus specified is validated.

The player operates any of the buttons thus validated, whereby the "continuous game", which is constituted of unit games executed by the number of times indicated by the player through the above-mentioned operation, is executed.

Figure 26:
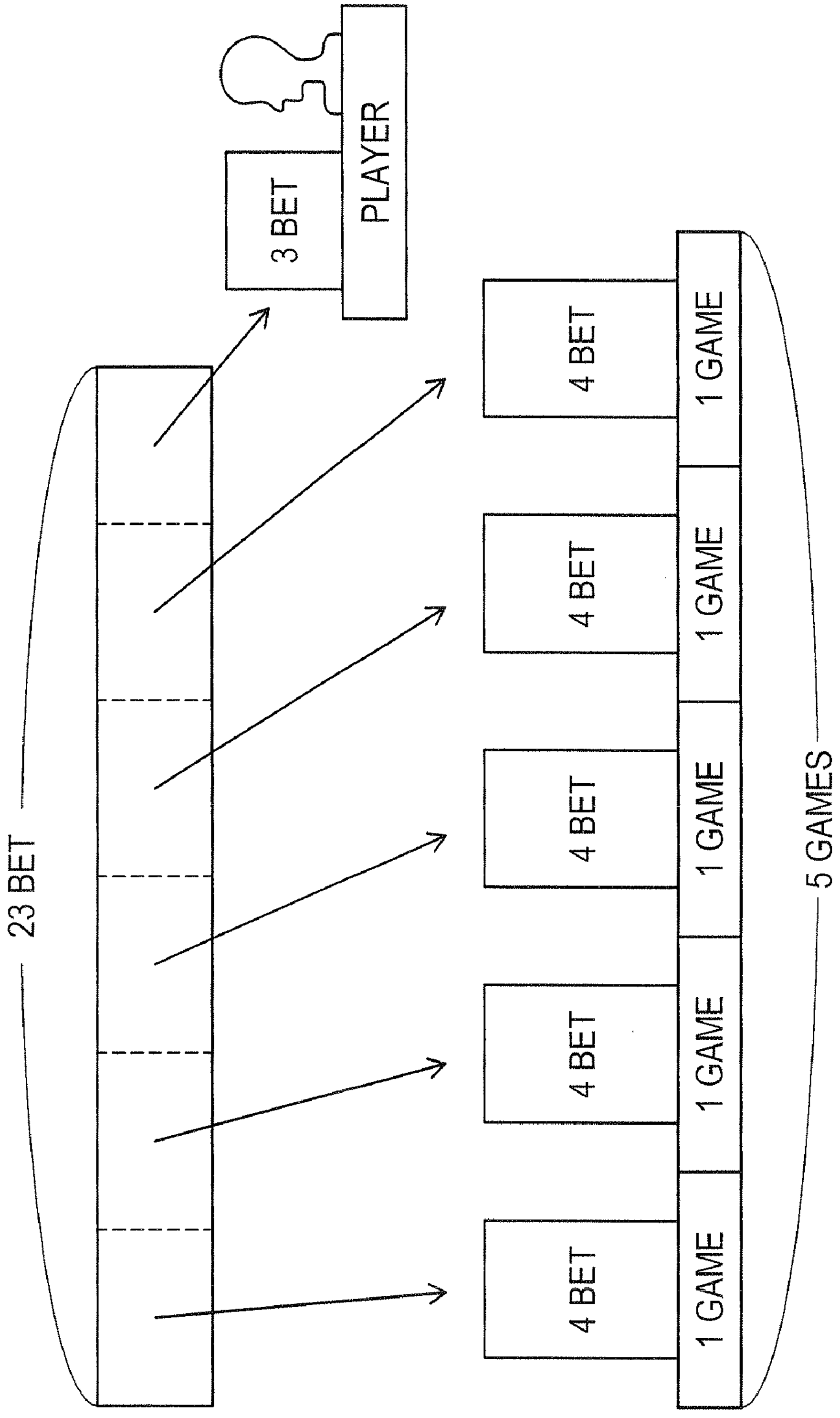
FIG. 26 is a view showing characteristics of the slot machine.

The bet amount with respect to the "continuous game" indicated by the player is evenly allocated to each unit game constituting the "continuous game" indicated by the player. More specifically, as shown in FIG. 26, for instance, the bet amount with respect to the "continuous game" indicated by the player is assumed to be "23", and the number of times for the unit games constituting the "continuous game" indicated by the player is assumed to be "5". In this case, the bet amount "4" is evenly allocated with respect to each unit game constituting the "continuous game" indicated by the player.

Incidentally, the bet amount which was left after the bet amount has been evenly allocated with respect to each unit game constituting the "continuous game" is returned to the player. In the case of FIG. 26, the bet amount "3" is returned to the player.

Thereafter, once the "continuous game" starts, each of the unit games constituting the "continuous game" is executed by auto-play.

Further, in the slot machine 2001 according to the present embodiment, as described above, the unit game is executed independently, or alternatively, each of the unit games constituting the "continuous game" instructed by a player is executed continuously. Furthermore, the slot machine 2001 has an image group 2300 as shown in FIG. 14. The image group 2300 is made up of a single image 2301 corresponding to a unit game, a continuous image 2302 corresponding to the case that the number of times of unit games constituting the "continuous game" is "2", . . . , and a continuous image 2303 corresponding to the case that the number of times of unit games constituting the "continuous game" is "100". Although not shown in FIG. 14, the respective continuous images corresponding to the cases that the number of times of unit games constituting the "continuous game" is "3" through "99" constitute the image group 2300.

Then, in a case where the unit game is executed independently on the liquid crystal panel 2005B, the single image 2301 whereby the story is concluded is continuously displayed on the liquid crystal display 2005A from the start of that unit game till the end of that unit game. Alternatively, in a case where each of the unit games constituting the "continuous game" instructed by a player is executed continuously, a continuous image is continuously displayed on the liquid crystal display 2005A from the start of the "continuous game" till the end of the "continuous game". This continuous image whereby the story is concluded is made up of a combination of a plurality of single images, the plurality of single images corresponding to the number of times of unit games constituting the "continuous game". For instance, as shown in FIG. 14, if 100 unit games constituting the "continuous game" instructed by a player are executed continuously, the continuous image 2303 is continuously displayed on the liquid crystal display 2005A from the start of the "continuous game" till the end of the "continuous game". This continuous image 2303 whereby the story is concluded is made up of a combination of 100 single images, the number of the single images corresponding to the number of times of unit games constituting the "continuous game".

2-2. Construction of the Slot Machine

The Second Embodiment

Hereinafter, the one embodiment embodying the present invention will be explained in detail with reference to the drawings.

Figure 15:
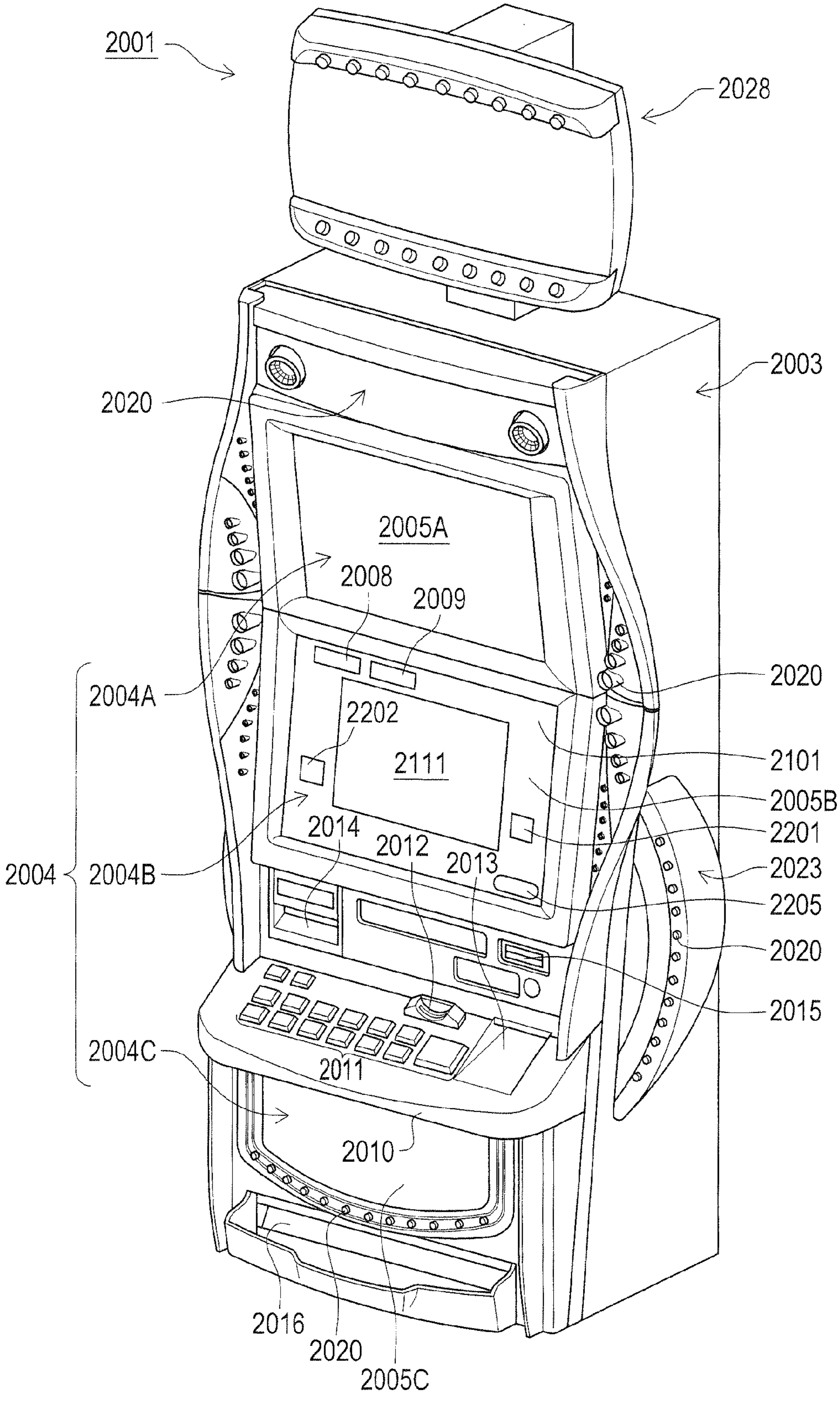
FIG. 15 is a perspective view of the slot machine.

First, an outline construction of the slot machine 2001 according to the present embodiment will be explained based on FIG. 15. FIG. 15 is a perspective view of the slot machine 2001 according to the present embodiment.

As shown in FIG. 15, the slot machine 2001 is an upright type slot machine arranged in a game arcade such as casino, in order to execute predetermined game modes, such slot machine includes a cabinet 2003 in which electronic and mechanical components are installed. For example, as a display portion 2004 to display information a concerning game, there are provided an upper display portion 2004A, a middle variable display portion 2004B and a lower display portion 2004C. Each display portion 2004A to 2004C is mounted at the front of the oblong cabinet 2003. The upper display portion 2004A includes a liquid crystal panel 2005A which is arranged above the middle variable display portion 2004B. On the liquid crystal panel 2005A, for example, an effect image, an introduction of a game content, and a rule explanation of a game are displayed. The lower display portion 2004C is arranged below the middle variable display portion 2004B, and includes a plastic panel 2005C on which images are printed, and a plastic panel 2005C is lightened by backlights.

The middle variable display portion 2004B, which is used to display an execution state of a game, includes the liquid crystal panel 2005B which is fixed at the front door of the cabinet 2003. In this liquid crystal panel 2005B, nine symbols of the video reels are displayed in a scrolling manner and in a stopped manner, respectively. In the middle variable display portion 2004B, the symbol display frame 2111 in which the nine symbol display areas associated with each video reel are positioned like a matrix of three rows times three columns is displayed on the liquid crystal panel 2005B. Further, a touch panel 2101 is provided on the front surface of the liquid crystal panel 2005B. A player can input each kind of commands by operating the touch panel 2101. On the upper position of the middle variable display portion 2004B, the payout amount display portion 2008 and a credit amount display portion 2009 are provided on the liquid crystal panel 2005B. Also the upper portion of the middle variable display portion 2004B, is related to the back side, thereby a player may play a game in a cozy posture.

In the middle variable display portion 2004B, a bet amount display portion 2202 is provided on the liquid crystal panel 2005B, at the right side of the symbol display frame 2111. Further, in the middle variable display portion 2004B, a game number display portion 2201 is provided on the liquid crystal panel 2005B, at the left side of the symbol display frame 2111. Furthermore, in the middle variable display portion 2004B, a minimum bet amount display area 2205 is provided on the liquid crystal panel 2005B, at the lower side of the game number display portion 2201.

Figure 20:
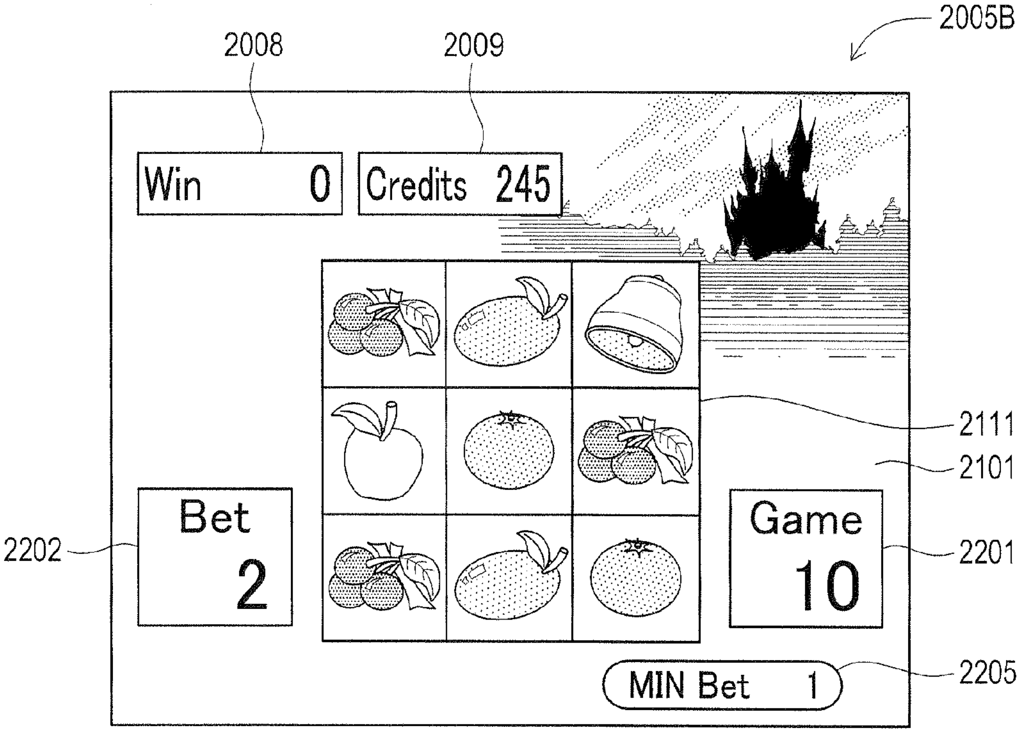
FIG. 20 is a view showing one of an image displayed on a liquid crystal panel.
Figure 21:
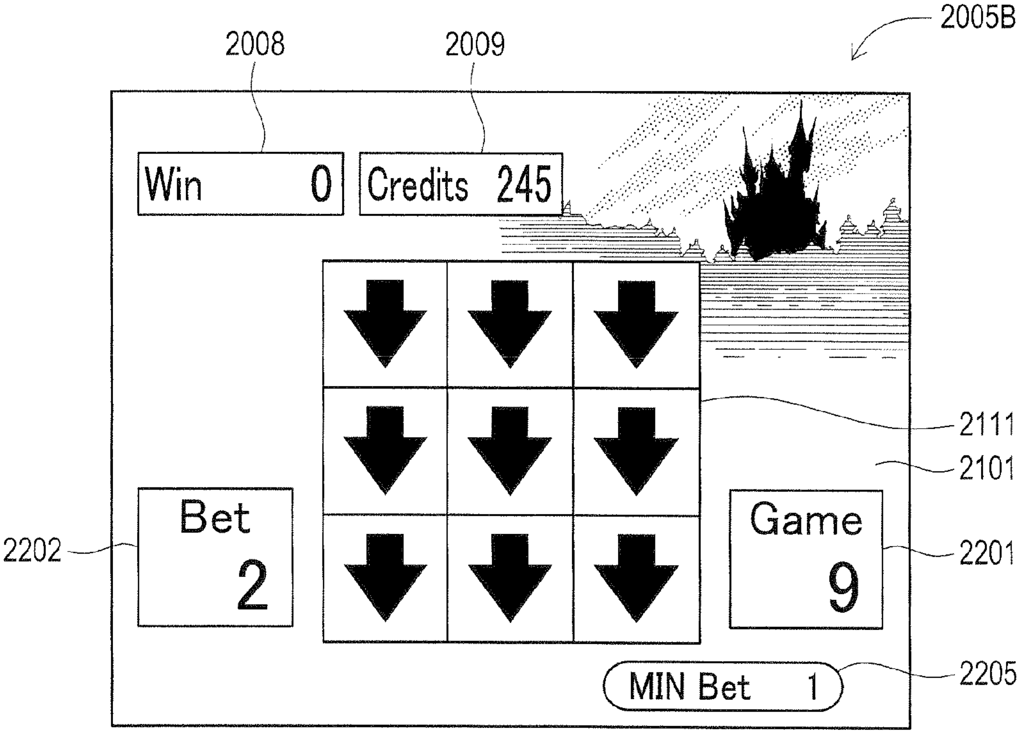
FIG. 21 is a view showing one of an image displayed on the liquid crystal panel.

Now, images of a slot game to be displayed on the liquid crystal panel 2005B are explained. FIG. 20 and FIG. 21 are drawings showing contents displayed on the liquid crystal panel 2005B, as one example of images of a slot game to be displayed on the liquid crystal panel 2005B. As shown in FIG. 20 and FIG. 21, on the liquid crystal panel 2005B in a slot game, the symbol drawn on the reel band of each video reel is displayed in the nine symbol display areas positioned like a matrix of three rows times three columns in the symbol display frame 2111, so that they can be viewed by a player. FIG. 20 shows a state in which the symbol drawn on the reel band of each video reel is arranged or rearranged in each symbol display area of the symbol display frame 2111 on the liquid crystal panel 2005B. FIG. 21 shows a state in which the symbol drawn on the reel band of each video reel is displayed by a scrolling manner in each symbol display area of the symbol display frame 2111 on the liquid crystal panel 2005B. Incidentally, on the reel band of each video reel, a symbol column constructed from twenty-two symbols is drawn respectively (refer to FIG. 16).

Further, the payout amount display portion 2008 and the credit amount display portion 2009 are provided on the liquid crystal panel 2005B. On the payout amount display portion 2008, the payout amount awarded in a slot game to a player is displayed. On the credit amount display portion 2009, the credit amount which is owned by a player at the moment is displayed.

Further, the liquid crystal panel 2005B contains the bet amount display portion 2202, the game number display portion 2201 and the minimum bet amount display area 2205. The bet amount display portion 2202 displays the bet amount for a unit game, as set by a player in a slot game. The game number display portion 2201 displays the remaining number of times for executing unit games that constitute the "continuous game" set by a player in a slot game. The minimum bet amount display area 2205 displays the minimum bet amount for each unit game that a player can set.

Therefore, on the liquid crystal panel 2005B in a slot game, one symbol which is drawn on the reel band of each video reel is arranged in each of the nine symbol display areas of the symbol display frame 2111.

Returning to FIG. 15, between the middle variable display portion 2004B and the lower display portion 2004C, at the front of the cabinet 2003, an operation table 2010 which is projected forward is provided. On the operation table 2010, a variety of operation buttons 2011 including a BET button, a COLLECT button, a SPIN button, a CASHOUT button and the like are arranged as an operation portion to execute a game.

Figure 24:
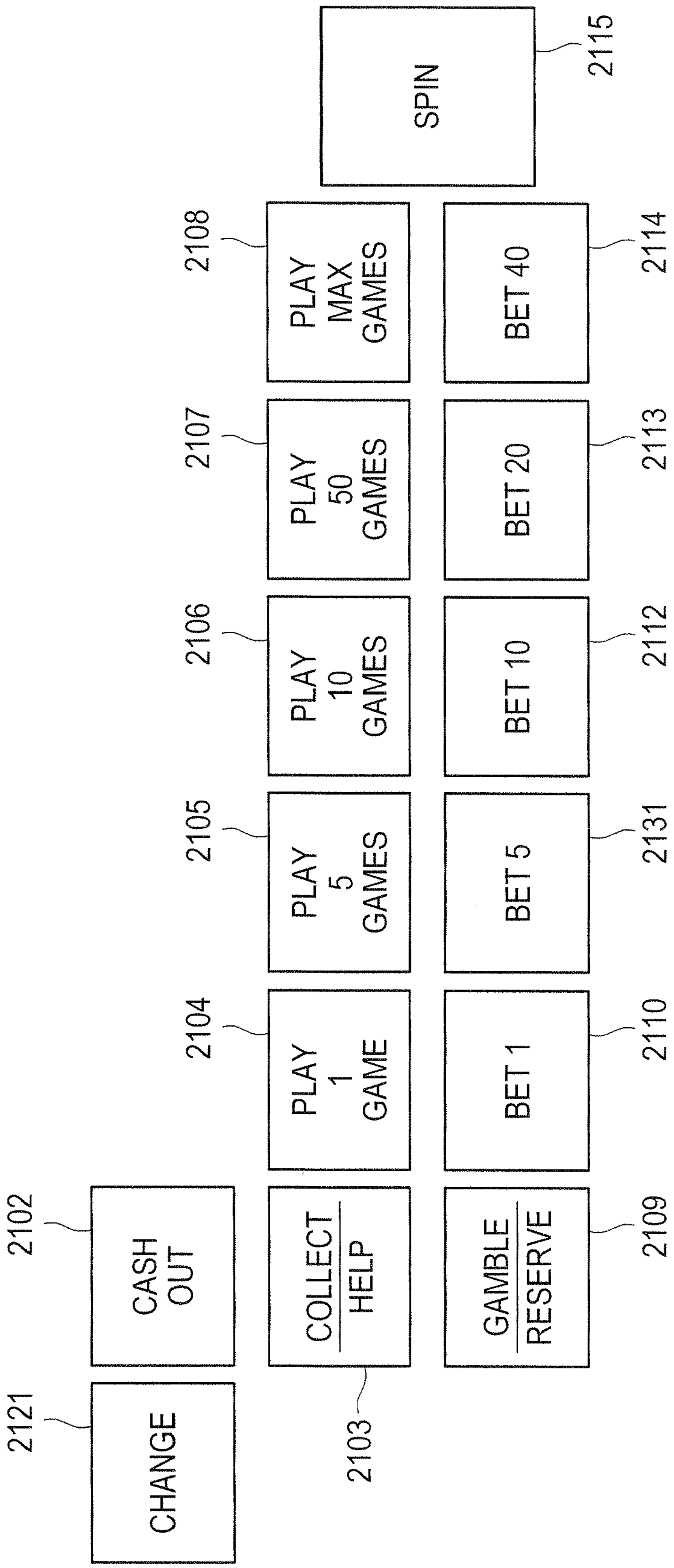
FIG. 24 is a front view showing a variety of operation buttons.

Here, the variety of operation buttons 2011 will now be described. FIG. 24 is a front view showing the variety of operation buttons 2011. As shown in FIG. 24, at an upper stage are provided a CHANGE button 2121, a CASHOUT button 2102 starting from the leftmost side. At a middle stage are provided a COLLECT/HELP button 2103, a PLAY 1 GAME button 2104, a PLAY 5 GAMES button 2105, a PLAY 10 GAMES button 2106, a PLAY 50 GAMES button 2107 and a PLAY MAX GAMES button 2108 starting from the leftmost side. At a lower stage are provided a GAMBLE/RESERVE button 2109, a BET 1 button 2110, a BET 5 button 2131, a BET 10 button 2112, a BET 20 button 2113 and a BET 40 button 2114, starting from the leftmost side. At the rightmost side is provided a SPIN button 2115.

In this respect, the CHANGE button 2121 is an operation device which is used to change bills inserted in a bill insertion slot 2013 (refer to FIG. 15). Coins which have been changed are paid out to a coin tray 2016 (refer to FIG. 15) provided at the lower side of the cabinet 2203 (refer to FIG. 15).

The CASHOUT button 2102 is an operation device which is used to input a command to pay out coins in accordance with the credit amount which a player owns at the moment to the coin tray 2016 (refer to FIG. 15) or a command to pay out such coins by means of bar code-attached tickets which are printed in a ticket printer 2014 (refer to FIG. 15).

The COLLECT/HELP button 2103 is an operation device which is used when completing a double-down game which is executed using the payout amount acquired by a player, or when the game operation method and the like is unclear. Incidentally, if the COLLECT/HELP button 2103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 2104 is an input device for inputting, based on being operated, a command to execute one unit game. The PLAY 5 GAMES button 2105 is an input device for inputting, based on being operated, a command to execute five continuous unit games constituting the "continuous game". The PLAY 10 GAMES button 2106 is an input device for inputting, based on being operated, a command to execute ten continuous unit games constituting the "continuous game". The PLAY 50 GAMES button 2107 is an input device for inputting, based on being operated, a command to execute fifty continuous unit games constituting the "continuous game".

The PLAY MAX GAMES button 2108 is an input device for inputting, based on being operated, a command to execute a maximum number of continuous unit games constituting the "continuous game". Here, the maximum number of times for executing the unit game is computed by dividing the credit amount owned by a player at the moment by the minimum bet amount with respect to each unit game which can be set by the player.

Incidentally, the operation with respect to the PLAY 1 GAME button 2104, PLAY 5 GAMES button 2105, PLAY 10 GAMES button 2106, PLAY 50 GAMES button 2107 and PLAY MAX game button 2108 is not accepted during normal operation.

The GAMBLE/RESERVE button 2109 is an operation device which is used by a player when he/she shifts a slot game to a double-down game, or when he/she steps away from the slot machine.

The BET 1 button 2110 is an input device for inputting, based on being operated, a command to set the bet amount corresponding to "1" with respect to a unit game or the "continuous game". The BET 5 button 2131 is an input device for inputting, based on being operated, a command to set the bet amount corresponding to "15" with respect to a unit game or the "continuous game". The BET 10 button 2112 is an input device for inputting, based on being operated, a command to set the bet amount corresponding to "10" with respect to a unit game or the "continuous game". The BET 20 button 2113 is an input device for inputting, based on being operated, a command to set the bet amount corresponding to "20" with respect to a unit game or the "continuous game". The BET 40 button 2114 is an input device for inputting, based on being operated, a command to set the bet amount corresponding to "40" with respect to a unit game or the "continuous game".

The SPIN button 2115 is an input device for inputting, based on being operated, a command to display each video reel by a scrolling manner.

Returning to FIG. 15, at the operation table 2010, a coin insertion slot 2012 and the bill insertion slot 2013 are provided. Between the operation table 2010 and the middle variable display portion 2004B, the ticket printer 2014 and a card reader 2015 are provided. At the lowest position of the cabinet 2003, the coin tray 2016 is also provided.

Incidentally, in the slot machine 2001 of the present embodiment, gaming medium may be coin, bill, or electronic value (credit). Here, the gaming medium may be others as well, such as medal, token, electronic money, or ticket.

Further, on the cabinet 2003 of the slot machine 2001, light emitting portions 2020 are arranged around a game area including the upper display portion 2004A, the middle variable display portion 2004B, the lower display portion 2004C and the operation table 2010.

Furthermore, the slot machine 2001 also includes a topper effect device 2028 which is installed on the cabinet 2003. The topper effect device 2028 is shaped in a rectangular board shaped, and is provided almost parallel to the liquid crystal panel 2005A of the upper display portion 2004A. The cabinet 2003 is further provided with speakers 2023 on its both sides.

2-3. Outline of Symbols

The Second Embodiment

Next, the symbols drawn on the reel band of each video reel will be explained based on FIG. 16. These symbols are scrolled and rearranged in the respective symbol display areas of the symbol display frame 2111 on the liquid crystal panel 2005B in a slot game. FIG. 16 is a schematic view showing symbol columns drawn on the reel band of each video reel.

On the reel band of each video reel, twenty-two symbols are arranged respectively. Each symbol column of video reel is constructed from the symbols including "FRANKENSTEIN", "BLUE7", "BELL", "APPLE", "CHERRY", "PLUM" and "ORANGE". And the symbols of predetermined types are arranged in a predetermined sequence.

In this respect, each of the symbols including "FRANKENSTEIN", "BLUE 7", "BELL", "APPLE", "CHERRY", "PLUM" and "ORANGE" are scatter symbols. If three or four or more scatter symbols are rearranged in the symbol display frame 2111 of the liquid crystal panel 2005B, the payout amount set in advance is awarded to a player (refer to FIG. 19).

Incidentally, to each symbol composing the symbol column of each video reel shown in FIG. 16, a code number is allocated from top to down in sequence.

2-4. Internal Construction of the Slot Machine

The Second Embodiment

Next, an internal construction of the above-mentioned slot machine 2001 will be explained with reference to FIG. 17 and FIG. 18.

Figure 17:
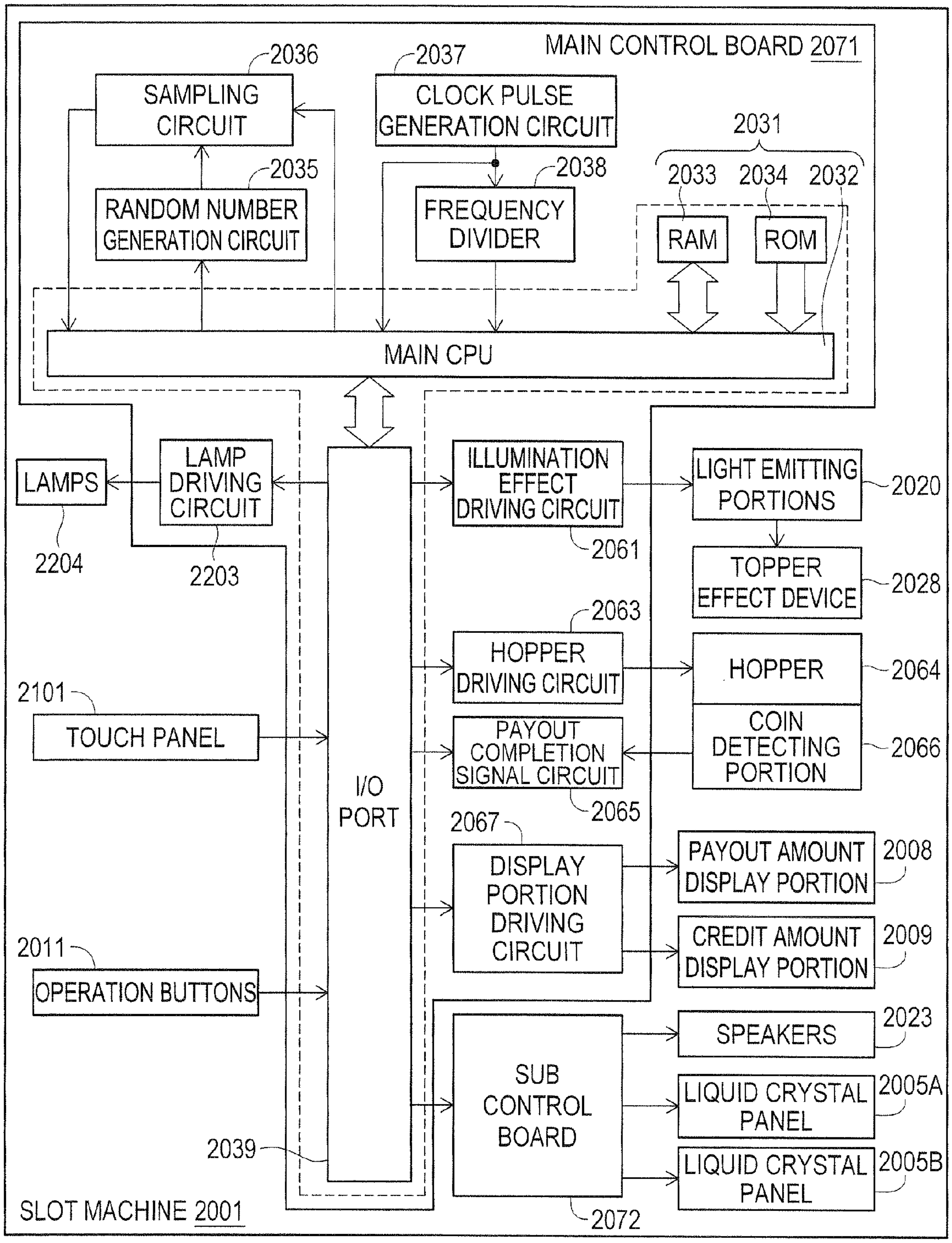
FIG. 17 is a block diagram showing an internal construction of entire slot machine.

FIG. 17 is a block diagram showing an internal construction of entire slot machine 2001. As shown in FIG. 17, the slot machine 2001 includes a plurality of construction elements such as a main control board 2071, in which a microcomputer 2031 is included. The main control board 2071 is constructed from the microcomputer 2031, a random number generation circuit 2035, a sampling circuit 2036, a clock pulse generation circuit 2037 and a frequency divider 2038. The main control board 2071 also includes an illumination effect driving circuit 2061, a hopper driving circuit 2063, a payout completion signal circuit 2065, a display portion driving circuit 2067 and a lamp driving circuit 2203.

The microcomputer 2031 is constructed from a main CPU 2032, a RAM 2033 and a ROM 2034. The main CPU 2032 runs based on programs stored in the ROM 2034, and inputs/ outputs a signal with other elements through an I/O port 2039, so as to execute control of the entire slot machine 2001. Data and programs used when the main CPU 2032 runs are stored in the RAM 2033. For example, after-mentioned random numbers which are sampled by the sampling circuit 2036 are stored temporarily after a start of a game, also the code numbers of the respective video reels and the symbol numbers are stored in the RAM 2033. Further, the RAM 2033 sets in advance a storage area where an after-mentioned variable N is stored. Programs executed by the main CPU 2032 and permanent data are stored in the ROM 2034.

Especially, the programs stored in the ROM 2034 include game programs and game system programs (abbreviated as "the game programs and the like" hereinafter). Further, a lottery programs mentioned below is also included in the game programs.

The lottery program is a program used to determine the code numbers of the respective video reels which corresponds to each symbol rearranged in the respective symbol display areas of the symbol display frame 2111 on the liquid crystal panel 2005B. Then, in the lottery program, it is included symbol weighing data corresponding to each of plural kinds of payout rates (for example, 80%, 84%, and 88%). The symbol weighing data are the data indicating correlation between the code number of each video reel and one or plural random numbers belonging to a predetermined number range (0 to 255), every each of the nine video reels. In other words, each of the code number of one video reel is associated with one or more random numbers corresponding to the payout rate. The random numbers are extracted by the lottery program, and symbols specified finally by the random numbers are rearranged in the respective symbol display areas of the symbol display frame 2111 on the liquid crystal panel 2005B.

Random numbers over a predetermined range are generated by the random number generation circuit 2035, which is operated based on instructions from the main CPU 2032. The random numbers are voluntarily extracted from the random numbers generated by the random number generation circuit 2035 by the sampling circuit 2036, based on instructions from the main CPU 2032, and the extracted random numbers are input to the main CPU 2032. The base clock for running the main CPU 2032 is generated by the clock pulse generation circuit 2037, and signals which are generated by dividing the base clock in a predetermined frequency are input to the main CPU 2032 by the frequency divider 2038.

And to the main control board 2071, the touch panel 2101 is connected. The touch panel 2101 is arranged in front of the liquid crystal panel 2005B, and specifies the coordinate position of the portion touched by a player. The position on which a player touched and the direction of the movement of the touched portion are determined based on the specified coordinate position information. A signal corresponding to the determination is input to the main CPU 2032 through the I/O port 2039.

Also, the operation buttons 2011 for instructing an execution of a game are connected to the main control board 2071. The operation buttons 2011 include the variety of buttons (refer to FIG. 24). A signal corresponding to the depressing of these buttons is input to the main CPU 2032 through the I/O port 2039.

An effect signal which is used to conduct illumination effect is output to the above-mentioned light emitting portions 2020 and the topper effect device 2028 by the illumination effect driving circuit 2061. Then, the topper effect device 2028 is serially connected to the illumination effect driving circuit 2061 through the light emitting portions 2020.

A hopper 2064 is driven by the hopper driving circuit 2063 based on control of main CPU 2032. The hopper 2064 executes payout of coins, and coins are paid out from the coin tray 2016. Data of the number of coins are input from the connected coin detecting portion 2066 by the payout completion signal circuit 2065. When the number of coins becomes a predetermined number, a signal indicating completion of the coins is input to the main CPU 2032. The number of the coins paid out from the hopper 2064 is calculated by the coin detecting portion 2066, and the data of the number calculated are input to the payout completion signal circuit 2065. The each display operation of the payout amount display portion 2008 and credit amount display portion 2009 is controlled by the display portion driving circuit 2067.

The lamp driving circuit 2203 turns lamps 2204 on/off based on control of main CPU 2032. The lamps 2204 are provided inside the operation buttons 2011. The lamp 2204 inside the button with respect to which a player's operation is validated lights up, notifying the player of the button with respect to which operation is validated.

Furthermore, a sub control board 2072 is connected to the main control board 2071. The sub control board 2072 is connected to the liquid crystal panel 2005A, the liquid crystal panel 2005B and the speakers 2023.

Figure 18:
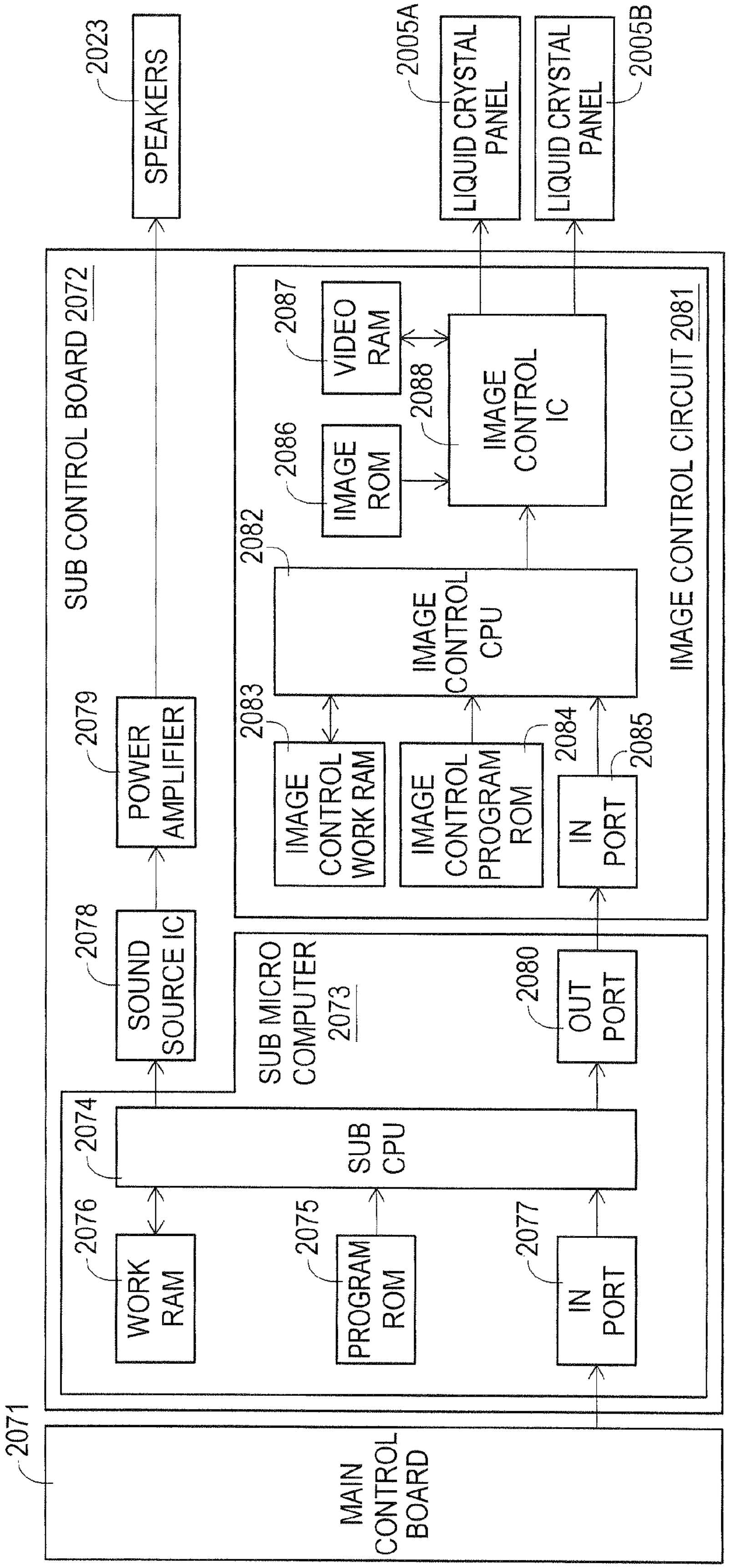
FIG. 18 is a block diagram showing an internal construction of a sub control board.

FIG. 18 is a block diagram showing an internal construction of the sub control board 2072. As shown in FIG. 18, a command from the main control board 2071 is input to the sub control board 2072. The display control on the liquid crystal panel 2005A of the upper display portion 2004A and the liquid crystal panel 2005B of the variable display portion 2004B, and the sound output control on the speakers 2023 are executed by the sub control board 2072. The sub control board 2072 is constructed on a circuit board different from the circuit board for the main control board 2071, and includes a microcomputer 2073 (abbreviated as "sub microcomputer" hereinafter) as a main construction element, and a sound source IC 2078, a power amplifier 2079 and an image control circuit 2081. The sound source IC 2078 controls the sound output from the speakers 2023, the power amplifier 2079 is used as an amplification device, and the image control circuit 2081 runs as a display control device of the liquid crystal panel 2005A and 2005B.

The sub microcomputer 2073 includes a sub CPU 2074, a program ROM 2075, a work RAM 2076, an IN port 2077 and an OUT port 2080. The control operations are executed by the sub CPU 2074 based on a control order sent from the main control board 2071, the program ROM 2075 is used as a memory device. Although a clock pulse generation circuit, a frequency divider, a random number generation circuit and a sampling circuit are not included in the sub control board 2072, the sub control board 2072 is constructed so as to execute random number sampling according to operation programs thereof. Control programs executed by the sub CPU 2074 are stored in the program ROM 2075. The work RAM 2076 is constructed as a temporary storing device when the above-mentioned control programs are executed by the sub CPU 2074.

The image control circuit 2081 includes an image control CPU 2082, an image control work RAM 2083, an image control program ROM 2084, an IN port 2085, an image ROM 2086, a video RAM 2087 and an image control IC 2088. Images displayed on the liquid crystal panel 2005A and 2005B are determined by the image control CPU 2082, based on parameters set by the sub microcomputer 2073, according to image control programs stored in the image control program ROM 2084.

The image control programs regarding to a display of the liquid crystal panel 2005A, 2005B and a variety of selection tables are stored in the image control program ROM 2084. The image control work RAM 2083 is constructed as a temporary storing device when the image control programs are executed by the image control CPU 2082. Images corresponding to contents determined by the image control CPU 2082 are formed by the image control IC 2088, and are output to the liquid crystal panel 2005A, 2005B.

In the image ROM 2086, dot data used to form images are stored. Thus, it stores the dot data on symbols drawn on the reel band of the each video reel. The video RAM 2087 runs as a temporary storing device when the images are formed by the image control IC 2088.

Further, based on a control signal from the main CPU 2032, the image control circuit 2081 performs display control of scrolling display/stop display of the video reels in the respective symbol display areas of the symbol display frame 2111 on the liquid crystal panel 2005B.

2-5. Outline of a Slot Game

The Second Embodiment

Next, winning combinations and the payout amounts corresponding to the winning combinations will be explained based on FIG. 19, wherein the winning combinations are symbol combinations when a slot game is executed by using each of the video reels in the slot machine 2001 according to the present embodiment. FIG. 19 is a payout table in which the winning combinations and the payout amounts corresponding to the winning combinations are shown when a slot game is executed by using each of the video reels.

Here, the payout amount shown in FIG. 19 indicates the payout amount when the bet amount is "1". Therefore, when the bet amount is "1", the payout amount shown in FIG. 19 is paid out, and when the bet amount is more than "2", the payout amount obtained by multiplying the payout amount shown in FIG. 19 with the bet amount is paid out.

Accordingly, if the nine scatter symbols of "FRANKENSTEIN" are rearranged in the symbol display frame 2111 of the liquid crystal panel 2005B, the amount obtained by multiplying the bet amount with 500 credits will be paid out. If the eight scatter symbols of "FRANKENSTEIN" are rearranged in the symbol display frame 2111 of the liquid crystal panel 2005B, the amount obtained by multiplying the bet amount with 300 credits will be paid out. Hereinafter, the payout amounts are set in a similar manner, as shown in FIG. 19, in accordance with the number of "FRANKENSTEIN" scatter symbols which have been rearranged in the symbol display frame 2111 of the liquid crystal panel 2005B.

With respect to each of the other scatter symbols including "BLUE 7", "BELL", "APPLE", "CHERRY", "ORANGE" and "PLUM", as well, the payout amounts as shown in FIG. 19 are set in a similar manner in accordance with the number of the same scatter symbols which have been rearranged in the symbol display frame 2111 of the liquid crystal panel 2005B.

As mentioned above, in the slot machine 2001 according to the present embodiment, a slot game is executed.

In other words, in a slot game, the slot game is executed by rearranging the plurality of same symbols specified by nine video reels in the symbol display frame 2111 of the liquid crystal panel 2005B. In the slot game, firstly, a part of symbol column (one symbol) drawn on the reel band of each video reel shown in FIG. 16, is arranged in each symbol display area of the symbol display frame 2111 on the liquid crystal panel 2005B (refer to FIG. 20). Here, after a player sets the bet amount by depressing the BET button among the operation buttons 2011, if the player depresses the SPIN button 2115 among the operation buttons 2011, each of the video reels rotates, the symbol column drawn on the reel band of each video reel shown in FIG. 16, is scrolled from up to down in the symbol display frame 2111 of the liquid crystal panel 2005B (refer to FIG. 21).

After a predetermined time, each of the video reels stops automatically, a part of symbol column (one symbol) drawn on the reel band of each video reel shown in FIG. 16, is rearranged in each symbol display area of the symbol display frame 2111 on the liquid crystal panel 2005B (refer to FIG. 20). On the other hand, each winning combination based on each the number of the scatter symbol is determined beforehand (refer to FIG. 19). When a symbol combination constructed from the nine symbols rearranged in the symbol display frame 2111 of the liquid crystal panel 2005B, realizes a winning combination specified by the number of the same scatter symbol, the payout amount obtained by multiplying the bet amount with the payout amount corresponding to the realized winning combination is awarded to the player.

2-6. Operation of the Slot Machine

The Second Embodiment

Figure 22:
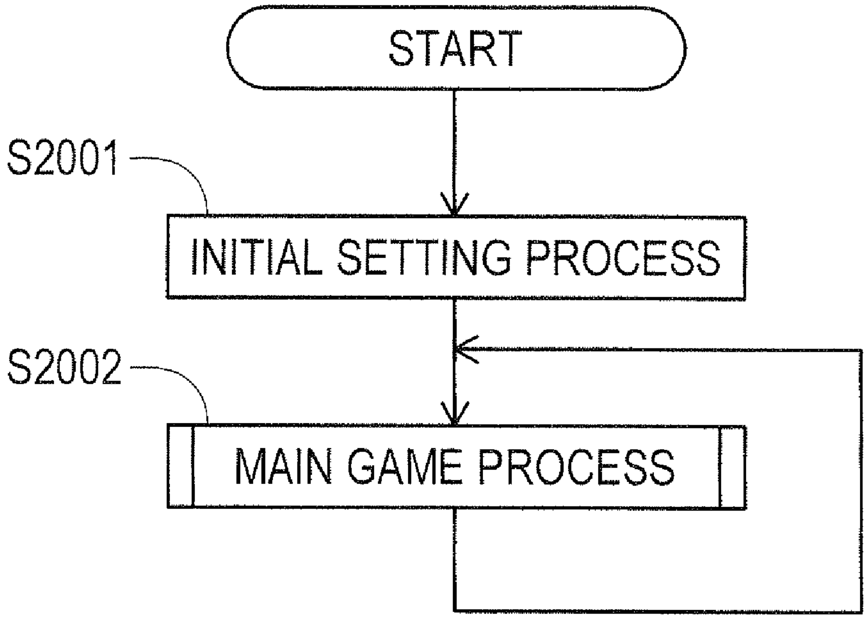
FIG. 22 is a flowchart of a main control program.

Next, a main control program executed in the slot machine 2001 according to the present embodiment will be explained with reference to drawings. FIG. 22 is a flowchart of the main control program.

First, when a power switch is pressed (power activation), the microcomputer 2031 is started to operate, an initial setting process is executed by the microcomputer 2031 in step (abbreviated as "S") 2001. In the initialization process, BIOS stored in the ROM 34 is executed by the main CPU 2032. Compressed data included in the BIOS are expanded to the RAM 2033, and when the BIOS expansion to the RAM 2033 is executed, a diagnosing process and initialization process of various peripheral devices are executed. Also, the game programs and the like are written from the ROM 2034 to the RAM 2033 by the main CPU 2032, so as to obtain the payout rate setting data and country ID information. Also, during execution of the initial setting process, a verification process to each program is executed.

Then in S2002, the main CPU 2032 reads out the game programs and the like from the RAM 2033, and executes the programs in sequence so as to conduct the main game process. A game is executed in the slot machine 2001 according to the present embodiment by executing the main game process. Then, the main game process is repeated when the power is supplied to the slot machine 2001.

Figure 23:
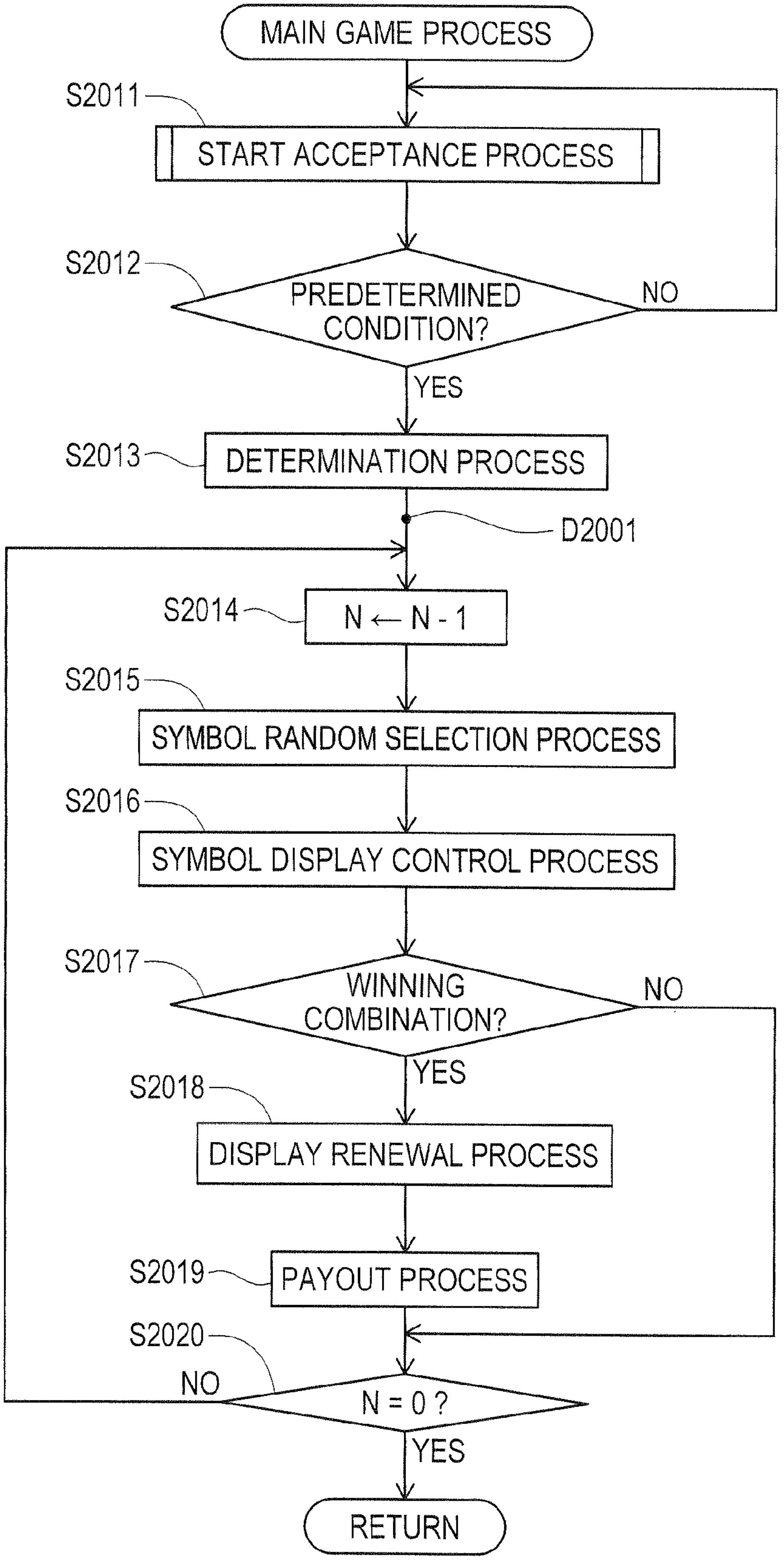
FIG. 23 is a flowchart of a main game process program.

Next, a sub process of the main game process in S2002 above will be explained based on FIG. 23. FIG. 23 is a flowchart of the main game process program in the slot machine 2001 according to the present embodiment. Incidentally, each program shown in the flowchart of FIG. 23 is stored in the ROM 2034 or the RAM 2033 of the slot machine 2001, and is executed by the main CPU 2032.

Figure 25:
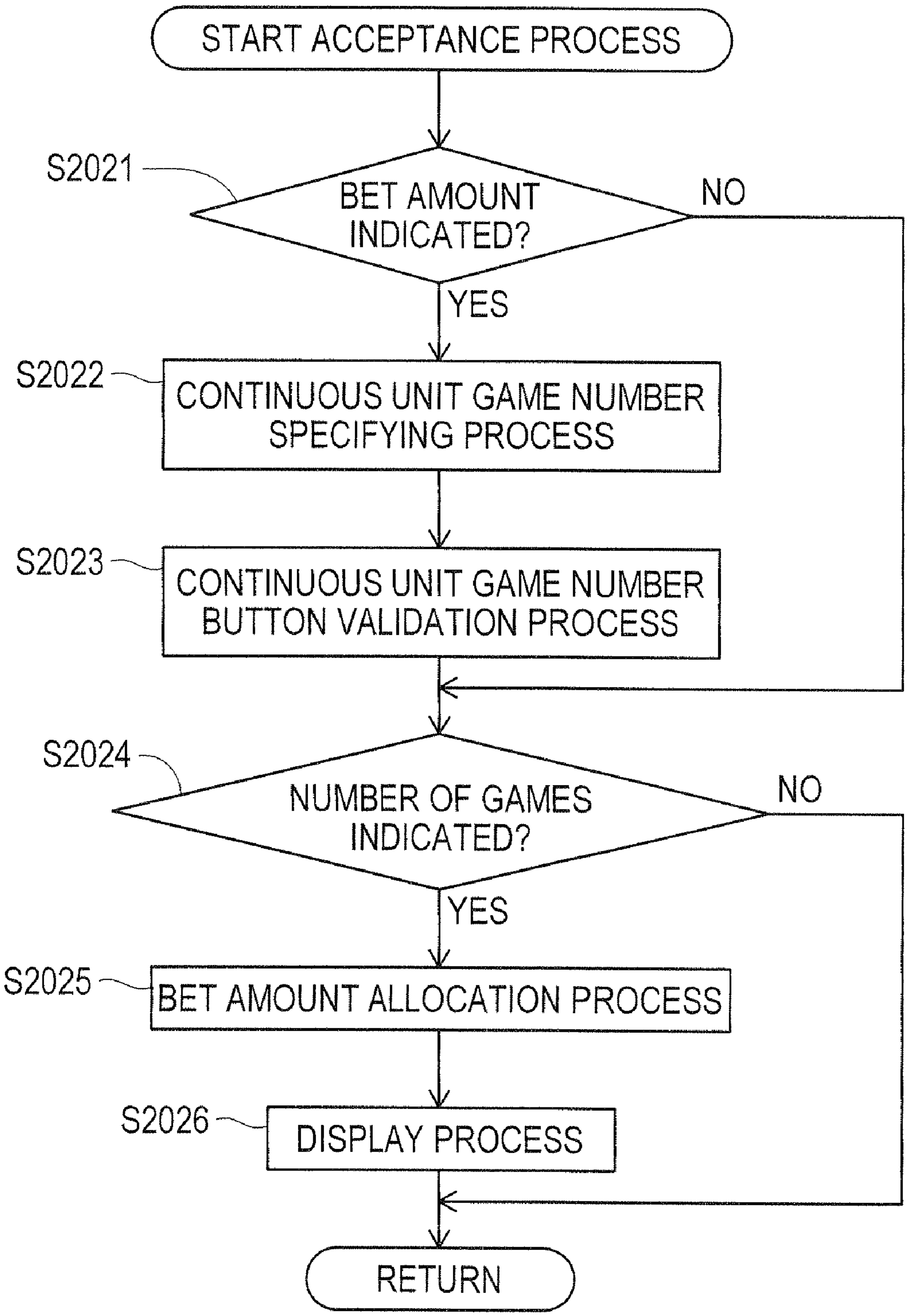
FIG. 25 is a flowchart of a start acceptance process program.

First, as shown in FIG. 23, in S2011, a start acceptance process is executed by the main CPU 2032. Then, a sub process of the start acceptance process in S2011 above will be explained based on FIG. 25. FIG. 25 is a flowchart of the start acceptance process program in the slot machine 2001 according to the present embodiment. Incidentally, each program shown in the flowchart of FIG. 25 is stored in the ROM 2034 or the RAM 2033 of the slot machine 2001, and is executed by the main CPU 2032.

In the start acceptance process in S2011 above, the main CPU 2032 determines, in S2021, whether or not the bet amount has been indicated, as shown in FIG. 25. Here, in a case of an input signal from any of the BET 1 button 2110, BET 5 button 2131, BET 10 button 2112, BET 20 button 2113 and BET 40 button 2114, it is determined that the bet amount has been indicated. However, if the indicated amount exceeds the bet amount corresponding to the credit amount owned by a player at the moment, it is determined that no bet amount has been indicated. At this point, if no bet amount has been indicated (S2021: NO), the process proceeds to S2024 described below. In contrast, if the bet amount has been indicated (S2021: YES), the process proceeds to S2022.

In S2022, the main CPU 2032 executes a continuous unit game number specifying process. In this process, the main CPU 2032 specifies one or a plurality of "continuous games" including a number of unit games which can be indicated by a player, through the bet amount indicated in S2021 above and the minimum bet amount (in the present embodiment, the bet amount being "1") with respect to a unit game which can be set by a player.

In S2023, the main CPU 2032 executes a continuous unit game number button validation process. In this process, the main CPU 2032 accepts the player's operating the button related to the "continuous game" specified in S2022 above, with respect to the PLAY 1 GAME button 2104, PLAY 5 GAMES button 2105, PLAY 10 GAMES button 2106, PLAY 50 GAMES button 2107 and PLAY MAX GAMES button 2108.

Incidentally, in a case of a rate of 1 credit for 1 bet, as long as the credit amount owned by a player at the moment is not "0", the player's operation with respect to the PLAY MAX GAMES button 2108 is accepted.

Further, the main CPU 2032 turns on the lamp 2204 provided inside the button related to the "continuous game" specified in S2022 above, by sending a control signal to the lamp driving circuit 2203. As a result, a player is notified that the operation of that button is valid.

In S2024, the main CPU 2032 determines whether or not the number of games has been indicated. Here, with respect to the PLAY 1 GAME button 2104, PLAY 5 GAMES button 2105, PLAY 10 GAMES button 2106, PLAY 50 GAMES button 2107 and PLAY MAX GAMES button 2108, if an input signal is sent from any of the buttons which have been validated in S2023 above, it is determined that the number of games has been indicated. At this point, if the number of games has not been indicated (S2024: NO), the process proceeds to above S2012 shown in FIG. 23. In contrast, if the number of games has been indicated (S2024: YES), the process proceeds to S2025.

Incidentally, the main CPU 2032 assigns the number of games indicated in S2024 above to the variable N. The main CPU 2032 displays the variable N stored in the RAM 2033 on the game number display portion 2201 of the liquid crystal panel 2005B by sending a control signal to the sub control board 2072.

In S2025, the main CPU 2032 executes a bet amount allocation process. In this process, the main CPU 2032 allocates the bet amount indicated in S2021 above in an equal manner to each unit game corresponding to the number of games indicated in S2024 above (refer to FIG. 26 above). As a result of this equal allocation, if a surplus occurs with respect to the bet amount indicated in S2021 above, the main CPU 2032 stores the surplus of the bet amount in the RAM 2033, as surplus information.

The main CPU 2032 stores the bet amount thus allocated in the RAM 2033, as bet allocation information. Then, the main CPU 2032 displays the bet allocation information (the bet amount which is evenly allocated to each unit game) which is stored in the RAM 2033 on the bet amount display portion 2202 of the liquid crystal panel 2005B, by sending a control signal to the sub control board 2072. Then, the process proceeds to above S2012 shown in FIG. 23.

Returning to FIG. 24, in S2012, the main CPU 2032 determines whether or not a predetermined condition is met.

Here, the predetermined condition is that the SPIN button 2115 is depressed. Accordingly, this determination is made based on a signal which is input to the main CPU 2032 depending on depressing the SPIN button 2115. At this point, if the SPIN button 2115 is not depressed (S2012: NO), the process returns to the start acceptance process (S2011) again. Thereby, an operation of changing the bet amount, an operation of changing the number of games and the like are possible. In contrast, if the SPIN button 2115 is depressed (S2012: YES), the process proceeds to S2013.

In S2013, the main CPU 2032 executes a determination process. In this process, the bet amount set based on the above bet operation is reduced from the credit amount owned by the player at the moment. Incidentally, the credit amount after the reduction is stored in the RAM 2033 as credit information. Then, by sending a control signal to the display portion driving circuit 2067, the main CPU 2032 displays the credit information (the credit amount after the above reduction) stored in the RAM 2033 on the credit amount display portion 2009 of the liquid crystal panel 2005B.

The main CPU 2032 includes the surplus information (the surplus of the bet amount which occurred in the allocation process of S2025) stored in the RAM 2033 to the credit information stored in the RAM 2033, at a rate of 1 credit for 1 bet. Then, by sending a control signal to the display portion driving circuit 2067, the main CPU 2032 displays the credit information (the credit amount after the above addition) stored in the RAM 2033 on the credit amount display portion 2009 of the liquid crystal panel 2005B. Further, the main CPU 2032 overwrites "0" in the RAM 2033, as the surplus information.

Further, the main CPU 2032 invalidates the operation with respect to all buttons including the PLAY 1 GAME button 2104, PLAY 5 GAMES button 2105, PLAY 10 GAMES button 2106, PLAY 50 GAMES button 2107 and PLAY MAX GAMES button 2108. Simultaneously, by sending a control signal to the lamp driving circuit 2203, the main CPU 2032 turns off the lamp 2204 provided inside each of the buttons 2104 to 2108.

In S2014, the main CPU 2032 decrements the variable N. Then, by sending a control signal to the sub control board 2072, the main CPU 2032 displays the variable N stored in the RAM 2033 on the game number display portion 2201 of the liquid crystal panel 2005B.

In S2015, the main CPU 2032 executes a symbol random selection process. Specifically, when the lottery program included in the game programs is executed by the main CPU 2032, the random number corresponding to each video reel respectively is selected from a range of "0 to 255". Then, with reference to the symbol weighting data corresponding to the payout rate setting data, based on the nine random numbers, the code number of each video reel is determined by the main CPU 2032. The main CPU 2032 stores the determined code number of each video reel in the RAM 2033 by overwriting code number information in the RAM 2033 with the determined code number of each video reel so as to correspond to each symbol display area of the symbol display frame 2111 on the liquid crystal panel 2005B. Thereafter, the process proceeds to S2016.

Here, the code number of each video reel is associated with the symbol number to be rearranged in each symbol display area of the symbol display frame 2111 on the liquid crystal panel 2005B, so each symbol to be rearranged in such game is determined by overwriting the code number information in the RAM 2033 with the code number of each video reel determined by the main CPU 2032 so as to correspond to each symbol display area of the symbol display frame 2111 on the liquid crystal panel 2005B. For example, if the main CPU 2032 determines that all of the code number of each video reel are "21" and then overwrites the code number information in the RAM 2033 with the code number of each video reel so as to correspond to each symbol display area of the symbol display frame 2111 on the liquid crystal panel 2005B, the main CPU 2032 determines to rearrange the nine symbols of "FRANKENSTEIN" (refer to FIG. 16). Thus, by overwriting the code number information in the RAM 2033 with the code number of each video reel selected by a lottery so as to correspond to each symbol display area of the symbol display frame 2111 on the liquid crystal panel 2005B, each symbol to be rearranged in a unit game of a slot game is determined.

Subsequently, when proceeding to S2016, the main CPU 2032 executes a symbol display control process. In other words, by sending a control signal to the sub control board 2072, the main CPU 2032 starts a scrolling display of each video reel in each symbol display area of the symbol display frame 2111 on the liquid crystal panel 2005B. After that, an effect mode (a display mode of images on the liquid crystal panel 2005B and a sound output mode from the speakers 2023) for each unit game is determined by the main CPU 2032, and the sub control board 2072 is ordered to start the effect in a predetermined effect pattern. Then, when a predetermined timing to stop displaying each video reel in scrolling manner comes, the main CPU 2032, by sending a control signal to the sub control board 2072, stops scrolling of each video reel being displayed. The stop operation is based on the code number stored in the RAM 2033 by overwriting the code number information in the RAM 2033 with the code number so as to correspond to each symbol display area of the symbol display frame 2111 on the liquid crystal panel 2005B. With this, each symbol which determined in S2015 above-mentioned is rearranged in each symbol display area of the symbol display frame 2111 on the liquid crystal panel 2005B.

After that, when proceeding to S2017, the main CPU 2032 determines whether or not there is a winning combination. The determination is made based on the code number stored in the RAM 2033 by overwriting the code number information in the RAM 2033 with the code number so as to correspond to each symbol display area of the symbol display frame 2111 on the liquid crystal panel 2005B. At this point, if there is not a winning combination (S2017: NO), the process proceeds to S2020 described below. In contrast, if there is a winning combination (S2017: YES), the process proceeds to S2018.

In S2018, the main CPU 2032 executes a display renewal process. Specifically, first, the payout amount obtained by multiplying the payout amount corresponding to the winning combination (the number of the same symbol) rearranged in the symbol display frame 2111 of the liquid crystal panel 2005B with the bet amount is computed. Incidentally, the computation is executed based on the bet allocation information in the RAM 2033 and the payout table of FIG. 19. In case that there is more than one payout amount corresponding to the winning combination (the number of the same symbol), the computation is executed by adding up these payout amounts. The computed payout amount is stored in RAM 2033 as payout information. After that, by sending a control signal to the display portion driving circuit 2067, the main CPU 2032 displays the payout information stored in the RAM 2033 (the above-mentioned computed amount) on the payout amount display portion 2008 of the liquid crystal panel 2005B.

Then, the main CPU 2032 executes a payout process in S2019. In the payout process, the payout amount awarded to a player in a slot game is paid out to the player based on the payout information stored in the RAM 2033.

When the pay out is executed, the credit amount stored in the RAM 2033 as the payout information (the payout amount awarded to a player in a slot game) are added to the credit amount stored in the RAM 2033 as the credit information, and the added value is overwritten in the RAM 2033 as the credit information. After that, by sending a control signal to the display portion driving circuit 2067, the main CPU 2032 displays the credit information stored in the RAM 2033 (the added value computed in S2019) on the credit amount display portion 2009 of the liquid crystal panel 2005B.

Incidentally, in the payout process, the credit amount owned by a player at the moment may be paid out by coins corresponding to the credit amount (one credit equals to one coin) based on the player's depressing the CASHOUT button 2102, or may also be paid out by a ticket with a bar code which is printed by the ticket printer 2014.

Then, after the main CPU 2032 executes the above-mentioned payout process in S2019, the process proceeds to S2020.

In S2020, the main CPU 2032 determines whether or not the variable N is "0". At this point, if the variable N is not "0" (S2020: NO), the process returns to S2014 above. As a result, the unit games corresponding to the number of games indicated in S2024 above are executed by auto-play with the bet amount which is allocated in S2025 above. In contrast, if the variable N is "0" (S2020: YES), the main CPU 2032 overwrites "0" in the RAM 2033, as the bet allocation information, and at the same time, displays "0" on the bet amount display portion 2202 of the liquid crystal panel 2005B by sending a control signal to the sub control board 2072. Then, the process returns to S2011 above, at which the main game process is repeated as shown in FIG. 24.

2-7. Display of Effect Images Having a Story Line

The Second Embodiment

In the slot machine 2001 according to the present embodiment, as described above, the unit game is executed independently, or alternatively, each of the unit games constituting the "continuous game" instructed by a player is executed continuously. In this respect, in a case where the unit game is executed independently, a single image whereby the story is concluded is continuously displayed on the liquid crystal display 2005A from the start of that unit game till the end of that unit game. Alternatively, in a case where each of the unit games constituting the "continuous game" instructed by a player is executed continuously, a continuous image is continuously displayed on the liquid crystal display 2005A from the start of the "continuous game" till the end of the "continuous game". This continuous image whereby the story is concluded is made up of a combination of a plurality of single images, the plurality of single images corresponding to the number of times of unit games constituting the "continuous game".

For this purpose, the slot machine 2001 according to the present embodiment has a single image corresponding to the unit game and continuous images respectively corresponding to the "continuous game" which can be indicated by a player. For convenience of the description, in the slot machine 2001 according to the present embodiment, the number of times of unit games constituting the "continuous game" which can be indicated by a player is assumed to be from "2" to "100".

Figure 28:
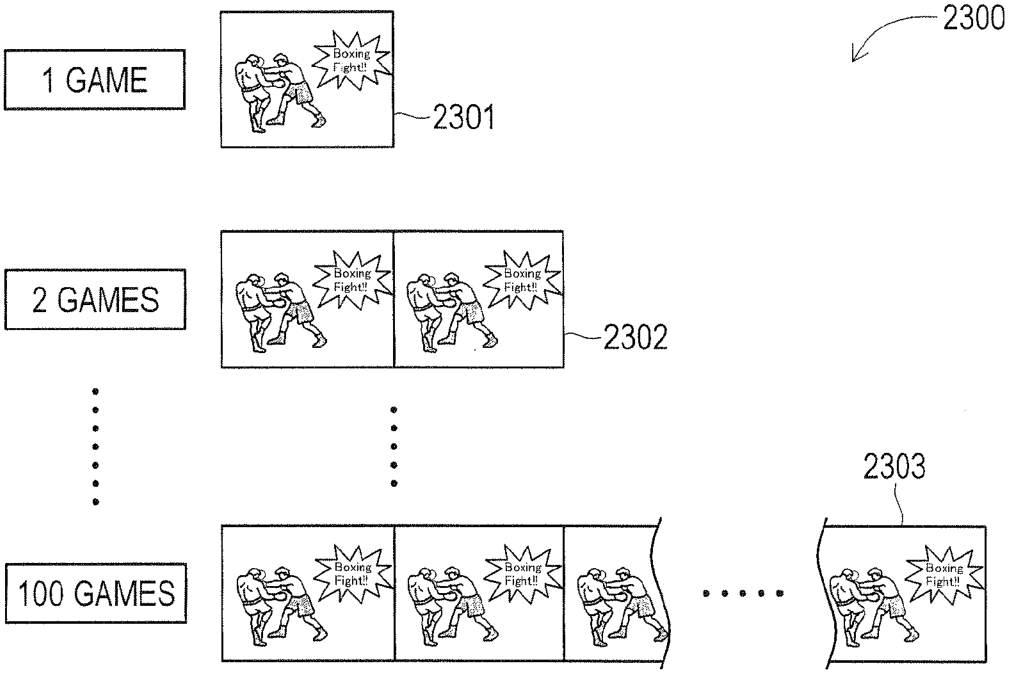
FIG. 28 is a view showing one example of an image group.

In the slot machine 2001 according to the present embodiment, the image group 2300 as shown in FIG. 28 is stored in the image ROM 2086 (refer to FIG. 18). The image group 2300 is made up of the single image 2301, the continuous image 2302, . . . , and the continuous image 2303. The single image 2301 corresponds to the unit game. The continuous image 2302 corresponds to the case that the number of times of unit games constituting the "continuous game" is "2". The continuous image 2303 corresponds to the case that the number of times of unit games constituting the "continuous game" is "100". Although not shown in FIG. 14, the continuous images respectively corresponding to the case that the number of times of unit games constituting the "continuous game" is "3" through "99" are stored in the image ROM 2086 as images constituting the image group 2300.

The screen time of the single image 2301 corresponding to the unit game is the same as the time from the start of that unit game till the end of that unit game. The contents of the single image 2301 represent the story which is concluded by this single image 2301 alone.

The screen time of the continuous image 2302, which corresponds to the case that the number of times of unit games constituting the "continuous game" is "2", is the same as the time required for continuous execution of 2 unit games constituting the "continuous game". The contents of the continuous image 2302 represent the story which is concluded by this continuous image 2302.

The screen time of the continuous image 2303, which corresponds to the case that the number of times of unit games constituting the "continuous game" is "100", is the same as the time required for continuous execution of 100 unit games constituting the "continuous game". The contents of the continuous image 2303 represent the story which is concluded by this continuous image 2303.

This is similar with respect to the respective continuous images corresponding to the case that the number of times of unit games constituting the "continuous game" is "3" through "99".

Figure 30:
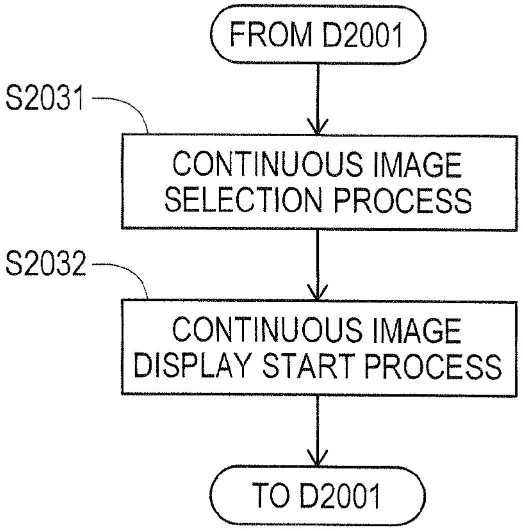
FIG. 30 is a flowchart of a main game process program.

Then, in the slot machine 2001 according to the present embodiment, the main CPU 2032 executes a main game process program as shown in FIG. 30 at a point in time D2001 placed between S2013 and S2014 of the main game process program as shown in FIG. 23 above. Incidentally, a program shown in the flowchart of FIG. 30 is stored in the ROM 2034 and the RAM 2033 of the slot machine 2001, and is executed by the main CPU 2032.

After executing the determination process for the main game process program in S2013 of FIG. 23 above, the main CPU 2032 executes a continuous image selection process in S2031 of FIG. 30. In this process, the main CPU 2032 selects images corresponding to the number of times of the unit games constituting the "continuous game". At this point, the number of times of the unit games constituting the "continuous game" coincides with a variable N. Accordingly, the main CPU 2032 selects, from the image group 2300, a continuous image corresponding to the same number of times of unit games as the variable N, from the continuous images respectively corresponding to the number of times of the unit games constituting the "continuous game", by sending a control signal to the sub control board 2072.

If the variable N is "1", the main CPU 2032 selects the single image 2301 from the image group 2300 by sending a control signal to the sub control board 2072.

In S2032, the main CPU 2032 executes a continuous image display start process. In this process, the main CPU 2032 starts display of the continuous image or single image selected in S2031 above on the liquid crystal display 2005A by sending a control signal to the sub control board 2072. Then, the process proceeds to S2014 of the main game process program as shown in FIG. 23 above.

2-8. Other

The Second Embodiment

The present invention is not limited to the above-described second embodiment, and various modifications and alterations can be made thereto without departing from the spirit of the invention.

For instance, the bet amount with respect to the "continuous game" indicated by a player may be allocated at random to each unit game constituting the "continuous game" indicated by the player. More specifically, as shown in FIG. 27, for instance, the bet amount with respect to the "continuous game" indicated by a player is assumed to be "23", while the number of times of the unit games constituting the "continuous game" indicated by the player is assumed to be "5".

Figure 27:
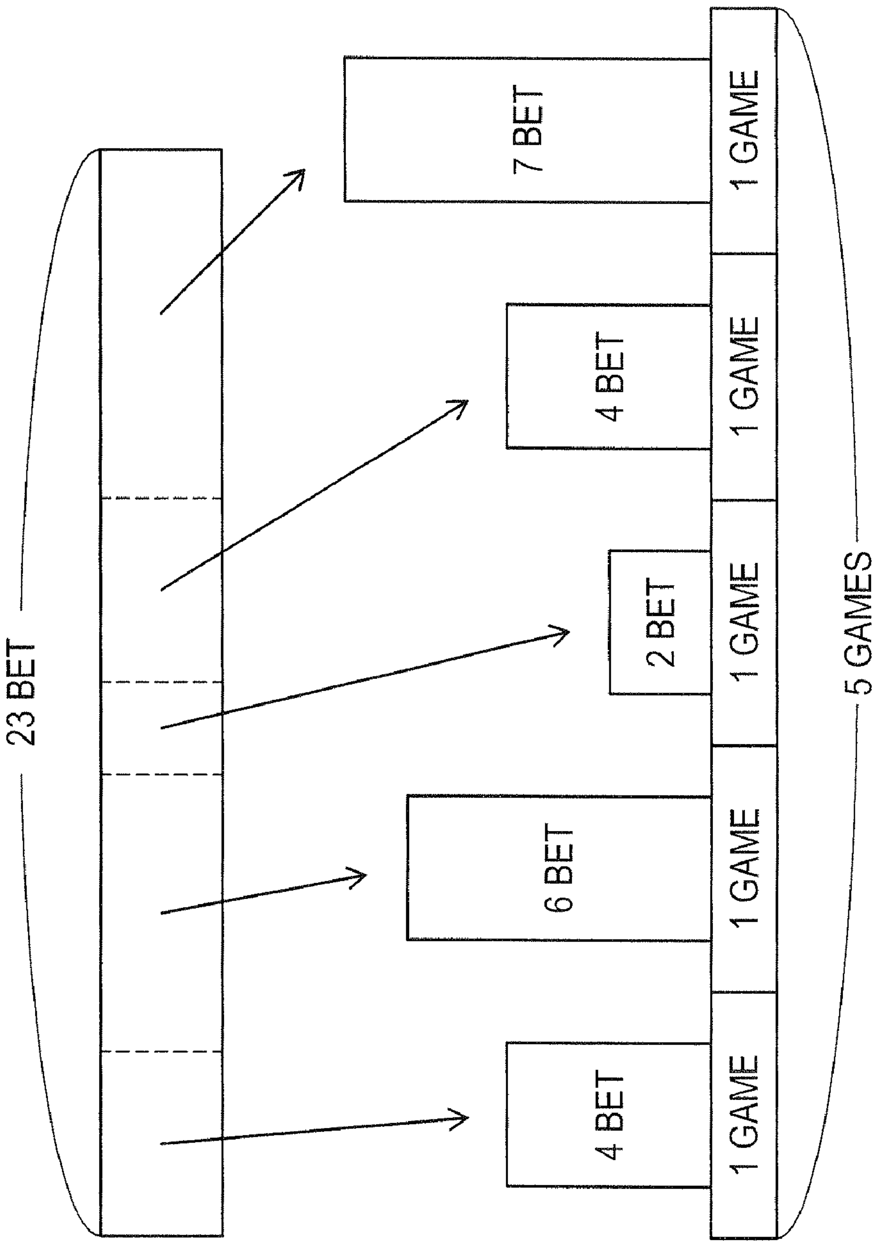
FIG. 27 is a view showing characteristics of the slot machine.

In the case shown in FIG. 27, the bet amount is respectively allocated to five unit games constituting the "continuous game" indicated by the player, in the order "4", "6" "2", "4" and "7".

Incidentally, if the bet amount with respect to the "continuous game" indicated by a player is allocated at random to each unit game constituting the "continuous game" indicated by the player, the main CPU 2032 performs control so that the bet amount allocated with respect to the unit games during execution thereof is updated and stored in the bet allocation information, with each execution of the unit games constituting the "continuous game" indicated by the player. Further, the main CPU 2032 performs control so that the bet allocation information thus updated and stored is displayed on the bet amount display portion 2202 of the liquid crystal panel 2005B, by sending a control signal to the sub control board 2072, with each execution of the unit games constituting the "continuous game" indicated by the player.

A surplus of the bet amount may occur as a result of the above-mentioned random allocation thereof. Alternatively, as shown in FIG. 27, this random allocation of the bet amount may be adjusted so as to prevent occurrence of a surplus of the bet amount.

The present invention may also be applied with respect to a gaming machine wherein unit games such as card games, roulette games, dice games or mahjong game or the like are repeatedly executed.

Figure 29:
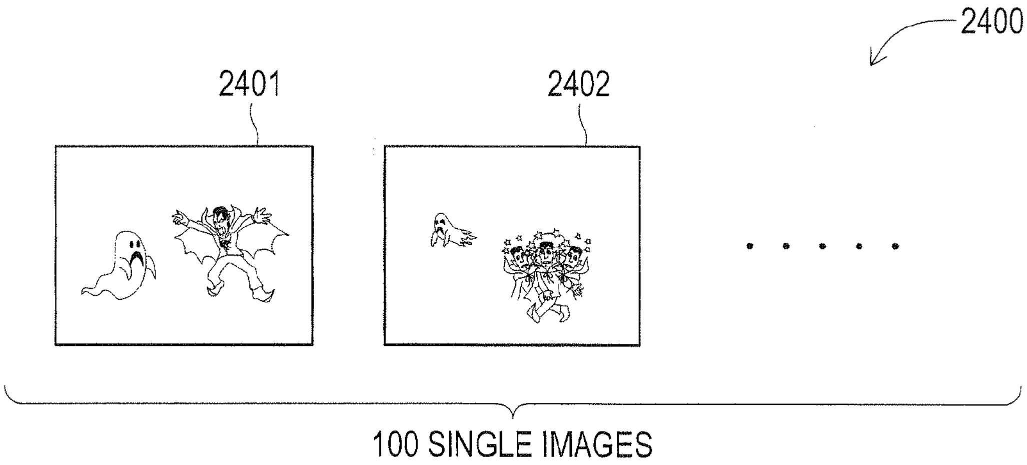
FIG. 29 is a view showing one example of an image group.

In the slot machine 2001 according to the present embodiment, an image group 2400 made up of 100 single images 2401, 2402, . . . , as shown in FIG. 29 may be stored in the ROM 2086 (refer to FIG. 18). The 100 single images 2401, 2402, . . . are stored in the image ROM 2086 in the sequence the story develops.

In this case, the single image corresponding to the unit game is selected at random from the image group 2400 made up of 100 single images 2401, 2402, . . . . Alternatively, the continuous image respectively corresponding to the "continuous game" which can be indicated by a player is made up of a combination of single images 2401, 2402, . . . , through which the story develops, corresponding to the number of times of the unit games constituting the "continuous game". The continuous image having the constitution as described above is continuously displayed on the liquid crystal display 2005A from the start of the "continuous game" till the end of the "continuous game".

Figure 32:
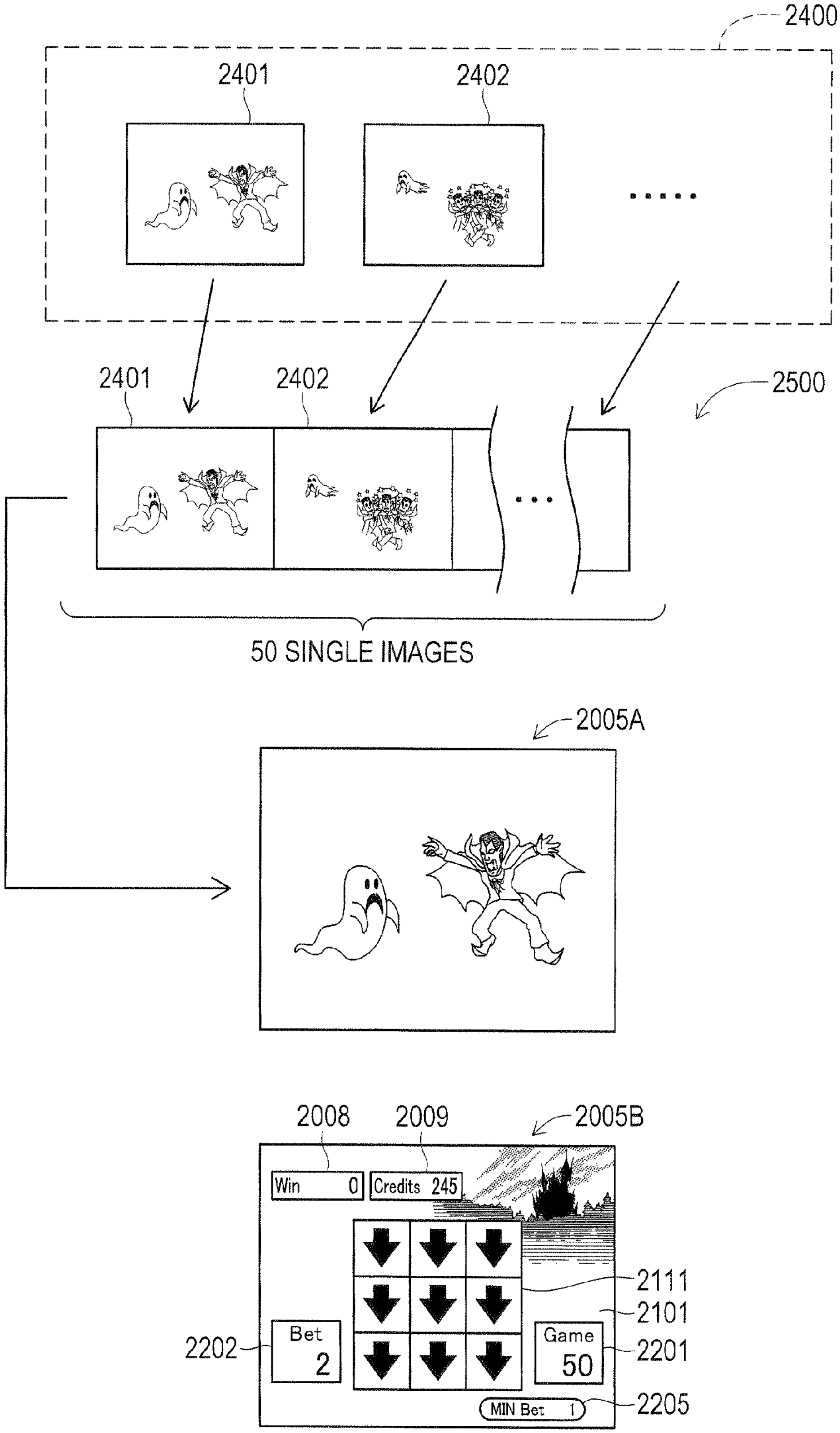
FIG. 32 is a view showing characteristics of the slot machine.

For instance, as shown in FIG. 32, if 50 unit games constituting the "continuous game" indicated by a player are executed continuously, a continuous image 2500 is continuously displayed on the liquid crystal display 2005A from the start of that "continuous game" till the end of that "continuous game". The continuous image 2500 is made up of a combination of the single images 2401, 2402, . . . corresponding to 50 unit games constituting that "continuous game". This continuous image 2500 is generated by linking 50 images, each of which being given a number from 1 through 50, in the sequence of their numbers, from the image group 2400 made up of 100 single images 2401, 2402, . . . , etc.

Figure 31:
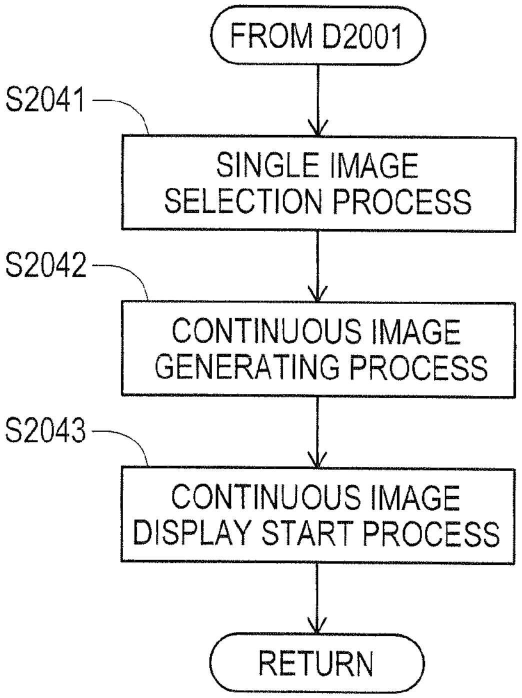
FIG. 31 is a flowchart of a main game process program.

To realize this configuration, in the slot machine 2001 according to the present embodiment, the main CPU 2032 executes a main game process program as shown in FIG. 31 at a point in time D2001 placed between S2013 and S2014 of the main game process program as shown in FIG. 23 above. Incidentally, a program shown in the flowchart of FIG. 31 is stored in the ROM 2034 and the RAM 2033 of the slot machine 2001, and is executed by the main CPU 2032.

After executing the determination process for the main game process program in S2013 of FIG. 23 above, the main CPU 2032 executes a single image selection process in S2041 in FIG. 31. In this process, the main CPU 2032 selects the single images 2401, 2402, . . . , corresponding to the number of times of the unit games constituting the "continuous game" from the image group 2400. At this point, the number of times of the unit games constituting the "continuous game" coincides with the variable N. Accordingly, the main CPU 2032 selects N images, each of which being given one number from 1 through N, from the image group 2400 made up of 100 single images 2401, 2402, . . . , etc.

In this respect, a number of N images may also be selected starting from an image which has been given a number specified in accordance with rules set based on the bet allocation information stored in the RAM 2033.

However, if the variable N is "1", the main CPU 2032 selects at random 1 image from the image group 2400 made up of 100 single images 2401, 2402, . . . , by sending a control signal to the sub control board 2072.

In this respect, 1 image may also be selected from the image group 2400 based on rules set in accordance with the bet allocation information stored in the RAM 2033.

In S2042, the main CPU 2032 executes a continuous image generating process. In this process, the main CPU 2032 generates the continuous image by combining the images selected in S2041 above in the sequence of numbers 1 through N that have been given to the respective images, by sending a control signal to the sub control board 2072.

However, if the variable N is "1", the generating process as described above is not executed.

In S2043, the main CPU 2032 executes a continuous image display start process. In this process, the main CPU 2032 starts display of the continuous image generated in S2042 above on the liquid crystal display 2005A by transmitting a control signal to the sub control board 2072. However, if the variable N is "1", the main CPU 2032 starts display of the single image selected in S2041 above on the liquid crystal display 2005A by sending a control signal to the sub control board 2072. Then, the process proceeds to S2014 of the main game process program as shown in FIG. 23 above.

3-1. Characteristics of the Present Invention

The Third Embodiment

Next, the third embodiment of the present invention, as applied to a slot machine which is one example of a gaming machine of the present invention, will be described while referring to the accompanying drawings.

A game which is executed in the slot machine of the present embodiment is constituted of a slot game in which scatter symbols are employed.

Figure 33:
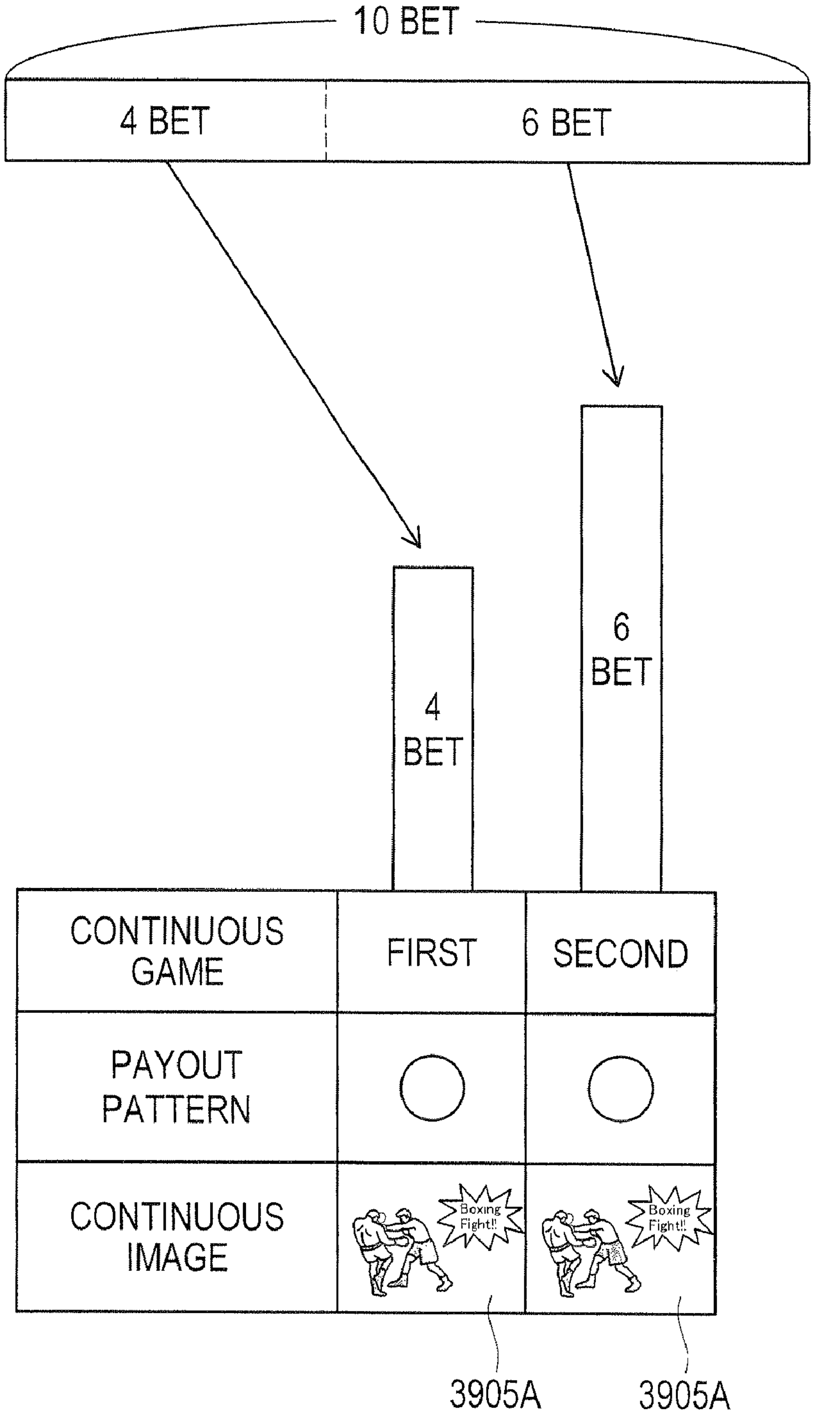
FIG. 33 is a view showing characteristics of a slot machine which is one third embodiment of the present invention.

In the slot game, as shown in FIG. 33, a symbol display frame 3111 displaying nine symbols is displayed on the well-known liquid crystal panel 3005B. The nine symbols are arranged in a matrix comprising three rows by three columns. In this respect, within the symbol display frame 3111, nine symbol display areas, where one of many symbols drawn on a reel band of one video reel is arranged, are positioned like a matrix comprising three rows by three columns. That is, one symbol display area is assigned to each of the nine video reels. Then, one of the symbols drawn on the reel band of each video reels is arranged in each of the symbol display areas.

Figure 38:
FIG. 38 is a payout table in which winning combinations and the payout amounts corresponding to the winning combinations are shown when a slot game is executed by using each of the reels.
Figure 38:
Figure 38:
Figure 38:
Figure 38:
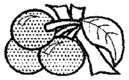
Figure 38:
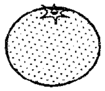
Figure 38:
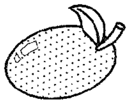

In the meantime, as shown in FIG. 38, various winning combinations are previously determined based on the number of the same scatter symbol. When each of the video reels is scrolled and stopped (refer to FIG. 39 and FIG. 40), a symbol is rearranged one by one in each of the symbol display areas of the symbol display frame 3111, as the liquid crystal panel 3005B shown in FIG. 33. At this time, when the nine symbols that are rearranged in the symbol display frame 3111 compose any one of the winning combinations, the payout amount corresponding to the winning combination composed is displayed in a payout amount display portion 3008. With this, a unit game is configured.

In the slot machine 3001 of the present embodiment, the player can indicate that a unit game will be executed continuously by a predetermined number of times such as "1", "5", "10" and the like. A group of unit games which the player indicated as a continuous play corresponds to a "continuous game". This indication is made by operating a plurality of buttons which are respectively provided in accordance with the number of times of the unit games constituting the "continuous game" (refer to FIG. 43).

The player can indicate the bet amount, such as "1", "5", "10" and the like, with respect to the "continuous game". This indication is made by operating a plurality of buttons which are respectively provided in accordance with the bet amount (refer to FIG. 43).

In this respect, in the slot machine 3001 of the present embodiment, once the player indicates the bet amount with respect to the "continuous game", one or a plurality of "continuous games" including unit games that are executed by the number of times which can be indicated by the player is specified through the bet amount with respect to the "continuous game" indicated by the player and the minimum bet amount with respect to a unit game which can be set by the player (in the present embodiment, the bet amount being "1"). Thereafter, the operation with respect to all buttons corresponding to the "continuous game" thus specified is validated.

The player operates any of the buttons thus validated, whereby the "continuous game", which is constituted of unit games executed by the number of times indicated by the player through the above-mentioned operation, is executed.

Figure 45:
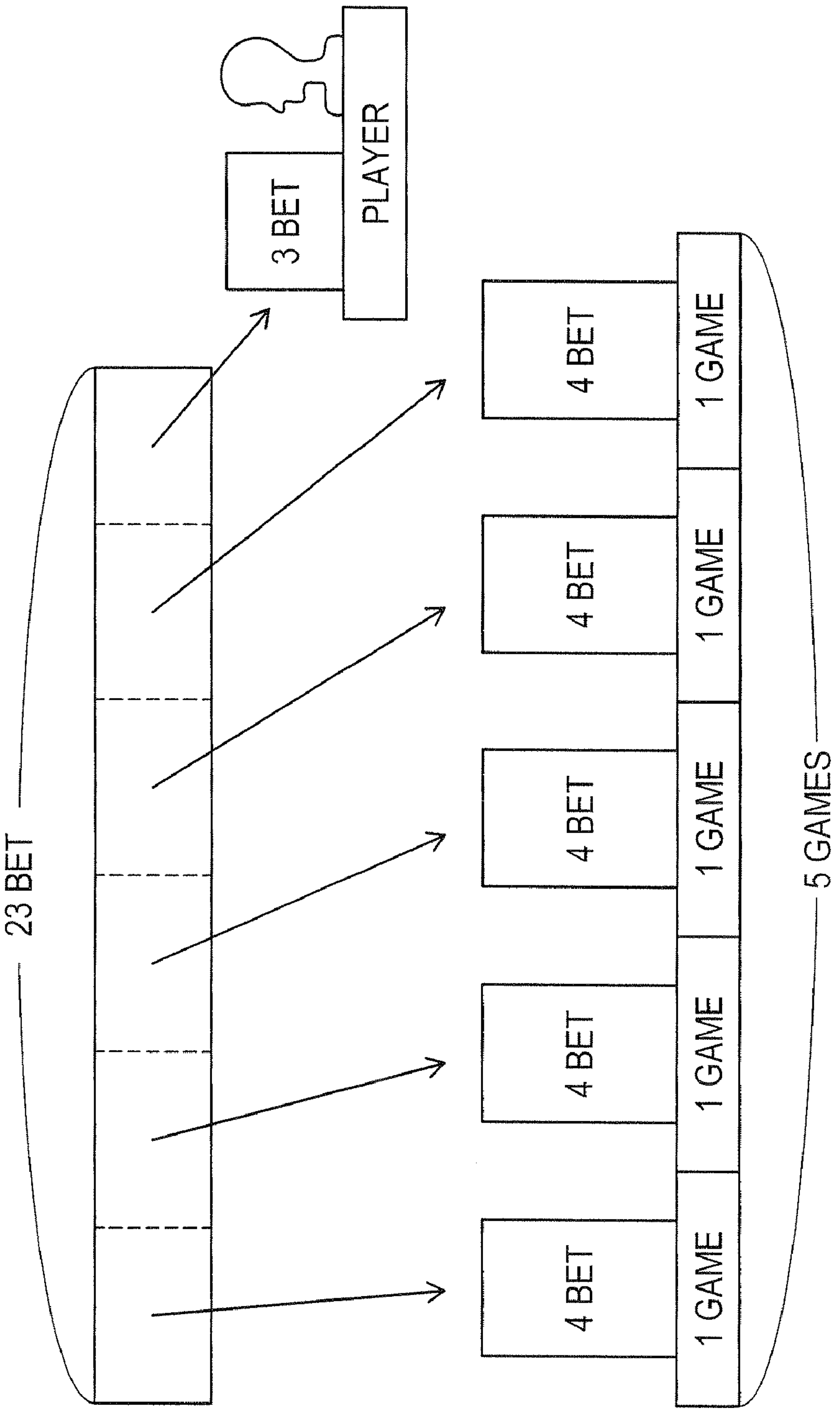
FIG. 45 is a view showing characteristics of the slot machine.

The bet amount with respect to the "continuous game" indicated by the player is evenly allocated to each unit game constituting the "continuous game" indicated by the player. More specifically, as shown in FIG. 45, for instance, the bet amount with respect to the "continuous game" indicated by the player is assumed to be "23", and the number of times for the unit games constituting the "continuous game" indicated by the player is assumed to be "5". In this case, the bet amount "4" is evenly allocated with respect to each unit game constituting the "continuous game" indicated by the player.

Incidentally, the bet amount which was left after the bet amount has been evenly allocated with respect to each unit game constituting the "continuous game" is returned to the player. In the case of FIG. 45, the bet amount "3" is returned to the player.

Further, the following can be given as characteristics of the present invention.

More specifically, a result of the payout for each unit game constituting the "continuous game" is determined in advance before a start of the "continuous game". The bet amount with respect to the "continuous game" indicated by a player, except for the bet amount that was returned to the player, is allocated at random with respect to each unit game constituting the "continuous game".

Figure 46:
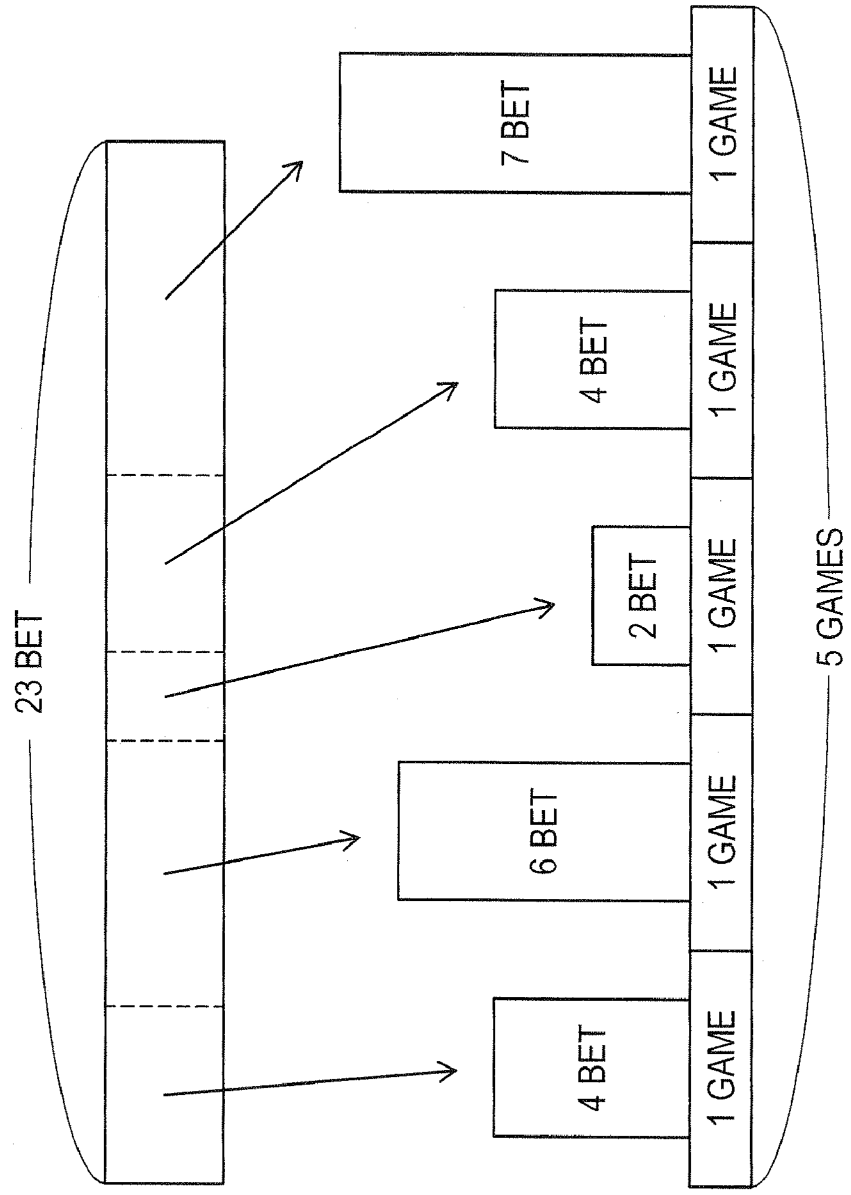
FIG. 46 is a view showing characteristics of the slot machine.

More specifically, as shown in FIG. 46, for instance, the bet amount with respect to the "continuous game" indicated by a player is assumed to be "23" and the number of times of the unit games constituting the "continuous game" indicated by the player is assumed to be "5". In the case shown in FIG. 46, the bet amount is respectively allocated at random to 5 unit games constituting the "continuous game" indicated by the player, in the order "4", "6", "2", "4" and "7". However, with this random allocation, the respective bet amounts are adjusted so as to avoid that a surplus of the bet amount occurs.

The payouts for the unit games constituting the "continuous game" are respectively determined in advance by using the bet amount allocated at random as described above. Further, the payouts which have been determined in advance as described above are summed up, whereby the total payout which is payable to the player in the "continuous game" is computed in advance. Alternatively, a payout pattern on whether or not the payout is to be awarded in each unit game constituting the "continuous game" is also determined in advance. The total payout which has been computed in advance is allocated with respect to each unit game constituting the "continuous game", by using this payout pattern.

More specifically, as shown in FIG. 33, for instance, the number of times of the unit games constituting the "continuous game" indicated by a player is assumed to be "2", and the bet amount with respect to the "continuous game" indicated by the player is assumed to be "10". In this case, this bet amount is respectively allocated, in the order "4", "6" with respect to 2 unit games constituting the "continuous game" indicated by the player.

A payout pattern for this case is set in advance to a pattern whereby a payout is awarded for each of the 2 unit games constituting the "continuous game" indicated by the player. Accordingly, the total payout which is to be awarded to the player in the "continuous game" indicated by the player is respectively allocated to each of the 2 unit games constituting the "continuous game".

Once the "continuous game" indicated by the player is started, the unit games constituting this "continuous game" are executed by auto-play, so that the total payout that was computed in advance is adjusted to be paid out to the player by using the payout pattern that was determined in advance. This adjustment may be executed while taking into consideration the bet amount that was allocated in advance, or alternatively, without taking into consideration the bet amount that was allocated in advance. Even in the case that the bet amount allocated in advance is ignored, the sum of the bet amounts for the unit games constituting the "continuous game" is adjusted so as to coincide with the bet amount with respect to the "continuous game" indicated by the player.

During the execution of the "continuous game", control is executed so that an effect of a continuous image made up of a single image 3905A which is suitable for that payout pattern is continuously executed.

3-2. Construction of the Slot Machine

The Third Embodiment

Hereinafter, the one embodiment embodying the present invention will be explained in detail with reference to the drawings.

Figure 34:
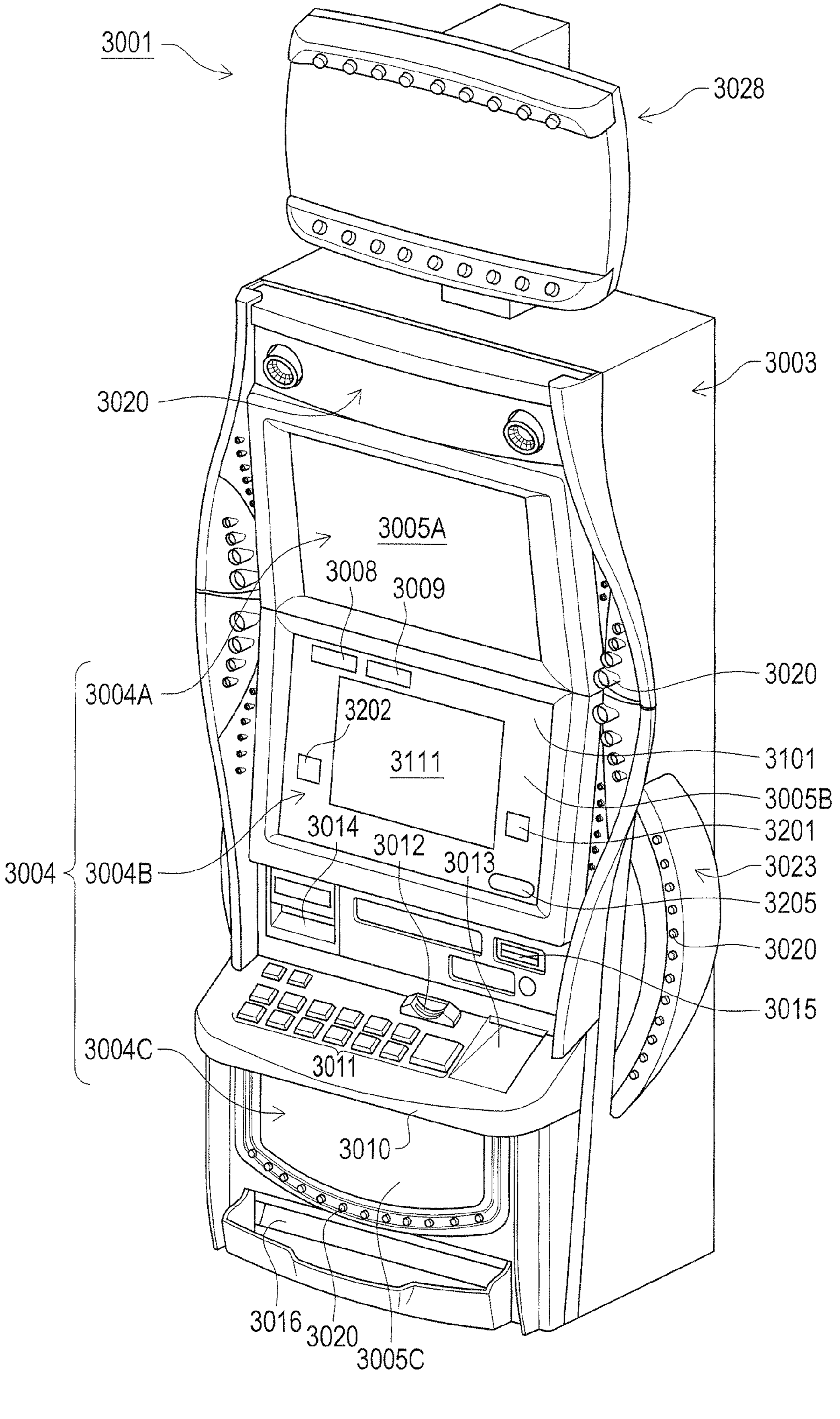
FIG. 34 is a perspective view of the slot machine.

First, an outline construction of the slot machine 3001 according to the present embodiment will be explained based on FIG. 34. FIG. 34 is a perspective view of the slot machine 3001 according to the present embodiment.

As shown in FIG. 34, the slot machine 3001 is an upright type slot machine arranged in a game arcade such as casino, in order to execute predetermined game modes, such slot machine includes a cabinet 3003 in which electronic and mechanical components are installed. For example, as a display portion 3004 to display information a concerning game, there are provided an upper display portion 3004A, a middle variable display portion 3004B and a lower display portion 3004C. Each display portion 3004A to 3004C is mounted at the front of the oblong cabinet 3003. The upper display portion 3004A includes a liquid crystal panel 3005A which is arranged above the middle variable display portion 3004B. On the liquid crystal panel 3005A, for example, an effect image, an introduction of a game content, and a rule explanation of a game are displayed. The lower display portion 3004C is arranged below the middle variable display portion 3004B, and includes a plastic panel 3005C on which images are printed, and a plastic panel 3005C is lightened by backlights.

The middle variable display portion 3004B, which is used to display an execution state of a game, includes the liquid crystal panel 3005B which is fixed at the front door of the cabinet 3003. In this liquid crystal panel 3005B, nine symbols of the video reels are displayed in a scrolling manner and in a stopped manner, respectively. In the middle variable display portion 3004B, the symbol display frame 3111 in which the nine symbol display areas associated with each video reel are positioned like a matrix of three rows times three columns is displayed on the liquid crystal panel 3005B. Further, a touch panel 3101 is provided on the front surface of the liquid crystal panel 3005B. A player can input each kind of commands by operating the touch panel 3101. On the upper position of the middle variable display portion 3004B, the payout amount display portion 3008 and a credit amount display portion 3009 are provided on the liquid crystal panel 3005B. Also the upper portion of the middle variable display portion 3004B, is related to the back side, thereby a player may play a game in a cozy posture.

In the middle variable display portion 3004B, a bet amount display portion 3202 is provided on the liquid crystal panel 3005B, at the right side of the symbol display frame 3111. Further, in the middle variable display portion 3004B, a game number display portion 3201 is provided on the liquid crystal panel 3005B, at the left side of the symbol display frame 3111. Furthermore, in the middle variable display portion 3004B, a minimum bet amount display area 3205 is provided on the liquid crystal panel 3005B, at the lower side of the game number display portion 3201.

Figure 39:
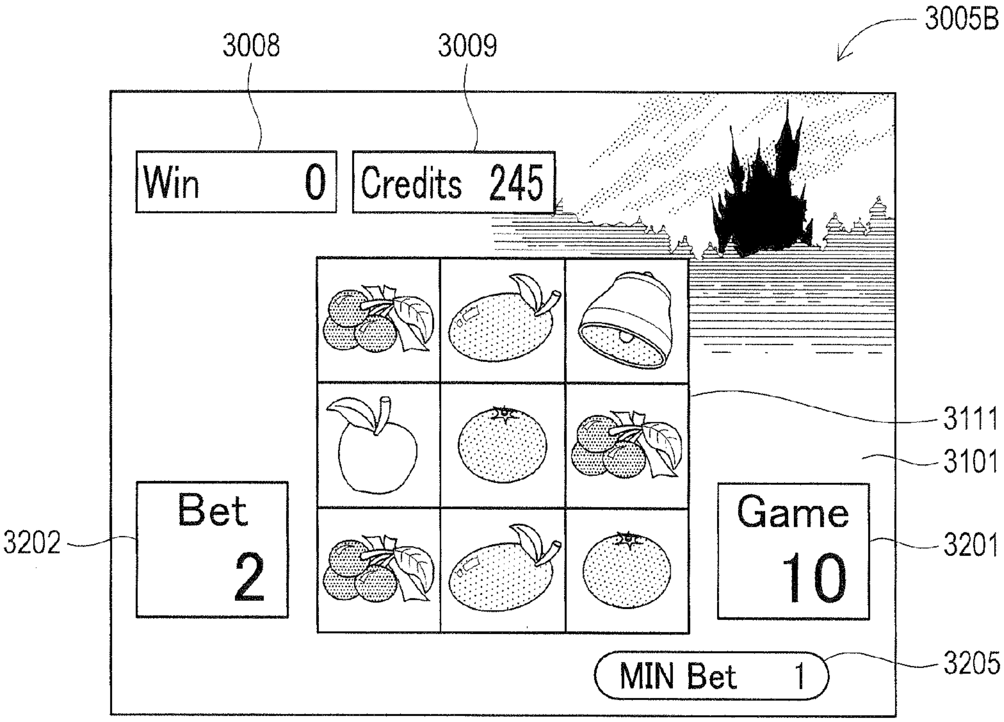
FIG. 39 is a view showing one of an image displayed on a liquid crystal panel.
Figure 40:
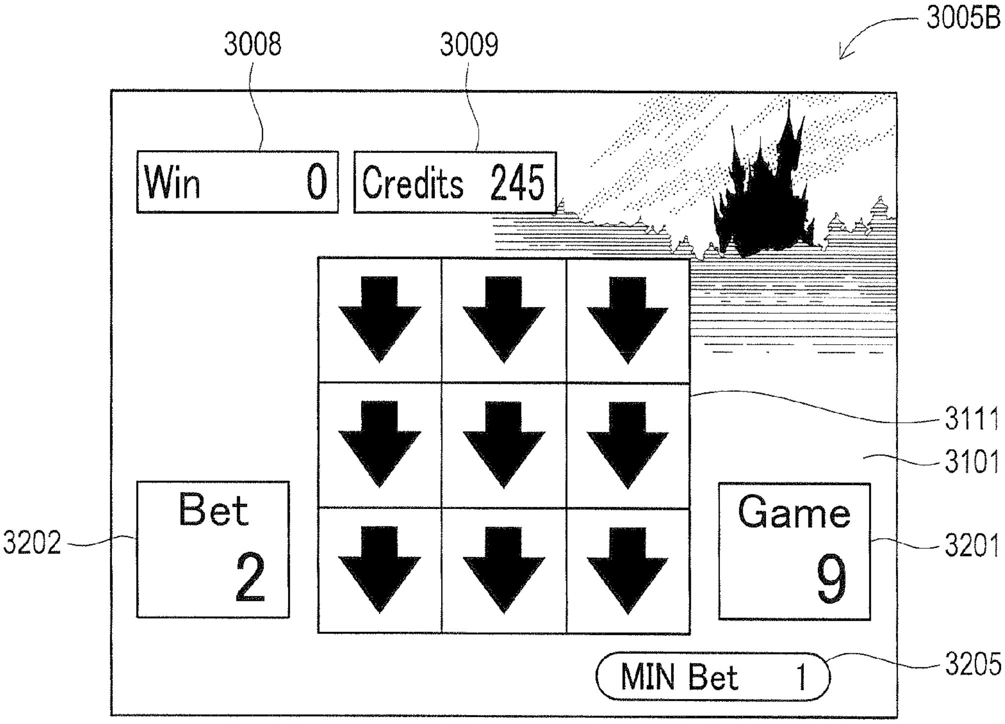
FIG. 40 is a view showing one of an image displayed on the liquid crystal panel.

Now, images of a slot game to be displayed on the liquid crystal panel 3005B are explained. FIG. 39 and FIG. 40 are drawings showing contents displayed on the liquid crystal panel 3005B, as one example of images of a slot game to be displayed on the liquid crystal panel 3005B. As shown in FIG. 39 and FIG. 40, on the liquid crystal panel 3005B in a slot game, the symbol drawn on the reel band of each video reel is displayed in the nine symbol display areas positioned like a matrix of three rows times three columns in the symbol display frame 3111, so that they can be viewed by a player. FIG. 39 shows a state in which the symbol drawn on the reel band of each video reel is arranged or rearranged in each symbol display area of the symbol display frame 3111 on the liquid crystal panel 3005B. FIG. 40 shows a state in which the symbol drawn on the reel band of each video reel is displayed by a scrolling manner in each symbol display area of the symbol display frame 3111 on the liquid crystal panel 3005B. Incidentally, on the reel band of each video reel, a symbol column constructed from twenty-two symbols is drawn respectively (refer to FIG. 35).

Further, the payout amount display portion 3008 and the credit amount display portion 3009 are provided on the liquid crystal panel 3005B. On the payout amount display portion 3008, the payout amount awarded in a slot game to a player is displayed. On the credit amount display portion 3009, the credit amount which is owned by a player at the moment is displayed.

Further, the liquid crystal panel 3005B contains the bet amount display portion 3202, the game number display portion 3201 and the minimum bet amount display area 3205. The bet amount display portion 3202 displays the bet amount for a unit game, as set by a player in a slot game. The game number display portion 3201 displays the remaining number of times for executing unit games that constitute the "continuous game" set by a player in a slot game. The minimum bet amount display area 3205 displays the minimum bet amount for each unit game that a player can set.

Therefore, on the liquid crystal panel 3005B in a slot game, one symbol which is drawn on the reel band of each video reel is arranged in each of the nine symbol display areas of the symbol display frame 3111.

Returning to FIG. 34, at the operation table 3010, a coin insertion slot 3012 and a bill insertion slot 3013 are provided. Between the middle variable display portion 3004B and the lower display portion 3004C, at the front of the cabinet 3003, an operation table 3010 which is projected forward is provided. On the operation table 3010, a variety of operation buttons 3011 including a BET button, a COLLECT button, a SPIN button, a CASHOUT button and the like are arranged as an operation portion to execute a game.

Figure 43:
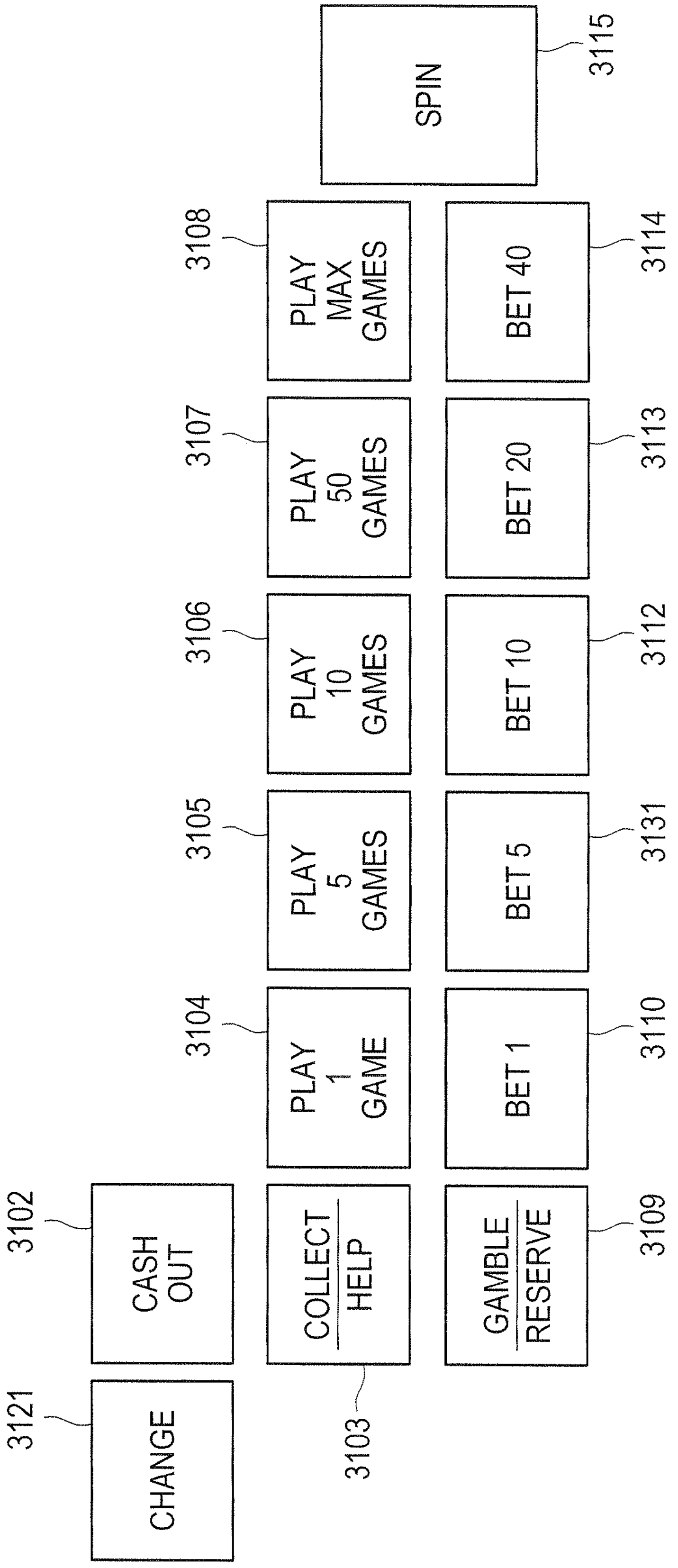
FIG. 43 is a front view showing a variety of operation buttons.

Here, the variety of operation buttons 3011 will now be described. FIG. 43 is a front view showing the variety of operation buttons 3011. As shown in FIG. 43, at an upper stage are provided a CHANGE button 3121, a CASHOUT button 3102 starting from the leftmost side. At a middle stage are provided a COLLECT/HELP button 3103, a PLAY 1 GAME button 3104, a PLAY 5 GAMES button 3105, a PLAY 10 GAMES button 3106, a PLAY 50 GAMES button 3107 and a PLAY MAX GAMES button 3108 starting from the leftmost side. At a lower stage are provided a GAMBLE/RESERVE button 3109, a BET 1 button 3110, a BET 5 button 3131, a BET 10 button 3112, a BET 20 button 3113 and a BET 40 button 3114, starting from the leftmost side. At the rightmost side is provided a SPIN button 3115.

In this respect, the CHANGE button 3121 is an operation device which is used to change bills inserted in the bill insertion slot 3013 (refer to FIG. 34). Coins which have been changed are paid out to a coin tray 3016 (refer to FIG. 34) provided at the lower side of the cabinet 3003 (refer to FIG. 34).

The CASHOUT button 3102 is an operation device which is used to input a command to pay out coins in accordance with the credit amount which a player owns at the moment to the coin tray 3016 (refer to FIG. 34) or a command to pay out such coins by means of bar code-attached tickets which are printed in a ticket printer 3014 (refer to FIG. 34).

The COLLECT/HELP button 3103 is an operation device which is used when completing a double-down game which is executed using the payout amount acquired by a player, or when the game operation method and the like is unclear. Incidentally, if the COLLECT/HELP button 3103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 3104 is an input device for inputting, based on being operated, a command to execute one unit game. The PLAY 5 GAMES button 3105 is an input device for inputting, based on being operated, a command to execute five continuous unit games constituting the "continuous game". The PLAY 10 GAMES button 3106 is an input device for inputting, based on being operated, a command to execute ten continuous unit games constituting the "continuous game". The PLAY 50 GAMES button 3107 is an input device for inputting, based on being operated, a command to execute fifty continuous unit games constituting the "continuous game".

The PLAY MAX GAMES button 3108 is an input device for inputting, based on being operated, a command to execute a maximum number of continuous unit games constituting the "continuous game". Here, the maximum number of times for executing the unit game is computed by dividing the credit amount owned by a player at the moment by the minimum bet amount with respect to each unit game which can be set by the player.

Incidentally, the operation with respect to the PLAY 1 GAME button 3104, PLAY 5 GAMES button 3105, PLAY 10 GAMES button 3106, PLAY 50 GAMES button 3107 and PLAY MAX game button 3108 is not accepted during normal operation.

The GAMBLE/RESERVE button 3109 is an operation device which is used by a player when he/she shifts a slot game to a double-down game, or when he/she steps away from the slot machine.

The BET 1 button 3110 is an input device for inputting, based on being operated, a command to set the bet amount corresponding to "1" with respect to a unit game or the "continuous game". The BET 5 button 3131 is an input device for inputting, based on being operated, a command to set the bet amount corresponding to "5" with respect to a unit game or the "continuous game". The BET 10 button 3112 is an input device for inputting, based on being operated, a command to set the bet amount corresponding to "10" with respect to a unit game or the "continuous game". The BET 20 button 3113 is an input device for inputting, based on being operated, a command to set the bet amount corresponding to "20" with respect to a unit game or the "continuous game". The BET 40 button 3114 is an input device for inputting, based on being operated, a command to set the bet amount corresponding to "40" with respect to a unit game or the "continuous game".

The SPIN button 3115 is an input device for inputting, based on being operated, a command to display each video reel by a scrolling manner.

Returning to FIG. 34, between the operation table 3010 and the middle variable display portion 3004B, the ticket printer 3014 and a card reader 3015 are provided. At the lowest position of the cabinet 3003, the coin tray 3016 is also provided.

Incidentally, in the slot machine 3001 of the present embodiment, gaming medium may be coin, bill, or electronic value (credit). Here, the gaming medium may be others as well, such as medal, token, electronic money, or ticket.

Further, on the cabinet 3003 of the slot machine 3001, light emitting portions 3020 are arranged around a game area including the upper display portion 3004A, the middle variable display portion 3004B, the lower display portion 3004C and the operation table 3010.

Furthermore, the slot machine 3001 also includes a topper effect device 3028 which is installed on the cabinet 3003. The topper effect device 3028 is shaped in a rectangular board shaped, and is provided almost parallel to the liquid crystal panel 3005A of the upper display portion 3004A. The cabinet 3003 is further provided with speakers 3023 on its both sides.

3-3. Outline of Symbols

The Third Embodiment

Next, the symbols drawn on the reel band of each video reel will be explained based on FIG. 35. These symbols are scrolled and rearranged in the respective symbol display areas of the symbol display frame 3111 on the liquid crystal panel 3005B in a slot game. FIG. 35 is a schematic view showing symbol columns drawn on the reel band of each video reel.

On the reel band of each video reel, twenty-two symbols are arranged respectively. Each symbol column of video reel is constructed from the symbols including "FRANKENSTEIN", "BLUE7", "BELL", "APPLE", "CHERRY", "PLUM" and "ORANGE". And the symbols of predetermined types are arranged in a predetermined sequence.

In this respect, each of the symbols including "FRANKENSTEIN", "BLUE 7", "BELL", "APPLE", "CHERRY", "PLUM" and "ORANGE" are scatter symbols. If three or four or more scatter symbols are rearranged in the symbol display frame 3111 of the liquid crystal panel 3005B, the payout amount set in advance is awarded to a player (refer to FIG. 38).

Incidentally, to each symbol composing the symbol column of each video reel shown in FIG. 35, a code number is allocated from top to down in sequence.

3-4. Internal Construction of the Slot Machine

The Third Embodiment

Next, an internal construction of the above-mentioned slot machine 3001 will be explained with reference to FIG. 36 and FIG. 37.

Figure 36:
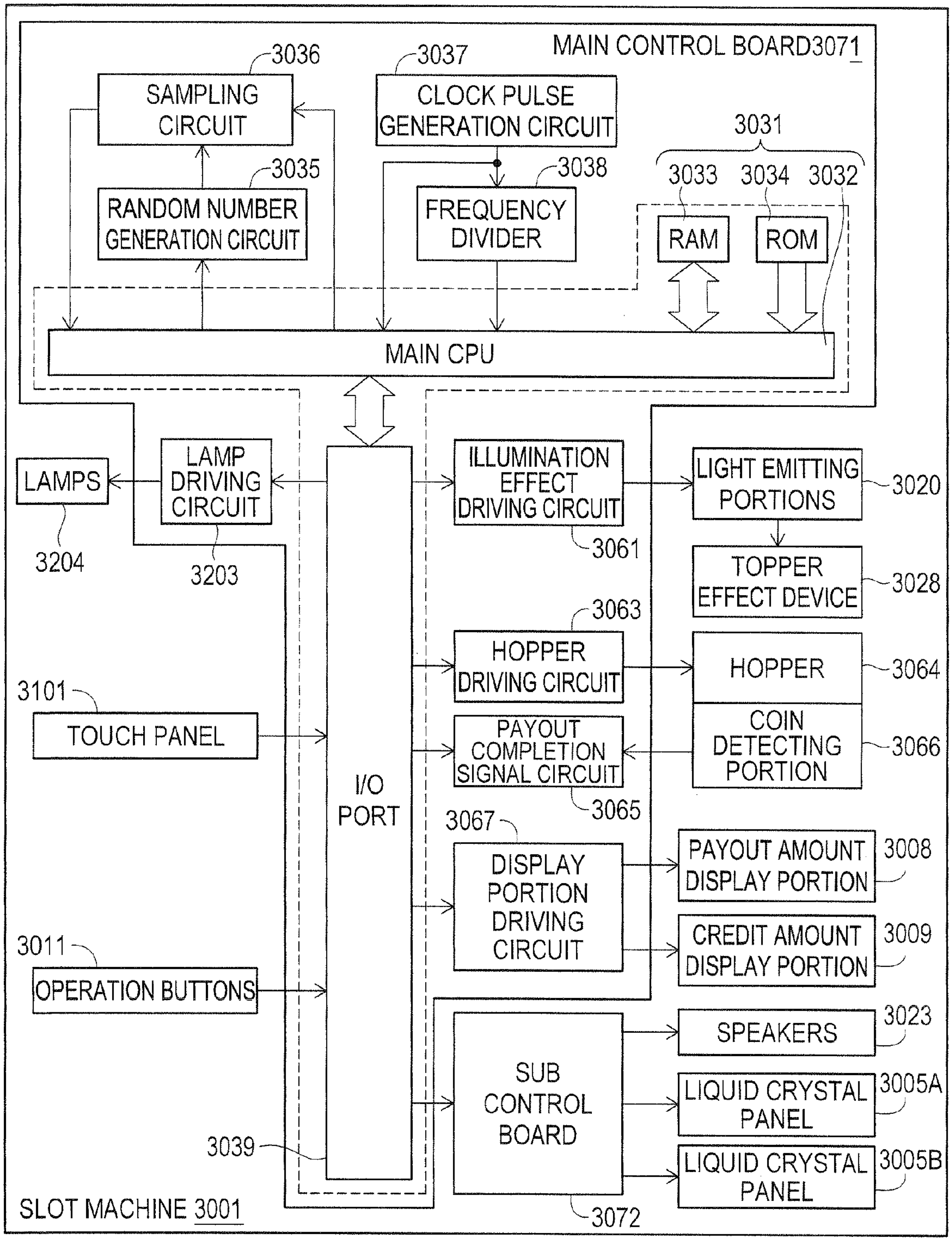
FIG. 36 is a block diagram showing an internal construction of entire slot machine.

FIG. 36 is a block diagram showing an internal construction of entire slot machine 3001. As shown in FIG. 36, the slot machine 3001 includes a plurality of construction elements such as a main control board 3071, in which a microcomputer 3031 is included. The main control board 3071 is constructed from the microcomputer 3031, a random number generation circuit 3035, a sampling circuit 3036, a clock pulse generation circuit 3037 and a frequency divider 3038. The main control board 3071 also includes an illumination effect driving circuit 3061, a hopper driving circuit 3063, a payout completion signal circuit 3065, a display portion driving circuit 3067 and a lamp driving circuit 3203.

The microcomputer 3031 is constructed from a main CPU 3032, a RAM 3033 and a ROM 3034. The main CPU 3032 runs based on programs stored in the ROM 3034, and inputs/outputs a signal with other elements through an I/O port 3039, so as to execute control of the entire slot machine 3001. Data and programs used when the main CPU 3032 runs are stored in the RAM 3033. For example, after-mentioned random numbers which are sampled by the sampling circuit 3036 are stored temporarily after a start of a game, also the code numbers of the respective video reels and the symbol numbers are stored in the RAM 3033. Further, the RAM 3033 sets in advance a storage area where an after-mentioned variable N is stored. Programs executed by the main CPU 3032 and permanent data are stored in the ROM 3034.

Especially, the programs stored in the ROM 3034 include game programs and game system programs (abbreviated as "the game programs and the like" hereinafter). Further, a lottery programs mentioned below is also included in the game programs.

The lottery program is a program used to determine the code numbers of the respective video reels which corresponds to each symbol rearranged in the respective symbol display areas of the symbol display frame 3111 on the liquid crystal panel 3005B. Then, in the lottery program, it is included symbol weighing data corresponding to each of plural kinds of payout rates (for example, 80%, 84%, and 88%). The symbol weighing data are the data indicating correlation between the code number of each video reel and one or plural random numbers belonging to a predetermined number range (0 to 255), every each of the nine video reels. In other words, each of the code number of one video reel is associated with one or more random numbers corresponding to the payout rate. The random numbers are extracted by the lottery program, and symbols specified finally by the random numbers are rearranged in the respective symbol display areas of the symbol display frame 3111 on the liquid crystal panel 3005B.

Random numbers over a predetermined range are generated by the random number generation circuit 3035, which is operated based on instructions from the main CPU 3032. The random numbers are voluntarily extracted from the random numbers generated by the random number generation circuit 3035 by the sampling circuit 3036, based on instructions from the main CPU 3032, and the extracted random numbers are input to the main CPU 3032. The base clock for running the main CPU 3032 is generated by the clock pulse generation circuit 3037, and signals which are generated by dividing the base clock in a predetermined frequency are input to the main CPU 3032 by the frequency divider 3038.

And to the main control board 3071, the touch panel 3101 is connected. The touch panel 3101 is arranged in front of the liquid crystal panel 3005B, and specifies the coordinate position of the portion touched by a player. The position on which a player touched and the direction of the movement of the touched portion are determined based on the specified coordinate position information. A signal corresponding to the determination is input to the main CPU 3032 through the I/O port 3039.

Also, the operation buttons 3011 for instructing an execution of a game are connected to the main control board 3071. The operation buttons 3011 include the variety of buttons (refer to FIG. 43). A signal corresponding to the depressing of these buttons is input to the main CPU 3032 through the I/O port 3039.

An effect signal which is used to conduct illumination effect is output to the above-mentioned light emitting portions 3020 and the topper effect device 3028 by the illumination effect driving circuit 3061. Then, the topper effect device 3028 is serially connected to the illumination effect driving circuit 3061 through the light emitting portions 3020.

A hopper 3064 is driven by the hopper driving circuit 3063 based on control of main CPU 3032. The hopper 3064 executes payout of coins, and coins are paid out from the coin tray 3016. Data of the number of coins are input from the connected coin detecting portion 3066 by the payout completion signal circuit 3065. When the number of coins becomes a predetermined number, a signal indicating completion of the coins is input to the main CPU 3032. The number of the coins paid out from the hopper 3064 is calculated by the coin detecting portion 3066, and the data of the number calculated are input to the payout completion signal circuit 3065. The each display operation of the payout amount display portion 3008 and credit amount display portion 3009 is controlled by the display portion driving circuit 3067.

The lamp driving circuit 3203 turns lamps 3204 on/off based on control of main CPU 3032. The lamps 3204 are provided inside the operation buttons 3011. The lamp 3204 inside the button with respect to which a player's operation is validated lights up, notifying the player of the button with respect to which operation is validated.

Furthermore, a sub control board 3072 is connected to the main control board 3071. The sub control board 3072 is connected to the liquid crystal panel 3005A, the liquid crystal panel 3005B and the speakers 3023.

Figure 37:
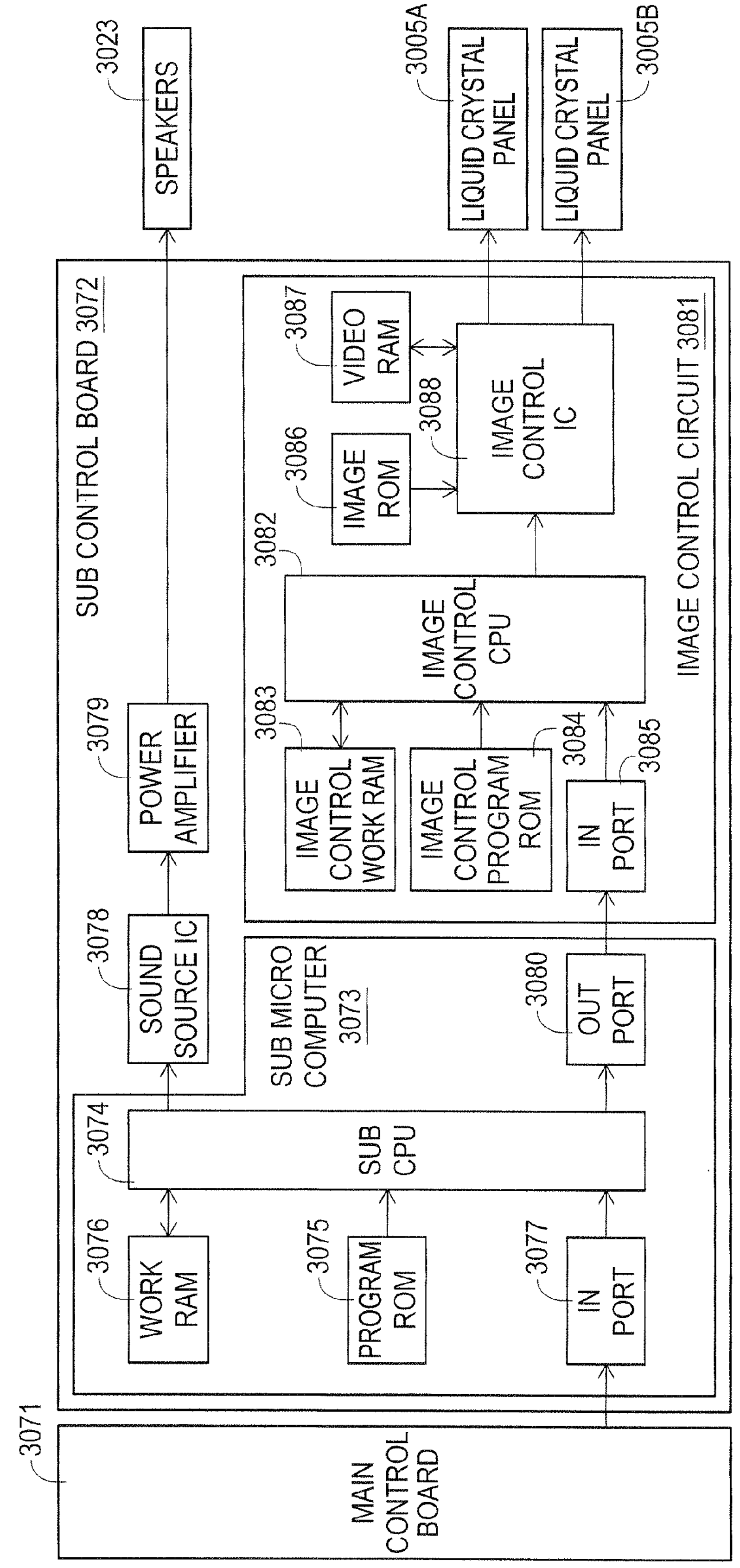
FIG. 37 is a block diagram showing an internal construction of a sub control board.

FIG. 37 is a block diagram showing an internal construction of the sub control board 3072. As shown in FIG. 37, a command from the main control board 3071 is input to the sub control board 3072. The display control on the liquid crystal panel 3005A of the upper display portion 3004A and the liquid crystal panel 3005B of the variable display portion 3004B, and the sound output control on the speakers 3023 are executed by the sub control board 3072. The sub control board 3072 is constructed on a circuit board different from the circuit board for the main control board 3071, and includes a microcomputer 3073 (abbreviated as "sub microcomputer" hereinafter) as a main construction element, and a sound source IC 3078, a power amplifier 3079 and an image control circuit 3081. The sound source IC 3078 controls the sound output from the speakers 3023, the power amplifier 3079 is used as an amplification device, and the image control circuit 3081 runs as a display control device of the liquid crystal panel 3005A and 3005B.

The sub microcomputer 3073 includes a sub CPU 3074, a program ROM 3075, a work RAM 3076, an IN port 3077 and an OUT port 3080. The control operations are executed by the sub CPU 3074 based on a control order sent from the main control board 3071, the program ROM 3075 is used as a memory device. Although a clock pulse generation circuit, a frequency divider, a random number generation circuit and a sampling circuit are not included in the sub control board 3072, the sub control board 3072 is constructed so as to execute random number sampling according to operation programs thereof. Control programs executed by the sub CPU 3074 are stored in the program ROM 3075. The work RAM 3076 is constructed as a temporary storing device when the above-mentioned control programs are executed by the sub CPU 3074.

The image control circuit 3081 includes an image control CPU 3082, an image control work RAM 3083, an image control program ROM 3084, an IN port 3085, an image ROM 3086, a video RAM 3087 and an image control IC 3088. Images displayed on the liquid crystal panel 3005A and 3005B are determined by the image control CPU 3082, based on parameters set by the sub microcomputer 3073, according to image control programs stored in the image control program ROM 3084.

The image control programs regarding to a display of the liquid crystal panel 3005A, 3005B and a variety of selection tables are stored in the image control program ROM 3084. The image control work RAM 3083 is constructed as a temporary storing device when the image control programs are executed by the image control CPU 3082. Images corresponding to contents determined by the image control CPU 3082 are formed by the image control IC 3088, and are output to the liquid crystal panel 3005A, 3005B.

In the image ROM 3086, dot data used to form images are stored. Thus, it stores the dot data on symbols drawn on the reel band of the each video reel. The video RAM 3087 runs as a temporary storing device when the images are formed by the image control IC 3088.

Further, based on a control signal from the main CPU 3032, the image control circuit 3081 performs display control of scrolling display/stop display of the video reels in the respective symbol display areas of the symbol display frame 3111 on the liquid crystal panel 3005B.

3-5. Outline of a Slot Game

The Third Embodiment

Next, winning combinations and the payout amounts corresponding to the winning combinations will be explained based on FIG. 38, wherein the winning combinations are symbol combinations when a slot game is executed by using each of the video reels in the slot machine 3001 according to the present embodiment. FIG. 38 is a payout table in which the winning combinations and the payout amounts corresponding to the winning combinations are shown when a slot game is executed by using each of the video reels.

Here, the payout amount shown in FIG. 38 indicates the payout amount when the bet amount is "1". Therefore, when the bet amount is "1", the payout amount shown in FIG. 38 is paid out, and when the bet amount is more than "2", the payout amount obtained by multiplying the payout amount shown in FIG. 38 with the bet amount is paid out.

Accordingly, if the nine scatter symbols of "FRANKENSTEIN" are rearranged in the symbol display frame 3111 of the liquid crystal panel 3005B, the amount obtained by multiplying the bet amount with 500 credits will be paid out. If the eight scatter symbols of "FRANKENSTEIN" are rearranged in the symbol display frame 3111 of the liquid crystal panel 3005B, the amount obtained by multiplying the bet amount with 300 credits will be paid out. Hereinafter, the payout amounts are set in a similar manner, as shown in FIG. 38, in accordance with the number of "FRANKENSTEIN" scatter symbols which have been rearranged in the symbol display frame 3111 of the liquid crystal panel 3005B.

With respect to each of the other scatter symbols including "BLUE 7", "BELL", "APPLE", "CHERRY", "ORANGE" and "PLUM", as well, the payout amounts as shown in FIG. 38 are set in a similar manner in accordance with the number of the same scatter symbols which have been rearranged in the symbol display frame 3111 of the liquid crystal panel 3005B.

As mentioned above, in the slot machine 3001 according to the present embodiment, a slot game is executed.

In other words, in a slot game, the slot game is executed by rearranging the plurality of same symbols specified by nine video reels in the symbol display frame 3111 of the liquid crystal panel 3005B. In the slot game, firstly, a part of symbol column (one symbol) drawn on the reel band of each video reel shown in FIG. 35, is arranged in each symbol display area of the symbol display frame 3111 on the liquid crystal panel 3005B (refer to FIG. 39). Here, after a player sets the bet amount by depressing the BET button among the operation buttons 3011, if the player depresses the SPIN button 3115 among the operation buttons 3011, each of the video reels rotates, the symbol column drawn on the reel band of each video reel shown in FIG. 35, is scrolled from up to down in the symbol display frame 3111 of the liquid crystal panel 3005B (refer to FIG. 40).

After a predetermined time, each of the video reels stops automatically, a part of symbol column (one symbol) drawn on the reel band of each video reel shown in FIG. 35, is rearranged in each symbol display area of the symbol display frame 3111 on the liquid crystal panel 3005B (refer to FIG. 39). On the other hand, each winning combination based on each the number of the scatter symbol is determined beforehand (refer to FIG. 38). When a symbol combination constructed from the nine symbols rearranged in the symbol display frame 3111 of the liquid crystal panel 3005B, realizes a winning combination specified by the number of the same scatter symbol, the payout amount obtained by multiplying the bet amount with the payout amount corresponding to the realized winning combination is awarded to the player.

3-6. Operation of the Slot Machine

The Third Embodiment

Figure 41:
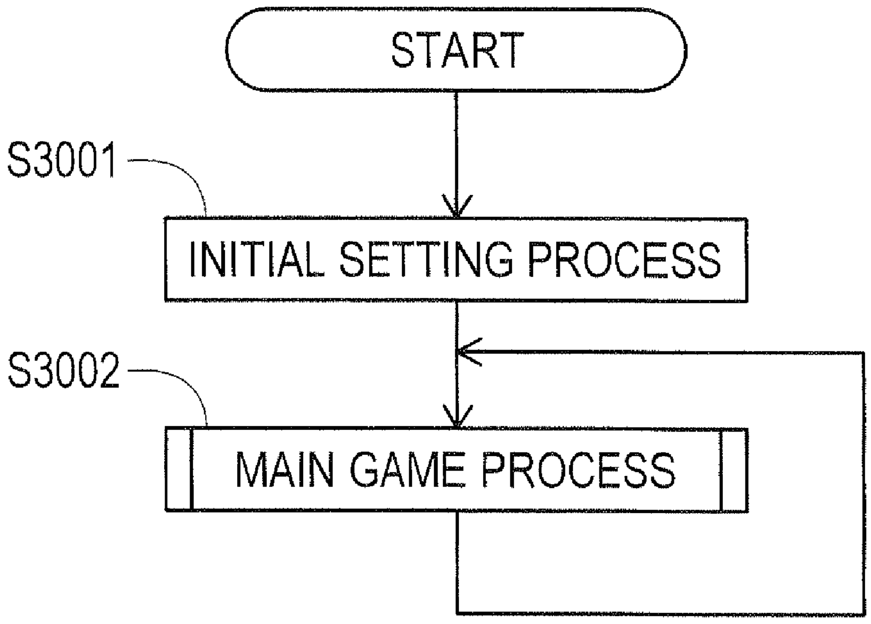
FIG. 41 is a flowchart of a main control program.

Next, a main control program executed in the slot machine 3001 according to the present embodiment will be explained with reference to drawings. FIG. 41 is a flowchart of the main control program.

First, when a power switch is pressed (power activation), the microcomputer 3031 is started to operate, an initial setting process is executed by the microcomputer 3031 in step (abbreviated as "S") 3001. In the initialization process, BIOS stored in the ROM 3034 is executed by the main CPU 3032. Compressed data included in the BIOS are expanded to the RAM 3033, and when the BIOS expansion to the RAM 3033 is executed, a diagnosing process and initialization process of various peripheral devices are executed. Also, the game programs and the like are written from the ROM 3034 to the RAM 3033 by the main CPU 3032, so as to obtain the payout rate setting data and country ID information. Also, during execution of the initial setting process, a verification process to each program is executed.

Then in S3002, the main CPU 3032 reads out the game programs and the like from the RAM 3033, and executes the programs in sequence so as to conduct the main game process. A game is executed in the slot machine 3001 according to the present embodiment by executing the main game process. Then, the main game process is repeated when the power is supplied to the slot machine 3001.

Figure 42:
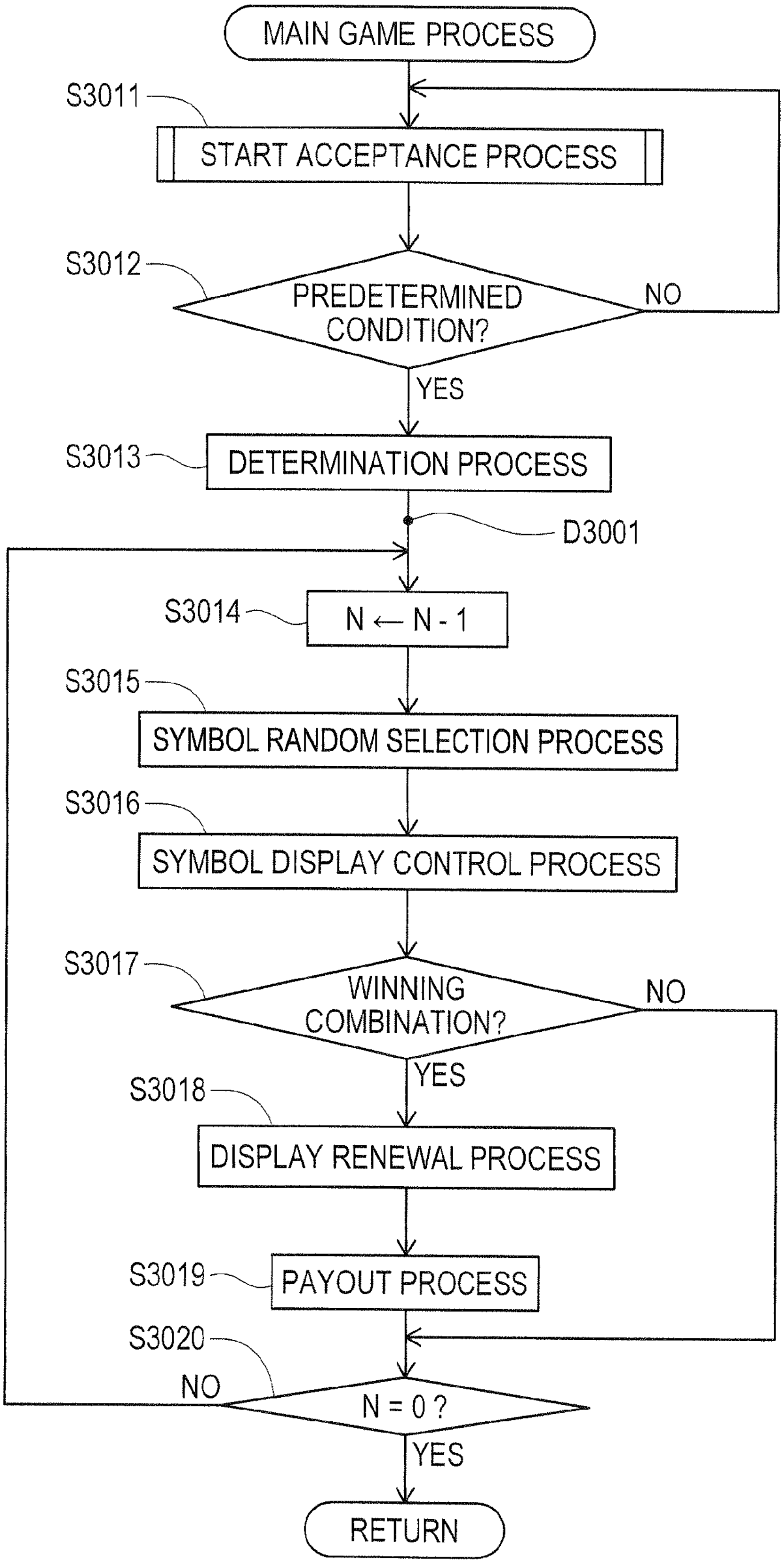
FIG. 42 is a flowchart of a main game process program.

Next, a sub process of the main game process in S3002 above will be explained based on FIG. 42. FIG. 42 is a flowchart of the main game process program in the slot machine 3001 according to the present embodiment. Incidentally, each program shown in the flowchart of FIG. 42 is stored in the ROM 3034 or the RAM 3033 of the slot machine 3001, and is executed by the main CPU 3032.

Figure 44:
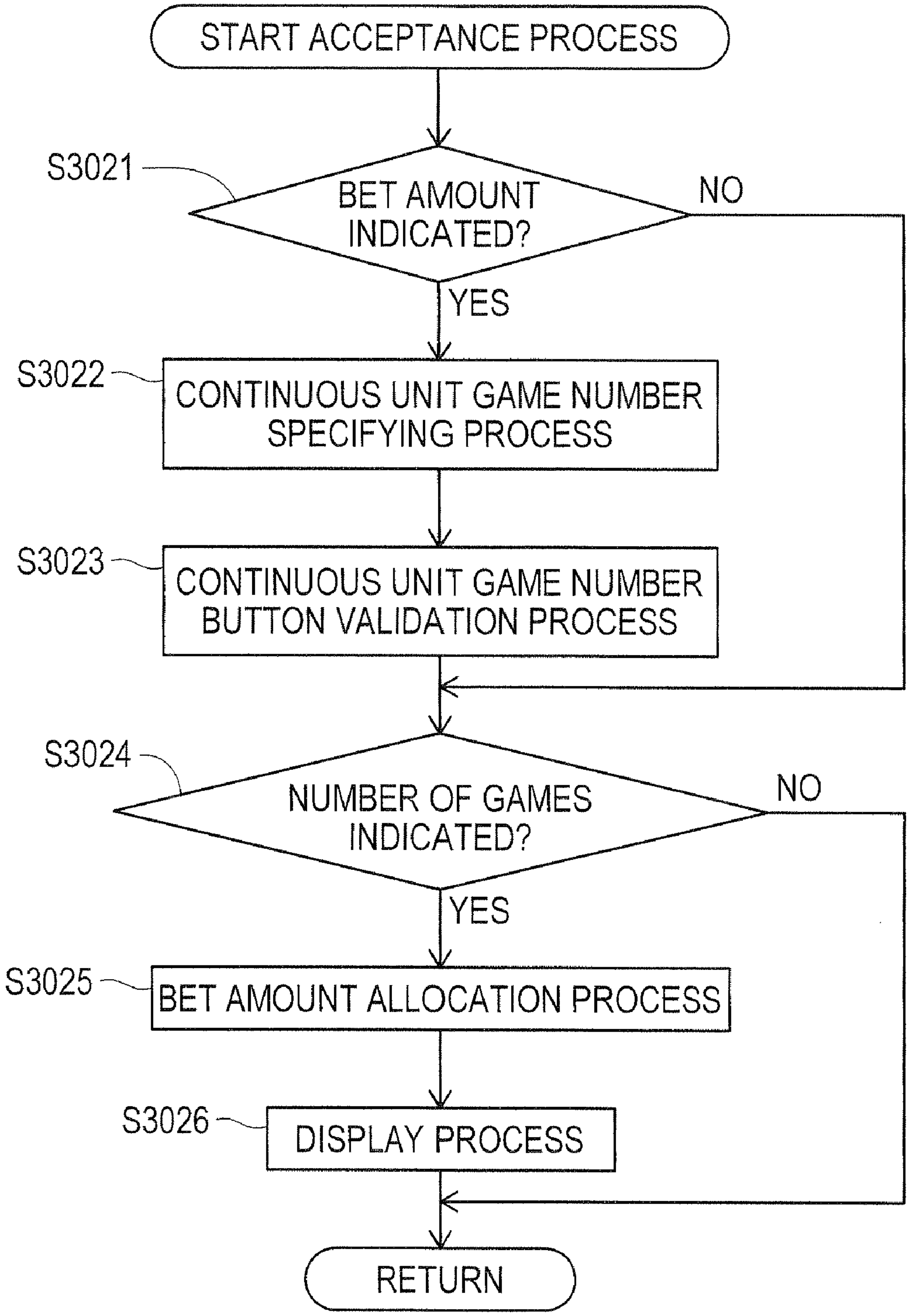
FIG. 44 is a flowchart of a start acceptance process program.

First, as shown in FIG. 42, in S3011, a start acceptance process is executed by the main CPU 3032. Then, a sub process of the start acceptance process in S3011 above will be explained based on FIG. 44. FIG. 44 is a flowchart of the start acceptance process program in the slot machine 3001 according to the present embodiment. Incidentally, each program shown in the flowchart of FIG. 44 is stored in the ROM 3034 or the RAM 3033 of the slot machine 3001, and is executed by the main CPU 3032.

In the start acceptance process in S3011 above, the main CPU 3032 determines, in S3021, whether or not the bet amount has been indicated, as shown in FIG. 44. Here, in a case of an input signal from any of the BET 1 button 3110, BET 5 button 3131, BET 10 button 3112, BET 20 button 3113 and BET 40 button 3114, it is determined that the bet amount has been indicated. However, if the indicated amount exceeds the bet amount corresponding to the credit amount owned by a player at the moment, it is determined that no bet amount has been indicated. At this point, if no bet amount has been indicated (S3021: NO), the process proceeds to S3024 described below. In contrast, if the bet amount has been indicated (S3021: YES), the process proceeds to S3022.

In S3022, the main CPU 3032 executes a continuous unit game number specifying process. In this process, the main CPU 3032 specifies one or a plurality of "continuous games" including a number of unit games which can be indicated by a player, through the bet amount indicated in S3021 above and the minimum bet amount (in the present embodiment, the bet amount being "1") with respect to a unit game which can be set by a player.

In S3023, the main CPU 3032 executes a continuous unit game number button validation process. In this process, the main CPU 3032 accepts the player's operating the button related to the "continuous game" specified in S3022 above, with respect to the PLAY 1 GAME button 3104, PLAY 5 GAMES button 3105, PLAY 10 GAMES button 3106, PLAY 50 GAMES button 3107 and PLAY MAX GAMES button 3108.

Incidentally, in a case of a rate of 1 credit for 1 bet, as long as the credit amount owned by a player at the moment is not "0", the player's operation with respect to the PLAY MAX GAMES button 3108 is accepted.

Further, the main CPU 3032 turns on the lamp 3204 provided inside the button related to the "continuous game" specified in S3022 above, by sending a control signal to the lamp driving circuit 3203. As a result, a player is notified that the operation of that button is valid.

In S3024, the main CPU 3032 determines whether or not the number of games has been indicated. Here, with respect to the PLAY 1 GAME button 3104, PLAY 5 GAMES button 3105, PLAY 10 GAMES button 3106, PLAY 50 GAMES button 3107 and PLAY MAX GAMES button 3108, if an input signal is sent from any of the buttons which have been validated in S3023 above, it is determined that the number of games has been indicated. At this point, if the number of games has not been indicated (S3024: NO), the process proceeds to above S3012 shown in FIG. 42. In contrast, if the number of games has been indicated (S3024: YES), the process proceeds to S3025.

Incidentally, the main CPU 3032 assigns the number of games indicated in S3024 above to the variable N. The main CPU 3032 displays the variable N stored in the RAM 3033 on the game number display portion 3201 of the liquid crystal panel 3005B by sending a control signal to the sub control board 3072.

In S3025, the main CPU 3032 executes a bet amount allocation process. In this process, the main CPU 3032 allocates the bet amount indicated in S3021 above in an equal manner to each unit game corresponding to the number of games indicated in S3024 above (refer to FIG. 45 above). As a result of this equal allocation, if a surplus occurs with respect to the bet amount indicated in S3021 above, the main CPU 3032 stores the surplus of the bet amount in the RAM 3033, as surplus information. The main CPU 3032 stores the sum of the bet amount thus evenly allocated in the RAM 3033, as total bet amount information.

The main CPU 3032 stores the bet amount thus allocated in the RAM 3033, as bet allocation information. Then, the main CPU 3032 displays the bet allocation information (the bet amount which is evenly allocated to each unit game) which is stored in the RAM 3033 on the bet amount display portion 3202 of the liquid crystal panel 3005B, by sending a control signal to the sub control board 3072. Then, the process proceeds to above S3012 shown in FIG. 42.

Returning to FIG. 43, in S3012, the main CPU 3032 determines whether or not a predetermined condition is met.

Here, the predetermined condition is that the SPIN button 3115 is depressed. Accordingly, this determination is made based on a signal which is input to the main CPU 3032 depending on depressing the SPIN button 3115. At this point, if the SPIN button 3115 is not depressed (S3012: NO), the process returns to the start acceptance process (S3011) again. Thereby, an operation of changing the bet amount, an operation of changing the number of games and the like are possible. In contrast, if the SPIN button 3115 is depressed (S3012: YES), the process proceeds to S3013.

In S3013, the main CPU 3032 executes a determination process. In this process, the bet amount set based on the above bet operation is reduced from the credit amount owned by the player at the moment. Incidentally, the credit amount after the reduction is stored in the RAM 3033 as credit information. Then, by sending a control signal to the display portion driving circuit 3067, the main CPU 3032 displays the credit information (the credit amount after the above reduction) stored in the RAM 3033 on the credit amount display portion 3009 of the liquid crystal panel 3005B.

The main CPU 3032 includes the surplus information (the surplus of the bet amount which occurred in the allocation process of S3025) stored in the RAM 3033 to the credit information stored in the RAM 3033, at a rate of 1 credit for 1 bet. Then, by sending a control signal to the display portion driving circuit 3067, the main CPU 3032 displays the credit information (the credit amount after the above addition) stored in the RAM 3033 on the credit amount display portion 3009 of the liquid crystal panel 3005B. Further, the main CPU 3032 overwrites "0" in the RAM 3033, as the surplus information.

Further, the main CPU 3032 invalidates the operation with respect to all buttons including the PLAY 1 GAME button 3104, PLAY 5 GAMES button 3105, PLAY 10 GAMES button 3106, PLAY 50 GAMES button 3107 and PLAY MAX GAMES button 3108. Simultaneously, by sending a control signal to the lamp driving circuit 3203, the main CPU 3032 turns off the lamp 3204 provided inside each of the buttons 3104 to 3108.

In S3014, the main CPU 3032 decrements the variable N. Then, by sending a control signal to the sub control board 3072, the main CPU 3032 displays the variable N stored in the RAM 3033 on the game number display portion 3201 of the liquid crystal panel 3005B.

In S3015, the main CPU 3032 executes a symbol random selection process. Specifically, when the lottery program included in the game programs is executed by the main CPU 3032, the random number corresponding to each video reel respectively is selected from a range of "0 to 255". Then, with reference to the symbol weighting data corresponding to the payout rate setting data, based on the nine random numbers, the code number of each video reel is determined by the main CPU 3032. The main CPU 3032 stores the determined code number of each video reel in the RAM 3033 by overwriting code number information in the RAM 3033 with the determined code number of each video reel so as to correspond to each symbol display area of the symbol display frame 3111 on the liquid crystal panel 3005B. Thereafter, the process proceeds to S3016.

Here, the code number of each video reel is associated with the symbol number to be rearranged in each symbol display area of the symbol display frame 3111 on the liquid crystal panel 3005B, so each symbol to be rearranged in such game is determined by overwriting the code number information in the RAM 3033 with the code number of each video reel determined by the main CPU 3032 so as to correspond to each symbol display area of the symbol display frame 3111 on the liquid crystal panel 3005B. For example, if the main CPU 3032 determines that all of the code number of each video reel are "21" and then overwrites the code number information in the RAM 3033 with the code number of each video reel so as to correspond to each symbol display area of the symbol display frame 3111 on the liquid crystal panel 3005B, the main CPU 3032 determines to rearrange the nine symbols of "FRANKENSTEIN" (refer to FIG. 35). Thus, by overwriting the code number information in the RAM 3033 with the code number of each video reel selected by a lottery so as to correspond to each symbol display area of the symbol display frame 3111 on the liquid crystal panel 3005B, each symbol to be rearranged in a unit game of a slot game is determined.

Subsequently, when proceeding to S3016, the main CPU 3032 executes a symbol display control process. In other words, by sending a control signal to the sub control board 3072, the main CPU 3032 starts a scrolling display of each video reel in each symbol display area of the symbol display frame 3111 on the liquid crystal panel 3005B. After that, an effect mode (a display mode of images on the liquid crystal panel 3005B and a sound output mode from the speakers 3023) for each unit game is determined by the main CPU 3032, and the sub control board 3072 is ordered to start the effect in a predetermined effect pattern. Then, when a predetermined timing to stop displaying each video reel in scrolling manner comes, the main CPU 3032, by sending a control signal to the sub control board 3072, stops scrolling of each video reel being displayed. The stop operation is based on the code number stored in the RAM 3033 by overwriting the code number information in the RAM 3033 with the code number so as to correspond to each symbol display area of the symbol display frame 3111 on the liquid crystal panel 3005B. With this, each symbol which determined in S3015 above-mentioned is rearranged in each symbol display area of the symbol display frame 3111 on the liquid crystal panel 3005B.

After that, when proceeding to S3017, the main CPU 3032 determines whether or not there is a winning combination. The determination is made based on the code number stored in the RAM 3033 by overwriting the code number information in the RAM 3033 with the code number so as to correspond to each symbol display area of the symbol display frame 3111 on the liquid crystal panel 3005B. At this point, if there is not a winning combination (S3017: NO), the process proceeds to S3020 described below. In contrast, if there is a winning combination (S3017: YES), the process proceeds to S3018.

In S3018, the main CPU 3032 executes a display renewal process. Specifically, first, the payout amount obtained by multiplying the payout amount corresponding to the winning combination (the number of the same symbol) rearranged in the symbol display frame 3111 of the liquid crystal panel 3005B with the bet amount is computed. Incidentally, the computation is executed based on the bet allocation information in the RAM 3033 and the payout table of FIG. 38. In case that there is more than one payout amount corresponding to the winning combination (the number of the same symbol), the computation is executed by adding up these payout amounts. The computed payout amount is stored in RAM 3033 as payout information. After that, by sending a control signal to the display portion driving circuit 3067, the main CPU 3032 displays the payout information stored in the RAM 3033 (the above-mentioned computed amount) on the payout amount display portion 3008 of the liquid crystal panel 3005B.

Then, the main CPU 3032 executes a payout process in S3019. In the payout process, the payout amount awarded to a player in a slot game is paid out to the player based on the payout information stored in the RAM 3033.

When the pay out is executed, the credit amount stored in the RAM 3033 as the payout information (the payout amount awarded to a player in a slot game) are added to the credit amount stored in the RAM 3033 as the credit information, and the added value is overwritten in the RAM 3033 as the credit information. After that, by sending a control signal to the display portion driving circuit 3067, the main CPU 3032 displays the credit information stored in the RAM 3033 (the added value computed in S3019) on the credit amount display portion 3009 of the liquid crystal panel 3005B.

Incidentally, in the payout process, the credit amount owned by a player at the moment may be paid out by coins corresponding to the credit amount (one credit equals to one coin) based on the player's depressing the CASHOUT button 3102, or may also be paid out by a ticket with a bar code which is printed by the ticket printer 3014.

Then, after the main CPU 3032 executes the above-mentioned payout process in S3019, the process proceeds to S3020.

In S3020, the main CPU 3032 determines whether or not the variable N is "0". At this point, if the variable N is not "0" (S3020: NO), the process returns to S3014 above. As a result, the unit games corresponding to the number of games indicated in S3024 above are executed by auto-play with the bet amount which is allocated in S3025 above. In contrast, if the variable N is "0" (S3020: YES), the main CPU 3032 overwrites "0" in the RAM 3033, as the bet allocation information, and at the same time, displays "0" on the bet amount display portion 3202 of the liquid crystal panel 3005B by sending a control signal to the sub control board 3072. Then, the process returns to S3011 above, at which the main game process is repeated as shown in FIG. 43.

Figure 49:
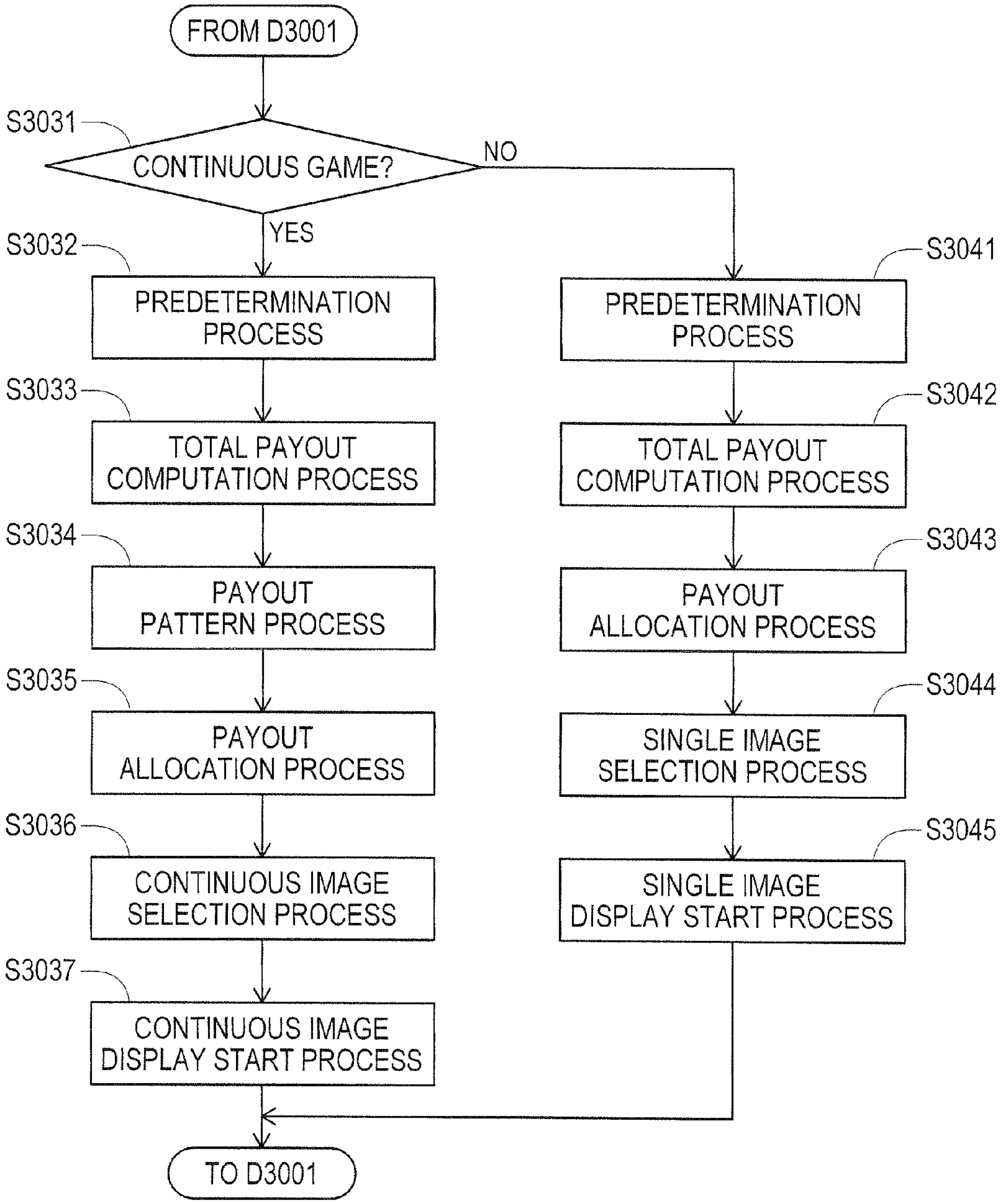
FIG. 49 is a flowchart of a main game process program.

Incidentally, in the present embodiment, S3015 and S3016 are forcibly controlled by a main game process program as shown in FIG. 49 described below.

3-7. Display of Effect Images Suitable for the Payout Pattern

The Third Embodiment

In the slot machine 3001 according to the present embodiment, the unit game is executed independently, or alternatively, the unit games constituting the "continuous game" indicated by a player are executed continuously, as described above. In this respect, if the unit game is executed independently, a single image suitable for the presence or absence of a payout is continuously displayed on the liquid crystal display 3005A from a start of that unit game till an end of that unit game.

Alternatively, if the unit games constituting the "continuous game" indicated by a player are executed continuously, a singe image suitable for the presence or absence of a payout is continuously displayed on the liquid crystal display 3005A from a start of each unit game till an end of each unit game. However, in the present embodiment, if the unit games constituting the "continuous game" indicated by a player are executed continuously, a continuous image made up of a combination of a plurality of single images is continuously displayed on the liquid crystal display 3005A from a start of that "continuous game" till an end of that "continuous game". The continuous image is made so as to be suitable for a payout pattern constituted in accordance with the presence or absence of payouts corresponding to the number of times of the unit games constituting the "continuous game".

For that purpose, in the slot machine 3001 according to the present embodiment, a success single image suitable for the case where a payout occurs and a fail single image suitable for the case where no payout occurs are stored in the image ROM 3086 (refer to FIG. 37), as single images corresponding to the unit game. The screen time of each single image is the same as the time from a start of the unit game till an end of the unit game.

The slot machine 3001 according to the present embodiment comprises continuous images respectively corresponding to all the payout patterns which are conceivable for the "continuous game" that can be indicated by a player. For convenience of the description, in the slot machine 3001 according to the present embodiment, the number of times of the unit games constituting the "continuous game" which can be indicated by a player is assumed to be "2" through "100".

Figures 47, 48:
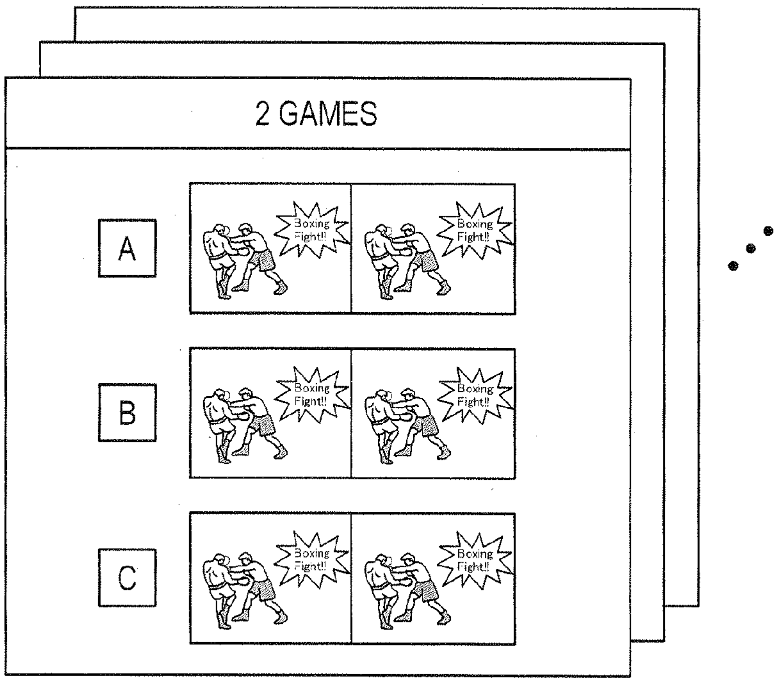
FIG. 47 is a view showing one example of a data table.
FIG. 48 is a view showing one example of a data table.

In the slot machine 3001 according to the present embodiment, all the payout patterns which are conceivable for the "continuous game" that can be indicated by a player are managed in data tables for the payout patterns as shown in FIG. 47. These data tables for the payout patterns are stored in the ROM 3034.

For instance, the data table for the payout patterns as shown in FIG. 47 corresponds to the case that the number of times of the unit games constituting the "continuous game" is "2". The data table for the payout patterns stores three payout patterns, not including the pattern for the case that a payout does not occur in any of the unit games. In FIG. 47, "0" indicates the presence of a payout, and "X" indicates the absence of a payout. Further, data for specifying a continuous image which is suitable for each payout pattern is stored in the data table for the payout patterns so as to correspond to each payout pattern. In FIG. 47, "A", "B" and "C" indicate data that specifies the continuous image.

In the slot machine 3001 according to the present embodiment, the continuous images suitable for each payout pattern in the "continuous game" indicated by a player are managed based on the data tables for the continuous images as shown in FIG. 48. These data tables for the continuous image are stored in the image ROM 3086.

For instance, the data table for the continuous images as shown in FIG. 48 corresponds to the case that the number of times of the unit games constituting the "continuous game" is "2". The data table for the continuous image stores continuous images suitable for each payout pattern by association with data for specifying these continuous images. In FIG. 48, “A”, “B” and “C” indicate data for specifying these continuous images.

Each continuous image is made up of a combination of the success single image and the fail single image in a sequence suitable for the payout pattern. The screen time for each continuous image is the same as the time from a start of that “continuous game” till an end of that “continuous game”.

The continuous images suitable for each payout pattern for the case that the number of times of the unit games constituting the “continuous game” is “2” are respectively stored and managed based on the data tables for the payout patterns as shown in FIG. 47 and the data tables for the continuous images as shown in FIG. 48. Incidentally, the continuous image suitable for the payout pattern corresponding to the case that no payout occurs is made up of the fail single images, the fail single images corresponding to the number of times of the unit games constituting the “continuous game”.

Although not shown, the continuous images suitable for each payout pattern in the case that the number of times of the unit games constituting the “continuous game” is from “2” through “99” are stored and managed in a similar fashion.

Then, in the slot machine 3001 according to the present embodiment, the main CPU 3032 executes a main game process program as shown in FIG. 49 at a point in time D3001 placed between S3013 and S3014 of the main game process program as shown in FIG. 42 above. Incidentally, a program shown in the flowchart of FIG. 49 is stored in the ROM 3034 and the RAM 3033 of the slot machine 3001, and is executed by the main CPU 3032.

After executing the determination process for the main game process program in S3013 of FIG. 42 above, the main CPU 3032 determines whether or not a “continuous game” has been realized in S3031 of FIG. 49. At this point in time, the number of times of the unit games constituting the “continuous game” coincides with a variable N. Accordingly, if the variable N is higher than “1”, the main CPU 3032 determines that a “continuous game” has been realized. At this point, if a “continuous game” has not been realized (S3031: NO), the process proceeds to S3041. In contrast, if a “continuous game” has been realized (S3031: YES), the process proceeds to S3032.

In S3032, the main CPU 3032 executes a predetermination process. In this process, the main CPU 3032 allocates at random the total bet amount including in the total bet amount information stored in the RAM 3033 to the unit games, the unit games corresponding to the number of games indicated in S3024 of FIG. 44 above (refer to FIG. 33 above and FIG. 46 above). The main CPU 3032 may also allocate this total bet amount evenly (refer to FIG. 45 above).

In S3033, the main CPU 3032 executes a total payout computation process. In this process, the main CPU 3032 computes in advance the total payout which is to be awarded to a player in the “continuous game”. This pre-computation is executed by repeating S3015, S3016 and S3019 in FIG. 42 above, by the number of times corresponding to the number of games indicated in S3024 of FIG. 44 above, while using each of the bet amounts allocated in S3032 above.

In S3034, the main CPU 3032 executes a payout pattern process. In this process, the main CPU 3032 specifies one payout pattern from the data table for payout patterns corresponding to the number of times (N times) of the unit games constituting the “continuous game”.

In S3035, the main CPU 3032 executes a payout allocation process. In this process, the main CPU 3032 allocates the total payout which was computed in advance in S3033 above to each unit game constituting the “continuous game” by means of the payout pattern specified in S3034 above.

In S3036, the main CPU 3032 executes a continuous image selection process. In this process, the main CPU 3032 reads out the data specifying the continuous image suitable for the payout pattern specified in S3034 above from the data table for the payout patterns, the number of which corresponds to the number of times (N times) of the unit games constituting the “continuous game”.

In S3037, the main CPU 3032 executes a continuous image display start process. In this process, the main CPU 3032 starts a display of the continuous image specified in S3036 above on the liquid crystal display 3005A, by sending a control signal to the sub control board 3072. This control signal includes data that was read out in S3036 above and data showing the variable N.

Incidentally, if the total payout computed in advance in S3033 above is 0, the main CPU 3032 executes control so that the fail single image is repeatedly displayed on the liquid display 3005A each time the unit game constituting the “continuous game” is executed, by sending a control signal to the sub control board 3072.

Then, after the process of S3037 above has ended, the process proceeds to S3014 of the main game process program in FIG. 42 above. At this time, the main CPU 3032 forcibly controls each process in S3015 and S3016 of the main game process program in FIG. 42 above, so that the payouts allocated in S3035 above is awarded to a player by means of the payout pattern specified in S3034 above.

However, at the time of this forced control, the main CPU 3032 executes control so that the bet amount allocated with respect to a unit game which progresses is updated and stored as the bet allocation information each time each of the unit games constituting the “continuous game” indicated by a player is executed. Further, the main CPU 3032 executes control so that the bet allocation information thus updated and stored is displayed on the bet amount display portion 3202 of the liquid crystal panel 3005B by sending a control signal to the sub control board 3072 each time each of the unit games constituting the “continuous games” indicated by a player is executed.

Incidentally, if the total payout which was computed in advance in S3033 above is 0, each processes in S3015 and S3016 of the main game process program in FIG. 42 above are forcibly controlled so as to prevent awarding of the payout to a player.

Alternatively, if a “continuous game” has not been realized (S3031: NO), the unit game is executed independently. In this case, the main CPU 3032 executes the processes following S3041. First, the main CPU 3032 executes a predetermination process in S3041. In this process, the main CPU 3032 allocates the total bet amount including in the total bet amount information stored in the RAM 3033 to the unit game.

In S3042, the main CPU 3032 executes a total payout computation process. In this process, the main CPU 3032 computes in advance the total payout which is to be awarded to a player in the unit game. This pre-computation is made by executing S3015, S3016 and S3019 in FIG. 42 above, while using the bet amount allocated in S3041 above.

In S3043, the main CPU 3032 executes a payout allocation process. In this process, the main CPU 3032 allocates the total payout which was computed in advance in S3042 above only to the unit game.

In S3044, the main CPU 3032 executes a single image selection process. In this process, the main CPU 3032 reads out data specifying the success single image.

In S3045, the main CPU 3032 executes a single image display start process. In this process, the main CPU 3032 starts a display of the success single image on the liquid crystal display 3005A by sending a control signal including data which was read out in S3044 above to the sub control board 3072.

Incidentally, if the total payout which was computed in advance in S3042 above is 0, the main CPU 3032 executes control so that the fail single image is repeatedly displayed on the liquid crystal display 3005A when the unit game is executed, by sending a control signal to the sub control board 3072.

Then, after the process in S3045 above has ended, the process proceeds to S3014 of the main game process program in FIG. 42 above. At this time, the main CPU 3032 forcibly controls each process in S3015 and S3016 of the main game process program in FIG. 42 above so that the total payout which was allocated in S3043 above is awarded to a player. If the total payout computed in advance in S3042 above is 0, each processes in S3015 and S3016 of the main game process program in FIG. 42 above are forcibly controlled so as to prevent awarding of the payout to a player.

3-8. Other

The Third Embodiment

The present invention is not limited to the above-described third embodiment, and various modifications and alterations can be made thereto without departing from the spirit of the invention.

For instance, the present invention may also be applied with respect to a gaming machine wherein unit games such as card games, roulette games, dice games or mahjong game or the like are repeatedly executed.

The slot machine 3001 according to the present embodiment may also generate the payout patterns on a case-by-case basis. For this purpose, in the payout pattern process in S3034 of FIG. 49 above, the presence or absence of payouts corresponding to the number of the unit games constituting this "continuous game" is determined at random.

Figure 50:
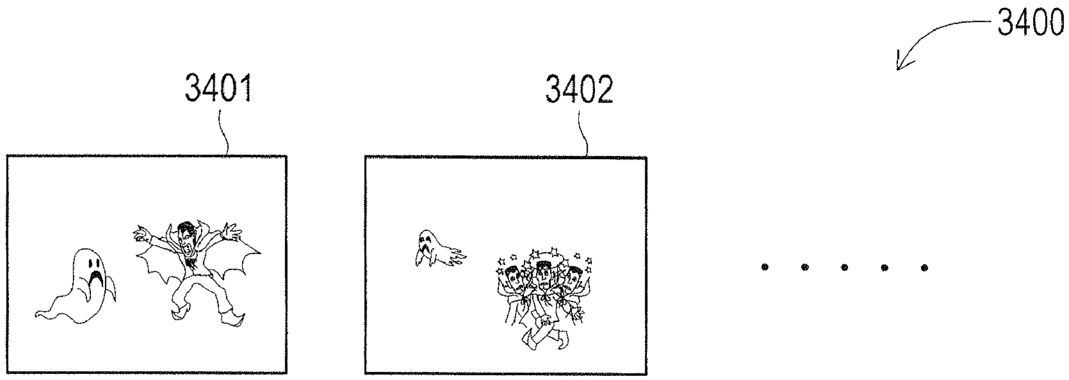
FIG. 50 is a view showing one example of an image group.

Further, the continuous image suitable for the respective payout pattern may also be edited on a case-by-case basis. For this purpose, as shown in FIG. 50, for instance, an image group 3400 made up of 100 single images 3401, 3402, . . . is stored in the image ROM 3086 (refer to FIG. 37). Then, the main CPU 3032 selects the number of N images from the image group 3400 in accordance with the rules set based on the bet allocation information stored in the RAM 3033 and the generated payout pattern above. The main CPU 3032 generates the continuous image by combining the plurality of images thus selected in the selection sequence.

The main CPU 3032 may also select the single image displayed on the liquid crystal display 3005A at the time the unit game is being executed from the image group 3400 in accordance with the rules set in accordance with the bet allocation information stored in the RAM 3033.

4-1. Characteristics of the Present Invention

The Fourth Embodiment

Next, the fourth embodiment of the present invention, as applied to a slot machine which is one example of a gaming machine of the present invention, will be described while referring to the accompanying drawings.

A game which is executed in the slot machine of the present embodiment is constituted of a slot game in which scatter symbols are employed.

Figure 51:
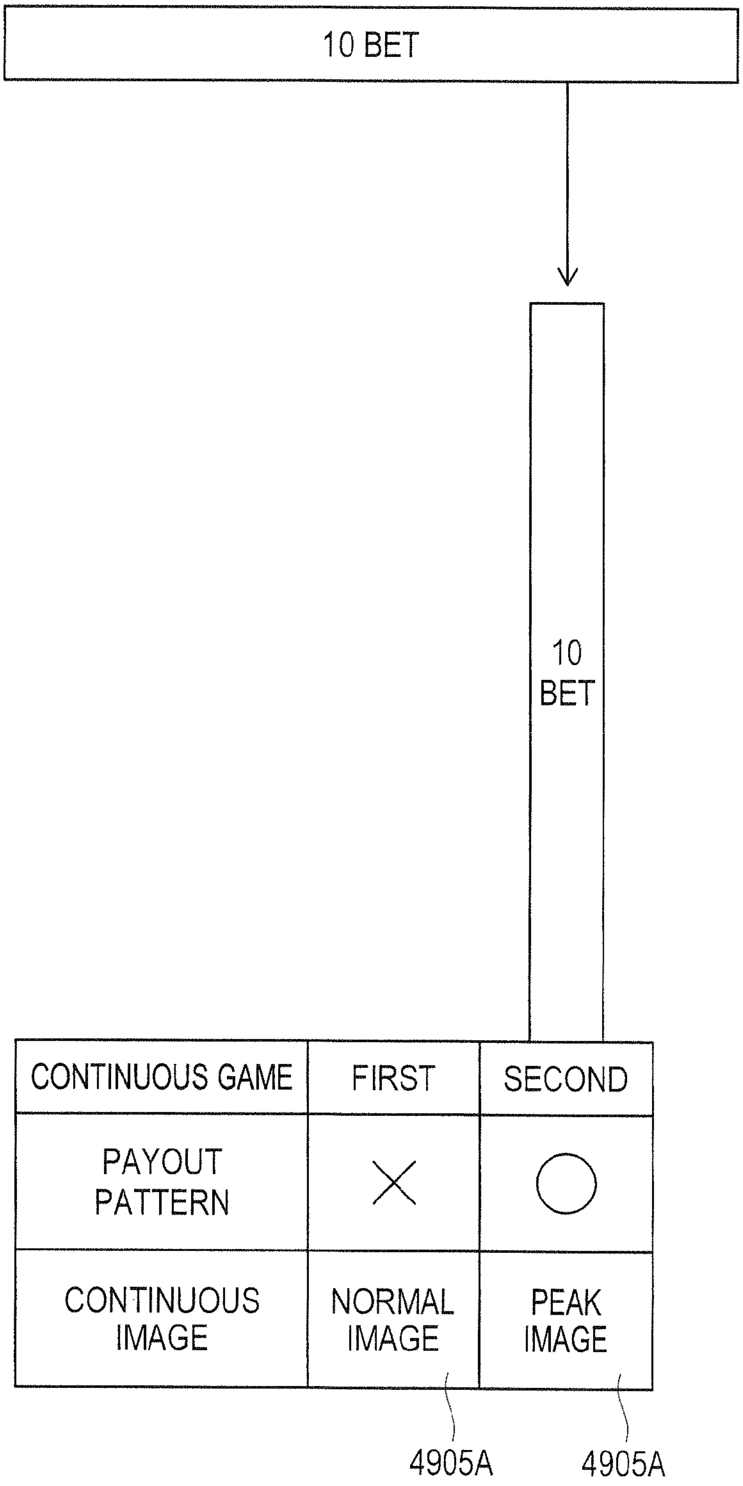
FIG. 51 is a view showing characteristics of a slot machine which is one fourth embodiment of the present invention.

In the slot game, as shown in FIG. 51, a symbol display frame 4111 displaying nine symbols is displayed on the well-known liquid crystal panel 4005B. The nine symbols are arranged in a matrix comprising three rows by three columns. In this respect, within the symbol display frame 4111, nine symbol display areas, where one of many symbols drawn on a reel band of one video reel is arranged, are positioned like a matrix comprising three rows by three columns. That is, one symbol display area is assigned to each of the nine video reels. Then, one of the symbols drawn on the reel band of each video reels is arranged in each of the symbol display areas.

Figure 56:
FIG. 56 is a payout table in which winning combinations and the payout amounts corresponding to the winning combinations are shown when a slot game is executed by using each of the reels.
Figure 56:
Figure 56:
Figure 56:
Figure 56:
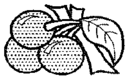
Figure 56:
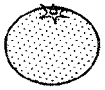
Figure 56:
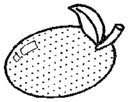

In the meantime, as shown in FIG. 56, various winning combinations are previously determined based on the number of the same scatter symbol. When each of the video reels is scrolled and stopped (refer to FIG. 57 and FIG. 58), a symbol is rearranged one by one in each of the symbol display areas of the symbol display frame 4111, as the liquid crystal panel 4005B shown in FIG. 51. At this time, when the nine symbols that are rearranged in the symbol display frame 4111 compose any one of the winning combinations, the payout amount corresponding to the winning combination composed is displayed in a payout amount display portion 4008. With this, a unit game is configured.

In the slot machine 4001 of the present embodiment, the player can indicate that a unit game will be executed continuously by a predetermined number of times such as "1", "5", "10" and the like. A group of unit games which the player indicated as a continuous play corresponds to a "continuous game". This indication is made by operating a plurality of buttons which are respectively provided in accordance with the number of times of the unit games constituting the "continuous game" (refer to FIG. 61).

The player can indicate the bet amount, such as "1", "5", "10" and the like, with respect to the "continuous game". This indication is made by operating a plurality of buttons which are respectively provided in accordance with the bet amount (refer to FIG. 61).

In this respect, in the slot machine 4001 of the present embodiment, once the player indicates the bet amount with respect to the "continuous game", one or a plurality of "continuous games" including unit games that are executed by the number of times which can be indicated by the player is specified through the bet amount with respect to the "continuous game" indicated by the player and the minimum bet amount with respect to a unit game which can be set by the player (in the present embodiment, the bet amount being "1"). Thereafter, the operation with respect to all buttons corresponding to the "continuous game" thus specified is validated.

The player operates any of the buttons thus validated, whereby the "continuous game", which is constituted of unit games executed by the number of times indicated by the player through the above-mentioned operation, is executed.

Figure 63:
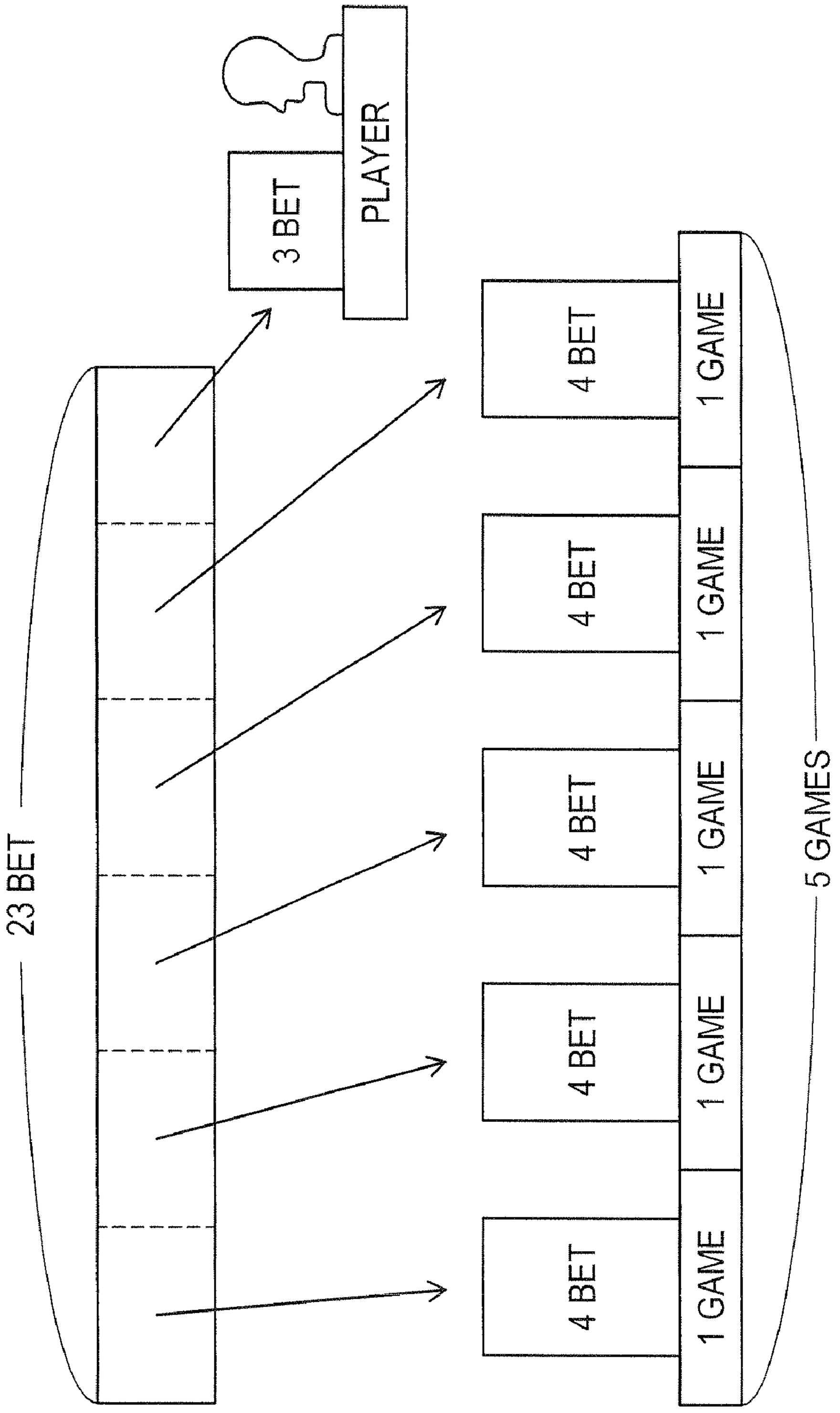
FIG. 63 is a view showing characteristics of the slot machine.

The bet amount with respect to the "continuous game" indicated by the player is evenly allocated to each unit game constituting the "continuous game" indicated by the player. More specifically, as shown in FIG. 63, for instance, the bet amount with respect to the "continuous game" indicated by the player is assumed to be "23", and the number of times for the unit games constituting the "continuous game" indicated by the player is assumed to be "5". In this case, the bet amount "4" is evenly allocated with respect to each unit game constituting the "continuous game" indicated by the player.

Incidentally, the bet amount which was left after the bet amount has been evenly allocated with respect to each unit game constituting the "continuous game" is returned to the player. In the case of FIG. 63, the bet amount "3" is returned to the player.

Further, the following can be given as characteristics of the present invention.

More specifically, a result of the payout for each unit game constituting the "continuous game" is determined in advance before a start of the "continuous game". The bet amount with respect to the "continuous game" indicated by a player, except for the bet amount that was returned to the player, is allocated at random with respect to each unit game constituting the "continuous game".

Figure 64:
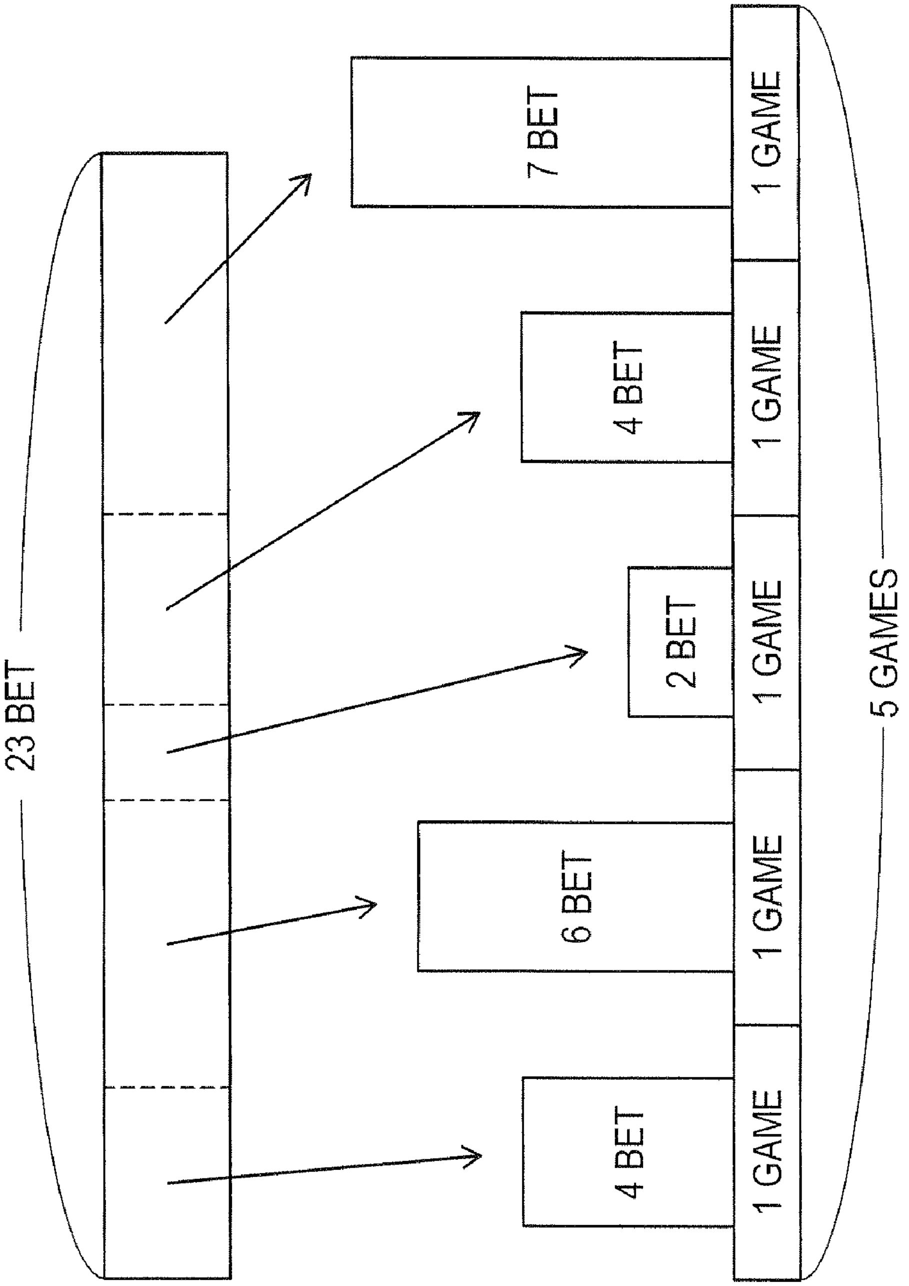
FIG. 64 is a view showing characteristics of the slot machine.

More specifically, as shown in FIG. 64, for instance, the bet amount with respect to the "continuous game" indicated by a player is assumed to be "23" and the number of times of the unit games constituting the "continuous game" indicated by the player is assumed to be "5". In the case shown in FIG. 64, the bet amount is respectively allocated at random to 5 unit games constituting the "continuous game" indicated by the player, in the order "4", "6", "2", "4" and "7". However, with this random allocation, the respective bet amounts are adjusted so as to avoid that a surplus of the bet amount occurs.

The payouts for the unit games constituting the "continuous game" are respectively determined in advance by using the bet amount allocated at random as described above. Further, the payouts which have been determined in advance as described above are summed up, whereby the total payout which is payable to the player in the "continuous game" is computed in advance. Alternatively, a payout pattern on whether or not the payout is to be awarded in each unit game constituting the "continuous game" is also determined in advance. The total payout which has been computed in advance is allocated with respect to each unit game constituting the "continuous game", by using this payout pattern.

More specifically, as shown in FIG. 51, for instance, the number of times of the unit games constituting the "continuous game" indicated by a player is assumed to be "2", and the bet amount with respect to the "continuous game" indicated by the player is assumed to be "10". In this case, this bet amount is respectively allocated, in the order "0", "10" with respect to 2 unit games constituting the "continuous game" indicated by the player.

A payout pattern for this case is set in advance to a pattern whereby a payout is awarded only for the unit game which is executed the second time out of the unit game which is executed two times to constitute the "continuous game" indicated by the player. Accordingly, the total payout which is to be awarded to the player in the "continuous game" indicated by the player is allocated only to the unit game which is executed the second time out of the unit game which is executed two times to constitute the "continuous game".

Figure 69:
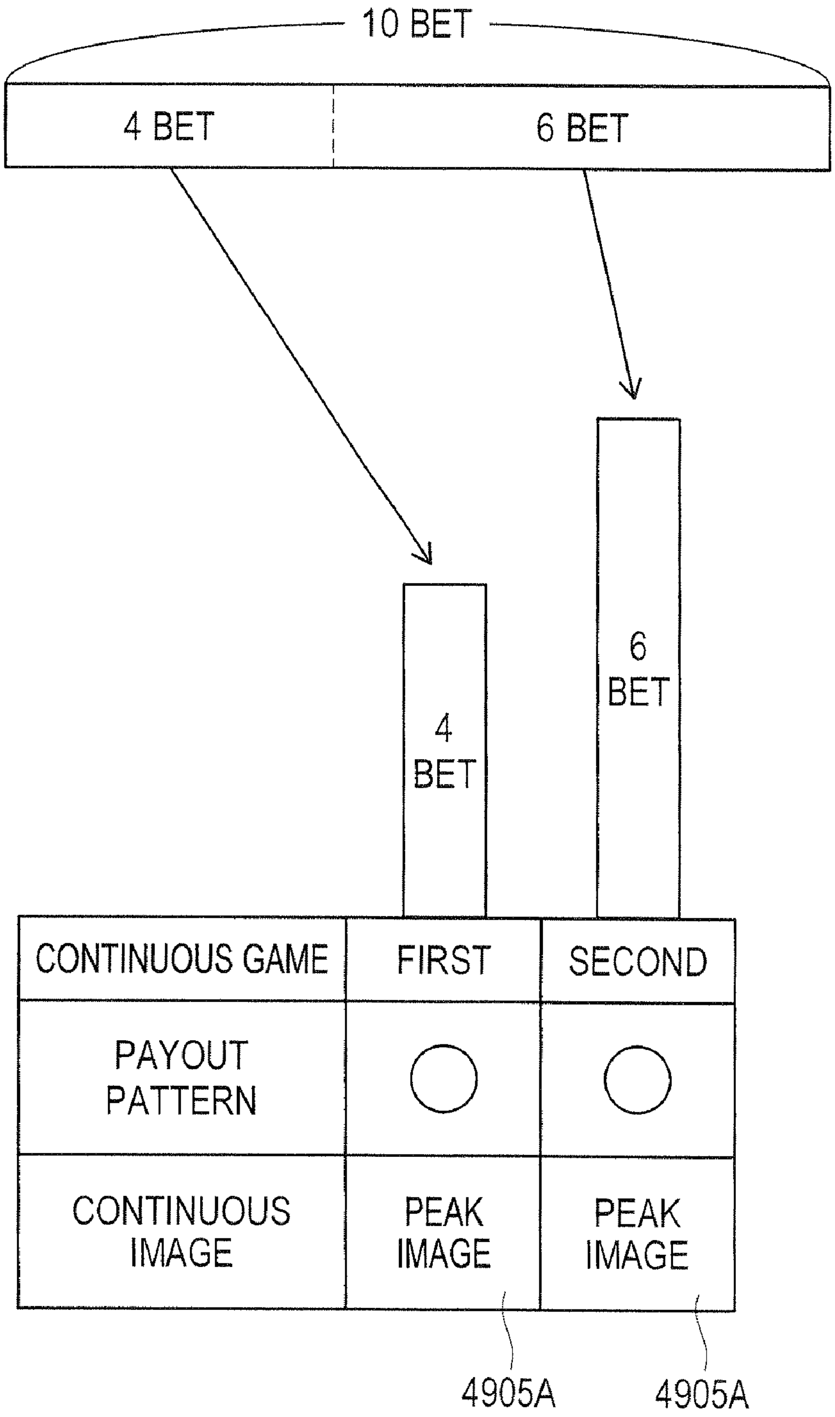
FIG. 69 is a view showing characteristics of the slot machine.

In the case shown in FIG. 69, the bet amount is allocated, in the order "4", "6" with respect to each unit game which is executed two times to constitute the "continuous game" indicated by the player.

A payout pattern for this case is set in advance to a pattern whereby a payout is awarded for each unit game which is executed two times to constitute the "continuous game" indicated by the player. Accordingly, the total payout which is awarded to the player in the "continuous game" indicated by the player is respectively allocated to each unit game which is executed two times to constitute the "continuous game".

Figure 70:
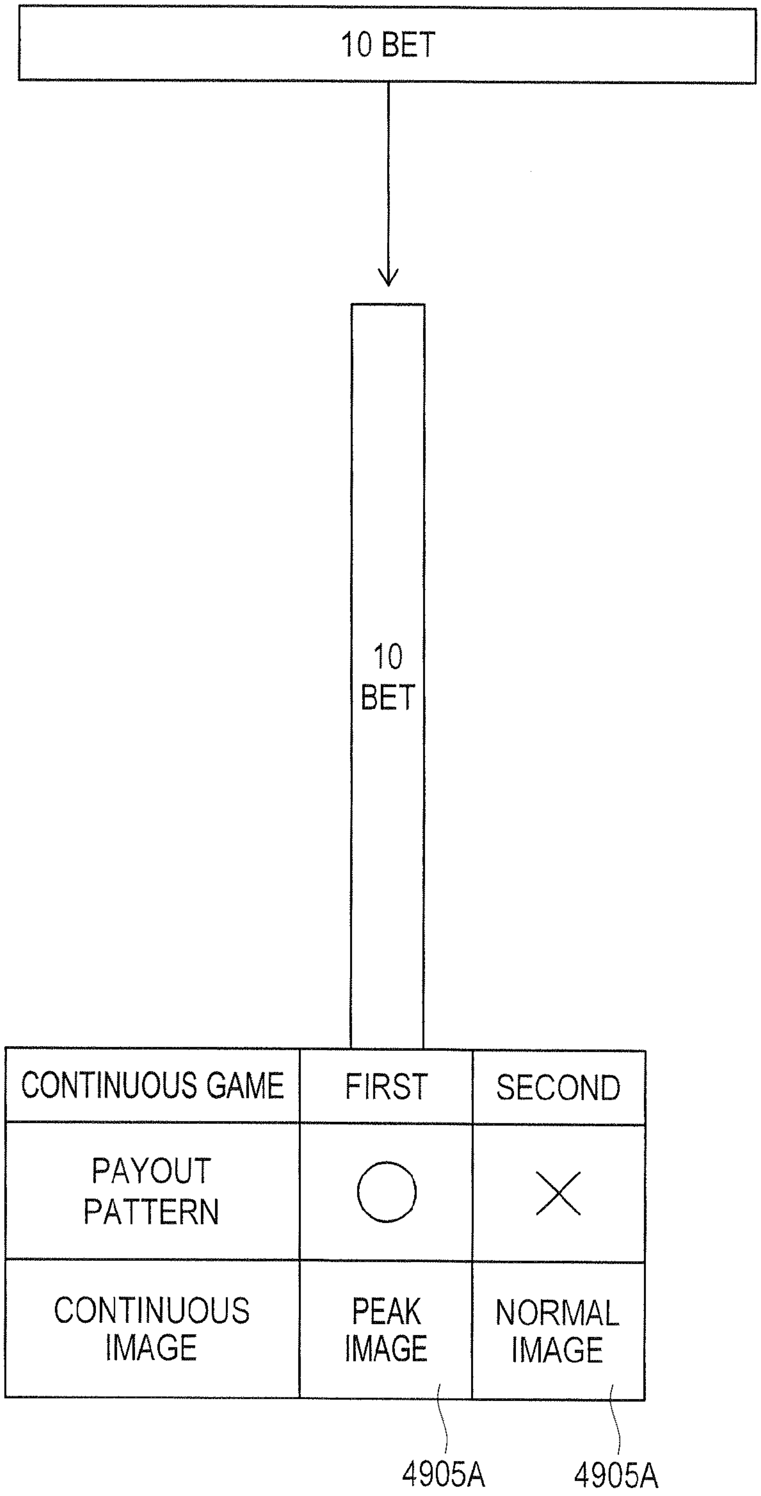
FIG. 70 is a view showing characteristics of the slot machine.

In the case shown in FIG. 70, the bet amount is allocated, in the order "10", "0" with respect to each unit game which is executed two times to constitute the "continuous game" indicated by the player.

A payout pattern for this case is set in advance to a pattern whereby a payout is awarded only for the unit game which is executed the first time out of the unit game which is executed two times to constitute the "continuous game" indicated by the player. Accordingly, the total payout which is awarded to the player in the "continuous game" indicated by the player is allocated only to the unit game which is executed the first time out of the unit game which is executed two times to constitute the "continuous game".

Once the "continuous game" indicated by the player is started, the unit games constituting this "continuous game" are executed by auto-play, so that the total payout that was computed in advance is adjusted to be paid out to the player by using the payout pattern that was determined in advance. This adjustment may be executed while taking into consideration the bet amount that was allocated in advance, or alternatively, without taking into consideration the bet amount that was allocated in advance. Even in the case that the bet amount allocated in advance is ignored, the sum of the bet amounts for the unit games constituting the "continuous game" is adjusted so as to coincide with the bet amount with respect to the "continuous game" indicated by the player.

During the execution of the "continuous game", control is executed so that an effect of a continuous image made up of a single image 4905A which is suitable for that payout pattern is continuously executed, as shown in FIG. 51, FIG. 69 and FIG. 70.

During execution of the unit game for which a payout is not awarded to the player, the single image 4905A is a normal image. Alternatively, during execution of the unit game for which a payout is awarded to the player, the single image 4905A is a peak image. The normal image is an image of a common scene of certain content. The peak image is an image of a climax scene of this content.

4-2. Construction of the Slot Machine

The Fourth Embodiment

Hereinafter, the one embodiment embodying the present invention will be explained in detail with reference to the drawings.

Figure 52:
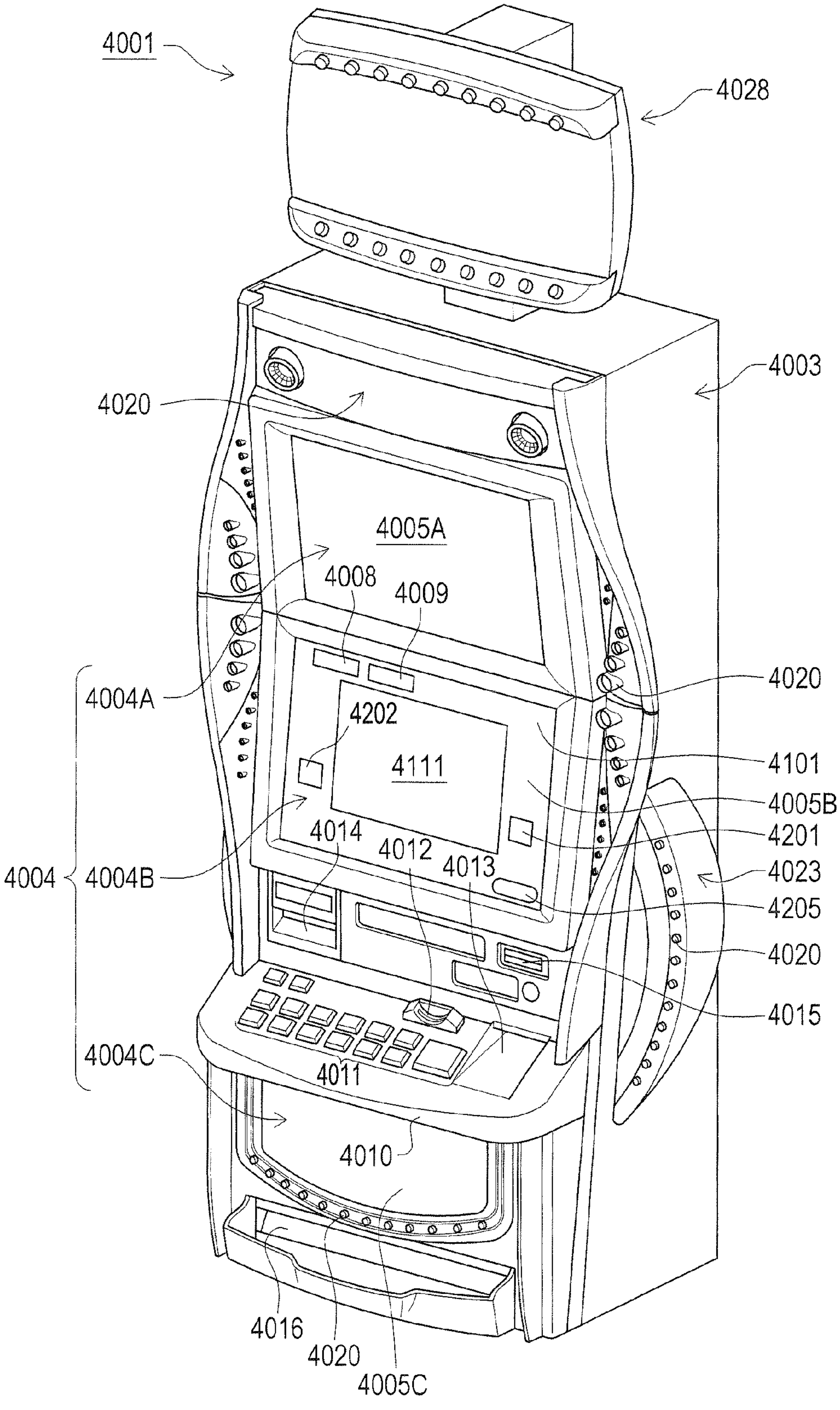
FIG. 52 is a perspective view of the slot machine.

First, an outline construction of the slot machine 4001 according to the present embodiment will be explained based on FIG. 52 FIG. 52 is a perspective view of the slot machine 4001 according to the present embodiment.

As shown in FIG. 52, the slot machine 4001 is an upright type slot machine arranged in a game arcade such as casino, in order to execute predetermined game modes, such slot machine includes a cabinet 4003 in which electronic and mechanical components are installed. For example, as a display portion 4004 to display information a concerning game, there are provided an upper display portion 4004A, a middle variable display portion 4004B and a lower display portion 4004C. Each display portion 4004A to 4004C is mounted at the front of the oblong cabinet 4003. The upper display portion 4004A includes a liquid crystal panel 4005A which is arranged above the middle variable display portion 4004B. On the liquid crystal panel 4005A, for example, an effect image, an introduction of a game content, and a rule explanation of a game are displayed. The lower display portion 4004C is arranged below the middle variable display portion 4004B, and includes a plastic panel 4005C on which images are printed, and a plastic panel 4005C is lightened by backlights.

The middle variable display portion 4004B, which is used to display an execution state of a game, includes the liquid crystal panel 4005B which is fixed at the front door of the cabinet 4003. In this liquid crystal panel 4005B, nine symbols of the video reels are displayed in a scrolling manner and in a stopped manner, respectively. In the middle variable display portion 4004B, the symbol display frame 4111 in which the nine symbol display areas associated with each video reel are positioned like a matrix of three rows times three columns is displayed on the liquid crystal panel 4005B. Further, a touch panel 4101 is provided on the front surface of the liquid crystal panel 4005B. A player can input each kind of commands by operating the touch panel 4101. On the upper position of the middle variable display portion 4004B, the payout amount display portion 4008 and a credit amount display portion 4009 are provided on the liquid crystal panel 4005B. Also the upper portion of the middle variable display portion 4004B, is related to the back side, thereby a player may play a game in a cozy posture.

In the middle variable display portion 4004B, a bet amount display portion 4202 is provided on the liquid crystal panel 4005B, at the right side of the symbol display frame 4111. Further, in the middle variable display portion 4004B, a game number display portion 4201 is provided on the liquid crystal panel 4005B, at the left side of the symbol display frame 4111. Furthermore, in the middle variable display portion 4004B, a minimum bet amount display area 4205 is provided on the liquid crystal panel 4005B, at the lower side of the game number display portion 4201.

Figure 57:
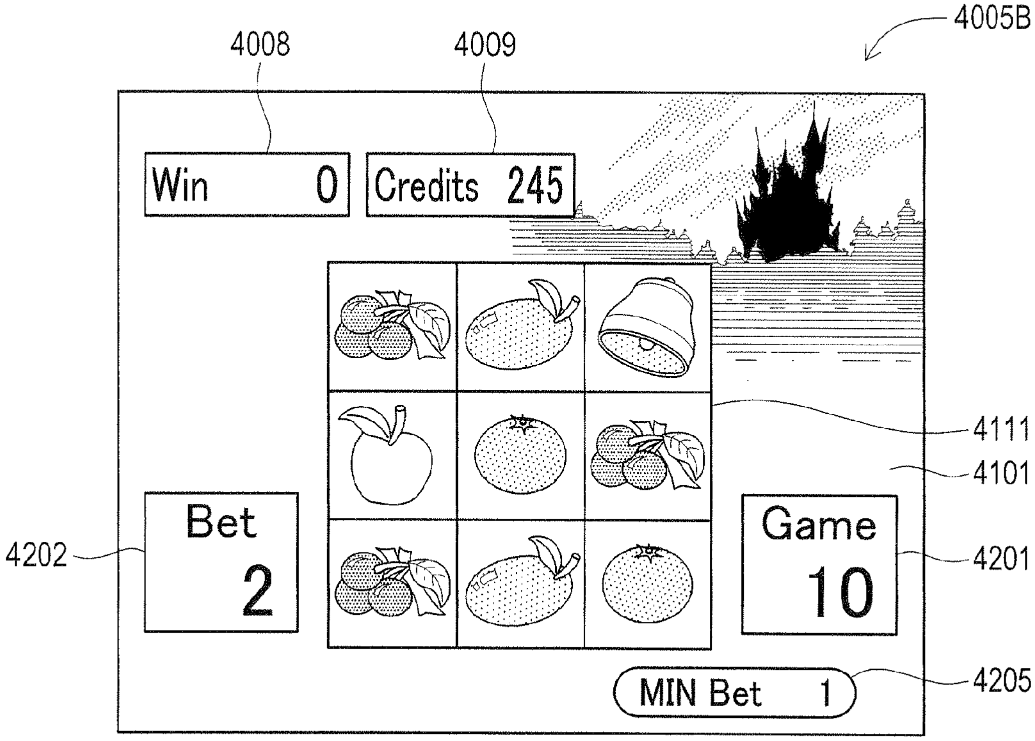
FIG. 57 is a view showing one of an image displayed on a liquid crystal panel.
Figure 58:
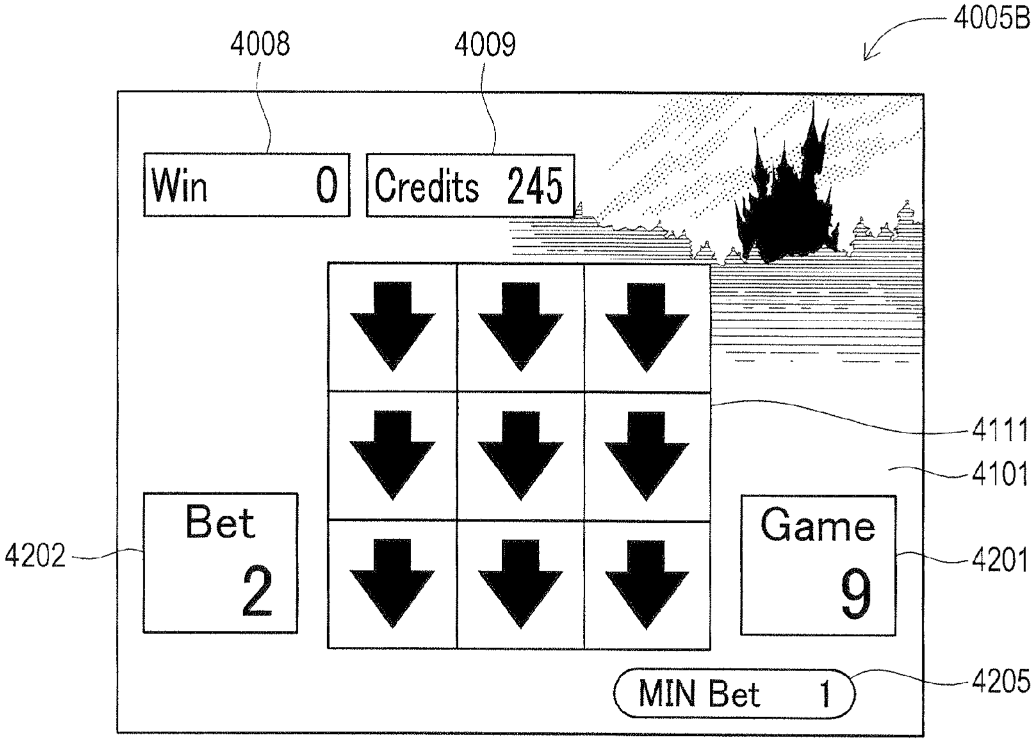
FIG. 58 is a view showing one of an image displayed on the liquid crystal panel.

Now, images of a slot game to be displayed on the liquid crystal panel 4005B are explained. FIG. 57 and FIG. 58 are drawings showing contents displayed on the liquid crystal panel 4005B, as one example of images of a slot game to be displayed on the liquid crystal panel 4005B. As shown in FIG. 57 and FIG. 58, on the liquid crystal panel 4005B in a slot game, the symbol drawn on the reel band of each video reel is displayed in the nine symbol display areas positioned like a matrix of three rows times three columns in the symbol display frame 4111, so that they can be viewed by a player. FIG. 57 shows a state in which the symbol drawn on the reel band of each video reel is arranged or rearranged in each symbol display area of the symbol display frame 4111 on the liquid crystal panel 4005B. FIG. 58 shows a state in which the symbol drawn on the reel band of each video reel is displayed by a scrolling manner in each symbol display area of the symbol display frame 4111 on the liquid crystal panel 4005B. Incidentally, on the reel band of each video reel, a symbol column constructed from twenty-two symbols is drawn respectively (refer to FIG. 53).

Further, the payout amount display portion 4008 and the credit amount display portion 4009 are provided on the liquid crystal panel 4005B. On the payout amount display portion 4008, the payout amount awarded in a slot game to a player is displayed. On the credit amount display portion 4009, the credit amount which is owned by a player at the moment is displayed.

Further, the liquid crystal panel 4005B contains the bet amount display portion 4202, the game number display portion 4201 and the minimum bet amount display area 4205. The bet amount display portion 4202 displays the bet amount for a unit game, as set by a player in a slot game. The game number display portion 4201 displays the remaining number of times for executing unit games that constitute the "continuous game" set by a player in a slot game. The minimum bet amount display area 4205 displays the minimum bet amount for each unit game that a player can set.

Therefore, on the liquid crystal panel 4005B in a slot game, one symbol which is drawn on the reel band of each video reel is arranged in each of the nine symbol display areas of the symbol display frame 4111.

Returning to FIG. 52, at the operation table 4010, a coin insertion slot 4012 and a bill insertion slot 4013 are provided. Between the middle variable display portion 4004B and the lower display portion 4004C, at the front of the cabinet 4003, an operation table 4010 which is projected forward is provided. On the operation table 4010, a variety of operation buttons 4011 including a BET button, a COLLECT button, a SPIN button, a CASHOUT button and the like are arranged as an operation portion to execute a game.

Figure 61:
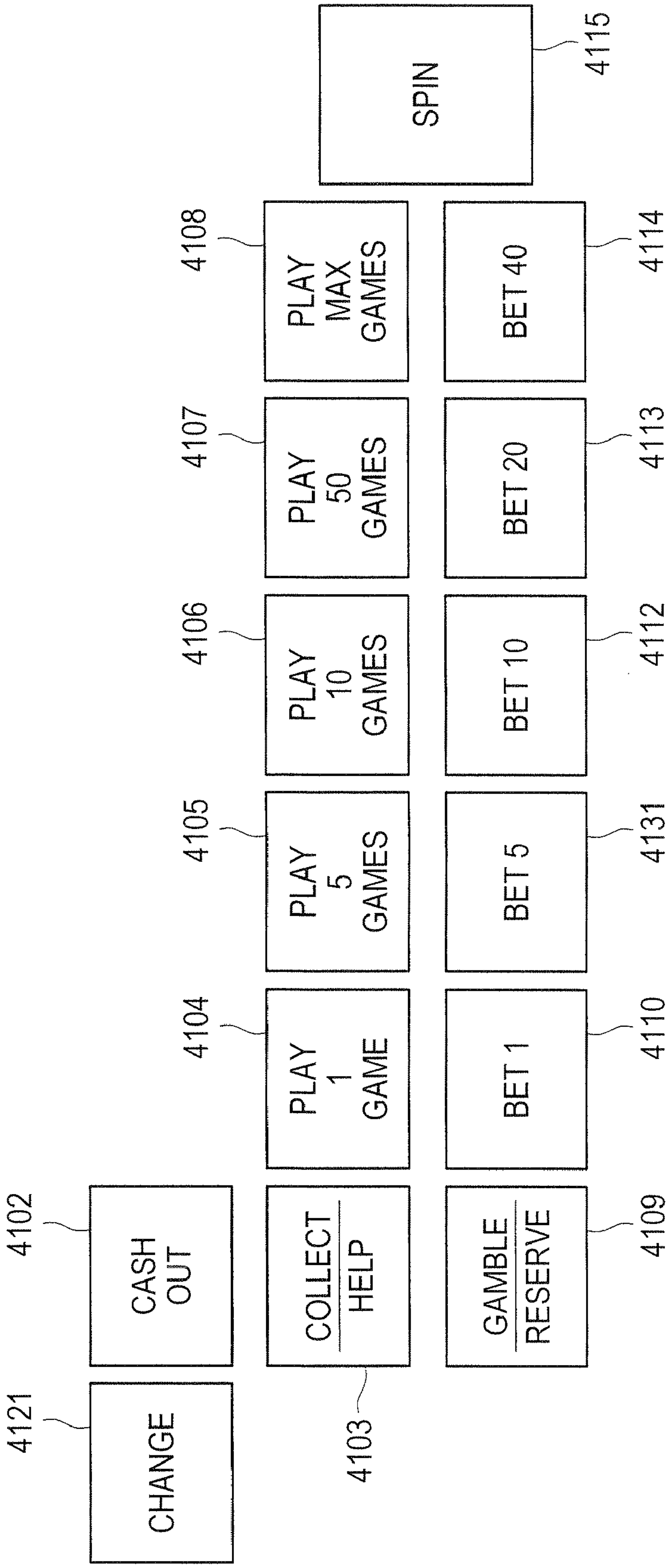
FIG. 61 is a front view showing a variety of operation buttons.

Here, the variety of operation buttons 4011 will now be described. FIG. 61 is a front view showing the variety of operation buttons 4011. As shown in FIG. 61, at an upper stage are provided a CHANGE button 4121, a CASHOUT button 4102 starting from the leftmost side. At a middle stage are provided a COLLECT/HELP button 4103, a PLAY 1 GAME button 4104, a PLAY 5 GAMES button 4105, a PLAY 10 GAMES button 4106, a PLAY 50 GAMES button 4107 and a PLAY MAX GAMES button 4108 starting from the leftmost side. At a lower stage are provided a GAMBLE/RESERVE button 4109, a BET 1 button 4110, a BET 5 button 4131, a BET 10 button 4112, a BET 20 button 4113 and a BET 40 button 4114, starting from the leftmost side. At the rightmost side is provided a SPIN button 4115.

In this respect, the CHANGE button 4121 is an operation device which is used to change bills inserted in the bill insertion slot 4013 (refer to FIG. 52). Coins which have been changed are paid out to a coin tray 4016 (refer to FIG. 52) provided at the lower side of the cabinet 4003 (refer to FIG. 52).

The CASHOUT button 4102 is an operation device which is used to input a command to pay out coins in accordance with the credit amount which a player owns at the moment to the coin tray 4016 (refer to FIG. 52) or a command to pay out such coins by means of bar code-attached tickets which are printed in a ticket printer 4014 (refer to FIG. 52).

The COLLECT/HELP button 4103 is an operation device which is used when completing a double-down game which is executed using the payout amount acquired by a player, or when the game operation method and the like is unclear. Incidentally, if the COLLECT/HELP button 4103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 4104 is an input device for inputting, based on being operated, a command to execute one unit game. The PLAY 5 GAMES button 4105 is an input device for inputting, based on being operated, a command to execute five continuous unit games constituting the "continuous game". The PLAY 10 GAMES button 4106 is an input device for inputting, based on being operated, a command to execute ten continuous unit games constituting the "continuous game". The PLAY 50 GAMES button 4107 is an input device for inputting, based on being operated, a command to execute fifty continuous unit games constituting the "continuous game".

The PLAY MAX GAMES button 4108 is an input device for inputting, based on being operated, a command to execute a maximum number of continuous unit games constituting the "continuous game". Here, the maximum number of times for executing the unit game is computed by dividing the credit amount owned by a player at the moment by the minimum bet amount with respect to each unit game which can be set by the player.

Incidentally, the operation with respect to the PLAY 1 GAME button 4104, PLAY 5 GAMES button 4105, PLAY 10 GAMES button 4106, PLAY 50 GAMES button 4107 and PLAY MAX game button 4108 is not accepted during normal operation.

The GAMBLE/RESERVE button 4109 is an operation device which is used by a player when he/she shifts a slot game to a double-down game, or when he/she steps away from the slot machine.

The BET 1 button 4110 is an input device for inputting, based on being operated, a command to set the bet amount corresponding to "1" with respect to a unit game or the "continuous game". The BET 5 button 4131 is an input device for inputting, based on being operated, a command to set the bet amount corresponding to "5" with respect to a unit game or the "continuous game". The BET 10 button 4112 is an input device for inputting, based on being operated, a command to set the bet amount corresponding to "10" with respect to a unit game or the "continuous game". The BET 20 button 4113 is an input device for inputting, based on being operated, a command to set the bet amount corresponding to "20" with respect to a unit game or the "continuous game". The BET 40 button 4114 is an input device for inputting, based on being operated, a command to set the bet amount corresponding to "40" with respect to a unit game or the "continuous game".

The SPIN button 4115 is an input device for inputting, based on being operated, a command to display each video reel by a scrolling manner.

Returning to FIG. 52, between the operation table 4010 and the middle variable display portion 4004B, the ticket printer 4014 and a card reader 4015 are provided. At the lowest position of the cabinet 4003, the coin tray 4016 is also provided.

Incidentally, in the slot machine 4001 of the present embodiment, gaming medium may be coin, bill, or electronic value (credit). Here, the gaming medium may be others as well, such as medal, token, electronic money, or ticket.

Further, on the cabinet 4003 of the slot machine 4001, light emitting portions 4020 are arranged around a game area including the upper display portion 4004A, the middle variable display portion 4004B, the lower display portion 4004C and the operation table 4010.

Furthermore, the slot machine 4001 also includes a topper effect device 4028 which is installed on the cabinet 4003. The topper effect device 4028 is shaped in a rectangular board shaped, and is provided almost parallel to the liquid crystal panel 4005A of the upper display portion 4004A. The cabinet 4003 is further provided with speakers 4023 on its both sides.

4-3. Outline of Symbols

The Fourth Embodiment

Next, the symbols drawn on the reel band of each video reel will be explained based on FIG. 53. These symbols are scrolled and rearranged in the respective symbol display areas of the symbol display frame 4111 on the liquid crystal panel 4005B in a slot game. FIG. 53 is a schematic view showing symbol columns drawn on the reel band of each video reel.

On the reel band of each video reel, twenty-two symbols are arranged respectively. Each symbol column of video reel is constructed from the symbols including "FRANKENSTEIN", "BLUE7", "BELL", "APPLE", "CHERRY", "PLUM" and "ORANGE". And the symbols of predetermined types are arranged in a predetermined sequence.

In this respect, each of the symbols including "FRANKENSTEIN", "BLUE 7", "BELL", "APPLE", "CHERRY", "PLUM" and "ORANGE" are scatter symbols. If three or four or more scatter symbols are rearranged in the symbol display frame 4111 of the liquid crystal panel 4005B, the payout amount set in advance is awarded to a player (refer to FIG. 56).

Incidentally, to each symbol composing the symbol column of each video reel shown in FIG. 53, a code number is allocated from top to down in sequence.

4-4. Internal Construction of the Slot Machine

The Fourth Embodiment

Next, an internal construction of the above-mentioned slot machine 4001 will be explained with reference to FIG. 54 and FIG. 55.

Figure 54:
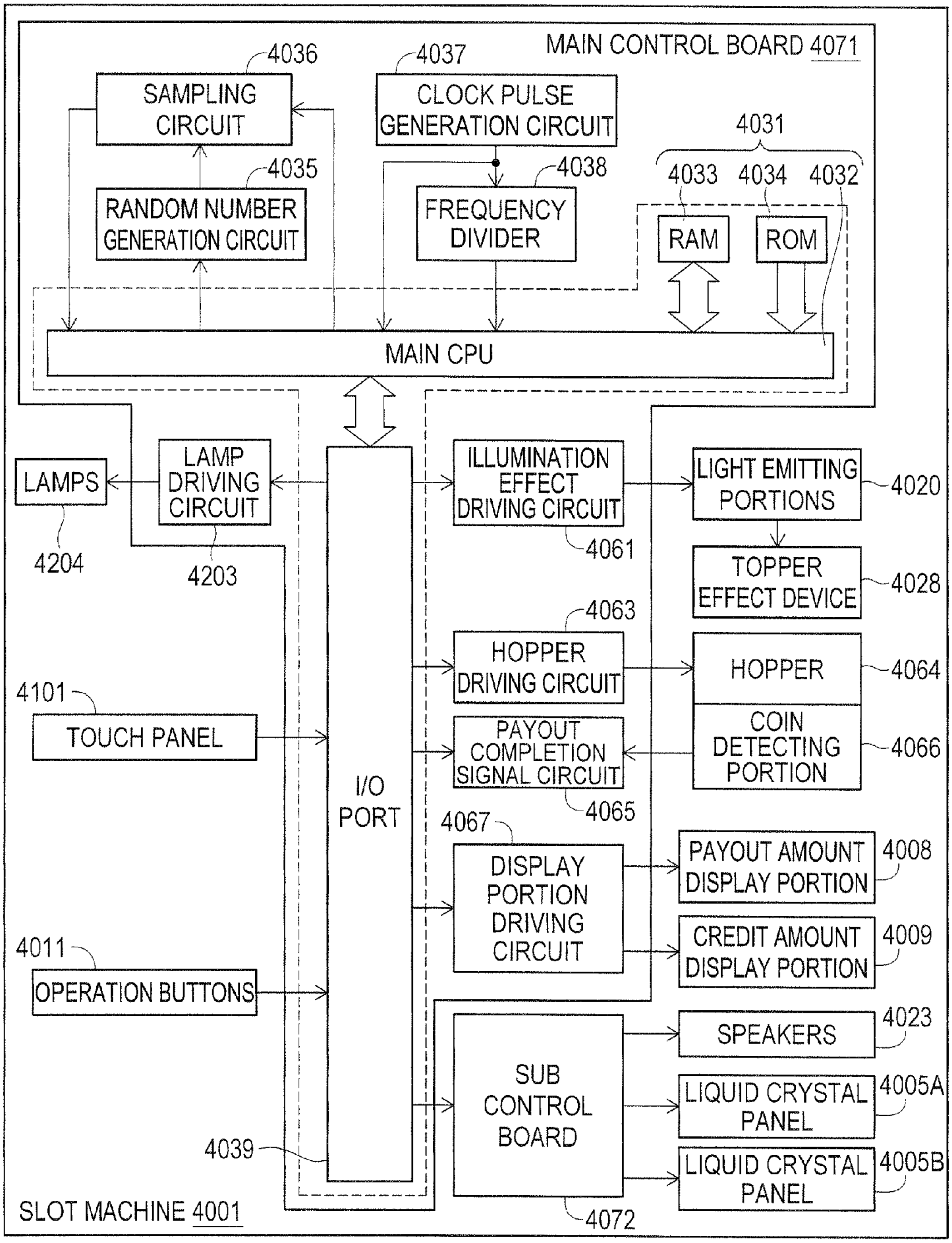
FIG. 54 is a block diagram showing an internal construction of entire slot machine.

FIG. 54 is a block diagram showing an internal construction of entire slot machine 4001. As shown in FIG. 54, the slot machine 4001 includes a plurality of construction elements such as a main control board 4071, in which a microcomputer 4031 is included. The main control board 4071 is constructed from the microcomputer 4031, a random number generation circuit 4035, a sampling circuit 4036, a clock pulse generation circuit 4037 and a frequency divider 4038. The main control board 4071 also includes an illumination effect driving circuit 4061, a hopper driving circuit 4063, a payout completion signal circuit 4065, a display portion driving circuit 4067 and a lamp driving circuit 4203.

The microcomputer 4031 is constructed from a main CPU 4032, a RAM 4033 and a ROM 4034. The main CPU 4032 runs based on programs stored in the ROM 4034, and inputs/outputs a signal with other elements through an I/O port 4039, so as to execute control of the entire slot machine 4001. Data and programs used when the main CPU 4032 runs are stored in the RAM 4033. For example, after-mentioned random numbers which are sampled by the sampling circuit 4036 are stored temporarily after a start of a game, also the code numbers of the respective video reels and the symbol numbers are stored in the RAM 4033. Further, the RAM 4033 sets in advance a storage area where an after-mentioned variable N is stored. Programs executed by the main CPU 4032 and permanent data are stored in the ROM 4034.

Especially, the programs stored in the ROM 4034 include game programs and game system programs (abbreviated as "the game programs and the like" hereinafter). Further, a lottery programs mentioned below is also included in the game programs.

The lottery program is a program used to determine the code numbers of the respective video reels which corresponds to each symbol rearranged in the respective symbol display areas of the symbol display frame 4111 on the liquid crystal panel 4005B. Then, in the lottery program, it is included symbol weighing data corresponding to each of plural kinds of payout rates (for example, 80%, 84%, and 88%). The symbol weighing data are the data indicating correlation between the code number of each video reel and one or plural random numbers belonging to a predetermined number range (0 to 255), every each of the nine video reels. In other words, each of the code number of one video reel is associated with one or more random numbers corresponding to the payout rate. The random numbers are extracted by the lottery program, and symbols specified finally by the random numbers are rearranged in the respective symbol display areas of the symbol display frame 4111 on the liquid crystal panel 4005B.

Random numbers over a predetermined range are generated by the random number generation circuit 4035, which is operated based on instructions from the main CPU 4032. The random numbers are voluntarily extracted from the random numbers generated by the random number generation circuit 4035 by the sampling circuit 4036, based on instructions from the main CPU 4032, and the extracted random numbers are input to the main CPU 4032. The base clock for running the main CPU 4032 is generated by the clock pulse generation circuit 4037, and signals which are generated by dividing the base clock in a predetermined frequency are input to the main CPU 4032 by the frequency divider 4038.

And to the main control board 4071, the touch panel 4101 is connected. The touch panel 4101 is arranged in front of the liquid crystal panel 4005B, and specifies the coordinate position of the portion touched by a player. The position on which a player touched and the direction of the movement of the touched portion are determined based on the specified coordinate position information. A signal corresponding to the determination is input to the main CPU 4032 through the I/O port 4039.

Also, the operation buttons 4011 for instructing an execution of a game are connected to the main control board 4071. The operation buttons 4011 include the variety of buttons (refer to FIG. 61). A signal corresponding to the depressing of these buttons is input to the main CPU 4032 through the I/O port 4039.

An effect signal which is used to conduct illumination effect is output to the above-mentioned light emitting portions 4020 and the topper effect device 4028 by the illumination effect driving circuit 4061. Then, the topper effect device 4028 is serially connected to the illumination effect driving circuit 4061 through the light emitting portions 4020.

A hopper 4064 is driven by the hopper driving circuit 4063 based on control of main CPU 4032. The hopper 4064 executes payout of coins, and coins are paid out from the coin tray 4016. Data of the number of coins are input from the connected coin detecting portion 4066 by the payout completion signal circuit 4065. When the number of coins becomes a predetermined number, a signal indicating completion of the coins is input to the main CPU 4032. The number of the coins paid out from the hopper 4064 is calculated by the coin detecting portion 4066, and the data of the number calculated are input to the payout completion signal circuit 4065. The each display operation of the payout amount display portion 4008 and credit amount display portion 4009 is controlled by the display portion driving circuit 4067.

The lamp driving circuit 4203 turns lamps 4204 on/off based on control of main CPU 4032. The lamps 4204 are provided inside the operation buttons 4011. The lamp 4204 inside the button with respect to which a player's operation is validated lights up, notifying the player of the button with respect to which operation is validated.

Furthermore, a sub control board 4072 is connected to the main control board 4071. The sub control board 4072 is connected to the liquid crystal panel 4005A, the liquid crystal panel 4005B and the speakers 4023.

Figure 55:
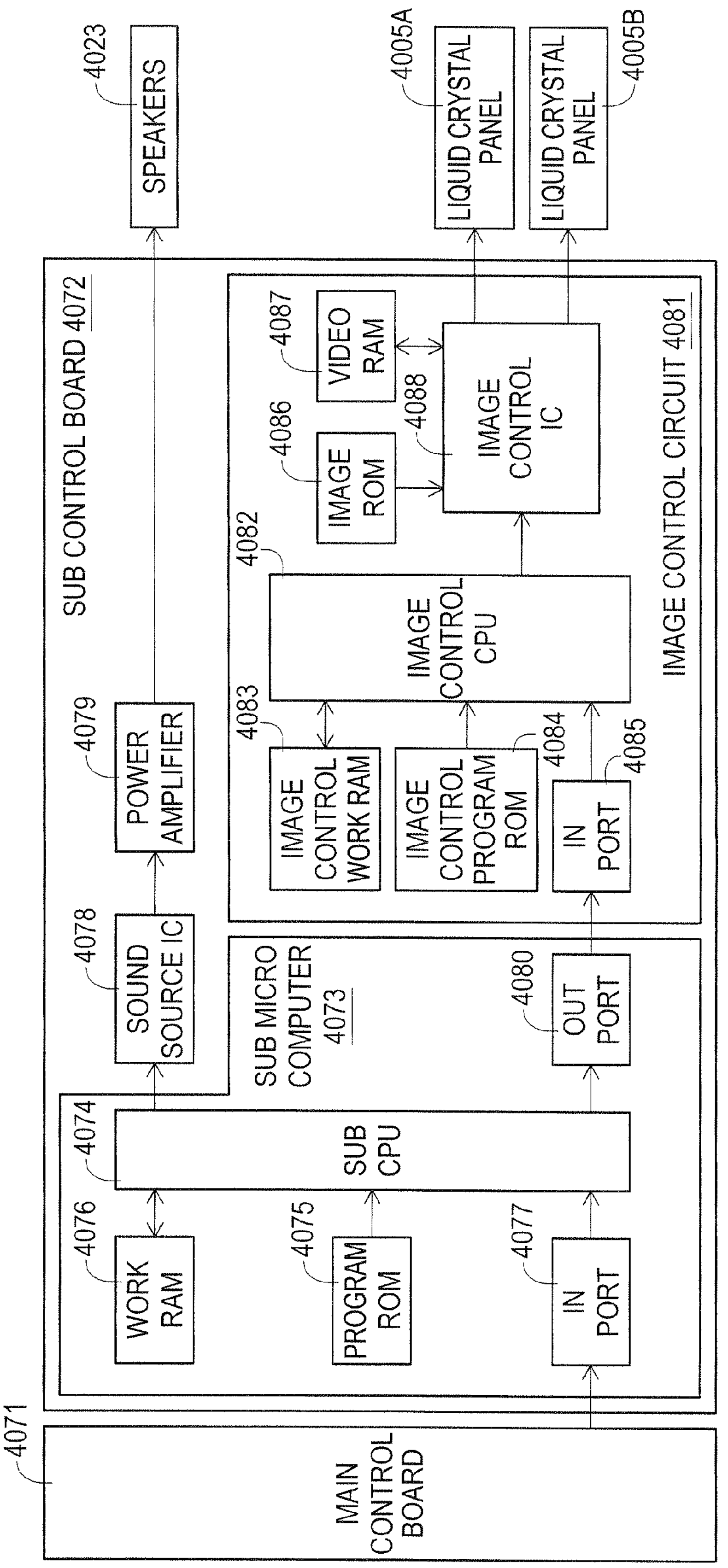
FIG. 55 is a block diagram showing an internal construction of a sub control board.

FIG. 55 is a block diagram showing an internal construction of the sub control board 4072. As shown in FIG. 55, a command from the main control board 4071 is input to the sub control board 4072. The display control on the liquid crystal panel 4005A of the upper display portion 4004A and the liquid crystal panel 4005B of the variable display portion 4004B, and the sound output control on the speakers 4023 are executed by the sub control board 4072. The sub control board 4072 is constructed on a circuit board different from the circuit board for the main control board 4071, and includes a microcomputer 4073 (abbreviated as "sub microcomputer" hereinafter) as a main construction element, and a sound source IC 4078, a power amplifier 4079 and an image control circuit 4081. The sound source IC 4078 controls the sound output from the speakers 4023, the power amplifier 4079 is used as an amplification device, and the image control circuit 4081 runs as a display control device of the liquid crystal panel 4005A and 4005B.

The sub microcomputer 4073 includes a sub CPU 4074, a program ROM 4075, a work RAM 4076, an IN port 4077 and an OUT port 4080. The control operations are executed by the sub CPU 4074 based on a control order sent from the main control board 4071, the program ROM 4075 is used as a memory device. Although a clock pulse generation circuit, a frequency divider, a random number generation circuit and a sampling circuit are not included in the sub control board 4072, the sub control board 4072 is constructed so as to execute random number sampling according to operation programs thereof. Control programs executed by the sub CPU 4074 are stored in the program ROM 4075. The work RAM 4076 is constructed as a temporary storing device when the above-mentioned control programs are executed by the sub CPU 4074.

The image control circuit 4081 includes an image control CPU 4082, an image control work RAM 4083, an image control program ROM 4084, an IN port 4085, an image ROM 4086, a video RAM 4087 and an image control IC 4088. Images displayed on the liquid crystal panel 4005A and 4005B are determined by the image control CPU 4082, based on parameters set by the sub microcomputer 4073, according to image control programs stored in the image control program ROM 4084.

The image control programs regarding to a display of the liquid crystal panel 4005A, 4005B and a variety of selection tables are stored in the image control program ROM 4084. The image control work RAM 4083 is constructed as a temporary storing device when the image control programs are executed by the image control CPU 4082. Images corresponding to contents determined by the image control CPU 4082 are formed by the image control IC 4088, and are output to the liquid crystal panel 4005A, 4005B.

In the image ROM 4086, dot data used to form images are stored. Thus, it stores the dot data on symbols drawn on the reel band of the each video reel. The video RAM 4087 runs as a temporary storing device when the images are formed by the image control IC 4088.

Further, based on a control signal from the main CPU 4032, the image control circuit 4081 performs display control of scrolling display/stop display of the video reels in the respective symbol display areas of the symbol display frame 4111 on the liquid crystal panel 4005B.

4-5. Outline of a Slot Game

The Fourth Embodiment

Next, winning combinations and the payout amounts corresponding to the winning combinations will be explained based on FIG. 56, wherein the winning combinations are symbol combinations when a slot game is executed by using each of the video reels in the slot machine 4001 according to the present embodiment. FIG. 56 is a payout table in which the winning combinations and the payout amounts corresponding to the winning combinations are shown when a slot game is executed by using each of the video reels.

Here, the payout amount shown in FIG. 56 indicates the payout amount when the bet amount is “1”. Therefore, when the bet amount is “1”, the payout amount shown in FIG. 56 is paid out, and when the bet amount is more than “2”, the payout amount obtained by multiplying the payout amount shown in FIG. 56 with the bet amount is paid out.

Accordingly, if the nine scatter symbols of “FRANKENSTEIN” are rearranged in the symbol display frame 4111 of the liquid crystal panel 4005B, the amount obtained by multiplying the bet amount with 500 credits will be paid out. If the eight scatter symbols of “FRANKENSTEIN” are rearranged in the symbol display frame 4111 of the liquid crystal panel 4005B, the amount obtained by multiplying the bet amount with 300 credits will be paid out. Hereinafter, the payout amounts are set in a similar manner, as shown in FIG. 56, in accordance with the number of “FRANKENSTEIN” scatter symbols which have been rearranged in the symbol display frame 4111 of the liquid crystal panel 4005B.

With respect to each of the other scatter symbols including “BLUE 7”, “BELL”, “APPLE”, “CHERRY”, “ORANGE” and “PLUM”, as well, the payout amounts as shown in FIG. 56 are set in a similar manner in accordance with the number of the same scatter symbols which have been rearranged in the symbol display frame 4111 of the liquid crystal panel 4005B.

As mentioned above, in the slot machine 4001 according to the present embodiment, a slot game is executed.

In other words, in a slot game, the slot game is executed by rearranging the plurality of same symbols specified by nine video reels in the symbol display frame 4111 of the liquid crystal panel 4005B. In the slot game, firstly, a part of symbol column (one symbol) drawn on the reel band of each video reel shown in FIG. 53, is arranged in each symbol display area of the symbol display frame 4111 on the liquid crystal panel 4005B (refer to FIG. 57). Here, after a player sets the bet amount by depressing the BET button among the operation buttons 4011, if the player depresses the SPIN button 4115 among the operation buttons 4011, each of the video reels rotates, the symbol column drawn on the reel band of each video reel shown in FIG. 53, is scrolled from up to down in the symbol display frame 4111 of the liquid crystal panel 4005B (refer to FIG. 58).

After a predetermined time, each of the video reels stops automatically, a part of symbol column (one symbol) drawn on the reel band of each video reel shown in FIG. 53, is rearranged in each symbol display area of the symbol display frame 4111 on the liquid crystal panel 4005B (refer to FIG. 57). On the other hand, each winning combination based on each the number of the scatter symbol is determined beforehand (refer to FIG. 56). When a symbol combination constructed from the nine symbols rearranged in the symbol display frame 4111 of the liquid crystal panel 4005B, realizes a winning combination specified by the number of the same scatter symbol, the payout amount obtained by multiplying the bet amount with the payout amount corresponding to the realized winning combination is awarded to the player.

4-6. Operation of the Slot Machine

The Fourth Embodiment

Figure 59:
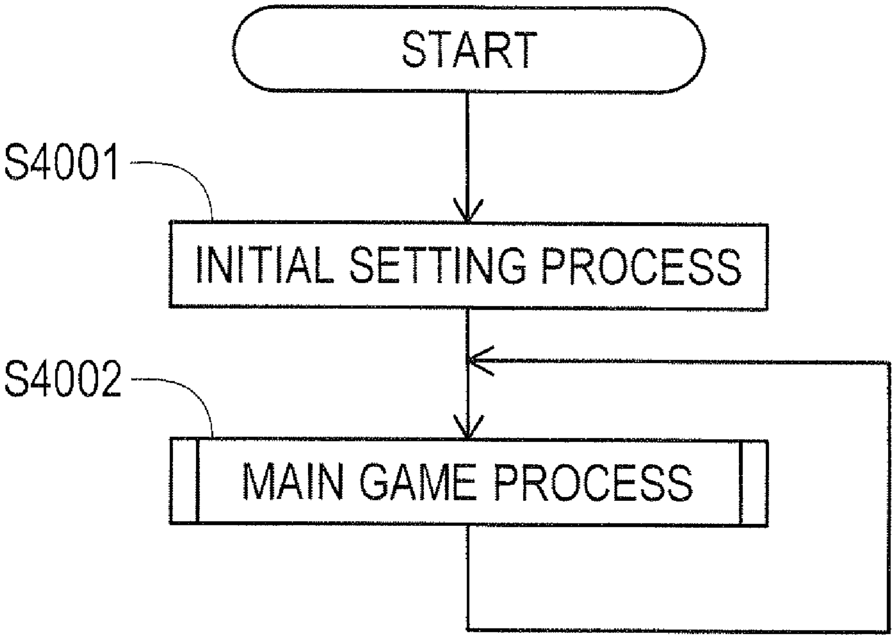
FIG. 59 is a flowchart of a main control program.

Next, a main control program executed in the slot machine 4001 according to the present embodiment will be explained with reference to drawings. FIG. 59 is a flowchart of the main control program.

First, when a power switch is pressed (power activation), the microcomputer 4031 is started to operate, an initial setting process is executed by the microcomputer 4031 in step (abbreviated as “S”) 4001. In the initialization process, BIOS stored in the ROM 4034 is executed by the main CPU 4032. Compressed data included in the BIOS are expanded to the RAM 4033, and when the BIOS expansion to the RAM 4033 is executed, a diagnosing process and initialization process of various peripheral devices are executed. Also, the game programs and the like are written from the ROM 4034 to the RAM 4033 by the main CPU 4032, so as to obtain the payout rate setting data and country ID information. Also, during execution of the initial setting process, a verification process to each program is executed.

Then in S4002, the main CPU 4032 reads out the game programs and the like from the RAM 4033, and executes the programs in sequence so as to conduct the main game process. A game is executed in the slot machine 4001 according to the present embodiment by executing the main game process. Then, the main game process is repeated when the power is supplied to the slot machine 4001.

Figure 60:
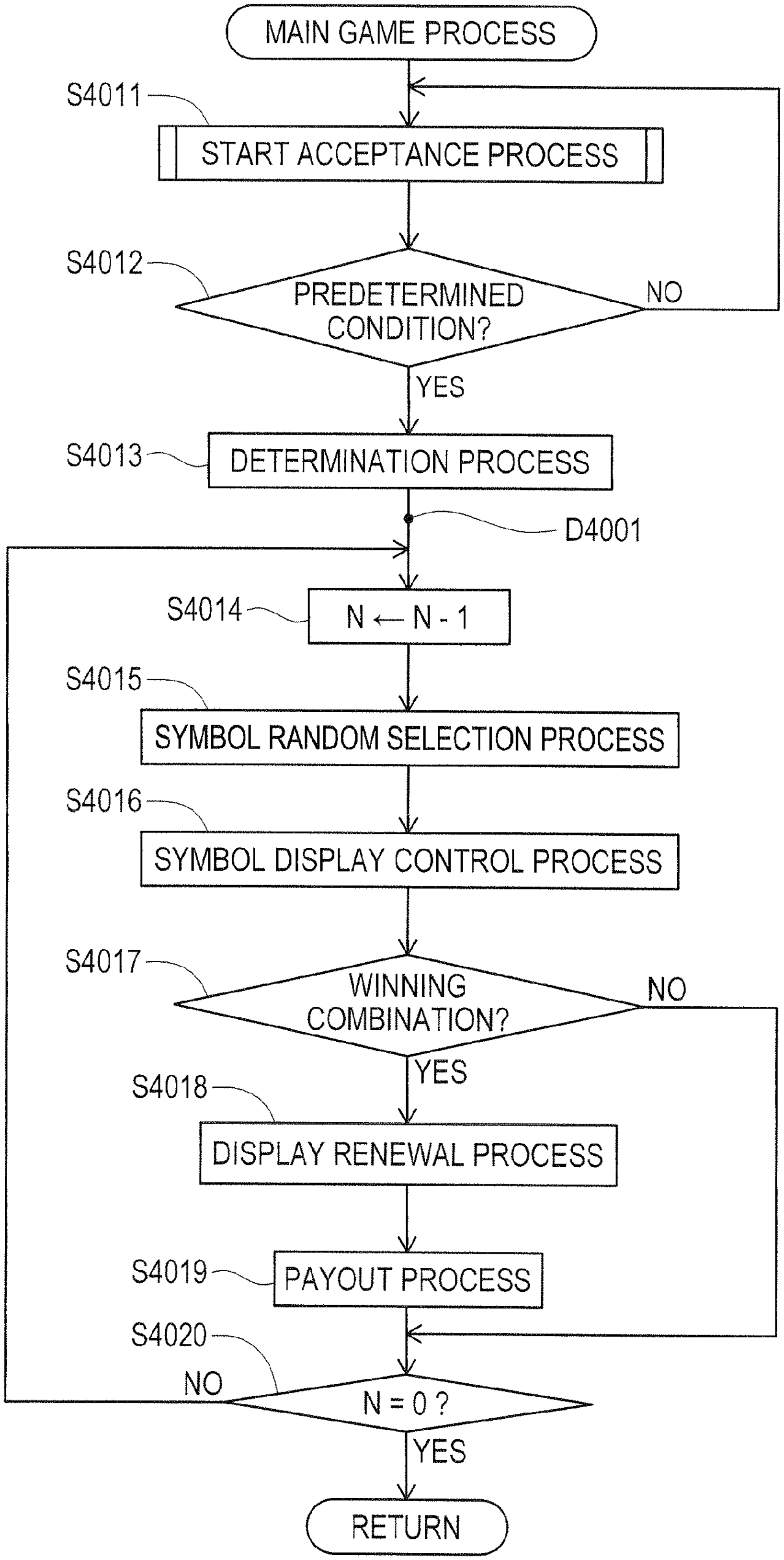
FIG. 60 is a flowchart of a main game process program.

Next, a sub process of the main game process in S4002 above will be explained based on FIG. 60. FIG. 60 is a flowchart of the main game process program in the slot machine 4001 according to the present embodiment. Incidentally, each program shown in the flowchart of FIG. 60 is stored in the ROM 4034 or the RAM 4033 of the slot machine 4001, and is executed by the main CPU 4032.

Figure 62:
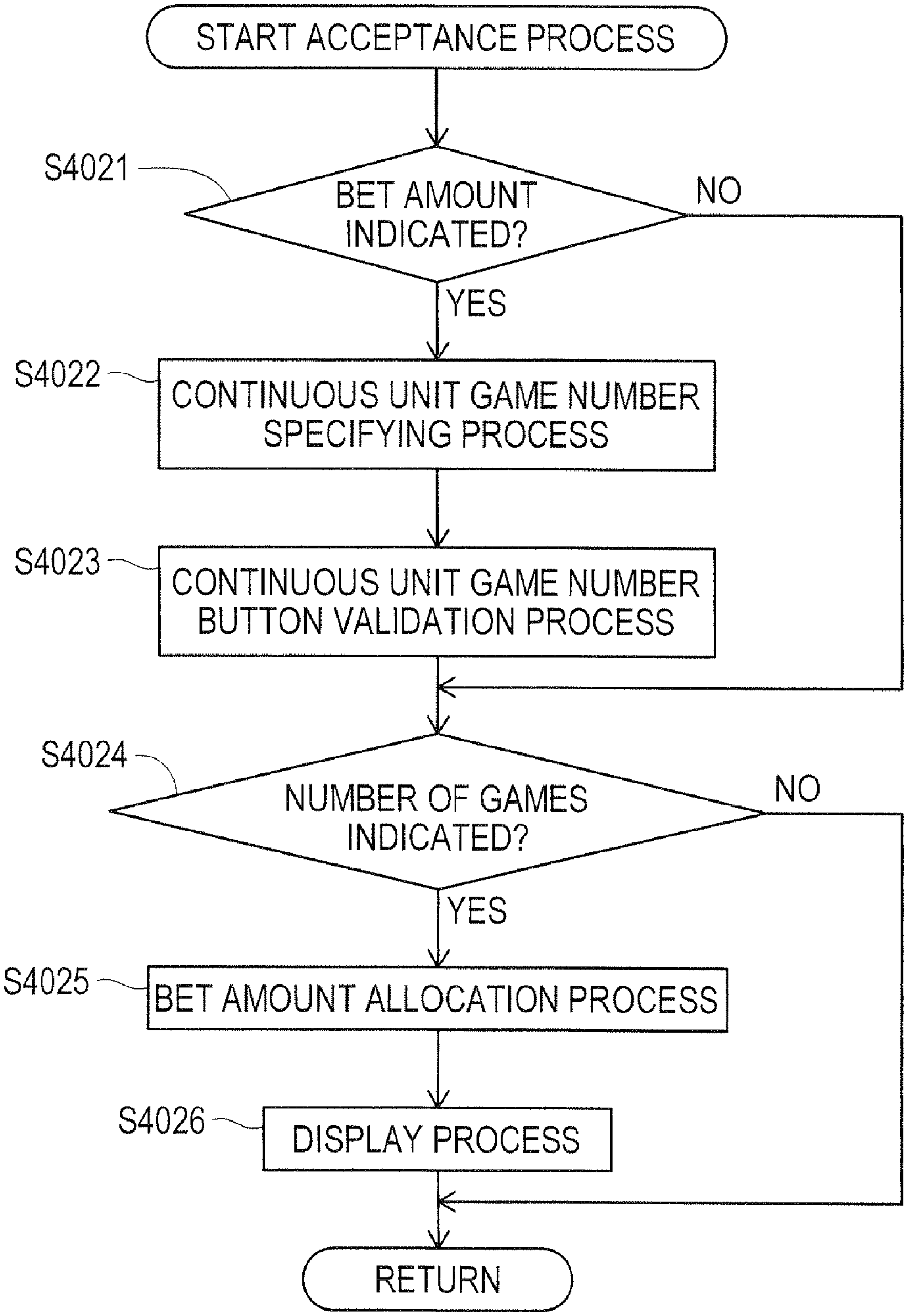
FIG. 62 is a flowchart of a start acceptance process program.

First, as shown in FIG. 60, in S4011, a start acceptance process is executed by the main CPU 4032. Then, a sub process of the start acceptance process in S4011 above will be explained based on FIG. 62. FIG. 62 is a flowchart of the start acceptance process program in the slot machine 4001 according to the present embodiment. Incidentally, each program shown in the flowchart of FIG. 62 is stored in the ROM 4034 or the RAM 4033 of the slot machine 4001, and is executed by the main CPU 4032.

In the start acceptance process in S4011 above, the main CPU 4032 determines, in S4021, whether or not the bet amount has been indicated, as shown in FIG. 62. Here, in a case of an input signal from any of the BET 1 button 4110, BET 5 button 4131, BET 10 button 4112, BET 20 button 4113 and BET 40 button 4114, it is determined that the bet amount has been indicated. However, if the indicated amount exceeds the bet amount corresponding to the credit amount owned by a player at the moment, it is determined that no bet amount has been indicated. At this point, if no bet amount has been indicated (S4021: NO), the process proceeds to S4024 described below. In contrast, if the bet amount has been indicated (S4021: YES), the process proceeds to S4022.

In S4022, the main CPU 4032 executes a continuous unit game number specifying process. In this process, the main CPU 4032 specifies one or a plurality of “continuous games” including a number of unit games which can be indicated by a player, through the bet amount indicated in S4021 above and the minimum bet amount (in the present embodiment, the bet amount being “1”) with respect to a unit game which can be set by a player.

In S4023, the main CPU 4032 executes a continuous unit game number button validation process. In this process, the main CPU 4032 accepts the player’s operating the button related to the “continuous game” specified in S4022 above, with respect to the PLAY 1 GAME button 4104, PLAY 5 GAMES button 4105, PLAY 10 GAMES button 4106, PLAY 50 GAMES button 4107 and PLAY MAX GAMES button 4108.

Incidentally, in a case of a rate of 1 credit for 1 bet, as long as the credit amount owned by a player at the moment is not "0", the player's operation with respect to the PLAY MAX GAMES button 4108 is accepted.

Further, the main CPU 4032 turns on the lamp 4204 provided inside the button related to the "continuous game" specified in S4022 above, by sending a control signal to the lamp driving circuit 4203. As a result, a player is notified that the operation of that button is valid.

In S4024, the main CPU 4032 determines whether or not the number of games has been indicated. Here, with respect to the PLAY 1 GAME button 4104, PLAY 5 GAMES button 4105, PLAY 10 GAMES button 4106, PLAY 50 GAMES button 4107 and PLAY MAX GAMES button 4108, if an input signal is sent from any of the buttons which have been validated in S4023 above, it is determined that the number of games has been indicated. At this point, if the number of games has not been indicated (S4024: NO), the process proceeds to above S4012 shown in FIG. 60. In contrast, if the number of games has been indicated (S4024: YES), the process proceeds to S4025.

Incidentally, the main CPU 4032 assigns the number of games indicated in S4024 above to the variable N. The main CPU 4032 displays the variable N stored in the RAM 4033 on the game number display portion 4201 of the liquid crystal panel 4005B by sending a control signal to the sub control board 4072.

In S4025, the main CPU 4032 executes a bet amount allocation process. In this process, the main CPU 4032 allocates the bet amount indicated in S4021 above in an equal manner to each unit game corresponding to the number of games indicated in S4024 above (refer to FIG. 63 above). As a result of this equal allocation, if a surplus occurs with respect to the bet amount indicated in S4021 above, the main CPU 4032 stores the surplus of the bet amount in the RAM 4033, as surplus information. The main CPU 4032 stores the sum of the bet amount thus evenly allocated in the RAM 4033, as total bet amount information.

The main CPU 4032 stores the bet amount thus allocated in the RAM 4033, as bet allocation information. Then, the main CPU 4032 displays the bet allocation information (the bet amount which is evenly allocated to each unit game) which is stored in the RAM 4033 on the bet amount display portion 4202 of the liquid crystal panel 4005B, by sending a control signal to the sub control board 4072. Then, the process proceeds to above S4012 shown in FIG. 60.

Returning to FIG. 61, in S4012, the main CPU 4032 determines whether or not a predetermined condition is met.

Here, the predetermined condition is that the SPIN button 4115 is depressed. Accordingly, this determination is made based on a signal which is input to the main CPU 4032 depending on depressing the SPIN button 4115. At this point, if the SPIN button 4115 is not depressed (S4012: NO), the process returns to the start acceptance process (S4011) again. Thereby, an operation of changing the bet amount, an operation of changing the number of games and the like are possible. In contrast, if the SPIN button 4115 is depressed (S4012: YES), the process proceeds to S4013.

In S4013, the main CPU 4032 executes a determination process. In this process, the bet amount set based on the above bet operation is reduced from the credit amount owned by the player at the moment. Incidentally, the credit amount after the reduction is stored in the RAM 4033 as credit information. Then, by sending a control signal to the display portion driving circuit 4067, the main CPU 4032 displays the credit information (the credit amount after the above reduction) stored in the RAM 4033 on the credit amount display portion 4009 of the liquid crystal panel 4005B.

The main CPU 4032 includes the surplus information (the surplus of the bet amount which occurred in the allocation process of S4025) stored in the RAM 4033 to the credit information stored in the RAM 4033, at a rate of 1 credit for 1 bet. Then, by sending a control signal to the display portion driving circuit 4067, the main CPU 4032 displays the credit information (the credit amount after the above addition) stored in the RAM 4033 on the credit amount display portion 4009 of the liquid crystal panel 4005B. Further, the main CPU 4032 overwrites "0" in the RAM 4033, as the surplus information.

Further, the main CPU 4032 invalidates the operation with respect to all buttons including the PLAY 1 GAME button 4104, PLAY 5 GAMES button 4105, PLAY 10 GAMES button 4106, PLAY 50 GAMES button 4107 and PLAY MAX GAMES button 4108. Simultaneously, by sending a control signal to the lamp driving circuit 4203, the main CPU 4032 turns off the lamp 4204 provided inside each of the buttons 4104 to 4108.

In S4014, the main CPU 4032 decrements the variable N. Then, by sending a control signal to the sub control board 4072, the main CPU 4032 displays the variable N stored in the RAM 4033 on the game number display portion 4201 of the liquid crystal panel 4005B.

In S4015, the main CPU 4032 executes a symbol random selection process. Specifically, when the lottery program included in the game programs is executed by the main CPU 4032, the random number corresponding to each video reel respectively is selected from a range of "0 to 255". Then, with reference to the symbol weighting data corresponding to the payout rate setting data, based on the nine random numbers, the code number of each video reel is determined by the main CPU 4032. The main CPU 4032 stores the determined code number of each video reel in the RAM 4033 by overwriting code number information in the RAM 4033 with the determined code number of each video reel so as to correspond to each symbol display area of the symbol display frame 4111 on the liquid crystal panel 4005B. Thereafter, the process proceeds to S4016.

Here, the code number of each video reel is associated with the symbol number to be rearranged in each symbol display area of the symbol display frame 4111 on the liquid crystal panel 4005B, so each symbol to be rearranged in such game is determined by overwriting the code number information in the RAM 4033 with the code number of each video reel determined by the main CPU 4032 so as to correspond to each symbol display area of the symbol display frame 4111 on the liquid crystal panel 4005B. For example, if the main CPU 4032 determines that all of the code number of each video reel are "21" and then overwrites the code number information in the RAM 4033 with the code number of each video reel so as to correspond to each symbol display area of the symbol display frame 4111 on the liquid crystal panel 4005B, the main CPU 4032 determines to rearrange the nine symbols of "FRANKENSTEIN" (refer to FIG. 53). Thus, by overwriting the code number information in the RAM 4033 with the code number of each video reel selected by a lottery so as to correspond to each symbol display area of the symbol display frame 4111 on the liquid crystal panel 4005B, each symbol to be rearranged in a unit game of a slot game is determined.

Subsequently, when proceeding to S4016, the main CPU 4032 executes a symbol display control process. In other words, by sending a control signal to the sub control board 4072, the main CPU 4032 starts a scrolling display of each video reel in each symbol display area of the symbol display frame 4111 on the liquid crystal panel 4005B. After that, an effect mode (a display mode of images on the liquid crystal panel 4005B and a sound output mode from the speakers 4023) for each unit game is determined by the main CPU 4032, and the sub control board 4072 is ordered to start the effect in a predetermined effect pattern. Then, when a predetermined timing to stop displaying each video reel in scrolling manner comes, the main CPU 4032, by sending a control signal to the sub control board 4072, stops scrolling of each video reel being displayed. The stop operation is based on the code number stored in the RAM 4033 by overwriting the code number information in the RAM 4033 with the code number so as to correspond to each symbol display area of the symbol display frame 4111 on the liquid crystal panel 4005B. With this, each symbol which determined in S4015 above-mentioned is rearranged in each symbol display area of the symbol display frame 4111 on the liquid crystal panel 4005B.

After that, when proceeding to S4017, the main CPU 4032 determines whether or not there is a winning combination. The determination is made based on the code number stored in the RAM 4033 by overwriting the code number information in the RAM 4033 with the code number so as to correspond to each symbol display area of the symbol display frame 4111 on the liquid crystal panel 4005B. At this point, if there is not a winning combination (S4017: NO), the process proceeds to S4020 described below. In contrast, if there is a winning combination (S4017: YES), the process proceeds to S4018.

In S4018, the main CPU 4032 executes a display renewal process. Specifically, first, the payout amount obtained by multiplying the payout amount corresponding to the winning combination (the number of the same symbol) rearranged in the symbol display frame 4111 of the liquid crystal panel 4005B with the bet amount is computed. Incidentally, the computation is executed based on the bet allocation information in the RAM 4033 and the payout table of FIG. 56. In case that there is more than one payout amount corresponding to the winning combination (the number of the same symbol), the computation is executed by adding up these payout amounts. The computed payout amount is stored in RAM 4033 as payout information. After that, by sending a control signal to the display portion driving circuit 4067, the main CPU 4032 displays the payout information stored in the RAM 4033 (the above-mentioned computed amount) on the payout amount display portion 4008 of the liquid crystal panel 4005B.

Then, the main CPU 4032 executes a payout process in S4019. In the payout process, the payout amount awarded to a player in a slot game is paid out to the player based on the payout information stored in the RAM 4033.

When the pay out is executed, the credit amount stored in the RAM 4033 as the payout information (the payout amount awarded to a player in a slot game) are added to the credit amount stored in the RAM 4033 as the credit information, and the added value is overwritten in the RAM 4033 as the credit information. After that, by sending a control signal to the display portion driving circuit 4067, the main CPU 4032 displays the credit information stored in the RAM 4033 (the added value computed in S4019) on the credit amount display portion 4009 of the liquid crystal panel 4005B.

Incidentally, in the payout process, the credit amount owned by a player at the moment may be paid out by coins corresponding to the credit amount (one credit equals to one coin) based on the player's depressing the CASHOUT button 4102, or may also be paid out by a ticket with a bar code which is printed by the ticket printer 4014.

Then, after the main CPU 4032 executes the above-mentioned payout process in S4019, the process proceeds to S4020.

In S4020, the main CPU 4032 determines whether or not the variable N is "0". At this point, if the variable N is not "0" (S4020: NO), the process returns to S4014 above. As a result, the unit games corresponding to the number of games indicated in S4024 above are executed by auto-play with the bet amount which is allocated in S4025 above. In contrast, if the variable N is "0" (S4020: YES), the main CPU 4032 overwrites "0" in the RAM 4033, as the bet allocation information, and at the same time, displays "0" on the bet amount display portion 4202 of the liquid crystal panel 4005B by sending a control signal to the sub control board 4072. Then, the process returns to S4011 above, at which the main game process is repeated as shown in FIG. 61.

Figure 67:
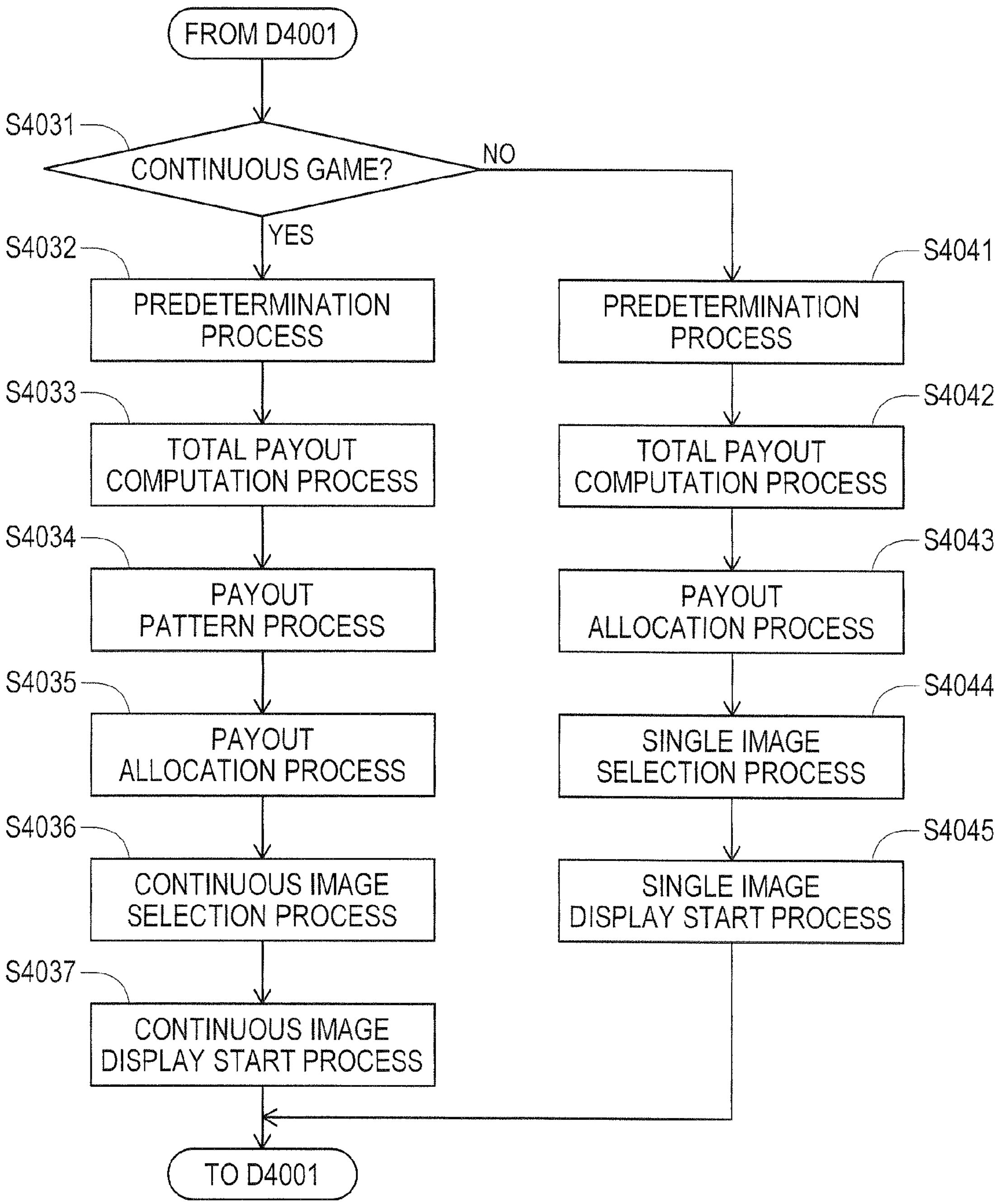
FIG. 67 is a flowchart of a main game process program.

Incidentally, in the present embodiment, S4015 and S4016 are forcibly controlled by a main game process program as shown in FIG. 67 described below.

4-7. Display of Effect Images Suitable for the Payout Pattern

The Fourth Embodiment

In the slot machine 4001 according to the present embodiment, the unit game is executed independently, or alternatively, the unit games constituting the "continuous game" indicated by a player are executed continuously, as described above. In this respect, if the unit game is executed independently, a single image suitable for the presence or absence of a payout is continuously displayed on the liquid crystal display 4005A from a start of that unit game till an end of that unit game.

Alternatively, if the unit games constituting the "continuous game" indicated by a player are executed continuously, a singe image suitable for the presence or absence of a payout is continuously displayed on the liquid crystal display 4005A from a start of each unit game till an end of each unit game. However, in the present embodiment, if the unit games constituting the "continuous game" indicated by a player are executed continuously, a continuous image made up of a combination of a plurality of single images is continuously displayed on the liquid crystal display 4005A from a start of that "continuous game" till an end of that "continuous game". The continuous image is made so as to be suitable for a payout pattern constituted in accordance with the presence or absence of payouts corresponding to the number of times of the unit games constituting the "continuous game".

For that purpose, in the slot machine 4001 according to the present embodiment, a peak single image suitable for the case where a payout occurs and a normal single image suitable for the case where no payout occurs are stored in the image ROM 4086 (refer to FIG. 55), as single images corresponding to the unit game. The screen time of each single image is the same as the time from a start of the unit game till an end of the unit game.

The slot machine 4001 according to the present embodiment comprises continuous images respectively corresponding to all the payout patterns which are conceivable for the "continuous game" that can be indicated by a player. For convenience of the description, in the slot machine 4001 according to the present embodiment, the number of times of the unit games constituting the "continuous game" which can be indicated by a player is assumed to be "2" through "100".

Figures 65, 66:
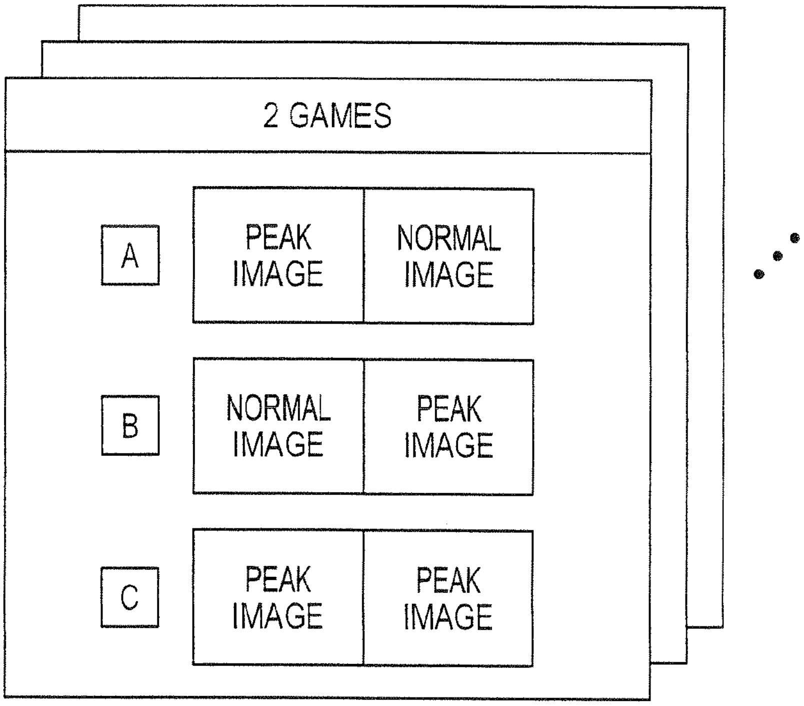
FIG. 65 is a view showing one example of a data table.
FIG. 66 is a view showing one example of a data table.

In the slot machine 4001 according to the present embodiment, all the payout patterns which are conceivable for the "continuous game" that can be indicated by a player are managed in data tables for the payout patterns as shown in FIG. 65. These data tables for the payout patterns are stored in the ROM 4034.

For instance, the data table for the payout patterns as shown in FIG. 65 corresponds to the case that the number of times of the unit games constituting the "continuous game" is "2". The data table for the payout patterns stores three payout patterns, not including the pattern for the case that a payout does not occur in any of the unit games. In FIG. 65, "0" indicates the presence of a payout, and "X" indicates the absence of a payout. Further, data for specifying a continuous image which is suitable for each payout pattern is stored in the data table for the payout patterns so as to correspond to each payout pattern. In FIG. 65, "A", "B" and "C" indicate data that specifies the continuous image.

In the slot machine 4001 according to the present embodiment, the continuous images suitable for each payout pattern in the "continuous game" indicated by a player are managed based on the data tables for the continuous images as shown in FIG. 66. These data tables for the continuous image are stored in the image ROM 4086.

For instance, the data table for the continuous images as shown in FIG. 66 corresponds to the case that the number of times of the unit games constituting the "continuous game" is "2". The data table for the continuous image stores continuous images suitable for each payout pattern by association with data for specifying these continuous images. In FIG. 66, "A", "B" and "C" indicate data for specifying these continuous images.

Each continuous image is made up of a combination of the peak single image and the normal single image in a sequence suitable for the payout pattern. The screen time for each continuous image is the same as the time from a start of that "continuous game" till an end of that "continuous game". The normal image is an image of a common scene of certain content. The peak image is an image of a climax scene of this content. Accordingly, each continuous image is edited in consideration of the storyline of this content.

The continuous images suitable for each payout pattern for the case that the number of times of the unit games constituting the "continuous game" is "2" are respectively stored and managed based on the data tables for the payout patterns as shown in FIG. 65 and the data tables for the continuous images as shown in FIG. 66. Incidentally, the continuous image suitable for the payout pattern corresponding to the case that no payout occurs is made up of the normal single images, the normal single images corresponding to the number of times of the unit games constituting the "continuous game".

Although not shown, the continuous images suitable for each payout pattern in the case that the number of times of the unit games constituting the "continuous game" is from "2" through "99" are stored and managed in a similar fashion.

Then, in the slot machine 4001 according to the present embodiment, the main CPU 4032 executes a main game process program as shown in FIG. 67 at a point in time D4001 placed between S4013 and S4014 of the main game process program as shown in FIG. 60 above. Incidentally, a program shown in the flowchart of FIG. 67 is stored in the ROM 4034 and the RAM 4033 of the slot machine 4001, and is executed by the main CPU 4032.

After executing the determination process for the main game process program in S4013 of FIG. 60 above, the main CPU 4032 determines whether or not a "continuous game" has been realized in S4031 of FIG. 67. At this point in time, the number of times of the unit games constituting the "continuous game" coincides with a variable N. Accordingly, if the variable N is higher than "1", the main CPU 4032 determines that a "continuous game" has been realized. At this point, if a "continuous game" has not been realized (S4031: NO), the process proceeds to S4041. In contrast, if a "continuous game" has been realized (S4031: YES), the process proceeds to S4032.

In S4032, the main CPU 4032 executes a predetermination process. In this process, the main CPU 4032 allocates at random the total bet amount including in the total bet amount information stored in the RAM 4033 to the unit games, the unit games corresponding to the number of games indicated in S4024 of FIG. 62 above (refer to FIG. 51 above and FIG. 64 above). The main CPU 4032 may also allocate this total bet amount evenly (refer to FIG. 63 above).

In S4033, the main CPU 4032 executes a total payout computation process. In this process, the main CPU 4032 computes in advance the total payout which is to be awarded to a player in the "continuous game". This pre-computation is executed by repeating S4015, S4016 and S4019 in FIG. 60 above, by the number of times corresponding to the number of games indicated in S4024 of FIG. 62 above, while using each of the bet amounts allocated in S4032 above.

In S4034, the main CPU 4032 executes a payout pattern process. In this process, the main CPU 4032 specifies one payout pattern from the data table for payout patterns corresponding to the number of times (N times) of the unit games constituting the "continuous game".

In S4035, the main CPU 4032 executes a payout allocation process. In this process, the main CPU 4032 allocates the total payout which was computed in advance in S4033 above to each unit game constituting the "continuous game" by means of the payout pattern specified in S4034 above.

In S4036, the main CPU 4032 executes a continuous image selection process. In this process, the main CPU 4032 reads out the data specifying the continuous image suitable for the payout pattern specified in S4034 above from the data table for the payout patterns, the number of which corresponds to the number of times (N times) of the unit games constituting the "continuous game".

In S4037, the main CPU 4032 executes a continuous image display start process. In this process, the main CPU 4032 starts a display of the continuous image specified in S4036 above on the liquid crystal display 4005A, by sending a control signal to the sub control board 4072. This control signal includes data that was read out in S4036 above and data showing the variable N.

Incidentally, if the total payout computed in advance in S4033 above is 0, the main CPU 4032 executes control so that the normal single image is repeatedly displayed on the liquid display 4005A each time the unit game constituting the "continuous game" is executed, by sending a control signal to the sub control board 4072.

Then, after the process of S4037 above ended, the process proceeds to S4014 of the main game process program in FIG. 60 above. At this time, the main CPU 4032 forcibly controls each process in S4015 and S4016 of the main game process program in FIG. 60 above, so that the payouts allocated in S4035 above is awarded to a player by means of the payout pattern specified in S4034 above.

However, at the time of this forced control, the main CPU 4032 executes control so that the bet amount allocated with respect to a unit game which progresses is updated and stored as the bet allocation information each time each of the unit games constituting the "continuous game" indicated by a player is executed. Further, the main CPU 4032 executes control so that the bet allocation information thus updated and stored is displayed on the bet amount display portion 4202 of the liquid crystal panel 4005B by sending a control signal to the sub control board 4072 each time each of the unit games constituting the "continuous games" indicated by a player is executed.

Incidentally, if the total payout which was computed in advance in S4033 above is 0, each processes in S4015 and S4016 of the main game process program in FIG. 60 above are forcibly controlled so as to prevent awarding of the payout to a player.

Alternatively, if a "continuous game" has not been realized (S4031: NO), the unit game is executed independently. In this case, the main CPU 4032 executes the processes following S4041. First, the main CPU 4032 executes a predetermination process in S4041. In this process, the main CPU 4032 allocates the total bet amount including in the total bet amount information stored in the RAM 4033 to the unit game.

In S4042, the main CPU 4032 executes a total payout computation process. In this process, the main CPU 4032 computes in advance the total payout which is to be awarded to a player in the unit game. This pre-computation is made by executing S4015, S4016 and S4019 in FIG. 60 above, while using the bet amount allocated in S4041 above.

In S4043, the main CPU 4032 executes a payout allocation process. In this process, the main CPU 4032 allocates the total payout which was computed in advance in S4042 above only to the unit game.

In S4044, the main CPU 4032 executes a single image selection process. In this process, the main CPU 4032 reads out data specifying the peak single image.

In S4045, the main CPU 4032 executes a single image display start process. In this process, the main CPU 4032 starts a display of the peak single image on the liquid crystal display 4005A by sending a control signal including data which was read out in S4044 above to the sub control board 4072.

Incidentally, if the total payout which was computed in advance in S4042 above is 0, the main CPU 4032 executes control so that the normal single image is repeatedly displayed on the liquid crystal display 4005A when the unit game is executed, by sending a control signal to the sub control board 4072.

Then, after the process in S4045 above ended, the process proceeds to S4014 of the main game process program in FIG. 60 above. At this time, the main CPU 4032 forcibly controls each process in S4015 and S4016 of the main game process program in FIG. 60 above so that the total payout which was allocated in S4043 above is awarded to a player. If the total payout computed in advance in S4042 above is 0, each processes in S4015 and S4016 of the main game process program in FIG. 60 above are forcibly controlled so as to prevent awarding of the payout to a player.

4-8. Other

The Fourth Embodiment

The present invention is not limited to the above-described fourth embodiment, and various modifications and alterations can be made thereto without departing from the spirit of the invention.

For instance, the present invention may also be applied with respect to a gaming machine wherein unit games such as card games, roulette games, dice games or mahjong game or the like are repeatedly executed.

The slot machine 4001 according to the present embodiment may also generate the payout patterns on a case-by-case basis. For this purpose, in the payout pattern process in S4034 of FIG. 67 above, the presence or absence of payouts corresponding to the number of the unit games constituting this "continuous game" is determined at random.

Figure 68:
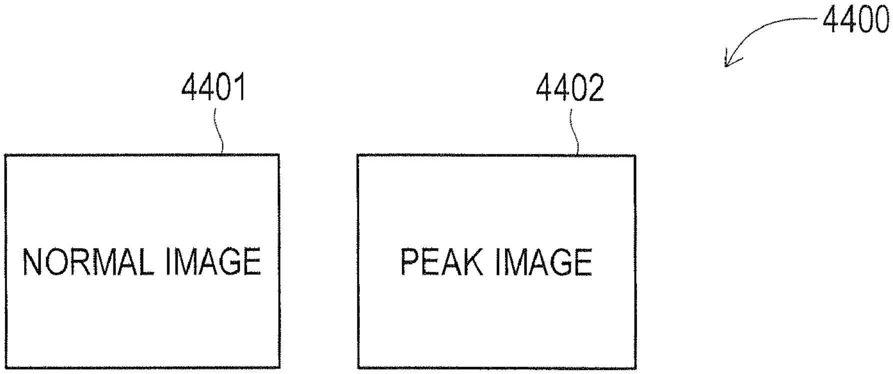
FIG. 68 is a view showing one example of an image group.

Further, the continuous image suitable for the respective payout pattern may also be edited on a case-by-case basis. For this purpose, as shown in FIG. 68, for instance, an image group 4400 made up of only 2 single images 4401, 4402 is stored in the image ROM 4086 (refer to FIG. 55). In this respect, the single image 4401 is the normal image and the single image 4402 is the peak image. The main CPU 4032 generates the continuous image by combining the normal image 4401 and the peak image 4402 in accordance with the rules set depending on the bet allocation information stored in the RAM 4033 and the generated payout patterns above.

The main CPU 4032 may also select the single image displayed on the liquid crystal display 4005A at the time the unit game is being executed from the image group 4400 in accordance with the rules set in accordance with the bet allocation information stored in the RAM 4033. In such a configuration, the image group 4400 made up of a plurality of normal mages 4401 and a plurality of peak images 4402. The contents of each normal image 4401 and each peak image 4402 differ from each other.

5-1. Characteristics of the Present Invention

The Fifth Embodiment

Next, the fifth embodiment of the present invention, as applied to a slot machine which is one example of a gaming machine of the present invention, will be described while referring to the accompanying drawings.

A game which is executed in the slot machine of the present embodiment is constituted of a slot game in which scatter symbols are employed.

Figure 71:
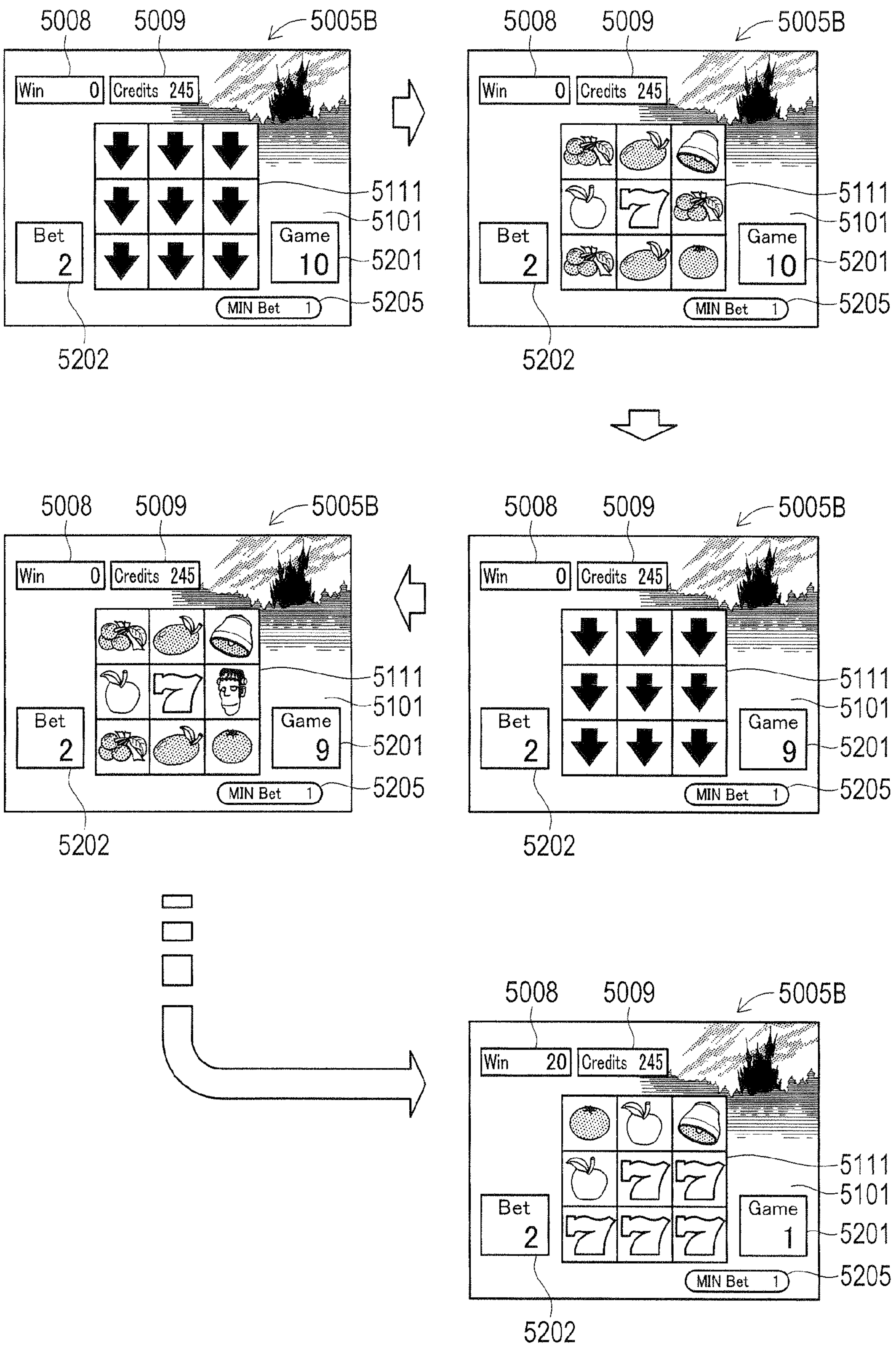
FIG. 71 is a view showing characteristics of a slot machine which is one fifth embodiment of the present invention.

In the slot game, as shown in FIG. 71, a symbol display frame 5111 displaying nine symbols is displayed on the well-known liquid crystal panel 5005B. The nine symbols are arranged in a matrix comprising three rows by three columns. In this respect, within the symbol display frame 5111, nine symbol display areas, where one of many symbols drawn on a reel band of one video reel is arranged, are positioned like a matrix comprising three rows by three columns. That is, one symbol display area is assigned to each of the nine video reels. Then, one of the symbols drawn on the reel band of each video reels is arranged in each of the symbol display areas.

Figure 76:
FIG. 76 is a payout table in which winning combinations and the payout amounts corresponding to the winning combinations are shown when a slot game is executed by using each of the reels.
Figure 76:
Figure 76:
Figure 76:
Figure 76:
Figure 76:
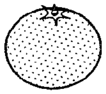
Figure 76:
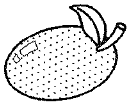

In the meantime, as shown in FIG. 76, various winning combinations are previously determined based on the number of the same scatter symbol. When each of the video reels is scrolled and stopped (refer to FIG. 77 and FIG. 78), a symbol is rearranged one by one in each of the symbol display areas of the symbol display frame 5111, as the liquid crystal panel 5005B shown in FIG. 71. At this time, when the nine symbols that are rearranged in the symbol display frame 5111 compose any one of the winning combinations, the payout amount corresponding to the winning combination composed is displayed in a payout amount display portion 5008. With this, a unit game is configured.

In the slot machine 1 of the present embodiment, the player can indicate that a unit game will be executed continuously by a predetermined number of times such as "1", "5", "10" and the like. A group of unit games which the player indicated as a continuous play corresponds to a "continuous game". This indication is made by operating a plurality of buttons which are respectively provided in accordance with the number of times of the unit games constituting the "continuous game" (refer to FIG. 81).

The player can indicate the bet amount, such as “1”, “5”, “10” and the like, with respect to the “continuous game”. This indication is made by operating a plurality of buttons which are respectively provided in accordance with the bet amount (refer to FIG. 81).

In this respect, in the slot machine 5001 of the present embodiment, once the player indicates the bet amount with respect to the “continuous game”, one or a plurality of “continuous games” including unit games that are executed by the number of times which can be indicated by the player is specified through the bet amount with respect to the “continuous game” indicated by the player and the minimum bet amount with respect to a unit game which can be set by the player (in the present embodiment, the bet amount being “1”). Thereafter, the operation with respect to all buttons corresponding to the “continuous game” thus specified is validated.

The player operates any of the buttons thus validated, whereby the “continuous game”, which is constituted of unit games executed by the number of times indicated by the player through the above-mentioned operation, is executed.

Figure 83:
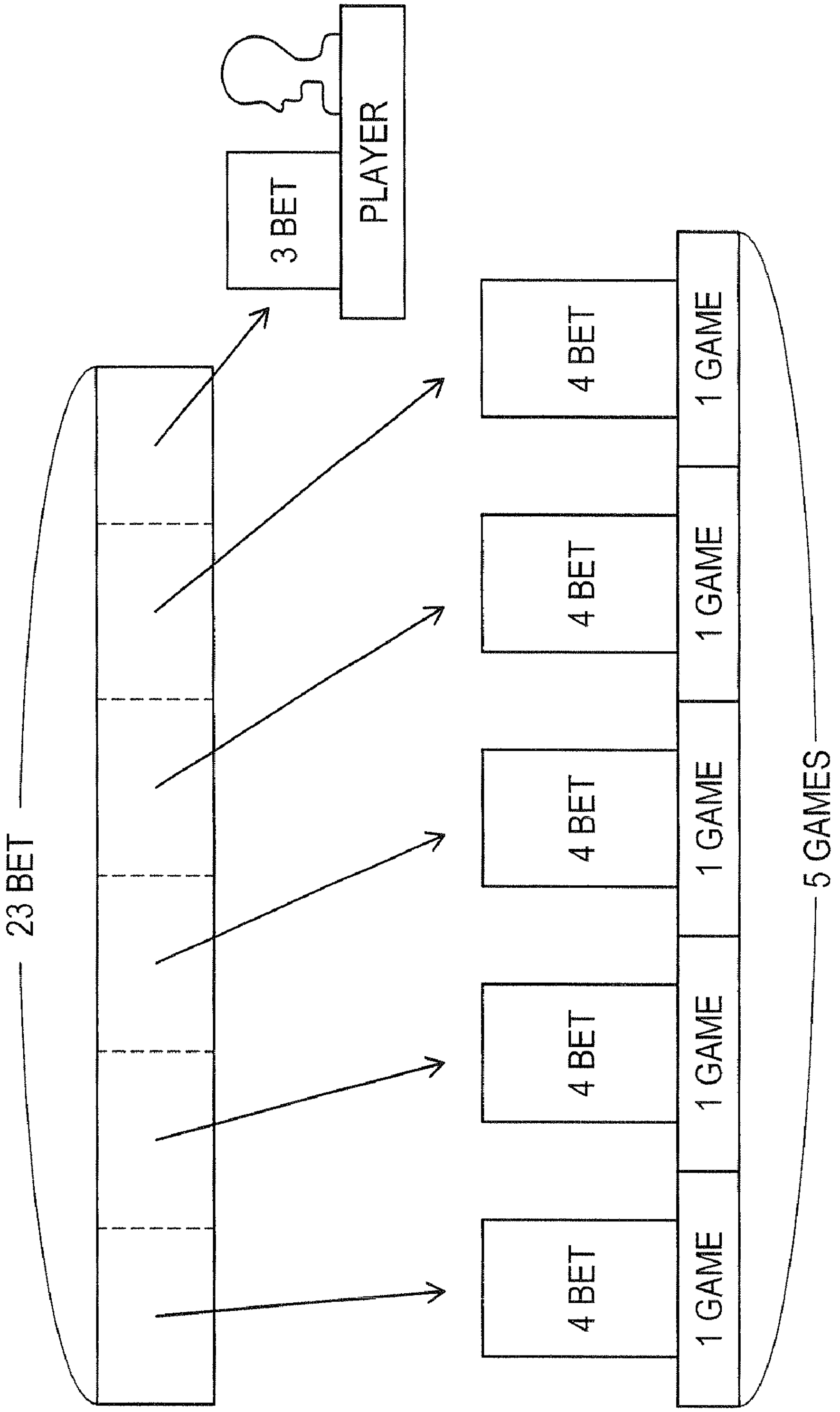
FIG. 83 is a view showing characteristics of the slot machine.

The bet amount with respect to the “continuous game” indicated by the player is evenly allocated to each unit game constituting the “continuous game” indicated by the player. More specifically, as shown in FIG. 83, for instance, the bet amount with respect to the “continuous game” indicated by the player is assumed to be “23”, and the number of times for the unit games constituting the “continuous game” indicated by the player is assumed to be “5”. In this case, the bet amount “4” is evenly allocated with respect to each unit game constituting the “continuous game” indicated by the player.

Incidentally, the bet amount which was left after the bet amount has been evenly allocated with respect to each unit game constituting the “continuous game” is returned to the player. In the case of FIG. 83, the bet amount “3” is returned to the player.

Further, the following can be given as characteristics of the present invention for the case that the unit games constituting the “continuous game” indicated by a player are continuously executed in the slot machine 5001 according to the present embodiment. Namely, a result of the payout for each unit game constituting the “continuous game” is determined in advance before a start of the “continuous game”. The bet amount with respect to the “continuous game” indicated by a player, except for the bet amount that was returned to the player, is allocated at random with respect to each unit game constituting the “continuous game”.

Figure 84:
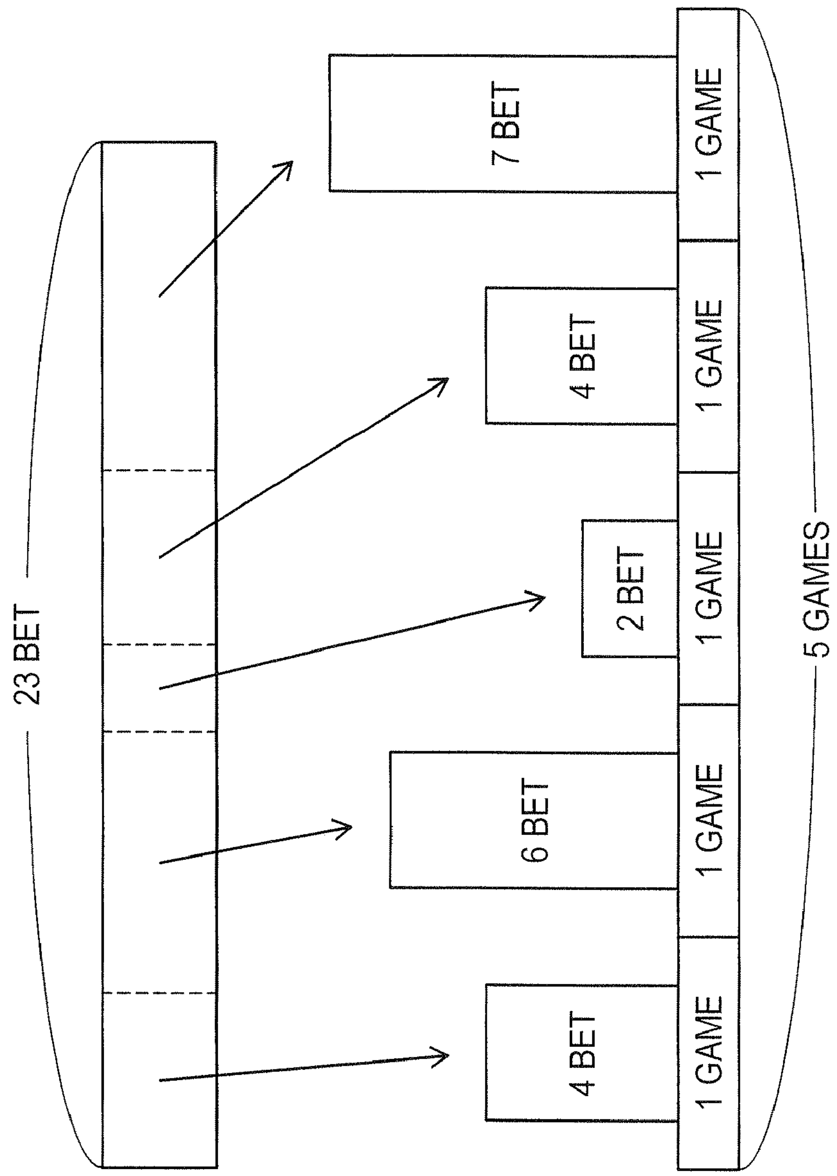
FIG. 84 is a view showing characteristics of the slot machine.

More specifically, as shown in FIG. 84, for instance, the bet amount with respect to the “continuous game” indicated by a player is assumed to be “23” and the number of times of the unit games constituting the “continuous game” indicated by the player is assumed to be “5”. In the case shown in FIG. 84, the bet amount is respectively allocated at random to 5 unit games constituting the “continuous game” indicated by the player, in the order “4”, “6”, “2”, “4” and “7”. However, with this random allocation, the respective bet amounts are adjusted so as to avoid that a surplus of the bet amount occurs.

The payouts for the unit games constituting the “continuous game” are respectively determined in advance by using the bet amount allocated at random as described above. Further, the payouts which have been determined in advance as described above are summed up, whereby the total payout which is payable to the player in the “continuous game” is computed in advance. Alternatively, a payout pattern on whether or not the payout is to be awarded in each unit game constituting the “continuous game” is also determined to a predetermined payout pattern. The total payout which has been computed in advance is allocated with respect to each unit game constituting the “continuous game”, by using this predetermined payout pattern.

This predetermined payout pattern is a pattern which is awarded to a player only in the unit game executed finally out of a plurality of the unit games constituting the “continuous game” indicated by a player.

Once the “continuous game” indicated by the player is started, the unit games constituting this “continuous game” are executed by auto-play, so that the total payout that was computed in advance is adjusted to be paid out to the player by using the predetermined payout pattern. This adjustment may be executed while taking into consideration the bet amount that was allocated in advance, or alternatively, without taking into consideration the bet amount that was allocated in advance. Even in the case that the bet amount allocated in advance is ignored, the sum of the bet amounts for the unit games constituting the “continuous game” is adjusted so as to coincide with the bet amount with respect to the “continuous game” indicated by the player.

5-2. Construction of the Slot Machine

The Fifth Embodiment

Hereinafter, the one embodiment embodying the present invention will be explained in detail with reference to the drawings.

Figure 72:
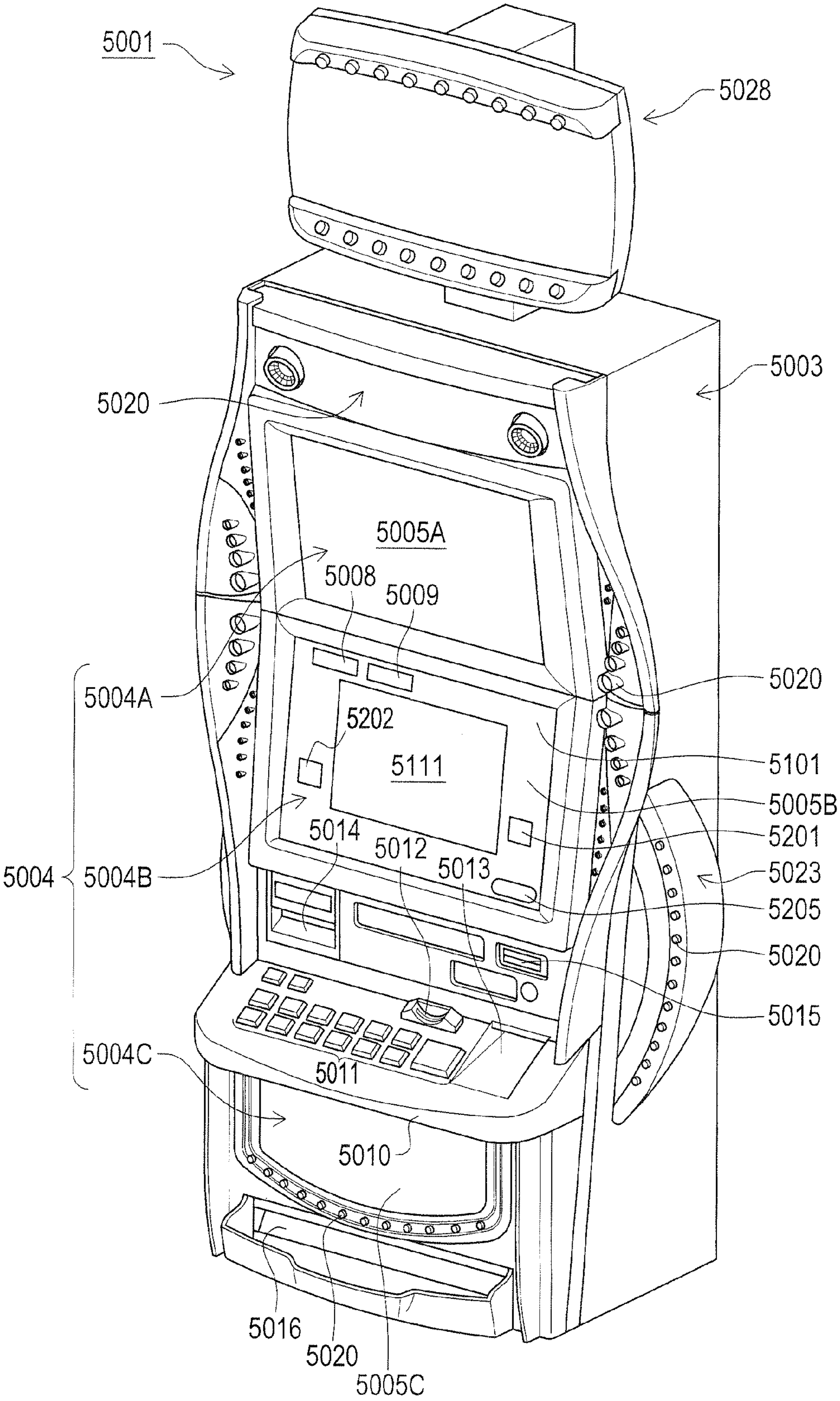
FIG. 72 is a perspective view of the slot machine.

First, an outline construction of the slot machine 5001 according to the present embodiment will be explained based on FIG. 72. FIG. 72 is a perspective view of the slot machine 5001 according to the present embodiment.

As shown in FIG. 72, the slot machine 5001 is an upright type slot machine arranged in a game arcade such as casino, in order to execute predetermined game modes, such slot machine includes a cabinet 5003 in which electronic and mechanical components are installed. For example, as a display portion 5004 to display information a concerning game, there are provided an upper display portion 5004A, a middle variable display portion 5004B and a lower display portion 5004C. Each display portion 5004A to 5004C is mounted at the front of the oblong cabinet 5003. The upper display portion 5004A includes a liquid crystal panel 5005A which is arranged above the middle variable display portion 5004B. On the liquid crystal panel 5005A, for example, an effect image, an introduction of a game content, and a rule explanation of a game are displayed. The lower display portion 5004C is arranged below the middle variable display portion 5004B, and includes a plastic panel 5005C on which images are printed, and a plastic panel 5005C is lightened by backlights.

The middle variable display portion 5004B, which is used to display an execution state of a game, includes the liquid crystal panel 5005B which is fixed at the front door of the cabinet 5003. In this liquid crystal panel 5005B, nine symbols of the video reels are displayed in a scrolling manner and in a stopped manner, respectively. In the middle variable display portion 5004B, the symbol display frame 5111 in which the nine symbol display areas associated with each video reel are positioned like a matrix of three rows times three columns is displayed on the liquid crystal panel 5005B. Further, a touch panel 5101 is provided on the front surface of the liquid crystal panel 5005B. A player can input each kind of commands by operating the touch panel 5101. On the upper position of the middle variable display portion 5004B, the payout amount display portion 5008 and a credit amount display portion 5009 are provided on the liquid crystal panel 5005B. Also the upper portion of the middle variable display portion 5004B, is related to the back side, thereby a player may play a game in a cozy posture.

In the middle variable display portion 5004B, a bet amount display portion 202 is provided on the liquid crystal panel 5005B, at the right side of the symbol display frame 5111. Further, in the middle variable display portion 5004B, a game number display portion 5201 is provided on the liquid crystal panel 5005B, at the left side of the symbol display frame 5111. Furthermore, in the middle variable display portion 5004B, a minimum bet amount display area 5205 is provided on the liquid crystal panel 5005B, at the lower side of the game number display portion 5201.

Figure 77:
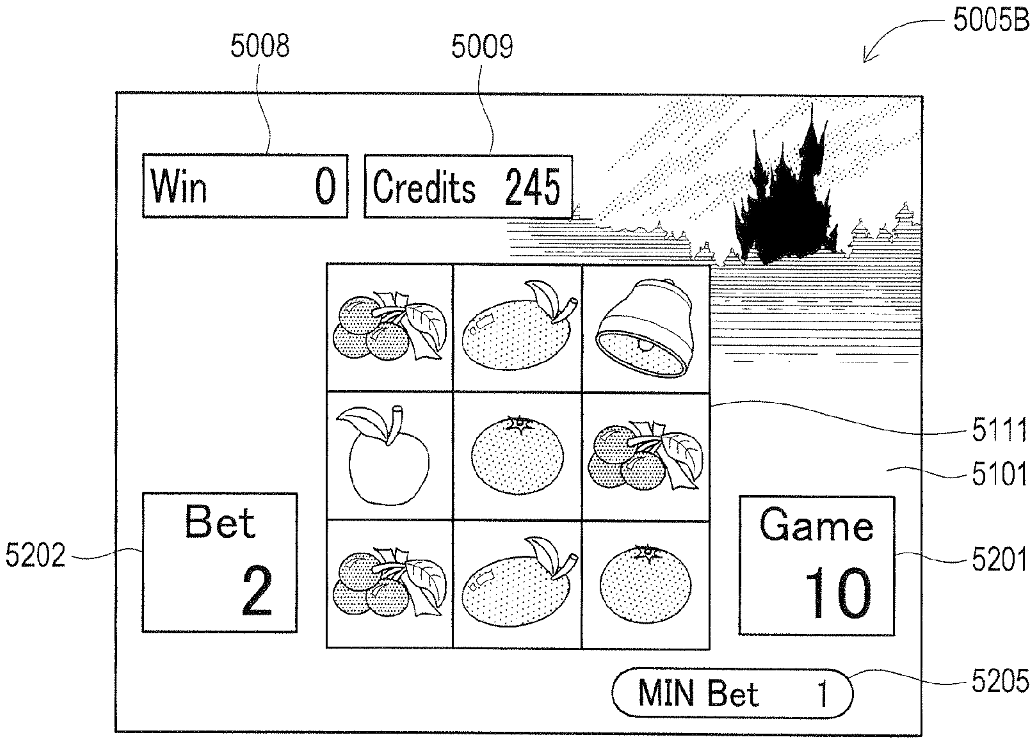
FIG. 77 is a view showing one of an image displayed on a liquid crystal panel.
Figure 78:
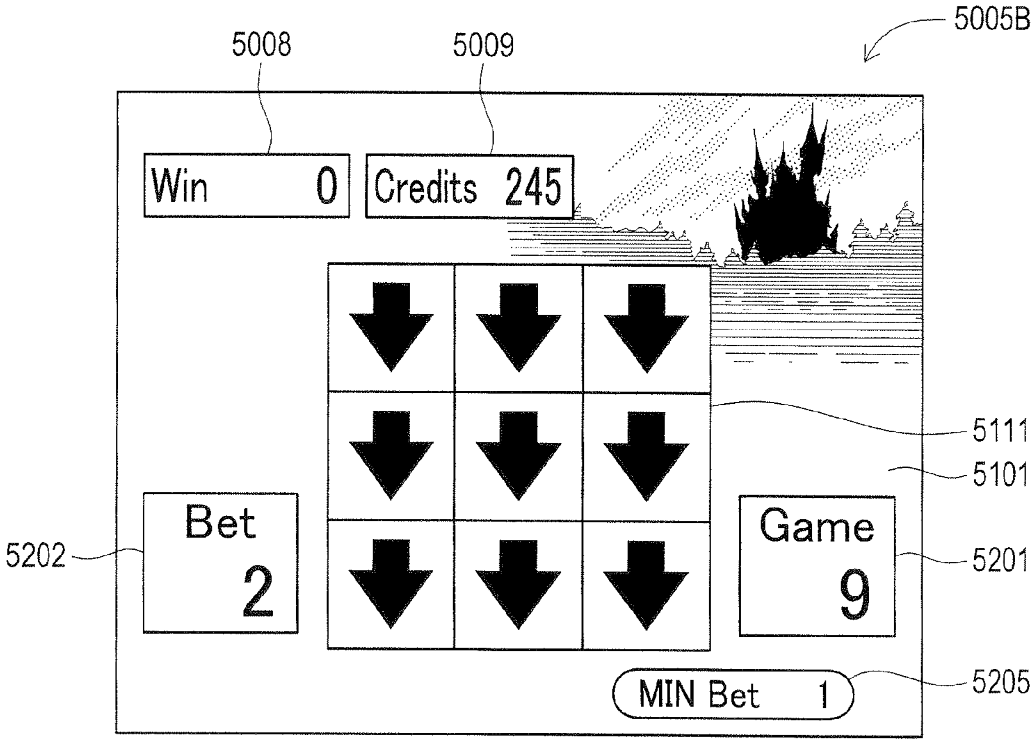
FIG. 78 is a view showing one of an image displayed on the liquid crystal panel.

Now, images of a slot game to be displayed on the liquid crystal panel 5005B are explained. FIG. 77 and FIG. 78 are drawings showing contents displayed on the liquid crystal panel 5005B, as one example of images of a slot game to be displayed on the liquid crystal panel 5005B. As shown in FIG. 77 and FIG. 78, on the liquid crystal panel 5005B in a slot game, the symbol drawn on the reel band of each video reel is displayed in the nine symbol display areas positioned like a matrix of three rows times three columns in the symbol display frame 5111, so that they can be viewed by a player. FIG. 77 shows a state in which the symbol drawn on the reel band of each video reel is arranged or rearranged in each symbol display area of the symbol display frame 5111 on the liquid crystal panel 5005B. FIG. 78 shows a state in which the symbol drawn on the reel band of each video reel is displayed by a scrolling manner in each symbol display area of the symbol display frame 5111 on the liquid crystal panel 5005B. Incidentally, on the reel band of each video reel, a symbol column constructed from twenty-two symbols is drawn respectively (refer to FIG. 73).

Further, the payout amount display portion 5008 and the credit amount display portion 5009 are provided on the liquid crystal panel 5005B. On the payout amount display portion 5008, the payout amount awarded in a slot game to a player is displayed. On the credit amount display portion 5009, the credit amount which is owned by a player at the moment is displayed.

Further, the liquid crystal panel 5005B contains the bet amount display portion 5202, the game number display portion 5201 and the minimum bet amount display area 5205. The bet amount display portion 5202 displays the bet amount for a unit game, as set by a player in a slot game. The game number display portion 5201 displays the remaining number of times for executing unit games that constitute the "continuous game" set by a player in a slot game. The minimum bet amount display area 5205 displays the minimum bet amount for each unit game that a player can set.

Therefore, on the liquid crystal panel 5005B in a slot game, one symbol which is drawn on the reel band of each video reel is arranged in each of the nine symbol display areas of the symbol display frame 5111.

Returning to FIG. 72, at the operation table 5010, a coin insertion slot 5012 and a bill insertion slot 5013 are provided. Between the middle variable display portion 5004B and the lower display portion 5004C, at the front of the cabinet 5003, an operation table 5010 which is projected forward is provided. On the operation table 5010, a variety of operation buttons 5011 including a BET button, a COLLECT button, a SPIN button, a CASHOUT button and the like are arranged as an operation portion to execute a game.

Figure 81:
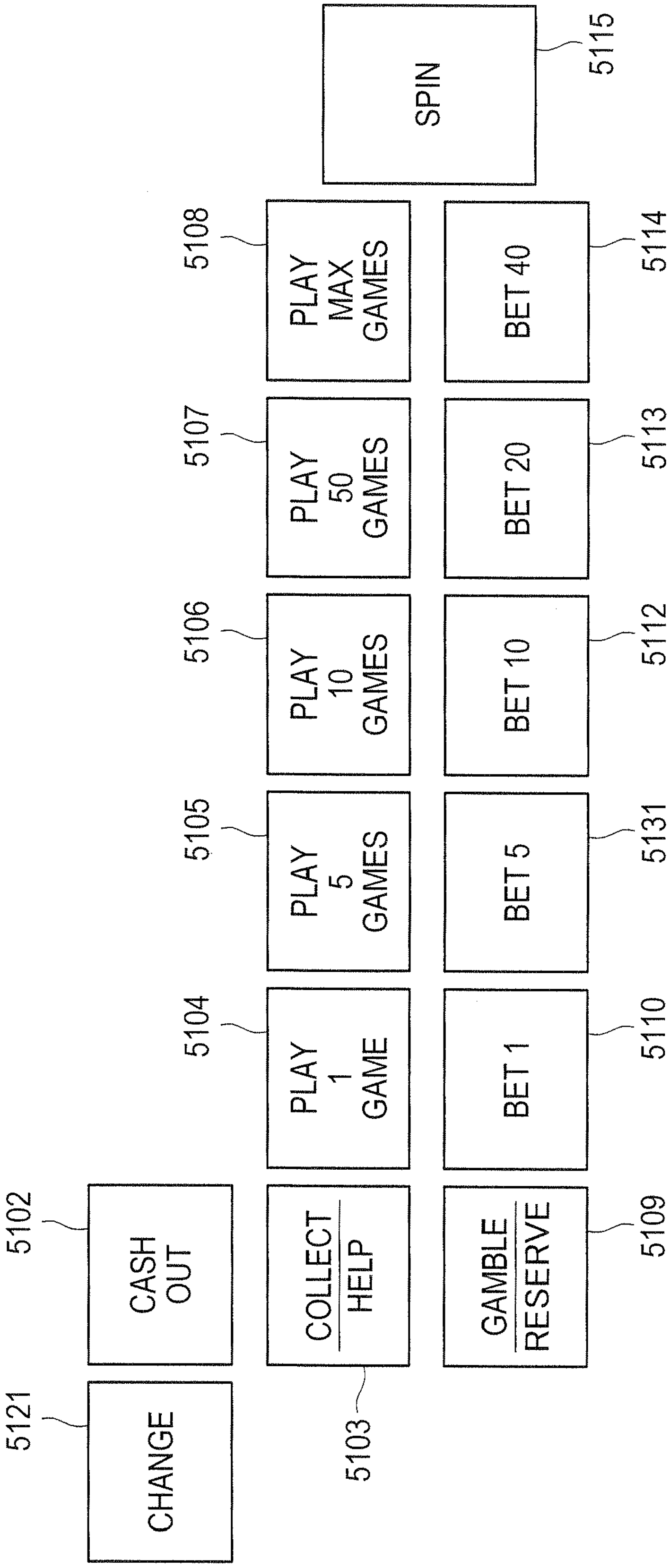
FIG. 81 is a front view showing a variety of operation buttons.

Here, the variety of operation buttons 5011 will now be described. FIG. 81 is a front view showing the variety of operation buttons 5011. As shown in FIG. 81, at an upper stage are provided a CHANGE button 5121, a CASHOUT button 1502 starting from the leftmost side. At a middle stage are provided a COLLECT/HELP button 5103, a PLAY 1 GAME button 5104, a PLAY 5 GAMES button 5105, a PLAY 10 GAMES button 5106, a PLAY 50 GAMES button 5107 and a PLAY MAX GAMES button 5108 starting from the leftmost side. At a lower stage are provided a GAMBLE/RESERVE button 5109, a BET 1 button 5110, a BET 5 button 5131, a BET 10 button 5112, a BET 20 button 5113 and a BET 40 button 5114, starting from the leftmost side. At the rightmost side is provided a SPIN button 5115.

In this respect, the CHANGE button 5121 is an operation device which is used to change bills inserted in the bill insertion slot 5013 (refer to FIG. 72). Coins which have been changed are paid out to a coin tray 5016 (refer to FIG. 72) provided at the lower side of the cabinet 5003 (refer to FIG. 72).

The CASHOUT button 5102 is an operation device which is used to input a command to pay out coins in accordance with the credit amount which a player owns at the moment to the coin tray 5016 (refer to FIG. 72) or a command to pay out such coins by means of bar code-attached tickets which are printed in a ticket printer 5014 (refer to FIG. 72).

The COLLECT/HELP button 5103 is an operation device which is used when completing a double-down game which is executed using the payout amount acquired by a player, or when the game operation method and the like is unclear. Incidentally, if the COLLECT/HELP button 5103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 5104 is an input device for inputting, based on being operated, a command to execute one unit game. The PLAY 5 GAMES button 5105 is an input device for inputting, based on being operated, a command to execute five continuous unit games constituting the "continuous game". The PLAY 10 GAMES button 5106 is an input device for inputting, based on being operated, a command to execute ten continuous unit games constituting the "continuous game". The PLAY 50 GAMES button 5107 is an input device for inputting, based on being operated, a command to execute fifty continuous unit games constituting the "continuous game".

The PLAY MAX GAMES button 5108 is an input device for inputting, based on being operated, a command to execute a maximum number of continuous unit games constituting the "continuous game". Here, the maximum number of times for executing the unit game is computed by dividing the credit amount owned by a player at the moment by the minimum bet amount with respect to each unit game which can be set by the player.

Incidentally, the operation with respect to the PLAY 1 GAME button 5104, PLAY 5 GAMES button 5105, PLAY 10 GAMES button 5106, PLAY 50 GAMES button 5107 and PLAY MAX game button 5108 is not accepted during normal operation.

The GAMBLE/RESERVE button 5109 is an operation device which is used by a player when he/she shifts a slot game to a double-down game, or when he/she steps away from the slot machine.

The BET 1 button 5110 is an input device for inputting, based on being operated, a command to set the bet amount corresponding to "1" with respect to a unit game or the "continuous game". The BET 5 button 5131 is an input device for inputting, based on being operated, a command to set the bet amount corresponding to "5" with respect to a unit game or the "continuous game". The BET 10 button 5112 is an input device for inputting, based on being operated, a command to set the bet amount corresponding to "10" with respect to a unit game or the "continuous game". The BET 20 button 5113 is an input device for inputting, based on being operated, a command to set the bet amount corresponding to "20" with respect to a unit game or the "continuous game". The BET 40 button 5114 is an input device for inputting, based on being operated, a command to set the bet amount corresponding to "40" with respect to a unit game or the "continuous game".

The SPIN button 5115 is an input device for inputting, based on being operated, a command to display each video reel by a scrolling manner.

Returning to FIG. 72, between the operation table 5010 and the middle variable display portion 5004B, the ticket printer 5014 and a card reader 5015 are provided. At the lowest position of the cabinet 5003, the coin tray 5016 is also provided.

Incidentally, in the slot machine 5001 of the present embodiment, gaming medium may be coin, bill, or electronic value (credit). Here, the gaming medium may be others as well, such as medal, token, electronic money, or ticket.

Further, on the cabinet 5003 of the slot machine 5001, light emitting portions 5020 are arranged around a game area including the upper display portion 5004A, the middle variable display portion 5004B, the lower display portion 5004C and the operation table 5010.

Furthermore, the slot machine 5001 also includes a topper effect device 5028 which is installed on the cabinet 5003. The topper effect device 5028 is shaped in a rectangular board shaped, and is provided almost parallel to the liquid crystal panel 5005A of the upper display portion 5004A. The cabinet 5003 is further provided with speakers 5023 on its both sides.

5-3. Outline of Symbols

The Fifth Embodiment

Next, the symbols drawn on the reel band of each video reel will be explained based on FIG. 73. These symbols are scrolled and rearranged in the respective symbol display areas of the symbol display frame 5111 on the liquid crystal panel 5005B in a slot game. FIG. 73 is a schematic view showing symbol columns drawn on the reel band of each video reel.

On the reel band of each video reel, twenty-two symbols are arranged respectively. Each symbol column of video reel is constructed from the symbols including "FRANKENSTEIN", "BLUE7", "BELL", "APPLE", "CHERRY", "PLUM" and "ORANGE". And the symbols of predetermined types are arranged in a predetermined sequence.

In this respect, each of the symbols including "FRANKENSTEIN", "BLUE 7", "BELL", "APPLE", "CHERRY", "PLUM" and "ORANGE" are scatter symbols. If three or four or more scatter symbols are rearranged in the symbol display frame 5111 of the liquid crystal panel 5005B, the payout amount set in advance is awarded to a player (refer to FIG. 76).

Incidentally, to each symbol composing the symbol column of each video reel shown in FIG. 73, a code number is allocated from top to down in sequence.

5-4. Internal Construction of the Slot Machine

The Fifth Embodiment

Next, an internal construction of the above-mentioned slot machine 5001 will be explained with reference to FIG. 74 and FIG. 75.

Figure 74:
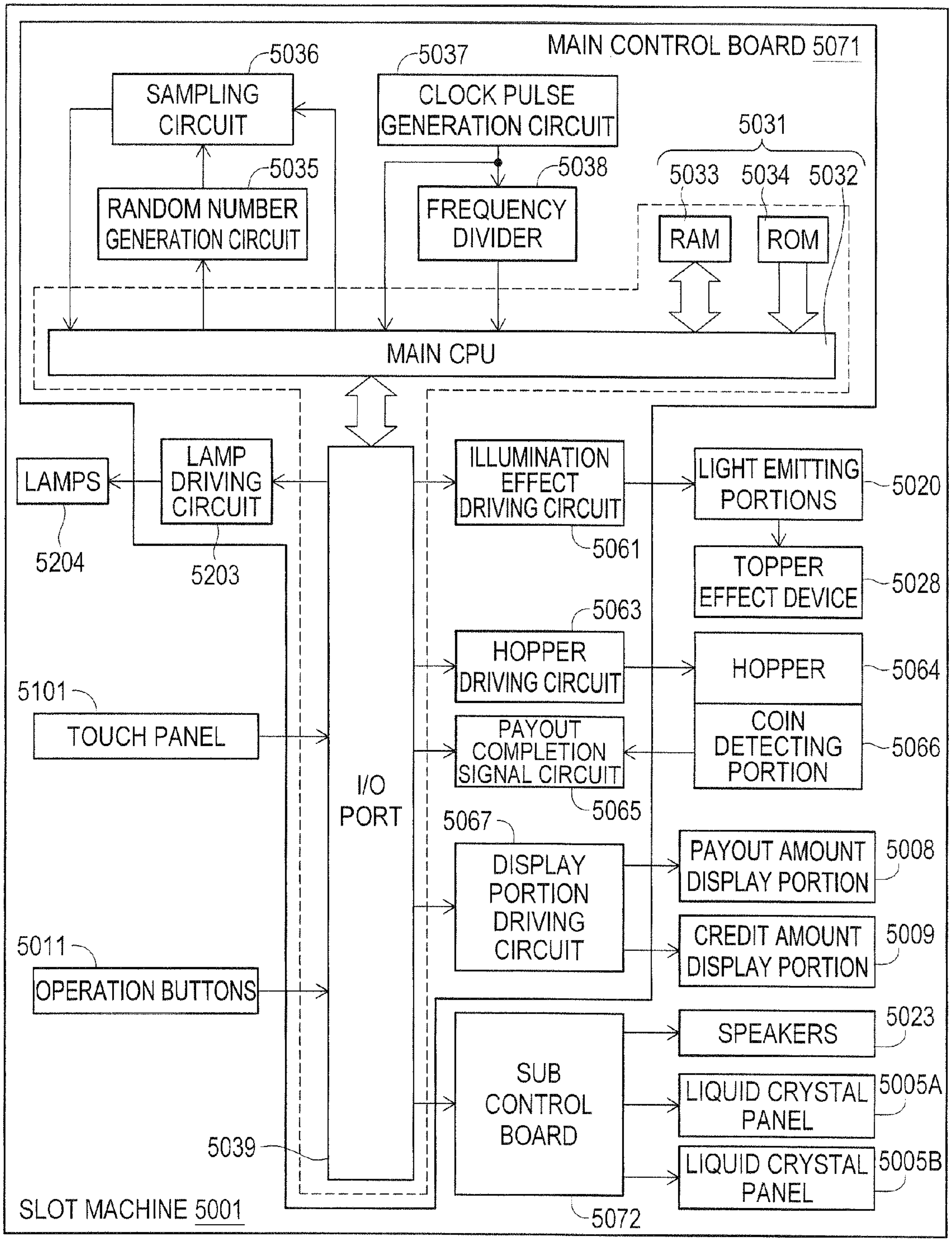
FIG. 74 is a block diagram showing an internal construction of entire slot machine.

FIG. 74 is a block diagram showing an internal construction of entire slot machine 5001. As shown in FIG. 74, the slot machine 5001 includes a plurality of construction elements such as a main control board 5071, in which a microcomputer 5031 is included. The main control board 5071 is constructed from the microcomputer 5031, a random number generation circuit 5035, a sampling circuit 5036, a clock pulse generation circuit 5037 and a frequency divider 5038. The main control board 5071 also includes an illumination effect driving circuit 5061, a hopper driving circuit 5063, a payout completion signal circuit 5065, a display portion driving circuit 5067 and a lamp driving circuit 5203.

The microcomputer 5031 is constructed from a main CPU 5032, a RAM 5033 and a ROM 5034. The main CPU 5032 runs based on programs stored in the ROM 5034, and inputs/outputs a signal with other elements through an I/O port 5039, so as to execute control of the entire slot machine 5001. Data and programs used when the main CPU 5032 runs are stored in the RAM 5033. For example, after-mentioned random numbers which are sampled by the sampling circuit 5036 are stored temporarily after a start of a game, also the code numbers of the respective video reels and the symbol numbers are stored in the RAM 5033. Further, the RAM 5033 sets in advance a storage area where an after-mentioned variable N is stored. Programs executed by the main CPU 5032 and permanent data are stored in the ROM 5034.

Especially, the programs stored in the ROM 5034 include game programs and game system programs (abbreviated as "the game programs and the like" hereinafter). Further, a lottery programs mentioned below is also included in the game programs.

The lottery program is a program used to determine the code numbers of the respective video reels which corresponds to each symbol rearranged in the respective symbol display areas of the symbol display frame 5111 on the liquid crystal panel 5005B. Then, in the lottery program, it is included symbol weighing data corresponding to each of plural kinds of payout rates (for example, 80%, 84%, and 88%). The symbol weighing data are the data indicating correlation between the code number of each video reel and one or plural random numbers belonging to a predetermined number range (0 to 255), every each of the nine video reels. In other words, each of the code number of one video reel is associated with one or more random numbers corresponding to the payout rate. The random numbers are extracted by the lottery program, and symbols specified finally by the random numbers are rearranged in the respective symbol display areas of the symbol display frame 5111 on the liquid crystal panel 5005B.

Random numbers over a predetermined range are generated by the random number generation circuit 5035, which is operated based on instructions from the main CPU 5032. The random numbers are voluntarily extracted from the random numbers generated by the random number generation circuit 5035 by the sampling circuit 5036, based on instructions from the main CPU 5032, and the extracted random numbers are input to the main CPU 5032. The base clock for running the main CPU 5032 is generated by the clock pulse generation circuit 5037, and signals which are generated by dividing the base clock in a predetermined frequency are input to the main CPU 5032 by the frequency divider 38.

And to the main control board 5071, the touch panel 5101 is connected. The touch panel 5101 is arranged in front of the liquid crystal panel 5005B, and specifies the coordinate position of the portion touched by a player. The position on which a player touched and the direction of the movement of the touched portion are determined based on the specified coordinate position information. A signal corresponding to the determination is input to the main CPU 5032 through the I/O port 5039.

Also, the operation buttons 5011 for instructing an execution of a game are connected to the main control board 5071. The operation buttons 5011 include the variety of buttons (refer to FIG. 81). A signal corresponding to the depressing of these buttons is input to the main CPU 5032 through the I/O port 5039.

An effect signal which is used to conduct illumination effect is output to the above-mentioned light emitting portions 5020 and the topper effect device 5028 by the illumination effect driving circuit 5061. Then, the topper effect device 5028 is serially connected to the illumination effect driving circuit 5061 through the light emitting portions 5020.

A hopper 5064 is driven by the hopper driving circuit 5063 based on control of main CPU 5032. The hopper 5064 executes payout of coins, and coins are paid out from the coin tray 5016. Data of the number of coins are input from the connected coin detecting portion 5066 by the payout completion signal circuit 5065. When the number of coins becomes a predetermined number, a signal indicating completion of the coins is input to the main CPU 5032. The number of the coins paid out from the hopper 5064 is calculated by the coin detecting portion 5066, and the data of the number calculated are input to the payout completion signal circuit 5065. The each display operation of the payout amount display portion 5008 and credit amount display portion 5009 is controlled by the display portion driving circuit 5067.

The lamp driving circuit 5203 turns lamps 5204 on/off based on control of main CPU 5032. The lamps 5204 are provided inside the operation buttons 5011. The lamp 5204 inside the button with respect to which a player's operation is validated lights up, notifying the player of the button with respect to which operation is validated.

Furthermore, a sub control board 5072 is connected to the main control board 5071. The sub control board 5072 is connected to the liquid crystal panel 5005A, the liquid crystal panel 5005B and the speakers 5023.

Figure 75:
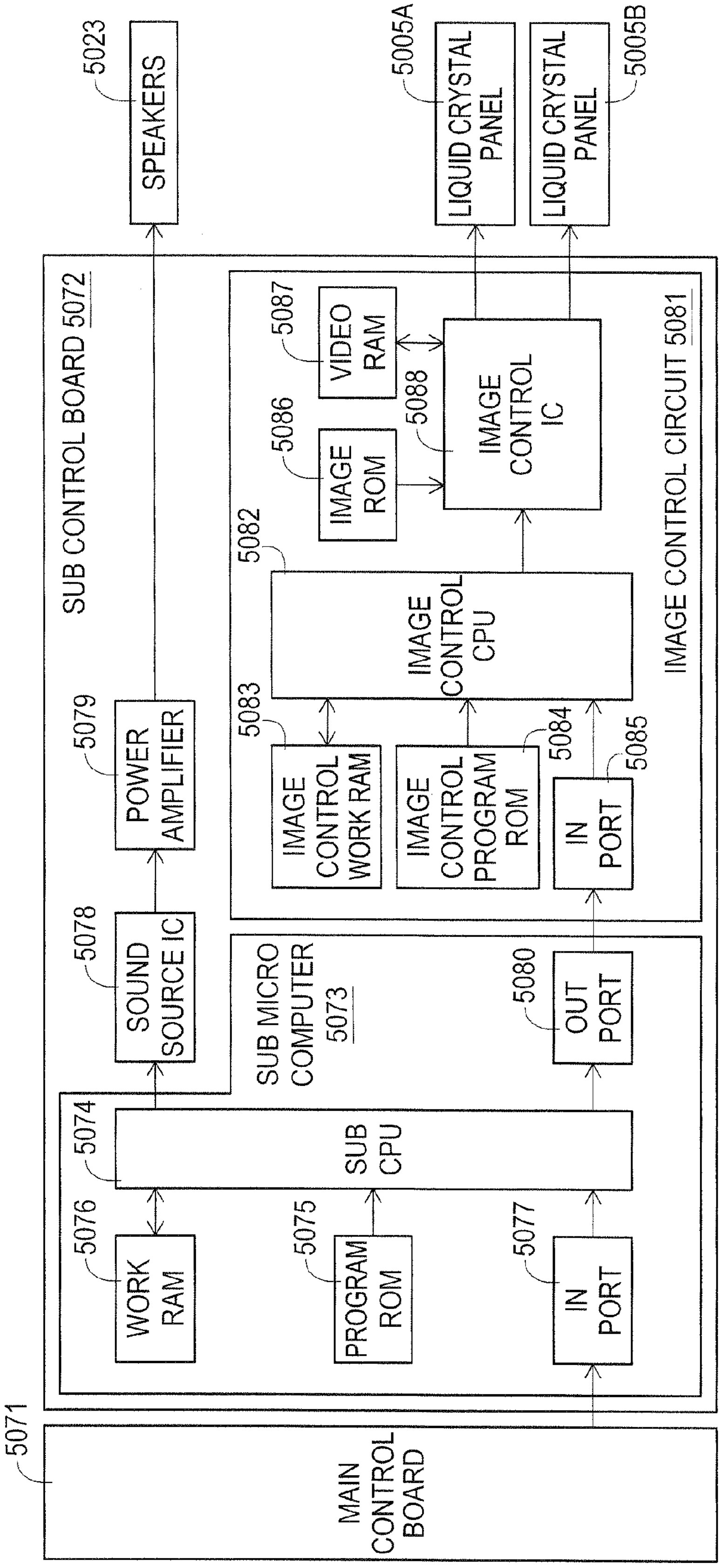
FIG. 75 is a block diagram showing an internal construction of a sub control board.

FIG. 75 is a block diagram showing an internal construction of the sub control board 5072. As shown in FIG. 75, a command from the main control board 5071 is input to the sub control board 5072. The display control on the liquid crystal panel 5005A of the upper display portion 5004A and the liquid crystal panel 5005B of the variable display portion 5004B, and the sound output control on the speakers 5023 are executed by the sub control board 5072. The sub control board 5072 is constructed on a circuit board different from the circuit board for the main control board 5071, and includes a microcomputer 5073 (abbreviated as "sub microcomputer" hereinafter) as a main construction element, and a sound source IC 5078, a power amplifier 5079 and an image control circuit 5081. The sound source IC 5078 controls the sound output from the speakers 5023, the power amplifier 5079 is used as an amplification device, and the image control circuit 5081 runs as a display control device of the liquid crystal panel 5005A and 5005B.

The sub microcomputer 5073 includes a sub CPU 5074, a program ROM 5075, a work RAM 5076, an IN port 5077 and an OUT port 5080. The control operations are executed by the sub CPU 5074 based on a control order sent from the main control board 5071, the program ROM 5075 is used as a memory device. Although a clock pulse generation circuit, a frequency divider, a random number generation circuit and a sampling circuit are not included in the sub control board 5072, the sub control board 5072 is constructed so as to execute random number sampling according to operation programs thereof. Control programs executed by the sub CPU 5074 are stored in the program ROM 5075. The work RAM 5076 is constructed as a temporary storing device when the above-mentioned control programs are executed by the sub CPU 5074.

The image control circuit 5081 includes an image control CPU 5082, an image control work RAM 5083, an image control program ROM 5084, an IN port 5085, an image ROM 5086, a video RAM 5087 and an image control IC 5088. Images displayed on the liquid crystal panel 5005A and 5005B are determined by the image control CPU 5082, based on parameters set by the sub microcomputer 5073, according to image control programs stored in the image control program ROM 5084.

The image control programs regarding to a display of the liquid crystal panel 5005A, 5005B and a variety of selection tables are stored in the image control program ROM 5084. The image control work RAM 5083 is constructed as a temporary storing device when the image control programs are executed by the image control CPU 5082. Images corresponding to contents determined by the image control CPU 5082 are formed by the image control IC 5088, and are output to the liquid crystal panel 5005A, 5005B.

In the image ROM 5086, dot data used to form images are stored. Thus, it stores the dot data on symbols drawn on the reel band of the each video reel. The video RAM 5087 runs as a temporary storing device when the images are formed by the image control IC 5088.

Further, based on a control signal from the main CPU 5032, the image control circuit 5081 performs display control of scrolling display/stop display of the video reels in the respective symbol display areas of the symbol display frame 5111 on the liquid crystal panel 5005B.

5-5. Outline of a Slot Game

The Fifth Embodiment

Next, winning combinations and the payout amounts corresponding to the winning combinations will be explained based on FIG. 76, wherein the winning combinations are symbol combinations when a slot game is executed by using each of the video reels in the slot machine 5001 according to the present embodiment. FIG. 76 is a payout table in which the winning combinations and the payout amounts corresponding to the winning combinations are shown when a slot game is executed by using each of the video reels.

Here, the payout amount shown in FIG. 76 indicates the payout amount when the bet amount is "1". Therefore, when the bet amount is "1", the payout amount shown in FIG. 76 is paid out, and when the bet amount is more than "2", the payout amount obtained by multiplying the payout amount shown in FIG. 76 with the bet amount is paid out.

Accordingly, if the nine scatter symbols of "FRANKENSTEIN" are rearranged in the symbol display frame 5111 of the liquid crystal panel 5005B, the amount obtained by multiplying the bet amount with 500 credits will be paid out. If the eight scatter symbols of "FRANKENSTEIN" are rearranged in the symbol display frame 5111 of the liquid crystal panel 5005B, the amount obtained by multiplying the bet amount with 300 credits will be paid out. Hereinafter, the payout amounts are set in a similar manner, as shown in FIG. 76, in accordance with the number of "FRANKENSTEIN" scatter symbols which have been rearranged in the symbol display frame 5111 of the liquid crystal panel 5005B.

With respect to each of the other scatter symbols including "BLUE 7", "BELL", "APPLE", "CHERRY", "ORANGE"

and "PLUM", as well, the payout amounts as shown in FIG. 76 are set in a similar manner in accordance with the number of the same scatter symbols which have been rearranged in the symbol display frame 5111 of the liquid crystal panel 5005B.

As mentioned above, in the slot machine 5001 according to the present embodiment, a slot game is executed.

In other words, in a slot game, the slot game is executed by rearranging the plurality of same symbols specified by nine video reels in the symbol display frame 5111 of the liquid crystal panel 5005B. In the slot game, firstly, a part of symbol column (one symbol) drawn on the reel band of each video reel shown in FIG. 73, is arranged in each symbol display area of the symbol display frame 5111 on the liquid crystal panel 5005B (refer to FIG. 77). Here, after a player sets the bet amount by depressing the BET button among the operation buttons 5011, if the player depresses the SPIN button 5115 among the operation buttons 5011, each of the video reels rotates, the symbol column drawn on the reel band of each video reel shown in FIG. 73, is scrolled from up to down in the symbol display frame 5111 of the liquid crystal panel 5005B (refer to FIG. 78).

After a predetermined time, each of the video reels stops automatically, a part of symbol column (one symbol) drawn on the reel band of each video reel shown in FIG. 73, is rearranged in each symbol display area of the symbol display frame 5111 on the liquid crystal panel 5005B (refer to FIG. 77). On the other hand, each winning combination based on each the number of the scatter symbol is determined beforehand (refer to FIG. 76). When a symbol combination constructed from the nine symbols rearranged in the symbol display frame 5111 of the liquid crystal panel 5005B, realizes a winning combination specified by the number of the same scatter symbol, the payout amount obtained by multiplying the bet amount with the payout amount corresponding to the realized winning combination is awarded to the player.

5-6. Operation of the Slot Machine

The Fifth Embodiment

Figure 79:
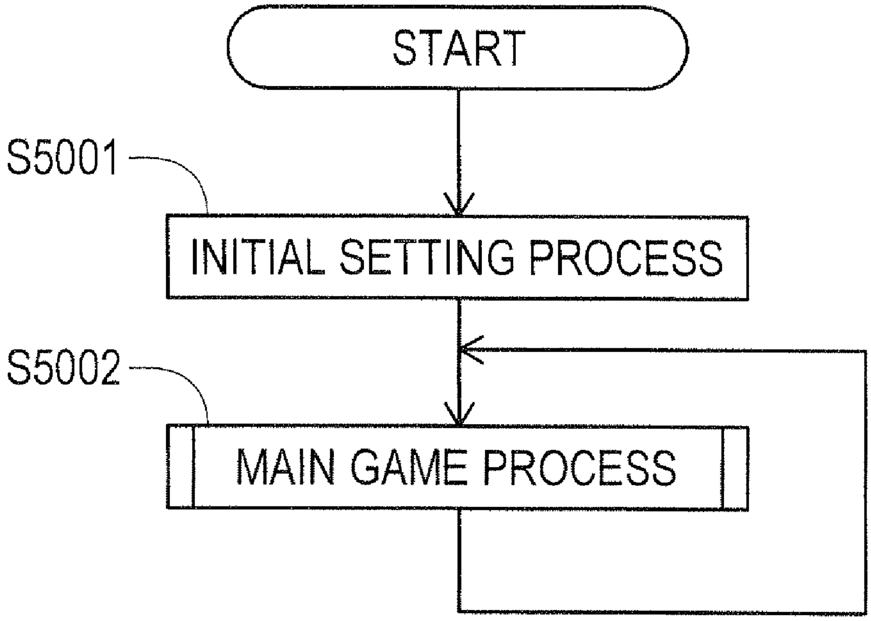
FIG. 79 is a flowchart of a main control program.

Next, a main control program executed in the slot machine 5001 according to the present embodiment will be explained with reference to drawings. FIG. 79 is a flowchart of the main control program.

First, when a power switch is pressed (power activation), the microcomputer 5031 is started to operate, an initial setting process is executed by the microcomputer 5031 in step (abbreviated as "S") 5001. In the initialization process, BIOS stored in the ROM 5034 is executed by the main CPU 5032. Compressed data included in the BIOS are expanded to the RAM 5033, and when the BIOS expansion to the RAM 5033 is executed, a diagnosing process and initialization process of various peripheral devices are executed. Also, the game programs and the like are written from the ROM 5034 to the RAM 5033 by the main CPU 5032, so as to obtain the payout rate setting data and country ID information. Also, during execution of the initial setting process, a verification process to each program is executed.

Then in S5002, the main CPU 5032 reads out the game programs and the like from the RAM 5033, and executes the programs in sequence so as to conduct the main game process. A game is executed in the slot machine 5001 according to the present embodiment by executing the main game process. Then, the main game process is repeated when the power is supplied to the slot machine 5001.

Figure 80:
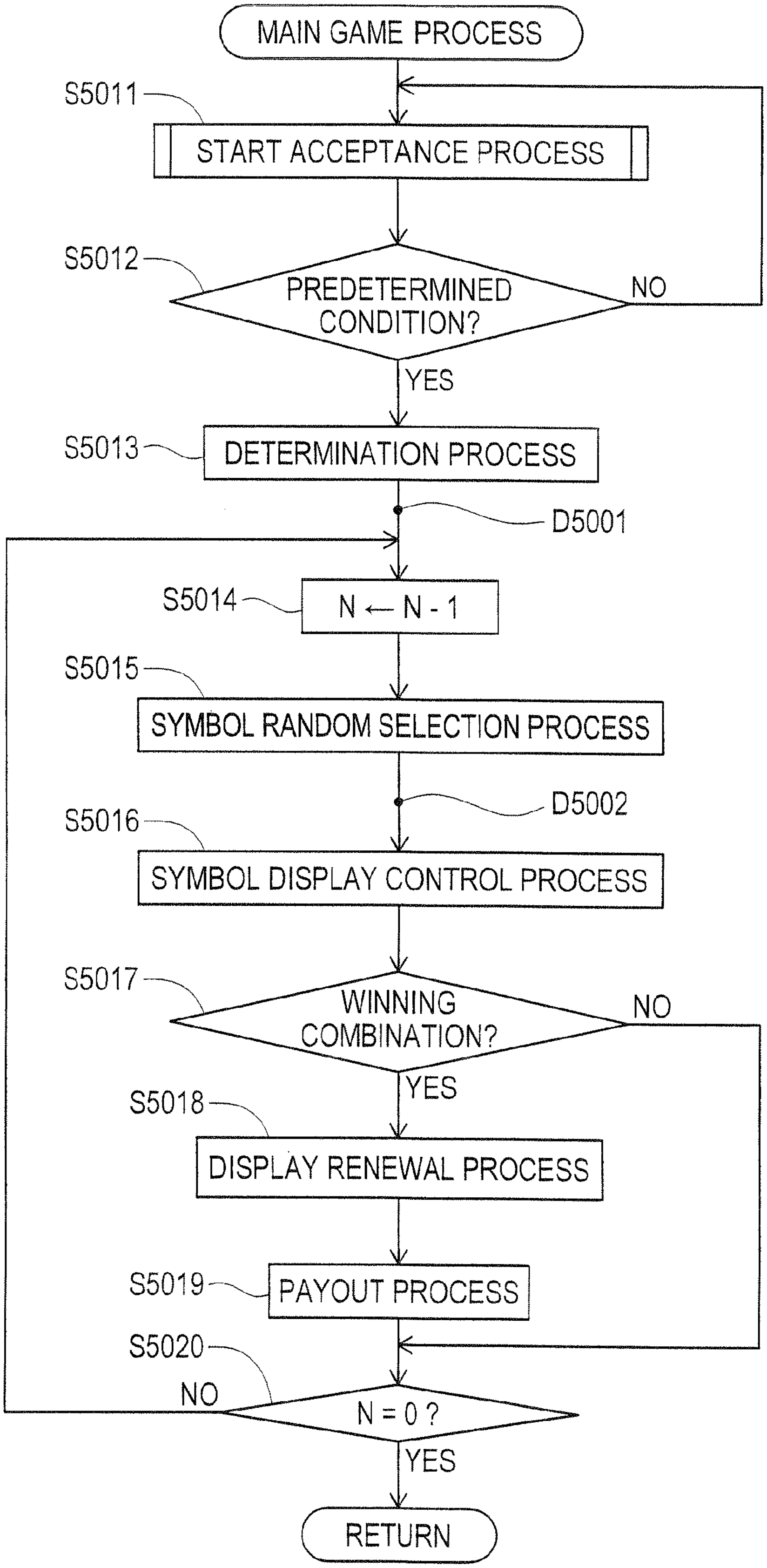
FIG. 80 is a flowchart of a main game process program.

Next, a sub process of the main game process in S5002 above will be explained based on FIG. 80. FIG. 80 is a flowchart of the main game process program in the slot machine 5001 according to the present embodiment. Incidentally, each program shown in the flowchart of FIG. 80 is stored in the ROM 5034 or the RAM 5033 of the slot machine 5001, and is executed by the main CPU 5032.

Figure 82:
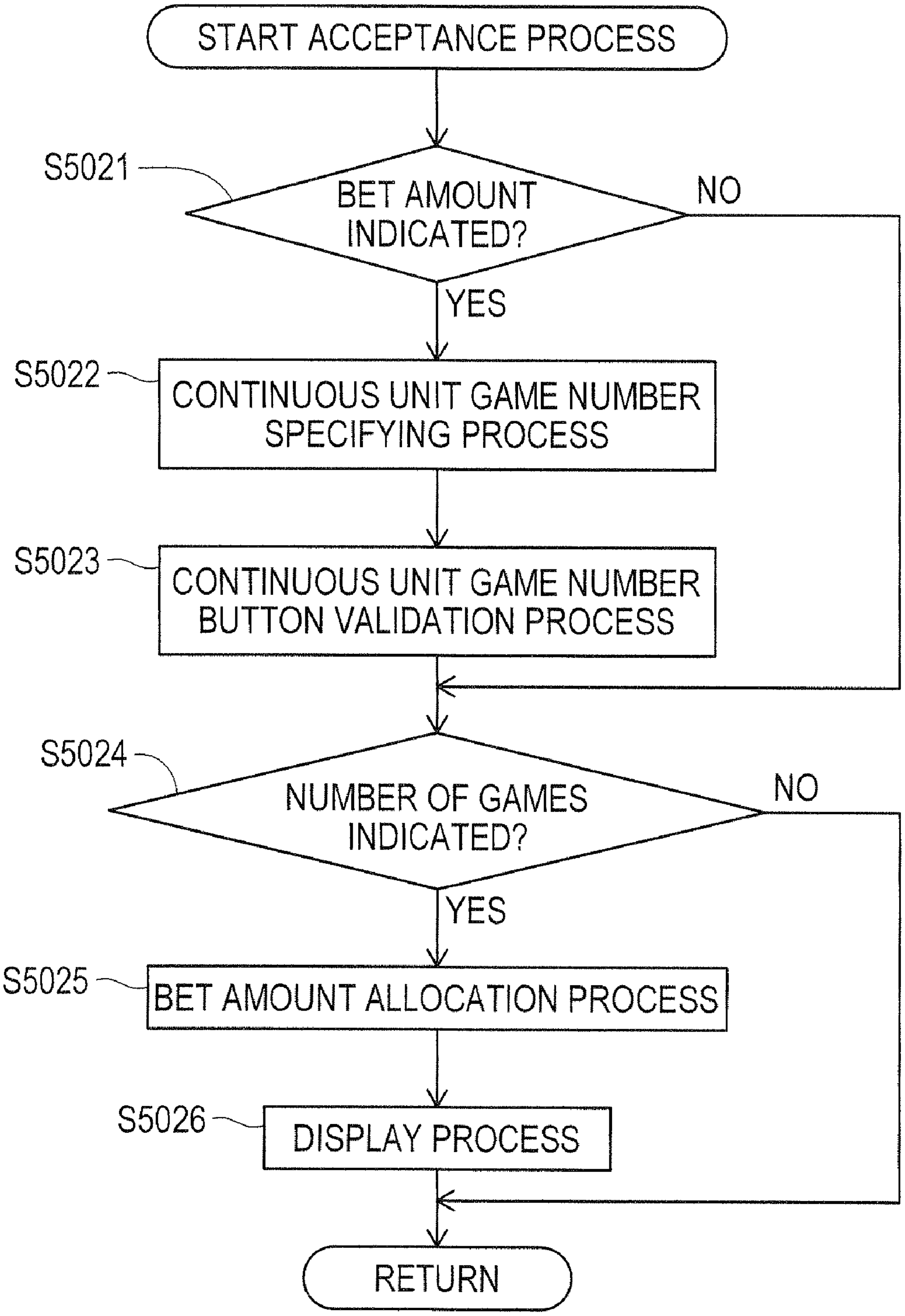
FIG. 82 is a flowchart of a start acceptance process program.

First, as shown in FIG. 80, in S5011, a start acceptance process is executed by the main CPU 5032. Then, a sub process of the start acceptance process in S5011 above will be explained based on FIG. 82. FIG. 82 is a flowchart of the start acceptance process program in the slot machine 5001 according to the present embodiment. Incidentally, each program shown in the flowchart of FIG. 82 is stored in the ROM 5034 or the RAM 5033 of the slot machine 5001, and is executed by the main CPU 5032.

In the start acceptance process in S5011 above, the main CPU 5032 determines, in S5021, whether or not the bet amount has been indicated, as shown in FIG. 82. Here, in a case of an input signal from any of the BET 1 button 5110, BET 5 button 5131, BET 10 button 5112, BET 20 button 5113 and BET 40 button 5114, it is determined that the bet amount has been indicated. However, if the indicated amount exceeds the bet amount corresponding to the credit amount owned by a player at the moment, it is determined that no bet amount has been indicated. At this point, if no bet amount has been indicated (S5021: NO), the process proceeds to S5024 described below. In contrast, if the bet amount has been indicated (S5021: YES), the process proceeds to S5022.

In S5022, the main CPU 5032 executes a continuous unit game number specifying process. In this process, the main CPU 5032 specifies one or a plurality of "continuous games" including a number of unit games which can be indicated by a player, through the bet amount indicated in S5021 above and the minimum bet amount (in the present embodiment, the bet amount being "1") with respect to a unit game which can be set by a player.

In S5023, the main CPU 5032 executes a continuous unit game number button validation process. In this process, the main CPU 5032 accepts the player's operating the button related to the "continuous game" specified in S5022 above, with respect to the PLAY 1 GAME button 5104, PLAY 5 GAMES button 5105, PLAY 10 GAMES button 5106, PLAY 50 GAMES button 5107 and PLAY MAX GAMES button 5108.

Incidentally, in a case of a rate of 1 credit for 1 bet, as long as the credit amount owned by a player at the moment is not "0", the player's operation with respect to the PLAY MAX GAMES button 5108 is accepted.

Further, the main CPU 5032 turns on the lamp 5204 provided inside the button related to the "continuous game" specified in S5022 above, by sending a control signal to the lamp driving circuit 5203. As a result, a player is notified that the operation of that button is valid.

In S5024, the main CPU 5032 determines whether or not the number of games has been indicated. Here, with respect to the PLAY 1 GAME button 5104, PLAY 5 GAMES button 5105, PLAY 10 GAMES button 5106, PLAY 50 GAMES button 5107 and PLAY MAX GAMES button 5108, if an input signal is sent from any of the buttons which have been validated in S5023 above, it is determined that the number of games has been indicated. At this point, if the number of games has not been indicated (S5024: NO), the process proceeds to above S5012 shown in FIG. 80. In contrast, if the number of games has been indicated (S5024: YES), the process proceeds to S5025.

Incidentally, the main CPU 5032 assigns the number of games indicated in S5024 above to the variable N. The main CPU 5032 displays the variable N stored in the RAM 5033 on the game number display portion 5201 of the liquid crystal panel 5005B by sending a control signal to the sub control board 5072.

In S5025, the main CPU 5032 executes a bet amount allocation process. In this process, the main CPU 5032 allocates the bet amount indicated in S5021 above in an equal manner to each unit game corresponding to the number of games indicated in S5024 above (refer to FIG. 83 above). As a result of this equal allocation, if a surplus occurs with respect to the bet amount indicated in S5021 above, the main CPU 5032 stores the surplus of the bet amount in the RAM 5033, as surplus information.

The main CPU 5032 stores the bet amount thus allocated in the RAM 5033, as bet allocation information. Then, the main CPU 5032 displays the bet allocation information (the bet amount which is evenly allocated to each unit game) which is stored in the RAM 5033 on the bet amount display portion 5202 of the liquid crystal panel 5005B, by sending a control signal to the sub control board 5072. Then, the process proceeds to above S5012 shown in FIG. 80.

Returning to FIG. 81, in S5012, the main CPU 5032 determines whether or not a predetermined condition is met.

Here, the predetermined condition is that the SPIN button 5115 is depressed. Accordingly, this determination is made based on a signal which is input to the main CPU 5032 depending on depressing the SPIN button 5115. At this point, if the SPIN button 5115 is not depressed (S5012: NO), the process returns to the start acceptance process (S5011) again. Thereby, an operation of changing the bet amount, an operation of changing the number of games and the like are possible. In contrast, if the SPIN button 5115 is depressed (S5012: YES), the process proceeds to S5013.

In S5013, the main CPU 5032 executes a determination process. In this process, the bet amount set based on the above bet operation is reduced from the credit amount owned by the player at the moment. Incidentally, the credit amount after the reduction is stored in the RAM 5033 as credit information. Then, by sending a control signal to the display portion driving circuit 5067, the main CPU 5032 displays the credit information (the credit amount after the above reduction) stored in the RAM 5033 on the credit amount display portion 5009 of the liquid crystal panel 5005B.

The main CPU 5032 includes the surplus information (the surplus of the bet amount which occurred in the allocation process of S5025) stored in the RAM 5033 to the credit information stored in the RAM 5033, at a rate of 1 credit for 1 bet. Then, by sending a control signal to the display portion driving circuit 5067, the main CPU 5032 displays the credit information (the credit amount after the above addition) stored in the RAM 5033 on the credit amount display portion 5009 of the liquid crystal panel 5005B. Further, the main CPU 5032 overwrites "0" in the RAM 5033, as the surplus information.

Further, the main CPU 5032 invalidates the operation with respect to all buttons including the PLAY 1 GAME button 5104, PLAY 5 GAMES button 5105, PLAY 10 GAMES button 5106, PLAY 50 GAMES button 5107 and PLAY MAX GAMES button 5108. Simultaneously, by sending a control signal to the lamp driving circuit 5203, the main CPU 5032 turns off the lamp 5204 provided inside each of the buttons 5104 to 5108.

In S5014, the main CPU 5032 decrements the variable N. Then, by sending a control signal to the sub control board 5072, the main CPU 5032 displays the variable N stored in the RAM 5033 on the game number display portion 5201 of the liquid crystal panel 5005B.

In S5015, the main CPU 5032 executes a symbol random selection process. Specifically, when the lottery program included in the game programs is executed by the main CPU 5032, the random number corresponding to each video reel respectively is selected from a range of "0 to 255". Then, with reference to the symbol weighting data corresponding to the payout rate setting data, based on the nine random numbers, the code number of each video reel is determined by the main CPU 5032. The main CPU 5032 stores the determined code number of each video reel in the RAM 5033 by overwriting code number information in the RAM 5033 with the determined code number of each video reel so as to correspond to each symbol display area of the symbol display frame 5111 on the liquid crystal panel 5005B. Thereafter, the process proceeds to S5016.

Here, the code number of each video reel is associated with the symbol number to be rearranged in each symbol display area of the symbol display frame 5111 on the liquid crystal panel 5005B, so each symbol to be rearranged in such game is determined by overwriting the code number information in the RAM 5033 with the code number of each video reel determined by the main CPU 5032 so as to correspond to each symbol display area of the symbol display frame 5111 on the liquid crystal panel 5005B. For example, if the main CPU 5032 determines that all of the code number of each video reel are "21" and then overwrites the code number information in the RAM 5033 with the code number of each video reel so as to correspond to each symbol display area of the symbol display frame 5111 on the liquid crystal panel 5005B, the main CPU 5032 determines to rearrange the nine symbols of "FRANKENSTEIN" (refer to FIG. 83). Thus, by overwriting the code number information in the RAM 5033 with the code number of each video reel selected by a lottery so as to correspond to each symbol display area of the symbol display frame 5111 on the liquid crystal panel 5005B, each symbol to be rearranged in a unit game of a slot game is determined.

Subsequently, when proceeding to S5016, the main CPU 5032 executes a symbol display control process. In other words, by sending a control signal to the sub control board 5072, the main CPU 5032 starts a scrolling display of each video reel in each symbol display area of the symbol display frame 5111 on the liquid crystal panel 5005B. After that, an effect mode (a display mode of images on the liquid crystal panel 5005B and a sound output mode from the speakers 5023) for each unit game is determined by the main CPU 5032, and the sub control board 5072 is ordered to start the effect in a predetermined effect pattern. Then, when a predetermined timing to stop displaying each video reel in scrolling manner comes, the main CPU 5032, by sending a control signal to the sub control board 5072, stops scrolling of each video reel being displayed. The stop operation is based on the code number stored in the RAM 5033 by overwriting the code number information in the RAM 5033 with the code number so as to correspond to each symbol display area of the symbol display frame 5111 on the liquid crystal panel 5005B. With this, each symbol which determined in S5015 above-mentioned is rearranged in each symbol display area of the symbol display frame 5111 on the liquid crystal panel 5005B.

After that, when proceeding to S5017, the main CPU 5032 determines whether or not there is a winning combination. The determination is made based on the code number stored in the RAM 5033 by overwriting the code number information in the RAM 5033 with the code number so as to correspond to each symbol display area of the symbol display frame 5111 on the liquid crystal panel 5005B. At this point, if there is not a winning combination (S5017: NO), the process proceeds to S5020 described below. In contrast, if there is a winning combination (S5017: YES), the process proceeds to S5018.

In S5018, the main CPU 5032 executes a display renewal process. Specifically, first, the payout amount obtained by multiplying the payout amount corresponding to the winning combination (the number of the same symbol) rearranged in the symbol display frame 5111 of the liquid crystal panel 5005B with the bet amount is computed. Incidentally, the computation is executed based on the bet allocation information in the RAM 5033 and the payout table of FIG. 76. In case that there is more than one payout amount corresponding to the winning combination (the number of the same symbol), the computation is executed by adding up these payout amounts. The computed payout amount is stored in RAM 5033 as payout information. After that, by sending a control signal to the display portion driving circuit 5067, the main CPU 5032 displays the payout information stored in the RAM 5033 (the above-mentioned computed amount) on the payout amount display portion 5008 of the liquid crystal panel 5005B.

Then, the main CPU 5032 executes a payout process in S5019. In the payout process, the payout amount awarded to a player in a slot game is paid out to the player based on the payout information stored in the RAM 5033.

When the pay out is executed, the credit amount stored in the RAM 5033 as the payout information (the payout amount awarded to a player in a slot game) are added to the credit amount stored in the RAM 5033 as the credit information, and the added value is overwritten in the RAM 5033 as the credit information. After that, by sending a control signal to the display portion driving circuit 5067, the main CPU 5032 displays the credit information stored in the RAM 5033 (the added value computed in S5019) on the credit amount display portion 5009 of the liquid crystal panel 5005B.

Incidentally, in the payout process, the credit amount owned by a player at the moment may be paid out by coins corresponding to the credit amount (one credit equals to one coin) based on the player's depressing the CASHOUT button 5102, or may also be paid out by a ticket with a bar code which is printed by the ticket printer 5014.

Then, after the main CPU 5032 executes the above-mentioned payout process in S5019, the process proceeds to S5020.

In S5020, the main CPU 5032 determines whether or not the variable N is "0". At this point, if the variable N is not "0" (S5020: NO), the process returns to S5014 above. As a result, the unit games corresponding to the number of games indicated in S5024 above are executed by auto-play with the bet amount which is allocated in S5025 above. In contrast, if the variable N is "0" (S5020: YES), the main CPU 5032 overwrites "0" in the RAM 5033, as the bet allocation information, and at the same time, displays "0" on the bet amount display portion 5202 of the liquid crystal panel 5005B by sending a control signal to the sub control board 5072. Then, the process returns to S5011 above, at which the main game process is repeated as shown in FIG. 81.

5-7. Awarding of Payouts Suitable for a Predetermined Payout Pattern

The Fifth Embodiment

In the slot machine 5001 according to the present embodiment, the unit game is executed independently, or alternatively, the unit games constituting the "continuous game" indicated by a player are executed continuously, as described above. In this respect, in the case that the unit games constituting the "continuous game" indicated by a player are executed continuously, the main game process program shown in FIG. 80 above is forcibly controlled by a main game process programs shown in FIG. 85 and FIG. 86 as described below. As a result of this forcible control, a payout is awarded to a player based on the predetermined payout pattern. Here, as described above, the predetermined payout pattern is a pattern which is awarded to a player only in the unit game executed finally out of a plurality of the unit games constituting the "continuous game" indicated by a player.

Here, the main game process program shown in FIG. 85 will be explained. In the slot machine 5001 according to the present embodiment, the main CPU 5032 executes the main game process program shown in FIG. 85 at a point in time D5001 placed between S5013 and S5014 of the main game process program shown in FIG. 80 above. Incidentally, the program shown in the flowchart of FIG. 85 is stored in the ROM 5034 and the RAM 5033 of the slot machine 5001, and is executed by the main CPU 5032.

Figure 85:
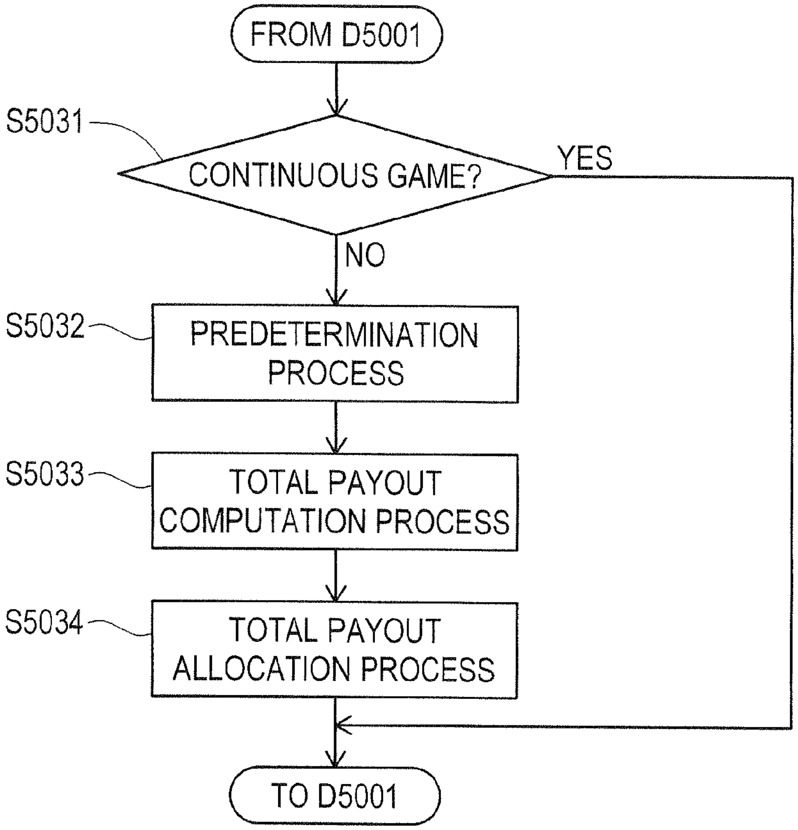
FIG. 85 is a flowchart of a main game process program.

After executing the determination process in S5013 of the main game process program shown in FIG. 80 above, the main CPU 5032 determines whether or not the "continuous game" has been realized, in S5031 of FIG. 85. At this time, the number of times of the unit games constituting the "continuous game" coincides with the variable N. Accordingly, the main CPU 5032 determines that the "continuous game" has been realized if the variable N is greater than "1". At this point, if the "continuous game" has not been realized (S5031: NO), the process proceeds to S5014 of the main game process program shown in FIG. 80 above. In contrast, if the "continuous game" has been realized (S5031: YES), the process proceeds to S5032.

In S5032, the main CPU 5032 executes a predetermination process. In this process, the main CPU 5032 allocates at random the total bet amount including in total bet amount information stored in the RAM 5033 to the unit games, the unit games corresponding to the number of games indicated in S5024 of FIG. 82 above (refer to FIG. 84 above). The main CPU 5032 may also allocate this total bet amount evenly (refer to FIG. 83 above).

In S5033, the main CPU 5032 executes a total payout computation process. In this process, the main CPU 5032 computes in advance the total payout which is to be awarded to a player in the "continuous game". This pre-computation is executed by repeating S5015, S5016 and S5019 in FIG. 80 above, by the number of times corresponding to the number of games indicated in S5024 of FIG. 82 above, while using each of the bet amounts allocated in S5032 above.

In S5034, the main CPU 5032 executes a total payout allocation process. In this process, the main CPU 5032 allocates the total payout which was computed in advance in S5033 above only to the unit game which will be executed finally out of each of the unit games constituting the "continuous game" indicated by a player.

After the process in S5034 above ended, the process proceeds to S5014 of the main game process program shown in FIG. 80 above. At this time, the main CPU 5032 forcibly controls the main game process program shown in FIG. 80 above so that the total payout computed in advance in S5033 above is awarded to a player in the unit game which will be executed finally out of each of the unit games constituting the "continuous game" indicated by a player.

Incidentally, if the total payout computed in advance in S5033 above is 0, the main CPU 5032 forcibly controls the main game process program so as to prevent award of a payout to a player.

Figure 86:
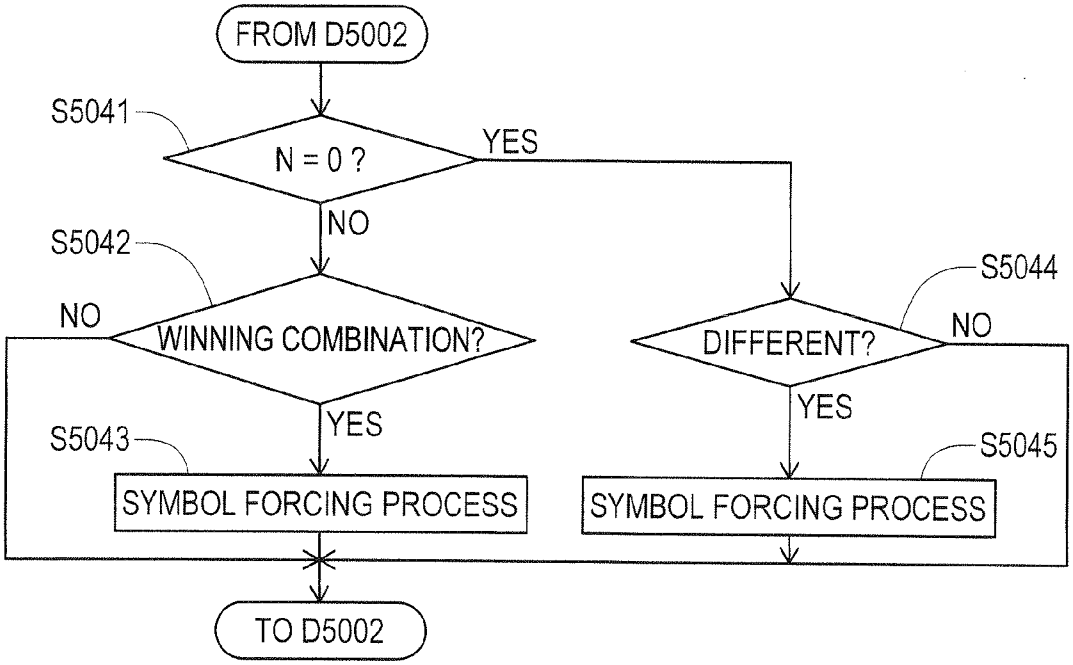
FIG. 86 is a flowchart of a main game process program.

For that purpose, in the slot machine 5001 according to the present embodiment, the main CPU 5032 executes a main game process program shown in FIG. 86 at a point in time D5002 placed between S5015 and S5016 of the main game process program shown in FIG. 80 above. Incidentally, the program shown in the flow chart of FIG. 86 is stored in the ROM 5034 and the RAM 5033 of the slot machine 5001, and is executed by the main CPU 5032.

After executing the symbol random selection process in S5015 of the main game process program shown in FIG. 80 above, the main CPU 5032 determines whether or not the variable N is "0", in S5041 of FIG. 86. At this point, if the variable N is other than "0" (S5041: NO), the process proceeds to S5042. In this case, the unit game before the unit game which will be executed finally out of each of the unit games constituting the "continuous game" is executed.

In S5042, the main CPU 5032 determines whether or not there is a winning combination. The determination is made based on the code number stored in the RAM 5033 by overwriting the code number information in the RAM 5033 with the code number so as to correspond to each symbol display area of the symbol display frame 5111 on the liquid crystal panel 5005B. At this point, if there is not a winning combination (S5042: NO), the process proceeds to S5016 of FIG. 80 above. In contrast, if there is a winning combination (S5042: YES), the process proceeds to S5043.

In S5043, the main CPU 5032 executes a symbol forcing process. In this process, the main CPU 5032 overwrites the code number overwriting the code number information in the RAM 5033 so as to correspond to each symbol display area of the symbol display frame 5111 on the liquid crystal panel 5005B, as code numbers corresponding to symbol combinations other than the winning combinations. Thereafter, the process proceeds to S5016 of FIG. 80 above.

Alternatively, if the variable N is "0" (S41: YES), the process proceeds to S5044. In this case, the unit game which will be executed finally out of each of the unit games constituting the "continuous game" is executed.

In S5044, the main CPU 5032 determines whether or not a payout to be awarded to a player differs from the total payout computed in advance in S5033 above. In this process, the main CPU 5032 computes a payout to be awarded to a player based on both the code number overwriting the code number information in the RAM 5033 so as to correspond to each symbol display area of the symbol display frame 5111 on the liquid crystal panel 5005B and the payout table shown in FIG. 76. At this point, if the payout to be awarded to a player coincides with the total payout computed in advance in S5033 above (S5044: NO), the process proceeds to S5016 of FIG. 80 above. In contrast, if the payout to be awarded to a player differs from the total payout computed in advance in S5033 above (S5044: YES), the process proceeds to S5045.

In S5045, the main CPU 5032 executes a symbol forcing process. In this process, the main CPU 5032 overwrites the code number overwriting the code number information in the RAM 5033 so as to correspond to each symbol display area of the symbol display frame 5111 on the liquid crystal panel 5005B, as code numbers corresponding to symbol combinations which awards the total payout computed in advance in S5033 above to a player. Thereafter, the process proceeds to S5016 of FIG. 80 above.

Incidentally, at the time of this forced control, the main CPU 5032 executes control so that the bet amount allocated with respect to a unit game which progresses is updated and stored as the bet allocation information each time each of the unit games constituting the "continuous game" indicated by a player is executed. Further, the main CPU 5032 executes control so that the bet allocation information thus updated and stored is displayed on the bet amount display portion 5202 of the liquid crystal panel 5005B by sending a control signal to the sub control board 5072 each time each of the unit games constituting the "continuous games" indicated by a player is executed.

Even with such control, the bet amount is respectively allocated with respect to each unit game constituting the "continuous game" indicated by a player. However, allocation of the bet amount with respect to each unit game is adjusted so that the total payout computed in advance in S5033 above is awarded to a player in the unit game executed finally out of a plurality of the unit games constituting the "continuous game" indicated by a player. Further, the total bet amount for the unit games constituting the "continuous games" is adjusted so as to coincide with the bet amount with respect to the "continuous game" indicated by a player.

5-8. Other

The Fifth Embodiment

The present invention is not limited to the above-described fifth embodiment, and various modifications and alterations can be made thereto without departing from the spirit of the invention.

For instance, the present invention may also be applied with respect to a gaming machine wherein unit games such as card games, roulette games, dice games or mahjong game or the like are repeatedly executed.

Figure 87:
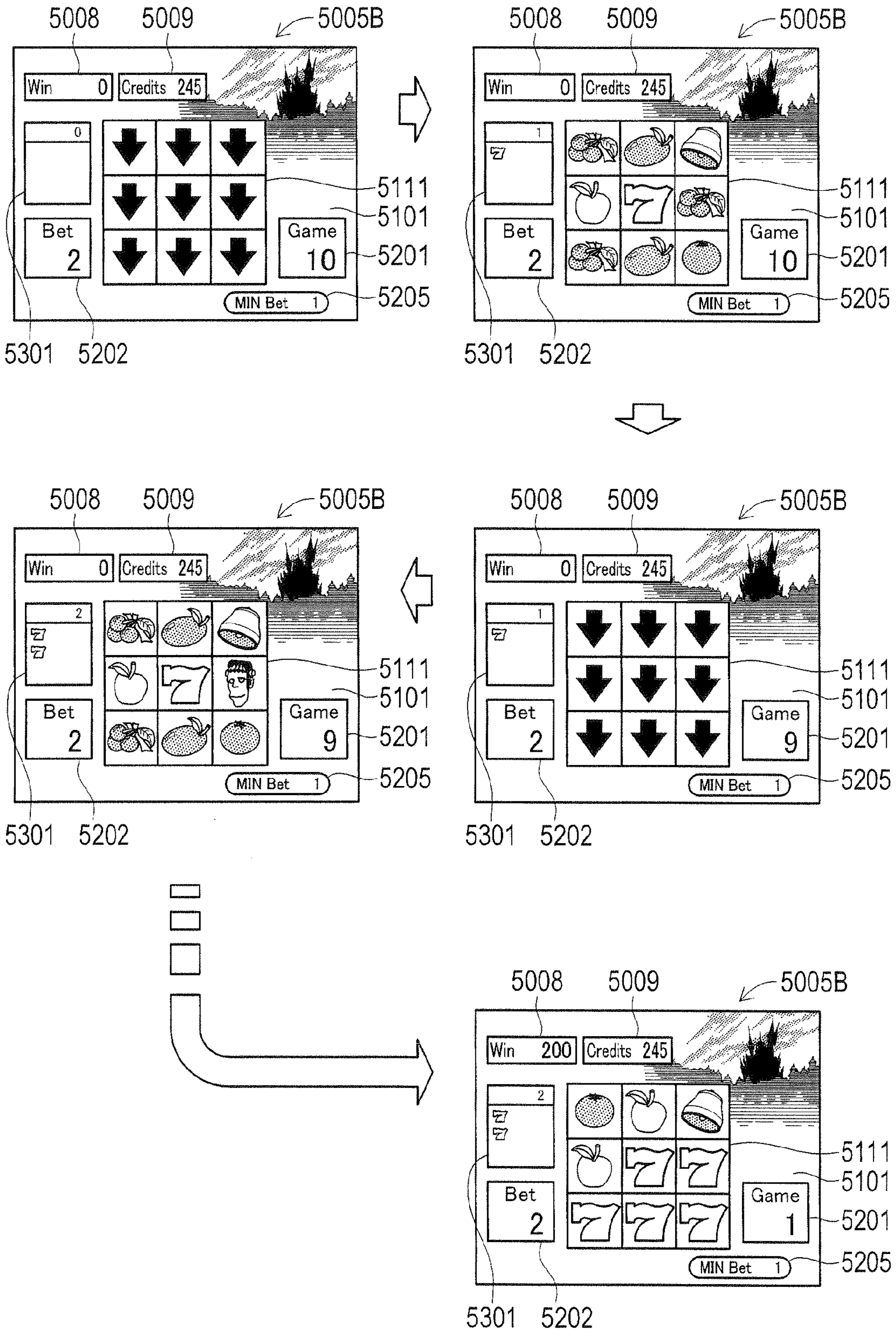
FIG. 87 is a view showing characteristics of the slot machine.
Figure 88:
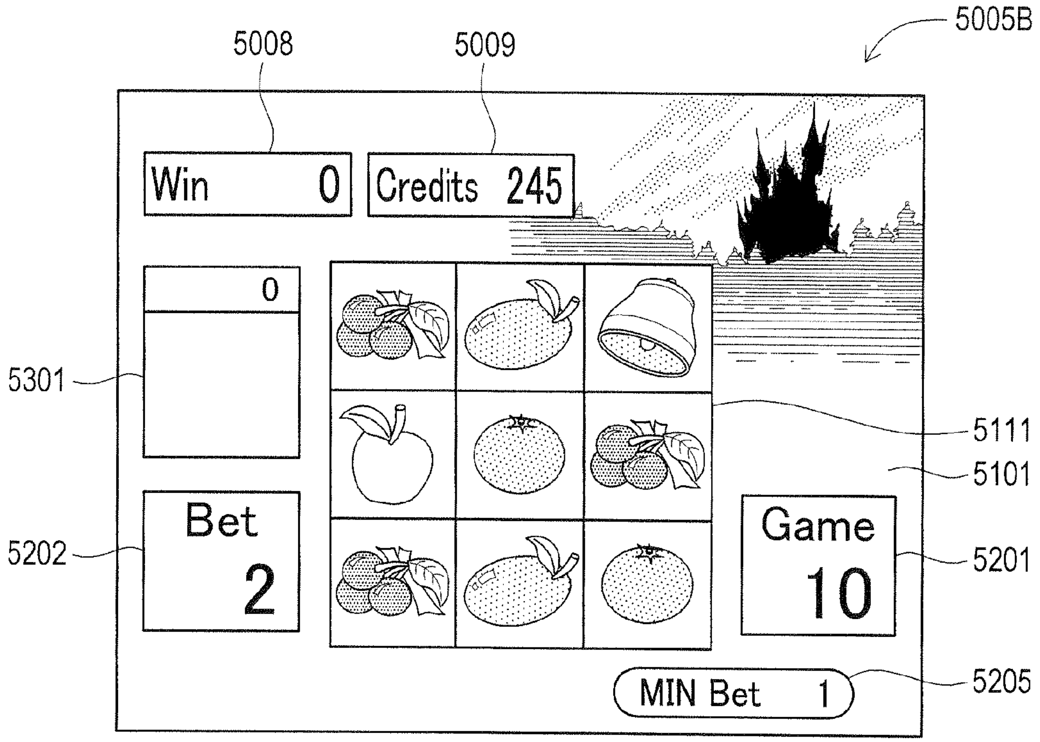
FIG. 88 is a view showing one of an image displayed on the liquid crystal panel.
Figure 89:
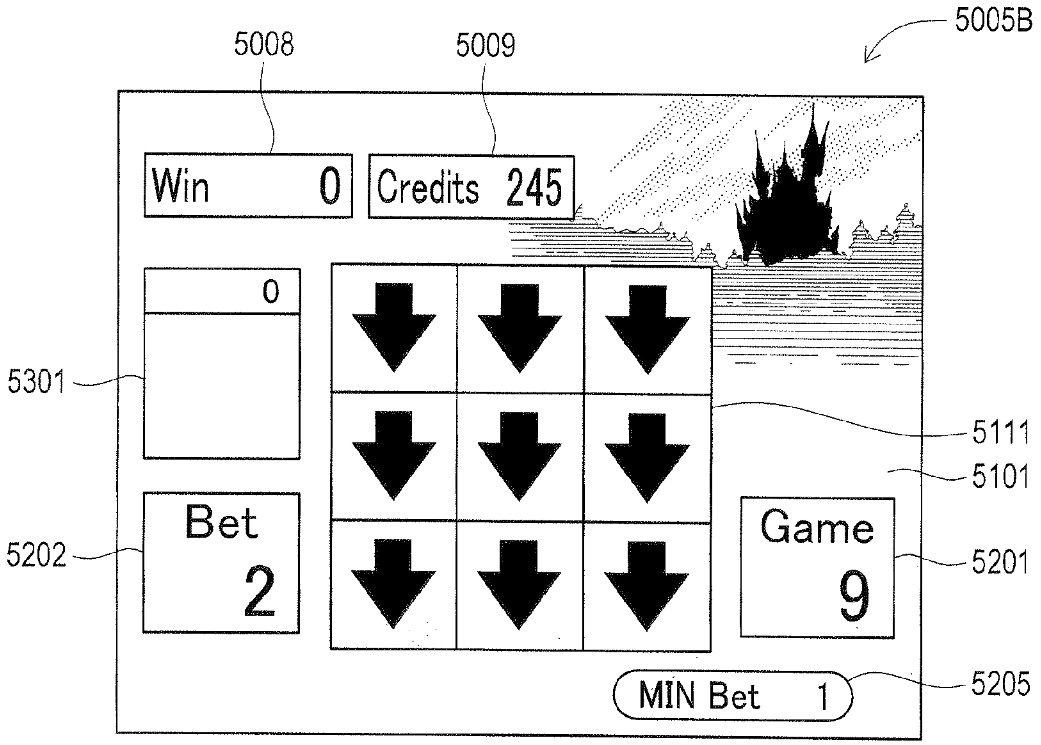
FIG. 89 is a view showing one of an image displayed on the liquid crystal panel.

In the slot machine 5001 according to the present embodiment, a specific display area 5301 may be provided as shown on each liquid crystal panel 5005B in FIG. 88 and FIG. 89. In this case, an only specific symbol of "BLUE 7" is displayed in addition to a specific symbol of "BLUE 7" being displayed in the specific display area 5301, as shown in FIG. 87. At the upper portion of the specific display area 5301 is displayed the number of the specific symbols of "BLUE 7" being displayed additionally.

Specifically, in each of the unit games constituting the "continuous game" indicated by a player is executed a slot game wherein a payout is awarded to the player based on the total number of specific symbols of "BLUE 7" displaying on the liquid crystal panel 5005B. In the case of the slot game, S5017 and S5019 as shown in FIG. 80 above are executed only with respect to a specific symbol of "BLUE 7".

Then, when symbols of "BLUE 7" are first rearranged in the symbol display frame 5111 in a certain unit game constituting the "continuous game", the payout amount to be awarded to a player is computed based on the number of the symbols of "BLUE 7" which are first rearranged. The symbols of "BLUE 7" which were first rearranged are shifted to the specific display area 5301 for displaying in the specific display area 5301. At the upper portion of the specific display area 5301 is displayed the number of the symbols of "BLUE 7" being displayed additionally.

When symbols of "BLUE 7" are rearranged again in the symbol display frame 5111 in any of the subsequent unit games, the payout amount to be awarded to a player is computed based on the total number of the symbols of "BLUE 7". This total number of the symbols of "BLUE 7" is obtained by adding the number of the symbols of "BLUE 7" which are being displayed in the specific display area 5301 to the number of the symbols of "BLUE 7" thus rearranged. In this case, the symbols of "BLUE 7" thus rearranged are additionally displayed in the specific display area 5301 in addition to the symbols of "BLUE 7" which are already being displayed in the specific display area 5301. The same applies for any subsequent unit games.

This will be described in more detail. The specific display area 5301 is displayed as shown on each liquid crystal panel 5005B in FIG. 87. Here, as shown on the liquid crystal panel 5005B shown on the both sides in the upper stage of FIG. 87, it is assumed that symbols of "BLUE 7" are first rearranged in the symbol display frame 5111 in a certain unit game constituting the "continuous game". In this case, it is determined whether or not the number of symbols (1 symbol) of "BLUE 7" rearranged in the symbol display frame 5111 in this unit game corresponds to any of the winning combinations. The Symbol of "BLUE 7" which has been rearranged at first is shifted to the specific display area 5301 for displaying in the specific display area 5301, as shown on the liquid crystal panel 5005B shown on the right side in the upper stage of FIG. 87. At the upper portion of the specific display area 5301 is displayed the number of the symbols of "BLUE 7" being displayed additionally.

Thereafter, as shown on the liquid crystal panel 5005B shown on the right side in the middle stage of FIG. 87, each video reel is scrolled in each symbol display area of the symbol display frame 5111, to shift to the next unit game. In the next unit game, if symbols of "BLUE 7" are rearranged again in the symbol display frame 5111, as shown on the liquid crystal panel 5005B shown on the right side in the upper stage of FIG. 87, a payout is awarded to a player if the total number of the symbols of "BLUE 7" corresponds to any of the winning combinations. The total number of the symbols of "BLUE 7" is obtained by adding the number of the symbols of "BLUE 7" which are being displayed in the specific display area 5301 to the number of the symbols of "BLUE 7" thus rearranged.

Further, as shown on the liquid crystal panel 5005B shown on the left side in the middle stage of FIG. 87, in the specific display area 5301, the Symbol of "BLUE 7" which has been rearranged is shifted to the specific display area 5301 for displaying in the specific display area 5301. At the upper portion of the specific display area 5301 is displayed the number of the symbols of "BLUE 7" being displayed additionally.

Incidentally, the number of symbols of "BLUE 7" that can be displayed in the specific display area 5301 is not limited. For instance, the specific display area 5301 may always display the symbols of "BLUE 7" which are rearranged in the symbol display frame 5111 on the specific display area 5301, with the symbols of "BLUE 7" being displayed as thumbnails. Limitation with respect to this display may be imposed.

Thereafter, each vide reel is scrolled in each symbol display area of the symbol display frame 5111, to shift to the next unit game. In the subsequent unit games as well, as shown on the liquid crystal panel 5005B shown on the right side in the lower stage of FIG. 87, it is determined whether or not the total number of symbols (7 symbols) of "BLUE 7" corresponds to any of the winning combinations. The total number of symbols of "BLUE 7" is obtained by adding the number of the symbols (2 symbols) of "BLUE 7" which are being displayed in the specific display area 5301 to the number of symbols (5 symbols) of "BLUE 7" which are rearranged in that unit game. After all unit games constituting the "continuous game" ended, the symbols of "BLUE 7" which are being displayed in the specific display area 5301 disappear from the liquid crystal panel 5005B. Accordingly, at the upper portion of the specific display area 5301 is displayed number "0", as the number of symbols of "BLUE 7" which are additionally displayed (refer to FIG. 88 and FIG. 89).

With such a slot game, the main game process program shown in FIG. 80 above may be forcibly controlled by main game process programs shown in FIG. 90 and FIG. 91 described below so that a payout is awarded to a player in a predetermined payout pattern, even in the case that the unit games constituting the "continuous game" indicated by a player are executed continuously.

Here, as described above, the predetermined payout pattern is a pattern which is awarded to a player only in the unit game executed finally out of a plurality of the unit games constituting the "continuous game" indicated by a player.

Here, a main game process program shown in FIG. 90 will be explained. In the slot machine 5001 according to the present embodiment, the main CPU 5032 executes a main game process program shown in FIG. 90 at the point in time D5001 placed between S5013 and S5014 of the main game process program shown in FIG. 80 above. Incidentally, the program shown in the flowchart of FIG. 90 is stored in the ROM 5034 and the RAM 5033 of the slot machine 5001, and is executed by the main CPU 5032.

Figure 90:
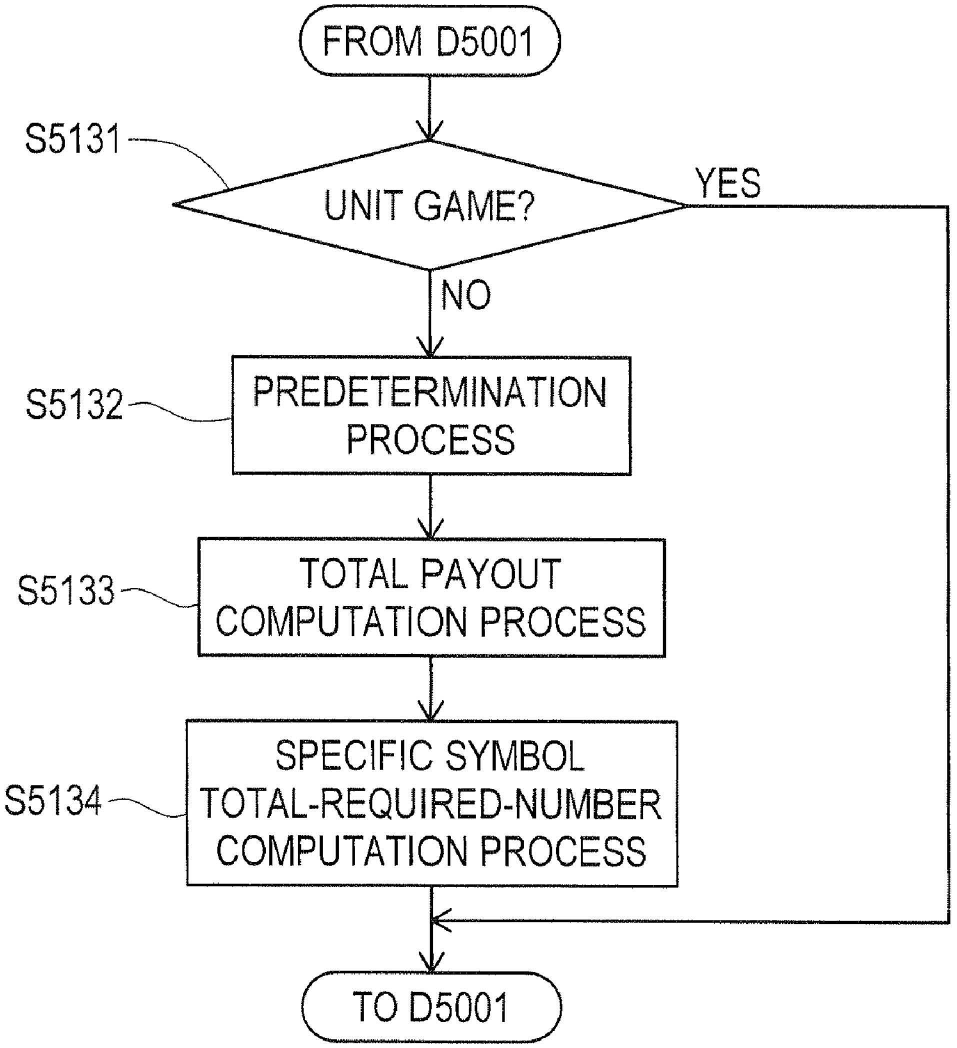
FIG. 90 is a flowchart of a main game process program.

After executing the determination process in S5013 of the main game process program shown in FIG. 80 above, the main CPU 5032 determines whether or not the unit game has been realized, in S5131 of FIG. 90. At this time, the number of times of the unit games constituting the "continuous game" coincides with the variable N. Accordingly, the main CPU 5032 determines that the unit game has not been realized if the variable N is greater than "1". At this point, if the unit game has been realized (S5131: YES), the process proceeds to S5014 of the main game process program shown in FIG. 80 above. In contrast, if the unit game has not been realized (S5131: NO), the process proceeds to S5132.

In S5132, the main CPU 5032 executes a predetermination process. In this process, the main CPU 5032 allocates at random the total bet amount including in the total bet amount information stored in the RAM 5033 to the unit games, the unit games corresponding to the number of games indicated in S5024 of FIG. 82 above (refer to FIG. 84 above). The main CPU 5032 may also allocate this total bet amount evenly (refer to FIG. 83 above).

In S5133, the main CPU 5032 executes a total payout computation process. In this process, the main CPU 5032 computes in advance the total payout which is to be awarded to a player in the "continuous game". This pre-computation is executed by repeating S5015, S5016 and S5019 in FIG. 80 above, by the number of times corresponding to the number of games indicated in S5024 of FIG. 82 above, while using each of the bet amounts allocated in S5132 above.

In S5134, the main CPU 5032 executes a specific symbol total-required-number computation process. In this process, the main CPU 5032 computes the total required number of the specific symbols of "BLUE 7", as a specific symbol total required number, to pay the total payout computed in advance in S5133 above to a player.

After the process in S5134 above ended, the process proceeds to S5014 of the main game process program shown in FIG. 80 above. At this time, the main CPU 5032 forcibly controls the main game process program shown in FIG. 80 above so that the total payout computed in advance in S5133 above is awarded to a player in the unit game which will be executed finally out of each of the unit games constituting the "continuous game" indicated by a player.

Incidentally, if the total payout computed in advance in S5133 above is 0, the main CPU 5032 forcibly controls the main game process program so as to prevent award of a payout to a player.

Figure 91:
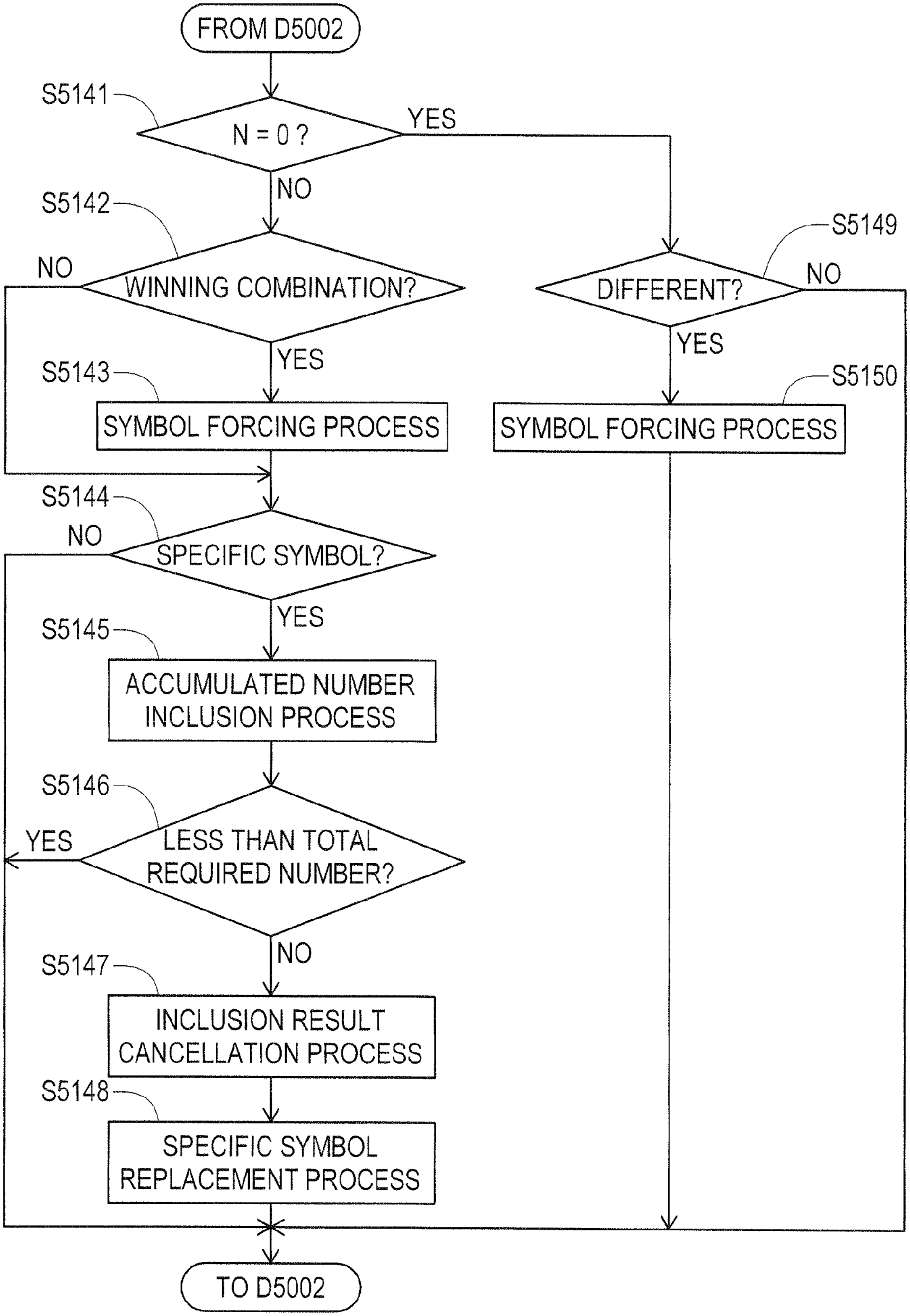
FIG. 91 is a flowchart of a main game process program.

Fore the purpose, in the slot machine 5001 according to the present embodiment, the main CPU 5032 executes a main game process program shown in FIG. 91 at the point in time D5002 placed between S5015 and S5016 of the main game process program shown in FIG. 80 above. Incidentally, the program shown in the flowchart of FIG. 91 is stored in the ROM 5034 and the RAM 5033 of the slot machine 5001, and is executed by the main CPU 5032.

After executing the symbol random selection process in S5015 of the main game process program shown in FIG. 80 above, the main CPU 5032 determines whether or not the variable N is "0", in S5141 of FIG. 91. At this point, if the variable N is other than "0" (S5141: NO), the process proceeds to S5142. In this case, the unit game before the unit game which will be executed finally out of each of the unit games constituting the "continuous game" is executed.

In S5142, the main CPU 5032 determines whether or not there is a winning combination. The determination is made based on both the code number stored in the RAM 5033 by overwriting the code number information in the RAM 5033 with the code number so as to correspond to each symbol display area of the symbol display frame 5111 on the liquid crystal panel 5005B and an accumulated number stored in the RAM 5033. At this point, if there is not a winning combination (S5142: NO), the process proceeds to S5144 described below. In contrast, if there is a winning combination (S5142: YES), the process proceeds to S5143.

In S5143, the main CPU 5032 executes a symbol forcing process. In this process, the main CPU 5032 overwrites the code number overwriting the code number information in the RAM 5033 so as to correspond to each symbol display area of the symbol display frame 5111 on the liquid crystal panel 5005B, as code numbers corresponding to symbol combinations other than the winning combinations. Thereafter, the process proceeds to S5016 of FIG. 80 above. At this time, the accumulated number is considered when the main CPU 5032 determines whether or not it is a symbol combination other than the winning combinations.

In S5144, it is determined whether or not specific symbol of "BLUE 7" is rearranged in the symbol display frame 5111 of the liquid crystal panel 5005B. This determination is made based on the code number stored in the RAM 5033 by overwriting the code number information in the RAM 5033 with the code number so as to correspond to each symbol display area of the symbol display frame 5111 on the liquid crystal panel 5005B. At this point, if specific symbol of "BLUE 7" is not rearranged in the symbol display frame 5111 of the liquid crystal panel 5005B (S5144: NO), the process proceeds to S5016 of FIG. 80 above. In contrast, if specific symbol of "BLUE 7" is rearranged in the symbol display frame 5111 of the liquid crystal panel 5005B (S5144: YES), the process proceeds to S5145.

In S5145, the main CPU 5032 executes an accumulated number inclusion process. In this process, the main CPU 5032 counts the specific symbols of "BLUE 7" which are rearranged in the symbol display frame 5111 of the liquid crystal panel 5005B. This count is made based on the code number stored in the RAM 5033 by overwriting the code number information in the RAM 5033 with the code number so as to correspond to each symbol display area of the symbol display frame 5111 on the liquid crystal panel 5005B and the like. Then, the main CPU 5032 includes this count value in the accumulated number stored in the RAM 5033. Thereafter, the process proceeds to S5146.

In S5146, the main CPU 5032 determines whether or not the total number of the specific symbols including the number of the specific symbols of "BLUE 7" which are rearranged in the symbol display frame 5111 of the liquid crystal panel 5005B and the number of the specific symbols of "BLUE 7" which are displayed on the specific display area 5301 is less the specific symbol total required number calculated in S5134 above.

At this point, if the total number of the specific symbols including the number of the specific symbols of "BLUE 7" which are rearranged in the symbol display frame 5111 of the liquid crystal panel 5005B and the number of the specific symbols of "BLUE 7" which are displayed on the specific display area 5301 is less the specific symbol total required number (S5146: YES), the process proceeds to S5016 of FIG. 80 above.

Then, if specific symbol of "BLUE 7" is rearranged in the symbol display frame 5111 of the liquid crystal panel 5005B, in S5016 of FIG. 80 above, the main CPU 5032 shifts and displays the symbols of "BLUE 7" which are being rearranged in the symbol display frame 5111 of the liquid crystal panel 5005B, in the specific display area 5301 of the liquid crystal panel 5005B, by sending a control signal to the sub control board 5072 after the payout process in S5019 of FIG. 80 above. Further, the main CPU 5032 displays the accumulated number stored in the RAM 5033 at the upper portion of the specific display area 5301 by sending a control signal to the sub control board 5072. Incidentally, after all unit games constituting the "continuous game" ended, the main CPU 5032 erases the specific symbols of "BLUE 7" which are being displayed in the specific display area 5301 from the liquid crystal panel 5005B by sending a control signal to the sub control board 5072. The main CPU 5032 resets the accumulated number stored in the RAM 5033 to "0". Then, the main CPU 5032 displays the number "0", which is the accumulated number thus reset, at the upper portion of the specific display area 5301, by sending a control signal to the sub control board 5072.

Alternatively, if the total number of the specific symbols including the number of the specific symbols of "BLUE 7" which are rearranged in the symbol display frame 5111 of the liquid crystal panel 5005B and the number of the specific symbols of "BLUE 7" which are displayed on the specific display area 5301 is equal to or above the specific symbol total required number (S5146: NO), the process proceeds to S5147.

In S5147, the main CPU 5032 executes an inclusion result cancellation process. In this process, the main CPU 5032 returns the accumulated number stored in the RAM 5033 to the number prior to the inclusion executed in S5145 above.

In S5148, the main CPU 5032 executes a specific symbol replacement process. In this process, the main CPU 5032 overwrites the code number of the specific symbol of "BLUE 7" overwriting the code number information in the RAM 5033 so as to correspond to each symbol display area of the symbol display frame 5111 on the liquid crystal panel 5005B, as code numbers of other symbol.

Alternatively, if the variable N is "0" (S5141: YES), the process proceeds to S5149. In this case, the unit game which will be executed finally out of each of the unit games constituting the "continuous game" is executed.

In S5149, the main CPU 5032 determines whether or not a payout to be awarded to a player differs from the total payout computed in advance in S5133 above. In this process, the main CPU 5032 computes a payout to be awarded to a player based on both the code number overwriting the code number information in the RAM 5033 so as to correspond to each symbol display area of the symbol display frame 5111 on the liquid crystal panel 5005B and the payout table shown in FIG. 76. At this point, if the payout to be awarded to a player coincides with the total payout computed in advance in S5133 above (S5149: NO), the process proceeds to S5016 of FIG. 80 above. In contrast, if the payout to be awarded to a player differs from the total payout computed in advance in S5133 above (S5149: YES), the process proceeds to S5150.

In S5150, the main CPU 5032 executes a symbol forcing process. In this process, the main CPU 5032 overwrites the code number overwriting the code number information in the RAM 5033 so as to correspond to each symbol display area of the symbol display frame 5111 on the liquid crystal panel 5005B, as code numbers corresponding to symbol combinations which awards the total payout computed in advance in S5133 above to a player. Thereafter, the process proceeds to S5016 of FIG. 80 above.

Incidentally, at the time of this forced control, the main CPU 5032 executes control so that the bet amount allocated with respect to a unit game which progresses is updated and stored as the bet allocation information each time each of the unit games constituting the "continuous game" indicated by a player is executed. Further, the main CPU 5032 executes control so that the bet allocation information thus updated and stored is displayed on the bet amount display portion 5202 of the liquid crystal panel 5005B by sending a control signal to the sub control board 5072 each time each of the unit games constituting the "continuous games" indicated by a player is executed.

Even with such control, the bet amount is respectively allocated with respect to each unit game constituting the "continuous game" indicated by a player. However, allocation of the bet amount with respect to each unit game is adjusted so that the total payout computed in advance in S5133 above is awarded to a player in the unit game executed finally out of a plurality of the unit games constituting the "continuous game" indicated by a player. Further, the total bet amount for the unit games constituting the "continuous games" is adjusted so as to coincide with the bet amount with respect to the "continuous game" indicated by a player.

6-1. Characteristics of the Present Invention

The Sixth Embodiment

Hereinafter, the sixth embodiment of a gaming machine according to the present invention will be described while referring to the accompanying drawings.

The game which is executed in the gaming machine according to the present embodiment is constituted of a multiple-choice game which is played by making choices.

This multiple-choice game is executed using the well-known liquid crystal panels 6005A and 6005B. In this multiple-choice game, the well-known liquid crystal panel 6005B displays two choices 6303A and 6303B, as shown at an upper side in FIG. 92. The choice 6303A displays "investment A", and the choice 6303B displays "investment B". At a start of this multiple-choice game is determined the basic payout amount. Default odds are also provided. After indicating the bet amount with respect to this multiple-choice game, a player chooses either one of two choices 6303A and 6303B by means of a touch panel 6101 provided on the liquid crystal panel 6005B. Then, a result of the choice, specifically, investment success or investment failure, is displayed on the liquid crystal panel 6005B.

Figure 92:
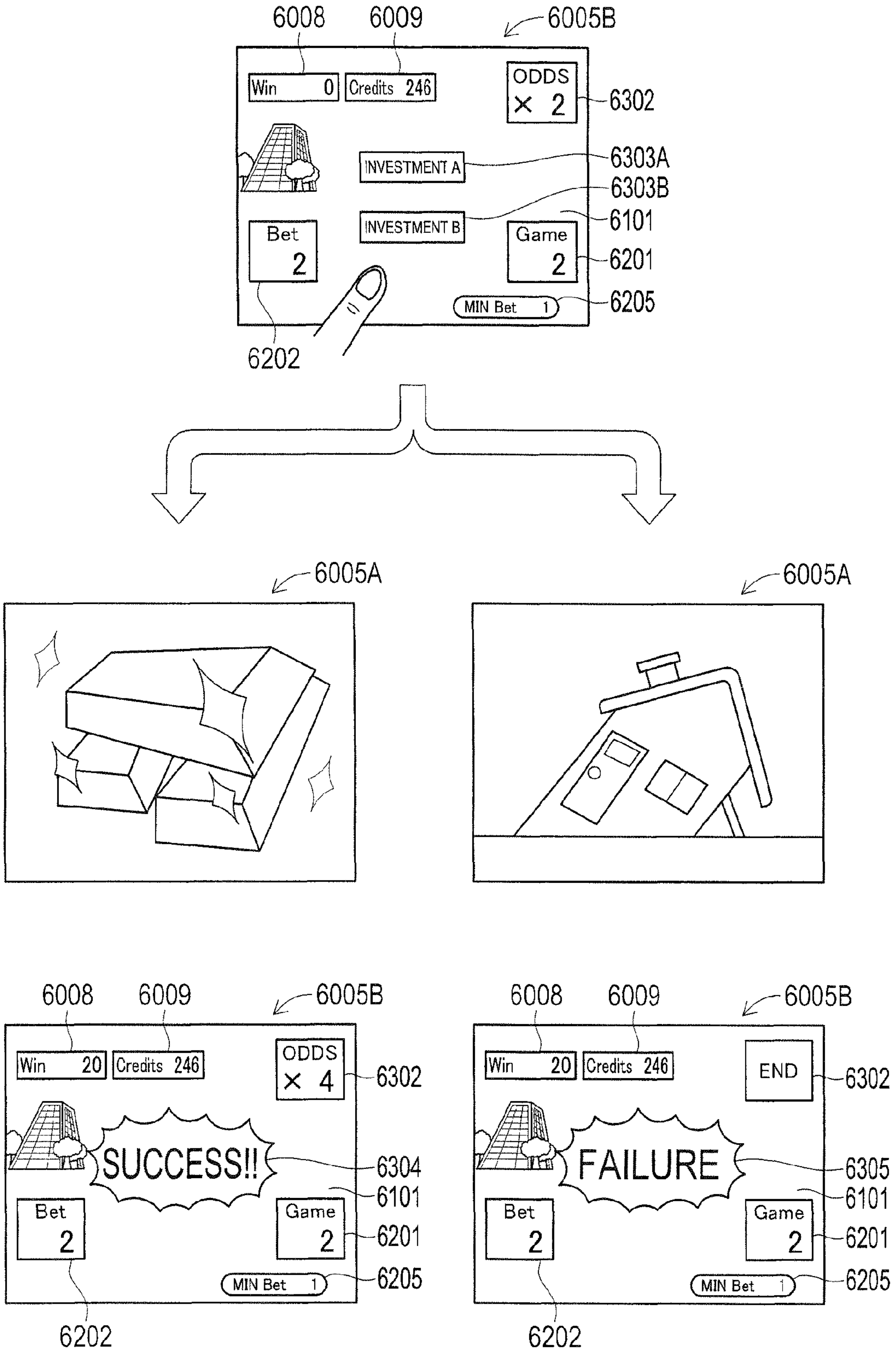
FIG. 92 is a view showing characteristics of a gaming machine which is one sixth embodiment of the present invention.

If the result of the choice result is investment success, a message 6304 saying "success" is displayed as shown in the liquid crystal panel 6005B at the left side in the lower stage of FIG. 92. A player is then awarded a prize obtained by multiplying the bet amount and the default odds by the basic payout amount. The amount of this prize is displayed on a payout amount display portion 6008.

If the result of the choice is investment failure, a message 6305 saying "failure" is displayed as shown in the liquid crystal panel 6005B at the right side in the lower stage of FIG. 92. Then a player is awarded no payout.

A unit game of the multiple-choice game is thus constituted.

To make explanation easier, the unit game is referred to as the multiple-choice game.

In the gaming machine 6001 of the present embodiment, the player can indicate that a unit game will be executed continuously by a predetermined number of times such as "1", "2", "3" and the like. A group of unit games which the player indicated as a continuous play corresponds to a "continuous game". This indication is made by operating a plurality of buttons which are respectively provided in accordance with the number of times of the unit games constituting the "continuous game" (refer to FIG. 94).

The player can indicate the bet amount, such as "1", "5", "10" and the like, with respect to the "continuous game". This indication is made by operating a plurality of buttons which are respectively provided in accordance with the bet amount (refer to FIG. 94).

In this respect, in the gaming machine 6001 of the present embodiment, once the player indicates the bet amount with respect to the "continuous game", one or a plurality of "continuous games" including unit games that are executed by the number of times which can be indicated by the player is specified through the bet amount with respect to the "continuous game" indicated by the player and the minimum bet amount with respect to a unit game which can be set by the player (in the present embodiment, the bet amount being "1"). Thereafter, the operation with respect to all buttons corresponding to the "continuous game" thus specified is validated.

The player operates any of the buttons thus validated, whereby the "continuous game", which is constituted of unit games executed by the number of times indicated by the player through the above-mentioned operation, is executed.

Figure 97:
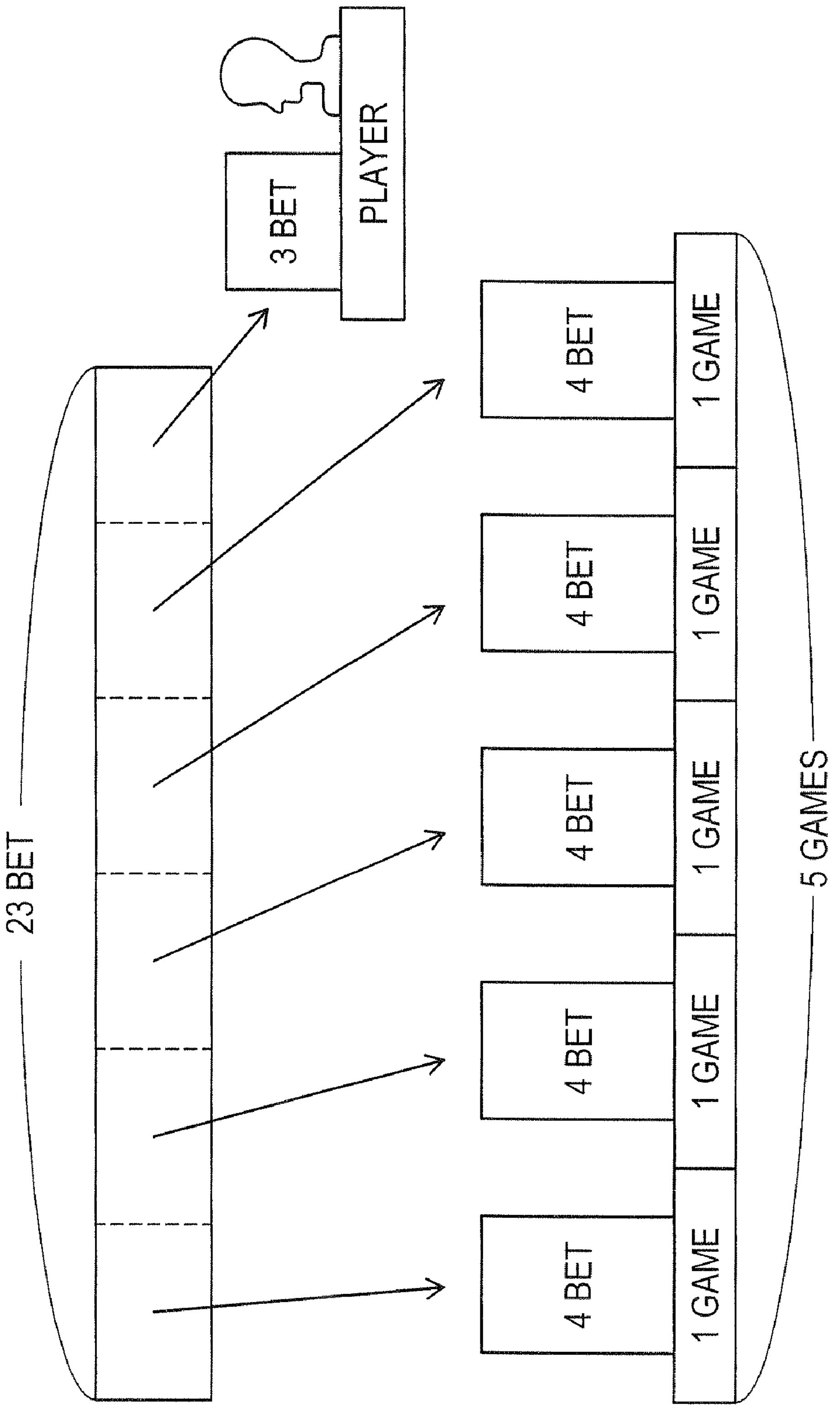
FIG. 97 is a view showing characteristics of the gaming machine.

The bet amount with respect to the "continuous game" indicated by the player is evenly allocated to each unit game constituting the "continuous game" indicated by the player. More specifically, as shown in FIG. 97, for instance, the bet amount with respect to the "continuous game" indicated by the player is assumed to be "23", and the number of times for the unit games constituting the "continuous game" indicated by the player is assumed to be "5". In this case, the bet amount "4" is evenly allocated with respect to each unit game constituting the "continuous game" indicated by the player.

Incidentally, the bet amount which was left after the bet amount has been evenly allocated with respect to each unit game constituting the "continuous game" is returned to the player. In the case of FIG. 97, the bet amount "3" is returned to the player.

Thereafter, after the "continuous game" starts, the respective unit games constituting the "continuous game" are executed continuously. In case of a choice result showing investment failure in a certain unit game, the process does not proceed to the next unit game, ending the "continuous game".

During the execution of the "continuous game", control is executed so that an effect is executed whereby a new promotion image is displayed on the liquid crystal panel 6005A with each new investment success choice result, and a bankruptcy image is displayed on the liquid crystal panel 6005A in a case of an investment failure choice result.

6-2. Construction of the Machine

The Sixth Embodiment

Hereinafter, the one embodiment embodying the present invention will be explained in detail with reference to the drawings.

Figure 93:
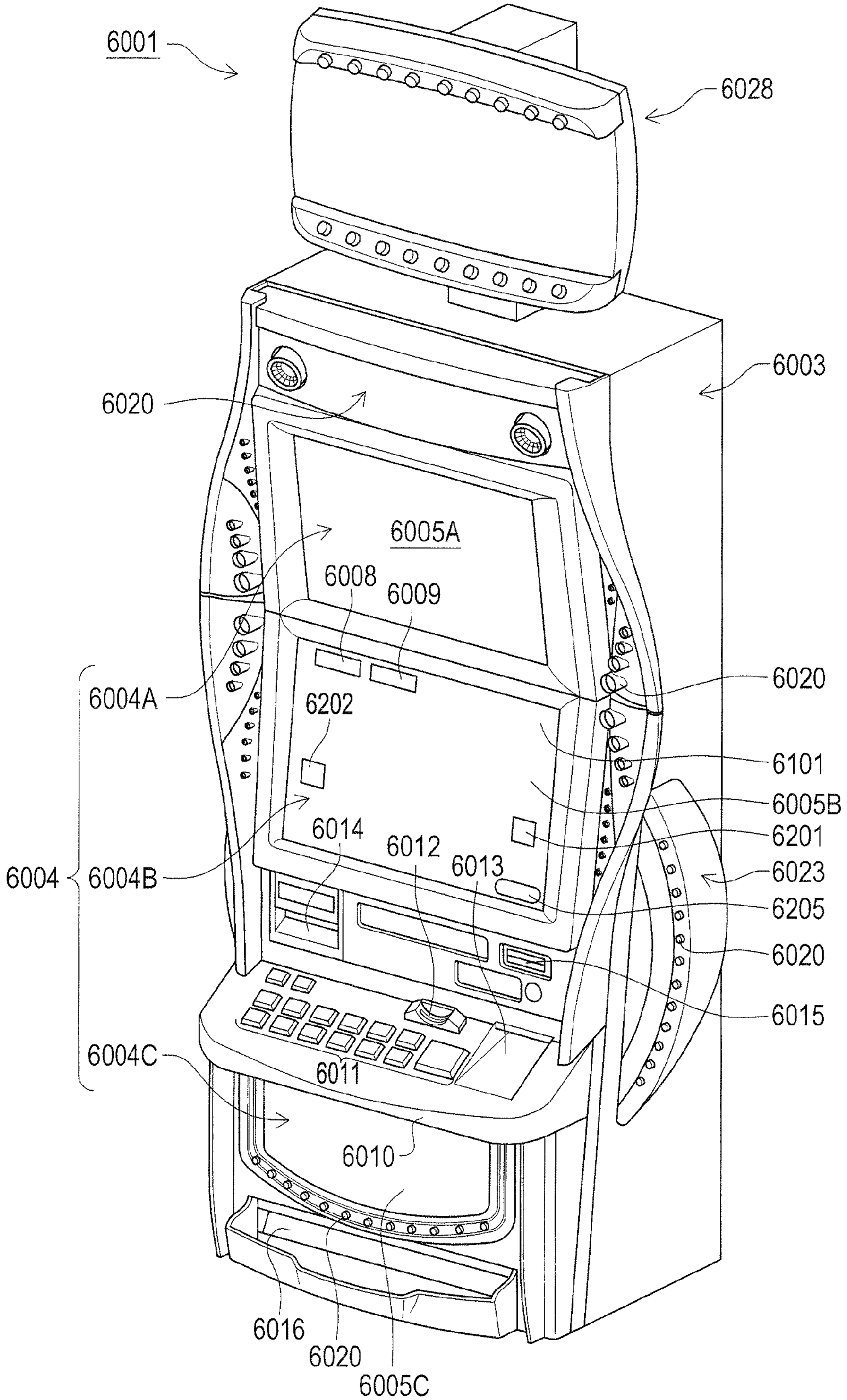
FIG. 93 is a perspective view of the gaming machine.

First, an outline construction of the gaming machine 6001 according to the present embodiment will be explained based on FIG. 93. FIG. 93 is a perspective view of the gaming machine 6001 according to the present embodiment.

As shown in FIG. 93, the gaming machine 6001 is an upright type gaming machine arranged in a game arcade such as casino, in order to execute predetermined game modes, such gaming machine includes a cabinet 6003 in which electronic and mechanical components are installed. For example, as a display portion 6004 to display information a concerning game, there are provided an upper display portion 6004A, a middle variable display portion 6004B and a lower display portion 6004C. Each display portion 6004A to 6004C is mounted at the front of the oblong cabinet 6003. The upper display portion 6004A includes a liquid crystal panel 6005A which is arranged above the middle variable display portion 6004B. On the liquid crystal panel 6005A, for example, an effect image, an introduction of a game content, and a rule explanation of a game are displayed. The lower display portion 6004C is arranged below the middle variable display portion 6004B, and includes a plastic panel 6005C on which images are printed, and a plastic panel 6005C is lightened by backlights.

The middle variable display portion 6004B, which is used to display an execution state of a game, includes the liquid crystal panel 6005B which is fixed at the front door of the cabinet 6003. Further, a touch panel 6101 is provided on the front surface of the liquid crystal panel 6005B. On the upper position of the middle variable display portion 6004B, the payout amount display portion 6008 and a credit amount display portion 6009 are provided on the liquid crystal panel 6005B. Also the upper portion of the middle variable display portion 6004B, is related to the back side, thereby a player may play a game in a cozy posture.

At the right portion of the middle variable display portion 6004B, a bet amount display portion 6202 is provided on the liquid crystal panel 6005B. Further, at the right portion of the middle variable display portion 6004B, a game number display portion 6201 is provided. Furthermore, in the middle variable display portion 6004B, a minimum bet amount display area 6205 is provided on the liquid crystal panel 6005B, at the lower side of the game number display portion 6201.

Further, the payout amount display portion 6008 and the credit amount display portion 6009 are provided on the liquid crystal panel 6005B. On the payout amount display portion 6008, the payout amount awarded in a multiple-choice game to a player is displayed. On the credit amount display portion 6009, the credit amount which is owned by a player at the moment is displayed.

Further, the liquid crystal panel 6005B contains the bet amount display portion 6202, the game number display portion 6201 and the minimum bet amount display area 6205. The bet amount display portion 6202 displays the bet amount for a unit game, as set by a player in a multiple-choice. The game number display portion 6201 displays the remaining number of times for executing unit games that constitute the "continuous game" set by a player in a multiple-choice. The minimum bet amount display area 6205 displays the minimum bet amount for each unit game that a player can set.

Returning to FIG. 93, between the middle variable display portion 6004B and the lower display portion 6004C, at the front of the cabinet 6003, an operation table 6010 which is projected forward is provided. On the operation table 6010, a variety of operation buttons 6011 including a BET button, a COLLECT button, a SPIN button, a CASHOUT button and the like are arranged as an operation portion to execute a game.

Figure 94:
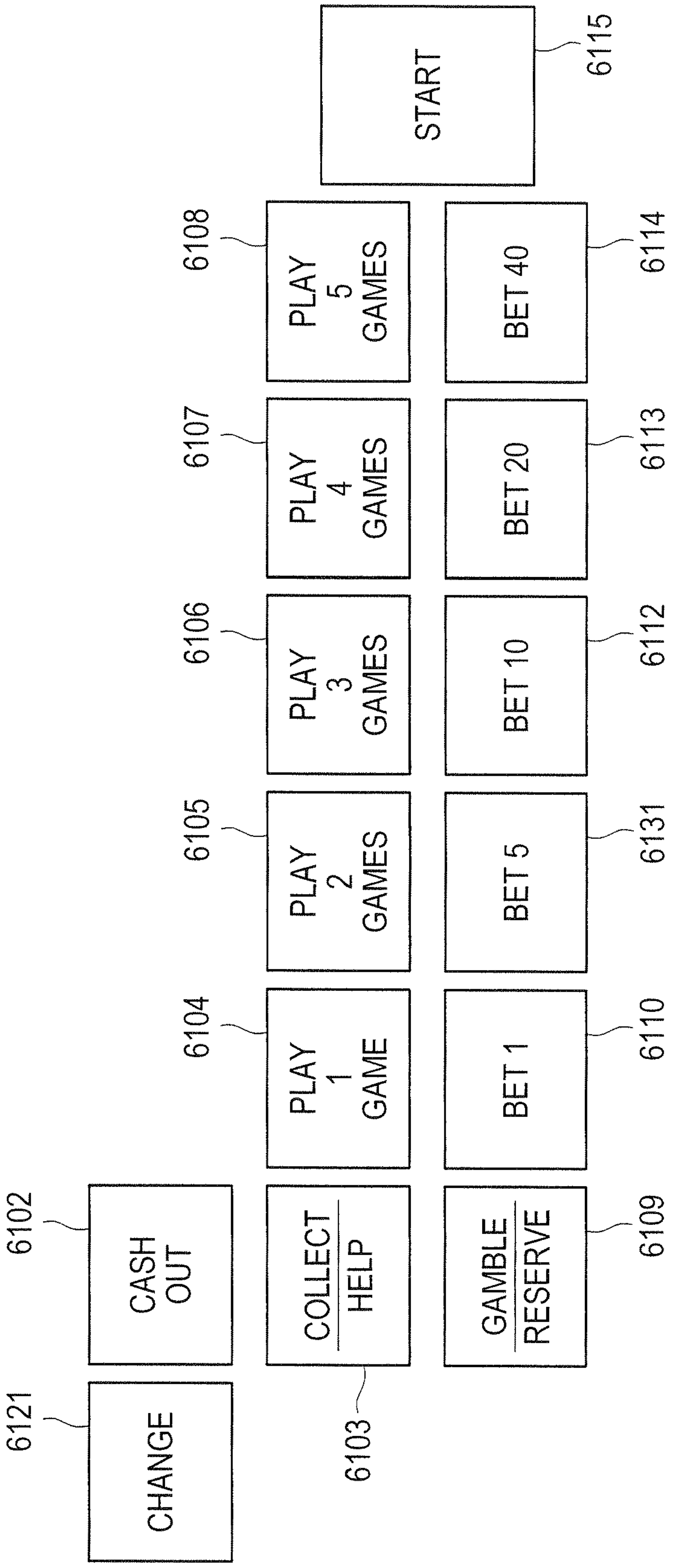
FIG. 94 is a front view showing a variety of operation buttons.

Here, the variety of operation buttons 6011 will now be described. FIG. 94 is a front view showing the variety of operation buttons 6011. As shown in FIG. 94, at an upper stage are provided a CHANGE button 6121, a CASHOUT button 6102 starting from the leftmost side. At a middle stage are provided a COLLECT/HELP button 6103, a PLAY 1 GAME button 6104, a PLAY 2 GAMES button 6105, a PLAY 3 GAMES button 6106, a PLAY 4 GAMES button 6107 and a PLAY 5 GAMES button 6108 starting from the leftmost side. At a lower stage are provided a GAMBLE/RESERVE button 6109, a BET 1 button 6110, a BET 5 button 6131, a BET 10 button 6112, a BET 20 button 6113 and a BET 40 button 6114, starting from the leftmost side. At the rightmost side is provided a START button 6115.

In this respect, the CHANGE button 6121 is an operation device which is used to change bills inserted in a bill insertion slot 6013 (refer to FIG. 93). Coins which have been changed are paid out to a coin tray 6016 (refer to FIG. 93) provided at the lower side of the cabinet 6003 (refer to FIG. 93).

The CASHOUT button 6102 is an operation device which is used to input a command to pay out coins in accordance with the credit amount which a player owns at the moment to the coin tray 6016 (refer to FIG. 93) or a command to pay out such coins by means of bar code-attached tickets which are printed in a ticket printer 6014 (refer to FIG. 93).

The COLLECT/HELP button 6103 is an operation device which is used when completing a double-down game which is executed using the payout amount acquired by a player, or when the game operation method and the like is unclear. Incidentally, if the COLLECT/HELP button 6103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 6104 is an input device for inputting, based on being operated, a command to execute one unit game. The PLAY 2 GAMES button 6105 is an input device for inputting, based on being operated, a command to execute two continuous unit games constituting the "continuous game". The PLAY 3 GAMES button 6106 is an input device for inputting, based on being operated, a command to execute three continuous unit games constituting the "continuous game". The PLAY 4 GAMES button 6107 is an input device for inputting, based on being operated, a command to execute four continuous unit games constituting the "continuous game". The PLAY 5 GAMES button 6108 is an input device for inputting, based on being operated, a command to execute five continuous unit games constituting the "continuous game".

Incidentally, the operation with respect to the PLAY 1 GAME button 6104, PLAY 2 GAMES button 6105, PLAY 3 GAMES button 6106, PLAY 4 GAMES button 6107 and PLAY 5 GAMES button 6108 is not accepted during normal operation.

The GAMBLE/RESERVE button 6109 is an operation device which is used by a player when he/she shifts a game to a double-down game, or when he/she steps away from the gaming machine.

The BET 1 button 6110 is an input device for inputting, based on being operated, a command to set the bet amount corresponding to "1" with respect to a unit game or the "continuous game". The BET 5 button 6131 is an input device for inputting, based on being operated, a command to set the bet amount corresponding to "5" with respect to a unit game or the "continuous game". The BET 10 button 6112 is an input device for inputting, based on being operated, a command to set the bet amount corresponding to "10" with respect to a unit game or the "continuous game". The BET 20 button 6113 is an input device for inputting, based on being operated, a command to set the bet amount corresponding to "20" with respect to a unit game or the "continuous game". The BET 40 button 6114 is an input device for inputting, based on being operated, a command to set the bet amount corresponding to "40" with respect to a unit game or the "continuous game".

The START button 6115 is an input device for inputting, based on being operated, a command to start a multiple-choice game.

Returning to FIG. 93, at the operation table 6010, a coin insertion slot 6012 and the bill insertion slot 6013 are provided. Between the operation table 6010 and the middle variable display portion 6004B, the ticket printer 6014 and a card reader 6015 are provided. At the lowest position of the cabinet 6003, the coin tray 6016 is also provided.

Incidentally, in the gaming machine 6001 according to the present embodiment, gaming medium may be coin, bill, or electronic value (credit). Here, the gaming medium may be others as well, such as medal, token, electronic money, or ticket.

Further, on the cabinet 6003 of the gaming machine 6001, light emitting portions 6020 are arranged around a game area including the upper display portion 6004A, the middle variable display portion 6004B, the lower display portion 6004C and the operation table 6010.

Furthermore, the gaming machine 6001 also includes a topper effect device 6028 which is installed on the cabinet 6003. The topper effect device 6028 is shaped in a rectangular board shaped, and is provided almost parallel to the liquid crystal panel 6005A of the upper display portion 6004A. The cabinet 6003 is further provided with speakers 6023 on its both sides.

6-3. Internal Construction of the Gaming Machine

The Sixth Embodiment

Next, an internal construction of the above-mentioned gaming machine 6001 will be explained with reference to FIG. 95 and FIG. 96.

Figure 95:
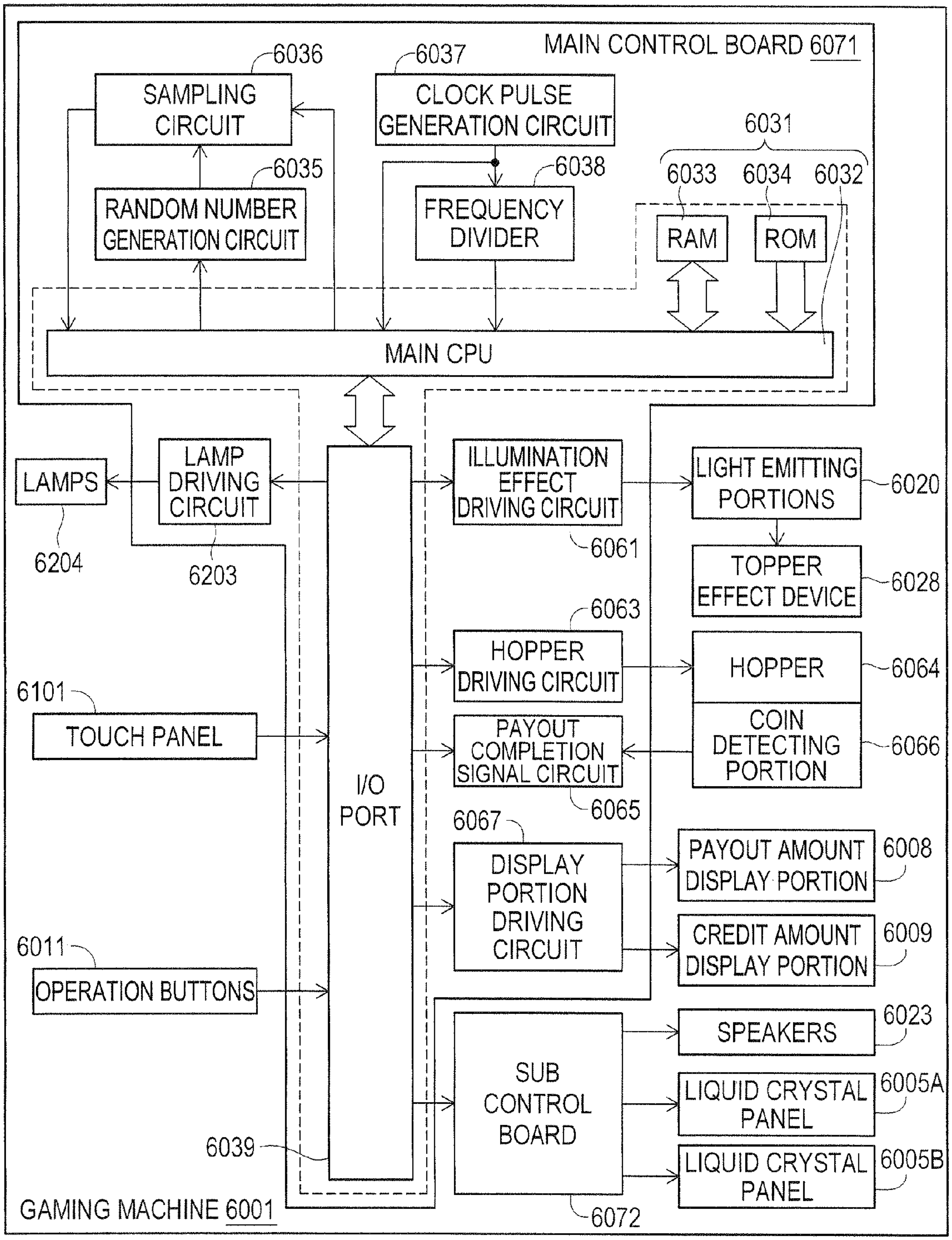
FIG. 95 is a block diagram showing an internal construction of entire gaming machine.

FIG. 95 is a block diagram showing an internal construction of entire gaming machine 6001. As shown in FIG. 95, the gaming machine 6001 includes a plurality of construction elements such as a main control board 6071, in which a microcomputer 6031 is included. The main control board 6071 is constructed from the microcomputer 6031, a random number generation circuit 6035, a sampling circuit 6036, a clock pulse generation circuit 6037 and a frequency divider 6038. The main control board 6071 also includes an illumination effect driving circuit 6061, a hopper driving circuit 6063, a payout completion signal circuit 6065, a display portion driving circuit 6067 and a lamp driving circuit 6203.

The microcomputer 6031 is constructed from a main CPU 6032, a RAM 6033 and a ROM 6034. The main CPU 6032 runs based on programs stored in the ROM 6034, and inputs/outputs a signal with other elements through an I/O port 6039, so as to execute control of the entire gaming machine 6001. Data and programs used when the main CPU 6032 runs are stored in the RAM 6033. For example, after-mentioned random numbers which are sampled by the sampling circuit 6036 are stored temporarily after a start of a game. Further, the RAM 6033 sets in advance a storage area where an after-mentioned variable N is stored. Programs executed by the main CPU 6032 and permanent data are stored in the ROM 6034.

Especially, the programs stored in the ROM 6034 include game programs and game system programs (abbreviated as "the game programs and the like" hereinafter).

Random numbers over a predetermined range are generated by the random number generation circuit 6035, which is operated based on instructions from the main CPU 6032. The random numbers are voluntarily extracted from the random numbers generated by the random number generation circuit 6035 by the sampling circuit 6036, based on instructions from the main CPU 6032, and the extracted random numbers are input to the main CPU 6032. The base clock for running the main CPU 6032 is generated by the clock pulse generation circuit 6037, and signals which are generated by dividing the base clock in a predetermined frequency are input to the main CPU 6032 by the frequency divider 6038.

And to the main control board 6071, the touch panel 6101 is connected. The touch panel 6101 is arranged in front of the liquid crystal panel 6005B, and specifies the coordinate position of the portion touched by a player. The position on which a player touched and the direction of the movement of the touched portion are determined based on the specified coordinate position information. A signal corresponding to the determination is input to the main CPU 6032 through the I/O port 6039.

Also, the operation buttons 6011 for instructing an execution of a game are connected to the main control board 6071. The operation buttons 6011 include the variety of buttons (refer to FIG. 94). A signal corresponding to the depressing of these buttons is input to the main CPU 6032 through the I/O port 6039.

An effect signal which is used to conduct illumination effect is output to the above-mentioned light emitting portions 6020 and the topper effect device 6028 by the illumination effect driving circuit 6061. Then, the topper effect device 6028 is serially connected to the illumination effect driving circuit 6061 through the light emitting portions 6020.

A hopper 6064 is driven by the hopper driving circuit 6063 based on control of main CPU 6032. The hopper 6064 executes payout of coins, and coins are paid out from the coin tray 6016. Data of the number of coins are input from the connected coin detecting portion 6066 by the payout completion signal circuit 6065. When the number of coins becomes a predetermined number, a signal indicating completion of the coins is input to the main CPU 6032. The number of the coins paid out from the hopper 6064 is calculated by the coin detecting portion 6066, and the data of the number calculated are input to the payout completion signal circuit 6065. The each display operation of the payout amount display portion 6008 and credit amount display portion 6009 is controlled by the display portion driving circuit 6067.

The lamp driving circuit 6203 turns lamps 6204 on/off based on control of main CPU 6032. The lamps 6204 are provided inside the operation buttons 6011. The lamp 6204 inside the button with respect to which a player's operation is validated lights up, notifying the player of the button with respect to which operation is validated.

Furthermore, a sub control board 6072 is connected to the main control board 6071. The sub control board 6072 is connected to the liquid crystal panel 6005A, the liquid crystal panel 6005B and the speakers 6023.

Figure 96:
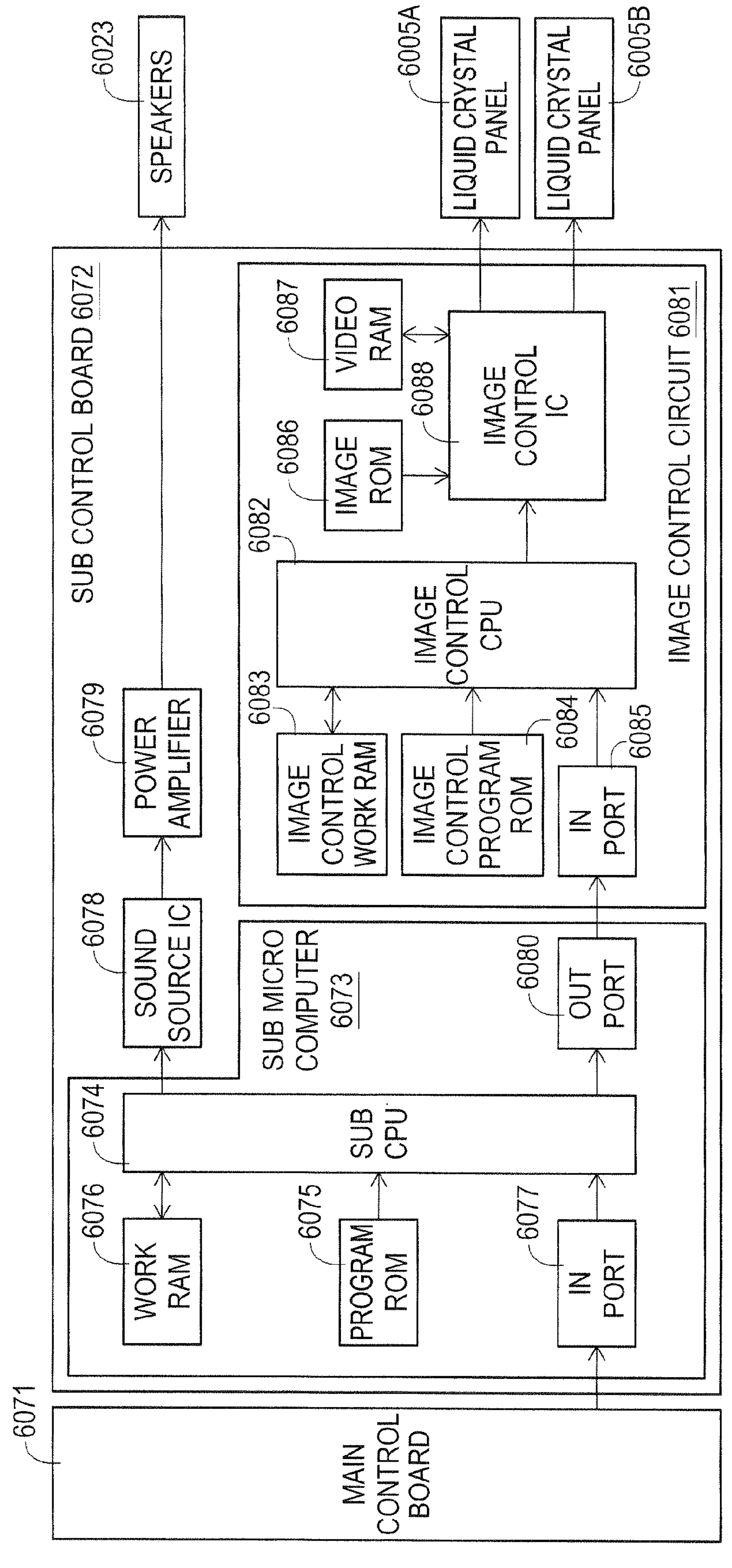
FIG. 96 is a block diagram showing an internal construction of a sub control board.

FIG. 96 is a block diagram showing an internal construction of the sub control board 6072. As shown in FIG. 96, a command from the main control board 6071 is input to the sub control board 6072. The display control on the liquid crystal panel 6005A of the upper display portion 6004A and the liquid crystal panel 6005B of the variable display portion 6004B, and the sound output control on the speakers 6023 are executed by the sub control board 6072. The sub control board 6072 is constructed on a circuit board different from the circuit board for the main control board 6071, and includes a microcomputer 6073 (abbreviated as "sub microcomputer" hereinafter) as a main construction element, and a sound source IC 6078, a power amplifier 6079 and an image control circuit 6081. The sound source IC 6078 controls the sound output from the speakers 6023, the power amplifier 6079 is used as an amplification device, and the image control circuit 6081 runs as a display control device of the liquid crystal panel 6005A and 6005B.

The sub microcomputer 6073 includes a sub CPU 6074, a program ROM 6075, a work RAM 6076, an IN port 6077 and an OUT port 6080. The control operations are executed by the sub CPU 6074 based on a control order sent from the main control board 6071, the program ROM 6075 is used as a memory device. Although a clock pulse generation circuit, a frequency divider, a random number generation circuit and a sampling circuit are not included in the sub control board 6072, the sub control board 6072 is constructed so as to execute random number sampling according to operation programs thereof. Control programs executed by the sub CPU 6074 are stored in the program ROM 6075. The work RAM 6076 is constructed as a temporary storing device when the above-mentioned control programs are executed by the sub CPU 6074.

The image control circuit 6081 includes an image control CPU 6082, an image control work RAM 6083, an image control program ROM 6084, an IN port 6085, an image ROM 6086, a video RAM 6087 and an image control IC 6088. Images displayed on the liquid crystal panel 6005A and 6005B are determined by the image control CPU 6082, based on parameters set by the sub microcomputer 6073, according to image control programs stored in the image control program ROM 6084.

The image control programs regarding to a display of the liquid crystal panel 6005A, 6005B and a variety of selection tables are stored in the image control program ROM 6084. The image control work RAM 6083 is constructed as a temporary storing device when the image control programs are executed by the image control CPU 6082. Images corresponding to contents determined by the image control CPU 6082 are formed by the image control IC 6088, and are output to the liquid crystal panel 6005A, 6005B.

In the image ROM 6086, dot data used to form images are stored. Thus, it stores the dot data for forming images. The video RAM 6087 runs as a temporary storing device when the images are formed by the image control IC 6088.

Further, based on a control signal from the main CPU 6032, the image control circuit 6081 performs display control of the liquid crystal panel 6005A, 6005B.

6-4. Development of the Multiple-choice Game

The Sixth Embodiment

Next, the multiple-choice game will be described in detail. In the gaming machine 6001 according to the present embodiment, the multiple-choice game is executed as a unit game or unit games constituting the "continuous game". If the multiple-choice game starts as a unit game, the basic payout is set to "10". Alternatively, if the multiple-choice game starts as the unit games constituting the "continuous game", a multiple-choice game is first executed to determine the basic payout.

For the convenience of the description, the multiple-choice game for determining the basic payout may be referred to as a "first multiple-choice game". The multiple-choice game described in FIG. 92 may be referred to as a "second multiple-choice game" to identify the multiple-choice games.

Figures 102, 103:
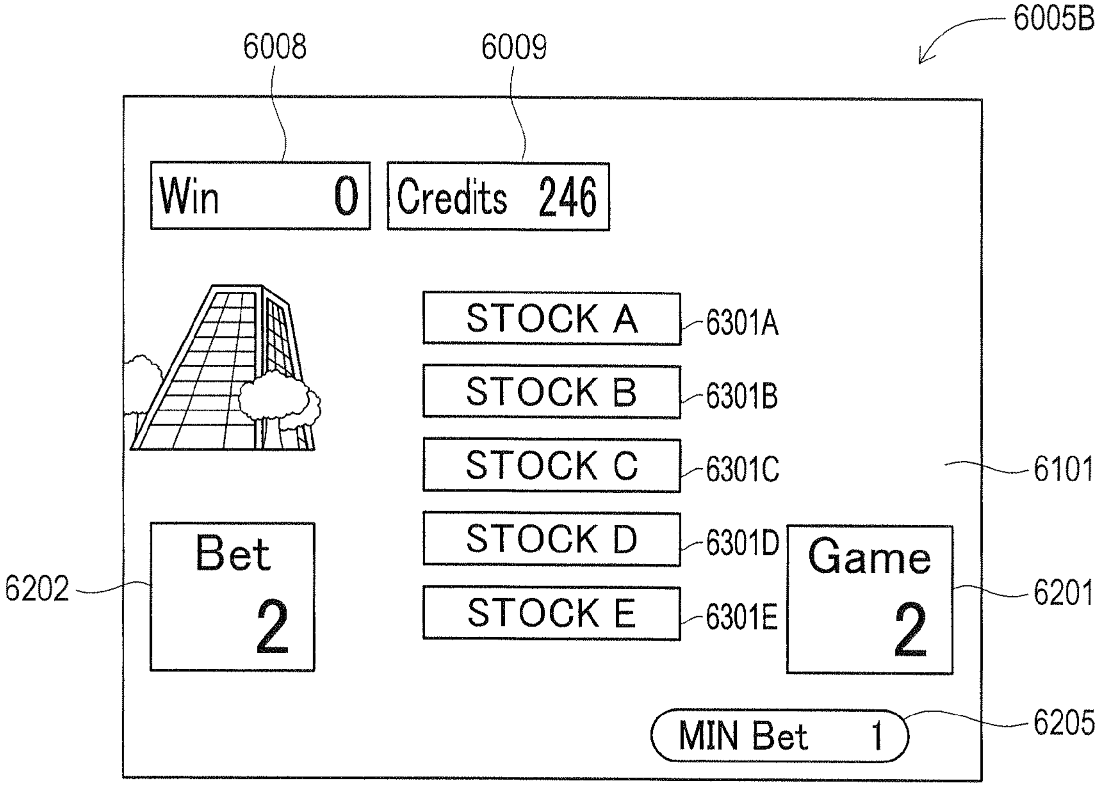
FIG. 102 is a view showing one example of an image displayed on a liquid crystal panel.
FIG. 103 is a view showing one example of a data table.

FIG. 102 is a view showing a choice screen for determining the basic payout in the "second multiple-choice game". In the choice screen displayed on the liquid crystal panel 6005B shown in FIG. 102 are provided five choices 6301A, 6301B, 6301C, 6301D and 6301E for determining the basic payout.

The choice 6301A is displayed as "stock A". The choice 6301B is displayed as "stock B". The choice 6301C is displayed as "stock C". The choice 6301D is displayed as "stock D". The choice 6301E is displayed as "stock E".

A player buys any one of the five types of stocks by choosing any one of the five choices 6301A, 6301B, 6301C, 6301D and 6301E. In this case, the respective choices 6301A, 6301B, 6301C, 6301D and 6301E are each assigned any one of the number values out of "0", "10", "20" and "50". The assigned value corresponds to the basic payout.

Specifically, the number value which was assigned to the choice made by a player out of the five choices 6301A, 6301B, 6301C, 6301D and 6301E becomes the basic payout in the "second multiple-choice game".

Incidentally, the choice screen displayed on the liquid crystal panel 6005B shown in FIG. 102 is provided with the payout amount display portion 6008, the credit amount display portion 6009, the remaining game number display portion 6201, the bet amount display portion 6202 and the minimum bet amount display area 6205. The image data for this choice screen is stored in the image ROM 6086 (refer to FIG. 96).

Figures 104, 105:
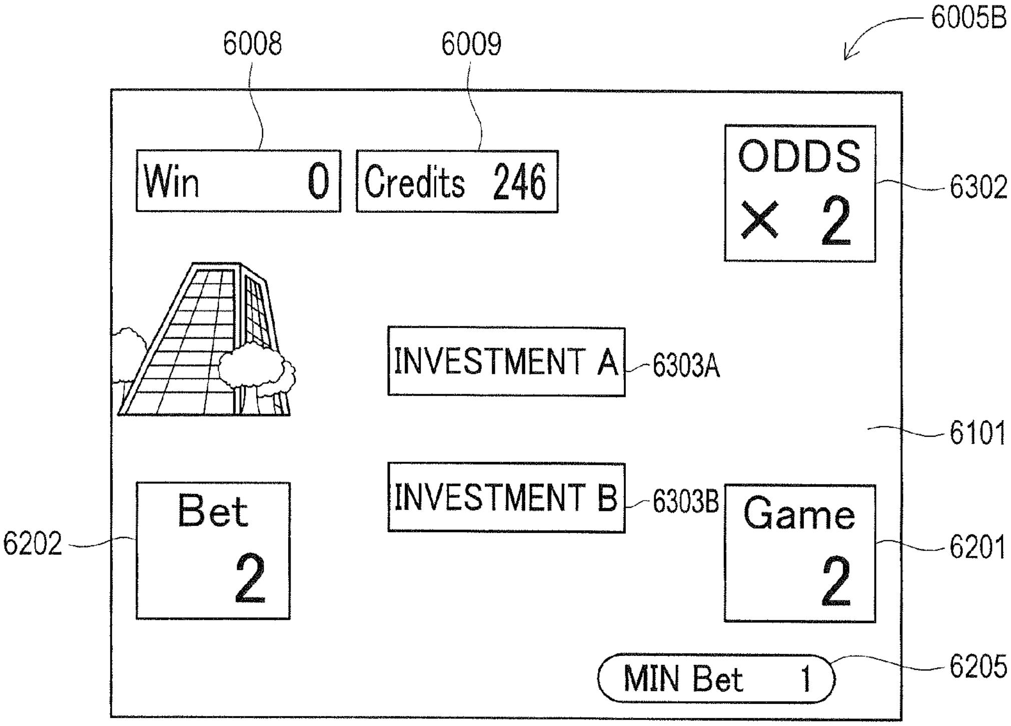
FIG. 104 is a view showing one example of an image displayed on the liquid crystal panel.
FIG. 105 is a view showing one example of a data table.

Thus, after the basic payout is determined in the "second multiple-choice game", the liquid crystal panel 6005B displays a choice screen as shown in FIG. 104. FIG. 104 is a view showing the choice screen in the "second multiple-choice game". The choice screen displayed on the liquid crystal panel 6005B shown in FIG. 104 is provided with two choices 6303A and 6303B.

The choice 6303A is displayed as "investment A". The choice 6303B is displayed as "investment B". A player determines either of the 2 investments by choosing either of the two choices 6303A and 6303B. In this case, the choices 6303A and 6303B are each assigned either one of the choice results including "success" and "failure".

Specifically, the choice results assigned to the choice made by a player out of the two choices 6303A and 6303B become the game results in the "second multiple-choice game".

Incidentally, the choice screen displayed on the liquid display panel 6005B shown in FIG. 104 has an odds display portion 6302, in addition to the payout amount display portion 6008, the credit amount display portion 6009, the remaining game number display portion 6201, the odds amount display portion 6302 and the minimum bet amount display area 6205. The odds display portion 6302 displays the default odds in the "second multiple-choice game". Image data of this choice screen are stored in the image ROM 6086 (refer to FIG. 96).

Figure 106:
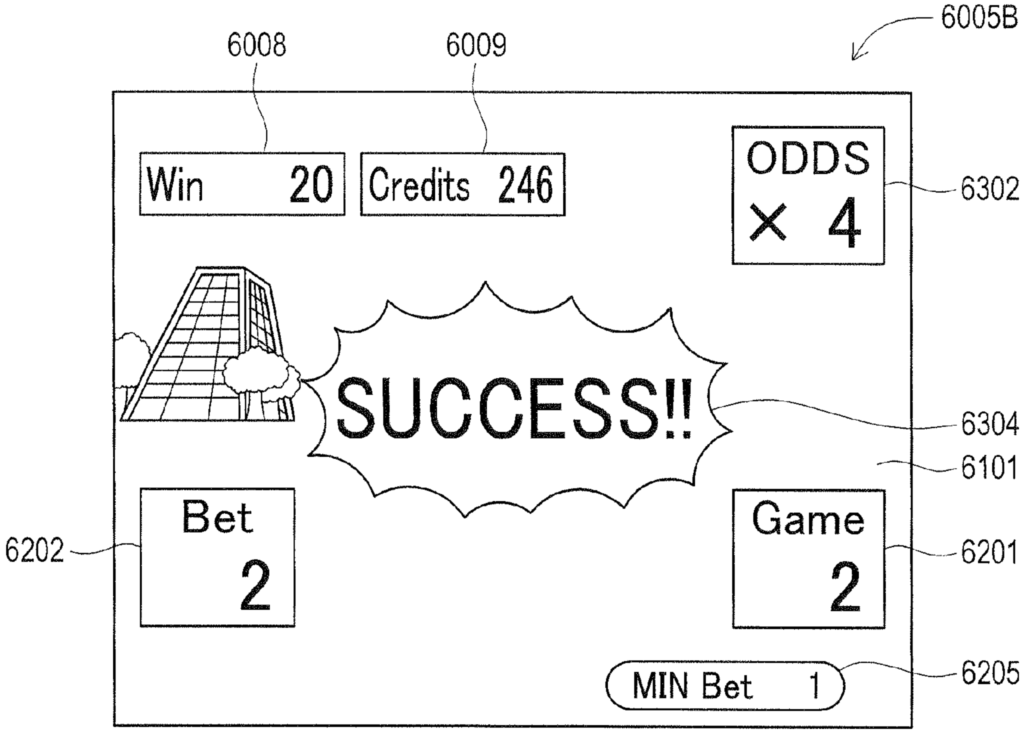
FIG. 106 is a view showing one example of an image displayed on the liquid crystal panel.

Then, if the game result in the "second multiple-choice game" is "success", the liquid crystal panel 6005B displays a result screen shown in FIG. 106 as investment success for a player. FIG. 106 is a view showing the success result screen in the "second multiple-choice game". The success result screen displayed on the liquid crystal panel 6005B shown in FIG. 106 displays the message 6304 saying "success". A player is awarded a prize obtained by multiplying the default odds and the bet amount by the basic payout amount. The amount of this prize is displayed on the payout amount display portion 6008. Image data of this success result screen are stored in the image ROM 6086 (refer to FIG. 96).

Then, the liquid crystal panel 6005B displays the choice screen shown in FIG. 104 once again. As a result, the player can play the "second multiple-choice game" once again. When the choice screen of FIG. 104 is displayed again in the liquid crystal panel 6005B, the number displayed on the remaining game number display portion 6201 is decreased by 1. Alternatively, the odds displayed on the odds display portion 6302 double.

Thus, the player can play the unit games constituting the "continuous game" from the initial unit game to the final unit game so long as the game result continues to be "success" in the "second multiple-choice game".

Figure 107:
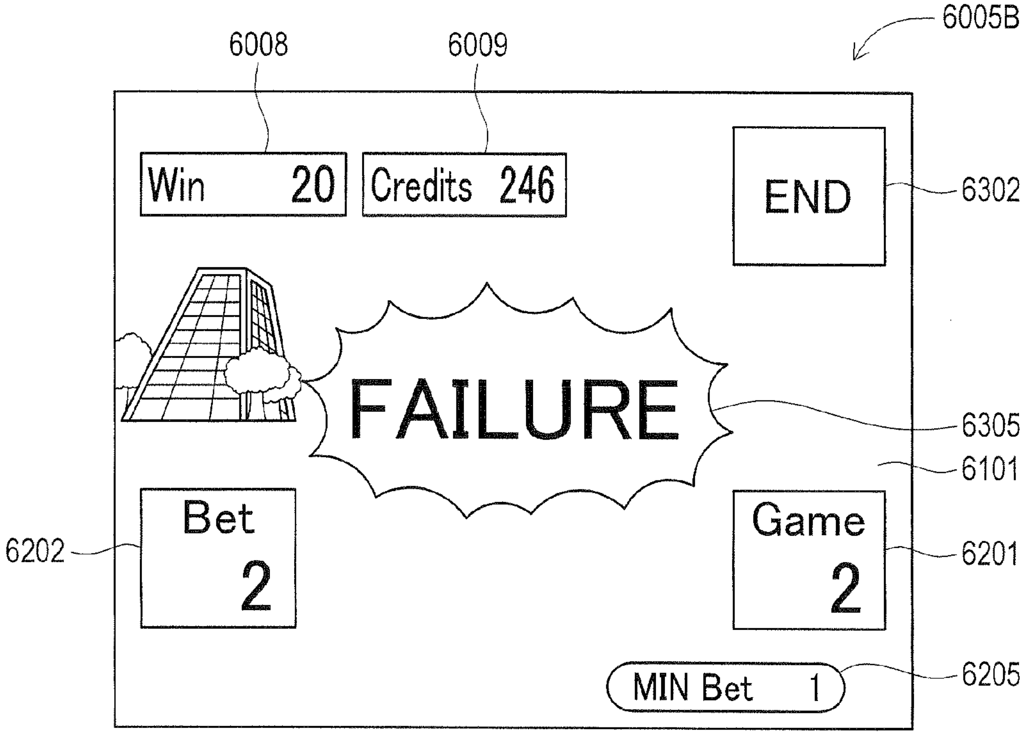
FIG. 107 is a view showing one example of an image displayed on the liquid crystal panel.

Alternatively, if the game result in the "second multiple-choice game" is "failure", the liquid crystal panel 6005B displays a result screen shown in FIG. 107 as investment failure for a player. FIG. 107 is a view showing the failure result screen in the "second multiple-choice game". The failure result screen displayed on the liquid crystal panel 6005B shown in FIG. 107 displays the message 6305 saying "failure". In this case, no prize is awarded to a player. Image data of this failure result screen are stored in the image ROM 6086 (refer to FIG. 96).

In a case the game result in the "second multiple-choice game" is "failure", the "continuous game" ends. Accordingly, there are cases that a player cannot play the unit games constituting the "continuous game up to the final unit game.

Incidentally, if the multiple-choice game executed as a unit game, only one "second multiple-choice game" is executed.

6-5. Image Effects in the Multiple-choice Game

The Sixth Embodiment

Next, image effects of the multiple-choice game will be described in detail. In the gaming machine 6001 according to the present embodiment, if the multiple-choice game starts as each of the unit games constituting the "continuous game", an image effect is executed in the liquid crystal panel 6005A simultaneously with execution of the respective unit games in the liquid crystal panel 6005B. Image differs depending on the basic payout amount and choice result in the multiple-choice game, and further, the number of times of the unit games constituting the "continuous game".

Figure 108:
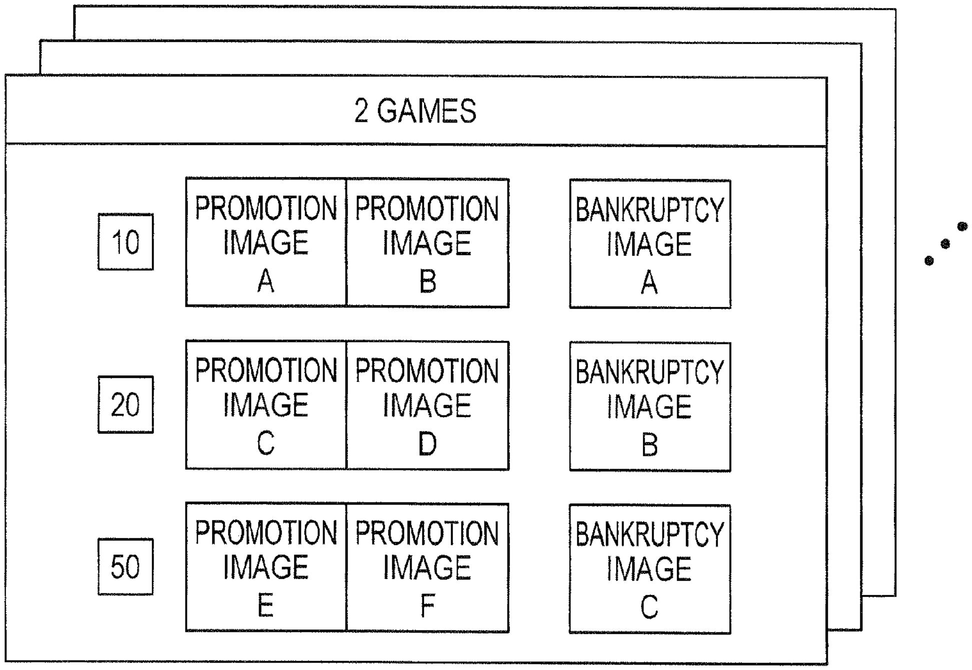
FIG. 108 is a view showing one example of a data table.

To execute such image effect, in the gaming machine 6001 according to the present embodiment, the images corresponding to each of the number of times of the unit games constituting the "continuous game" are adjusted based on a data table as shown in FIG. 108. With this, a data base is constructed.

The data table shown in FIG. 108 shows the case that the number of times of the unit games constituting the "continuous game" is "2".

If the basic payout amount is "10", in a case where the game result of the first unit game out of each of the unit games constituting the "continuous game" is "success", an image effect corresponding to a promotion image A is executed. Further, if the game result of the second unit game is "success", an image effect corresponding to a promotion image B is executed. Alternatively, if the game result of any of the unit games constituting the "continuous game" is "failure", an image effect corresponding to a bankruptcy image A is executed.

If the basic payout amount is "20", in a case where the game result of the first unit game out of each of the unit games constituting the "continuous game" is "success", an image effect corresponding to a promotion image C is executed. Further, if the game result of the second unit game is "success", an image effect corresponding to a promotion image D is executed. Alternatively, if the game result of any of the unit games constituting the "continuous game" is "failure", an image effect corresponding to a bankruptcy image B is executed.

If the basic payout amount is "50", in a case where the game result of the first unit game out of each of the unit games constituting the "continuous game" is "success", an image effect corresponding to a promotion image E is executed. Further, if the game result of the second unit game is "success", an image effect corresponding to a promotion image F is executed. Alternatively, if the game result of any of the unit games constituting the "continuous game" is "failure", an image effect corresponding to a bankruptcy image C is executed.

This data table is provided so as to correspond to the number of times of the unit games constituting the "continuous game" and is stored in the image ROM 6086 (refer to FIG. 96).

This promotion image or bankruptcy image contains differences in the contents of that image regarding promotion and bankruptcy based on the number of times of the unit games constituting the "continuous game" and the basic payout amount.

Incidentally, even in the case the multiple-choice game is executed as a unit game, an image effect is simultaneously executed in the liquid crystal panel 6005A. At this time, if the game result of the unit game is "success", an image effect corresponding to the promotion image A is executed. Alternatively, if the game result of the unit game is "failure", an image effect corresponding to the bankruptcy image A is executed. As shown in FIG. 108, the promotion image A above and the bankruptcy image A above are stored in the data table wherein the number of times of the unit games constituting the "continuous game" is "2". These images may also be stored in a data table dedicated for the unit game which is newly provided in the image ROM 6086 (refer to FIG. 96).

6-6. Operation of the Gaming Machine

The Sixth Embodiment

Figure 99:
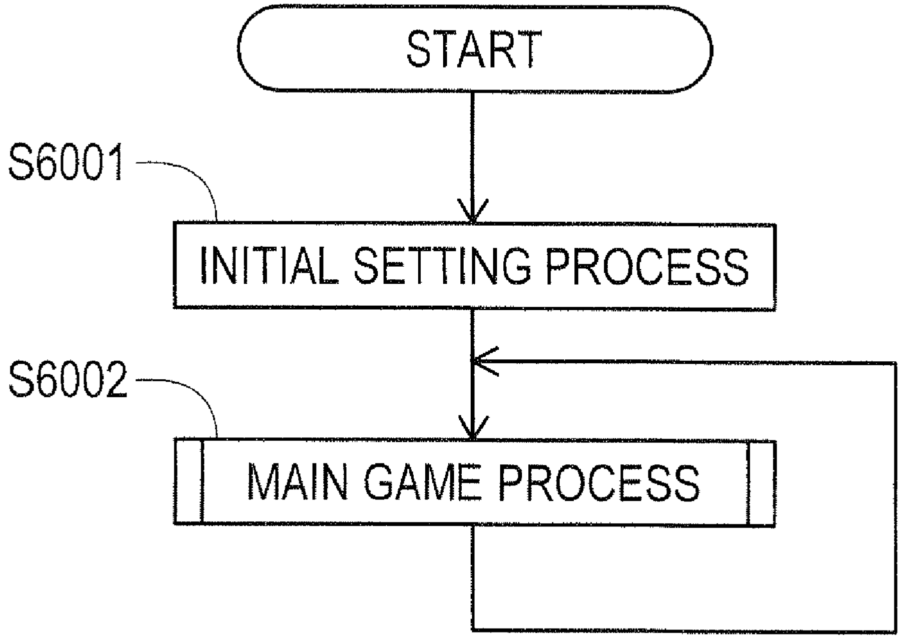
FIG. 99 is a flowchart of a main control program.

Next, a main control program executed in the gaming machine 6001 according to the present embodiment will be explained with reference to drawings. FIG. 99 is a flowchart of the main control program.

First, when a power switch is pressed (power activation), the microcomputer 6031 is started to operate, an initial setting process is executed by the microcomputer 6031 in step (abbreviated as "S") 6001. In the initialization process, BIOS stored in the ROM 6034 is executed by the main CPU 6032. Compressed data included in the BIOS are expanded to the RAM 6033, and when the BIOS expansion to the RAM 6033 is executed, a diagnosing process and initialization process of various peripheral devices are executed. Also, the game programs and the like are written from the ROM 6034 to the RAM 6033 by the main CPU 6032, so as to obtain the payout rate setting data and country ID information. Also, during execution of the initial setting process, a verification process to each program is executed.

Then in S6002, the main CPU 6032 reads out the game programs and the like from the RAM 6033, and executes the programs in sequence so as to conduct the main game process. A game is executed in the gaming machine 6001 according to the present embodiment by executing the main game process. Then, the main game process is repeated when the power is supplied to the gaming machine 6001.

Figure 100:
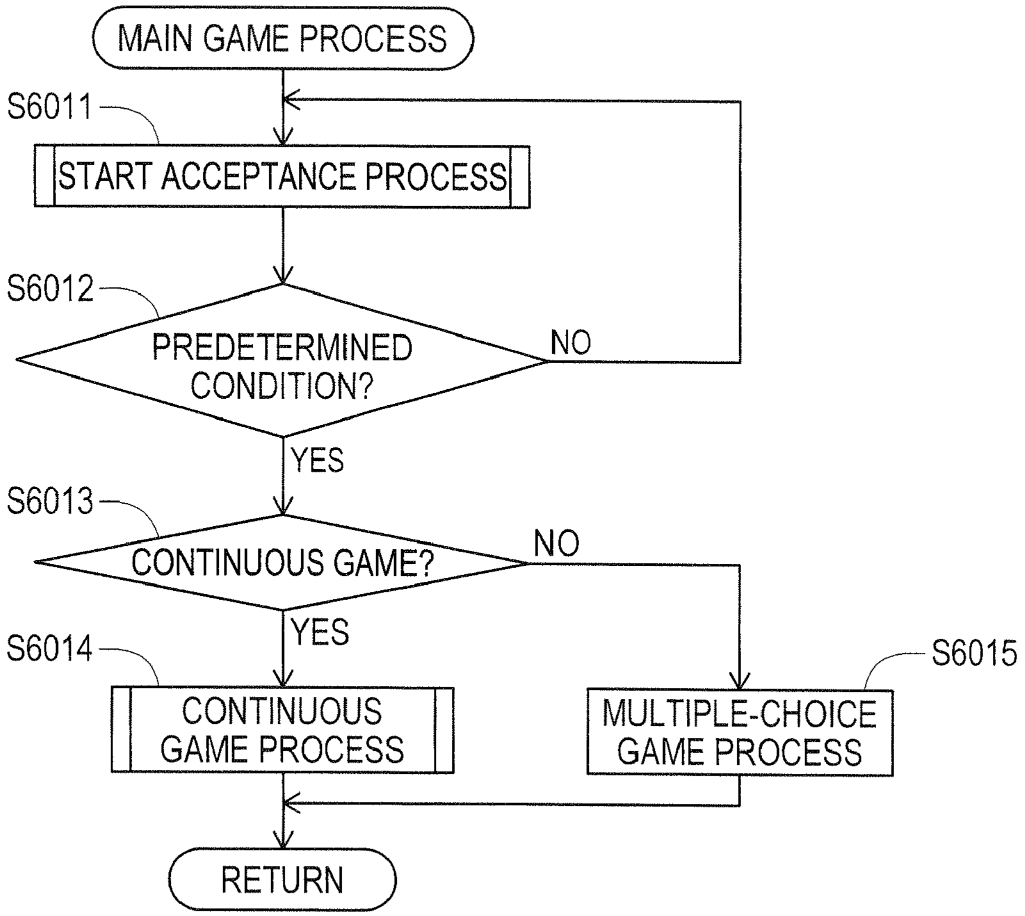
FIG. 100 is a flowchart of a main game process program.

Next, a sub process of the main game process in S6002 above will be explained based on FIG. 100. FIG. 100 is a flowchart of the main game process program in the gaming machine 6001 according to the present embodiment. Incidentally, each program shown in the flowchart of FIG. 100 is stored in the ROM 6034 or the RAM 6033 of the gaming machine 6001, and is executed by the main CPU 6032.

Figure 101:
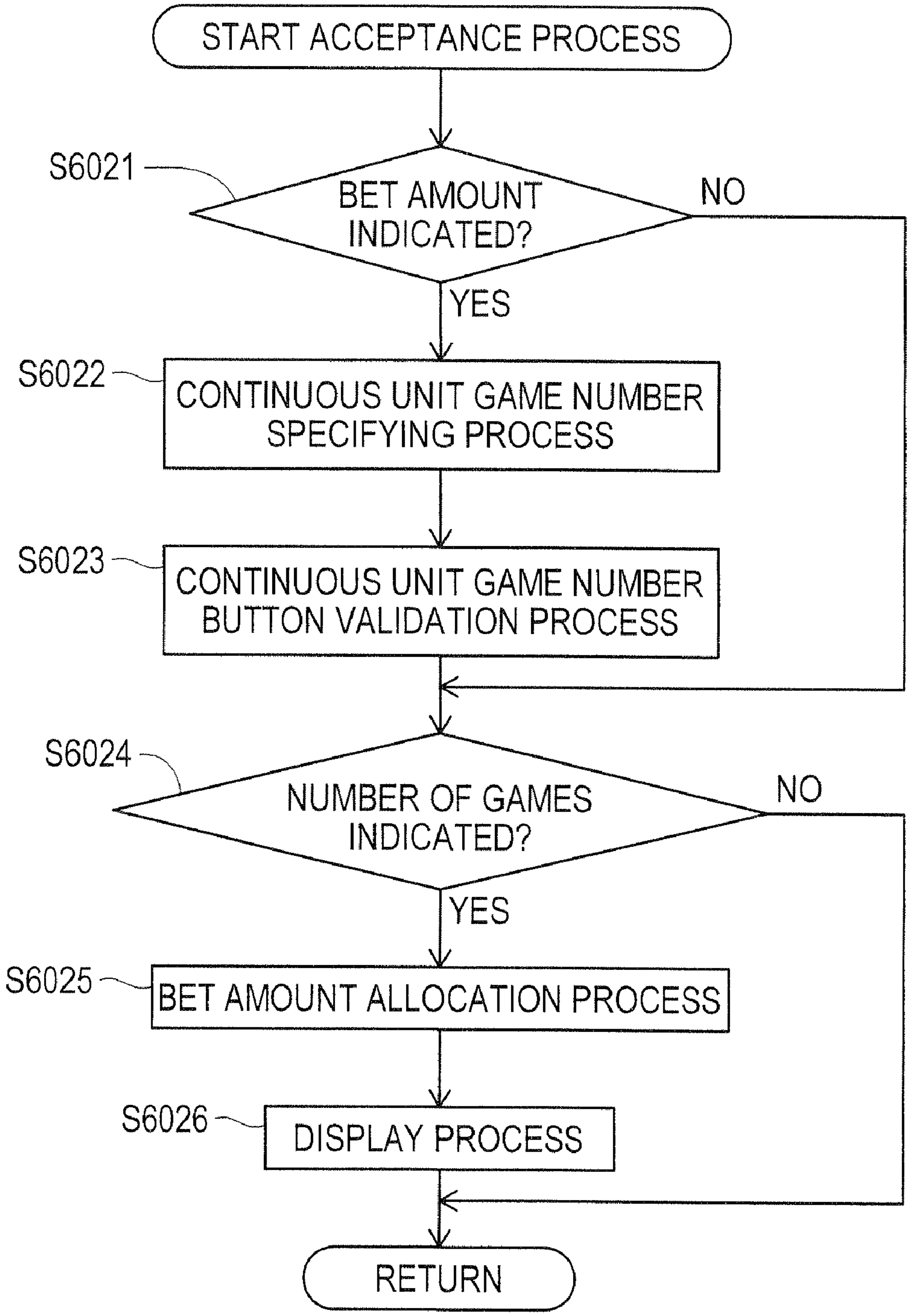
FIG. 101 is a flowchart of a start acceptance process program.

First, as shown in FIG. 100, in S6011, a start acceptance process is executed by the main CPU 6032. Then, a sub process of the start acceptance process in S6011 above will be explained based on FIG. 101. FIG. 101 is a flowchart of the start acceptance process program in the gaming machine 6001 according to the present embodiment. Incidentally, program shown in the flowchart of FIG. 101 is stored in the ROM 6034 or the RAM 6033 of the gaming machine 6001, and is executed by the main CPU 6032.

In the start acceptance process in S6011 above, the main CPU 6032 determines, in S6021, whether or not the bet amount has been indicated, as shown in FIG. 101. Here, in a case of an input signal from any of the BET 1 button 6110, BET 5 button 6131, BET 10 button 6112, BET 20 button 6113 and BET 40 button 6114, it is determined that the bet amount has been indicated. However, if the indicated amount exceeds the bet amount corresponding to the credit amount owned by a player at the moment, it is determined that no bet amount has been indicated. At this point, if no bet amount has been indicated (S6021: NO), the process proceeds to S6024 described below. In contrast, if the bet amount has been indicated (S6021: YES), the process proceeds to S6022.

In S6022, the main CPU 6032 executes a continuous unit game number specifying process. In this process, the main CPU 6032 specifies one or a plurality of "continuous games" including a number of unit games which can be indicated by a player, through the bet amount indicated in S6021 above and the minimum bet amount (in the present embodiment, the bet amount being "1") with respect to a unit game which can be set by a player.

In S6023, the main CPU 6032 executes a continuous unit game number button validation process. In this process, the main CPU 6032 accepts the player's operating the button related to the "continuous game" specified in S6022 above, with respect to the PLAY 1 GAME button 6104, PLAY 2 GAMES button 6105, PLAY 3 GAMES button 6106, PLAY 4 GAMES button 6107 and PLAY 5 GAMES button 6108.

Further, the main CPU 6032 turns on the lamp 6204 provided inside the button related to the "continuous game" specified in S6022 above, by sending a control signal to the lamp driving circuit 6203. As a result, a player is notified that the operation of that button is valid.

In S6024, the main CPU 6032 determines whether or not the number of games has been indicated. Here, with respect to the PLAY 1 GAME button 6104, PLAY 2 GAMES button 6105, PLAY 3 GAMES button 6106, PLAY 4 GAMES button 6107 and PLAY 5 GAMES button 6108, if an input signal is sent from any of the buttons which have been validated in S6023 above, it is determined that the number of games has been indicated. At this point, if the number of games has not been indicated (S6024: NO), the process proceeds to S6012 shown in FIG. 100 above. In contrast, if the number of games has been indicated (S6024: YES), the process proceeds to S6025.

Incidentally, the main CPU 6032 assigns the number of games indicated in S6024 above to the variable N, and overwrites in the RAM 6033 as number of times information. The main CPU 6032 displays the variable N stored in the RAM 6033 on the game number display portion 6201 of the liquid crystal panel 6005B by sending a control signal to the sub control board 6072.

In S6025, the main CPU 6032 executes a bet amount allocation process. In this process, the main CPU 6032 allocates the bet amount indicated in S6021 above in an equal manner to each unit game corresponding to the number of games indicated in S6024 above (refer to FIG. 97 above). As a result of this equal allocation, if a surplus occurs with respect to the bet amount indicated in S6021 above, the main CPU 6032 stores the surplus of the bet amount in the RAM 6033, as surplus information.

The main CPU 6032 stores the bet amount thus allocated in the RAM 6033, as bet allocation information. Then, the main CPU 6032 displays the bet allocation information (the bet amount which is evenly allocated to each unit game) which is stored in the RAM 6033 on the bet amount display portion 6202 of the liquid crystal panel 6005B, by sending a control signal to the sub control board 6072. Then, the process proceeds to S6012 shown in FIG. 100 above.

Returning to FIG. 100, in S6012, the main CPU 6032 determines whether or not a predetermined condition is met.

Here, the predetermined condition is that the START button 6115 is depressed. Accordingly, this determination is made based on a signal which is input to the main CPU 6032 depending on depressing the START button 6115. At this point, if the START button 6115 is not depressed (S6012: NO), the process returns to the start acceptance process (S6011) again. Thereby, an operation of changing the bet amount, an operation of changing the number of games and the like are possible. In contrast, if the START button 6115 is depressed (S6012: YES), the process proceeds to S6013.

However, before the main CPU 6032 executes a process in S6013, the main CPU 6032 executes each of the following processes. First, the bet amount set based on the above bet operation is reduced from the credit amount owned by the player at the moment. Incidentally, the credit amount after the reduction is stored in the RAM 6033 as credit information. Then, by sending a control signal to the display portion driving circuit 6067, the main CPU 6032 displays the credit information (the credit amount after the above reduction) stored in the RAM 6033 on the credit amount display portion 6009 of the liquid crystal panel 6005B.

The main CPU 6032 includes the surplus information (the surplus of the bet amount which occurred in the allocation process of S6025 above) stored in the RAM 6033 to the credit information stored in the RAM 6033, at a rate of 1 credit for 1 bet. Then, by sending a control signal to the display portion driving circuit 6067, the main CPU 6032 displays the credit information (the credit amount after the above addition) stored in the RAM 6033 on the credit amount display portion 6009 of the liquid crystal panel 6005B. Further, the main CPU 6032 overwrites "0" in the RAM 6033, as the surplus information.

Further, the main CPU 6032 invalidates the operation with respect to all buttons including the PLAY 1 GAME button 6104, PLAY 2 GAMES button 6105, PLAY 3 GAMES button 6106, PLAY 4 GAMES button 6107 and PLAY 5 GAMES button 6108. Simultaneously, by sending a control signal to the lamp driving circuit 6203, the main CPU 6032 turns off the lamp 6204 provided inside each of the buttons 6104 to 6108.

In S6013, the main CPU 6032 determines whether or not a continuous game has been realized. At this time, the number of times of the unit games constituting the "continuous game" coincides with the variable N. Accordingly, the main CPU 6032 determines that the "continuous game" has been realized if the variable N is greater than "1". At this point, if the "continuous game" has not been realized (S6013: NO), the process proceeds to S6015 described later. In contrast, if the "continuous game" has been realized (S6013: YES), the process proceeds to S6014.

Figure 110:
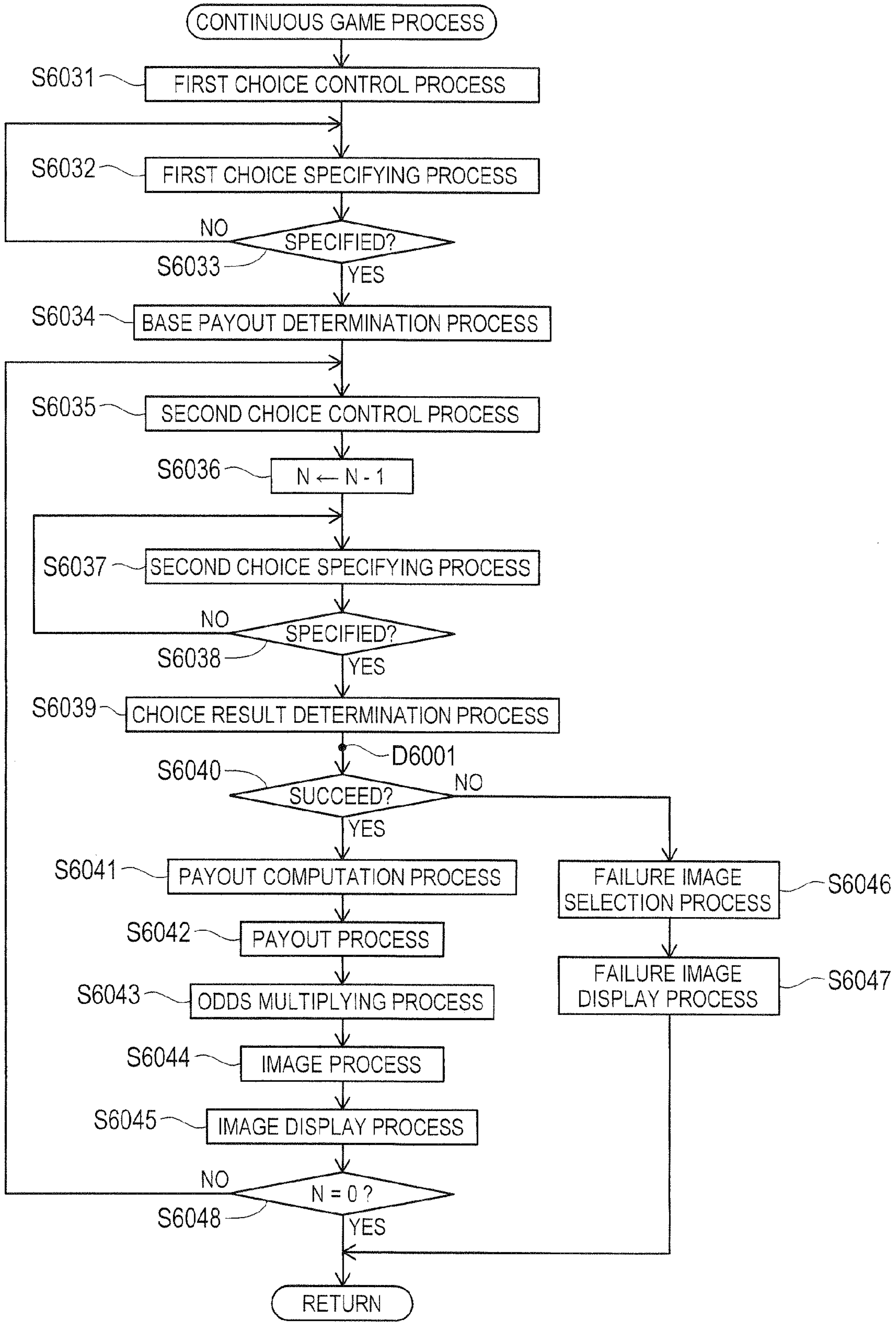
FIG. 110 is a flowchart of a continuous game process program.

In S6014, the main CPU 6032 executes a continuous game process. Then, a sub process of the continuous game process in S6014 above will be explained based on FIG. 110. FIG. 110 is a flowchart of the continuous game process program in the gaming machine 6001 according to the present embodiment. Incidentally, program shown in the flowchart of FIG. 110 is stored in the ROM 6034 or the RAM 6033 of the gaming machine 6001, and is executed by the main CPU 6032.

In the continuous game process in S6014 above, as shown in FIG. 110, the main CPU 6032 executes a first choice control process in S6031. In this process, the main CPU 6032 displays the choice screen in FIG. 102 above on the liquid crystal panel 6005B by sending a control signal to the sub control board 6072.

Further, the main CPU 6032 assigns one number value out of "0", "10", "20" and "50" with respect to the respective choices 6301A, 6301B, 6301C, 6301D and 6301E on the choice screen in FIG. 102 above. This assignment is made using a data table as shown in FIG. 103. Such data table is stored in the ROM 6034 and the like.

In the data table shown in FIG. 103, the respective random number values in the range "0" through "255" are associated with any one number value out of "0", "10", "20" and "50". Accordingly, the main CPU 6032 chooses the random numbers respectively corresponding to the respective choices 6301A, 6301B, 6301C, 6301D and 6301E on the choice screen in FIG. 102 above out of the number value range "0 to 255" by using the sampling circuit 6036. Then, the main CPU 6032 determines the assigned number values for the respective choices 6301A, 6301B, 6301C, 6301D and 6301E on the choice screen in FIG. 102 above based on the five random numbers thus chosen while referring to the data table shown in FIG. 103.

Incidentally, with respect to this determination, the main CPU 6032 may change the assigned number values for the respective choices 6301A, 6301B, 6301C, 6301D and 6301E on the choice screen in FIG. 102 above, in accordance with the bet amount corresponding to the bet allocation information stored in the RAM 6033. For instance, if the bet amount corresponding to the bet allocation information is equal to or above a predetermined number, the main CPU 6032 sets all assigned number values for the respective choices 6301A, 6301B, 6301C, 6301D and 6301E on the choice screen in FIG. 102 above to "50".

In S6032, the main CPU 6032 executes a first choice specifying process. In this process, the main CPU 6032 specifies the choice made by a player out of the choices 6301A, 6301B, 6301C, 6301D and 6301E on the choice screen in FIG. 102 above. This specifying process is executed by determining whether or not a player touched the respective choices 6301A, 6301B, 6301C, 6301D and 6301E on the choice screen in the FIG. 102 above, based on a coordinate signal from the touch panel 101.

In S6033, the main CPU 6032 is in stand-by until the specifying process in S6032 above is executed (S6033: NO). Once the specifying process in S6032 above is executed (S6033: YES), the process proceeds to S6034.

In S6034, the main CPU 6032 executes a base payout determination process. In this process, the main CPU 6032 sets the number value assigned to the choice which was specified in S6032 above out of the respective choices 6301A, 6301B, 6301C, 6301D and 6301E on the choice screen in FIG. 102 above to the basic payout amount.

In S6035, the main CPU 6032 executes a second choice control process. In this process, the main CPU 6032 displays the choice screen in FIG. 104 above on the liquid crystal panel 6005B by sending a control signal to the sub control board 6072.

Further, the main CPU 6032 assigns either a "success" choice result or a "failure" choice result with respect to the respective choices 6303A and 6303B on the choice screen in FIG. 104 above. This assignment is executed by using a data table as shown in FIG. 105. Incidentally, such data table is stored in the ROM 6034 and the like.

In the data table shown in FIG. 105, the respective random number values in the range "0" through "255" are associated with either the "success" choice result or "failure" choice result. Accordingly, the main CPU 6032 chooses the random numbers respectively corresponding to the respective choices 6303A and 6303B on the choice screen shown in FIG. 104 above out of the number value range "0 to 255" by using the sampling circuit 6036. Then, the main CPU 6032 determines the choice results to be assigned to the respective choices 6303A and 6303B on the choice screen shown in FIG. 104 above based on the 2 random numbers thus chosen, by referring to the data table shown in FIG. 105 above.

In S6036, the main CPU 6032 decrements the variable N. Then, the main CPU 6032 displays the variable N thus stored in the RAM 6033 on the remaining game number display portion 6201 of the liquid crystal panel 6005B by sending a control signal to the sub control board 6072.

In S6037, the main CPU 6032 executes a second choice specifying process. In this process, the main CPU 6032 specifies the choice made by a player out of the respective choices 6303A and 6303B on the choice screen in FIG. 104 above. This specifying process is executed by determining whether or not a player touched the respective choices 6303A and 6303B on the choice screen in FIG. 104 above, based on a coordinate signal from the touch panel 6101.

In S6038, the main CPU 6032 is in stand-by until the specifying process in S6037 above is executed (S6038: NO). Once the specifying process in S6037 above is executed (S6038: YES), the process proceeds to S6039.

In S6039, the main CPU 6032 executes a choice result determination process. In this process, the main CPU 6032 determines the player's choice result as "success" or "failure", based on the choice results assigned to the choice that was specified in S6037 above out of the respective choices 6303A and 6303B displayed on the choice screen in FIG. 104 above.

Further, the main CPU 6032 displays the result screen (the success result screen in FIG. 106 above or the failure result screen in FIG. 107 above) in accordance with the player's choice results on the liquid crystal panel 6005B by sending a control signal to the sub control board 6072.

In S6040, the main CPU 6032 determines whether or not the choice result determined in S6039 above is "success". At this point, if the choice result is "failure" (S6040: NO), the process proceeds to S6046 described below. In contrast, if the choice result is "success" (S6040: YES), the process proceeds to S6041.

In S6041, the main CPU 6032 executes a payout computation process. In this process, the main CPU 6032 computes an amount obtained by multiplying the bet amount and an odds value including in odds information described below by the basic payout amount determined in S6034 above. Incidentally, this bet amount is stored as bet allocation information in the RAM 6033. Further, the main CPU 6032 stores the amount thus computed in the RAM 6033 as payout information. At the same time, the main CPU 6032 displays the amount thus computed on the payout amount display portion 6008 of the liquid crystal panel 6005B by sending a control signal to the display portion driving circuit 6067.

Then, the main CPU 6032 executes a payout process in S6042. In the payout process, the computed amount in S6041 above is paid out to the player based on the payout information stored in the RAM 6033.

When the pay out is executed, the credit amount stored in the RAM 6033 as the payout information (the payout amount awarded to a player in a unit game) are added to the credit amount stored in the RAM 6033 as the credit information, and the added value is overwritten in the RAM 6033 as the credit information. After that, by sending a control signal to the display portion driving circuit 6067, the main CPU 6032 displays the credit information stored in the RAM 6033 (the added value computed in S6042) on the credit amount display portion 6009 of the liquid crystal panel 6005B.

Incidentally, in the payout process, the credit amount owned by a player at the moment may be paid out by coins corresponding to the credit amount (one credit equals to one coin) based on the player's depressing the CASHOUT button 6102, or may also be paid out by a ticket with a bar code which is printed by the ticket printer 6014.

Then, after the main CPU 6032 executes the above-mentioned payout process in S6042, the process proceeds to S6043.

In S6043, the main CPU 6032 executes an odds multiplying process. In this process, the main CPU 6032 doubles the odds value stored as the odds information in the RAM 6033. The default value for the odds value (default odds) stored as the odds information in the RAM 6033 is "X2". Further, the main CPU 6032 displays the odds value stored as the odds information on the odds display portion 6302 by sending a control signal to the sub control board 6072.

In S6044, the main CPU 6032 executes an image process. In this process, the main CPU 6032 selects the promotion image to be used for the image effect in this unit game from the data base constructed in the image ROM 6086 (refer to FIG. 96), based on the number of times information stored in the RAM 6033, the variable N and the choice result ("success") determined in S6039 above. This selection is executed by the main CPU 6032, by sending a control signal to the sub control board 6072.

In S6045, the main CPU 6032 executes an image display process. In this process, the main CPU 6032 displays the promotion image selected in S6044 above on the liquid crystal panel 6005A by sending a control signal to the sub control board 6072. Then, the process proceeds to S6048.

In S6048, the main CPU 6032 determines whether or not the variable N is "0". At this point, if the variable N is other than "0" (S6048: NO), the process reverts to S6035 described above. As a result, the unit game with respect to which the bet amount allocated in S6025 above was designated is repeated, whereby the "continuous game" is continued. In contrast, if the variable N is "0" (S6048: YES), the process reverts to S6011 in FIG. 100 above. As a result, this helps avoid repetition of the unit game by the number of times exceeding the number of games indicated in S6024 above. Further, in reverting the process to S6011 in FIG. 100 above, the main CPU 6032 overwrites "0" in the RAM 6033 as the bet allocation information, and at the same time, displays "0" on the bet amount display portion 6202 of the liquid crystal panel 6005B by sending a control signal to the sub control board 6072. Further, the odds value stored as the odds information in the RAM 6033 is reset to the default value (default odds).

Alternatively, if the choice result is "failure" in S6040 above (S6040: NO), the process proceeds to S6046. In S6046, the main CPU 6032 executes a failure image selection process. In this process, the main CPU 6032 selects the bankruptcy image which is used as the image effect in this unit game from the data base constructed in the image ROM 6086 (refer to FIG. 96), based on the number of times information stored in the RAM 6033, the variable N and the choice result (failure) determined in S6039 above. This selection is executed by the main CPU 6032 by sending a control signal to the sub control board 6072.

In S6047, the main CPU 6032 executes a failure image display process. In this process, the main CPU 6032 displays the bankruptcy image selected in S6046 above on the liquid crystal panel 6005A by sending a control signal to the sub control board 6072. Then, the process reverts to S6011 in FIG. 100 above. As a result, this "continuous game" is ended even if the unit game has not been repeated till the number of times indicated in S6024 above. Further, in reverting the process to S6011 in FIG. 100 above, the main CPU 6032 overwrites "0" in the RAM 6033 as the bet allocation information, and at the same time, displays "0" on the bet amount display portion 6202 of the liquid crystal panel 6005B by sending a control signal to the sub control board 6072. Further, the odds value stored as the odds information in the RAM 6033 is reset to the default value (default odds).

Returning to FIG. 100, if the "continuous game" has not been realized in S6013 above (S6013: NO), the process proceeds to S6015. In S6015, the main CPU 6032 executes a multiple-choice game process. In this process, the main CPU 6032 executes the continuous game process shown in FIG. 110, starting from S6035. The variable N at this time is "1", so only one "second multiple-choice game" is executed.

6-7. Other

The Sixth Embodiment

The present invention is not limited to the above-described sixth embodiment, and various modifications and alterations can be made thereto without departing from the spirit of the invention.

For instance, the bet amount with respect to the "continuous game" indicated by a player may be allocated at random to each unit game constituting the "continuous game" indicated by the player. More specifically, as shown in FIG. 98, for instance, the bet amount with respect to the “continuous game” indicated by a player is assumed to be “23”, while the number of times of the unit games constituting the “continuous game” indicated by the player is assumed to be “5”.

Figure 98:
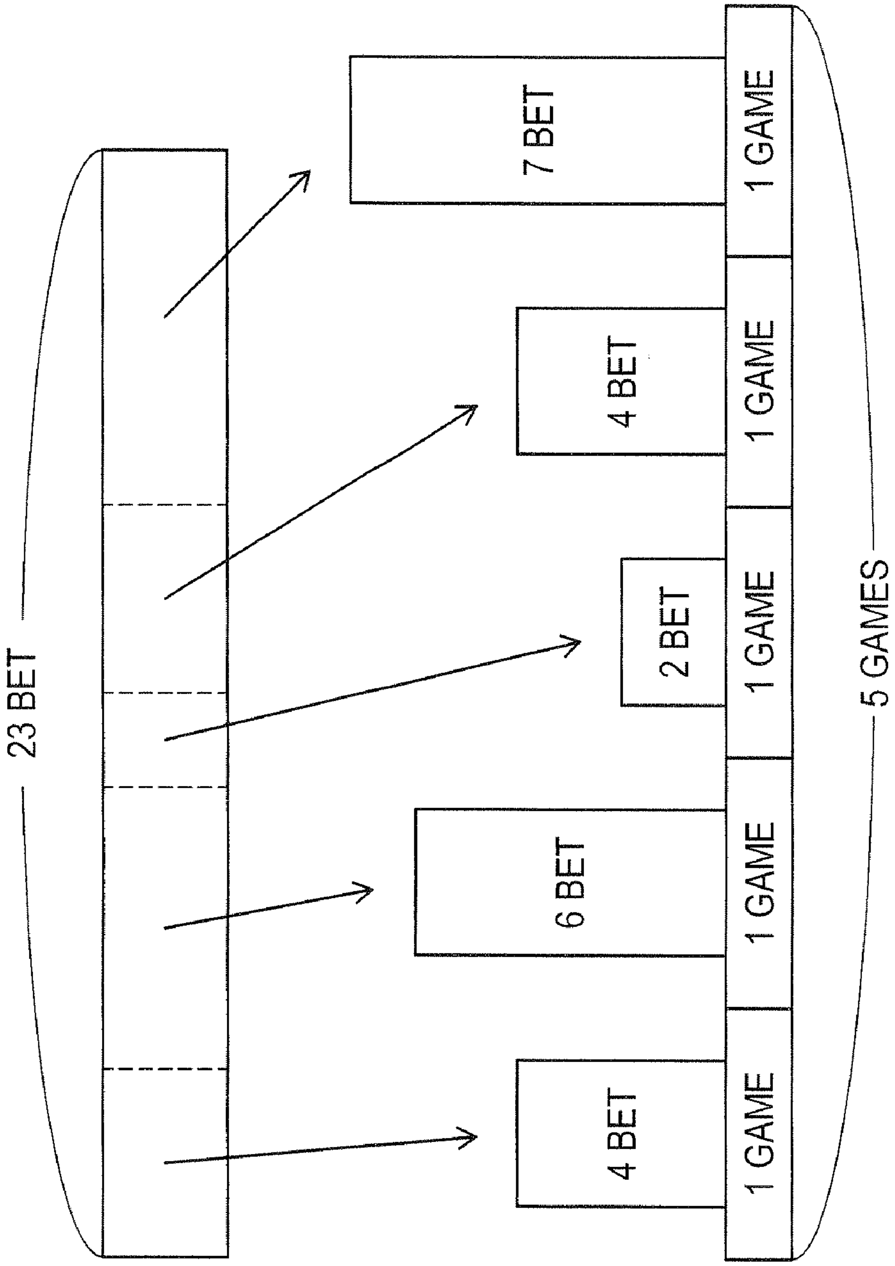
FIG. 98 is a view showing characteristics of the gaming machine.

In the case shown in FIG. 98, the bet amount is respectively allocated to five unit games constituting the “continuous game” indicated by the player, in the order “4”, “16”, “2”, “4” and “7”.

Incidentally, if the bet amount with respect to the “continuous game” indicated by a player is allocated at random to each unit game constituting the “continuous game” indicated by the player, the main CPU 6032 performs control so that the bet amount allocated with respect to the unit games during execution thereof is updated and stored in the bet allocation information, with each execution of the unit games constituting the “continuous game” indicated by the player. Further, the main CPU 6032 performs control so that the bet allocation information thus updated and stored is displayed on the bet amount display portion 6202 of the liquid crystal panel 6005B, by sending a control signal to the sub control board 6072, with each execution of the unit games constituting the “continuous game” indicated by the player.

A surplus of the bet amount may occur as a result of the above-mentioned random allocation thereof. Alternatively, as shown in FIG. 98, this random allocation of the bet amount may be adjusted so as to prevent occurrence of a surplus of the bet amount.

Figure 109:
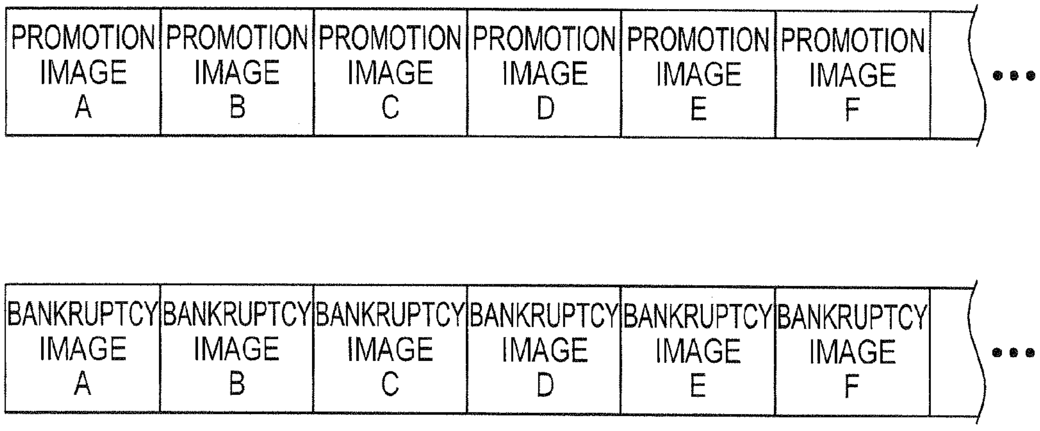
FIG. 109 is a view showing one example of a data table.

In the gaming machine 6001 according to the present embodiment, the promotion image and the bankruptcy image employed for the effect images in the “second multiple-choice game” may be selected upon being displayed on the liquid crystal panel 6005A on a case-by-case basis. Thus, for instance, a promotion image group and a bankruptcy image group may be stored in the image ROM 6086 (refer to FIG. 96) as shown in the data table in FIG. 109. The promotion image group is made up of a plurality of promotion images including the promotion image A, the promotion image B, the promotion image C, the promotion image D, the promotion image E and the promotion image F, . . . , etc. The bankruptcy image group is made up of a plurality of bankruptcy images including the bankruptcy image A, the bankruptcy image B, the bankruptcy image C, the bankruptcy image D, the bankruptcy image E and the bankruptcy image F, . . . , etc.

Then, in the image process in S6044 of FIG. 110 above, the main CPU 6032 selects the promotion image to be used for the image effect in this unit game from the promotion image group stored in the image ROM 6086 (refer to FIG. 96), based on the number of times information stored in the RAM 6033, the variable N and the choice result (“success”) determined in S6039 above. Alternatively, in the image process in S6046 of FIG. 110 above, the main CPU 6032 selects the bankruptcy image to be used for the image effect in this unit game from the bankruptcy image group stored in the image ROM 6086 (refer to FIG. 96), based on the number of times information stored in the RAM 6033, the variable N and the choice result (“failure”) determined in S6039 above.

In the gaming machine 6001 according to the present embodiment, if a predetermined condition is met, control may be executed so that the player’s choice result in the “second multiple-choice game” is forcibly “success” or “failure”.

Figure 111:
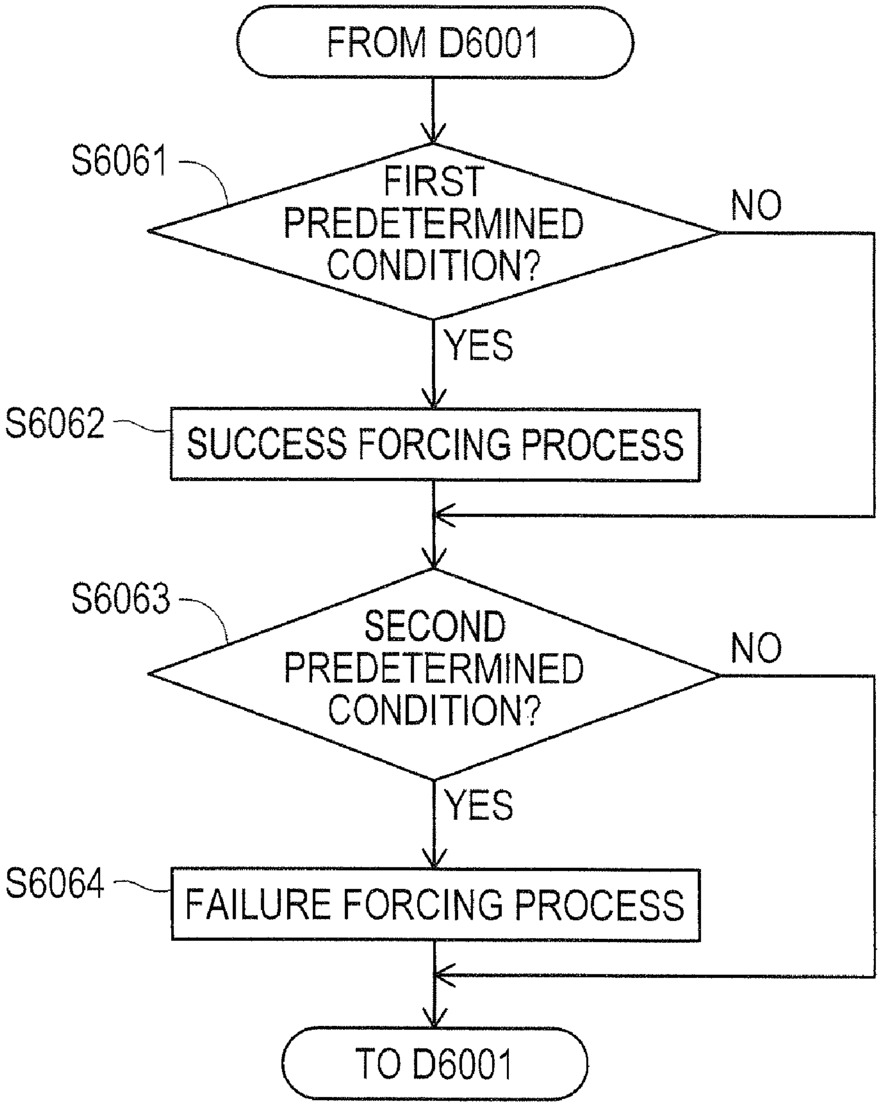
FIG. 111 is a flowchart of a continuous game process program.

For that purpose, in the gaming machine 6001 according to the present embodiment, the main CPU 6032 executes a continuous game process program shown in FIG. 111 at a point in time D6001 placed between S6039 and S6040 of the continuous game process program shown in FIG. 110 above. Incidentally, the program shown in the flowchart of FIG. 111 is stored in the ROM 6034 and the RAM 6033 of the gaming machine 6001, and is executed by the main CPU 6032.

After executing the choice result determination process in S6039 of the continuous game process program in FIG. 110 above, the main CPU 6032 executes the process of S6061 in FIG. 111. In this process, the main CPU 6032 determines whether or not the first predetermined condition is met. At this point, if the first predetermined condition is not met (S6061: NO), the process proceeds to S6063 described below. In contrast, if the first predetermined condition is met (S6061: YES), the process proceeds to S6062.

In S6062, the main CPU 6032 executes a success forcing process. In this process, the main CPU 6032 maintains or changes the choice result determined in S6039 of FIG. 110 above to “success”. Then, the process proceeds to S6063.

In S6063, the main CPU 6032 determines whether or not the second predetermined condition is met. At this point, if the second predetermined condition is not met (S6063: NO), the process proceeds to S6040 of FIG. 110 above. In contrast, if the second predetermined condition is met (S6063: YES), the process proceeds to S6064.

In S6064, the main CPU 6032 executes a failure forcing process. In this process, the main CPU 6032 maintains or changes the choice result determined in S6039 of FIG. 110 above to “failure”. Then, the process proceeds to S6040 of FIG. 110 above.

7-1. Characteristics of the Present Invention

The Seventh Embodiment

Hereinafter, the seventh embodiment of a gaming machine according to the present invention will be described while referring to the accompanying drawings.

The game which is executed in the gaming machine according to the present embodiment is constituted of a multiple-choice game which is played by making choices.

This multiple-choice game is executed using the well-known liquid crystal panels 7005A and 7005B. In this multiple-choice game, the well-known liquid crystal panel 7005B displays two choices 7303A and 7303B, as shown at an upper side in FIG. 112. The choice 7303A displays “investment A”, and the choice 7303B displays “investment B”. At a start of this multiple-choice game is determined the basic payout amount. Default odds are also provided. After indicating the bet amount with respect to this multiple-choice game, a player chooses either one of two choices 7303A and 7303B by means of a touch panel 7101 provided on the liquid crystal panel 7005B. Then, a result of the choice, specifically, investment success or investment failure, is displayed on the liquid crystal panel 7005B.

Figure 112:
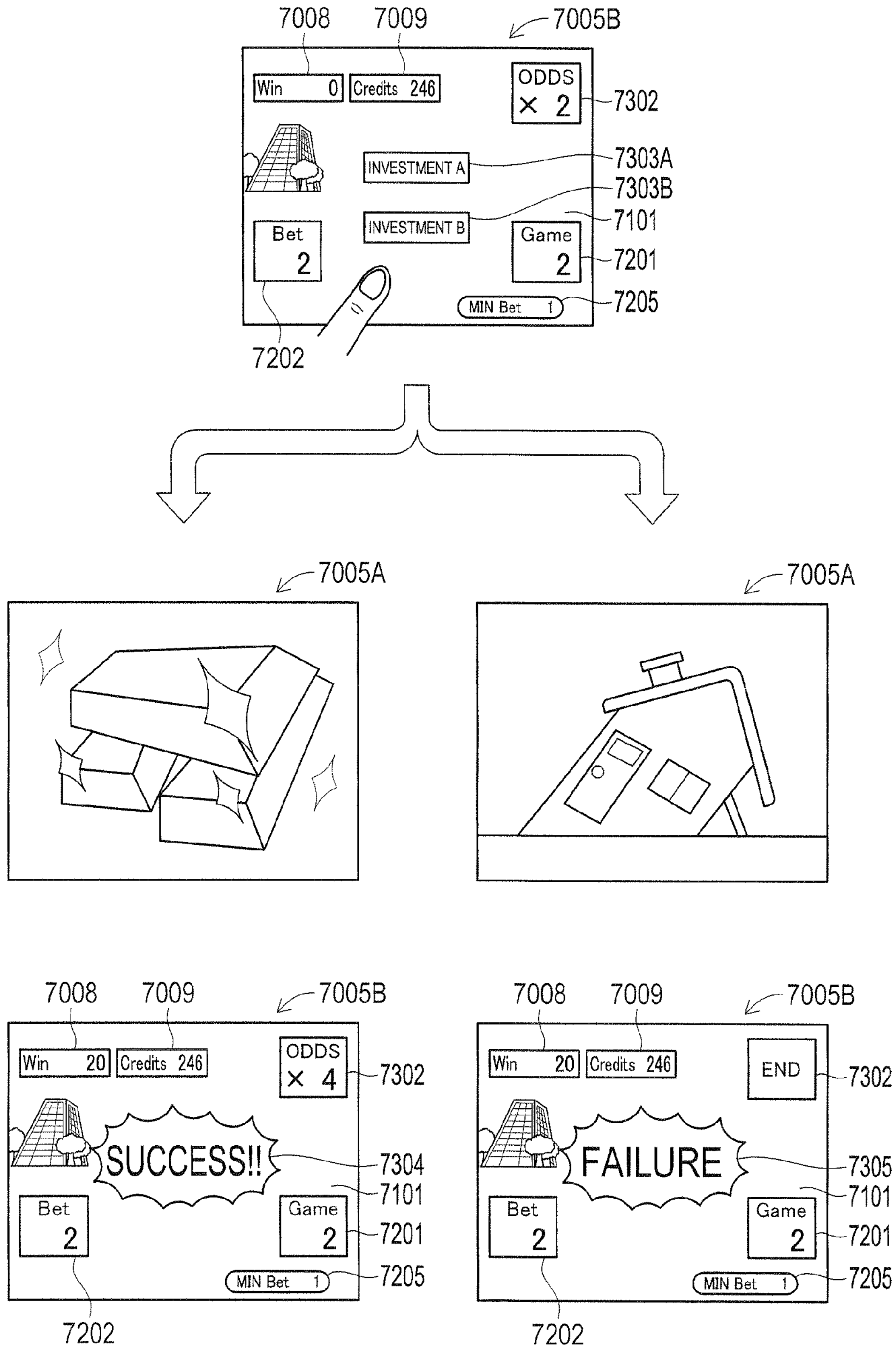
FIG. 112 is a view showing characteristics of a gaming machine which is one seventh embodiment of the present invention.

If the result of the choice result is investment success, a message 7304 saying “success” is displayed as shown in the liquid crystal panel 7005B at the left side in the lower stage of FIG. 112. A player is then awarded a prize obtained by multiplying the bet amount and the default odds by the basic payout amount. The amount of this prize is displayed on a payout amount display portion 7008.

If the result of the choice is investment failure, a message 7305 saying “failure” is displayed as shown in the liquid crystal panel 7005B at the right side in the lower stage of FIG. 112. Then a player is awarded no payout.

A unit game of the multiple-choice game is thus constituted.

To make explanation easier, the unit game is referred to as the multiple-choice game.

In the gaming machine 7001 of the present embodiment, the player can indicate that a unit game will be executed continuously by a predetermined number of times such as "1", "2", "3" and the like. A group of unit games which the player indicated as a continuous play corresponds to a "continuous game". This indication is made by operating a plurality of buttons which are respectively provided in accordance with the number of times of the unit games constituting the "continuous game" (refer to FIG. 114).

The player can indicate the bet amount, such as "1", "5", "10" and the like, with respect to the "continuous game". This indication is made by operating a plurality of buttons which are respectively provided in accordance with the bet amount (refer to FIG. 114).

In this respect, in the gaming machine 7001 of the present embodiment, once the player indicates the bet amount with respect to the "continuous game", one or a plurality of "continuous games" including unit games that are executed by the number of times which can be indicated by the player is specified through the bet amount with respect to the "continuous game" indicated by the player and the minimum bet amount with respect to a unit game which can be set by the player (in the present embodiment, the bet amount being "1"). Thereafter, the operation with respect to all buttons corresponding to the "continuous game" thus specified is validated.

The player operates any of the buttons thus validated, whereby the "continuous game", which is constituted of unit games executed by the number of times indicated by the player through the above-mentioned operation, is executed.

Figure 117:
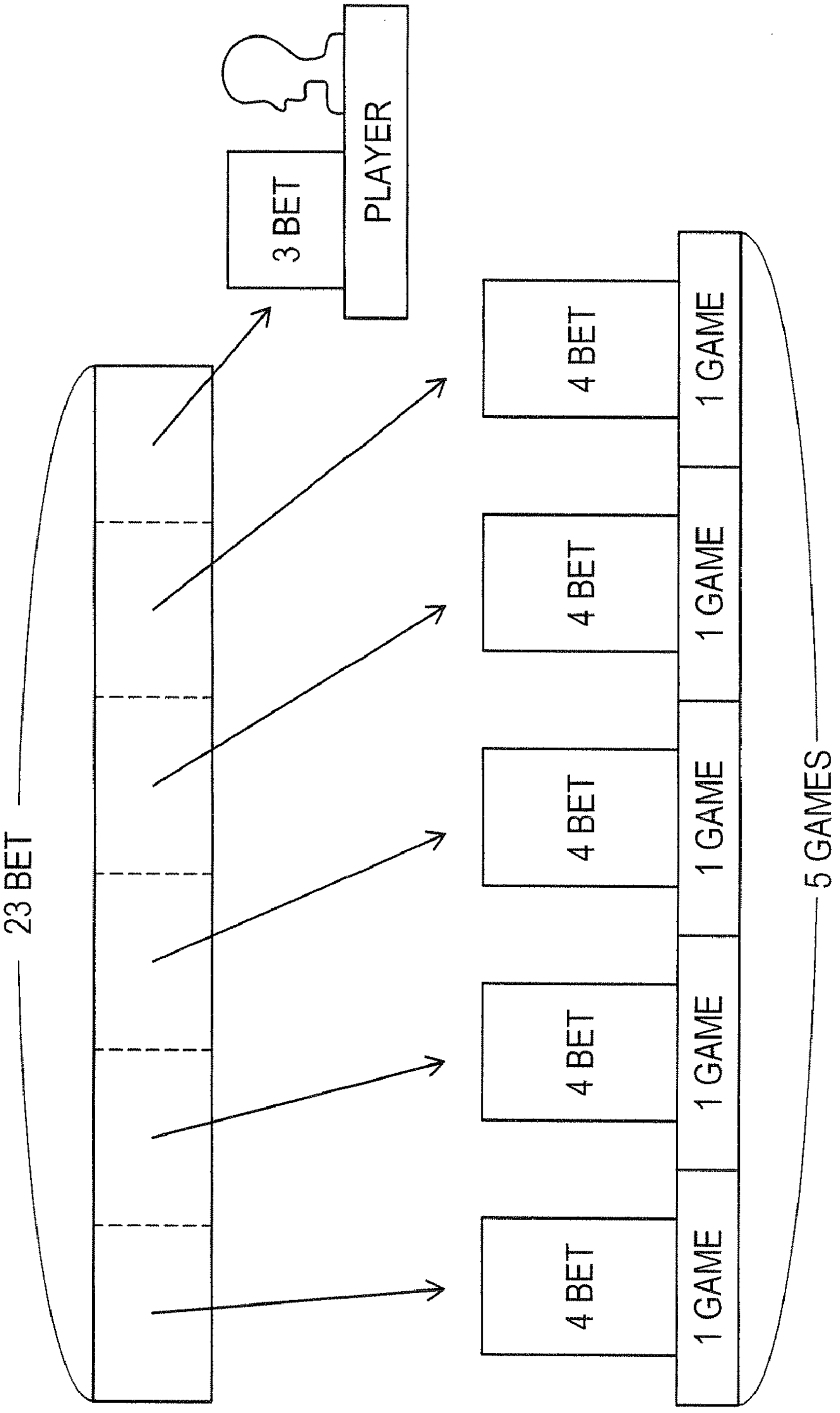
FIG. 117 is a view showing characteristics of the gaming machine.

The bet amount with respect to the "continuous game" indicated by the player is evenly allocated to each unit game constituting the "continuous game" indicated by the player. More specifically, as shown in FIG. 117, for instance, the bet amount with respect to the "continuous game" indicated by the player is assumed to be "23", and the number of times for the unit games constituting the "continuous game" indicated by the player is assumed to be "5". In this case, the bet amount "4" is evenly allocated with respect to each unit game constituting the "continuous game" indicated by the player.

Incidentally, the bet amount which was left after the bet amount has been evenly allocated with respect to each unit game constituting the "continuous game" is returned to the player. In the case of FIG. 117, the bet amount "3" is returned to the player.

Thereafter, after the "continuous game" starts, the respective unit games constituting the "continuous game" are executed continuously. In case of a choice result showing investment failure in a certain unit game, the process does not proceed to the next unit game, ending the "continuous game".

During the execution of the "continuous game", control is executed so that an effect is executed whereby a new promotion image is displayed on the liquid crystal panel 7005A with each new investment success choice result, and a bankruptcy image is displayed on the liquid crystal panel 7005A in a case of an investment failure choice result.

During the execution of the "continuous game", a standalone type mystery jackpot is executed (S7063 in FIG. 132 below). The award amount for the mystery jackpot is determined as will be described hereinafter. Specifically, prior to execution of the "continuous game", the maximum payout amount that a player can acquire in the "continuous game" is computed in advance (S7062 in FIG. 132 below). In a unit game wherein the total payout amount acquired by a player in the "continuous game" exceeds the maximum payout amount (in FIG. 133 below, S7071: YES), a game result of the unit game is forcibly controlled (S7072 in FIG. 133 below). With such control, the total payout amount acquired by a player in the "continuous game" never exceeds the maximum payout amount. Here, the difference amount by which the total payout amount acquired by a player in the "continuous game" is short of the maximum payout amount is included in the award amount for the mystery jackpot (S7076 in FIG. 133 below and S7082 in FIG. 134 below).

7-2. Construction of the Gaming Machine

The Seventh Embodiment

Hereinafter, the one embodiment embodying the present invention will be explained in detail with reference to the drawings.

Figure 113:
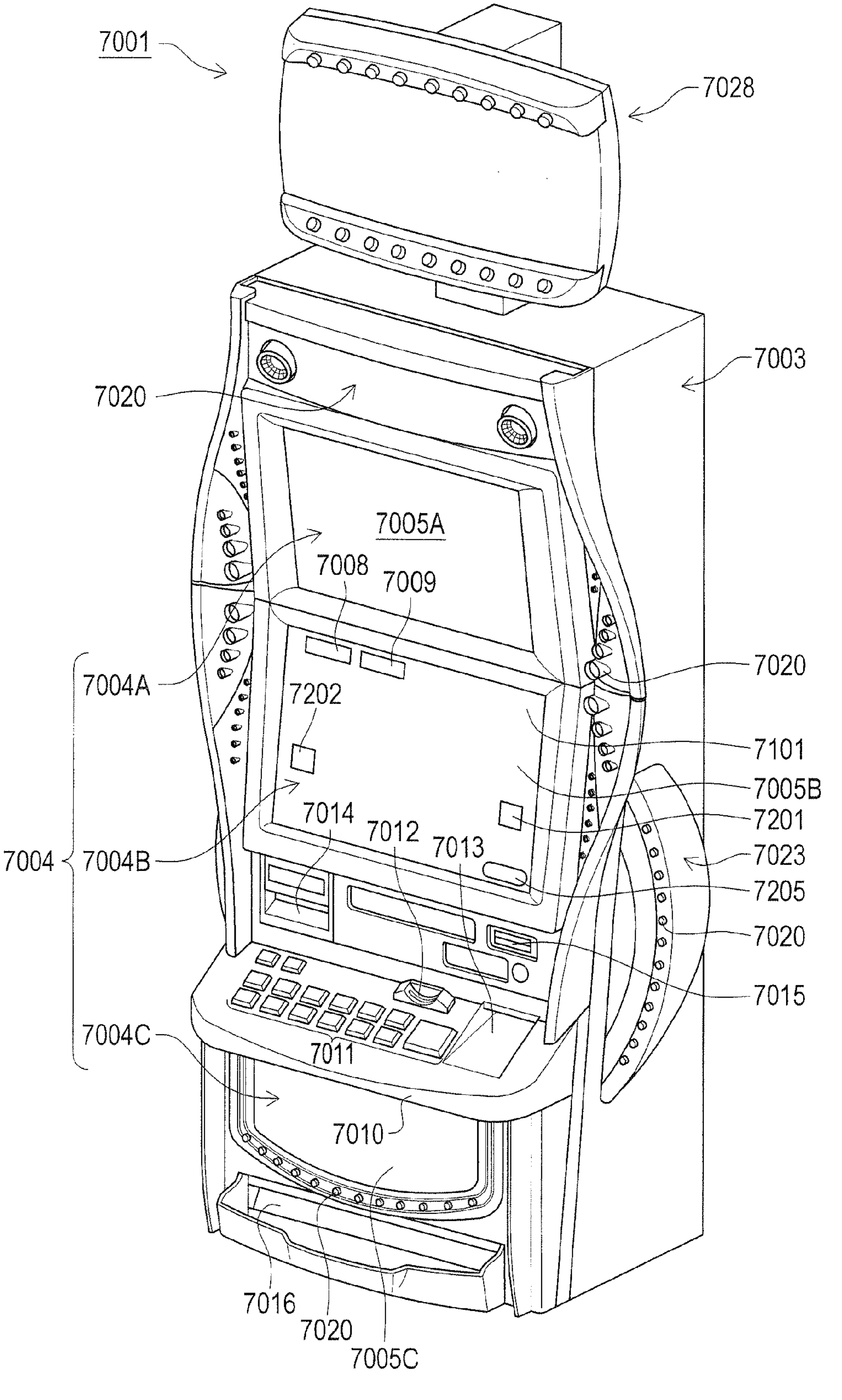
FIG. 113 is a perspective view of the gaming machine.

First, an outline construction of the gaming machine 7001 according to the present embodiment will be explained based on FIG. 113. FIG. 113 is a perspective view of the gaming machine 7001 according to the present embodiment.

As shown in FIG. 113, the gaming machine 7001 is an upright type gaming machine arranged in a game arcade such as casino, in order to execute predetermined game modes, such gaming machine includes a cabinet 7003 in which electronic and mechanical components are installed. For example, as a display portion 7004 to display information a concerning game, there are provided an upper display portion 7004A, a middle variable display portion 7004B and a lower display portion 7004C. Each display portion 7004A to 7004C is mounted at the front of the oblong cabinet 7003. The upper display portion 7004A includes a liquid crystal panel 7005A which is arranged above the middle variable display portion 7004B. On the liquid crystal panel 7005A, for example, an effect image, an introduction of a game content, and a rule explanation of a game are displayed. The lower display portion 7004C is arranged below the middle variable display portion 7004B, and includes a plastic panel 7005C on which images are printed, and a plastic panel 7005C is lightened by backlights.

The middle variable display portion 7004B, which is used to display an execution state of a game, includes the liquid crystal panel 7005B which is fixed at the front door of the cabinet 7003. Further, a touch panel 7101 is provided on the front surface of the liquid crystal panel 7005B. On the upper position of the middle variable display portion 7004B, the payout amount display portion 7008 and a credit amount display portion 7009 are provided on the liquid crystal panel 7005B. Also the upper portion of the middle variable display portion 7004B, is related to the back side, thereby a player may play a game in a cozy posture.

At the right portion of the middle variable display portion 7004B, a bet amount display portion 7202 is provided on the liquid crystal panel 7005B. Further, at the right portion of the middle variable display portion 7004B, a game number display portion 7201 is provided. Furthermore, in the middle variable display portion 7004B, a minimum bet amount display area 7205 is provided on the liquid crystal panel 7005B, at the lower side of the game number display portion 7201.

Further, the payout amount display portion 7008 and the credit amount display portion 7009 are provided on the liquid crystal panel 7005B. On the payout amount display portion 7008, the payout amount awarded in a multiple-choice game to a player is displayed. On the credit amount display portion 7009, the credit amount which is owned by a player at the moment is displayed.

Further, the liquid crystal panel 7005B contains the bet amount display portion 7202, the game number display portion 7201 and the minimum bet amount display area 7205.

The bet amount display portion 7202 displays the bet amount for a unit game, as set by a player in a multiple-choice. The game number display portion 7201 displays the remaining number of times for executing unit games that constitute the "continuous game" set by a player in a multiple-choice. The minimum bet amount display area 7205 displays the minimum bet amount for each unit game that a player can set.

Returning to FIG. 113, between the middle variable display portion 4B and the lower display portion 7004C, at the front of the cabinet 7003, an operation table 10 which is projected forward is provided. On the operation table 7010, a variety of operation buttons 7011 including a BET button, a COLLECT button, a SPIN button, a CASHOUT button and the like are arranged as an operation portion to execute a game.

Figure 114:
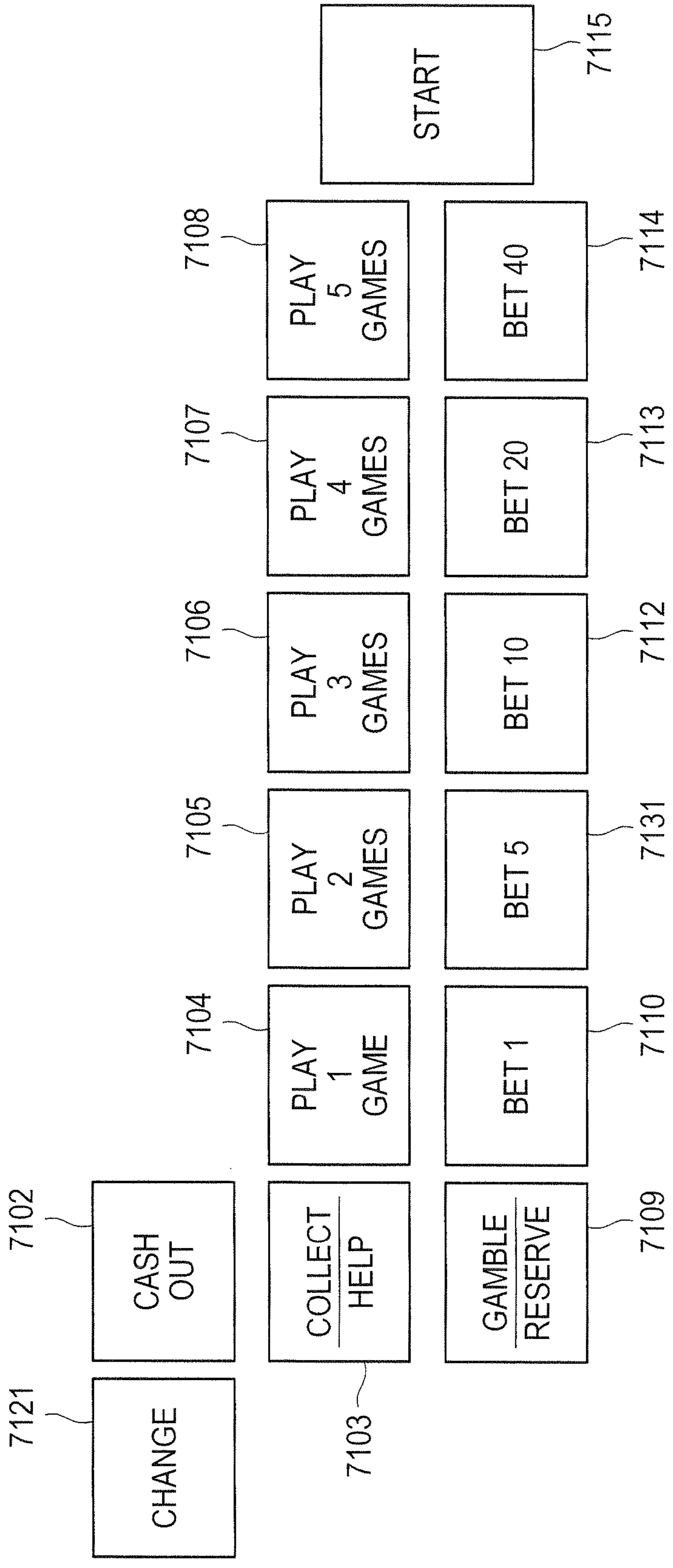
FIG. 114 is a front view showing a variety of operation buttons.

Here, the variety of operation buttons 7011 will now be described. FIG. 114 is a front view showing the variety of operation buttons 7011. As shown in FIG. 114, at an upper stage are provided a CHANGE button 7121, a CASHOUT button 7102 starting from the leftmost side. At a middle stage are provided a COLLECT/HELP button 7103, a PLAY 1 GAME button 7104, a PLAY 2 GAMES button 7105, a PLAY 3 GAMES button 7106, a PLAY 4 GAMES button 7107 and a PLAY 5 GAMES button 7108 starting from the leftmost side. At a lower stage are provided a GAMBLE/RESERVE button 7109, a BET 1 button 7110, a BET 5 button 7131, a BET 10 button 7112, a BET 20 button 7113 and a BET 40 button 7114, starting from the leftmost side. At the rightmost side is provided a START button 7115.

In this respect, the CHANGE button 7121 is an operation device which is used to change bills inserted in a bill insertion slot 7013 (refer to FIG. 113). Coins which have been changed are paid out to a coin tray 7016 (refer to FIG. 113) provided at the lower side of the cabinet 7003 (refer to FIG. 113).

The CASHOUT button 7102 is an operation device which is used to input a command to pay out coins in accordance with the credit amount which a player owns at the moment to the coin tray 7016 (refer to FIG. 113) or a command to pay out such coins by means of bar code-attached tickets which are printed in a ticket printer 7014 (refer to FIG. 113).

The COLLECT/HELP button 7103 is an operation device which is used when completing a double-down game which is executed using the payout amount acquired by a player, or when the game operation method and the like is unclear. Incidentally, if the COLLECT/HELP button 7103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 7104 is an input device for inputting, based on being operated, a command to execute one unit game. The PLAY 2 GAMES button 7105 is an input device for inputting, based on being operated, a command to execute two continuous unit games constituting the "continuous game". The PLAY 3 GAMES button 7106 is an input device for inputting, based on being operated, a command to execute three continuous unit games constituting the "continuous game". The PLAY 4 GAMES button 7107 is an input device for inputting, based on being operated, a command to execute four continuous unit games constituting the "continuous game". The PLAY 5 GAMES button 7108 is an input device for inputting, based on being operated, a command to execute five continuous unit games constituting the "continuous game".

Incidentally, the operation with respect to the PLAY 1 GAME button 7104, PLAY 2 GAMES button 7105, PLAY 3 GAMES button 7106, PLAY 4 GAMES button 7107 and PLAY 5 GAMES button 7108 is not accepted during normal operation.

The GAMBLE/RESERVE button 7109 is an operation device which is used by a player when he/she shifts a game to a double-down game, or when he/she steps away from the gaming machine.

The BET 1 button 7110 is an input device for inputting, based on being operated, a command to set the bet amount corresponding to "1" with respect to a unit game or the "continuous game". The BET 5 button 7131 is an input device for inputting, based on being operated, a command to set the bet amount corresponding to "5" with respect to a unit game or the "continuous game". The BET 10 button 7112 is an input device for inputting, based on being operated, a command to set the bet amount corresponding to "10" with respect to a unit game or the "continuous game". The BET 20 button 7113 is an input device for inputting, based on being operated, a command to set the bet amount corresponding to "20" with respect to a unit game or the "continuous game". The BET 40 button 7114 is an input device for inputting, based on being operated, a command to set the bet amount corresponding to "40" with respect to a unit game or the "continuous game".

The START button 7115 is an input device for inputting, based on being operated, a command to start a multiple-choice game.

Returning to FIG. 113, at the operation table 7010, a coin insertion slot 7012 and the bill insertion slot 7013 are provided. Between the operation table 7010 and the middle variable display portion 7004B, the ticket printer 7014 and a card reader 7015 are provided. At the lowest position of the cabinet 7003, the coin tray 7016 is also provided.

Incidentally, in the gaming machine 7001 according to the present embodiment, gaming medium may be coin, bill, or electronic value (credit). Here, the gaming medium may be others as well, such as medal, token, electronic money, or ticket.

Further, on the cabinet 7003 of the gaming machine 7001, light emitting portions 7020 are arranged around a game area including the upper display portion 7004A, the middle variable display portion 7004B, the lower display portion 7004C and the operation table 7010.

Furthermore, the gaming machine 7001 also includes a topper effect device 7028 which is installed on the cabinet 7003. The topper effect device 7028 is shaped in a rectangular board shaped, and is provided almost parallel to the liquid crystal panel 7005A of the upper display portion 7004A. The cabinet 7003 is further provided with speakers 7023 on its both sides.

7-3. Internal Construction of the Gaming Machine

The Seventh Embodiment

Next, an internal construction of the above-mentioned gaming machine 7001 will be explained with reference to FIG. 115 and FIG. 116.

Figure 115:
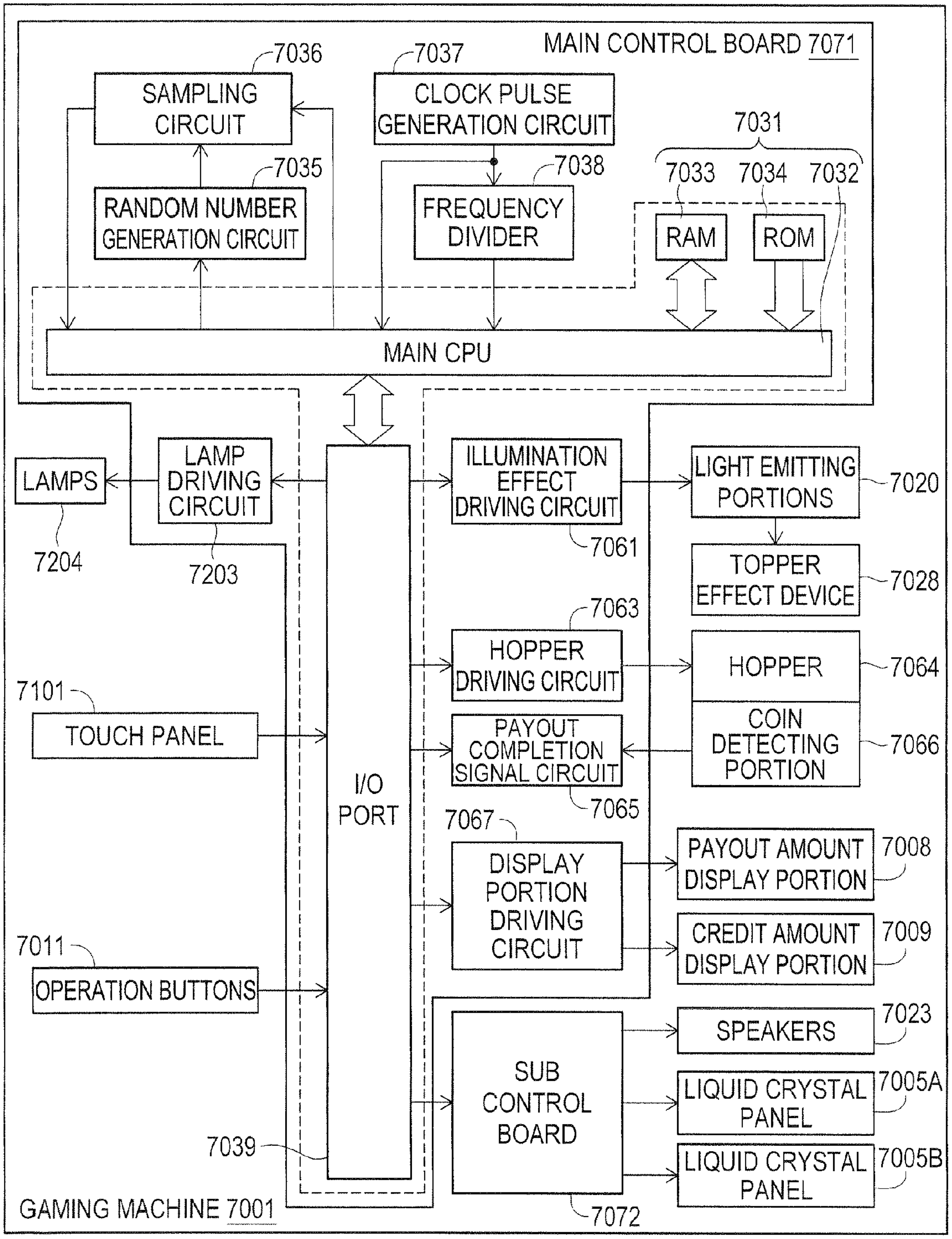
FIG. 115 is a block diagram showing an internal construction of entire gaming machine.

FIG. 115 is a block diagram showing an internal construction of entire gaming machine 7001. As shown in FIG. 115, the gaming machine 7001 includes a plurality of construction elements such as a main control board 7071, in which a microcomputer 7031 is included. The main control board 7071 is constructed from the microcomputer 7031, a random number generation circuit 7035, a sampling circuit 7036, a clock pulse generation circuit 7037 and a frequency divider 7038. The main control board 7071 also includes an illumination effect driving circuit 7061, a hopper driving circuit 7063, a payout completion signal circuit 7065, a display portion driving circuit 7067 and a lamp driving circuit 7203.

The microcomputer 7031 is constructed from a main CPU 7032, a RAM 7033 and a ROM 7034. The main CPU 7032 runs based on programs stored in the ROM 7034, and inputs/outputs a signal with other elements through an I/O port 7039, so as to execute control of the entire gaming machine 7001. Data and programs used when the main CPU 7032 runs are stored in the RAM 7033. For example, after-mentioned random numbers which are sampled by the sampling circuit 7036 are stored temporarily after a start of a game. Further, the RAM 7033 sets in advance a storage area where an after-mentioned variable N is stored. Programs executed by the main CPU 7032 and permanent data are stored in the ROM 7034.

Especially, the programs stored in the ROM 7034 include game programs and game system programs (abbreviated as "the game programs and the like" hereinafter).

Random numbers over a predetermined range are generated by the random number generation circuit 7035, which is operated based on instructions from the main CPU 7032. The random numbers are voluntarily extracted from the random numbers generated by the random number generation circuit 7035 by the sampling circuit 7036, based on instructions from the main CPU 7032, and the extracted random numbers are input to the main CPU 7032. The base clock for running the main CPU 7032 is generated by the clock pulse generation circuit 7037, and signals which are generated by dividing the base clock in a predetermined frequency are input to the main CPU 7032 by the frequency divider 7038.

And to the main control board 7071, the touch panel 7101 is connected. The touch panel 7101 is arranged in front of the liquid crystal panel 7005B, and specifies the coordinate position of the portion touched by a player. The position on which a player touched and the direction of the movement of the touched portion are determined based on the specified coordinate position information. A signal corresponding to the determination is input to the main CPU 7032 through the I/O port 7039.

Also, the operation buttons 7011 for instructing an execution of a game are connected to the main control board 7071. The operation buttons 7011 include the variety of buttons (refer to FIG. 114). A signal corresponding to the depressing of these buttons is input to the main CPU 7032 through the I/O port 7039.

An effect signal which is used to conduct illumination effect is output to the above-mentioned light emitting portions 7020 and the topper effect device 7028 by the illumination effect driving circuit 7061. Then, the topper effect device 7028 is serially connected to the illumination effect driving circuit 7061 through the light emitting portions 7020.

A hopper 7064 is driven by the hopper driving circuit 7063 based on control of main CPU 7032. The hopper 7064 executes payout of coins, and coins are paid out from the coin tray 7016. Data of the number of coins are input from the connected coin detecting portion 7066 by the payout completion signal circuit 7065. When the number of coins becomes a predetermined number, a signal indicating completion of the coins is input to the main CPU 7032. The number of the coins paid out from the hopper 7064 is calculated by the coin detecting portion 7066, and the data of the number calculated are input to the payout completion signal circuit 7065. The each display operation of the payout amount display portion 7008 and credit amount display portion 7009 is controlled by the display portion driving circuit 7067.

The lamp driving circuit 7203 turns lamps 7204 on/off based on control of main CPU 7032. The lamps 7204 are provided inside the operation buttons 7011. The lamp 7204 inside the button with respect to which a player's operation is validated lights up, notifying the player of the button with respect to which operation is validated.

Furthermore, a sub control board 7072 is connected to the main control board 7071. The sub control board 7072 is connected to the liquid crystal panel 7005A, the liquid crystal panel 7005B and the speakers 7023.

Figure 116:
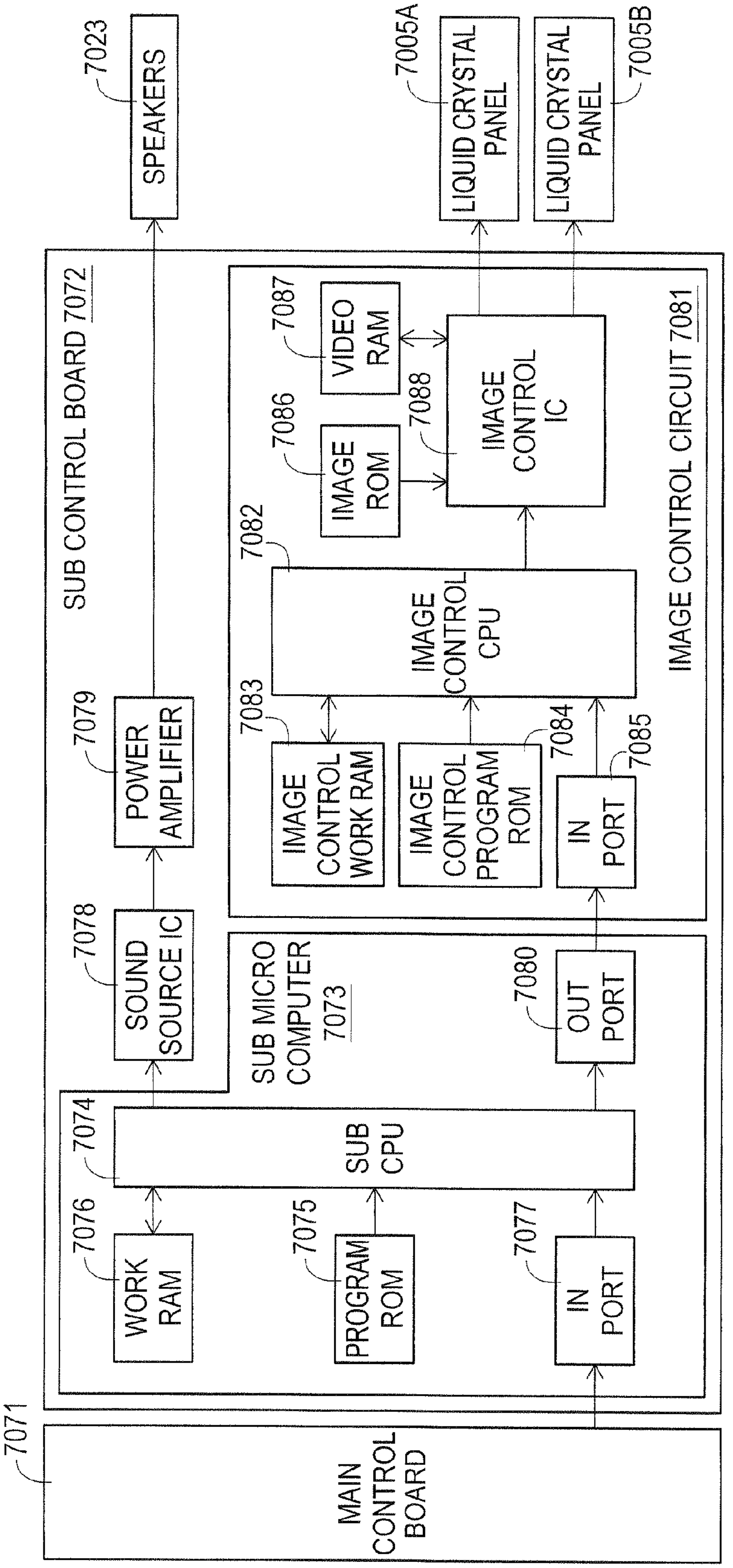
FIG. 116 is a block diagram showing an internal construction of a sub control board.

FIG. 116 is a block diagram showing an internal construction of the sub control board 7072. As shown in FIG. 116, a command from the main control board 7071 is input to the sub control board 7072. The display control on the liquid crystal panel 7005A of the upper display portion 7004A and the liquid crystal panel 7005B of the variable display portion 7004B, and the sound output control on the speakers 7023 are executed by the sub control board 7072. The sub control board 7072 is constructed on a circuit board different from the circuit board for the main control board 7071, and includes a microcomputer 7073 (abbreviated as "sub microcomputer" hereinafter) as a main construction element, and a sound source IC 7078, a power amplifier 7079 and an image control circuit 7081. The sound source IC 7078 controls the sound output from the speakers 7023, the power amplifier 7079 is used as an amplification device, and the image control circuit 7081 runs as a display control device of the liquid crystal panel 7005A and 7005B.

The sub microcomputer 7073 includes a sub CPU 7074, a program ROM 7075, a work RAM 7076, an IN port 7077 and an OUT port 7080. The control operations are executed by the sub CPU 7074 based on a control order sent from the main control board 7071, the program ROM 7075 is used as a memory device. Although a clock pulse generation circuit, a frequency divider, a random number generation circuit and a sampling circuit are not included in the sub control board 7072, the sub control board 7072 is constructed so as to execute random number sampling according to operation programs thereof. Control programs executed by the sub CPU 7074 are stored in the program ROM 7075. The work RAM 7076 is constructed as a temporary storing device when the above-mentioned control programs are executed by the sub CPU 7074.

The image control circuit 7081 includes an image control CPU 7082, an image control work RAM 7083, an image control program ROM 7084, an IN port 7085, an image ROM 7086, a video RAM 7087 and an image control IC 7088. Images displayed on the liquid crystal panel 7005A and 7005B are determined by the image control CPU 7082, based on parameters set by the sub microcomputer 7073, according to image control programs stored in the image control program ROM 7084.

The image control programs regarding to a display of the liquid crystal panel 7005A, 7005B and a variety of selection tables are stored in the image control program ROM 7084. The image control work RAM 7083 is constructed as a temporary storing device when the image control programs are executed by the image control CPU 7082. Images corresponding to contents determined by the image control CPU 7082 are formed by the image control IC 7088, and are output to the liquid crystal panel 7005A, 7005B.

In the image ROM 7086, dot data used to form images are stored. Thus, it stores the dot data for forming images. The video RAM 7087 runs as a temporary storing device when the images are formed by the image control IC 7088.

Further, based on a control signal from the main CPU 7032, the image control circuit 7081 performs display control of the liquid crystal panel 7005A, 7005B.

7-4. Development of the Multiple-choice Game

The Seventh Embodiment

Next, the multiple-choice game will be described in detail. In the gaming machine 7001 according to the present embodiment, the multiple-choice game is executed as a unit game or unit games constituting the "continuous game". If the multiple-choice game starts as a unit game, the basic payout is set to "10". Alternatively, if the multiple-choice game starts as the unit games constituting the "continuous game", a multiple-choice game is first executed to determine the basic payout.

For the convenience of the description, the multiple-choice game for determining the basic payout may be referred to as a "first multiple-choice game". The multiple-choice game described in FIG. 112 may be referred to as a "second multiple-choice game" to identify the multiple-choice games.

Figures 122, 123:
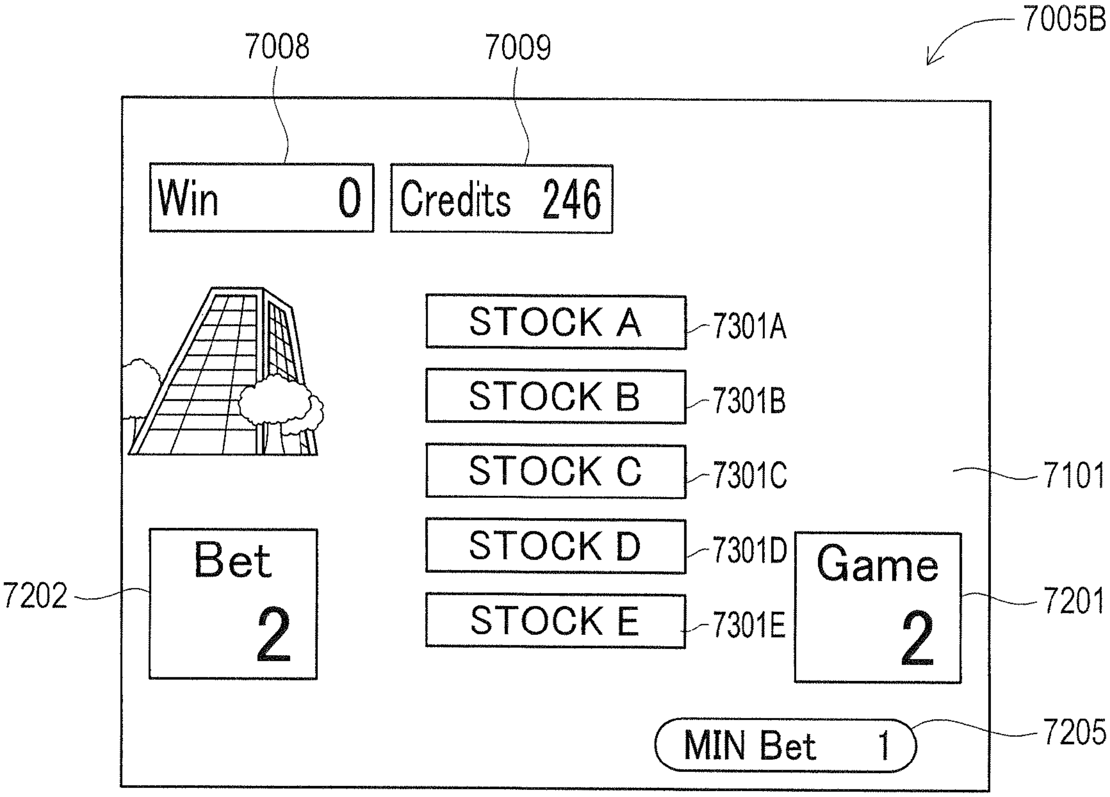

FIG. 122 is a view showing a choice screen for determining the basic payout in the "second multiple-choice game". In the choice screen displayed on the liquid crystal panel 7005B shown in FIG. 122 are provided five choices 7301A, 7301B, 7301C, 7301D and 7301E for determining the basic payout.

The choice 7301A is displayed as "stock A". The choice 7301B is displayed as "stock B". The choice 7301C is displayed as "stock C". The choice 7301D is displayed as "stock D". The choice 7301E is displayed as "stock E".

A player buys any one of the five types of stocks by choosing any one of the five choices 7301A, 7301B, 7301C, 7301D and 7301E. In this case, the respective choices 7301A, 7301B, 7301C, 7301D and 7301E are each assigned any one of the number values out of "0", "10", "20" and "50". The assigned value corresponds to the basic payout.

Specifically, the number value which was assigned to the choice made by a player out of the five choices 7301A, 7301B, 7301C, 7301D and 7301E becomes the basic payout in the "second multiple-choice game".

Incidentally, the choice screen displayed on the liquid crystal panel 7005B shown in FIG. 122 is provided with the payout amount display portion 7008, the credit amount display portion 7009, the remaining game number display portion 7201, the bet amount display portion 7202 and the minimum bet amount display area 7205. The image data for this choice screen is stored in the image ROM 7086 (refer to FIG. 116).

Figures 124, 125:
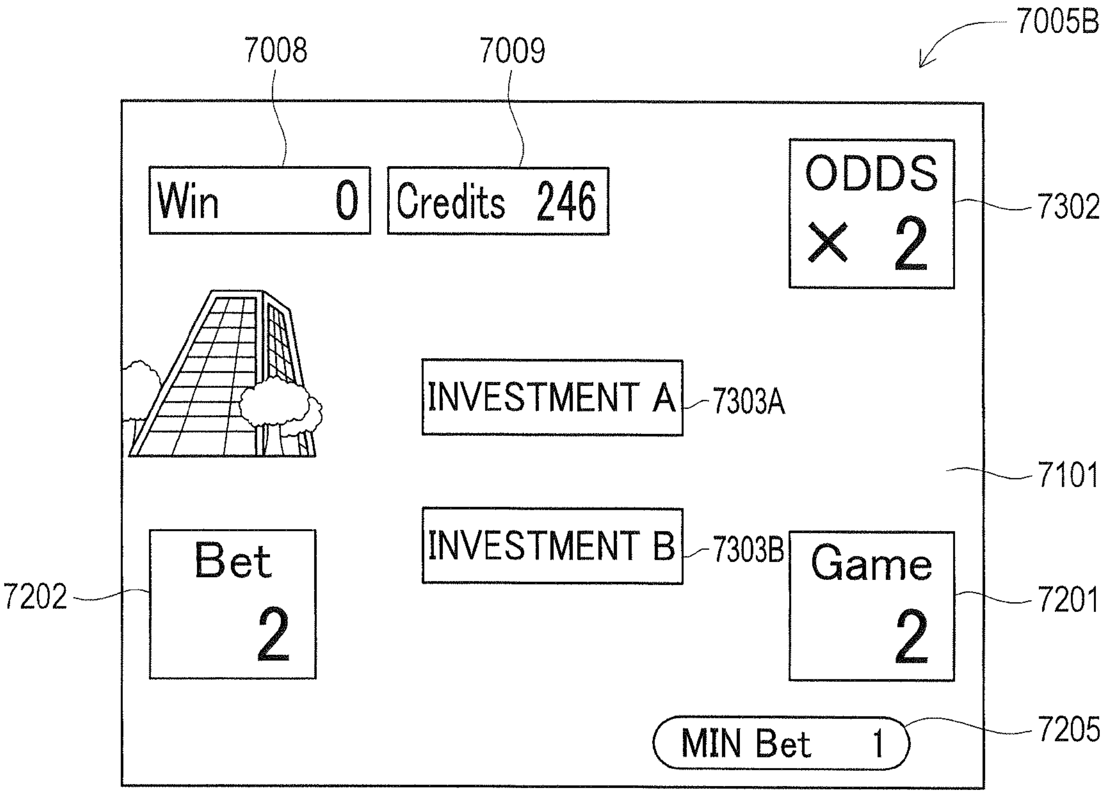

Thus, after the basic payout is determined in the "second multiple-choice game", the liquid crystal panel 7005B displays a choice screen as shown in FIG. 124. FIG. 124 is a view showing the choice screen in the "second multiple-choice game". The choice screen displayed on the liquid crystal panel 7005B shown in FIG. 124 is provided with two choices 7303A and 7303B.

The choice 7303A is displayed as "investment A". The choice 7303B is displayed as "investment B". A player determines either of the 2 investments by choosing either of the two choices 7303A and 7303B. In this case, the choices 7303A and 7303B are each assigned either one of the choice results including "success" and "failure".

Specifically, the choice results assigned to the choice made by a player out of the two choices 7303A and 7303B become the game results in the "second multiple-choice game".

Incidentally, the choice screen displayed on the liquid display panel 7005B shown in FIG. 124 has an odds display portion 7302, in addition to the payout amount display portion 7008, the credit amount display portion 7009, the remaining game number display portion 7201, the bet odds display portion 7302 and the minimum bet amount display area 7205. The odds display portion 7302 displays the default odds in the "second multiple-choice game". Image data of this choice screen are stored in the image ROM 7086 (refer to FIG. 116).

Figure 126:
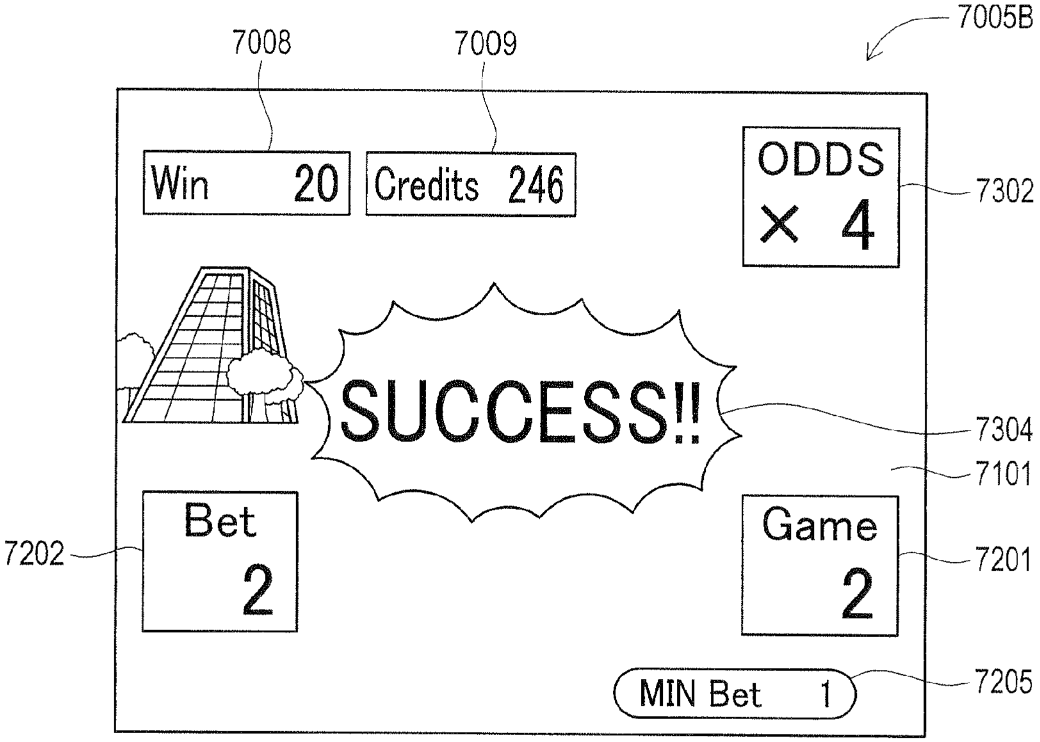

Then, if the game result in the "second multiple-choice game" is "success", the liquid crystal panel 7005B displays a result screen shown in FIG. 126 as investment success for a player. FIG. 126 is a view showing the success result screen in the "second multiple-choice game". The success result screen displayed on the liquid crystal panel 7005B shown in FIG. 126 displays the message 7304 saying "success". A player is awarded a prize obtained by multiplying the default odds and the bet amount by the basic payout amount. The amount of this prize is displayed on the payout amount display portion 7008. Image data of this success result screen are stored in the image ROM 7086 (refer to FIG. 116).

Then, the liquid crystal panel 7005B displays the choice screen shown in FIG. 124 once again. As a result, the player can play the "second multiple-choice game" once again. When the choice screen of FIG. 124 is displayed again in the liquid crystal panel 7005B, the number displayed on the remaining game number display portion 7201 is decreased by 1. Alternatively, the odds displayed on the odds display portion 7302 double.

Thus, the player can play the unit games constituting the "continuous game" from the initial unit game to the final unit game so long as the game result continues to be "success" in the "second multiple-choice game".

Figure 127:
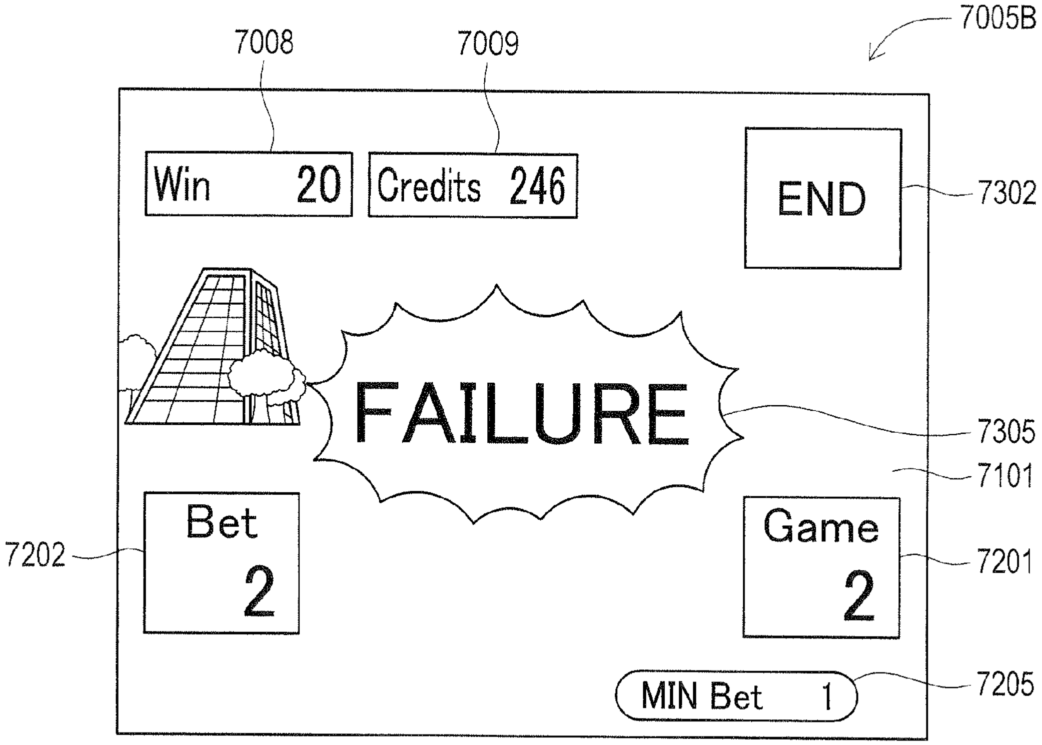

Alternatively, if the game result in the "second multiple-choice game" is "failure", the liquid crystal panel 7005B displays a result screen shown in FIG. 127 as investment failure for a player. FIG. 127 is a view showing the failure result screen in the "second multiple-choice game". The failure result screen displayed on the liquid crystal panel 7005B shown in FIG. 127 displays the message 7305 saying "failure". In this case, no prize is awarded to a player. Image data of this failure result screen are stored in the image ROM 7086 (refer to FIG. 116).

In a case the game result in the "second multiple-choice game" is "failure", the "continuous game" ends. Accordingly, there are cases that a player cannot play the unit games constituting the "continuous game up to the final unit game.

Incidentally, if the multiple-choice game executed as a unit game, only one "second multiple-choice game" is executed.

7-5. Image Effects in the Multiple-choice Game

The Seventh Embodiment

Next, image effects of the multiple-choice game will be described in detail. In the gaming machine 7001 according to the present embodiment, if the multiple-choice game starts as each of the unit games constituting the "continuous game", an image effect is executed in the liquid crystal panel 7005A simultaneously with execution of the respective unit games in the liquid crystal panel 7005B. Image differs depending on the basic payout amount and choice result in the multiple-choice game, and further, the number of times of the unit games constituting the "continuous game".

Figure 128:
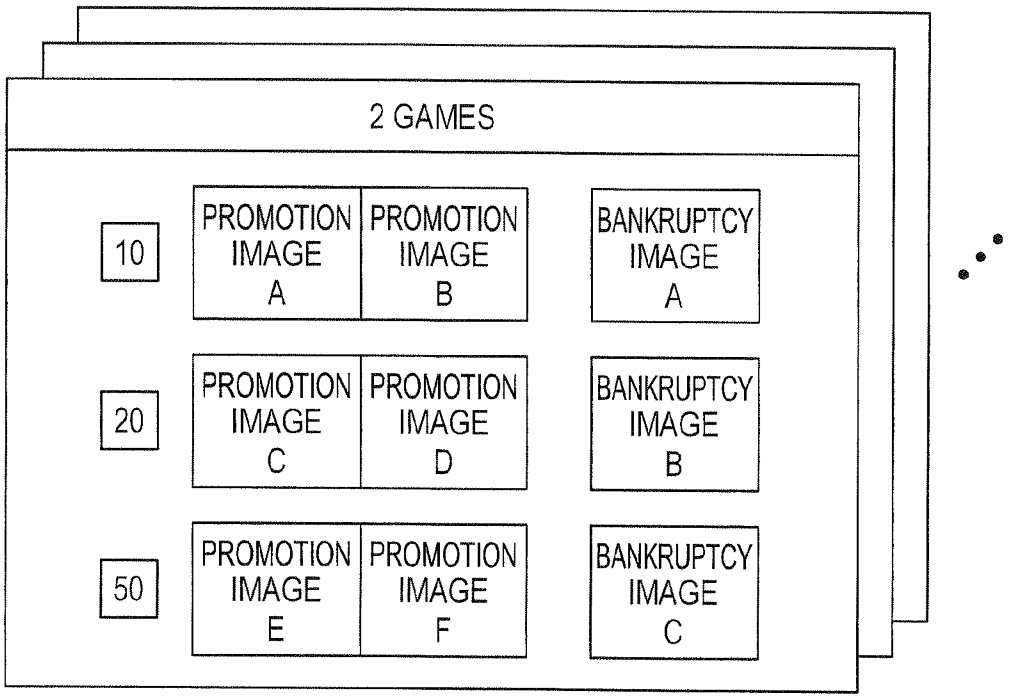

To execute such image effect, in the gaming machine 7001 according to the present embodiment, the images corresponding to each of the number of times of the unit games constituting the "continuous game" are adjusted based on a data table as shown in FIG. 128. With this, a data base is constructed.

The data table shown in FIG. 128 shows the case that the number of times of the unit games constituting the "continuous game" is "2".

If the basic payout amount is "10", in a case where the game result of the first unit game out of each of the unit games constituting the "continuous game" is "success", an image effect corresponding to a promotion image A is executed. Further, if the game result of the second unit game is "success", an image effect corresponding to a promotion image B is executed. Alternatively, if the game result of any of the unit games constituting the "continuous game" is "failure", an image effect corresponding to a bankruptcy image A is executed.

If the basic payout amount is "20", in a case where the game result of the first unit game out of each of the unit games constituting the "continuous game" is "success", an image effect corresponding to a promotion image C is executed. Further, if the game result of the second unit game is "success", an image effect corresponding to a promotion image D is executed. Alternatively, if the game result of any of the unit games constituting the "continuous game" is "failure", an image effect corresponding to a bankruptcy image B is executed.

If the basic payout amount is "50", in a case where the game result of the first unit game out of each of the unit games constituting the "continuous game" is "success", an image effect corresponding to a promotion image E is executed. Further, if the game result of the second unit game is "success", an image effect corresponding to a promotion image F is executed. Alternatively, if the game result of any of the unit games constituting the "continuous game" is "failure", an image effect corresponding to a bankruptcy image C is executed.

This data table is provided so as to correspond to the number of times of the unit games constituting the "continuous game" and is stored in the image ROM 7086 (refer to FIG. 116).

This promotion image or bankruptcy image contains differences in the contents of that image regarding promotion and bankruptcy based on the number of times of the unit games constituting the "continuous game" and the basic payout amount.

Incidentally, even in the case the multiple-choice game is executed as a unit game, an image effect is simultaneously executed in the liquid crystal panel 7005A. At this time, if the game result of the unit game is "success", an image effect corresponding to the promotion image A is executed. Alternatively, if the game result of the unit game is "failure", an image effect corresponding to the bankruptcy image A is executed. As shown in FIG. 128, the promotion image A above and the bankruptcy image A above are stored in the data table wherein the number of times of the unit games constituting the "continuous game" is "2". These images may also be stored in a data table dedicated for the unit game which is newly provided in the image ROM 7086 (refer to FIG. 116).

7-6. Operation of the Gaming Machine

The Seventh Embodiment

Figure 119:
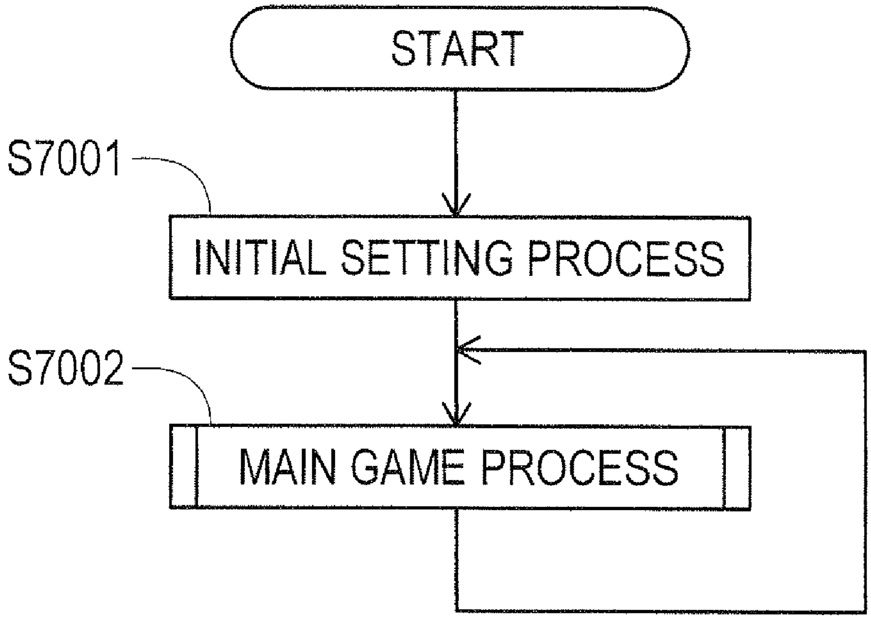
FIG. 119 is a flowchart of a main control program.

Next, a main control program executed in the gaming machine 7001 according to the present embodiment will be explained with reference to drawings. FIG. 119 is a flowchart of the main control program.

First, when a power switch is pressed (power activation), the microcomputer 7031 is started to operate, an initial setting process is executed by the microcomputer 7031 in step (abbreviated as "S") 7001. In the initialization process, BIOS stored in the ROM 7034 is executed by the main CPU 7032. Compressed data included in the BIOS are expanded to the RAM 7033, and when the BIOS expansion to the RAM 7033 is executed, a diagnosing process and initialization process of various peripheral devices are executed. Also, the game programs and the like are written from the ROM 7034 to the RAM 7033 by the main CPU 7032, so as to obtain the payout rate setting data and country ID information. Also, during execution of the initial setting process, a verification process to each program is executed.

Then in S7002, the main CPU 7032 reads out the game programs and the like from the RAM 7033, and executes the programs in sequence so as to conduct the main game process. A game is executed in the gaming machine 7001 according to the present embodiment by executing the main game process. Then, the main game process is repeated when the power is supplied to the gaming machine 7001.

Figure 120:
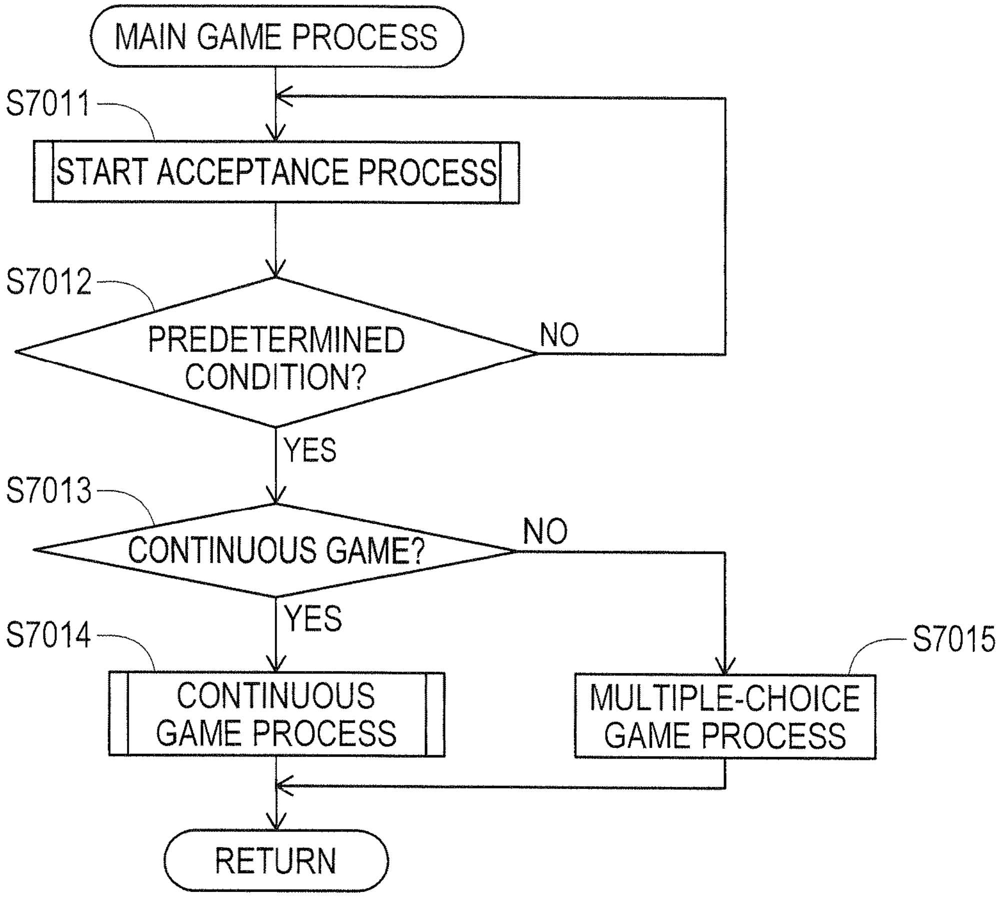

Next, a sub process of the main game process in S7002 above will be explained based on FIG. 120. FIG. 120 is a flowchart of the main game process program in the gaming machine 7001 according to the present embodiment. Incidentally, each program shown in the flowchart of FIG. 120 is stored in the ROM 7034 or the RAM 7033 of the gaming machine 7001, and is executed by the main CPU 7032.

Figure 121:
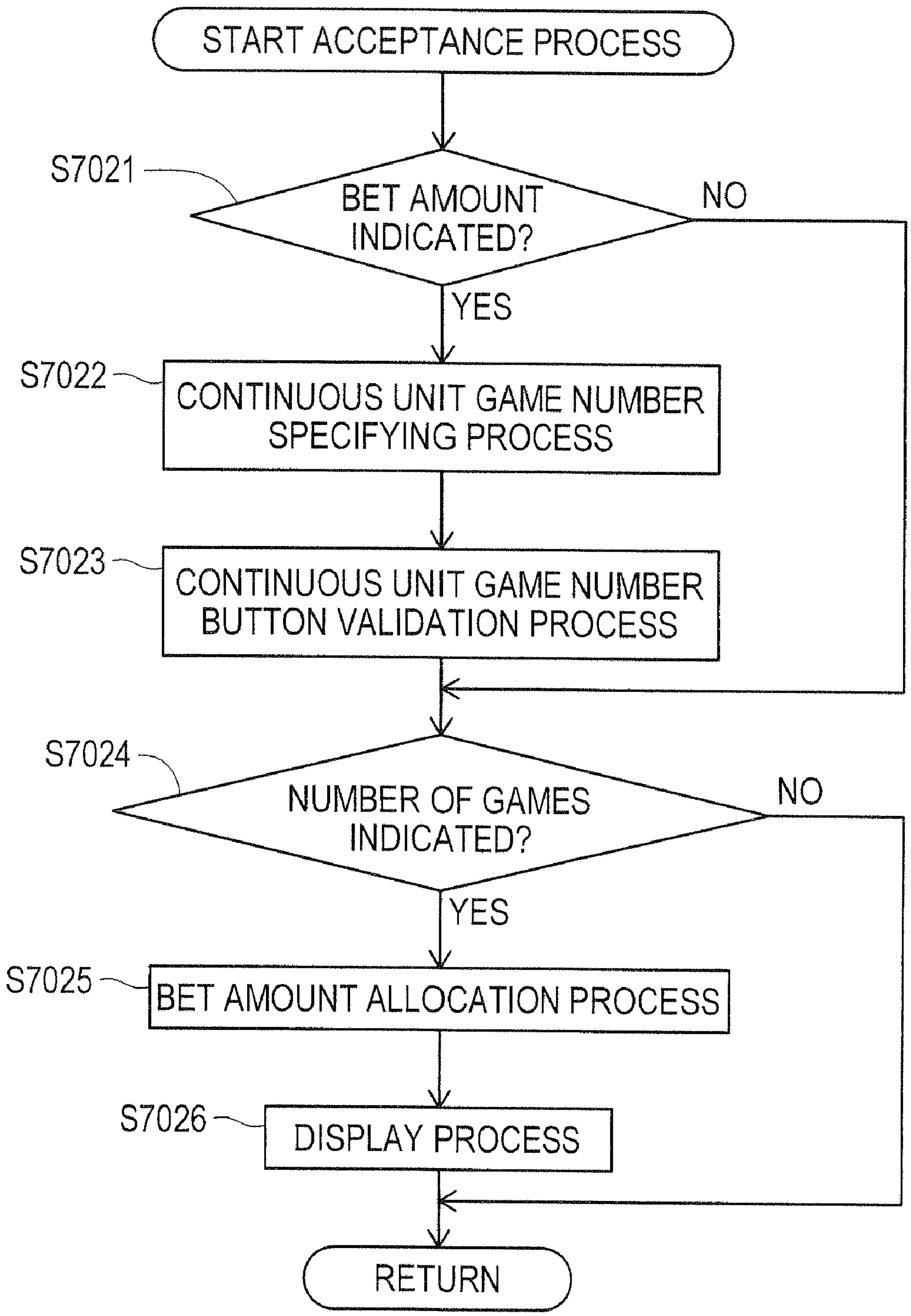

First, as shown in FIG. 120, in S7011, a start acceptance process is executed by the main CPU 7032. Then, a sub process of the start acceptance process in S7011 above will be explained based on FIG. 121. FIG. 121 is a flowchart of the start acceptance process program in the gaming machine 7001 according to the present embodiment. Incidentally, program shown in the flowchart of FIG. 121 is stored in the ROM 7034 or the RAM 7033 of the gaming machine 7001, and is executed by the main CPU 7032.

In the start acceptance process in S7011 above, the main CPU 7032 determines, in S7021, whether or not the bet amount has been indicated, as shown in FIG. 121. Here, in a case of an input signal from any of the BET 1 button 7110, BET 5 button 7131, BET 10 button 7112, BET 20 button 7113 and BET 40 button 7114, it is determined that the bet amount has been indicated. However, if the indicated amount exceeds the bet amount corresponding to the credit amount owned by a player at the moment, it is determined that no bet amount has been indicated. At this point, if no bet amount has been indicated (S7021: NO), the process proceeds to S7024 described below. In contrast, if the bet amount has been indicated (S7021: YES), the process proceeds to S7022.

In S7022, the main CPU 7032 executes a continuous unit game number specifying process. In this process, the main CPU 7032 specifies one or a plurality of "continuous games" including a number of unit games which can be indicated by a player, through the bet amount indicated in S7021 above and the minimum bet amount (in the present embodiment, the bet amount being "1") with respect to a unit game which can be set by a player.

In S7023, the main CPU 7032 executes a continuous unit game number button validation process. In this process, the main CPU 7032 accepts the player's operating the button related to the "continuous game" specified in S7022 above, with respect to the PLAY 1 GAME button 7104, PLAY 2 GAMES button 7105, PLAY 3 GAMES button 7106, PLAY 4 GAMES button 7107 and PLAY 5 GAMES button 7108.

Further, the main CPU 7032 turns on the lamp 7204 provided inside the button related to the "continuous game" specified in S7022 above, by sending a control signal to the lamp driving circuit 7203. As a result, a player is notified that the operation of that button is valid.

In S7024, the main CPU 7032 determines whether or not the number of games has been indicated. Here, with respect to the PLAY 1 GAME button 7104, PLAY 2 GAMES button 7105, PLAY 3 GAMES button 7106, PLAY 4 GAMES button 7107 and PLAY 5 GAMES button 7108, if an input signal is sent from any of the buttons which have been validated in S7023 above, it is determined that the number of games has been indicated. At this point, if the number of games has not been indicated (S7024: NO), the process proceeds to S7012 shown in FIG. 110 above. In contrast, if the number of games has been indicated (S7024: YES), the process proceeds to S7025.

Incidentally, the main CPU 7032 assigns the number of games indicated in S7024 above to the variable N, and overwrites in the RAM 7033 as number of times information. The main CPU 7032 displays the variable N stored in the RAM 7033 on the game number display portion 7201 of the liquid crystal panel 7005B by sending a control signal to the sub control board 7072.

In S7025, the main CPU 7032 executes a bet amount allocation process. In this process, the main CPU 7032 allocates the bet amount indicated in S7021 above in an equal manner to each unit game corresponding to the number of games indicated in S7024 above (refer to FIG. 117 above). As a result of this equal allocation, if a surplus occurs with respect to the bet amount indicated in S7021 above, the main CPU 7032 stores the surplus of the bet amount in the RAM 7033, as surplus information.

The main CPU 7032 stores the bet amount thus allocated in the RAM 7033, as bet allocation information. Then, the main CPU 7032 displays the bet allocation information (the bet amount which is evenly allocated to each unit game) which is stored in the RAM 7033 on the bet amount display portion 7202 of the liquid crystal panel 7005B, by sending a control signal to the sub control board 7072. Then, the process proceeds to S7012 shown in FIG. 120 above.

Returning to FIG. 120, in S7012, the main CPU 7032 determines whether or not a predetermined condition is met.

Here, the predetermined condition is that the START button 7115 is depressed. Accordingly, this determination is made based on a signal which is input to the main CPU 7032 depending on depressing the START button 7115. At this point, if the START button 7115 is not depressed (S7012: NO), the process returns to the start acceptance process (S7011) again. Thereby, an operation of changing the bet amount, an operation of changing the number of games and the like are possible. In contrast, if the START button 7115 is depressed (S7012: YES), the process proceeds to S7013.

However, before the main CPU 7032 executes a process in S7013, the main CPU 7032 executes each of the following processes. First, the bet amount set based on the above bet operation is reduced from the credit amount owned by the player at the moment. Incidentally, the credit amount after the reduction is stored in the RAM 7033 as credit information. Then, by sending a control signal to the display portion driving circuit 7067, the main CPU 7032 displays the credit information (the credit amount after the above reduction) stored in the RAM 7033 on the credit amount display portion 7009 of the liquid crystal panel 7005B.

The main CPU 7032 includes the surplus information (the surplus of the bet amount which occurred in the allocation process of S7025 above) stored in the RAM 7033 to the credit information stored in the RAM 7033, at a rate of 1 credit for 1 bet. Then, by sending a control signal to the display portion driving circuit 7067, the main CPU 7032 displays the credit information (the credit amount after the above addition) stored in the RAM 7033 on the credit amount display portion 7009 of the liquid crystal panel 7005B. Further, the main CPU 7032 overwrites "0" in the RAM 7033, as the surplus information.

Further, the main CPU 7032 invalidates the operation with respect to all buttons including the PLAY 1 GAME button 7104, PLAY 2 GAMES button 7105, PLAY 3 GAMES button 7106, PLAY 4 GAMES button 7107 and PLAY 5 GAMES button 7108. Simultaneously, by sending a control signal to the lamp driving circuit 7203, the main CPU 7032 turns off the lamp 7204 provided inside each of the buttons 7104 to 7108.

In S7013, the main CPU 7032 determines whether or not a continuous game has been realized. At this time, the number of times of the unit games constituting the "continuous game" coincides with the variable N. Accordingly, the main CPU 7032 determines that the "continuous game" has been realized if the variable N is greater than "1". At this point, if the "continuous game" has not been realized (S7013: NO), the process proceeds to S7015 described later. In contrast, if the "continuous game" has been realized (S7013: YES), the process proceeds to S7014.

Figure 130:
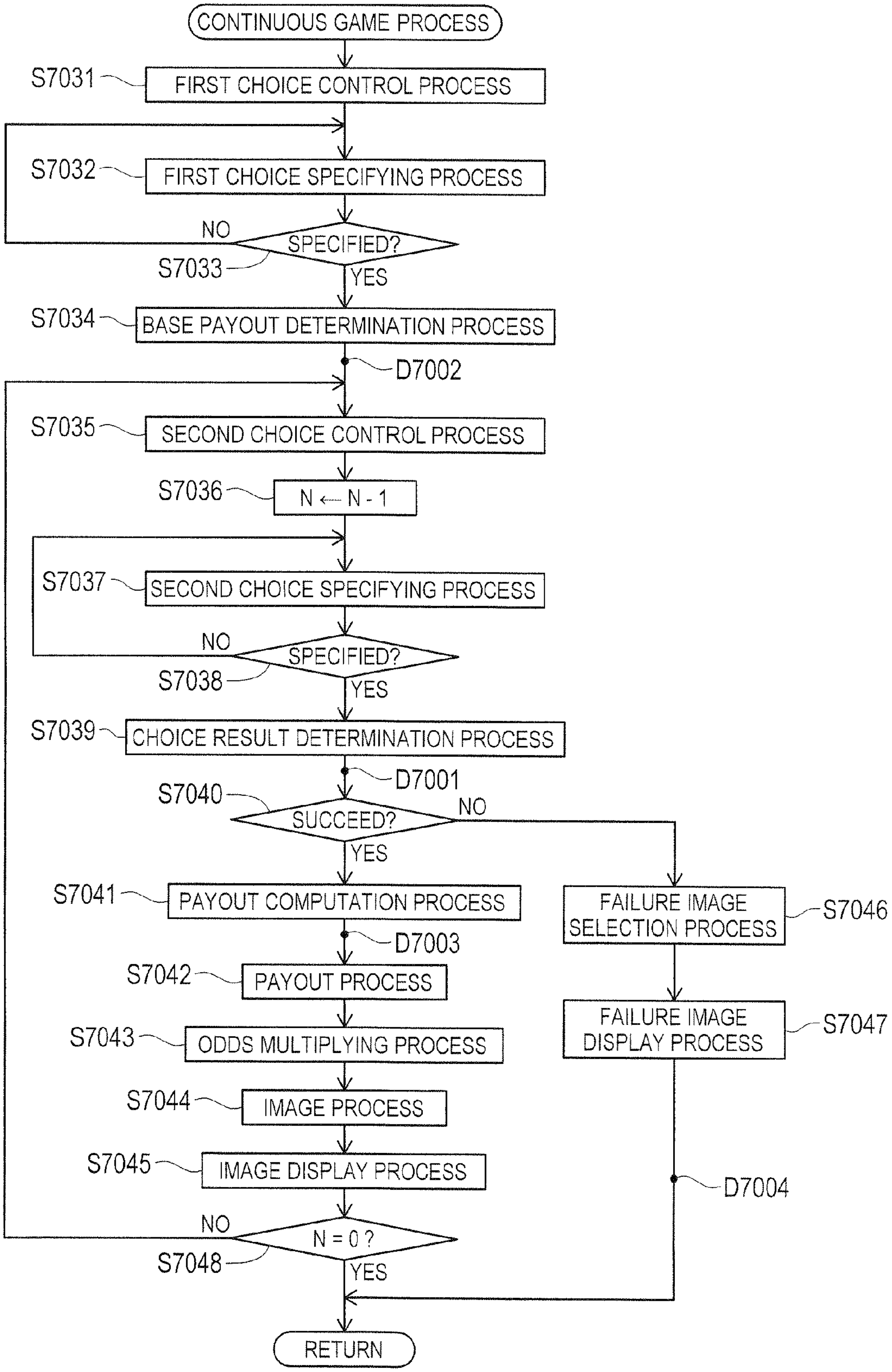

In S7014, the main CPU 7032 executes a continuous game process. Then, a sub process of the continuous game process in S7014 above will be explained based on FIG. 1301. FIG. 130 is a flowchart of the continuous game process program in the gaming machine 7001 according to the present embodiment. Incidentally, program shown in the flowchart of FIG. 130 is stored in the ROM 7034 or the RAM 7033 of the gaming machine 7001, and is executed by the main CPU 7032.

In the continuous game process in S7014 above, as shown in FIG. 130, the main CPU 7032 executes a first choice control process in S7031. In this process, the main CPU 7032 displays the choice screen in FIG. 122 above on the liquid crystal panel 7005B by sending a control signal to the sub control board 7072.

Further, the main CPU 7032 assigns one number value out of "0", "10", "20" and "50" with respect to the respective choices 7301A, 7301B, 7301C, 7301D and 7301E on the choice screen in FIG. 122 above. This assignment is made using a data table as shown in FIG. 123. Such data table is stored in the ROM 7034 and the like.

In the data table shown in FIG. 123, the respective random number values in the range "0" through "255" are associated with any one number value out of "0", "10", "20" and "50". Accordingly, the main CPU 7032 chooses the random numbers respectively corresponding to the respective choices 7301A, 7301B, 7301C, 7301D and 7301E on the choice screen in FIG. 122 above out of the number value range "0 to 255" by using the sampling circuit 7036. Then, the main CPU 7032 determines the assigned number values for the respective choices 7301A, 7301B, 7301C, 7301D and 7301E on the choice screen in FIG. 122 above based on the five random numbers thus chosen while referring to the data table shown in FIG. 123.

Incidentally, with respect to this determination, the main CPU 7032 may change the assigned number values for the respective choices 7301A, 7301B, 7301C, 7301D and 7301E on the choice screen in FIG. 122 above, in accordance with the bet amount corresponding to the bet allocation information stored in the RAM 7033. For instance, if the bet amount corresponding to the bet allocation information is equal to or above a predetermined number, the main CPU 7032 sets all assigned number values for the respective choices 7301A, 7301B, 7301C, 7301D and 7301E on the choice screen in FIG. 122 above to "50".

In S7032, the main CPU 7032 executes a first choice specifying process. In this process, the main CPU 7032 specifies the choice made by a player out of the choices 7301A, 7301B, 7301C, 7301D and 7301E on the choice screen in FIG. 122 above. This specifying process is executed by determining whether or not a player touched the respective choices 7301A, 7301B, 7301C, 7301D and 7301E on the choice screen in the FIG. 122 above, based on a coordinate signal from the touch panel 101.

In S7033, the main CPU 7032 is in stand-by until the specifying process in S7032 above is executed (S7033: NO). Once the specifying process in S7032 above is executed (S7033: YES), the process proceeds to S7034.

In S7034, the main CPU 7032 executes a base payout determination process. In this process, the main CPU 7032 sets the number value assigned to the choice which was specified in S7032 above out of the respective choices 7301A, 7301B, 7301C, 7301D and 7301E on the choice screen in FIG. 122 above to the basic payout amount.

In S7035, the main CPU 7032 executes a second choice control process. In this process, the main CPU 7032 displays the choice screen in FIG. 124 above on the liquid crystal panel 7005B by sending a control signal to the sub control board 7072.

Further, the main CPU 7032 assigns either a "success" choice result or a "failure" choice result with respect to the respective choices 7303A and 7303B on the choice screen in FIG. 124 above. This assignment is executed by using a data table as shown in FIG. 125. Incidentally, such data table is stored in the ROM 7034 and the like.

In the data table shown in FIG. 125, the respective random number values in the range "0" through "255" are associated with either the "success" choice result or "failure" choice result. Accordingly, the main CPU 7032 chooses the random numbers respectively corresponding to the respective choices 7303A and 7303B on the choice screen shown in FIG. 124 above out of the number value range "0 to 255" by using the sampling circuit 7036. Then, the main CPU 7032 determines the choice results to be assigned to the respective choices 7303A and 7303B on the choice screen shown in FIG. 124 above based on the 2 random numbers thus chosen, by referring to the data table shown in FIG. 125 above.

In S7036, the main CPU 7032 decrements the variable N. Then, the main CPU 7032 displays the variable N thus stored in the RAM 7033 on the remaining game number display portion 7201 of the liquid crystal panel 7005B by sending a control signal to the sub control board 7072.

In S7037, the main CPU 7032 executes a second choice specifying process. In this process, the main CPU 7032 specifies the choice made by a player out of the respective choices 7303A and 7303B on the choice screen in FIG. 124 above. This specifying process is executed by determining whether or not a player touched the respective choices 7303A and 7303B on the choice screen in FIG. 124 above, based on a coordinate signal from the touch panel 7101.

In S7038, the main CPU 7032 is in stand-by until the specifying process in S7037 above is executed (S7038: NO). Once the specifying process in S7037 above is executed (S7038: YES), the process proceeds to S7039.

In S7039, the main CPU 7032 executes a choice result determination process. In this process, the main CPU 7032 determines the player's choice result as "success" or "failure", based on the choice results assigned to the choice that was specified in S7037 above out of the respective choices 7303A and 7303B displayed on the choice screen in FIG. 124 above.

Further, the main CPU 7032 displays the result screen (the success result screen in FIG. 126 above or the failure result screen in FIG. 127 above) in accordance with the player's choice results on the liquid crystal panel 7005B by sending a control signal to the sub control board 7072.

In S7040, the main CPU 7032 determines whether or not the choice result determined in S7039 above is "success". At this point, if the choice result is "failure" (S7040: NO), the process proceeds to S7046 described below. In contrast, if the choice result is "success" (S7040: YES), the process proceeds to S7041.

In S7041, the main CPU 7032 executes a payout computation process. In this process, the main CPU 7032 computes an amount obtained by multiplying the bet amount and an odds value including in odds information described below by the basic payout amount determined in S7034 above. Incidentally, this bet amount is stored as bet allocation information in the RAM 7033. Further, the main CPU 7032 stores the amount thus computed in the RAM 7033 as payout information. At the same time, the main CPU 7032 displays the amount thus computed on the payout amount display portion 7008 of the liquid crystal panel 7005B by sending a control signal to the display portion driving circuit 7067.

Then, the main CPU 7032 executes a payout process in S7042. In the payout process, the computed amount in S7041 above is paid out to the player based on the payout information stored in the RAM 7033.

When the pay out is executed, the credit amount stored in the RAM 7033 as the payout information (the payout amount awarded to a player in a unit game) are added to the credit amount stored in the RAM 7033 as the credit information, and the added value is overwritten in the RAM 7033 as the credit information. After that, by sending a control signal to the display portion driving circuit 67, the main CPU 7032 displays the credit information stored in the RAM 7033 (the added value computed in S7042) on the credit amount display portion 7009 of the liquid crystal panel 7005B.

Incidentally, in the payout process, the credit amount owned by a player at the moment may be paid out by coins corresponding to the credit amount (one credit equals to one coin) based on the player's depressing the CASHOUT button 7102, or may also be paid out by a ticket with a bar code which is printed by the ticket printer 7014.

Then, after the main CPU 7032 executes the above-mentioned payout process in S7042, the process proceeds to S7043.

In S7043, the main CPU 7032 executes an odds multiplying process. In this process, the main CPU 7032 doubles the odds value stored as the odds information in the RAM 7033. The default value for the odds value (default odds) stored as the odds information in the RAM 7033 is "X2". Further, the main CPU 7032 displays the odds value stored as the odds information on the odds display portion 7302 by sending a control signal to the sub control board 7072.

In S7044, the main CPU 7032 executes an image process. In this process, the main CPU 7032 selects the promotion image to be used for the image effect in this unit game from the data base constructed in the image ROM 7086 (refer to FIG. 116), based on the number of times information stored in the RAM 7033, the variable N and the choice result ("success") determined in S7039 above. This selection is executed by the main CPU 7032, by sending a control signal to the sub control board 7072.

In S7045, the main CPU 7032 executes an image display process. In this process, the main CPU 7032 displays the promotion image selected in S7044 above on the liquid crystal panel 7005A by sending a control signal to the sub control board 7072. Then, the process proceeds to S7048.

In S7048, the main CPU 7032 determines whether or not the variable N is "0". At this point, if the variable N is other than "0" (S7048: NO), the process reverts to S7035 described above. As a result, the unit game with respect to which the bet amount allocated in S7025 above was designated is repeated, whereby the "continuous game" is continued. In contrast, if the variable N is "0" (S7048: YES), the process reverts to S7011 in FIG. 120 above. As a result, this helps avoid repetition of the unit game by the number of times exceeding the number of games indicated in S7024 above. Further, in reverting the process to S7011 in FIG. 120 above, the main CPU 7032 overwrites "0" in the RAM 7033 as the bet allocation information, and at the same time, displays "0" on the bet amount display portion 202 of the liquid crystal panel 7005B by sending a control signal to the sub control board 7072. Further, the odds value stored as the odds information in the RAM 7033 is reset to the default value (default odds).

Alternatively, if the choice result is "failure" in S7040 above (S7040: NO), the process proceeds to S7046. In S7046, the main CPU 7032 executes a failure image selection process. In this process, the main CPU 7032 selects the bankruptcy image which is used as the image effect in this unit game from the data base constructed in the image ROM 7086 (refer to FIG. 116), based on the number of times information stored in the RAM 7033, the variable N and the choice result (failure) determined in S7039 above. This selection is executed by the main CPU 7032 by sending a control signal to the sub control board 7072.

In S7047, the main CPU 7032 executes a failure image display process. In this process, the main CPU 7032 displays the bankruptcy image selected in S7046 above on the liquid crystal panel 7005A by sending a control signal to the sub control board 7072. Then, the process reverts to S7011 in FIG. 120 above. As a result, this "continuous game" is ended even if the unit game has not been repeated till the number of times indicated in S7024 above. Further, in reverting the process to S7011 in FIG. 120 above, the main CPU 7032 overwrites "0" in the RAM 7033 as the bet allocation information, and at the same time, displays "0" on the bet amount display portion 7202 of the liquid crystal panel 7005B by sending a control signal to the sub control board 7072. Further, the odds value stored as the odds information in the RAM 7033 is reset to the default value (default odds).

Returning to FIG. 120, if the "continuous game" has not been realized in S7013 above (S7013: NO), the process proceeds to S7015. In S7015, the main CPU 7032 executes a multiple-choice game process. In this process, the main CPU 7032 executes the continuous game process shown in FIG. 130, starting from S7035. The variable N at this time is "1", so only one "second multiple-choice game" is executed.

7-7. Progressive Jackpot

The Seventh Embodiment

However, in the gaming machine 7001 according to the present embodiment, if the multi-choice game is started as the unit games constituting the "continuous game", a standalone type progressive jackpot can be provided. Next, a description will be given concerning the standalone type progressive jackpot which is realized in the gaming machine 7001 according to the present embodiment.

In the gaming machine 7001 according to the present embodiment, first, the main CPU 7032 executes a continuous game process program shown in FIG. 132 at a point in time D7002 placed between S7034 and S7035 of the continuous game process program shown in FIG. 130 above. Incidentally, the program shown in the flowchart of FIG. 132 is stored in the ROM 7034 and the RAM 7033 of the gaming machine 7001, and is executed by the main CPU 7032.

After executing the base payout determination process in S7034 of the continuous game process program in FIG. 130 above, the main CPU 7032 executes the number-of-success random determination process in S7061 of FIG. 132. In this process, the main CPU 7032 determines at random the number of times of a game result which shows "success" out of the number of times of the unit games constituting this "continuous game".

In S7062, the main CPU 7032 executes a maximum payout pre-computation process. In this process, the main CPU 7032 computes in advance the maximum payout amount which a player can acquire in the "continuous game", based on the number of times of the game results that are determined "success" in S7061 above, the basic payout amount determined in S7034 of FIG. 130 above, the odds which are doubled in S7044 of FIG. 130 above and the bet amount including in the bet allocation information stored in RAM 7033 (the bet amount which was evenly allocated to the respective unit games constituting the "continuous game").

More specifically, the number of times determined in S7061 above is assumed to be "3", the basic payout amount is assumed to be "50" and the bet amount is assumed to be "2", for instance.

In the first unit game constituting the "continuous game", the odds are "X2" of the default odds. So, the payout amount which is computed as "basic payout amount X bet amount X odds" is "200" (which equals: "50"×"2"×"2"). In the second unit game, the odds are "X4" which doubles the default odds. So, the payout amount which is computes as "basic payout amount X bet amount X odds" is "400" (which equals: "50"×"2"×"4"). In the third unit game, the odds are "X8". So, the payout amount which is computes as "basic payout amount X bet amount X odds" is "800" (which equals: "50"×"2"×"8"). Accordingly, the maximum payout amount which can be acquired by a player in the "continuous game" is "1400" which is a sum of the payout amounts in the respective unit games including the first, the second and the third unit games (which equals: "200"+"400"+"800").

Then, in S7063, the main CPU 7032 executes a mystery jackpot process. In this process, the main CPU 7032 determines at random whether or not the jackpot is won. At this point, if it is determined that the jackpot is lost (S7063: No), the process proceeds to S7035 of FIG. 130 above, without any other processes being executed.

In contrast, if it is determined the jackpot is won (S7063: Yes), the entire jackpot award amount provided in the RAM 7033 is awarded to a player. At this time, the main CPU 7032 displays a jackpot winning screen on the liquid crystal panel 7005B by sending a control signal to the sub control board 7072. FIG. 135 is a view showing a jackpot winning screen. The jackpot winning screen displayed on the liquid crystal panel 7005B shown in FIG. 135 above displays a message 306 saying "JACKPOT!!". Further, the main CPU 7032 adds the entire jackpot award amount to the credit amount stored in the RAM 7033 as the credit information and overwrites the adding value in the RAM 7033 as the credit information. Then, the main CPU 7032 displays the credit information stored in the RAM 7033 (the added value computed in S7063) on the credit amount display portion 7009 of the liquid crystal panel 7005B by sending a control signal to the display portion driving circuit 7067. Further, the main CPU 7032 resets the jackpot award amount stored in the RAM 7033 to "0". Then, the process proceeds to S7035 of FIG. 130 above.

In the gaming machine 7001 according to the present embodiment, the main CPU 7032 executes a continuous game process program shown in FIG. 133 at a point in time D7003 placed between S7041 and S7042 of the continuous game process program shown in FIG. 130 above. Incidentally, the program shown in the flowchart of FIG. 133 is stored in the ROM 7034 and the RAM 7033 of the gaming machine 7001, and is executed by the main CPU 7032.

After executing the payout calculation process in S7041 of the continuous game process program in FIG. 130 above, in S7071 of FIG. 133, the main CPU 7032 determines whether or not the total payout amount acquired by the player until present in this "continuous game" has exceeded the maximum payout amount computed in advance in S7062 of FIG. 132 above. Here, "the total payout amount acquired by the player until present in this "continuous game"" represents the total amount of the computed payout amount in S7041 of FIG. 130 above which obtained until present in this "continuous game". At this point, if the total payout amount acquired by the player until present in this "continuous game" has not exceed the maximum payout amount above (S7071: NO), the process proceeds to S7042 of FIG. 130 above. In contrast, if the total payout amount acquired by the player until present in this "continuous game" has exceeded the maximum payout amount above (S7071: YES), the process proceeds to S7072.

In S7072, the main CPU 7032 executes a failure forced changing process. In this process, the main CPU 7032 forcibly changes the choice result determined in S7039 of FIG. 130 above from "success" to "failure".

In S7073, the main CPU 7032 executes a failure image process. In this process, the main CPU 7032 selects the bankruptcy image used in the image effect of this unit game from the data base constructed in the image ROM 7086 (refer to FIG. 116) based on the number of times information stored in RAM 7033, the variable N and the choice result ("failure") which was forcibly changed in S7072 above. The main CPU 7032 executes this selection by sending a control signal to the sub control board 7072.

In S7074, the main CPU 7032 executes a failure image display process. In this process, the main CPU 7032 displays the bankruptcy image selected in S7073 above on the liquid crystal panel 7005A by sending a control signal to the sub control board 7072.

In S7075, the main CPU 7032 executes a difference computation process. In this process, the main CPU 7032 computes the difference amount between the maximum payout amount computed in advance in S7062 of FIG. 132 above and the total payout amount acquired by the player until present in this "continuous game". Here, "the total payout amount acquired by the player until present in this "continuous game"" represents the total amount of the computed payout amount in S7041 of FIG. 130 above which obtained until present in this "continuous game".

In S7076, the main CPU 7032 executes a jackpot award inclusion process. In this process, the main CPU 7032 includes the difference amount computed in S7075 above in the jackpot award amount provided in the RAM 7033. Then, after the continuous game process program in FIG. 133 and the continuous game process program in FIG. 130 above have ended, the process reverts to S7011 of FIG. 120 above. Incidentally, in reverting to S7011 of FIG. 120 above, the main CPU 7032 overwrites "0" in the RAM 7033 as the bet allocation information and at the same time, displays "0" on the bet amount display portion 7202 of the liquid crystal panel 7005B by sending a control signal to the sub control board 7072. Further, the odds value stored as the odds information in the RAM 7033 is reset to the default value (default odds).

In the gaming machine 7001 according to the present embodiment, the main CPU 7032 executes a continuous game process program shown in FIG. 134 at a point in time D7004 placed immediately after S7047 of the continuous game process program shown in FIG. 130 above. Incidentally, the program shown in the flowchart of FIG. 134 is stored in the ROM 7034 and the RAM 7033 of the gaming machine 7001, and is executed by the main CPU 7032.

After executing the failure image display process in S7047 of the continuous game process program in FIG. 130 above, the main CPU 7032 executes a difference computation process in S7081 of FIG. 134. In this process, the main CPU 7032 computes the difference amount between the maximum payout amount computed in advance in S7062 of FIG. 132 above and the total payout amount acquired by the player until present in the "continuous game". Here, the "total payout amount acquired by the player until the present in the "continuous game"" represents the total amount of the payout computed in S7041 of FIG. 130 above that was obtained until present in the "continuous game".

In S7082, the main CPU 7032 executes a jackpot award inclusion process. In this process, the main CPU 7032 includes the difference amount computed in S7081 above in the jackpot award amount provided in the RAM 7033. Then, after the continuous game process program in FIG. 134 and the continuous game process program in FIG. 130 above have ended, the process reverts to S7011 of FIG. 120 above. Incidentally, in reverting to S7011 of FIG. 120 above, the main CPU 7032 overwrites "0" in the RAM 7033 as the bet allocation information and at the same time, displays "0" on the bet amount display portion 7202 of the liquid crystal panel 7005B by sending a control signal to the sub control board 7072, as is the case with the continuous game process program shown in FIG. 130 above. Further, the odds value stored as the odds information in the RAM 7033 is reset to the default value (default odds).

7-8. Other

The Seventh Embodiment

The present invention is not limited to the above-described seventh embodiment, and various modifications and alterations can be made thereto without departing from the spirit of the invention.

For instance, the bet amount with respect to the "continuous game" indicated by a player may be allocated at random to each unit game constituting the "continuous game" indicated by the player. More specifically, as shown in FIG. 118, for instance, the bet amount with respect to the "continuous game" indicated by a player is assumed to be "23", while the number of times of the unit games constituting the "continuous game" indicated by the player is assumed to be "5".

Figure 118:
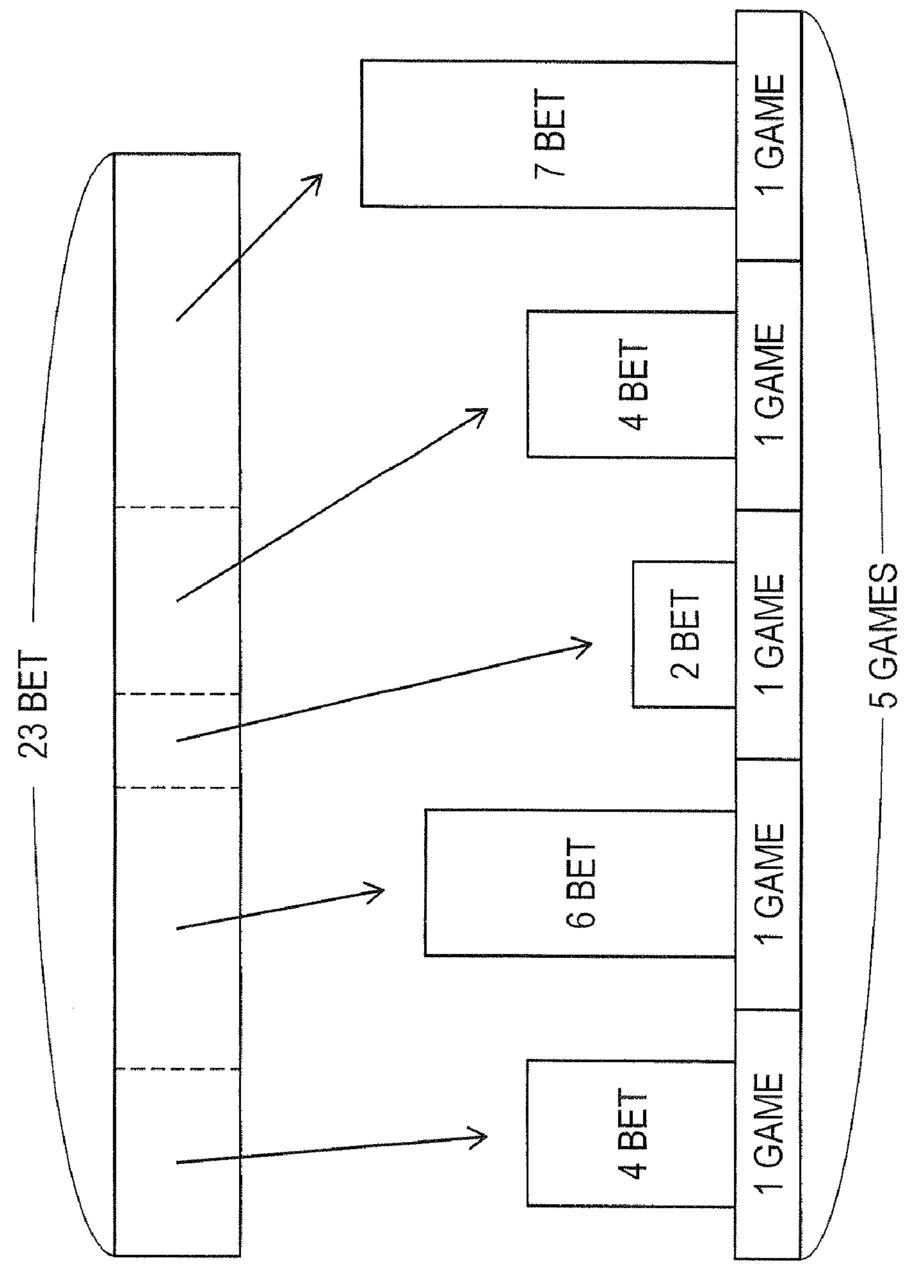
FIG. 118 is a view showing characteristics of the gaming machine.

In the case shown in FIG. 118, the bet amount is respectively allocated to five unit games constituting the "continuous game" indicated by the player, in the order "4", "6", "2", "4" and "7".

Incidentally, if the bet amount with respect to the "continuous game" indicated by a player is allocated at random to each unit game constituting the "continuous game" indicated by the player, the main CPU 7032 performs control so that the bet amount allocated with respect to the unit games during execution thereof is updated and stored in the bet allocation information, with each execution of the unit games constituting the "continuous game" indicated by the player. Further, the main CPU 7032 performs control so that the bet allocation information thus updated and stored is displayed on the bet amount display portion 7202 of the liquid crystal panel 7005B, by sending a control signal to the sub control board 7072, with each execution of the unit games constituting the "continuous game" indicated by the player.

A surplus of the bet amount may occur as a result of the above-mentioned random allocation thereof. Alternatively, as shown in FIG. 118, this random allocation of the bet amount may be adjusted so as to prevent occurrence of a surplus of the bet amount.

Figure 129:
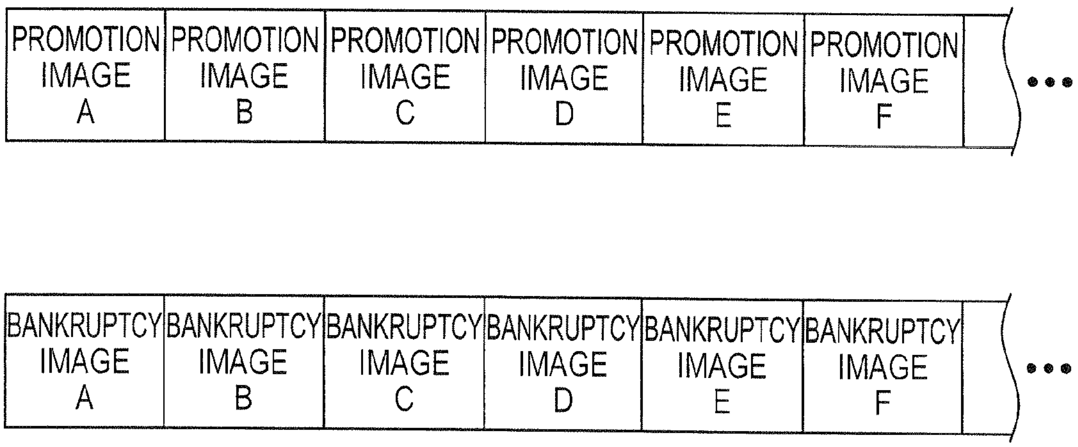

In the gaming machine 7001 according to the present embodiment, the promotion image and the bankruptcy image employed for the effect images in the "second multiple-choice game" may be selected upon being displayed on the liquid crystal panel 7005A on a case-by-case basis. Thus, for instance, a promotion image group and a bankruptcy image group may be stored in the image ROM 7086 (refer to FIG. 116) as shown in the data table in FIG. 129. The promotion image group is made up of a plurality of promotion images including the promotion image A, the promotion image B, the promotion image C, the promotion image D, the promotion image E and the promotion image F, . . . , etc. The bankruptcy image group is made up of a plurality of bankruptcy images including the bankruptcy image A, the bankruptcy image B, the bankruptcy image C, the bankruptcy image D, the bankruptcy image E and the bankruptcy image F, . . . , etc.

Then, in the image process in S7044 of FIG. 130 above, the main CPU 7032 selects the promotion image to be used for the image effect in this unit game from the promotion image group stored in the image ROM 7086 (refer to FIG. 116), based on the number of times information stored in the RAM 7033, the variable N and the choice result ("success") determined in S7039 above. Alternatively, in the image process in S7046 of FIG. 130 above, the main CPU 7032 selects the bankruptcy image to be used for the image effect in this unit game from the bankruptcy image group stored in the image ROM 7086 (refer to FIG. 116), based on the number of times information stored in the RAM 7033, the variable N and the choice result ("failure") determined in S7039 above.

In the gaming machine 7001 according to the present embodiment, in a case that a standalone type progressive jackpot is not provided, if a predetermined condition is met, control may be executed so that the player's choice result in the "second multiple-choice game" is forcibly "success" or "failure".

Figure 131:
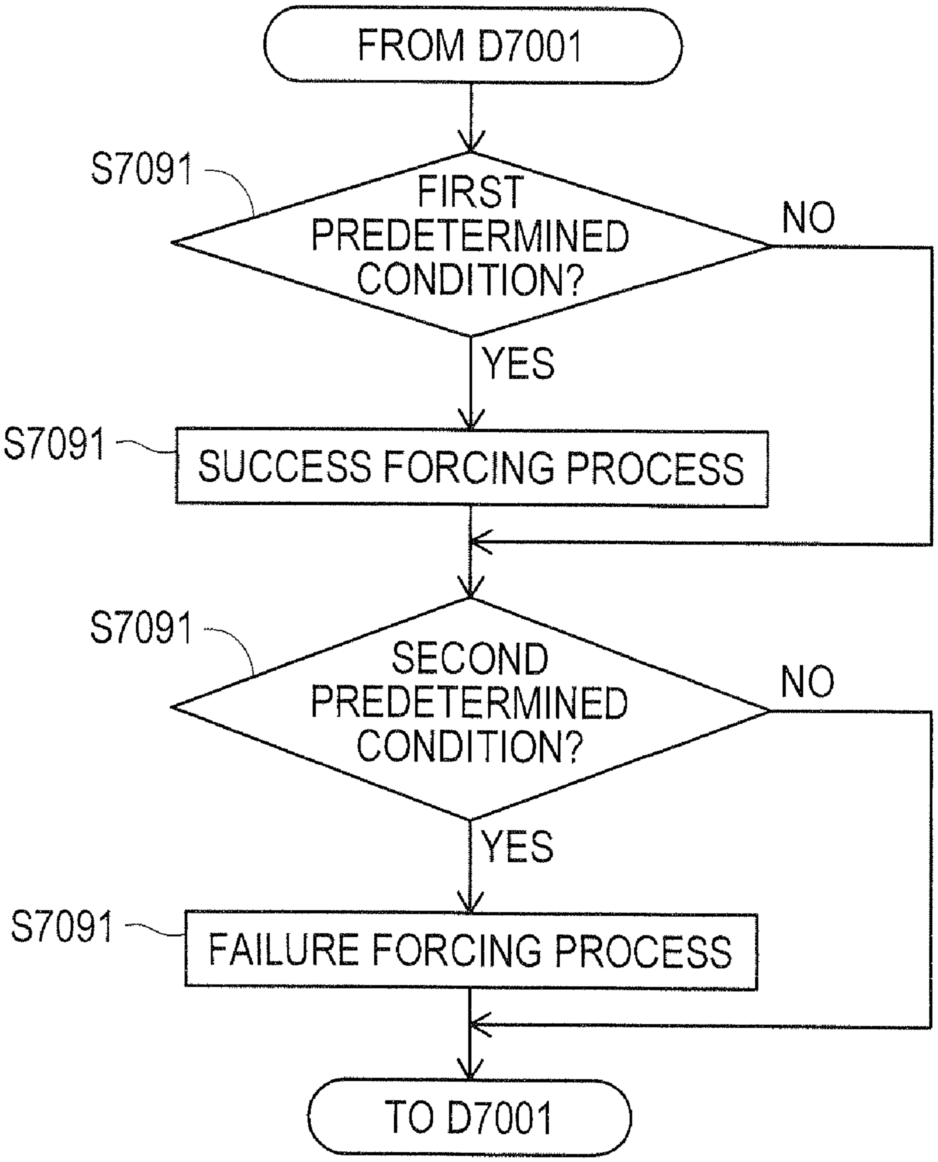

For that purpose, in the gaming machine 7001 according to the present embodiment, the main CPU 7032 executes a continuous game process program shown in FIG. 131 at a point in time D7001 placed between S7039 and S7040 of the continuous game process program shown in FIG. 130 above. Incidentally, the program shown in the flowchart of FIG. 131 is stored in the ROM 7034 and the RAM 7033 of the gaming machine 7001, and is executed by the main CPU 7032.

After executing the choice result determination process in S7039 of the continuous game process program in FIG. 130 above, the main CPU 7032 executes the process of S7091 in FIG. 131. In this process, the main CPU 7032 determines whether or not the first predetermined condition is met. At this point, if the first predetermined condition is not met (S7091: NO), the process proceeds to S7093 described below. In contrast, if the first predetermined condition is met (S7091: YES), the process proceeds to S7092.

In S7092, the main CPU 7032 executes a success forcing process. In this process, the main CPU 7032 maintains or changes the choice result determined in S7039 of FIG. 130 above to "success". Then, the process proceeds to S7093.

In S7093, the main CPU 7032 determines whether or not the second predetermined condition is met. At this point, if the second predetermined condition is not met (S7093: NO), the process proceeds to S7040 of FIG. 130 above. In contrast, if the second predetermined condition is met (S7093: YES), the process proceeds to S7094.

In S7094, the main CPU 7032 executes a failure forcing process. In this process, the main CPU 7032 maintains or changes the choice result determined in S7039 of FIG. 130 above to "failure". Then, the process proceeds to S7040 of FIG. 130 above.

8-1. Characteristics of the Present Invention

The Eighth Embodiment

Next, the eighth embodiment of the present invention, as applied to a slot machine which is one example of a gaming machine of the present invention, will be described while referring to the accompanying drawings.

A game which is executed in the slot machine of the present embodiment is constituted of a slot game in which scatter symbols are employed.

In the slot game, as shown in FIG. 151 and FIG. 152, a symbol display frame 8111 displaying nine symbols is displayed on the well-known liquid crystal panel 8005B. The nine symbols are arranged in a matrix comprising three rows by three columns. In this respect, within the symbol display frame 8111, nine symbol display areas, where one of many symbols drawn on a reel band of one video reel is arranged, are positioned like a matrix comprising three rows by three columns. That is, one symbol display area is assigned to each of the nine video reels. Then, one of the symbols drawn on the reel band of each video reels is arranged in each of the symbol display areas.

In the meantime, as shown in FIG. 149, various winning combinations are previously determined based on the number of the same scatter symbol. When each of the video reels is scrolled and stopped, a symbol is rearranged one by one in each of the symbol display areas of the symbol display frame 8111, as the liquid crystal panel 8005B shown in FIG. 151 and FIG. 152. At this time, when the nine symbols that are rearranged in the symbol display frame 8111 compose any one of the winning combinations, the payout amount corresponding to the winning combination composed is displayed in a payout amount display portion 8008. With this, a unit game is configured.

Incidentally, for convenience of the description, a unit game may be described as a slot game.

In the slot machine 1 of the present embodiment, the player can indicate that a unit game will be executed continuously by a predetermined number of times such as "1", "5", "10" and the like. A group of unit games which the player indicated as a continuous play corresponds to a "continuous game". This indication is made by operating a plurality of buttons which are respectively provided in accordance with the number of times of the unit games constituting the "continuous game" (refer to FIG. 138).

The player can indicate the bet amount, such as "1", "5", "10" and the like, with respect to the "continuous game". This indication is made by operating a plurality of buttons which are respectively provided in accordance with the bet amount (refer to FIG. 138).

In this respect, in the slot machine 1 of the present embodiment, once the player indicates the bet amount with respect to the "continuous game", one or a plurality of "continuous games" including unit games that are executed by the number of times which can be indicated by the player is specified through the bet amount with respect to the "continuous game" indicated by the player and the minimum bet amount with respect to a unit game which can be set by the player (in the present embodiment, the bet amount being "1"). Thereafter, the operation with respect to all buttons corresponding to the "continuous game" thus specified is validated.

The player operates any of the buttons thus validated, whereby the "continuous game", which is constituted of unit games executed by the number of times indicated by the player through the above-mentioned operation, is executed.

The bet amount with respect to the "continuous game" indicated by the player is evenly allocated to each unit game constituting the "continuous game" indicated by the player. More specifically, as shown in FIG. 141, for instance, the bet amount with respect to the "continuous game" indicated by the player is assumed to be "23", and the number of times for the unit games constituting the "continuous game" indicated by the player is assumed to be "5". In this case, the bet amount "4" is evenly allocated with respect to each unit game constituting the "continuous game" indicated by the player.

Incidentally, the bet amount which was left after the bet amount has been evenly allocated with respect to each unit game constituting the "continuous game" is returned to the player. In the case of FIG. 141, the bet amount "3" is returned to the player.

Thereafter, once the "continuous game" starts, each of the unit games constituting the "continuous game" is executed by auto-play.

In the slot machine 8001 according to the present embodiment, a player operates the button for indicating the bet amount. Then, the player simultaneously operates a predetermined button and the button through which the player instructs continuous execution of a predetermined number of times of unit games, whereby the following game is executed. A detailed description will be next given while referring to FIG. 136.

As shown in FIG. 136, a case is assumed wherein after a player operates a BET 20 button 8113, he/she simultaneously operates a PLAY 5 GAMES button 8105 and a PLAY MAX GAMES button 8108. The bet amount "20" is set with respect to the "continuous game", based on the player's operation with respect to the BET 20 button 8113. The bet amount is set so that 5 unit games constituting the "continuous game" are continuously executed based on the player's operation with respect to the PLAY 5 GAMES button 8105. Accordingly, in S8501, the bet amount "4" is equally allocated with respect to 5 unit games constituting the "continuous game" indicated by the player.

Next, in S8502, a control to stop payout with respect to the player is executed. In such a situation, in S8503, the unit game constituting the "continuous game" indicated by the player is repeatedly executed 5 times by auto-play. Then, in S8504, a ranking forecast game is executed. In this ranking forecast game, the total payout 8501 which is payable to the player in the auto-play is bet. In this ranking forecast game, the player selects one character for a battle in which a plurality of characters enter, and then forecasts the ranking of the selected character in that battle.

In that ranking forecast game, if the ranking forecast made by the player loses, a total payout 8501 is included in a fund 8502, as shown in S8506. Alternatively, if the ranking forecast made by the player wins in that ranking forecast game in S8505, the total payout 8501 is paid out to the player together with the fund 8502.

8-2. Construction of the Slot Machine

The Eighth Embodiment

Hereinafter, the one embodiment embodying the present invention will be explained in detail with reference to the drawings.

First, an outline construction of the slot machine 8001 according to the present embodiment will be explained based on FIG. 137. FIG. 137 is a perspective view of the slot machine 8001 according to the present embodiment.

As shown in FIG. 137, the slot machine 8001 is an upright type slot machine arranged in a game arcade such as casino, in order to execute predetermined game modes, such slot machine includes a cabinet 8003 in which electronic and mechanical components are installed. For example, as a display portion 8004 to display information a concerning game, there are provided an upper display portion 8004A, a middle variable display portion 8004B and a lower display portion 8004C. Each display portion 8004A to 8004C is mounted at the front of the oblong cabinet 8003. The upper display portion 8004A includes a liquid crystal panel 5A which is arranged above the middle variable display portion 8004B. On the liquid crystal panel 8005A, for example, an effect image, an introduction of a game content, and a rule explanation of a game are displayed. The lower display portion 8004C is arranged below the middle variable display portion 8004B, and includes a plastic panel 8005C on which images are printed, and a plastic panel 8005C is lightened by back-lights.

The middle variable display portion 8004B, which is used to display an execution state of a game, includes the liquid crystal panel 8005B which is fixed at the front door of the cabinet 8003. In this liquid crystal panel 8005B, nine symbols of the video reels are displayed in a scrolling manner and in a stopped manner, respectively. In the middle variable display portion 8004B, the symbol display frame 8111 in which the nine symbol display areas associated with each video reel are positioned like a matrix of three rows times three columns is displayed on the liquid crystal panel 8005B. Further, a touch panel 8101 is provided on the front surface of the liquid crystal panel 8005B. A player can input each kind of commands by operating the touch panel 8101. On the upper position of the middle variable display portion 8004B, the payout amount display portion 8008 and a credit amount display portion 8009 are provided on the liquid crystal panel 8005B. Also the upper portion of the middle variable display portion 8004B, is related to the back side, thereby a player may play a game in a cozy posture.

In the middle variable display portion 8004B, a bet amount display portion 8202 is provided on the liquid crystal panel 8005B, at the right side of the symbol display frame 8111. Further, in the middle variable display portion 8004B, a game number display portion 8201 is provided on the liquid crystal panel 8005B, at the left side of the symbol display frame 8111. Furthermore, in the middle variable display portion 8004B, a minimum bet amount display area 8205 is provided on the liquid crystal panel 8005B, at the lower side of the game number display portion 8201.

Now, images of a slot game to be displayed on the liquid crystal panel 8005B are explained. FIG. 150 and FIG. 151 are drawings showing contents displayed on the liquid crystal panel 8005B, as one example of images of a slot game to be displayed on the liquid crystal panel 8005B. As shown in FIG. 150 and FIG. 151, on the liquid crystal panel 8005B in a slot game, the symbol drawn on the reel band of each video reel is displayed in the nine symbol display areas positioned like a matrix of three rows times three columns in the symbol display frame 8111, so that they can be viewed by a player. FIG. 150 shows a state in which the symbol drawn on the reel band of each video reel is arranged or rearranged in each symbol display area of the symbol display frame 8111 on the liquid crystal panel 8005B. FIG. 151 shows a state in which the symbol drawn on the reel band of each video reel is displayed by a scrolling manner in each symbol display area of the symbol display frame 8111 on the liquid crystal panel 8005B. Incidentally, on the reel band of each video reel, a symbol column constructed from twenty-two symbols is drawn respectively (refer to FIG. 148).

Further, the payout amount display portion 8008 and the credit amount display portion 8009 are provided on the liquid crystal panel 8005B. On the payout amount display portion 8008, the payout amount awarded in a slot game to a player is displayed. On the credit amount display portion 8009, the credit amount which is owned by a player at the moment is displayed.

Further, the liquid crystal panel 8005B contains the bet amount display portion 8202, the game number display portion 8201 and the minimum bet amount display area 8205. The bet amount display portion 8202 displays the bet amount for a unit game, as set by a player in a slot game. The game number display portion 8201 displays the remaining number of times for executing unit games that constitute the "continuous game" set by a player in a slot game. The minimum bet amount display area 8205 displays the minimum bet amount for each unit game that a player can set.

Therefore, on the liquid crystal panel 8005B in a slot game, one symbol which is drawn on the reel band of each video reel is arranged in each of the nine symbol display areas of the symbol display frame 8111.

Returning to FIG. 137, between the middle variable display portion 8004B and the lower display portion 8004C, at the front of the cabinet 8003, an operation table 8010 which is projected forward is provided. On the operation table 8010, a variety of operation buttons 8011 including a BET button, a COLLECT button, a SPIN button, a CASHOUT button and the like are arranged as an operation portion to execute a game.

Here, the variety of operation buttons 8011 will now be described. FIG. 138 is a front view showing the variety of operation buttons 8011. As shown in FIG. 138, at an upper stage are provided a CHANGE button 8121, a CASHOUT button 8102 starting from the leftmost side. At a middle stage are provided a COLLECT/HELP button 8103, a PLAY 1 GAME button 8104, the PLAY 5 GAMES button 8105, a PLAY 10 GAMES button 8106, a PLAY 50 GAMES button 8107 and the PLAY MAX GAMES button 8108 starting from the leftmost side. At a lower stage are provided a GAMBLE/RESERVE button 8109, a BET 1 button 8110, a BET 5 button 8131, a BET 10 button 8112, the BET 20 button 8113 and a BET 40 button 8114, starting from the leftmost side. At the rightmost side is provided a SPIN button 8115.

In this respect, the CHANGE button 8121 is an operation device which is used to change bills inserted in a bill insertion slot 8013 (refer to FIG. 137). Coins which have been changed are paid out to a coin tray 8016 (refer to FIG. 137) provided at the lower side of the cabinet 8003 (refer to FIG. 137).

The CASHOUT button 8102 is an operation device which is used to input a command to pay out coins in accordance with the credit amount which a player owns at the moment to the coin tray 8016 (refer to FIG. 137) or a command to pay out such coins by means of bar code-attached tickets which are printed in a ticket printer 8014 (refer to FIG. 137).

The COLLECT/HELP button 8103 is an operation device which is used when completing a double-down game which is executed using the payout amount acquired by a player, or when the game operation method and the like is unclear. Incidentally, if the COLLECT/HELP button 8103 is operated when completing the double-down game, the payout amount which increased or decreased in the double-down game is added to the credit amount which a player owns at the moment.

Incidentally, the amount corresponding to 1 credit is set in advance by denomination.

The PLAY 1 GAME button 8104 is an input device for inputting, based on being operated, a command to execute one unit game. The PLAY 5 GAMES button 8105 is an input device for inputting, based on being operated, a command to execute five continuous unit games constituting the "continuous game". The PLAY 10 GAMES button 8106 is an input device for inputting, based on being operated, a command to execute ten continuous unit games constituting the "continuous game". The PLAY 50 GAMES button 8107 is an input device for inputting, based on being operated, a command to execute fifty continuous unit games constituting the "continuous game".

The PLAY MAX GAMES button 8108 is an input device for inputting, based on being operated, a command to execute a maximum number of continuous unit games constituting the "continuous game". Here, the maximum number of times for executing the unit game is computed by dividing the credit amount owned by a player at the moment by the minimum bet amount with respect to each unit game which can be set by the player.

Incidentally, the operation with respect to the PLAY 1 GAME button 8104, PLAY 5 GAMES button 8105, PLAY 10 GAMES button 8106, PLAY 50 GAMES button 8107 and PLAY MAX game button 8108 is not accepted during normal operation.

The GAMBLE/RESERVE button 8109 is an operation device which is used by a player when he/she shifts a slot game to a double-down game, or when he/she steps away from the slot machine.

The BET 1 button 8110 is an input device for inputting, based on being operated, a command to set the bet amount corresponding to "1" with respect to a unit game or the "continuous game". The BET 5 button 8131 is an input device for inputting, based on being operated, a command to set the bet amount corresponding to "5" with respect to a unit game or the "continuous game". The BET 10 button 8112 is an input device for inputting, based on being operated, a command to set the bet amount corresponding to "10" with respect to a unit game or the "continuous game". The BET 20 button 8113 is an input device for inputting, based on being operated, a command to set the bet amount corresponding to "20" with respect to a unit game or the "continuous game". The BET 40 button 8114 is an input device for inputting, based on being operated, a command to set the bet amount corresponding to "40" with respect to a unit game or the "continuous game".

The SPIN button 8115 is an input device for inputting, based on being operated, a command to display each video reel by a scrolling manner.

Returning to FIG. 137, at the operation table 8010, a coin insertion slot 8012 and the bill insertion slot 8013 are provided. Between the operation table 8010 and the middle variable display portion 8004B, the ticket printer 8014 and a card reader 8015 are provided. At the lowest position of the cabinet 8003, the coin tray 8016 is also provided.

Incidentally, in the slot machine 8001 of the present embodiment, gaming medium may be coin, bill, or electronic value (credit). Here, the gaming medium may be others as well, such as medal, token, electronic money, or ticket.

Further, on the cabinet 8003 of the slot machine 8001, light emitting portions 8020 are arranged around a game area including the upper display portion 8004A, the middle variable display portion 8004B, the lower display portion 8004C and the operation table 8010.

Furthermore, the slot machine 8001 also includes a topper effect device 8028 which is installed on the cabinet 8003. The topper effect device 28 is shaped in a rectangular board shaped, and is provided almost parallel to the liquid crystal panel 8005A of the upper display portion 8004A. The cabinet 8003 is further provided with speakers 8023 on its both sides.

8-3. Outline of Symbols

The Eighth Embodiment

Next, the symbols drawn on the reel band of each video reel will be explained based on FIG. 148. These symbols are scrolled and rearranged in the respective symbol display areas of the symbol display frame 8111 on the liquid crystal panel 8005B in a slot game. FIG. 148 is a schematic view showing symbol columns drawn on the reel band of each video reel.

On the reel band of each video reel, twenty-two symbols are arranged respectively. Each symbol column of video reel is constructed from the symbols including "FRANKENSTEIN", "BLUE7", "BELL", "APPLE", "CHERRY", "PLUM" and "ORANGE". And the symbols of predetermined types are arranged in a predetermined sequence.

In this respect, each of the symbols including "FRANKENSTEIN", "BLUE 7", "BELL", "APPLE", "CHERRY", "PLUM" and "ORANGE" are scatter symbols. If three or four or more scatter symbols are rearranged in the symbol display frame 8111 of the liquid crystal panel 8005B, the payout amount set in advance is awarded to a player (refer to FIG. 149).

Incidentally, to each symbol composing the symbol column of each video reel shown in FIG. 148, a code number is allocated from top to down in sequence.

8-4. Internal Construction of the Slot Machine

The Eighth Embodiment

Next, an internal construction of the above-mentioned slot machine 8001 will be explained with reference to FIG. 139 and FIG. 140.

FIG. 139 is a block diagram showing an internal construction of entire slot machine 8001. As shown in FIG. 139, the slot machine 8001 includes a plurality of construction elements such as a main control board 8071, in which a microcomputer 8031 is included. The main control board 8071 is constructed from the microcomputer 8031, a random number generation circuit 8035, a sampling circuit 8036, a clock pulse generation circuit 8037 and a frequency divider 8080. The main control board 8071 also includes an illumination effect driving circuit 8061, a hopper driving circuit 8063, a payout completion signal circuit 8065, a display portion driving circuit 8067 and a lamp driving circuit 8203.

The microcomputer 8031 is constructed from a main CPU 8032, a RAM 8033 and a ROM 8034. The main CPU 8032 runs based on programs stored in the ROM 8034, and inputs/outputs a signal with other elements through an I/O port 8039, so as to execute control of the entire slot machine 8001. Data and programs used when the main CPU 8032 runs are stored in the RAM 8033. For example, after-mentioned random numbers which are sampled by the sampling circuit 8036 are stored temporarily after a start of a game, also the code numbers of the respective video reels and the symbol numbers are stored in the RAM 8033. Further, the RAM 8033 sets in advance a storage area where an after-mentioned variable N is stored. Programs executed by the main CPU 8032 and permanent data are stored in the ROM 8034.

Especially, the programs stored in the ROM 8034 include game programs and game system programs (abbreviated as "the game programs and the like" hereinafter). Further, a lottery programs mentioned below is also included in the game programs.

The lottery program is a program used to determine the code numbers of the respective video reels which corresponds to each symbol rearranged in the respective symbol display areas of the symbol display frame 8111 on the liquid crystal panel 8005B. Then, in the lottery program, it is included symbol weighing data corresponding to each of plural kinds of payout rates (for example, 80%, 84%, and 88%). The symbol weighing data are the data indicating correlation between the code number of each video reel and one or plural random numbers belonging to a predetermined number range (0 to 255), every each of the nine video reels. In other words, each of the code number of one video reel is associated with one or more random numbers corresponding to the payout rate. The random numbers are extracted by the lottery program, and symbols specified finally by the random numbers are rearranged in the respective symbol display areas of the symbol display frame 8111 on the liquid crystal panel 8005B.

Random numbers over a predetermined range are generated by the random number generation circuit 8035, which is operated based on instructions from the main CPU 8032. The random numbers are voluntarily extracted from the random numbers generated by the random number generation circuit 8035 by the sampling circuit 8036, based on instructions from the main CPU 8032, and the extracted random numbers are input to the main CPU 8032. The base clock for running the main CPU 8032 is generated by the clock pulse generation circuit 8037, and signals which are generated by dividing the base clock in a predetermined frequency are input to the main CPU 8032 by the frequency divider 8038.

And to the main control board 8071, the touch panel 8101 is connected. The touch panel 8101 is arranged in front of the liquid crystal panel 8005B, and specifies the coordinate position of the portion touched by a player. The position on which a player touched and the direction of the movement of the touched portion are determined based on the specified coordinate position information. A signal corresponding to the determination is input to the main CPU 8032 through the I/O port 8039.

Also, the operation buttons 8011 for instructing an execution of a game are connected to the main control board 8071. The operation buttons 8011 include the variety of buttons (refer to FIG. 138). A signal corresponding to the depressing of these buttons is input to the main CPU 8032 through the I/O port 8039.

An effect signal which is used to conduct illumination effect is output to the above-mentioned light emitting portions 8020 and the topper effect device 8028 by the illumination effect driving circuit 8061. Then, the topper effect device 8028 is serially connected to the illumination effect driving circuit 8061 through the light emitting portions 8020.

A hopper 8064 is driven by the hopper driving circuit 8063 based on control of main CPU 8032. The hopper 8064 executes payout of coins, and coins are paid out from the coin tray 8016. Data of the number of coins are input from the connected coin detecting portion 8066 by the payout completion signal circuit 8065. When the number of coins becomes a predetermined number, a signal indicating completion of the coins is input to the main CPU 8032. The number of the coins paid out from the hopper 8064 is calculated by the coin detecting portion 8066, and the data of the number calculated are input to the payout completion signal circuit 8065. The each display operation of the payout amount display portion 8008 and credit amount display portion 8009 is controlled by the display portion driving circuit 8067.

The lamp driving circuit 8203 turns lamps 8204 on/off based on control of main CPU 8032. The lamps 8204 are provided inside the operation buttons 8011. The lamp 8204 inside the button with respect to which a player's operation is validated lights up, notifying the player of the button with respect to which operation is validated.

Furthermore, a sub control board 8072 is connected to the main control board 8071. The sub control board 8072 is connected to the liquid crystal panel 8005A, the liquid crystal panel 8005B and the speakers 8023.

FIG. 140 is a block diagram showing an internal construction of the sub control board 8072. As shown in FIG. 140, a command from the main control board 8071 is input to the sub control board 8072. The display control on the liquid crystal panel 8005A of the upper display portion 8004A and the liquid crystal panel 8005B of the variable display portion 8004B, and the sound output control on the speakers 8023 are executed by the sub control board 8072. The sub control board 8072 is constructed on a circuit board different from the circuit board for the main control board 8071, and includes a microcomputer 8073 (abbreviated as "sub microcomputer" hereinafter) as a main construction element, and a sound source IC 8078, a power amplifier 8079 and an image control circuit 8081. The sound source IC 8078 controls the sound output from the speakers 8023, the power amplifier 8079 is used as an amplification device, and the image control circuit 8081 runs as a display control device of the liquid crystal panel 8005A and 8005B.

The sub microcomputer 8073 includes a sub CPU 8074, a program ROM 8075, a work RAM 8076, an IN port 8077 and an OUT port 8080. The control operations are executed by the sub CPU 8074 based on a control order sent from the main control board 8071, the program ROM 8075 is used as a memory device. Although a clock pulse generation circuit, a frequency divider, a random number generation circuit and a sampling circuit are not included in the sub control board 8072, the sub control board 8072 is constructed so as to execute random number sampling according to operation programs thereof. Control programs executed by the sub CPU 8074 are stored in the program ROM 8075. The work RAM 8076 is constructed as a temporary storing device when the above-mentioned control programs are executed by the sub CPU 8074.

The image control circuit 8081 includes an image control CPU 8082, an image control work RAM 8083, an image control program ROM 8084, an IN port 8085, an image ROM 8086, a video RAM 8087 and an image control IC 8088. Images displayed on the liquid crystal panel 8005A and 8005B are determined by the image control CPU 8082, based on parameters set by the sub microcomputer 8073, according to image control programs stored in the image control program ROM 8084.

The image control programs regarding to a display of the liquid crystal panel 8005A, 8005B and a variety of selection tables are stored in the image control program ROM 8084. The image control work RAM 8083 is constructed as a temporary storing device when the image control programs are executed by the image control CPU 8082. Images corresponding to contents determined by the image control CPU 8082 are formed by the image control IC 8088, and are output to the liquid crystal panel 8005A, 8005B.

In the image ROM 8086, dot data used to form images are stored. Thus, it stores the dot data on symbols drawn on the reel band of the each video reel. The video RAM 8087 runs as a temporary storing device when the images are formed by the image control IC 8088.

Further, based on a control signal from the main CPU 8032, the image control circuit 8081 performs display control of scrolling display/stop display of the video reels in the respective symbol display areas of the symbol display frame 8111 on the liquid crystal panel 8005B.

8-5. Outline of a Slot Game

The Eighth Embodiment

Next, winning combinations and the payout amounts corresponding to the winning combinations will be explained based on FIG. 149, wherein the winning combinations are symbol combinations when a slot game is executed by using each of the video reels in the slot machine 8001 according to the present embodiment. FIG. 149 is a payout table in which the winning combinations and the payout amounts corresponding to the winning combinations are shown when a slot game is executed by using each of the video reels.

Here, the payout amount shown in FIG. 149 indicates the payout amount when the bet amount is "1". Therefore, when the bet amount is "1", the payout amount shown in FIG. 149 is paid out, and when the bet amount is more than "2", the payout amount obtained by multiplying the payout amount shown in FIG. 149 with the bet amount is paid out.

Accordingly, if the nine scatter symbols of "FRANKENSTEIN" are rearranged in the symbol display frame 8111 of the liquid crystal panel 8005B, the amount obtained by multiplying the bet amount with 500 credits will be paid out. If the eight scatter symbols of "FRANKENSTEIN" are rearranged in the symbol display frame 8111 of the liquid crystal panel 8005B, the amount obtained by multiplying the bet amount with 300 credits will be paid out. Hereinafter, the payout amounts are set in a similar manner, as shown in FIG. 149, in accordance with the number of "FRANKENSTEIN" scatter symbols which have been rearranged in the symbol display frame 8111 of the liquid crystal panel 8005B.

With respect to each of the other scatter symbols including "BLUE 7", "BELL", "APPLE", "CHERRY", "ORANGE" and "PLUM", as well, the payout amounts as shown in FIG. 149 are set in a similar manner in accordance with the number of the same scatter symbols which have been rearranged in the symbol display frame 8111 of the liquid crystal panel 8005B.

As mentioned above, in the slot machine 8001 according to the present embodiment, a slot game is executed.

In other words, in a slot game, the slot game is executed by rearranging the plurality of same symbols specified by nine video reels in the symbol display frame 8111 of the liquid crystal panel 8005B. In the slot game, firstly, a part of symbol column (one symbol) drawn on the reel band of each video reel shown in FIG. 148, is arranged in each symbol display area of the symbol display frame 8111 on the liquid crystal panel 8005B (refer to FIG. 150). Here, after a player sets the bet amount by depressing the BET button among the operation buttons 8011, if the player depresses the SPIN button 8115 among the operation buttons 8011, each of the video reels rotates, the symbol column drawn on the reel band of each video reel shown in FIG. 148, is scrolled from up to down in the symbol display frame 8111 of the liquid crystal panel 8005B (refer to FIG. 151).

After a predetermined time, each of the video reels stops automatically, a part of symbol column (one symbol) drawn on the reel band of each video reel shown in FIG. 148, is rearranged in each symbol display area of the symbol display frame 8111 on the liquid crystal panel 8005B (refer to FIG. 150). On the other hand, each winning combination based on each the number of the scatter symbol is determined beforehand (refer to FIG. 149). When a symbol combination constructed from the nine symbols rearranged in the symbol display frame 8111 of the liquid crystal panel 8005B, realizes a winning combination specified by the number of the same scatter symbol, the payout amount obtained by multiplying the bet amount with the payout amount corresponding to the realized winning combination is awarded to the player.

8-6. Operation of the Slot Machine

The Eighth Embodiment

Next, a main control program executed in the slot machine 8001 according to the present embodiment will be explained with reference to drawings. FIG. 143 is a flowchart of the main control program.

First, when a power switch is pressed (power activation), the microcomputer 8031 is started to operate, an initial setting process is executed by the microcomputer 8031 in step (abbreviated as "S") 8001. In the initialization process, BIOS stored in the ROM 8034 is executed by the main CPU 8032. Compressed data included in the BIOS are expanded to the RAM 8033, and when the BIOS expansion to the RAM 8033 is executed, a diagnosing process and initialization process of various peripheral devices are executed. Also, the game programs and the like are written from the ROM 8034 to the RAM 8033 by the main CPU 8032, so as to obtain the payout rate setting data and country ID information. Also, during execution of the initial setting process, a verification process to each program is executed.

Then in S8002, the main CPU 8032 reads out the game programs and the like from the RAM 8033, and executes the programs in sequence so as to conduct the main game process. A game is executed in the slot machine 8001 according to the present embodiment by executing the main game process. Then, the main game process is repeated when the power is supplied to the slot machine 8001.

Next, a sub process of the main game process in S8002 above will be explained based on FIG. 144. FIG. 144 is a flowchart of the main game process program in the slot machine 8001 according to the present embodiment. Incidentally, each program shown in the flowchart of FIG. 144 is stored in the ROM 8034 or the RAM 8033 of the slot machine 8001, and is executed by the main CPU 8032.

First, as shown in FIG. 144, in S8011, a start acceptance process is executed by the main CPU 8032. Then, a sub process of the start acceptance process in S8011 above will be explained based on FIG. 145. FIG. 145 is a flowchart of the start acceptance process program in the slot machine 8001 according to the present embodiment. Incidentally, each program shown in the flowchart of FIG. 145 is stored in the ROM 8034 or the RAM 8033 of the slot machine 8001, and is executed by the main CPU 8032.

In the start acceptance process in S8011 above, the main CPU 8032 determines, in S8021, whether or not the bet amount has been indicated, as shown in FIG. 145. Here, in a case of an input signal from any of the BET 1 button 8110, BET 5 button 8131, BET 10 button 8112, BET 20 button 8113 and BET 40 button 8114, it is determined that the bet amount has been indicated. However, if the indicated amount exceeds the bet amount corresponding to the credit amount owned by a player at the moment, it is determined that no bet amount has been indicated. At this point, if no bet amount has been indicated (S8021: NO), the process proceeds to S8024 described below. In contrast, if the bet amount has been indicated (S8021: YES), the process proceeds to S8022.

In S8022, the main CPU 8032 executes a continuous unit game number specifying process. In this process, the main CPU 8032 specifies one or a plurality of "continuous games" including a number of unit games which can be indicated by a player, through the bet amount indicated in S8021 above and the minimum bet amount (in the present embodiment, the bet amount being "1") with respect to a unit game which can be set by a player.

In S8023, the main CPU 8032 executes a continuous unit game number button validation process. In this process, the main CPU 8032 accepts the player's operating the button related to the "continuous game" specified in S8022 above, with respect to the PLAY 1 GAME button 8104, PLAY 5 GAMES button 8105, PLAY 10 GAMES button 8106, PLAY 50 GAMES button 8107 and PLAY MAX GAMES button 8108.

Incidentally, in a case of a rate of 1 credit for 1 bet, as long as the credit amount owned by a player at the moment is not "0", the player's operation with respect to the PLAY MAX GAMES button 8108 is accepted.

Further, the main CPU 8032 turns on the lamp 8204 provided inside the button related to the "continuous game" specified in S8022 above, by sending a control signal to the lamp driving circuit 8203. As a result, a player is notified that the operation of that button is valid.

In S8024, the main CPU 8032 determines whether or not the number of games has been indicated. Here, with respect to the PLAY 1 GAME button 8104, PLAY 5 GAMES button 8105, PLAY 10 GAMES button 8106, PLAY 50 GAMES button 8107 and PLAY MAX GAMES button 8108, if an input signal is sent from any of the buttons which have been validated in S8023 above, it is determined that the number of games has been indicated. At this point, if the number of games has not been indicated (S8024: NO), the process proceeds to above S8012 shown in FIG. 144. In contrast, if the number of games has been indicated (S8024: YES), the process proceeds to S8025.

Incidentally, the main CPU 8032 assigns the number of games indicated in S8024 above to the variable N. The main CPU 8032 displays the variable N stored in the RAM 8033 on the game number display portion 8201 of the liquid crystal panel 8005B by sending a control signal to the sub control board 8072.

In S8025, the main CPU 8032 executes a bet amount allocation process. In this process, the main CPU 8032 allocates the bet amount indicated in S8021 above in an equal manner to each unit game corresponding to the number of games indicated in S8024 above (refer to FIG. 141 above). As a result of this equal allocation, if a surplus occurs with respect to the bet amount indicated in S8021 above, the main CPU 8032 stores the surplus of the bet amount in the RAM 8033, as surplus information.

The main CPU 8032 stores the bet amount thus allocated in the RAM 8033, as bet allocation information. Then, the main CPU 8032 displays the bet allocation information (the bet amount which is evenly allocated to each unit game) which is stored in the RAM 8033 on the bet amount display portion 8202 of the liquid crystal panel 8005B, by sending a control signal to the sub control board 8072. Then, the process proceeds to above S8012 shown in FIG. 144.

Returning to FIG. 144, in S8012, the main CPU 8032 determines whether or not a predetermined condition is met.

Here, the predetermined condition is that the SPIN button 8115 is depressed. Accordingly, this determination is made based on a signal which is input to the main CPU 8032 depending on depressing the SPIN button 8115. At this point, if the SPIN button 8115 is not depressed (S8012: NO), the process returns to the start acceptance process (S8011) again. Thereby, an operation of changing the bet amount, an operation of changing the number of games and the like are possible. In contrast, if the SPIN button 8115 is depressed (S8012: YES), the process proceeds to S8013.

However, the main CPU 8032 executes each of following processes before an execution of process in S8013. First, the bet amount set based on the above bet operation is reduced from the credit amount owned by the player at the moment. Incidentally, the credit amount after the reduction is stored in the RAM 8033 as credit information. Then, by sending a control signal to the display portion driving circuit 8067, the main CPU 8032 displays the credit information (the credit amount after the above reduction) stored in the RAM 8033 on the credit amount display portion 8009 of the liquid crystal panel 8005B.

The main CPU 8032 includes the surplus information (the surplus of the bet amount which occurred in the allocation process of S8025) stored in the RAM 8033 to the credit information stored in the RAM 8033, at a rate of 1 credit for 1 bet. Then, by sending a control signal to the display portion driving circuit 8067, the main CPU 8032 displays the credit information (the credit amount after the above addition) stored in the RAM 8033 on the credit amount display portion 8009 of the liquid crystal panel 8005B. Further, the main CPU 8032 overwrites "0" in the RAM 8033, as the surplus information.

Further, the main CPU 8032 invalidates the operation with respect to all buttons including the PLAY 1 GAME button 8104, PLAY 5 GAMES button 8105, PLAY 10 GAMES button 8106, PLAY 50 GAMES button 8107 and PLAY MAX GAMES button 8108. Simultaneously, by sending a control signal to the lamp driving circuit 8203, the main CPU 8032 turns off the lamp 8204 provided inside each of the buttons 8104 to 8108.

If the main CPU 8032 simultaneously receives an input signal from the PLAY MAX GAMES button 8108 and any one button from the PLAY 1 GAME button 8104, PLAY 5 GAMES button 8105, PLAY 10 GAMES button 8106 and PLAY 50 GAMES button 8107, the main CPU 8032 turns ON a flag provided in the RAM 8033.

Incidentally, the main CPU 8032 may turn ON the flag provided in the RAM 8033 only upon simultaneously receiving an input signal from the PLAY MAX GAMES button 8108 and any one button selected from the PLAY 1 GAME button 8104, PLAY 5 GAMES button 8105, PLAY 10 GAMES button 8106 and PLAY 50 GAMES button 8107.

In S8013, the main CPU 8032 determines whether or not a unit game has been realized. At this point in time, the number of times of unit games constituting the "continuous game" and the variable N coincide. Accordingly, the main CPU 8032 determines that a unit game has been realized, if the variable N is equal to "1". At this point, if a unit game has not been realized (S8013: NO), the process proceeds to S8016 described later. In contrast, if a unit game has been realized (S8013: YES), the process proceeds to S8014.

In S8014, the main CPU 8032 executes a first allocation process. In this process, the main CPU 8032 allocates at random the bet amount corresponding to the total bet amount information stored in the RAM 8033 to the respective unit games corresponding to the number of games indicated in S8024 of FIG. 145 above.

More specifically, for instance, as shown in FIG. 142, the bet amount with respect to the "continuous game" indicated by a player is assumed to be "23", and the number of games constituting the "continuous game" indicated by the player is assumed to be "5".

In the case of FIG. 142, the bet amount is respectively allocated with respect to 5 unit games constituting the "continuous game" indicated by the player, in the sequence "4", "6", "2", "4" and "7".

Incidentally, as shown in this S8014, if the bet amount with respect to the "continuous game" indicated by the player is allocated at random with respect to the respective unit games constituting the "continuous game" indicated by the player, the main CPU 8032 performs control so that the bet amount allocated with respect to the unit games which are being executed is updated and stored as bet allocation information, with each unit game constituting the "continuous game" indicated by the player. Further, by sending a control signal to the sub control board 8072, the main CPU 8032 performs control so that the bet allocation information thus updated and stored is displayed on the bet amount display portion 8202 of the liquid crystal panel 8005B with respect to each execution of the unit game constituting the "continuous game" indicated by the player.

Incidentally, this random allocation of the bet amount is adjusted so that there is no surplus of the bet amount.

In S8015, the main CPU 8032 executes a unit game process. In this process, the main CPU 8032 executes a slot game just one time. In other words, the main CPU 8032 executes a unit game.

Namely, the main CPU 8032 executes a process wherein a symbol is selected at random. Specifically, when the lottery program included in the game programs is executed by the main CPU 8032, the random number corresponding to each video reel respectively is selected from a range of "0 to 255". Then, with reference to the symbol weighting data corresponding to the payout rate setting data, based on the nine random numbers, the code number of each video reel is determined by the main CPU 8032. The main CPU 8032 stores the determined code number of each video reel in the RAM 8033 by overwriting code number information in the RAM 8033 with the determined code number of each video reel so as to correspond to each symbol display area of the symbol display frame 8111 on the liquid crystal panel 8005B.

Here, the code number of each video reel is associated with the symbol number to be rearranged in each symbol display area of the symbol display frame 8111 on the liquid crystal panel 8005B, so each symbol to be rearranged in such game is determined by overwriting the code number information in the RAM 8033 with the code number of each video reel determined by the main CPU 8032 so as to correspond to each symbol display area of the symbol display frame 8111 on the liquid crystal panel 8005B. For example, if the main CPU 8032 determines that all of the code number of each video reel are "21" and then overwrites the code number information in the RAM 8033 with the code number of each video reel so as to correspond to each symbol display area of the symbol display frame 8111 on the liquid crystal panel 8005B, the main CPU 8032 determines to rearrange the nine symbols of "FRANKENSTEIN" (refer to FIG. 148). Thus, by overwriting the code number information in the RAM 8033 with the code number of each video reel selected by a lottery so as to correspond to each symbol display area of the symbol display frame 8111 on the liquid crystal panel 8005B, each symbol to be rearranged in a unit game of a slot game is determined.

Subsequently, the main CPU 8032 executes a process wherein a symbol display is controlled. In other words, by sending a control signal to the sub control board 8072, the main CPU 8032 starts a scrolling display of each video reel in each symbol display area of the symbol display frame 8111 on the liquid crystal panel 8005B. After that, an effect mode (a display mode of images on the liquid crystal panel 8005B and a sound output mode from the speakers 8023) for each unit game is determined by the main CPU 8032, and the sub control board 8072 is ordered to start the effect in a predetermined effect pattern. Then, when a predetermined timing to stop displaying each video reel in scrolling manner comes, the main CPU 8032, by sending a control signal to the sub control board 8072, stops scrolling of each video reel being displayed. The stop operation is based on the code number stored in the RAM 8033 by overwriting the code number information in the RAM 8033 with the code number so as to correspond to each symbol display area of the symbol display frame 8111 on the liquid crystal panel 8005B. With this, each symbol which determined in S8015 above-mentioned is rearranged in each symbol display area of the symbol display frame 8111 on the liquid crystal panel 8005B.

After that, the main CPU 8032 determines whether or not there is a winning combination. The determination is made based on the code number stored in the RAM 8033 by overwriting the code number information in the RAM 8033 with the code number so as to correspond to each symbol display area of the symbol display frame 8111 on the liquid crystal panel 8005B. At this point, if there is not a winning combination, the process returns to S8011 above.

In contrast, if there is a winning combination, the main CPU 8032 executes a process wherein a display is renewed. Specifically, first, the payout amount obtained by multiplying the payout amount corresponding to the winning combination (the number of the same symbol) rearranged in the symbol display frame 8111 of the liquid crystal panel 8005B with the bet amount is computed. Incidentally, the computation is executed based on the bet allocation information in the RAM 8033 and the payout table of FIG. 149. In case that there is more than one payout amount corresponding to the winning combination (the number of the same symbol), the computation is executed by adding up these payout amounts. The computed payout amount is stored in RAM 8033 as payout information. After that, by sending a control signal to the display portion driving circuit 8067, the main CPU 8032 displays the payout information stored in the RAM 8033 (the above-mentioned computed amount) on the payout amount display portion 8008 of the liquid crystal panel 8005B.

Then, the main CPU 8032 executes a process of payout. Here, the payout amount awarded to a player in a slot game is paid out to the player based on the payout information stored in the RAM 8033.

When the pay out is executed, the credit amount stored in the RAM 8033 as the payout information (the payout amount awarded to a player in a slot game) are added to the credit amount stored in the RAM 8033 as the credit information, and the added value is overwritten in the RAM 8033 as the credit information. After that, by sending a control signal to the display portion driving circuit 8067, the main CPU 8032 displays the credit information stored in the RAM 8033 (the added value computed) on the credit amount display portion 8009 of the liquid crystal panel 8005B.

Incidentally, in the payout process, the credit amount owned by a player at the moment may be paid out by coins corresponding to the credit amount (one credit equals to one coin) based on the player's depressing the CASHOUT button 8102, or may also be paid out by a ticket with a bar code which is printed by the ticket printer 8014.

Then, the process returns to S8011 above.

If a unit game has not been realized (S8013: NO), the process proceeds to S8016. In S8016, the main CPU 8032 determines whether or not a continuous game has been realized. At this time, the number of times of the unit games constituting the "continuous game" coincides with the variable N. Accordingly, the main CPU 8032 determines that the "continuous game" has been realized if the variable N is greater than "1". However, if the flag provided in the RAM 8033 is ON, the main CPU 8032 determines that the "continuous game" has not been realized. At this point, if the "continuous game" has not been realized (S8013: NO), the process proceeds to S8019 described later. In contrast, if the "continuous game" has been realized (S8013: YES), the process proceeds to S8017.

In S8017, the main CPU 8032 executes a second allocation process. In this process, similar to the first allocation process in S8014 above, the main CPU 8032 allocates at random the bet amount corresponding to the total bet amount information stored in the RAM 8033 to the respective unit games corresponding to the number of games indicated in S8024 of FIG. 145 above.

In S8018, the main CPU 8032 executes a continuous game process. In this process, the main CPU 8032 executes a plurality of slot games, the number of which is the same as the variable N. More specifically, the main CPU 8032 executes a unit game by the number of times which is the same as the variable N. According to this control, the unit game process in S8015 above is automatically repeated by the number of times which is the same as the variable N. The main CPU 8032 performs control so that the bet amount allocated with respect to the unit game which is being executed is updated and stored as bet allocation information, with respect to each execution of a unit game. Further, the main CPU 8032 performs control so that the bet allocation information thus updated and stored is displayed on the bet amount display portion 8202 of the liquid crystal panel 8005B, by sending a control signal to the sub control board 8072, with respect to each execution of a unit game.

Next, the process returns to S8011 above.

Further, if the "continuous game" has not been realized (S8016: NO), the process proceeds to S8019. In S8019, the main CPU 8032 determines whether or not a predetermined operation has been executed. In this process, the main CPU 8032 determines that the predetermined operation has been executed, if the flag provided in the RAM 8033 is ON. Here, the predetermined operation refers to the case that a player simultaneously operates the PLAY MAX GAMES button 8108 and any one button from amongst the PLAY 1 GAME button 8104, PLAY 5 GAMES button 8105, PLAY 10 GAMES button 8106 and PLAY 50 GAMES button 8107. At this point, if the predetermined operation is not executed (S8019: NO), the process returns to S8011 above. In contrast, if the predetermined operation is executed (S8019: YES), the process proceeds to S8020.

In S8020, the main CPU 8032 executes a multi-choice game. Then, a multi-choice game process in S8020 will be explained based on FIG. 146. FIG. 146 is a flowchart of a sub process program of the multi-choice game process in the slot machine 8001 according to the present embodiment. Incidentally, the program shown in the flowchart of FIG. 146 is stored in the ROM 8034 and the RAM 8033 of the slot machine 8001, and is executed by the main CPU 8032.

In the multi-choice game process in S8020 of FIG. 144 above, the main CPU 8032 executes a continuous number of times specifying process in S8031, as shown in FIG. 146. At this point, the number of times of the unit games constituting the "continuous game" coincides with the variable N. Accordingly, the main CPU 8032 specifies the number of times which is the same as the variable N as the continuous number of times.

In S8032, the main CPU 8032 executes a third allocation process. In this process, similar to the first allocation process in S8014 above, the main CPU 8032 allocates at random the bet amount corresponding to the total bet amount information stored in the RAM 8033 to the respective unit games corresponding to the number of games indicated in S8024 of FIG. 145 above.

In S8033, the main CPU 8032 executes a special continuous game process. In this process, the main CPU 8032 executes a plurality of slot games, the number of which is the same as the variable N. More specifically, the main CPU 8032 executes a unit game by the number of times which is the same as the variable N. However, in this process, a player is not awarded a payout. According to this control, the unit game process in S8015 above is automatically repeated by the number of times which is the same as the variable N. The main CPU 8032 performs control so that the bet amount allocated with respect to the unit game which is being executed is updated and stored as bet allocation information, with respect to each execution of a unit game. Further, the main CPU 8032 performs control so that the bet allocation information thus updated and stored is displayed on the bet amount display portion 8202 of the liquid crystal panel 8005B, by sending a control signal to the sub control board 8072, with respect to each execution of a unit game.

Further, the main CPU 8032 accumulates and stores the payout amount which is originally payable to the player in the RAM 8033, as the payout information.

In S8034, the main CPU 8032 executes a total payout computation process. In this process, the main CPU 8032 computes the payout information stored in RAM 8033 as the total payout 8501 (refer to FIG. 136).

In S8035, the main CPU 8032 executes a character symbol display process. In this process, the main CPU 8032 displays a character symbol display screen on the liquid crystal panel 8005B as shown in FIG. 152, by sending a control signal to the sub control board 8072. On the character symbol display screen as shown in FIG. 152 are displayed 4 characters that have entered the battle. Also, the respective numbers "1", "2", "3", and "4" showing the ranking in the battle are displayed. The image data corresponding to such character symbol display screen is stored in the image ROM 8086 (refer to FIG. 140).

In S8036, the main CPU 8032 executes a character symbol specifying process. In this process, the main CPU 8032 specifies the choice made by a player out of the 4 characters displayed on the character symbol display screen in FIG. 152 above. This specifying process is executed by determining whether or not a player touched the respective characters displayed on the character symbol display screen in FIG. 152 above, based on a coordinate signal from the touch panel 8101.

In S8037, the main CPU 8032 is in stand-by until the specifying process in S8036 above is executed (S8037: NO). Once the specifying process in S8036 above is executed (S8037: YES), the process proceeds to S8038.

In S8038, the main CPU 8032 executes a forecasted ranking specifying process. In this process, the main CPU 8032 specifies the choice made by a player out of the 4 numbers displayed on the character symbol display screen in FIG. 152 above. This specifying process is executed by determining whether or not a player touched the respective numbers displayed on the character symbol display screen in FIG. 152 above, based on a coordinate signal from the touch panel 8101.

In S8039, the main CPU 8032 is in stand-by until the specifying process in S8038 above is executed (S8039: NO). Once the specifying process in S8038 above is executed (S8039: YES), the process proceeds to S8040.

In S8040, the main CPU 8032 executes a ranking random determination process. In this process, the main CPU 8032 determines at random the order, in the battle, of the 4 characters displayed on the character symbol display screen in FIG. 152 above.

In S8041, the main CPU 8032 executes a battle effect image selection process. In this process, the main CPU 8032 selects a battle effect image showing the determination results in S8040 above. The battle effect image is selected from an image group 8400 as shown in FIG. 154. This image group 8400 is made up of a plurality of battle images 8401, 8402, . . . , as shown in FIG. 154. Incidentally, the image data corresponding to each battle image 8401, 8402, . . . , are stored in the image ROM 86 (refer to FIG. 140).

In S8042, the main CPU 8032 executes a battle effect image display process. In this process, first, the main CPU 8032 displays a battle start screen as shown in FIG. 153 on the liquid crystal panel 8005B by sending a control signal to the sub control board 8072. The image data corresponding to such battle start screen are stored in the image ROM 8086 (refer to FIG. 140).

Further, the main CPU 8032 displays the battle effect image which was selected in S8041 above by sending a control signal to the sub control board 8072.

In S8043, the main CPU 8032 executes a funding process. Then, the funding process in S8043 will be explained based on FIG. 147. FIG. 147 is a flowchart of a sub process program of the funding process in the slot machine 8001 according to the present embodiment. Incidentally, the program shown in the flowchart of FIG. 147 is stored in the ROM 8034 and the RAM 8033 of the slot machine 8001, and is executed by the main CPU 8032.

In the funding process in S8043 of FIG. 146 above, the main CPU 8032 determines, in S8051 as shown in FIG. 147, whether or not the ranking specified by the player in S8038 of FIG. 146 above with respect to the characters specified by the player in S8036 of FIG. 146 above differs from the ranking determined in S8040 of FIG. 146 above. At this point, in a case that they are the same (S8051: NO), the process proceeds to S8054 described below. In contrast, in a case that they differ (S8051: YES), the process proceeds to S8052.

In S8052, the main CPU 8032 executes a losing image display process. In this process, the main CPU 8032 displays a losing image 8602 as shown in FIG. 155 on the liquid crystal panel 8005B by sending a control signal to the sub control board 8072. Incidentally, the image data corresponding to such losing image 8602 are stored in the image ROM 8086 (refer to FIG. 140).

In S8053, the main CPU 8032 executes a fund amount inclusion process. In this process, the main CPU 8032 includes the payout information stored in the RAM 8033 that was computed in S8034 above in fund amount information provided in RAM 8033. Incidentally, the fund amount information provided in the RAM 8033 corresponds to the fund 8502 shown in FIG. 136. The payout information in RAM 8033 corresponds to the total payout 8501 shown in FIG. 136.

Further, the main CPU 8032 turns OFF the flag provided in the RAM 8033. Then, the process returns to S8011 of FIG. 144 above.

In a case that they are the same (S8051: NO), the process proceeds to S8054. In S8054, the main CPU 8032 executes a winning image display process. In this process, the main CPU 8032 displays a winning image 8601 as shown in FIG. 155 on the liquid crystal panel 8005B by sending a control signal to the sub control board 8072. Incidentally, the image data corresponding to such winning image 8601 are stored in the image ROM 8086 (refer to FIG. 140).

In S8055, the main CPU 8032 executes a payout process. In this process, the main CPU 8032 pays out to the player the fund 8502 corresponding to the fund amount information provided in the RAM 8033 and the total payout 8501 corresponding to the payout information stored in the RAM 8033 that was computed in S8034 above.

When this payout process is executed, the main CPU 8032 adds, to the credit amount stored as credit information in the RAM 8033, both the amount of the fund 8502 stored as the fund amount information in the RAM 8033 and the amount of the total payout 8501 stored as the payout information in the RAM 8033. Then, the main CPU 8032 overwrites the added value in the RAM 8033 as the credit information. After that, by sending a control signal to the display portion driving circuit 8067, the main CPU 8032 displays the credit information stored in the RAM 8033 (the added value computed in S8055) on the credit amount display portion 8009 of the liquid crystal panel 8005B.

Incidentally, in the payout process, the credit amount owned by a player at the moment may be paid out by coins corresponding to the credit amount (one credit equals to one coin) based on the player's depressing the CASHOUT button 8102, or may also be paid out by a ticket with a bar code which is printed by the ticket printer 8014.

Further, the main CPU 8032 turns OFF the flag provided in the RAM 8033. Thereafter, the process returns to S8011 of FIG. 144 above.

8-7. Other

The Eighth Embodiment

The present invention is not limited to the above-described eighth embodiment, and various modifications and alterations can be made thereto without departing from the spirit of the invention.

For instance, the present invention may also be applied with respect to a gaming machine wherein unit games such as card games, roulette games, dice games or mahjong game or the like are repeatedly executed.

What is claimed is:

1. A gaming machine comprising:

a plurality of unit games;

a continuous game which is a group of the unit games that progress by being executed continuously up to a plurality of number of times;

a bet amount indicating device with which a player performs an indicating operation of a bet amount;

a minimum bet amount that a player can indicate per a unit game by employing the bet amount indicating device;

a unit game indicating device with which a player performs an indicating operation so as to bet the bet amount which is indicated in the bet amount indicating device with respect to the unit game;

a plurality of continuous number of times indicating devices that are respectively employed by a player when performing an indicating operation so as to bet the bet amount indicated in the bet amount indicating device with respect to the continuous game, and that are provided so as to respectively correspond to a plurality of types of continuous number of times; in the plurality of continuous number of times indicating devices an indicating operation is invalidated in normal time;

a maximum number of times indicating device with which a player performs an indicating operation so as to bet the bet amount which is indicated in the bet amount indicating device with respect to the continuous game, and which is provided so as to correspond to a maximum continuous number of times which is computed based on both the bet amount indicated in the bet amount designating device and the minimum bet amount;

a multi-choice game which employs a plurality of character symbols;

a display device on which the multi-choice game progresses;

an inputting device with which a player performs an inputting operation which is required in the multi-choice game;

a fund amount in which a payout is included in the multi-choice game;

a plurality of battle effect images that are effect images respectively generated in advance with respect to each of all combinations that can be made up of ranking of the character symbols, and that notify a player of the ranking of the character symbols depending on a battle result of the character symbols;

a battle effect image group which is made up of the battle effect images;

a winning image which notifies a player of the player's win in the multi-choice game;

a losing image which notifies a player of the player's loss in the multi-choice game;

a completion device with which a player performs an inputting operation of a completion with respect to each of the indicating operations in the bet amount indicating device and the unit game indicating device, with which a player performs an inputting operation of a completion with respect to each of the indicating operations in the bet amount indicating device and the continuous number of times indicating device or with which a player performs an inputting operation of a completion with respect to each of the indicating operations in the bet amount indicating device and the maximum number of times indicating device; and a processor which is programmed, in a case where a player has simultaneously performed an indicating operation in any one of the continuous number of times indicating devices and performed an indicating operation in the maximum number of times indicating device, to execute each of processes from the process of (1) below to the process of (10-2) below for progressing the multi-choice game:

(1) specifying all of the types of continuous number of times upon performing an inputting operation by the player with the completion device;

(2) allocating respectively the indicated bet amount with respect to each of unit games corresponding to the specified continuous number of times;

(3) repeating automatically progress of each of unit games corresponding to the specified continuous number of times in a condition that no payout is awarded to the player;

(4) computing a total payout which was scheduled to be awarded to the player based on both progress results of each of unit games corresponding to the specified continuous number of times and the bet amount allocated;

(5) displaying each of the character symbols on the display device;

(6) specifying any one of the character symbols based on an inputting operation which is performed by the player employing the inputting device;

(7) specifying a ranking forecast by the player with respect to the specified character symbol based on an inputting operation which is performed by the player employing the inputting device;

(8) upon completing each inputting operation by the player with the inputting device:

(8-1) determining respectively at random raking of each character symbol being displayed on the display device;

(8-2) selecting a battle effect image corresponding to a combination which is made up of each character symbol's determined ranking from the battle effect image group;

(8-3) displaying the selected battle effect image on the display device;

(9) in a case where the determined ranking with respect to the specified character symbol differs from the specified ranking:

(9-1) displaying the losing image on the display device;

(9-2) ending the multi-choice game after including the scheduled total payout computed into the fund amount;

(10) in a case where the determined ranking with respect to the specified character symbol coincides with the specified ranking:

(10-1) displaying the winning image on the display device; and (10-2) ending the multi-choice game after awarding the player both the scheduled total payout computed and a payout corresponding to the fund amount.

2. The gaming machine of claim 1, wherein the processor is programmed, for allocating respectively the indicated bet amount with respect to each of unit games corresponding to the continuous number of times of the type which corresponds to the continuous number of times indicating device in which the indicating operation is performed, to execute each of processes from the process of (11) below to the process of (12) below in executing the process of (2) above:

(11) allocating evenly the indicated bet amount with respect to each of the unit games that progresses by the automatic continuous repetition; and

(12) returning to the player a bet amount that was left in the allocation.

3. The gaming machine of claim 1, wherein the processor is programmed, for allocating respectively the indicated bet amount with respect to each of unit games corresponding to the continuous number of times of the type which corresponds to the continuous number of times indicating device in which the indicating operation is performed, to execute a process of (13) below in executing the process of (2) above:

(13) allocating at random the indicated bet amount with respect to each of the unit games that progresses by the automatic continuous repetition.

4. The gaming machine of claim 1, wherein the processor is programmed to execute a process of (14) below:

(14) restricting an indicating operation in any one of the continuous number of times indicating devices validated to an indicating operation in a specific continuous number of times indicating device out of the continuous number of times indicating devices validated.

* * * * *